US012783700B2

(12) United States Patent
Nishimoto

(10) Patent No.: US 12,783,700 B2
(45) Date of Patent: Nov. 3, 2026

(54) DIGITAL ASSET GUARD SERVICE PROVISION SYSTEM

(71) Applicants: INTERTRADE Co., Ltd., Tokyo (JP); Digital Asset Markets, Inc., Tokyo (JP)

(72) Inventor: Kazuya Nishimoto, Tokyo (JP)

(73) Assignees: INTERTRADE Co., Ltd., Tokyo (JP); Digital Asset Markets, Inc, Tokyo (JP)

( * ) Notice: Subject to any disclaimer, the term of this patent is extended or adjusted under 35 U.S.C. 154(b) by 0 days.

(21) Appl. No.: 18/879,253

(22) PCT Filed: Dec. 1, 2023

(86) PCT No.: PCT/JP2023/043130
§ 371 (c)(1),
(2) Date: Dec. 27, 2024

(87) PCT Pub. No.: WO2024/214336
PCT Pub. Date: Oct. 17, 2024

(65) Prior Publication Data

US 2026/0057088 A1 Feb. 26, 2026

(30) Foreign Application Priority Data

Apr. 14, 2023 (JP) ................................ 2023-066775

(51) Int. Cl.
*G06F 7/04* (2006.01)
*G06F 21/62* (2013.01)
*H04L 9/00* (2022.01)

(52) U.S. Cl.
CPC ................ *G06F 21/62* (2013.01); *H04L 9/50* (2022.05)

(58) Field of Classification Search
CPC ... G06F 21/62; H04L 9/50; H04L 9/08; H04L 9/0819; H04L 63/0435
See application file for complete search history.

(56) References Cited

U.S. PATENT DOCUMENTS

| | | | | |
|---|---|---|---|---|
| 10,841,082 | B2 * | 11/2020 | Ben-Ari | H04L 63/0428 |
| 2020/0167503 | A1 * | 5/2020 | Wei | G06F 21/602 |

(Continued)

FOREIGN PATENT DOCUMENTS

| | | | |
|---|---|---|---|
| CN | 111949606 | A | 11/2020 |
| CN | 112134914 | A | 12/2020 |
| CN | 112769932 | A | 5/2021 |

OTHER PUBLICATIONS

Islam et al., Remote Device Management via Smart Contracts, Dec. 30, 2021, IEEE, pp. 38-46. (Year: 2021).*

(Continued)

*Primary Examiner* — Philip J Chea
*Assistant Examiner* — Jenise E Jackson
(74) *Attorney, Agent, or Firm* — Apex Juris, pllc; Tracy M Heims

(57) ABSTRACT

A system is provided robustly protects important information from high-level cyberattacks and physical destruction, including cryptographic analysis using quantum computers and electromagnetic pulse attacks, while enabling restoration without theft by a third party. The system encrypts and partitions file data using predetermined encryption and division algorithms based on a customer specified parameter, allots each file data to multiple sets of distributed file management groups comprising node groups at multiple bases in different regions of the world, distributes and records the file data to be saved in the nodes located at each base that belong to corresponding distributed file management groups, generates and encrypts index information of each distributed and recorded corresponding file data, and records the index information in node groups of a specified base in the consortium chain.

15 Claims, 108 Drawing Sheets

(56) References Cited

U.S. PATENT DOCUMENTS

| | | | | |
|---|---|---|---|---|
| 2020/0342092 | A1* | 10/2020 | Wei | G06F 21/6218 |
| 2021/0081548 | A1 | 3/2021 | Wang | |
| 2023/0297540 | A1* | 9/2023 | Khan | G06F 16/125 |
| 2024/0265002 | A1* | 8/2024 | Banerjee | G06F 16/219 |
| 2024/0362621 | A1* | 10/2024 | Ezrielev | G06Q 20/02 |

OTHER PUBLICATIONS

Wu et al., A Review on Recent Progress of Smart Contract in Blockchain, May 10, 2022, IEEE, pp. 1-25. (Year: 2022).*
International Search Report issued on Feb. 20, 2024.
Yukio Noguchi, Nikkei BP Nihon Keizai Shinbun Shuppan Honbu, non-official translation, The Blockchain Revolution [new edition] Emergence of a decentralized autonomous societies. 1st edition., Aug. 3, 2020, pp. 278-279, ISBN:978-4-532-19981-4.
Office action issued on Feb. 9, 2024 by Japan Patent Office.

* cited by examiner

FIG.5A

ENCRYPTION AND DIVISION ALGORITHM SELECTION RECEPTION MEANS 22

SELECTIONS OF A PROGRAM OR SMART CONTRACT 21A HAVING PREDETERMINED ENCRYPTION AND DIVISION ALGORITHMS BASED ON FIRST PARAMETER P1 SPECIFIED BY A CUSTOMER WHO DESIRES TO SAVE FILE DATA, ARE ACCEPTED
NOTE THAT A IS AN INTEGER FROM 1 THROUGH Q

FIG.5B

ENCRYPTION AND DIVISION ALGORITHM SELECTION RECEPTION MEANS 22

*FIRST PARAMETER P1 COMPRISES A FILE DIVISION CODE P11 AND A FILE STORAGE PARAMETER P12

SELECTIONS OF THE PROGRAM OR SMART CONTRACT 21A THAT HAS A PREDETERMINED ENCRYPTION AND DIVISION ALGORITHM BASED ON THE FILE DIVISION CODE P11 ARE ACCEPTED
NOTE THAT A IS AN INTEGER FROM 1 THROUGH Q

FIG.7A

FILE DATA ENCRYPTION AND DIVISION MEANS 24

TO ENCRYPT AND MULTI-DIVIDE CUSTOMER FILE DATA TO BE SAVED, ACCEPTED BY THE FILE DATA SAVING INSTRUCTION RECEPTION MEANS 23, USING THE PROGRAM OR SMART CONTRACT 21A THAT COMPRISES ENCRYPTION AND DIVISION ALGORITHMS ACCEPTED BY THE ENCRYPTION AND DIVISION ALGORITHM SELECTION RECEPTION MEANS 22

NOTE THAT A IS AN INTEGER FROM 1 THROUGH Q

FIG.7B

FILE DATA ENCRYPTION AND DIVISION MEANS 24

TO MULTI-DIVIDE CUSTOMER FILE DATA TO BE SAVED, ACCEPTED BY THE FILE DATA SAVING INSTRUCTION RECEPTION MEANS 23, USING THE PROGRAM OR SMART CONTRACT 21A THAT COMPRISES THE ENCRYPTION AND DIVISION ALGORITHMS ACCEPTED BY THE ENCRYPTION AND DIVISION ALGORITHM SELECTION RECEPTION MEANS 22, AND EACH MULTI-DIVIDED FILE DATA IS ENCRYPTED BASED ON FIRST PUBLIC KEY, THAT IS, A FIRST ENCRYPTION KEY K12 GENERATED BY CUSTOMER

NOTE THAT A IS AN INTEGER FROM 1 THROUGH Q

FIG.7C

FILE DATA ENCRYPTION AND DIVISION MEANS 24

*FILE DATA ENCRYPTION AND DIVISION MEANS 24 MAY BE CONFIGURED TO ENCRYPT THE CUSTOMER FILE DATA TO BE SAVED, ACCEPTED BY THE FILE DATA SAVING INSTRUCTION RECEPTION MEANS 23 BASED ON A FIRST PUBLIC KEY, THAT IS, THE FIRST ENCRYPTION KEY K12 GENERATED BY THE CUSTOMER, AND TO MULTI-DIVIDE ENCRYPTED FILE DATA, USING THE PROGRAM OR SMART CONTRACT 21A THAT COMPRISES THE ENCRYPTION AND DIVISION ALGORITHM ACCEPTED BY THE ENCRYPTION AND DIVISION ALGORITHM SELECTION RECEPTION MEANS 22

NOTE THAT A IS AN INTEGER FROM 1 THROUGH Q

FIG. 11A

FILE DATAINTEGRATION MEANS 101

TO INTEGRATE EACH SMALL AMOUNT OF FILE DATA RECORDED IN A PREDETERMINED CONFIDENTIAL BLOCKCHAIN BY THE SMALL AMOUNT FILE DATA TEMPORARY RECORDING MEANS 100, INTO ONE INTEGRATED FILE DATA THROUGH BATCH PROCESSES SEVERAL TIMES A DAY

INTEGRATED FILE DATA IS USED FOR THE SAVING PROCESS OF DIVIDING AND ENCRYPTING FILE DATA BY FILE DATA SAVING SYSTEM 10 AND OF DISTRIBUTING AND RECORDING FILE DATA INTO NODES $102_{1 \text{ THROUGH } MB}$ AT EACH BASE BELONGING TO THE DISTRIBUTED FILE MANAGEMENT GROUPS $101_{1 \text{ THROUGH } M}$ AND INTO RECORDING DEVICES AT MULTIPLE BASES NETWORKED TO THE NODES AT THE BASES

NOTE THAT M AND MB ARE INTEGERS OF 2 OR MORE

FIG. 11B

FILE DATAINTEGRATION MEANS 101

TO INTEGRATE EACH SMALL AMOUNT OF FILE DATA RECORDED IN THE PREDETERMINED CONFIDENTIAL BLOCKCHAIN BY THE SMALL AMOUNT FILE DATA TEMPORARY RECORDING MEANS 100, INTO ONE INTEGRATED FILE DATA THROUGH BATCH PROCESSES SEVERAL TIMES A DAY

INTEGRATED FILE DATA IS TRANSGFERRED TO THE SMART CONTRACT 21A, WHERE A IS AN INTEGER FROM 1 THROUGH Q, HAVING THE ENCRYPTION AND DIVISION ALGORITHM ACCEPTED BY THE ENCRYPTION AND DIVISION ALGORITHM SELECTION RECEPTION MEANS 22 IN THE FILE DATA SAVING SYSTEM 10

FILE DATAINTEGRATION MEANS 101 CONTROLS THE SYSTEM TO PERFORM THE SAVING PROCESS OF DIVIDING AND ENCRYPTING FILE DATA AND DISTRIBUTING AND RECORDING THE FILE DATA INTO THE NODES $102_{1 \text{ THROUGH } MB}$ AT EACH OF THE BASES BELONGING TO THE DISTRIBUTED FILE MANAGEMENT GROUPS $101_{1 \text{ THROUGH } M}$ AND INTO RECORDING DEVICES AT MULTIPLE BASES NETWORKED TO THE NODES AT THE BASES NOTE THAT A IS AN INTEGER FROM 1 THROUGH Q AND M AND MB ARE INTEGERS OF 2 OR MORE

FIG. 12A

SMALL AMOUNT FILE DATA DELETION MEANS 102

TO DISCONNECT A CHAIN OF BLOCK THAT RECORDS THE CORRESPONDING SMALL AMOUNT OF FILE DATA IN THE PREDETERMINED CONFIDENTIAL BLOCKCHAIN, AFTER FILE DATA SAVING SYSTEM 10 COMPLETES THE SAVING PROCESS FOR THE INTEGRATED FILE DATA

TO DELETE FILE DATA RECORDED IN THE BLOCK WHOSE CHAIN IS DISCONNECTED

FIG. 12B

SMALL AMOUNT FILE DATA DELETION MEANS 102

FOLLOWING FUNCTIONS ARE INCLUDED

FUNCTIONS OF SETTING TEMPORARY SAFEKEEPING PERIOD OF A PREDETERMINED NUMBER OF DAYS, FOR EXAMPLE, ABOUT SEVEN DAYS, FOR THE FILE DATA THAT HAS BEEN INTEGRATED INTO ONE INTEGRATED FILE DATA BY THE FILE DATA INTEGRATION MEANS 101 AND FOR WHICH THE FILE DATA SAVING SYSTEM 10 HAS COMPLETED THE SAVING PROCESS FOR THE INTEGRATED FILE DATA, AMONG THE FILE DATA RECORDED IN A PREDETERMINED CONFIDENTIAL BLOCKCHAIN BY THE SMALL AMOUNT FILE DATA TEMPORARY RECORDING MEANS 100

FIG. 12C

SMALL AMOUNT FILE DATA DELETION MEANS 102

FOLLOWING FUNCTIONS ARE INCLUDED

FUNCTIONS OF DISCONNECTING CORRESPONDING BLOCK IN THE PREDETERMINED CONFIDENTIAL BLOCKCHAIN AFTER THE TEMPORARY SAFEKEEPING PERIOD, AND DELETING THE FILE DATA RECORDED IN THE BLOCK

FIG. 14A

SMART CONTRACT 31 FOR ALLOTTING DISTRIBUTED FILE MANAGEMENT GROUPS

HAVING A FUNCTION FOR ALLOTTING, EACH FILE DATA ENCRYPTED AND MULTI-DIVIDED BY THE FILE DATA ENCRYPTION AND DIVISION MEANS 24 AND UPLOADED TO THE FIRST TEMPORARY STORAGE AREA M1 BY THE UPLOAD MEANS 25 TO THE MULTIPLE DISTRIBUTED FILE MANAGEMENT GROUPS $101_{1 \text{ THROUGH } M}$ CONFIGURED WITH THE NODES LOCATED AT EACH BASES CONFIGURED FOR PLANETS $100_{1 \text{ THROUGH } N}$ SET ON A CO-ADMINISTRATOR SIDE IN A CUSTOMER SPECIFIED CONDITION AND IN RECORDING DEVICES AT MULTIPLE BASES NETWORKED TO THE NODES AT THE BASES BASED ON THE FIRST PARAMETER P1 AND THE SECOND PARAMETER P2 SPECIFIED BY THE CO-ADMINISTRATOR OF THE CONSORTIUM-TYPE BLOCKCHAIN

NOTE THAT M AND N ARE INTEGERS OF 2 OR MORE

FIG. 14B

SMART CONTRACT 31 FOR ALLOTTING DISTRIBUTED FILE MANAGEMENT GROUPS

FOLLOWING FUNCTIIONS ARE INCLUDED

FUNCTIONS OF

CHANGING FILE FORMATS AND NAMES OF EACH FILE DATA ENCRYPTED AND MULTI-DIVIDED BY THE FILE DATA ENCRYPTION AND DIVISION MEANS 24 AND UPLOADED TO THE FIRST TEMPORARY STORAGE AREA M1 BY THE UPLOAD MEANS 25, TO PREDETERMINED FILE FORMATS AND NAMES BASED ON A FILE STORAGE CODE P12 AND THE SECOND PARAMETER P2

ENCRYPTING FILE DATA CONCURRENTLY WITH THE CHANGES AND ALLOTTING EACH FILE DATA TO THE MULTIPLE DISTRIBUTED FILE MANAGEMENT GROUPS $101_{1 \text{ THROUGH } M}$ CONFIGURED WITH THE NODES LOCATED AT MULTIPLE BASES CONFIGURED FOR THE PLANETS $100_{1 \text{ THROUGH } N}$ AND RECORDING DEVICES LOCATED AT MULTIPLE BASES NETWORKED TO THE NODES AT THE BASES

NOTE THAT M AND N ARE INTEGERS OF 2 OR MORE

FIG.15

SMART CONTRACT 31 FOR ALLOTTING DISTRIBUTED FILE MANAGEMENT GROUPS

HAVING A FUNCTION FOR ALLOTTING EACH FILE DATA TO THE MULTIPLE DISTRIBUTED FILE MANAGEMENT GROUPS $101_{1\ \text{THROUGH}\ M}$ CONFIGURED WITH THE NODES LOCATED AT MULTIPLE BASES CONFIGURED FOR THE PLANETS $100_{1\ \text{THROUGH}\ N}$ SET ON THE CO-ADMINISTRATOR SIDE IN THE CUSTOMER SPECIFIED CONDITION VIA A PLANET CONFIGURATION SETTING MEANS 36 AND

RECORDING DEVICES LOCATED AT MULTIPLE BASES NETWORKED TO THE NODES AT THE BASES

NOTE THAT M AND N ARE INTEGERS OF 2 OR MORE

FIG. 16A

DISTRIBUTION AND RECORDING SMART CONTRACT 32

HAVING A FUNCTION FOR DISTRIBUTING AND RECORDING EACH FILE DATA ALLOTTED BY THE SMART CONTRACT 31 FOR ALLOTTING DISTRIBUTED FILE MANAGEMENT GROUPS TO THE NODES $102_{1\ \text{THROUGH}\ MB}$ AT EACH OF THE BASES BELONGING TO EACH OF THE CORRESPONDING THE DISTRIBUTED FILE MANAGEMENT GROUPS $101_{1\ \text{THROUGH}\ M}$ AND RECORDING DEVICES LOCATED AT MULTIPLE BASES NETWORKED TO THE NODES AT THE BASES

NOTE THAT M AND MB ARE INTEGERS OF 2 OR MORE

FIG. 16B

DISTRIBUTION AND RECORDING SMART CONTRACT 32

HAVING A FUNCTION FOR

CHECKING DATA RECORDING CAPACITIES OF EACH SUB-CONFIGURATION FILE SERVER $103_{1\ \text{THROUGH}\ P}$ THAT CONNECT TO THE NODES $102_{1\ \text{THROUGH}\ MB}$ AT EACH OF THE BASES BELONGING TO EACH OF THE DISTRIBUTED FILE MANAGEMENT GROUPS $101_{1\ \text{THROUGH}\ M}$ AND OF THE RECORDING DEVICES LOCATED AT MULTIPLE BASES NETWORKED TO THE NODES AT THE BASES SELECTING A SPECIFIED SUB-CONFIGURATION FILE SERVER HAVING A DATA RECORD CAPACITY CAPABLE OF RECORDING LARGE FILE DATA THAT IS ENCRYPTED, MULTI-DIVIDED AND UPLOADED TO THE TEMPORARY STORAGE AREA M1 BASED ON THE DATA RECORD CAPACITY AND USAGES RECORDING, THE LARGE FILE DATA THAT IS ENCRYPTED, MULTI-DIVIDED AND UPLOADED TO THE FIRST TEMPORARY STORAGE AREA M1, IN THE SPECIFIED SUB-CONFIGURATION FILE SERVER AND RECORDING INFORMATION OF THE SPECIFIED SUB-CONFIGURATION FILE SERVER RECORDING THE LARGE FILE DATA THAT IS ENCRYPTED, MULTI-DIVIDED AND UPLOADED INTO THE FIRST TEMPORARY STORAGE AREA M1 IN THE NODES $102_{1\ \text{THROUGH}\ MB}$ AT EACH OF THE BASES BELONGING TO EACH OF THE DISTRIBUTED FILE MANAGEMENT GROUPS $101_{1\ \text{THROUGH}\ M}$ AS THE SECOND INDEX INFORMATION

NOTE THAT M, MB AND P ARE INTEGERS OF 2 OR MORE

FIG. 17

DISTRIBUTION AND RECORDING SMART CONTRACT 32

COMPRISES FUNCTIONS FOR

CALCULATING A REMAINING RECORDABLE CAPACITY OF EACH OF OTHER SUB-CONFIGURATION FILE SERVERS CONNECTED TO THE NODES $102_{1\ \text{THROUGH}\ MB}$ AT EACH OF THE BASES BELONGING TO EACH OF THE DISTRIBUTED FILE MANAGEMENT GROUPS $101_{1\ \text{THROUGH}\ M}$ AND CONNECTED TO THE RECORDING DEVICES LOCATED AT MULTIPLE BASES NETWORKED TO THE NODES AT THE BASES FOR FILE DATA EXCEEDING THE UPPER LIMIT OF THE RECORD CAPACITY OF THE FILE SERVER SELECTING THE MOST SUITABLE RECORDING DESTINATION OF SUB-CONFIGURATION FILE SERVER BASED ON THE CALCULATED REMAINING RECORDABLE CAPACITY RECORDING THE CALCULATED REMAINING RECORDABLE CAPACITY IN THE SELECTED SUB-CONFIGURATION FILE SERVER

CHANGING THE SETTINGS TO PUT THE ORIGINAL FILE SERVER IN A DORMANT STATE AND

RECORDING (UPDATING) INFORMATION OF THE RECORDING DESTINATION OF SUB-CONFIGURATION FILE SERVERS TO BE RECORDED IN THE NODES $102_{1\ \text{THROUGH}\ MB}$ AT EACH OF THE BASES BELONGING TO EACH OF THE DISTRIBUTED FILE MANAGEMENT GROUPS $101_{1\ \text{THROUGH}\ M}$ AS SECOND INDEX INFORMATION WHEN THE RECORDED CAPACITY OF THE LARGE FILE DATA, WHICH IS ENCRYPTED, MULTI-DIVIDED AND UPLOADED INTO THE FIRST TEMPORARY STORAGE AREA M1 AND RECORDED IN THE PREDETERMINED SUB-CONFIGURATION FILE SERVERS THAT ARE CONNECTED TO THE NODES $102_{1\ \text{THROUGH}\ MB}$ AT EACH OF THE BASES BELONGING TO EACH OF THE DISTRIBUTED FILE MANAGEMENT GROUPS $101_{1\ \text{THROUGH}\ M}$ AND THE RECORDING DEVICES LOCATED AT MULTIPLE BASES NETWORKED TO THE NODES AT THE BASES, EXCEEDS THE UPPER LIMIT OF THE RECORD CAPACITY OF THE FILE SERVER

NOTE THAT M AND MB ARE INTEGERS OF 2 OR MORE

FIG.18A

SMART CONTRACT 33 FOR GENERATING SERVER INDEX INFORMATION

COMPRISES A FUNCTION FOR GENERATING SERVER INDEX INFORMATION COMPRISING

FILE NAME INFORMATION OF EACH FILE DATA DISTRIBUTED AND RECORDED BY EACH OF THE DISTRIBUTION AND RECORDING SMART CONTRACTS 32 AND

CONFIGURATION INFORMATION OF EACH OF THE DISTRIBUTED FILE MANAGEMENT GROUPS TO WHICH EACH FILE DATA IS ALLOTTED

FIG.18B

SMART CONTRACT 33 FOR GENERATING SERVER INDEX INFORMATION

COMPRISES A FUNCTION FOR GENERATING SERVER INDEX INFORMATION INCLUDING INFORMATION ON THE NODES LOCATED AT EACH OF THE BASES AND INFORMATION ON RECORDING DEVICES LOCATED AT MULTIPLE BASES NETWORKED TO THE NODES AT THE BASES, THE NODES AND RECORDING DEVICES DISTRIBUTING AND RECORDING DUMMY FILE DATA ADDED BY THE PLANET CONFIGURATION PATTERN SETTING MEANS 36 AS CONFIGURATION INFORMATION OF EACH OF THE DISTRIBUTED FILE MANAGEMENT GROUPS $101_{1\ \mathrm{THROUGH}\ M}$

NOTE THAT M IS AN INTEGER OF 2 OR MORE

FIG.19A

SMART CONTRACT 34 FOR RECORDING SERVER INDEX INFORMATION

COMPRISES A FOLLOWING FUNCTION FOR ENCRYPTING THE SERVER INDEX INFORMATION GENERATED BY THE SMART CONTRACT 33 FOR GENERATING SERVER INDEX INFORMATION AND RECORDING INTO THE NODE GROUPS LOCATED AT THE SPECIFIED BASES IN THE CONSORTIUM-TYPE BLOCKCHAIN

FIG.19B

SMART CONTRACT 34 FOR RECORDING SERVER INDEX INFORMATION

COMPRISES THE FOLLOWING FUNCTION FOR ENCRYPTING THE SERVER INDEX INFORMATION GENERATED BY THE SMART CONTRACT 33 FOR GENERATING SERVER INDEX INFORMATION BASED ON A SECOND PUBLIC KEY, THAT IS, SECOND ENCRYPTION KEY K22 GENERATED BY THE CO-ADMINISTRATOR OF THE CONSORTIUM-TYPE BLOCKCHAIN, OR BASED ON A SECOND ENCRYPTION PARAMETER P2X2 AUTOMATICALLY GENERATED FROM THE SECOND DECRYPTION PARAMETER P2X1 SPECIFIED BY THE CO-ADMINISTRATOR AND MANAGED OFFLINE

THE SECOND ENCRYPTION PARAMETER P2X2 IS INCORPORATED AND MODULARIZED IN A PREDETERMINED SMART CONTRACT PERFORMING THE CORRESPONDING PROCESS

THE SECOND DECRYPTION PARAMETER P2X1 IS INCORPORATED AND MODULARIZED IN A PREDETERMINED SMART CONTRACT PERFORMING THE CORRESPONDING PROCESS

FIG.20

FIRST DATA DELETION MEANS 46

TO DELETE EACH FILE DATA UPLOADED INTO THE FIRST TEMPORARY STORAGE AREA M1, AFTER THE SERVER INDEX INFORMATION IS ENCRYPTED AND RECORDED IN THE NODE GROUPS LOCATED AT THE SPECIFIED BASES IN THE CONSORTIUM-TYPE BLOCKCHAIN BY THE SMART CONTRACT 34 FOR RECORDING SERVER INDEX INFORMATION

FIG.21A

PLANET CONFIGURATION PATTERN SETTING MEANS 36

TO SELECT NUMBER OF THE NODES CONFIGURING THE PLANETS $100_{1 \text{ THROUGH } N}$ AND DISTRIBUTED FILE MANAGEMENT GROUPS CONFIGURED WITH THE NODES $102_{1 \text{ THROUGH } MB}$ AT EACH OF THE BASES AND RECORDING DEVICES LOCATED AT MULTIPLE BASES NETWORKED TO THE NODES AT THE BASES BASED ON THE NUMBER OF DIVISIONS OF THE FILE DATA BASED ON THE RECORD CAPACITY SPECIFIED BY THE CUSTOMER THE FILE SIZE AND THE DEGREE OF DISPERSION OF THE FILE DATA
NOTE THAT N AND MB ARE INTEGERS OF 2 OR MORE

FIG.21B

PLANET CONFIGURATION PATTERN SETTING MEANS 36

TO ADD A PREDETERMINED NUMBER OF DUMMY FILE DATA, WHICH COMPRISES A CODE INSIDE THAT ALLOWS A SMART CONTRACT 84 FOR EXTRACTING ENCRYPTED AND DIVIDED FILE DATA TO RECOGNIZE THE DUMMY INFORMATION, TO THE NUMBER OF DIVISIONS OF THE FILE DATA, AND SELECT THE NUMBER OF THE NODES CONFIGURING THE PLANETS $100_{1 \text{ THROUGH } N}$ AND THE DISTRIBUTED FILE MANAGEMENT GROUPS CONFIGURED WITH THE NODES $102_{1 \text{ THROUGH } MB}$ AT EACH OF THE BASES AND MULTIPLE RECORDING DEVICES THAT IS NETWORKED TO THE NODES AT THE BASES
NOTE THAT N AND MB ARE INTEGERS OF 2 OR MORE

FIG.22A

PLANET CONFIGURATION PATTERN SETTING MEANS 36

TO SELECT THE NODES $102_{1\ THROUGH\ MB}$ AT EACH OF THE BASES WITHIN EACH OF THE DISTRIBUTED FILE MANAGEMENT GROUPS $101_{1\ THROUGH\ M}$ AND THE RECORDING DEVICES LOCATED AT MULTIPLE BASES NETWORKED TO THE NODES AT THE BASES TO BE THE NODES AND RECORDING DEVICES SET AT A LOCATION WITH THE MAXIMUM DISTANCE WHICH EQUALS TO THE MAXIMUM DEGREE OF DISPERSION NOTE THAT M AND MB ARE INTEGERS OF 2 OR MORE

FIG.22B

PLANET CONFIGURATION PATTERN SETTING MEANS 36

"TO REGARD THE SPHERICAL EARTH AS A FLAT SURFACE, GENERATE A MATRIX MA IN WHICH THE EARTH AS A FLAT SURFACE IS MULTI-DIVIDED IN THE LONGITUDINAL AND LATERAL DIRECTIONS, DETERMINE THE X-AXIS DIRECTION SPACING WITH REFERENCE TO THE Y-AXIS IN THE MATRIX MA FOR BASES OF THE NODES $102_{1\ THROUGH\ MB}$ AND BASES OF MULTIPLE RECORDING DEVICES NETWORKED TO THE NODES, THAT RECORD AND DISTRIBUTE ONE DIVIDED FILE DATA WITHIN ONE DISTRIBUTED FILE MANAGEMENT GROUP $101_B$ USING CALCULATED VALUES BASED ON THE NUMBER OF DIVISIONS OF FILE DATA, AND

SELECT THE NODES $102_{1\ THROUGH\ MB}$ AT EACH OF THE BASES WITHIN EACH OF THE DISTRIBUTED FILE MANAGEMENT GROUPS $101_{1\ THROUGH\ M}$ AND THE RECORDING DEVICES LOCATED AT MULTIPLE BASES NETWORKED TO THE NODES AT THE BASES

NOTE THAT B IS AN INTEGER BETWEEN 1 AND M, AND SUFFIXES M AND MB ARE INTEGERS OF 2 OR MORE

FIG. 23

PLANET CONFIGURATION PATTERN SETTING MEANS 36

FOR THE BASES OF THE NODES $102_{1\ \mathrm{THROUGH}\ MB}$ THAT RECORD AND DISTRIBUTE ONE DIVIDED FILE DATA AND OF MULTIPLE RECORDING DEVICES NETWORKED TO THE NODES AT THE BASES, WHEN THE INTERVAL IN THE X-AXIS DIRECTION CANNOT BE SPACED AS PER CALCULATION VALUES BASED ON THE NUMBERS OF DIVISIONS OF THE FILE DATA CAUSED BY A LACK OF REMAINING RECORDABLE CAPACITY OF ANY OF CORE NODES $102C_{1\ \mathrm{THROUGH}\ MB}$ AT A PREDETERMINED BASE AND RECORDING DEVICES AT MULTIPLE BASES NETWORKED TO THE NODES AT THE BASES, THE PLANET CONFIGURATION PATTERN SETTING MEANS 36 SELECTS THE NODES LOCATED AT BASES IN THE Y-AXIS DIRECTION HAVING NUMERICAL DIFFERENCES SIMILAR TO CALCULATION VALUES OF THE X-AXIS DIRECTION INTERVALS OR RECORDING DEVICES NETWORKED TO THE NODES AT THE BASES NOTE THAT C IS A POSITIVE INTEGER LESS THAN OR EQUAL TO MB, AND MB IS AN INTEGER OF 2 OR MORE

FIG.24A

PLANET CONFIGURATION PATTERN SETTING MEANS 36

TO RECORD TOTAL REMAINING RECORDABLE CAPACITY AND TOTAL REMAINING COMMUNICATION CAPACITY AND THE LIKE IN THE MATRIX MAAS INFORMATION ON THE NODES LOCATED AT EACH OF THE BASES AT EACH REGION TO WHICH BASES OF THE NODES $102_{1\ \text{THROUGH}\ MB}$ BELONG AND INFORMATION OF RECORDING DEVICES LOCATED AT MULTIPLE BASES NETWORKED TO THE NODES AT THE BASES AND SELECT MOST SUITABLE COMBINATIONS OF BASES OF THE NODES $102_{1\ \text{THROUGH}\ MB}$ AND MULTIPLE RECORDING DEVICES NETWORKED TO THE NODES AT EH BASES, USING INFORMATION OF TOTAL REMAINING RECORDING CAPACITIES AND TOTAL REMAINING COMMUNICATION CAPACITIES AND DISPERSION DEGREES OF THE NODES LOCATED AT EACH OF THE BASES AND RECORDING DEVICES LOCATED AT MULTIPLE BASES NETWORKED TO THE NODES AT THE BASES IN EACH REGION RECORDED IN THE MATRIX MA, UPON SELECTING BASES OF THE NODES $102_{1\ \text{THROUGH}\ MB}$ CONFIGURING THE DISTRIBUTED FILE MANAGEMENT GROUPS $101_{1\ \text{THROUGH}\ M}$ AND THE BASES OF MULTIPLE RECORDING DEVICES NETWORKED TO THE NODES

NOTE THAT M AND MB ARE INTEGERS OF 2 OR MORE

FIG.24B

PLANET CONFIGURATION PATTERN SETTING MEANS 36

TO CALCULATE A REGION IN WHICH RECORDING CAPACITIES AND COMMUNICATION CAPACITIES OF THE NODES LOCATED AT EACH OF THE BASES AND THE RECORDING DEVICES LOCATED AT MULTIPLE BASES NETWORKED TO THE NODES AT THE BASES NEED TO BE INCREASED, IN COMBINATIONS OF THE NODES $102_{1\ \text{THROUGH}\ MB}$ AT PREDETERMINED BASES CONFIGURING THE DISTRIBUTED FILE MANAGEMENT GROUPS $101_{1\ \text{THROUGH}\ M}$ AND RECORDING DEVICES LOCATED AT MULTIPLE BASES NETWORKED TO THE NODES AT THE BASES

NOTE THAT M AND MB ARE INTEGERS OF 2 OR MORE

FIG.25

SAVED FILE DATA LIST INFORMATION GENERATION MEANS 37

TO GENERATE SAVED FILE DATA LIST INFORMATION, COMPRISING TERMINAL INFORMATION, THAT IS A FIXED IP ADDRESS, AND INFORMATION OF THE ORIGINAL FILE NAME AND THE UPLOAD DATE OF THE FILE DATA TO BE SAVED WHICH ARE ASSOCIATED WITH A CUSTOMER, WHEN THE FILE DATA IS UPLOADED TO THE FIRST TEMPORARY STORAGE AREA M1 USING THE UPLOAD MEANS 25

FIG.26

SAVED FILE DATA LIST INFORMATION REFERENCE CONTROL MEANS 38

CONFIGURED TO ALLOW THE SAVED FILE DATA LIST INFORMATION GENERATED BY THE SAVED FILE DATA LIST INFORMATION GENERATION MEANS 37 TO REFER ONLY BY USING COMMUNICATION EQUIPMENT MANAGEMENT AND PROCESS PROGRAM MANAGED BY THE FIXED IP ADDRESS OF THE CUSTOMER

FIG.27A

SMART CONTRACT 39 FOR SETTING SAFEKEEPING PERIOD

COMPRISES THE FOLLOWING FUNCTION
A FUNCTION FOR SETTING A SAFEKEEPING PERIOD OF THE BLOCK IN UNITS OF THE PLANETS $100_{1\ \text{THROUGH}\ N}$ BASED ON SAFEKEEPING PERIOD INFORMATION OF FILE DATA THAT THE CUSTOMER DESIRES TO SAVE AND THAT IS RECORDED IN A NODE GROUP LOCATED AT A SPECIFIED BASE IN THE CONSORTIUM-TYPE BLOCKCHAIN BY A SMART CONTRACT 51 FOR RECORDING DATA SAVING SERVICE CONTRACT APPLICATION RECEPTION INFORMATION
NOTE THAT N IS AN INTEGER OF 2 OR MORE

FIG.27B

SMART CONTRACT 39 FOR SETTING SAFEKEEPING PERIOD

FURTHER COMPRISES THE FOLLOWING FUNCTION
A FUNCTION FOR SETTING A TEMPORARY SAFEKEEPING PERIOD OF A PREDETERMINED NUMBER OF DAYS, FOR EXAMPLE, APPROXIMATELY SEVEN DAYS FOR THE SMALL FILE DATA THAT IS ENCRYPTED, DIVIDED AND UPLOADED TO THE FIRST TEMPORARY STORAGE AREA M1

FIG.28

SMART CONTRACT 40 FOR CHAIN DISCONNECTION

TO HAVE A FUNCTION FOR DISCONNECTING THE CHAIN OF BLOCKS AFTER THE SAFEKEEPING PERIOD SET BY THE SMART CONTRACT 39 FOR SETTING SAFEKEEPING PERIOD HAS PASSED

FIG. 29

SMART CONTRACT 41 FOR BLOCK DELETION

TO HAVE A FUNCTION FOR DELETING UNNECESSARY BLOCKS DISCONNECTED VIA THE SMART CONTRACT 40 FOR CHAIN DISCONNECTION

FIG.30A

UNNECESSARY BLOCK DATA SAVING MEANS 42

IS CONFIGURED TO HAVE FUNCTIONS TO SEND A NOTIFICATION TO CONFIRM ASKING A CUSTOMER WHETHER TO DELETE THE UNNECESSARY BLOCK, BEFORE DELETING THE UNNECESSARY BLOCK DISCONNECTED VIA THE SMART CONTRACT 40 FOR CHAIN DISCONNECTION VIA THE SMART CONTRACT 41 FOR DELETING BLOCKS
TO CONFIRM THE CO-ADMINISTRATOR WHETHER TO DELETE THE UNNECESSARY BLOCK WHEN THERE IS NO RESPONSE FROM THE CUSTOMER TO THE NOTIFICATION SENT
TO TEMPORARILY RECORD EACH ENCRYPTED AND MULTI-DIVIDED FILE DATA AS DATA TO BE SAVED VIA A PREDETERMINED RECORDING MEDIUM THAT IS DISCONNECTED FROM THE NETWORK, EVEN IF THE UNNECESSARY BLOCK IS CONFIRMED TO BE DELIBLE AND
TO DELETE THE TEMPORARILY RECORDED DATA TO BE SAVED AFTER A CERTAIN PERIOD HAS PASSED

FIG.30B

UNNECESSARY BLOCK DATA SAVING MEANS 42

TO TEMPORARILY RECORD EACH OF THE ENCRYPTED AND MULTI-DIVIDED FILE DATA AS DATA TO BE SAVED VIA A PREDETERMINED RECORDING MEDIUM THAT IS DISCONNECTED FROM THE NETWORK, WHEN A NOTIFICATION IS SENT TO THE CUSTOMER TO CONFIRM WHETHER OR NOT THE UNNECESSARY BLOCKS MAY BE DELETED, AND THAT THE CUSTOMER DESIRED TO EXTEND THE SAFEKEEPING PERIOD FOR THE FILE DATA IS CONFIRMED,
AT THE SAME TIME TO SELECT A NEW PLANET THAT MEETS A CONDITION OF THE CUSTOMER'S DESIRE TO EXTEND SAFEKEEPING PERIOD FOR FILE DATA
TO AUTOMATICALLY SAVE CORRESPONDING FILE DATA TO THE NODES LOCATED AT EACH OF THE BASES CONFIGURING THE SELECTED PLANET AND THE RECORDING DEVICES LOCATED AT MULTIPLE BASES NETWORKED TO THE NODES AT THE BASES
TO UPDATE THE SERVER INDEX INFORMATION AND
TO DELETE THE TEMPORARILY RECORDED DATA TO BE SAVED AFTER A CERTAIN PERIOD HAS ELAPSED

FIG. 31

DATA FALSIFICATION CHECK CONTROL MEANS 43

TO CALCULATE HASH VALUES BASED ON ENCRYPTED AND MULTI-DIVIDED FILE DATA RECORDED IN THE NODES $102_{1\ \text{THROUGH}\ MB}$ AT EACH OF THE BASES BELONGING TO EACH OF THE DISTRIBUTED FILE MANAGEMENT GROUPS $101_{1\ \text{THROUGH}\ M}$ AND RECORDING DEVICES LOCATED AT MULTIPLE BASES NETWORKED TO THE NODES AT THE BASES

TO RECORD THE HASH VALUES CALCULATED IN THE BLOCK

TO CONSTANTLY COMPARE HASH VALUES RECORDED IN A BLOCK IN THE NODES $102_{1\ \text{THROUGH}\ MB}$ AT EACH OF THE BASES BELONGING TO EACH OF THE DISTRIBUTED FILE MANAGEMENT GROUPS $101_{1\ \text{THROUGH}\ M}$ AND RECORDING DEVICES LOCATED AT MULTIPLE BASES NETWORKED TO THE NODES AT THE BASES TO DETECT THAT THE ENCRYPTED AND MULTI-DIVIDED FILE DATA RECORDED IN THE SPECIFIED NODE OR RECORDING DEVICE IS TAMPERED WITH OR DESTROYED, WHEN THERE IS A DIFFERENCE BETWEEN A HASH DESCRIBED IN THE BLOCK AND A HASH DESCRIBED IN A BLOCK IN ANOTHER NODE OR RECORDING DEVICE TO EXCLUDE THE SPECIFIED NODE OR RECORDING DEVICE FROM THE FILE DATA SAVING PROCESS

TO DELETE THE BLOCK IN THE SPECIFIED NODE OR RECORDING DEVICE AND

TO SEND AN ALARM TO NOTIFY AN OPERATOR OF THE NODE AND A CO-ADMINISTRATOR OF THE CONSORTIUM-TYPE BLOCKCHAIN

NOTE THAT M AND MB ARE INTEGERS OF 2 OR MORE

FIG. 32

ROLLOVER SMART CONTRACT 44

COMPRISES THE FOLLOWING FUNCTIONS
TO SET A NEW PLANET AND DISTRIBUTED FILE MANAGEMENT GROUP IN ORDER TO EXTEND SAFEKEEPING PERIODS OF EACH ENCRYPTED AND MULTI-DIVIDED FILE DATA RECORDED AS THE BLOCK IN THE NODES $102_{1\ \text{THROUGH}\ MB}$ AT EACH OF THE BASES BELONGING TO EACH OF THE DISTRIBUTED FILE MANAGEMENT GROUPS $101_{1\ \text{THROUGH}\ MB}$ AND RECORDING DEVICES LOCATED AT MULTIPLE BASES NETWORKED TO THE NODES AT THE BASES, BEFORE THE SAFEKEEPING PERIOD OF THE BLOCK SET BY THE SMART CONTRACT 39 FOR SETTING SAFEKEEPING PERIOD ELAPSES
TO TAKE OVER A CONTROL NUMBER OF OLD SERVER INDEX INFORMATION
TO CHANGE TO A NEW CONTROL NUMBER
TO GENERATE NEW SERVER INDEX INFORMATION
TO RE-RECORD THE FILE DATA IN THE NODES $102_{1\ \text{THROUGH}\ MB}$ AT EACH OF THE BASES BELONGING TO NEW THE DISTRIBUTED FILE MANAGEMENT GROUPS $101_{1\ \text{THROUGH}\ M}$ AND IN RECORDING DEVICES LOCATED AT MULTIPLE BASES NETWORKED TO THE NODES AT THE BASES AND
TO DELETE THE FILE DATA RECORDED IN THE NODES $102_{1\ \text{THROUGH}\ MB}$ AT EACH OF THE BASES BELONGING TO THE ORIGINAL DISTRIBUTED FILE MANAGEMENT GROUPS $101_{1\ \text{THROUGH}\ M}$ AND THE RECORDING DEVICES LOCATED AT MULTIPLE BASES NETWORKED TO THE NODES AT THE BASES AND THE OLD SERVER INDEX INFORMATION REGARDING THE FILE DATA
NOTE THAT M AND MB ARE INTEGERS OF 2 OR MORE

FIG. 33

PERIODICAL RECORD AMOUNT CHECKING MEANS 45

TO REQUEST THE CUSTOMER TO RE-APPLY FOR A FILE DATA SAVING SERVICE CONTRACT, WHEN THE FILE DATA UPLOADED FROM A CUSTOMER WHO DESIRES TO SAVE THE FILE DATA AND DISTRIBUTED AND RECORDED IN THE NODES LOCATED AT EACH OF THE BASES BELONGING TO EACH OF THE DISTRIBUTED FILE MANAGEMENT GROUPS $101_{1\ \text{THROUGH}\ M}$ AND THE RECORDING DEVICES LOCATED AT MULTIPLE BASES NETWORKED TO THE NODES AT THE BASES EXCEEDS THE MAXIMUM FILE DATA RECORDABLE AMOUNT WITHIN A PREDETERMINED PERIOD AND TO PROCESS THE SAVING PROCESS AS AN ERROR, WHEN THE CUSTOMER DOES NOT PERFORM THE RE-APPLYING PROCEDURE IN RESPONSE TO THE REQUEST FOR RE-APPLYING FOR THE FILE DATA SAVING SERVICE CONTRACT

NOTE THAT M IS AN INTEGER OF 2 OR MORE

FIG. 34A

DATA SAVING SERVICE CONTRACT APPLICATION PROCEDURE RECEPTION MEANS 50

TO ACCEPT A DATA SAVING SERVICE CONTRACT APPLICATION PROCEDURE FROM A CUSTOMER WHO DESIRES TO SAVE THE FILE DATA AND
TO ACCEPT, AT THE TIME OF ACCEPTING THE DATA SAVING SERVICE CONTRACT APPLICATION PROCEDURE, A STORAGE CAPACITY, A DEGREE OF DISPERSION, WHETHER TO INCLUDE DOMESTIC OR INTERNATIONAL AREA OF SAVING OF THE FILE DATA, A SAFEKEEPING PERIOD, AND DESIGNATION OF REAL-TIME PROCESS OF THE FILE DATA TO BE SAVED DESIRED BY THE CUSTOMER

FIG. 34B

DATA SAVING SERVICE CONTRACT APPLICATION PROCEDURE RECEPTION MEANS 50

TO FURTHER ACCEPT DESIGNATIONS OF LEVELS OF GUARANTEE LEVEL OF FILE DATA DESIRED TO BE SAVED AND
THE FILE DATA SAVING AND RESTORATION SYSTEM CONFIGURATION FOR OPERATING THE NODES $102_{1 \text{ THROUGH } MB}$ (WHERE MB IS AN INTEGER OF 2 OR MORE) AT EACH OF THE BASES CONFIGURING EACH OF THE PLANETS $100_{1 \text{ THROUGH } N}$ (WHERE N IS AN INTEGER OF 2 OR MORE), THE RECORDING DEVICES AT MULTIPLE BASES NETWORKED TO THE NODES AT THE BASES, THE FILE DATA SAVING SYSTEM 10 AND THE FILE DATA RESTORATION SYSTEM 60
WHEN ACCEPTING THE DATA SAVING SERVICE CONTRACT APPLICATION PROCEDURE

FIG.35A

SMART CONTRACT 51 FOR RECORDING DATA SAVING SERVICE CONTRACT APPLICATION RECEPTION INFORMATION

COMPRISES THE FOLLOWING FUNCTIONS
A FUNCTION OF AUTOMATICALLY CALCULATING AND GENERATING THE BASIC CONFIGURATION OF THE ENTIRE PLANET BY MANAGING A STORAGE CAPACITY, A DEGREE OF DISPERSION, WHETHER TO INCLUDE DOMESTIC OR INTERNATIONAL AREA OF SAVING OF THE FILE DATA, A SAFEKEEPING PERIOD, AND DESIGNATION OF REAL-TIME PROCESS OF THE FILE DATA TO BE SAVED DESIRED BY A CUSTOMER ACCEPTED BY THE DATA SAVING SERVICE CONTRACT APPLICATION PROCEDURE RECEPTION MEANS 50, AND BY SETTING BUDGETARY CONDITION AND A CONDITION OF WHETHER TO INCLUDE HIGHLY CONFIDENTIAL MATTER REGARDING PERSONAL INFORMATION AND SECURITY, THAT IS A MAGNITUDE OF RISK, FROM THE CUSTOMER AND A FUNCTION OF ENCRYPTING AND RECORDING GENERATED INFORMATION AS PORTION OF THE SYSTEM SETTING INFORMATION IN NODE GROUPS AT A SPECIFIED BASE IN THE CONSORTIUM-TYPE BLOCKCHAIN, AND READING THE RECORDED SETTING INFORMATION TOGETHER WITH THE CUSTOMER'S PERSONAL INFORMATION SO THAT THE ENTIRE INFORMATION MAY BE COMPREHENDED

FIG.35B

SMART CONTRACT 51 FOR RECORDING DATA SAVING SERVICE CONTRACT APPLICATION RECEPTION INFORMATION

COMPRISES THE FOLLOWING FUNCTION
TO CHECK THE FILE DATA RECORD AMOUNT DESIRED TO BE SAVED REQUESTED BY THE CUSTOMER, THE RECORD AMOUNT BEING ACCEPTED BY THE DATA SAVING SERVICE CONTRACT APPLICATION PROCEDURE RECEPTION MEANS 50 AND
TO DETERMINE A NUMBER OF FILE DATA DIVISIONS SO THAT THE RECORD AMOUNT BECOMES LESS THAN THE MAXIMUM RECORD CAPACITY, WHEN THE CHECKED FILE DATA RECORD AMOUNT EXCEEDS THE MAXIMUM RECORD CAPACITY OF ONE FILE DEFINED IN THE SYSTEM

FIG. 36

UPLOAD PROCESSABLE IP ADDRESS CHECK MEANS 52

TO CONTROL TO BE CAPABLE OF OPERATING THE UPLOAD PROCESS OF THE FILE DATA TO BE SAVED IN THE FILE DATA SAVING SYSTEM 10, THAT IS, THE ENCRYPTION AND DIVISION ALGORITHM SELECTION RECEPTION MEANS 22, THE FILE DATA SAVING INSTRUCTION RECEPTION MEANS 23, THE FILE DATA ENCRYPTION AND DIVISION MEANS 24, AND THE UPLOAD MEANS 25, ONLY WITH AN OPERATION AT A CUSTOMER TERMINAL IN WHICH A FIXED IP ADDRESS IS PREREGISTERED IN NODE GROUPS AT SPECIFIED BASES IN THE CONSORTIUM-TYPE BLOCKCHAIN AS PORTIONS OF THE SYSTEM SETTING INFORMATION, AND AS TERMINAL INFORMATION FOR UPLOADING THE FILE DATA TO BE SAVED TO THE FIRST TEMPORARY STORAGE AREA M1 USING THE UPLOAD MEANS 25

FIG.39

PROGRAMS OR SMART CONTRACTS HAVING MULTIPLE DECRYPTION AND LINKAGE ALGORITHMS $71_{1\ \text{THROUGH}\ Q}$ COMPRISES MULTIPLE DECRYPTION AND LINKAGE ALGORITHMS $71ALPHA_{1\ \text{THROUGH}\ Q}$ HAVING DIFFERENT DECRYPTION AND LINKAGE PROCESS METHODS ASSOCIATED WITH EACH OF THE PROGRAMS OR SMART CONTRACTS $21_{1\ \text{THROUGH}\ Q}$ HAVING ENCRYPTION AND DIVISION ALGORITHMS

NOTE THAT Q IS AN INTEGER OF 10 OR MORE

*CONFIGURED TO RESTORE THE ENCRYPTED AND MULTI-DIVIDED FILE DATA TO THE ORIGINAL FILE DATA THAT IS DECRYPTED AND LINKED TO ONE FILE DATA USING SECRET SHARING TECHNOLOGIES

*THE SECRET SHARING TECHNOLOGY USED FOR DECRYPTING AND LINKING FILE DATA IS AN AONT SECRET SHARING TECHNOLOGY

*OTHER SECRET SHARING TECHNIQUES MAY ALSO BE USED

FIG. 40

DOWNLOAD MEANS 72

DOWNLOADS EACH OF THE ENCRYPTED AND MULTI-DIVIDED FILE DATA EXTRACTED BY THE SMART CONTRACT 64 FOR EXTRACTING ENCRYPTED AND DIVIDED FILE DATA INTO A SECOND TEMPORARY STORAGE AREA M2

FIG. 41A

FILE DATA RESTORATION MEANS 73

TO DECRYPT, LINK TO ONE FILE DATA AND RESTORE BEFORE BEING SAVED, THE ENCRYPTED AND DIVIDED FILE DATA THAT IS EXTRACTED BY THE SMART CONTRACT 84 FOR EXTRACTING ENCRYPTED AND DIVIDED FILE DATA, AND DOWNLOADED TO THE SECOND STORAGE AREA M2 BY THE DOWNLOAD MEANS 72 USING THE PROGRAM OR SMART CONTRACT 71ALPHA HAVING ENCRYPTION AND DIVISION ALGORITHMS ASSOCIATED WITH PROGRAM OR SMART CONTRACT 21A HAVING ENCRYPTION AND DIVISION ALGORITHMS ACCEPTED BY THE ENCRYPTION AND DIVISION ALGORITHM SELECTION RECEPTION MEANS 22

NOTE THAT A AND ALPHA ARE INTEGERS BETWEEN 1 AND Q

FIG. 41B

FILE DATA RESTORATION MEANS 73

TO DECRYPT EACH OF THE ENCRYPTED AND MULTI-DIVIDED FILE DATA EXTRACTED BY THE SMART CONTRACT 84 FOR EXTRACTING ENCRYPTED AND DIVIDED FILE DATA AND DOWNLOADED TO THE SECOND TEMPORARY STORAGE AREA M2 BY THE DOWNLOAD MEANS 72 BASED ON THE FIRST SECRET KEY, THAT IS FIRST OFFLINE DECRYPTION KEY K11 GENERATED BY THE CUSTOMER, AND

TO LINK EACH DECRYPTED FILE DATA TO ONE FILE DATA USING THE PROGRAMS OR SMART CONTRACTS 71ALPHA HAVING MULTIPLE DECRYPTION AND LINKAGE ALGORITHMS THAT ARE ASSOCIATED WITH THE PROGRAM OR SMART CONTRACT 21A HAVING THE ENCRYPTION AND DIVISION ALGORITHMS ACCEPTED BY THE ENCRYPTION AND DIVISION ALGORITHM SELECTION RECEPTION MEANS 22

NOTE THAT A AND ALPHA ARE INTEGERS BETWEEN 1 AND Q

FIG. 41C

FILE DATA RESTORATION MEANS 73

*NOTE THAT THE FILE DATA RESTORATION MEANS 73 MAY BE CONFIGURED TO LINK TO ONE FILE DATA, EACH ENCRYPTED AND MUTI-DIVIDED FILE DATA EXTRACTED BY THE SMART CONTRACT 84 FOR EXTRACTING ENCRYPTED AND DIVIDED FILE DATA AND DOWNLOADED TO THE SECOND TEMPORARY STORAGE AREA M2 BY THE DOWNLOAD MEANS 72, USING THE PROGRAMS OR SMART CONTRACTS 71ALPHA HAVING MULTIPLE DECRYPTION AND LINKAGE ALGORITHMS THAT ARE ASSOCIATED WITH THE PROGRAM OR SMART CONTRACT 21A HAVING THE ENCRYPTION AND DIVISION ALGORITHMS ACCEPTED BY THE ENCRYPTION AND DIVISION ALGORITHM SELECTION RECEPTION MEANS 22, AND TO DECRYPT THE LINKED ONE FILE DATA BASED ON THE CUSTOMER GENERATED FIRST SECRET KEY, THAT IS, THE FIRST OFFLINE DECRYPTION KEY K11

NOTE THAT A AND ALPHA ARE INTEGERS BETWEEN 1 AND Q

FIG. 42

FILE DATA RESTORATION MEANS 73

TO DECRYPT, LINK TO ONE FILE DATA AND RESTORE THE FILE DATA BEFORE BEING SAVED, EACH OF THE ENCRYPTED AND MULTI-DIVIDED FILE DATA EXTRACTED BY THE SMART CONTRACT 64 FOR EXTRACTING ENCRYPTED AND DIVIDED FILE DATA AND DOWNLOADED TO THE SECOND TEMPORARY STORAGE AREA M2 BY THE DOWNLOAD MEANS 72 BASED ON THE FILE DIVISION CODE P11 USING THE PROGRAM OR SMART CONTRACT 71ALPHA HAVING THE ENCRYPTION AND DIVISION ALGORITHMS ASSOCIATED WITH THE PROGRAM OR SMART CONTRACT 21A HAVING THE ENCRYPTION AND DIVISION ALGORITHM ACCEPTED BY THE ENCRYPTION AND DIVISION ALGORITHM SELECTION RECEPTION MEANS 22

NOTE THAT A AND ALPHA ARE INTEGERS BETWEEN 1 AND Q

FIG.43

SECOND DATA DELETION DOWNLOAD MEANS 74

TO DELETE EACH ENCRYPTED AND MULTI-DIVIDED FILE DATA DOWNLOADED TO THE SECOND TEMPORARY STORAGE AREA M2 AFTER BEING RESTORED TO THE FILE DATA BEFORE BEING SAVED BY THE FILE DATA RESTORATION MEANS 73

FIG. 45

FILE DATA EXTRACTION INSTRUCTION RECEPTION MEANS 81

TO ACCEPT A FILE DATA EXTRACTION INSTRUCTION FROM A CUSTOMER WHO DESIRES TO RESTORE FILE DATA

FIG. 46

SMART CONTRACT 82 FOR EXTRACTING ENCRYPTED SERVER INDEX INFORMATION

COMPRISES THE FOLLOWING FUNCTION
A FUNCTION OF EXTRACTING ENCRYPTED SERVER INDEX INFORMATION RECORDED IN A NODE GROUP AT A SPECIFIED BASE IN THE CONSORTIUM-TYPE BLOCKCHAIN BY THE SMART CONTRACT 34 FOR RECORDING SERVER INDEX INFORMATION BASED ON THE FIRST PARAMETER P1 ASSOCIATED WITH FILE DATA TO BE EXTRACTED THAT IS ACCEPTED BY THE FILE DATA EXTRACTION INSTRUCTION RECEPTION MEANS 81 OR A FIRST COMPOUND PARAMETER P1X, AND THE SECOND PARAMETER P2 OR THE SECOND COMPOUND PARAMETER P2X
THE FIRST COMPOUND PARAMETER P1X IS CONFIGURED WITH A PAIR OF THE FIRST DECRYPTION PARAMETER P1X1 THAT IS SPECIFIED BY A CUSTOMER AND MANAGED OFFLINE, AND THE FIRST ENCRYPTION PARAMETER P1X2 THAT IS AUTOMATICALLY GENERATED FROM THE FIRST DECRYPTION PARAMETER P1X1
THE SECOND COMPOUND PARAMETER P2X IS CONFIGURED WITH A PAIR OF THE SECOND DECRYPTION PARAMETER P2X1 THAT IS SPECIFIED BY A CO-ADMINISTRATOR AND MANAGED OFFLINE, AND THE SECOND ENCRYPTION PARAMETER P2X2 THAT IS AUTOMATICALLY GENERATED FROM THE SECOND DECRYPTION PARAMETER P2X1
THE SECOND ENCRYPTION PARAMETER P2X2 IS INCORPORATED AND MODULARIZED WITHIN A PREDETERMINED SMART CONTRACT THAT PERFORMS A CORRESPONDING PROCESS

FIG. 47A

SMART CONTRACT 83 FOR DECRYPTING SERVER INDEX INFORMATION

COMPRISES THE FOLLOWING FUNCTION
A FUNCTION OF DECRYPTING ENCRYPTED SERVER INDEX INFORMATION EXTRACTED BY THE SMART CONTRACT 82 FOR EXTRACTING ENCRYPTED SERVER INDEX INFORMATION

FIG. 47B

SMART CONTRACT 83 FOR DECRYPTING SERVER INDEX INFORMATION

COMPRISES THE FOLLOWING FUNCTION
A FUNCTION FOR DECRYPTING ENCRYPTED SERVER INDEX INFORMATION EXTRACTED BY THE SMART CONTRACT 82 FOR EXTRACTING ENCRYPTED SERVER INDEX INFORMATION BASED ON A SECOND SECRET KEY, THAT IS, A SECOND DECRYPTION KEY K21 GENERATED BY A CO-ADMINISTRATOR OF THE CONSORTIUM-TYPE BLOCKCHAIN, OR BASED ON THE SECOND DECRYPTION PARAMETER P2X1 SPECIFIED BY THE CO-ADMINISTRATOR AND MANAGED OFFLINE
THE SECOND DECRYPTION PARAMETER P2X1 IS INCORPORATED AND MODULARIZED IN A PREDETERMINED SMART CONTRACT THAT PERFORMS THE CORRESPONDING PROCESS

FIG. 48A

SMART CONTRACT 84 FOR EXTRACTING ENCRYPTED AND DIVIDED FILE DATA

COMPRISES THE FOLLOWING FUNCTION

A FUNCTION FOR EXTRACTING ENCRYPTED AND MULTI-DIVIDED FILE DATA ALLOTTED BY THE SMART CONTRACT 31 FOR ALLOTTING DISTRIBUTED FILE MANAGEMENT GROUPS TO EACH OF THE DISTRIBUTED FILE MANAGEMENT GROUPS $101_{1 \text{ THROUGH } M}$, THE FILE DATA BEING DISTRIBUTED AND RECORDED BY EACH OF THE DISTRIBUTION AND RECORDING SMART CONTRACTS 32, IN THE NODES $102_{1 \text{ THROUGH } MB}$ LOCATED AT EACH OF THE BASES BELONGING TO EACH OF THE DISTRIBUTED FILE MANAGEMENT GROUPS $101_{1 \text{ THROUGH } M}$ AND IN THE RECORDING DEVICES AT MULTIPLE BASES NETWORKED TO THE NODES AT THE BASES, FROM ANY ONE OF THE NODES LOCATED AT EACH OF THE BASES BELONGING TO EACH OF THE DISTRIBUTED FILE MANAGEMENT GROUPS $101_{1 \text{ THROUGH } M}$ AND THE RECORDING DEVICES AT MULTIPLE BASES NETWORKED TO THE NODES AT THE BASES, USING THE SERVER INDEX INFORMATION DECRYPTED BY THE SMART CONTRACT 83 FOR DECRYPTING SERVER INDEX INFORMATION

NOTE THAT M AND MB ARE INTEGERS OF 2 OR MORE

FIG. 48B

SMART CONTRACT 84 FOR EXTRACTING ENCRYPTED AND DIVIDED FILE DATA

COMPRISES THE FOLLOWING FUNCTION

A FUNCTION FOR EXTRACTING ENCRYPTED AND MULTI-DIVIDED FILE DATA ALLOTTED BY THE SMART 31 FOR ALLOTTING DISTRIBUTED FILE MANAGEMENT GROUPS TO EACH OF THE DISTRIBUTED FILE MANAGEMENT GROUPS $101_{1 \text{ THROUGH } M}$, THE FILE DATA BEING DISTRIBUTED AND RECORDED BY EACH OF THE DISTRIBUTION AND RECORDING SMART CONTRACTS 32, IN THE NODES $102_{1 \text{ THROUGH } MB}$ LOCATED AT EACH OF THE BASES BELONGING TO EACH OF THE DISTRIBUTED FILE MANAGEMENT GROUPS $101_{1 \text{ THROUGH } M}$ AND IN THE RECORDING DEVICES AT MULTIPLE BASES NETWORKED TO THE NODES AT THE BASES, FROM ANY ONE OF THE NODES LOCATED AT EACH OF THE BASES BELONGING TO EACH OF THE DISTRIBUTED FILE MANAGEMENT GROUPS $101_{1 \text{ THROUGH } M}$ AND THE RECORDING DEVICES AT MULTIPLE BASES NETWORKED TO THE NODES AT THE BASES, USING THE SERVER INDEX INFORMATION EXCLUDING INFORMATION OF THE NODES AT EACH OF THE BASES AND RECORDING DEVICES AT MULTIPLE BASES NETWORKED TO THE NODES AT THE BASES THAT DISTRIBUTE AND RECORD DUMMY FILE DATA HAVING A CODE INSIDE CAPABLE OF RECOGNIZING DUMMY INFORMATION FROM THE CONFIGURATION INFORMATION OF EACH OF THE DISTRIBUTED FILE MANAGEMENT GROUPS $101_{1 \text{ THROUGH } M}$ IN THE SERVER INDEX INFORMATION DECRYPTED BY THE SMART CONTRACT 83 FOR DECRYPTING SERVER INDEX INFORMATION

NOTE THAT M AND MB ARE INTEGERS OF 2 OR MORE

FIG. 49A

SMART CONTRACT 84 FOR EXTRACTING ENCRYPTED AND DIVIDED FILE DATA

COMPRISES THE FOLLOWING FUNCTION

A FUNCTION FOR

EXTRACTING ENCRYPTED AND MULTI-DIVIDED FILE DATA ALLOTTED BY THE SMART 31 FOR ALLOTTING DISTRIBUTED FILE MANAGEMENT GROUPS TO EACH OF THE DISTRIBUTED FILE MANAGEMENT GROUPS $101_{1 \text{ THROUGH } M}$ (WHERE M IS AN INTEGER GREATER THAN OR EQUAL TO 2 OR MORE), THE FILE DATA BEING DISTRIBUTED AND RECORDED BY EACH OF THE DISTRIBUTION AND RECORDING SMART CONTRACTS 32, IN THE NODES $102_{1 \text{ THROUGH } MB}$ (WHERE MB IS AN INTEGER OF 2 OR MORE) LOCATED AT EACH OF THE BASES BELONGING TO EACH OF THE DISTRIBUTED FILE MANAGEMENT GROUPS $101_{1 \text{ THROUGH } M}$ (WHERE M IS AN INTEGER GREATER THAN OR EQUAL TO 2 OR MORE) AND IN THE RECORDING DEVICES AT MULTIPLE BASES NETWORKED TO THE NODES AT THE BASES), FROM ANY ONE OF THE NODES LOCATED AT EACH OF THE BASES BELONGING TO EACH OF THE DISTRIBUTED FILE MANAGEMENT GROUPS $101_{1 \text{ THROUGH } M}$ (WHERE M IS AN INTEGER GREATER THAN OR EQUAL TO 2 OR MORE) OR FROM THE RECORDING DEVICES AT MULTIPLE BASES NETWORKED TO THE NODES AT THE BASES BASED ON THE FILE STORAGE CODE P12 AND THE PARAMETER P2

DECRYPTING THE EXTRACTED FILE DATA AND

AT THE SAME TIME CHANGING THE FILE FORMAT AND NAME OF THE FILE DATA TO THE ORIGINAL FILE FORMAT AND NAME

NOTE THAT M AND MB ARE INTEGERS OF 2 OR MORE

FIG. 49B

SMART CONTRACT 84 FOR EXTRACTING ENCRYPTED AND DIVIDED FILE DATA

COMPRISES THE FOLLOWING FUNCTION

A FUNCTION FOR

REFERRING TO THE SECOND INDEX INFORMATION RECORDED AT THE NODES $102_{1 \text{ THROUGH } MB}$ (WHERE MB IS AN INTEGER OF 2 OR MORE) LOCATED AT EACH OF THE BASES BELONGING TO EACH OF THE DISTRIBUTED FILE MANAGEMENT GROUPS $101_{1 \text{ THROUGH } M}$ (WHERE M IS AN INTEGER GREATER THAN OR EQUAL TO 2 OR MORE)

DETECTING MULTIPLE SUB-CONFIGURATION FILE SERVERS RECORDING THE ENCRYPTED AND MULTI-DIVIDED LARGE FILE SERVERS RECORDED AS THE SECOND INDEX INFORMATION

EXTRACTING THE FILE DATA RECORDED IN THE SUB-CONFIGURATION FILE SERVER FROM THE MULTIPLE SUB-CONFIGURATION FILE SERVERS AND

LINKING THE EXTRACTED MULTIPLE FILE DATA TO RESTORE THE ORIGINAL ENCRYPTED AND MULTI-DIVIDED LARGE FILE DATA

NOTE THAT M AND MB ARE INTEGERS OF 2 OR MORE

FIG.50

RESTORATION PROCESS TIME FRAME SETTING RECEPTION MEANS 85

CONFIGURED TO ACCEPT SETTINGS OF

A TIME FRAME IN WHICH A FILE DATA RESTORATION PROCESS FROM A CUSTOMER WHO DESIRES TO RESTORE THE FILE DATA IS PERFORMED

AN IP ADDRESS FOR PERFORMING THE RESTORATION; AND

A RESTORABLE PERIOD

FIG.51A

FILE DATA RESTORATION PROCESS OPERATION CONTROL MEANS 86

TO CONTROL THE FILE DATA EXTRACTION INSTRUCTION RECEPTION MEANS 81, THE SMART CONTRACT 82 FOR EXTRACTING ENCRYPTED SERVER INDEX INFORMATION, THE SMART CONTRACT 83 FOR DECRYPTING SERVER INDEX INFORMATION, THE SMART CONTRACT 84 FOR EXTRACTING ENCRYPTED AND DIVIDED FILE DATA, THE DOWNLOAD MEANS 72, THE FILE DATA RESTORATION MEANS 73, AND THE SECOND DATA DELETION MEANS 74 TO OPERATE ONLY DURING A TIME FRAME DURING WHICH A SETTING IS ACCEPTED BY THE RESTORATION PROCESS TIME FRAME SETTING RECEPTION MEANS 85

FIG.51B

FILE DATA RESTORATION PROCESS OPERATION CONTROL MEANS 86

TO CONTROL THE FILE DATA EXTRACTION INSTRUCTION RECEPTION MEANS 81, THE SMART CONTRACT 82 FOR EXTRACTING ENCRYPTED SERVER INDEX INFORMATION, THE SMART CONTRACT 83 FOR DECRYPTING SERVER INDEX INFORMATION, THE SMART CONTRACT 84 FOR EXTRACTING ENCRYPTED AND DIVIDED FILE DATA, THE DOWNLOAD MEANS 72, THE FILE DATA RESTORATION MEANS 73, AND THE SECOND DATA DELETION MEANS 74 TO OPERATE ONLY DURING A TIME FRAME DURING WHICH A SETTING IS ACCEPTED BY THE RESTORATION PROCESS TIME FRAME SETTING RECEPTION MEANS 85 AND WHEN A SETTING OF THE AUTHENTICATION CODE ACCEPTED BY THE AUTHENTICATION CODE SETTING ACCEPTANCE MEANS 87 IS APPROVED BY THE CO-ADMINISTRATOR OF THE CONSORTIUM-TYPE BLOCKCHAIN

FIG.52

AUTHENTICATION CODE SETTING RECEPTION MEANS 87

TO ACCEPT AUTHENTICATION LICENSE CODE SETTING BY A CUSTOMER WHO DESIRES TO RESTORE FILE DATA

*THE AUTHENTICATION CODE SET IN THE AUTHENTICATION CODE SETTING RECEPTION MEANS 87 IS A CODE THAT A CUSTOMER WHO DESIRES TO RESTORE FILE DATA IS CONTACTED BY A CO-ADMINISTRATOR OF THE CONSORTIUM-TYPE BLOCKCHAIN, OR IS A ONE-TIME PASSCODE SUCH AS A BIOMETRIC AUTHENTICATION REGISTERED IN THE CUSTOMER'S SMARTPHONE AND THE LIKE

FIG.53

DATA DESTRUCTION ATTACK DETECTION MEANS 91

TO DETECT THE EXISTENCE OF A DATA DESTRUCTION SITUATION DUE TO EQUIPMENT FAILURE OR AN ATTACK AGAINST THE ENCRYPTED AND MULTI-DIVIDED FILE DATA RECORDED IN THE NODES $102_{1 \text{ THROUGH } MB}$ OF ANY BASE CONFIGURING THE PLANETS $100_{1 \text{ THROUGH } N}$ OR RECORDING DEVICES, AND TO DETERMINE THAT THERE IS A DATA DESTRUCTION ATTACK WHEN MULTIPLE FILE DATA DESTRUCTIONS ARE DETECTED, THE FILE DATA BEING MANAGED IN A CERTAIN TIME FRAME, SUCH AS 30 MINUTES, 8 HOURS, OR 24 HOURS

NOTE THAT N AND MB ARE INTEGERS OF 2 OR MORE

FIG. 54A

AUTOMATIC DATA SAVING MEANS 92 UPON BEING ATTACKED

TO STOP THE NODES $102_{1\ \mathrm{THROUGH}\ MB}$ AT EACH OF THE BASES CONFIGURING THE PLANET, AND THE RECORDING DEVICES LOCATED AT MULTIPLE BASES NETWORKED TO THE NODES AT THE BASES, OR FORCIBLY TO DISCONNECT THE INTERNET CONNECTION ROUTES, WHEN THE DATA DESTRUCTION ATTACK DETECTION MEANS 91 DETECTS AN ATTACK AGAINST THE ENCRYPTED AND MULTI-DIVIDED FILE DATA

TO SET A SEPARATE NETWORK AND

TO AUTOMATICALLY SAVES THE ENCRYPTED AND MULTI-DIVIDED FILE DATA DISTRIBUTED AND RECORDED IN THE NODES $102_{1\ \mathrm{THROUGH}\ MB}$ AT EACH OF THE BASES AND THE RECORDING DEVICES LOCATED AT MULTIPLE BASES NETWORKED TO THE NODES AT THE BASES THAT ARE NOT ATTACKED, INTO THE NODES $102_{1\ \mathrm{THROUGH}\ MB}$ AT EACH OF THE BASES CONFIGURING OTHER PLANETS OR INTO THE RECORDING DEVICES LOCATED AT MULTIPLE BASES NETWORKED TO THE NODES AT THE BASES IN WHICH AN ATTACK AGAINST THE ENCRYPTED AND MULTI-DIVIDED FILE DATA IS NOT DETECTED BY THE DATA DESTRUCTION ATTACK DETECTION MEANS 91

NOTE THAT MB IS AN INTEGER OF 2 OR MORE

FIG. 54B

AUTOMATIC DATA SAVING MEANS 92 UPON BEING ATTACKED

TO AUTOMATICALLY SAVE, THE ENCRYPTED AND MULTI-DIVIDED FILE DATA DISTRIBUTED AND RECORDED IN THE NODES $102_{1\ \mathrm{THROUGH}\ MB}$ (WHERE MB IS AN INTEGER OF 2 OR MORE) AT EACH OF THE BASES AND CONFIGURING THE PLANET AND THE RECORDING DEVICES LOCATED AT MULTIPLE BASES NETWORKED TO THE NODES AT THE BASES THAT ARE NOT ATTACKED, INTO THE NODES $102_{1\ \mathrm{THROUGH}\ MB}$ (WHERE MB IS AN INTEGER OF 2 OR MORE) AT EACH OF THE BASES CONFIGURING OTHER PLANETS IN WHICH ENCRYPTED AND MULTI-DIVIDED FILE DATA IS NOT ATTACKED AND INTO THE RECORDING DEVICES LOCATED AT MULTIPLE BASES NETWORKED TO THE NODES AT THE BASES VIA A COMMUNICATION MEANS SUCH AS AN LTE AND THE LIKE OTHER THAN THE INTERNET, WHEN THE DATA DESTRUCTION ATTACK DETECTION MEANS 91 DETECTS AN ATTACK AGAINST THE ENCRYPTED AND MULTI-DIVIDED FILE DATA

FIG.55

COMMUNICATION SWITCHING CONTROL MEANS 93

CONFIGURED TO

MAINTAIN A STOPPED STATE IN WHICH THE NODES AND THE RECORDING DEVICES LOCATED AT MULTIPLE BASES NETWORKED TO THE NODES AT THE BASES ARE DISCONNECTED FROM THE INTERNET AND

SWITCH TO A CONNECTION WITH A COMMUNICATION MEANS SUCH AS AN LTE OTHER THAN THE INTERNET

WHEN THE DATA DESTRUCTIVE ATTACK DETECTION MEANS 91 DETECTS AN ATTACK AGAINST THE ENCRYPTED AND MULTI-DIVIDED FILE DATA

FIG.56

CUSTOMER REGISTRATION INFORMATION DESIGNATION RECEPTION MEANS 94

TO ACCEPT DESIGNATIONS OF A CUSTOMER ID, TERMINAL INFORMATION, THAT IS A FIXED IP ADDRESS FOR USING FILE DATA SAVING AND RESTORATION FROM A CUSTOMER WHO DESIRES TO SAVE THE FILE DATA

FIG.57

SMART CONTRACT 95 FOR CUSTOMER REGISTRATION

COMPRISES THE FOLLOWING FUNCTION
A FUNCTION FOR ENCRYPTING THE CUSTOMER ID, THE TERMINAL INFORMATION, THAT IS THE FIXED IP ADDRESS FOR USING FILE DATA SAVING AND RESTORATION ACCEPTED BY THE CUSTOMER REGISTRATION INFORMATION DESIGNATION RECEPTION MEANS 94, AND RECORDING INTO A NODE GROUP LOCATED AT A SPECIFIED BASE IN THE CONSORTIUM-TYPE BLOCKCHAIN

FIG. 59

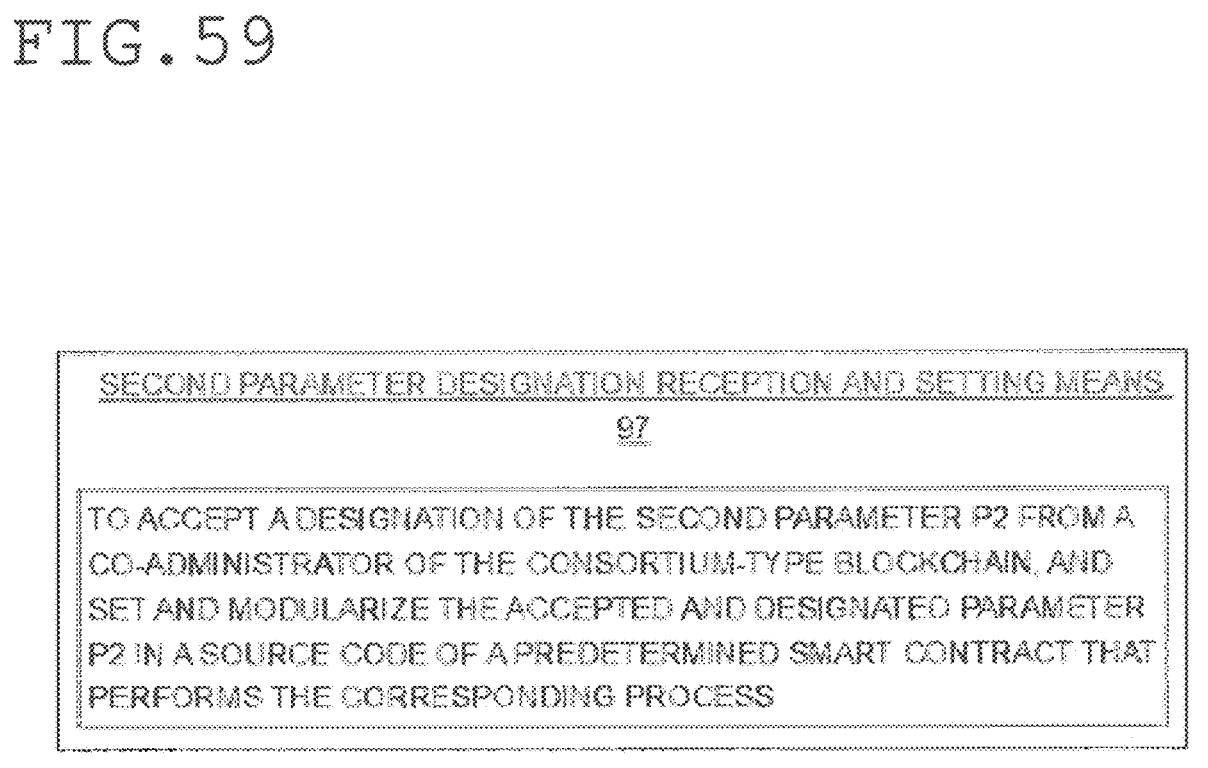

SECOND PARAMETER DESIGNATION RECEPTION AND SETTING MEANS
97

TO ACCEPT A DESIGNATION OF THE SECOND PARAMETER P2 FROM A CO-ADMINISTRATOR OF THE CONSORTIUM-TYPE BLOCKCHAIN, AND SET AND MODULARIZE THE ACCEPTED AND DESIGNATED PARAMETER P2 IN A SOURCE CODE OF A PREDETERMINED SMART CONTRACT THAT PERFORMS THE CORRESPONDING PROCESS

FIG.64

SMART CONTRACT 98 FOR GENERATING AND RECORDING SYSTEM SETTING INFORMATION

COMPRISES THE FOLLOWING FUNCTIONS:

GENERATING AND ENCRYPTING SYSTEM SETTING INFORMATION COMPRISING, TERMINAL INFORMATION (INFORMATION IDENTIFYING A DESTINATION SUCH AS A FIXED IP ADDRESS) FOR UPLOADING TO THE FIRST TEMPORARY STORAGE AREA M1 USING THE UPLOAD MEANS 25, A NUMBER OF A PREDETERMINED SMART CONTRACT PERFORMING A CORRESPONDING PROCESS OF THE RECORDING DESTINATION OF THE CUSTOMER FILE DATA, PLANET INFORMATION BELONGING TO THE FILE DATA RECORDING DESTINATION, AND FILE SERVER GROUP INFORMATION (IN THE NODES AT PREDETERMINED BASES AND RECORDING DEVICES LOCATED AT MULTIPLE BASES NETWORKED TO THE NODES AT THE BASES) CONFIGURING DISTRIBUTED FILE MANAGEMENT GROUPS; AND

RECORDING INTO A NODE GROUP LOCATED AT THE SPECIFIED BASES IN THE CONSORTIUM-TYPE BLOCKCHAIN

FIG.65

SMART CONTRACT FOR GENERATING CUSTOMER SETTING INFORMATION OR PROGRAM 99 WITH A WALLET FUNCTION FOR GENERATING CUSTOMER SETTING INFORMATION

COMPRISES THE FOLLOWING FUNCTION
A FUNCTION FOR GENERATING CUSTOMER SETTING INFORMATION HAVING SETTING INFORMATION OF THE FIRST PARAMETER P1 ASSOCIATED WITH THE PROGRAM OR SMART CONTRACT 21A HAVING ENCRYPTION AND DIVISION ALGORITHMS ACCEPTED BY THE ENCRYPTION AND DIVISION ALGORITHM SELECTION RECEPTION MEANS 22
NOTE THAT A IS AN INTEGER BETWEEN 1 AND Q

FIG.66

SMART CONTRACT OR PROGRAM 27 HAVING WALLET FUNCTION FOR GENERATING CUSTOMER INDEX INFORMATION

COMPRISES THE FOLLOWING FUNCTION
A FUNCTION FOR GENERATING CUSTOMER INDEX INFORMATION THAT COMPRISES AN ORIGINAL FILE NAME OF THE CUSTOMER FILE DATA TO BE SAVED AND INFORMATION OF AN UPLOAD DATE

FIG. 67

SMART CONTRACT 28 FOR RECORDING CUSTOMER INDEX INFORMATION

COMPRISES THE FOLLOWING FUNCTION
A FUNCTION FOR ENCRYPTING CUSTOMER INDEX INFORMATION GENERATED BY THE SMART CONTRACT 27 FOR GENERATING CUSTOMER INDEX INFORMATION OR THE PROGRAM 27 HAVING A WALLET FUNCTION AND FOR RECORDING AT NODE GROUPS LOCATED AT SPECIFIED BASES AT THE CONSORTIUM-TYPE BLOCKCHAIN

FIG.69

SMART CONTRACT 33-2 FOR GENERATING CO-ADMINISTRATOR SIDE INDEX INFORMATION

*CORRESPONDS TO THE SMART CONTRACT 33 FOR GENERATING SERVER INDEX INFORMATION

COMPRISES A FOLLOWING FUNCTION FOR GENERATING (RENAMED) FILE NAME INFORMATION OF EACH FILE DATA DISTRIBUTED AND RECORDED BY EACH OF THE DISTRIBUTION AND RECORDING SMART CONTRACTS 32, AND CO-ADMINISTRATOR-SIDE INDEX INFORMATION THAT COMPRISES (ENCRYPTED) CORRESPONDING RECORDING DESTINATION INFORMATION

FIG.70

PROGRAM OR SMART CONTRACT 34-1 FOR RECORDING CUSTOMER-SIDE INDEX INFORMATION

COMPRISES THE FOLLOWING FUNCTION
A FUNCTION FOR ENCRYPTING AND RECORDING CUSTOMER-SIDE INDEX INFORMATION GENERATED BY THE PROGRAM OR SMART CONTRACT 33-1 FOR GENERATING CUSTOMER-SIDE INDEX INFORMATION IN NODE GROUPS AT SPECIFIED BASES IN THE CONSORTIUM-TYPE BLOCKCHAIN, WHEN APPROVAL IS GRANTED USING A FIRST SECRET KEY FOR ACCESSING THE BLOCKCHAIN K112 GENERATED BASED ON THE FIRST SECRET KEY, THAT IS THE FIRST OFFLINE DECRYPTION KEY K11 GENERATED BY THE CUSTOMER

FIG. 71

SMART CONTRACT 34-2 FOR RECORDING CO-ADMINISTRATOR SIDE INDEX INFORMATION

*CORRESPONDS TO THE SMART CONTRACT 34 FOR RECORDING SERVER INDEX INFORMATION

COMPRISES THE FOLLOWING FUNCTION
A FUNCTION FOR ENCRYPTING AND RECORDING CO-ADMINISTRATOR SIDE INDEX INFORMATION GENERATED BY THE SMART CONTRACT 33-2 FOR GENERATING CO-ADMINISTRATOR SIDE INDEX INFORMATION INTO NODE GROUPS LOCATED AT SPECIFIED BASES AT THE CONSORTIUM-TYPE BLOCKCHAIN, WHEN APPROVAL IS GRANTED USING A SECOND SECRET KEY FOR ACCESSING THE BLOCKCHAIN K212 GENERATED BASED ON THE SECOND SECRET KEY, THAT IS THE SECOND OFFLINE DECRYPTION KEY K21 GENERATED BY THE CO-ADMINISTRATOR OF THE CONSORTIUM-TYPE BLOCKCHAIN

FIG.72

SMART CONTRACT 82-1 FOR EXTRACTING CUSTOMER-SIDE ENCRYPTED INDEX INFORMATION

COMPRISES THE FOLLOWING FUNCTION
A FUNCTION FOR EXTRACTING CUSTOMER SIDE ENCRYPTED INDEX INFORMATION RECORDED IN NODE GROUPS LOCATED AT SPECIFIED BASES IN THE CONSORTIUM-TYPE BLOCKCHAIN BY THE SMART CONTRACT 34-1 FOR RECORDING CUSTOMER-SIDE ENCRYPTED INDEX INFORMATION BASED ON THE FIRST PARAMETER P1 ASSOCIATED WITH THE FILE DATA TO BE EXTRACTED ACCEPTED BY THE FILE DATA EXTRACTION INSTRUCTION RECEPTION MEANS 81 AND THE SECOND PARAMETER P2, WHEN AUTHENTICATION IS GRANTED USING A FIRST SECRET KEY FOR ACCESSING THE BLOCKCHAIN K112 GENERATED BASED ON THE CUSTOMER GENERATED FIRST SECRET KEY, THAT IS THE FIRST OFFLINE DECRYPTION KEY K11

FIG.73

SMART CONTRACT 82-2 FOR EXTRACTING CO-ADMINISTRATOR SIDE ENCRYPTED INDEX INFORMATION

*CORRESPONDS TO THE SMART CONTRACT 82 FOR EXTRACTING SERVER INDEX INFORMATION

COMPRISES THE FOLLOWING FUNCTION
A FUNCTION FOR EXTRACTING ENCRYPTED CO-ADMINISTRATOR SIDE INDEX INFORMATION RECORDED IN NODE GROUPS AT SPECIFIED BASES IN THE CONSORTIUM-TYPE BLOCKCHAIN BY THE SMART CONTRACT 34-2 FOR RECORDING CO-ADMINISTRATOR SIDE ENCRYPTED INDEX INFORMATION BASED ON THE FIRST PARAMETER P1 ASSOCIATED WITH FILE DATA TO BE EXTRACTED ACCEPTED BY THE FILE DATA EXTRACTION INSTRUCTION RECEPTION MEANS 81 AND THE SECOND PARAMETER P2, WHEN AUTHENTICATION IS GRANTED USING THE SECOND SECRET KEY FOR ACCESSING THE BLOCKCHAIN K212 GENERATED BASED ON THE SECOND SECRET KEY, THAT IS, THE SECOND DECRYPTION KEY K21 GENERATED BY THE CO-ADMINISTRATOR OF THE CONSORTIUM-TYPE BLOCKCHAIN

FIG.74

SMART CONTRACT 83-1 FOR DECRYPTING CUSTOMER SIDE INDEX INFORMATION

COMPRISES THE FOLLOWING FUNCTION

A FUNCTION FOR DECRYPTING ENCRYPTED CUSTOMER SIDE INDEX INFORMATION EXTRACTED BY THE SMART CONTRACT 82-1 FOR EXTRACTING CUSTOMER-SIDE INDEX INFORMATION BASED ON THE FIRST SECRET KEY, THAT IS THE FIRST OFFLINE DECRYPTION KEY K11 GENERATED BY THE CUSTOMER

FIG.75

SMART CONTRACT 83-2 FOR DECRYPTING CO-ADMINISTRATOR-SIDE INDEX INFORMATION

*CORRESPONDS TO THE SMART CONTRACT 83 FOR DECRYPTING CO-ADMINISTRATOR-SIDE SERVER INDEX INFORMATION

COMPRISES THE FOLLOWING FUNCTION
A FUNCTION FOR DECRYPTING CO-ADMINISTRATOR SIDE INDEX INFORMATION ENCRYPTED BY A SMART CONTRACT 34-2 FOR ENCRYPTING CO-ADMINISTRATOR SIDE INDEX INFORMATION BASED ON THE SECOND SECRET KEY, THAT IS THE SECOND DECRYPTION KEY K21 GENERATED BY THE CO-ADMINISTRATOR OF THE CONSORTIUM-TYPE BLOCKCHAIN AMONG INDEX INFORMATION EXTRACTED BY THE SMART CONTRACT 82 FOR EXTRACTING ENCRYPTED INDEX INFORMATION

FIG.82

SMART CONTRACT 30X FOR SAVING CO-ADMINISTRATOR SIDE FILE DATA

COMPRISES THE FOLLOWING FUNCTIONS:

GENERATING THE KEY (KEY NUMBER OMITTED) FOR RENAMING AND ENCRYPTION USING THE FIRST PARAMETER P1 SPECIFIED BY A CUSTOMER WHO DESIRES TO SAVE THE FILE DATA, AND THE SECOND PARAMETER P2 THAT IS INTERNALLY HARD-CODED;

CHANGING AND ENCRYPTING FILE NAMES OF EACH FILE DATA ENCRYPTED AND MULTI-DIVIDED BY THE FILE DATA ENCRYPTION AND DIVISION MEANS 24 AND UPLOADED INTO THE FIRST TEMPORARY STORAGE AREA M1 BY THE UPLOAD MEANS 25, USING THE RENAMING AND ENCRYPTION KEY;

ALLOTTING THE FILE DATA TO THE MULTIPLE DISTRIBUTED FILE MANAGEMENT GROUPS $101_{1 \text{ THROUGH } M}$ (M IS AN INTEGER OF 2 OR MORE);

GENERATING AND ENCRYPTING SERVER INDEX INFORMATION COMPRISING: RENAMED FILE NAME INFORMATION OF EACH DISTRIBUTED AND RECORDED FILE DATA; AND ADDRESS INFORMATION OF THE NODES AND THE RECORDING DEVICES THAT ARE SAFEKEEPING DESTINATIONS FOR THE FILE DATA IN THE DISTRIBUTED FILE MANAGEMENT GROUPS $101_{1 \text{ THROUGH } M}$ (WHERE M IS AN INTEGER OF 2 OR MORE) THAT ARE ALLOTMENT DESTINATIONS OF EACH OF THE FILE DATA);

CHANGES THE FILE NAME TO A FILE NAME FURTHER DIFFERENT FROM THE RENAMED FILE NAME AND GENERATES NEW SERVER INDEX INFORMATION BASED ON THE INTERNALLY HARD-CODED SECOND PARAMETER P2 FOR RENAMED FILE INFORMATION AND ADDRESS INFORMATION OF THE NODES AND THE RECORDING DEVICES INTO WHICH THE FILE DATA IS SAFEKEPT, BEFORE RECORDING THE SERVER INDEX INFORMATION INTO NODE GROUPS LOCATED AT SPECIFIED BASES IN THE CONSORTIUM-TYPE BLOCKCHAIN, THE SMART CONTRACT 30X FOR SAVING CO-ADMINISTRATOR SIDE FILE DATA; AND

DELETING RENAMED FILE NAME INFORMATION OF EACH ORIGINALLY DISTRIBUTED AND RECORDED FILE DATA, AND THE ADDRESS INFORMATION OF THE NODES AND THE RECORDING DEVICES IN WHICH THE FILE DATA IS SAFEKEPT IN EACH OF THE DISTRIBUTED FILE MANAGEMENT GROUPS $101_{1 \text{ THROUGH } M}$ (WHERE M IS AN INTEGER OF 2 OR MORE) TO WHICH EACH FILE DATA IS ALLOTTED, AFTER ENCRYPTING THE NEWLY GENERATED SERVER INDEX INFORMATION AND RECORDING IN THE NODE GROUP AT THE SPECIFIED BASE IN THE CONSORTIUM-TYPE BLOCKCHAIN

FIG. 83

SMART CONTRACT 30X FOR SAVING CO-ADMINISTRATOR SIDE FILE DATA

COMPRISES THE FOLLOWING FUNCTION

A FUNCTION FOR

GENERATING NEW SERVER INDEX INFORMATION BY FURTHER ADDING DUMMY FILE INFORMATION TO THE CHANGED FILE NAME INFORMATION AND TO ADDRESS INFORMATION OF THE NODES AND RECORDING DEVICES IN WHICH THE FILE DATA IS SAFEKEPT, AFTER CHANGING THE FILE NAME TO A NAME THAT IS FURTHER DIFFERENT FROM THE RENAMED FILE NAME, BASED ON THE SECOND PARAMETER P2 THAT IS INTERNALLY HARD-CODED AND

DELETING THE RENAMED FILE NAME INFORMATION OF EACH ORIGINAL DISTRIBUTED AND RECORDED FILE DATA AND THE ADDRESS INFORMATION OF THE NODES AND RECORDING DEVICES IN WHICH THE FILE DATA IN EACH OF THE DISTRIBUTED FILE MANAGEMENT GROUPS $101_{1}$ THROUGH $_{M}$ (WHERE M IS AN INTEGER OF 2 OR MORE) TO WHICH EACH FILE DATA IS ALLOTTED IS SAFEKEPT, AFTER ENCRYPTING THE GENERATED NEW SERVER INDEX INFORMATION, AND RECORDING INTO THE NODE GROUPS AT SPECIFIED BASES IN THE CONSORTIUM-TYPE BLOCKCHAIN

NOTE THAT M IS AN INTEGER OF 2 OR MORE

FIG.84

SMART CONTRACT 80X FOR RESTORING CO-ADMINISTRATOR SIDE FILE DATA

COMPRISES THE FOLLOWING FUNCTION

A FUNCTION FOR

GENERATING KEYS FOR FILE NAME RESTORATION AND DECRYPTION USING THE FIRST PARAMETER P1 OR FIRST COMPOUND PARAMETER P1X SPECIFIED BY THE CUSTOMER, AND THE SECOND PARAMETER P2 OR THE SECOND COMPOUND PARAMETER P2X INTERNALLY HARD-CODED AND SPECIFIED BY THE CO-ADMINISTRATOR OF THE CONSORTIUM-TYPE BLOCKCHAIN

EXTRACTING ENCRYPTED SERVER INDEX INFORMATION RECORDED IN NODE GROUPS LOCATED AT SPECIFIED BASES IN THE CONSORTIUM-TYPE BLOCKCHAIN

RESTORING NEW SERVER INDEX INFORMATION IN WHICH THE FILE NAME IS FURTHER DIFFERENT FROM THE RENAMED FILE NAME BASED ON THE SECOND PARAMETER P2 AND THE SECOND COMPOUND PARAMETER P2X

SETTING THE CHANGED FILE NAME BACK TO THE RENAMED FILE NAME INFORMATION AND

SETTING BACK THE FILE NAME INFORMATION BEFORE THE RENAMING OF EACH OF THE DISTRIBUTED AND RECORDED FILE DATA BASED ON THE NAME RESTORATION AND DECRYPTION KEY

THE FIRST COMPOUND PARAMETER P1X IS CONFIGURED WITH A PAIR OF THE FIRST DECRYPTION PARAMETER P1X1 SPECIFIED BY THE CUSTOMER AND MANAGED OFFLINE, AND THE FIRST ENCRYPTION PARAMETER P1X2 THAT IS AUTOMATICALLY GENERATED FROM THE FIRST DECRYPTION PARAMETER P1X1

THE SECOND COMPOUND PARAMETER P2X IS CONFIGURED WITH A PAIR OF THE SECOND DECRYPTION PARAMETER P2X1 SPECIFIED BY THE CO-ADMINISTRATOR AND MANAGED OFFLINE, AND THE SECOND ENCRYPTION PARAMETER P2X2 THAT IS AUTOMATICALLY GENERATED FROM THE SECOND DECRYPTION PARAMETER P2X1

THE SECOND DECRYPTION PARAMETER P2X1 IS INCORPORATED AND MODULARIZED WITHIN A PREDETERMINED SMART CONTRACT THAT PERFORMS THE CORRESPONDING PROCESS

THE SECOND ENCRYPTION PARAMETER P2X2 (INCORPORATED AND MODULARIZED WITHIN A PREDETERMINED SMART CONTRACT THAT PERFORMS THE CORRESPONDING PROCESS

FIG.85

SMART CONTRACT 80X FOR RESTORING CO-ADMINISTRATOR SIDE FILE DATA

COMPRISES THE FOLLOWING FUNCTION

A FUNCTION FOR

GENERATING KEYS FOR FILE NAME RESTORATION AND DECRYPTION USING THE FIRST PARAMETER P1 OR FIRST COMPOUND PARAMETER P1X SPECIFIED BY THE CUSTOMER, AND THE SECOND PARAMETER P2 OR THE SECOND COMPOUND PARAMETER P2X INTERNALLY HARD-CODED AND SPECIFIED BY THE CO-ADMINISTRATOR OF THE CONSORTIUM-TYPE BLOCKCHAIN

EXTRACTING ENCRYPTED SERVER INDEX INFORMATION RECORDED IN NODE GROUPS LOCATED AT SPECIFIED BASES IN THE CONSORTIUM-TYPE BLOCKCHAIN

EXCLUDING DUMMY FILE INFORMATION BASED ON THE SECOND PARAMETER P2 OR THE SECOND COMPOUND PARAMETER P2X THAT ARE INTERNALLY HARD-CODED

SUBSEQUENTLY SETTING NEW SERVER INDEX INFORMATION BACK IN WHICH THE FILE NAME IS FURTHER DIFFERENT FROM THE RENAMED FILE NAME

SETTING THE FILE NAME INFORMATION BACK AFTER THE NAME CHANGE BY SETTING THE CHANGED NAME BACK AND

SETTING BACK INFORMATION IN WHICH RENAMED FILE NAMES OF EACH OF THE DISTRIBUTED AND RECORDED FILE DATA BASED ON THE KEYS FOR NAME RESTORATION AND DECRYPTION

THE FIRST COMPOUND PARAMETER P1X IS CONFIGURED WITH A PAIR OF THE FIRST DECRYPTION PARAMETER P1X1 SPECIFIED BY THE CUSTOMER AND MANAGED OFFLINE, AND THE FIRST ENCRYPTION PARAMETER P1X2 THAT IS AUTOMATICALLY GENERATED FROM THE FIRST DECRYPTION PARAMETER P1X1

THE SECOND COMPOUND PARAMETER P2X IS CONFIGURED WITH A PAIR OF THE SECOND DECRYPTION PARAMETER P2X1 SPECIFIED BY THE CO-ADMINISTRATOR AND MANAGED OFFLINE, AND THE SECOND ENCRYPTION PARAMETER P2X2 THAT IS AUTOMATICALLY GENERATED FROM THE SECOND DECRYPTION PARAMETER P2X1

THE SECOND DECRYPTION PARAMETER P2X1 IS INCORPORATED AND MODULARIZED WITHIN A PREDETERMINED SMART CONTRACT THAT PERFORMS THE CORRESPONDING PROCESS

THE SECOND ENCRYPTION PARAMETER P2X2 (INCORPORATED AND MODULARIZED WITHIN A PREDETERMINED SMART CONTRACT THAT PERFORMS THE CORRESPONDING PROCESS

FIG.104

MNGT OF BASES IN EQPT GRP FOR DISTRB EFFECTS

HORIZONTAL ALLOTMENT

VERTICAL ALLOTMENT

| | 1 | 2 | 3 | 4 | 5 | 6 | 7 | 8 | 9 | 10 |
|---|---|---|---|---|---|---|---|---|---|---|
| 1 | | | | | b | | | | | |
| 2 | a | | | | g | | | | c | |
| 3 | e | | | | | | | f | | |
| 4 | | i | | | | j | | k | | l |
| 5 | | | | | | | | | o | |
| 6 | | m | | | n | | | | | |
| 7 | | | | | | | | | | |
| 8 | | | | h | | | | | | |
| 9 | p | | | | | | | | | d |
| 10 | | | | | | | | | | |
| | | | | | | | | | | |

FIG.105

| | | | | | |
|---|---|---|---|---|---|
| DISTRBTD FILE MNGT GRP A | NODE | AREA CODE | ADDRESS | CAPA INFO | CMN SPD INFO |
| | CORENODE | | | | |
| | SUB-NODE 1 | | | | |
| | SUB-NODE 2 | | | | |
| | SUB-NODE 3 | | | | |
| | SUB-NODE 4 | | | | |
| DISTRBTD FILE MNGT GRP B | NODE | AREA CODE | ADDRESS | CAPA INFO | CMN SPD INFO |
| | CORENODE | | | | |
| | SUB-NODE 1 | | | | |
| | SUB-NODE 2 | | | | |
| | SUB-NODE 3 | | | | |
| | SUB-NODE 4 | | | | |
| DISTRBTD FILE MNGT GRP C | NODE | AREA CODE | ADDRESS | CAPA INFO | CMN SPD INFO |
| | CORENODE | | | | |
| | SUB-NODE 1 | | | | |
| | SUB-NODE 2 | | | | |
| | SUB-NODE 3 | | | | |
| | SUB-NODE 4 | | | | |
| DISTRBTD FILE MNGT GRP D | NODE | AREA CODE | ADDRESS | CAPA INFO | CMN SPD INFO |
| | CORENODE | | | | |
| | SUB-NODE 1 | | | | |
| | SUB-NODE 2 | | | | |
| | SUB-NODE 3 | | | | |
| | SUB-NODE 4 | | | | |

EASY TO EXPAND STORAGE AREA

DIGITAL ASSET GUARD SERVICE PROVISION SYSTEM

TECHNICAL FIELD

The present invention relates to the digital asset guard service provision system for protecting digital assets from destruction from risks such as high-level cyberattacks exceeding ordinal levels, strong natural disasters, or physical attacks that possibly occur in the future.

The term "system" in this disclosure means a computer system that specifically realizes information processing by software using hardware resources, comprising combination of elements such as computers, other electronic devices, software, communication networks, and data.

BACKGROUND

Conventionally, encryption technologies such as blockchain is used as a measure to protect data against general cyberattacks.

However, in the future, higher-level cyberattacks that exceed ordinal levels are envisaged, such as cryptographic analysis using quantum computers and electromagnetic pulse (EMP) attacks, which is described later. These high-level cyberattacks are aimed at leaking, tampering with, erasing or destroying digital assets, for example, sensitive information such as personal data or security-related information, control modules for critical functions, currencies such as stable coins, contracts and other rights.

For this reason, protecting digital assets from high-level cyberattacks is important.

Digital Assets Subject to High-Level Cyberattacks

The digital assets targeted by high-level cyber-attacks are likely to range from personal information, for example, account and personal asset information held by financial institutions, sensitive information such as personal data and security-related information held by large corporations and government agencies, critical contracts, designs, control modules and data, and lifeline-related items.

Conventionally, there are no services available to guard against high-level cyber-attacks with a high degree of certainty, especially for civilian use.

High Level Cyberattack

High-level cyberattacks mainly include cryptographic analysis using quantum computers (Y2Q: Years To Quantum) and electromagnetic pulse (EMP) attacks.

Cryptanalysis Using Quantum Computers

Cryptanalysis by quantum computers is a cyberattack that uses Secure Sockets Layer (SSL), blockchain public keys, and the like, to decrypt private keys and other keys, thereby breaking through cryptographic guards, taking important information and destroying systems.

If a quantum computer is abused, even if digital assets are guarded by storing private keys in cold wallets that are disconnected from the system, there is a high risk that cryptanalysis may be performed from the public key to decrypt the private keys.

Cryptanalysis by quantum computers is a cyber-attack that breaches the current basic security known as cryptography. Quantum computer-based cryptanalysis combined with various attacks is envisaged to lead to unexpected attacks, which will have a significant range of consequences.

EMP Attack

The EMP attack is a cyberattack that destroys electronic equipment, systems, and magnetically recorded digital assets using strong electromagnetic waves generated from a nuclear explosion at a high altitude (stratosphere)

The EMP attack may destroy the saved digital assets or the module of the system that saves the digital assets.

Also, although not the EMP attack, large-scale solar flares occur regularly. The effects of strong magnetic fields caused by solar flares can cause as much or more physical destruction as EMP attacks.

SUMMARY OF THE INVENTION

Problem to be Solved by the Invention

Measures Against High-Level Cyberattacks Currently being Considered

Quantum cryptography is being researched as a strategy for cryptographic analysis using quantum computers. However, in terms of when quantum cryptography may be introduced to the public and the cost of introducing quantum cryptography, Quantum cryptography has not yet reached the level of practical application at present.

Furthermore, as a measure against EMP attacks, measures such as the construction of anti-magnetic mesh are being taken at data centers (including cloud facilities) that meet the EMP resistance standards in the United States. However, only some of the data centers in Japan have anti-magnetic mesh installed, or the measures are not up to sufficient standards.

In addition, cloud computing may be used to save data to overseas regions, that is, independent areas where data centers are located.

However, the cloud has risks such as insufficient user management, and financial institutions (particularly major financial institutions) are refraining from using it. For details, most of the current domestic cloud services are overseas service entities, and if any problems occur in Japan, there is a possibility that they are easily withdrawn. Additionally, incorrect cloud settings can generate security holes, and even a simple attack can destroy the system.

In addition, even with domestic clouds, the digital assets saving using only one company's cloud has risks, such as the inability to use the saved data in the event of a system failure of the cloud. Even if digital assets were to be saved using the clouds of two companies, it would be necessary to generate separate management functions for the two companies' clouds, which would generally be difficult to use.

In particular, measures to be taken against cyberattacks that simultaneously use cryptographic analysis using quantum computers and EMP attacks are currently complex and expensive, and have not yet reached a level where they may be put to general practical use.

Other Challenges

In addition, there are very severe restrictions on the saving of the digital assets by systems regarding personal information and confidential corporate information. For example, if someone other than yourself manages digital assets, consent from the person who desires to manage the data is required. On the other hand, it is difficult to obtain consent from individuals for all digital assets that may be subject to management. This complicates the management of digital assets.

Additionally, when saving digital assets using distributed technology, blockchains such as public chains may not disconnect the chain that connects blocks. Therefore, even if it becomes necessary to delete garbage data that does not need to be managed or to delete digital data due to the customer's convenience, the digital data may not be deleted.

Furthermore, since the block size is relatively small, recording digital data in an amount exceeding the block size is not possible.

Furthermore, even if it were possible to generate a function similar to the save the digital assets using decentralized technology by combining public chains and freeware, the location of responsibility is not clear for public chains and freeware. In digital asset saving services that are not fundamentally guaranteed, handling important or personal information is not desirable due to its reliability.

This disclosure is made in light of the above-mentioned issues and aims to provide a digital asset that can strongly and efficiently protect important information such as confidential information and personal information from high-level cyberattacks and physical destruction, and the objective is to provide a digital asset guard service provision system that can restore important information without being stolen by a third party even if it is subject to cryptanalysis or EMP attacks by a quantum computer.

Means to Solve the Problem

In order to achieve the above object, the digital asset guard service provision system according to the present invention guards digital assets against high-level cyberattacks, comprising a decentralized ledger using the dispersed technique such as blockchains and the like, and the smart contract or server application for performing the predetermined process using the data managed in the decentralized ledger, the digital asset guard service provision system is characterized by comprising:

- a consortium-type blockchain configured with multiple planets (a planet is a unit making up a blockchain) comprising a node group in which nodes located at multiple bases in different regions in the world are linked;
- a file data saving system; and
- a file data restoration system;
- wherein the nodes located at each of the bases are networked to recording devices at multiple bases in the different regions in the world to form distributed file management groups,
- wherein the file data saving system comprises:
  - a program or smart contract having multiple encryption and division algorithms;
  - encryption and division algorithm selection reception means;
  - a file data saving instruction reception means;
  - a file data encryption and division means;
  - an upload means;
  - a smart contract for allotting distributed file management groups;
  - a smart contract for distribution and recording;
  - a smart contract for generating and recording system setting information;
  - a smart contract for generating server index information;
  - a smart contract or a program having a wallet function for generating customer setting information;
  - a smart contract or a program having a wallet function for generating customer index information; and
  - a first data deletion means;
- wherein the file data restoration system comprises:
  - a program or smart contract having multiple decryption and linkage algorithms;
  - a file data extraction instruction reception means;
  - a smart contract for extracting encrypted server index information;
  - a smart contract for decrypting server index information;
  - a smart contract for extracting encrypted and divided file data;
  - a download means;
  - a file data restoration means; and
  - a second data deletion means;
- wherein the multiple program or smart contract having encryption and division algorithms is configured to have a different file data encryption and division process method,
- wherein the encryption and division algorithm selection reception means is configured to accept a selection of a program or smart contract having predetermined encryption and division algorithms based on a first parameter specified by a customer who desires to save the file data,
- wherein the file data saving instruction reception means is configured to accept a file data saving instruction from a customer who desires to save the file data,
- wherein the file data encryption and division means is configured to encrypt and multi-divide the customer file data to be saved, the customer file data being accepted by the file data saving instruction reception means, using the program or smart contract having encryption and division algorithms accepted by the encryption and division algorithm selection reception means,
- wherein the upload means is configured to upload each file data encrypted and multi-divided by the file data encryption and division means to a first temporary storage area,
- wherein the smart contract for allotting distributed file management groups is configured to have a function for allotting, each of the file data (that is encrypted and multi-divided by the file data encryption and division means, and) uploaded into the first temporary storage area by the upload means, to the multiple distributed file management groups (configured with the nodes located at each of the bases configuring for the planet set on a co-administrator side in a condition specified by a customer and the recording devices located at multiple bases networked to the nodes at the bases) based on the first parameter and the second parameter specified by a co-administrator of the consortium-type blockchain,
- wherein the smart contract for distribution and recording is configured to have a function to distribute and record, each of the file data allotted by the smart contract for allotting distributed file management groups, into the nodes located at each of the bases belonging to each of the corresponding distributed file management groups and into the recording devices located at multiple bases networked to the nodes at the bases,
- wherein the smart contract for generating and recording system setting information is configured to have a function for generating and encrypting system setting information and recording into the node groups located at the specified bases in the consortium-type blockchain,
- wherein the system setting information comprises:
  - destination identifying information such as terminal information (fixed Internet Protocol (IP) addresses and the like) for uploading the system setting information to the first temporary storage area using the upload means;

a predetermined smart contract number that performs a process corresponding to a recording destination of customer file data;

planet information to which a recording destination of file data belongs; and information on a file server group at the nodes at predetermined bases and the recording devices located at multiple bases networked to the nodes at the bases configuring the file distributed file management groups;

wherein the smart contract for generating server index information is configured to have a function for generating server index information, wherein the server index information comprises:

information on file names of each of the file data distributed and recorded by each of the smart contracts for distribution and recording; and configuration information of each of the distributed file management groups which are allotment destinations of each of the file data, wherein the smart contract for recording server index information is configured to have a function for encrypting server index information generated by the smart contract for generating server index information and for recording the server index information into node groups located at specified bases in the consortium-type blockchain, wherein the smart contract or program having a wallet function for generating customer setting information is configured to have a function for generating customer setting information, wherein the customer setting information comprises the first parameter setting information associated with the program or smart contract having encryption and division algorithms accepted by the encryption and division algorithm selection reception means;

wherein the smart contract or program having a wallet function for generating customer index information is configured to have a function for generating customer index information, wherein the customer index information comprises information of an original file name of customer file data to be saved and of an upload date, wherein the smart contract for recording customer index information is configured to have a function for encrypting the customer index information generated by the smart contract or program having a wallet function for generating customer index information, and for recording the encrypted customer index information generated by the smart contract or program having a wallet function for generating customer index information into node groups located at specified bases in the consortium-type blockchain, wherein the first data deletion means is configured to delete each of the file data uploaded into the first temporary storage area, after the server index information is encrypted by the smart contract for recording server index information and recorded in the node group located at the specified bases in the consortium-type blockchain, wherein the programs or smart contracts having the multiple decryption and linkage algorithms are configured to associate with each of the program or smart contract having the encryption and division algorithms, and to differentiate file data decryption and linkage process methods, wherein the file data extraction instruction reception means is configured to accept a file data extraction instruction from a customer who desires to restore the file data, wherein the smart contract for extracting encrypted server index information is configured to have a function for extracting encrypted server index information (recorded in the node group located at the specified bases in the consortium-type blockchain by the smart contract for recording server index information) based on the first parameter or first compound parameter associated with the file data to be extracted accepted by the file data extraction instruction reception means and based on the second parameter or second compound parameter, wherein the first compound parameter comprises the pair of the first decryption parameter specified by the customer and managed offline and the first encryption parameter automatically generated from the first decryption parameter, wherein the second compound parameter is configured with the pair of a second decryption parameter specified by the co-administrator and managed offline (which is incorporated and modularized within the predetermined smart contract that performs the corresponding process) and a second encryption parameter automatically generated from the second decryption parameter (which is incorporated and modularized within the predetermined smart contract that performs the corresponding process), wherein the smart contract for decrypting server index information is configured to have a function for decrypting the encrypted server index information extracted by the smart contract for extracting encrypted server index information, wherein the smart contract for extracting encrypted and divided file data is configured to have a function for extracting the encrypted and multi-divided file data (which are allotted to each of the distributed file management groups by the smart contract for allotting distributed file management groups, and which are distributed and recorded in the nodes located at each of the bases belonging to each of the distributed file management groups and in the recording devices located at multiple bases networked to the nodes at the bases by each of the smart contracts for distribution and recording), from any of the nodes located at each of the bases belonging to each of the distributed file management groups or from the recording devices located at multiple bases networked to the nodes at the bases, using the server index information decrypted by the smart contract for decrypting server index information, wherein the download means is configured to download each of the encrypted and multi-divided file data extracted by the smart contract for extracting encrypted and multi-divided file data to a second temporary storage area, wherein the file data restoration means is configured to decrypt, each of the encrypted and multi-divided file data which are extracted by the smart contract for extracting encrypted and multi-divided file data and downloaded to the second temporary storage area by the download means, integrate into one file data and restore to the file data before being saved, using the program or smart contract having decryption and linkage algorithms associated with the program or smart contract having encryption and division algorithms accepted by the encryption and division algorithm selection reception means, and wherein the second data deletion means is configured to delete each of the encrypted and multi-divided file data downloaded to the second temporary storage area after restored to the file data before being saved by the file data restoration means.

In the digital asset guard service provision system according to the present invention, preferably, the file data saving system comprises:

a customer-side file data saving system that operates on the customer-side who desires to save the file data; and a co-administrator side file data saving system that operates on the co-administrator side of the consortium-type blockchain;

the customer side file data saving system comprises:

the multiple program or smart contract having encryption and division algorithms;

encryption and division algorithm selection reception means;

the file data saving instruction reception means;

the file data encryption and division means;

the upload means;

the smart contract or the program having a wallet function for generating customer index information; and the smart contract for recording customer index information;

the co-administrator side file data saving system comprises:

the smart contract for allotting distributed file management groups;

the smart contract for distribution and recording;

the smart contract for generating server index information;

the smart contract for recording server index information; and the first data deletion means;

the file data restoration system comprises a combination of:

a customer-side file data restoration system that operates on a customer-side who desires to restore saved file data; and a co-administrator side file data restoration system that operates on the co-administrator side of the consortium-type blockchain;

both of the restoration systems are formed completely and independently.

the customer side file data restoration system comprises:

a program or smart contract having multiple decryption and linkage algorithms;

the file data extraction instruction reception means;

the download means;

the file data restoration means; and the second data deletion means;

the co-administrator side file data restoration system preferably comprises:

the smart contract for extracting encrypted server index information;

the smart contract for decrypting server index information; and the smart contract for extracting encrypted and multi-divided file data;

In the digital asset guard service provision system according to the present invention, preferably, the smart contract for allotting distributed file management groups is further configured to have a function for converting file formats and names of each file data (encrypted and multi-divided by the file data encryption and division means and) uploaded into the first temporary storage area by the upload means into predetermined file formats and names prior to allotting to the multiple distributed file management groups, and the smart contract for extracting encrypted and multi-divided file data is preferably further configured to have a function for converting file formats and names of each extracted file data to original file formats and names after extracting the encrypted and multi-divided file data.

In the digital asset guard service provision system according to the present invention, the first parameter comprises:

a file division code; and a file storage code;

the encryption and division algorithm selection reception means is configured to accept a selection of a program or smart contract having predetermined encryption and division algorithms based on the file division code, the smart contract for allotting distributed file management groups is configured to have a function for performing processes 4-1 through 4-3, each of the smart contracts for distribution and recording is configured to have a function for distributing and recording each file data allotted by the smart contract for allotting distributed file management groups into the nodes at each of the bases belonging to each of the corresponding distributed file management groups and into the recording devices located at multiple bases networked to the nodes at the bases, the smart contract for extracting encrypted and divided file data is configured to have a function for performing processes 4-4 through 4-6, the file data restoration means is preferably configured to decrypt the encrypted and multi-divided file data (that is extracted by the smart contract for extracting encrypted and divided file data and) that is downloaded to the second temporary storage area by the download means, linking to one file data and restoring the file data before being saved, based on the file division code, using the program or smart contract having decryption and linkage algorithms associated with the program or smart contract having encryption and division algorithms accepted by the encryption and division algorithm selection reception means.

(Process 4-1) The smart contract for allotting distributed file management groups converts the file formats and names of each file data (encrypted and multi-divided by the file data encryption and division means and) uploaded to the first temporary storage area by the upload means to predetermined file formats and names based on the file storage code and the second parameter.

(Process 4-2) The smart contract for allotting distributed file management groups performs the process 4-1 and simultaneously encrypts the file data.

(Process 4-3) After performing the process 4-2, the smart contract for allotting distributed file management groups allots to multiple distributed file management groups configured with the nodes located at multiple bases formed for the planet set on the co-administrator side according to a condition specified by a customer and of the recording devices located at multiple bases networked to the nodes at the bases.

(Process 4-4) The smart contract for extracting encrypted and divided file data extracts each of the encrypted and multi-divided file data that are allotted to each of the distributed file management groups by the smart contract for allotting distributed file management groups, distributed and recorded in the nodes located at each of the bases belonging to each of the distributed file management groups by each of the smart contracts for distribution and recording and in the recording devices located at multiple bases networked to the nodes at the bases from any of the nodes located at each of the bases belonging to each of the distributed file management groups or from the recording devices located at multiple bases networked to the nodes at the bases based on the file storage code and the second parameter.

(Process 4-5) The smart contract for extracting encrypted and multi-divided file data decrypts the file data extracted in the process 4-4.

(Process 4-6) The smart contract for extracting encrypted and divided file data performs the process 4-5 and at the same time changes the file formats and names of the file data to the original file formats and names.

In the digital asset guard service provision system according to the present invention, the file data encryption and division means is configured to perform the processes 5-1 and 5-2, and the file data restoration means is preferably configured to perform the processes 5-3 and 5-4.

(Processes 5-1) The file data encryption and division means multi-divides the customer file data to be saved accepted by the file data saving instruction reception means using the program or smart contract having encryption and division algorithms accepted by the encryption and division algorithm selection reception means.

(Process 5-2) The file data encryption and division means performs the process 5-1, and encrypts each of the multi-divided file data in accordance with a first public key (first encryption key) generated by the customer.

(Process 5-3) The file data restoration means decrypts each of the encrypted and multi-divided file data that are (extracted by the smart contract for extracting encrypted and divided file data and) downloaded to the second temporary storage area by the download means based on a first secret key, that is a first offline decryption key generated by the customer.

(Process 5-4) The file data restoration means performs the process 5-3 and links each decrypted file data to one file data using a program or smart contract having decryption and linkage algorithms associated with the program or smart contract having encryption reception means.

In the digital asset guard service provision system according to the present invention, the file data encryption and division means is configured to perform the processes 6-1 and 6-2, and the file data restoration means is preferably configured to perform the processes 6-3 and 6-4.

(Process 6-1) The file data encryption and division means encrypts the customer file data to be saved that is accepted by the file data saving instruction reception means in accordance with the first public key, that is the first encryption key generated by the customer.

(Process 6-2) The file data encryption and division means performs the process 6-1 and multi-divides the encrypted file data using the program or smart contract having encryption and division algorithms accepted by the encryption and division algorithm selection reception means.

(Process 6-3) The file data restoration means links to one file data each of the encrypted and multi-divided file data extracted by the smart contract for extracting encrypted and divided file data and downloaded to the second temporary storage area by the download means, using the program or smart contract having decryption and linkage algorithms associated with the program or smart contract having encryption and division algorithms accepted by the encryption and division algorithm selection reception means.

(Process 6-4) The file data restoration means performs the process 6-3, and decrypts the linked one file data based on the first secret key, that is the first offline decryption key generated by the customer.

In the digital asset guard service provision system according to the present invention, preferably, the smart contract for recording server index information is configured to have a function for encrypting server index information generated by the smart contract for generating server index information based on the second public key, that is the second encryption key generated by the co-administrator of the consortium-type blockchain, or based on the second encryption parameter (which is incorporated and modularized in the predetermined smart contract performing the set process) which is automatically generated from a (incorporated and modularized within the predetermined smart contract that performs the corresponding process) second decryption parameter specified by the co-administrator and managed offline; and the smart contract for decrypting server index information is preferably configured to have a function for decrypting the encrypted server index information extracted by the smart contract for extracting encrypted server index information based on the second secret key, that is the second decryption key generated by the co-administrator of the consortium-type blockchain, or based on the second decryption parameter (which is incorporated and modularized in the predetermined smart contract performing the set process) specified by the co-administrator and managed offline.

Furthermore, in the digital asset guard service provision system of the present invention, the program or smart contract having encryption and division algorithms is preferably configured to encrypt and multi-divide file data using secret sharing technologies.

Further, in the digital asset guard service provision system of the present invention, the program or smart contract having decryption and linkage algorithms is preferably configured to decrypt and unify the encrypted and multi-divided file data using secret sharing technologies and restore to the original integrated file data.

Furthermore, in the digital asset guard service provision system of the present invention, the secret sharing technologies is preferably an AONT secret sharing technology.

In the digital asset guard service provision system according to the present invention, the file data saving system further comprises a planet configuration pattern setting means, the planet configuration pattern setting means is configured to calculate and select the number of the nodes configuring the planet and distributed file management groups configured with the nodes located at each of the bases and the recording devices located at multiple bases connecting the nodes at the base, based on the number of divisions of the file data in accordance with a record capacity, file size and a degree of dispersion of the file data specified by the customer, the smart contract for allotting distributed file management groups is configured to have a function for allotting to multiple distributed file management groups configured with the nodes at each of the bases configuring for the planet set on the co-administrator side according to conditions specified by the customer via the planet configuration pattern setting means and with the recording devices located at multiple bases networked to the nodes, and each of the smart contracts for distribution and recording is preferably configured to have a function for distributing and recording each file data allotted by the smart contract for allotting distributed file management groups into the nodes at each of the bases belonging to each of the corresponding distributed file management groups and into the recording devices located at multiple bases networked to the nodes at the bases.

In the digital asset guard service provision system according to the present invention the planet configuration pattern setting means is preferably configured to add a predetermined number of dummy file data (having an internal code that allows the smart contract for extracting encrypted and divided file data to recognize the dummy file data as dummy information) to the number of divisions of the file data, and selects the number of the nodes configuring the planet and distributed file management groups configured with the nodes at each of the bases and the recording devices located at multiple bases networked to the nodes located at each of the bases.

Further, in the digital asset guard service provision system of the present invention, as configuration information of each of the distributed file management groups, the smart contract for generating server index information is preferably configured to have a function for generating the server index information including: information of the nodes at each of the bases that distributes and records dummy file data added by the planet configuration pattern setting means; and information of the recording devices at multiple bases networked to the nodes at the bases.

In the digital asset guard service provision system according to the present invention, from the configuration information of each of the distributed file management groups in the server index information decrypted by the smart contract for decrypting server index information, using the server index information excluding information of the nodes located at each of the bases that distribute and record dummy file data (which has a code inside that can recognize that the information is dummy) and information of the recording devices located at multiple bases networked to the nodes at the bases, the smart contract for extracting encrypted and divided file data is preferably configured to have a function for extracting each divided and multi-divided file data (that are allotted to each of the distributed file management groups by the smart contract for allotting distributed file management groups, and distributed and recorded in the nodes located at each of the bases belonging to each of the distributed file management groups by each of the smart contracts for distribution and recording and in the recording devices located at multiple bases networked to the nodes) from either one of the nodes located at each of the bases belonging to each of the distributed file management groups and the recording devices at multiple bases networked to the nodes at the bases.

Further, in the digital asset guard service provision system of the present invention, the planet configuration pattern setting means is preferably configured to calculate and select, the nodes located at each of the bases in each of the distributed file management groups and the recording devices located at multiple bases networked to the nodes at the bases, so that the node and recording device are positioned in which the distances therebetween are maximized (equals to the greatest dispersion).

In the digital asset guard service provision system according to the present invention, the planet configuration pattern setting means performs the following processes 16-1 and 16-2, and preferably configured to calculate and select the nodes located at each of the bases in each of the distributed file management groups and the recording devices located at multiple bases networked to the nodes at the bases.

(Process 16-1) The planet configuration pattern setting means views the spherical earth as a flat surface and generates the matrix that divides the regions of the earth into multiple segments in the vertical and horizontal directions.

(Process 16-2) The planet configuration pattern setting means determines intervals in the X-axis direction with respect to the Y-axis in the matrix for bases of nodes that distribute and record one divided file data and of multiple recording devices networked to the nodes in a distributed file management group, using calculated values based on the number of divisions of the file data.

In the digital asset guard service provision system according to the present invention, bases of the nodes in which each divided file data is distributed and recorded and bases of the multiple recording devices networked to the nodes in the planet are preferably managed by information such as the global positioning system (GPS) and the like and classified in the matrix.

In the digital asset guard service provision system according to the present invention, when X-axis direction intervals cannot be spaced as the calculated values based on the number of divisions of the file data due to insufficient remaining recordable capacity in either one of the nodes at predetermined bases or the recording devices at multiple bases networked to the nodes, for bases of nodes that distribute and record one divided file data and of recording devices networked to the nodes, the planet configuration pattern setting means is preferably configured to calculate and select nodes and recording devices networked to the nodes of bases in which the calculated values of the X-axis direction intervals have similar numerical differences in the Y-axis direction In the digital asset guard service provision system according to the present invention, wherein the planet configuration pattern setting means is preferably configured to perform the processes 19-1 and 19-2.

(Process 19-1) The planet configuration pattern setting means selects bases of each node configuring the planet according to the number of divisions based on a record capacity and file size of file data specified by a customer.

(Process 19-2) In the distributed file management groups configured with each of the nodes selected in the process 19-1, the planet configuration pattern setting means selects multiple individual bases belonging to distributed file management groups and selects multiple recording devices (networked to the nodes) to be installed at each individual base to maximize dispersion degrees.

Further, in the digital asset guard service provision system of the present invention, the planet configuration pattern setting means is preferably configured to record a total remaining recordable capacity, a total communication remaining capacity and the like in the matrix as information of nodes at each of the bases in each region to which bases of each of the nodes belong and of the recording devices at multiple bases networked to the nodes at the bases, and to select bases of the optimal combination of nodes and recording devices at multiple bases networked to the nodes using the total remaining recordable capacity, information of the total communication remaining capacity and degrees of dispersion of the nodes at each of the bases and recording devices at multiple bases networked to the nodes at the bases in each region recorded in the matrix upon selecting the nodes configuring the distributed file management groups and recording devices at multiple bases networked to the nodes at the bases.

In the digital asset guard service provision system according to the present invention, in combinations of the nodes at predetermined bases configuring the distributed file management groups and the recording devices at multiple bases networked to the nodes at the bases, the planet configuration pattern setting means is preferably configured to calculate and select areas in which recording capacities and communication capacities, of the nodes at each of the bases and of the recording devices located at multiple bases networked to the nodes at the bases, are to be increased.

In the digital asset guard service provision system according to the present invention, each of the distributed file management groups preferably has a core node that specifies and manages individual equipment configuring the recording devices at each of the bases belonging to the distributed file management groups.

Further, in the digital asset guard service provision system of the present invention, the nodes located at each of the bases are connected via communication means such as the Internet, a closed network or the like, and in which the smart contracts for distribution and recording are incorporated.

In the digital asset guard service provision system according to the present invention, the file data saving system is preferably configured to read out the customer index information that is encrypted and recorded in node groups located at specified bases in the consortium-type blockchain, and is preferably configured to have a wallet function that comprehends recording destinations corresponding to each file data encrypted and multi-divided by the file data encryption and division means.

In the digital asset guard service provision system according to the present invention, the file data saving system further comprises saved file data list information generation means and saved file data list information reference control means, the saved file data list information generation means is configured to generate saved file data list information, the saved file data list information comprises:

terminal information (fixed IP addresses and the like);

an original file name of file data to be saved; and information of an upload date, that are associated with a customer when uploaded to the first temporary storage area using the upload means, and the saved file data list information reference control means is preferably configured to allow, saved file data list information generated by the saved file data list information generation means, to be referenced only by a 'communication equipment management and process program' managed by the fixed IP address of the customer.

Further, in the digital asset guard service provision system of the present invention, the file data restoration system further comprises a restoration process time frame setting reception means, and a file data restoration process operation control means, the restoration process time frame setting reception means is configured to accept:

a time frame setting in which file data from a customer who desires file data restoration is performed;

a setting of an IP address for performing restoration; and a setting of a restorable period and the like.

the file data restoration process operation control means is preferably configured to control to operate:

the file data extraction instruction reception means;

the smart contract for extracting encrypted server index information;

the smart contract for decrypting server index information;

the smart contract for extracting encrypted and divided file data;

the download means;

the file data restoration means; and the second data deletion means; only in a time frame in which the restoration process time frame setting reception means accepts to set.

In the digital asset guard service provision system according to the present invention, the file data restoration system further comprises an authentication code setting reception means, the 'authentication code setting acceptance means is configured to accept authentication license code settings from a customer who desires to restore the file data;

the file data restoration process operation control means is preferably configured to operate:

the file data extraction instruction reception means;

the smart contract for extracting encrypted server index information;

the smart contract for decrypting server index information;

the smart contract for extracting encrypted and divided file data;

the download means;

the file data restoration means; and the second data deletion means; only in a time frame a setting of which is accepted by the restoration process time frame setting acceptance means, and only when the authentication code, a setting of which is accepted by the authentication code setting reception means, is approved by the co-administrator of the consortium-type blockchain.

In the digital asset guard service provision system according to the present invention, the authentication code set in the authentication code setting reception means is a code that a customer who desires to restore the file data is contacted by the co-administrator of the consortium-type blockchain; and the file data restoration process operation control means is configured to provide an operation license of the program or smart contract having decryption and linkage algorithms associated with the program of smart contract having encryption and division algorithms accepted by the encryption and division algorithm selection reception means, when the authentication code a setting of which is accepted by the authentication code setting reception means is approved by the co-administrator of the consortium-type blockchain, and is further systematically confirmed that the authentication code is the customer him/herself by a multi-step authentication, a biometric authentication, a one-time passcode and the like registered in the customer's smartphone.

Further, in the digital asset guard service provision system of the present invention, preferably, the consortium-type blockchain is characterized by preferably having:

the nodes located at each of the bases configuring the planet;

the recording devices located at multiple bases networked to the nodes at the bases;

the file data saving system; and multi-level file data saving and restoration system configuration in which the file data restoration system operates.

In the digital asset guard service provision system according to the present invention comprises a level S file data saving and restoration system configuration, the level S file data saving and restoration system configuration is preferably configured to operate:

the nodes at each of the bases configuring the planet;

the recording devices at multiple bases networked to the nodes at the bases;

the file data saving system; and the file data restoration system, using satellite communications, 5G/6G private communications, LTE networks, dedicated closed networks and other closed networks that are not connected to the Internet.

In the digital asset guard service provision system according to the present invention comprises a level four file data saving and restoration system configuration, the level four file data saving and restoration system configuration is configured to utilize the Internet communication network and is configured with highly creditworthy companies each of which participants of the consortium-type blockchain approve, and in a space having a high security level such as a dedicated room and the like, the 'level four file data saving and restoration system configuration' is preferably configured to operate:

the nodes located at each of the bases configuring the planet;

the recording devices located at multiple bases networked to the nodes at the bases;

the file data saving system; and the file data restoration system.

Further, the digital asset guard service provision system of the present invention comprises a level three file data saving and restoration system configuration, the level three file data saving and restoration system configuration is configured to utilize the Internet communication network and is configured with highly creditworthy companies each of which participants of the consortium-type blockchain approve, and the 'level three file data saving and restoration system configuration' is preferably configured to operate:

the nodes located at each of the bases configuring the planet;

the recording devices located at multiple bases networked to the nodes at the bases;

the file data saving system; and the file data restoration system, by disposing a file server for data saving in a space having a security level suitable for offices and the like, or by using an inexpensive cloud service including using regional services spread worldwide.

In the digital asset guard service provision system according to the present invention comprises a level two file data saving and restoration system configuration, wherein the level two file data saving and restoration system configuration is configured to utilize the Internet communication network and is open to organizations such as general companies and their branch networks, and the level two file data saving and restoration system configuration is preferably configured to operate:

the nodes located at each of the bases configuring the planet;

the recording devices located at multiple bases networked to the nodes at the bases;

the file data saving system; and the file data restoration system.

In the digital asset guard service provision system according to the present invention comprises a level one file data saving and restoration system configuration, the level one file data saving and restoration system configuration is configured to utilize the Internet communication network and is open to private homes and the like and the level one file data saving and restoration system configuration is preferably configured to operate:

the nodes located at each of the bases configuring the planet;

the recording devices located at multiple bases networked to the nodes at the bases;

the file data saving system; and the file data restoration system.

In the digital asset guard service provision system according to the present invention, the file data saving and restoration system configurations of levels one through four are preferably configured such that, the nodes located at each of the bases of the world configuring each of the planet and a file server of the recording devices located at multiple bases networked to the nodes at the bases, connect to the Internet communication network via a network to operate during night hours when night time power may be used.

In the digital asset guard service provision system according to the present invention, the file data saving and restoration system configurations of levels one through four are preferably configured such that, the nodes located at each of the bases of the world configuring each of the planet and a file server of the recording devices located at multiple bases networked to the nodes at the bases, are operable using renewable energy such as solar power generation and the like during day time hours.

The digital asset guard service provision system according to the present invention further comprises a data saving service contract application procedure reception means and a smart contract for recording data saving service contract application reception information, the data saving service contract application procedure reception means is configured to accept a data saving service contract application procedure from a customer who desires to save the file data, and upon receiving the data saving service contract application procedure, the data saving service contract application procedure reception means is configured to accept from the customer:

a data record capacity and degree of dispersion of file data desired to be saved;

whether the file data desired to be saved includes only domestic or international;

safekeeping period; and a real-time process designation, wherein the smart contract for recording data saving service contract application reception information is preferably configured to have a function for performing processes 37-1 and 37-2.

(Process 37-1) The smart contract for recording the data saving service contract application reception information automatically calculates and generates a basic configuration of the entire planet by managing:

a data record capacity and degree of dispersion of file data desired to be saved;

whether the file data desired to be saved includes only domestic or international;

safekeeping period; and a real-time process information requested by the customer, and by setting conditions from the customer (budgetary and/or whether the highest confidential matter regarding personal information and security exists, that is a magnitude of risk).

(Process 37-2) Making the information generated in the process 37-1 as a portion of the system setting information, the smart contract for recording data saving service contract application reception information enables, the setting information that is encrypted and recorded in node groups located at specified bases in the consortium-type blockchain, the predetermined smart contract that performs the corresponding process to read the recorded setting information together with the customer's personal information so that the entire information may be comprehended.

Further, in the digital asset guard service provision system of the present invention, each divided file data recorded in the nodes located at each of the base belonging to each of the distributed file management groups and the recording devices located at multiple bases networked to the nodes at the bases, is configured to be managed in an encrypted state;

index information such as hashes of each file data and distributed file groups to which the recorded file data to be recorded are allotted, is recorded in a block;

a block is linked with a chain of hashes incorporating time data;

the file data saving system further comprises a smart contract for setting safekeeping period and a smart contract for disconnecting chains;

based on a safekeeping period of file data that the customer desires to save, which is recorded in node groups located at specified bases in the consortium-type blockchain by the smart contract for recording data saving service contract application reception information, the smart contract for setting safekeeping period is configured to have a function for setting the safekeeping period of the block on a planet-by-planet basis when each of the smart contracts for distribution and recording distributes and records each file data; and the smart contract for disconnecting chains is preferably configured to have a function for disconnecting the chain of the block after the safekeeping period set by the smart contract for setting safekeeping period.

In the digital asset guard service provision system according to the present invention, the file data saving system further comprises a smart contract for deleting blocks, and the smart contract for deleting blocks is preferably configured to have a function for deleting unnecessary blocks disconnected via the smart contract for disconnecting chains.

Further, in the digital asset guard service provision system of the present invention, the file data saving system further comprises an unnecessary block data saving means, and the unnecessary block data saving means is preferably configured to perform processes 40-1 through 40-4.

(Process 40-1) The unnecessary block data saving means sends a notification to confirm the customer whether to delete the unnecessary block disconnected via the smart contract for disconnecting chains, before deleting the unnecessary block.

(Process 40-2) If there is no response from the customer to the notification sent in the process 40-1, the unnecessary block data saving means notifies the co-administrator to confirm whether the unnecessary block is to be deleted.

(Process 40-3) Even if the unnecessary block is confirmed to be delible, the unnecessary block data saving means temporarily records each of the encrypted and multi-divided file data as data to be saved via a predetermined record medium disconnected from a network.

(Process 40-4) The unnecessary block data saving means deletes the temporarily recorded saved data by the process 40-3 after a certain time has elapsed.

In the digital asset guard service provision system according to the present invention, the unnecessary block data saving means is preferably configured to perform the processes 41-1 through 41-5, when the unnecessary block data saving means sends a notification to the customer to confirm whether the unnecessary block may be deleted, and the customer desires an extension of the safekeeping period of the file data.

(Process 41-1) The unnecessary block data saving means temporarily records each of the encrypted and multi-divided file data as data to be saved via a predetermined recording medium that is disconnected from the network.

(Process 41-2) The unnecessary block data saving means performs the process 41-1 and at the same time selects a new planet that meets the conditions for the extended safekeeping period of file data desired by the customer.

(Process 41-3) The unnecessary block data saving means automatically saves the file data to be saved the unnecessary block data to the nodes located at each of the bases configuring the planet that is selected in the process 41-2, and to the recording devices located at multiple bases networked to the nodes at the bases.

(Process 41-4) The unnecessary block data saving means performs the process 41-3 and updates the server index information.

(Process 41-5) After performing the process 41-4, the unnecessary block data saving means deletes the temporarily recorded data to be saved after a certain time has elapsed.

Further, in the digital asset guard service provision system of the present invention, the file data saving system further comprises data falsification check control means, and the data falsification check control means is preferably configured to perform processes 42-1 through 42-4.

(Process 42-1) The data falsification check control means calculates hash values based on encrypted and multi-divided file data recorded:

in the nodes at each of the bases belonging to each of the distributed file management groups; and in the recording devices at multiple bases networked to the nodes at the bases.

(Process 42-2) The data falsification check control means records in a block the hash value calculated in the process 42-1.

(Process 42-3) The data falsification check control means constantly compares the hash values recorded in:

blocks in the nodes located at each of the bases belonging to each of the distributed file management groups; and blocks of the recording devices located at multiple bases networked to the nodes at the bases.

(Process 42-4) If there is a difference between:

a hash described in a block in a specified node or in a recording device; and a hash described in another block of a node or a recording device; upon performing the comparison process 42-3, the data falsification check control means performs processes 42-4-1 and 42-4-2.

(Process 42-4-1) The data falsification check control means:

detects that the encrypted and multi-divided file data recorded in the specified node or recording device is tampered with or destroyed;

excludes the specified node or recording device from the file data save process object; and deletes the block in the specified node or recording device.

(Process 42-4-2) The data falsification check control means performs the process 42-4-1 and sends an alarm to the operator of the node and to the co-administrator of the consortium-type blockchain.

In the digital asset guard service provision system according to the present invention, preferably, the following communication equipment is configured to be managed using fixed IP addresses.

The communication equipment allow a customer to use the first secret key, that is the first offline decryption key to restore, each of the encrypted and multi-divided file data distributed and recorded in the nodes located at each of the bases belonging to each of the distributed file management groups and in the recording devices located at multiple bases networked to the nodes at the bases via the file data restoration system, to the original file data before being saved.

Further, the digital asset guard service provision system of the present invention is preferably configured to present to the co-administrator the management information of the IP address of the communication equipment for which the customer can use the first secret key, that is the first offline decryption key, only when a transaction of a multi-signature type key is approved by holders of specified nodes at multiple bases configuring co-administrators.

In the digital asset guard service provision system according to the present invention, node information that permits access is preferably recorded in node groups located at specified bases in the consortium-type blockchain.

The digital asset guard service provision system according to claim 1 further comprises an upload processable IP address checking means, the upload processable IP address checking means is preferably configured to control to be capable of operating the upload process of file data to be saved in the file data saving system, that is:

the encryption and division algorithm selection reception means;

the file data saving instruction reception means;

the file data encryption and division means; and the upload means, only by an operation in a customer terminal in which a fixed IP address is pre-registered in the node groups located at the specified bases in the consortium-type blockchain as a portion of the system setting information, as terminal information for uploading into the first temporary storage area using the upload means.

Furthermore, in the digital asset guard service provision system of the present invention, the smart contract for recording the data saving service contract application reception information is preferably further configured to have a function for performing processes 47-1 and 47-2.

(Process 47-1) The smart contract for recording data saving service contract application reception information checks a file data record amount desired to be saved by the customer, accepted by the data saving service contract application procedure reception means.

(Process 47-2) If the file data amount confirmed in the process 47-1 exceeds the maximum record capacity of one file defined in the system, The smart contract for recording data saving service contract application reception information determines the number of divisions of the file data so that the file data amount confirmed in the process 47-1 is less than the maximum record capacity.

The digital asset guard service provision system according to the present invention further comprises a rollover smart contract, which preferably has a function of performing processes 48-1 through 48-4.

(Process 48-1) The rollover smart contract sets a new planet and a new distributed file management group before the safekeeping period of the block set by the smart contract for setting the safekeeping period has passed, in order to extend the safekeeping period of each of the encrypted and multi-divided file data, which is recorded as such blocks:

in the nodes at each of the bases belonging to the distributed file management groups; and in the recording devices at multiple bases networked to the nodes at the bases.

(Process 48-2) After performing the process 48-1, the rollover smart contract takes over the control number of the old server index information, changes to a new control number, and generates new server index information.

(Process 48-3) The rollover smart contract performs the process 48-2 and re-records the file data: in the nodes at each of the bases belonging to a new distributed file management group; and in the recording devices located at multiple bases networked to the nodes at the bases.

(Process 48-4) After performing the process 48-3, the rollover smart contract deletes:

the file data recorded in the nodes located at each of the bases belonging to the original distributed file management group, and in the recording devices located at multiple bases networked to the nodes at the bases; and the old server index information regarding the file data.

Further, in the digital asset guard service provision system of the present invention, the nodes located at each of the bases belonging to each of the distributed file management groups and the recording devices located at multiple bases networked to the nodes at the bases are preferably configured to comprise:

multiple sub-configuration file servers each connected to the nodes at the base or to the recording devices at multiple bases networked to the nodes at the bases; or a file server group accessible from the nodes located at each of the bases belonging to each of the file management groups.

In the digital asset guard service provision system according to the present invention, each of the smart contracts for distribution and recording is preferably configured to have a function for performing processes 50-1 through 50-4.

(Process 50-1) Each of the smart contracts for distribution and recording confirms the data record capacity and usages of each of the sub-configuration file servers that is connected to the nodes at each of the bases belonging to each of the distributed file management groups and the recording devices at multiple bases networked to the nodes at the bases.

(Process 50-2) Based on the data record capacity confirmed in the process 50-1, each of the smart contracts for distribution and recording selects a specified sub-configuration file server that has a data record capacity that can record encrypted and multi-divided large file data that is uploaded in the first temporary storage area.

(Process 50-3) Each of the smart contracts for distribution and recording records the encrypted and multi-divided large file data that is uploaded in the first temporary storage area into the specified sub-configuration file server selected in the process 50-2.

(Process 50-4) As second index information, each of the smart contracts for distribution and recording performs the process 50-3, and records, in the nodes at the nodes at each of the bases belonging to each of the distributed file management groups, the specified sub-configuration file server information in which the encrypted and multi-divided large file data that is uploaded in the first temporary storage area is recorded.

Further, in the digital asset guard service provision system of the present invention, each of the smart contracts for distribution and recording is preferably configured to have a function for performing processes 51-1 through 51-5, when the recorded amount of the large file data, that is encrypted, multi-divided and uploaded into the first temporary storage area and that is recorded in the predetermined sub-configuration file server connected to the nodes at each of the bases belonging to each of the distributed file management groups and the recording device at multiple bases networked to the nodes at the bases, exceeds the upper limit of the storage capacity of the file server.

(Process 51-1) Each of the smart contracts for distribution and recording calculates a remaining record capacity of each of other sub-configuration file servers connected to the nodes at each of the bases belonging to each of the distributed file management groups and to the recording devices at multiple bases networked to the nodes at the bases.

(Process 51-2) Each of the smart contracts for distribution and recording selects an optimal sub-configuration file server to be recorded based on the record capacity calculated in the process 51-1.

(Process 51-3) Each of the smart contracts for distribution and recording records a portion of file data exceeding the upper limit of the record capacity of the file server into the sub-configuration file server selected in the process 51-2.

(Process 51-4) Each of the smart contracts for distribution and recording performs the process 51-3, and changes the settings of the original file server to be inactive.

(Process 51-5) After performing the process 51-4, each of the smart contracts for distribution and recording records and updates information of the recorded sub-configuration file server into each of the nodes belonging to each of the distributed file management groups as the second index information.

Furthermore, in the digital asset guard service provision system of the present invention, the nodes located at each of the bases that belong to each of the distributed file management groups; and the recording devices located at multiple bases networked to the nodes at the bases, are preferably configured to be capable of adding each connecting sub-configuration file server or recording medium that connects to the sub-configuration file servers In the digital asset guard service provision system according to the present invention, the smart contract for extracting encrypted and divided file data is preferably configured to have a function for performing processes 53-1 through 53-4.

(Process 53-1) The smart contract for extracting encrypted and divided file data refers to the second index information recorded in the nodes at each of the bases belonging to each of the distributed file management groups.

(Process 53-2) The smart contract for extracting encrypted and divided file data detects multiple destination sub-configuration file servers of the encrypted and multi-divided large file data recorded as the second index information referenced in the process 53-1.

(Process 53-3) The smart contract for extracting encrypted and divided file data extracts the file data recorded in the sub-configuration file server from the multiple sub-configuration file servers detected in the process 53-2.

(Process 53-4) The smart contract for extracting encrypted and divided file data links the multiple file data extracted in the process 53-3 to restore the original encrypted and multi-divided large file data.

Further, the digital asset guard service provision system of the present invention further comprises:

a small amount file data temporary recording means;

a file data integration means; and a small amount file data deletion means, the small amount file data temporary recording means is configured to record in real time a small amount of file data to be saved in a predetermined confidential blockchain within the range of block capacity, the file data integration means is configured to perform the processes 54-1 and 54-2, and the small amount file data deletion means is preferably configured to perform the processes 54-3 and 54-4.

(Process 54-1) The file data integration means performs batch processes several times a day on each small amount of file data recorded in the predetermined confidential blockchain by the small amount file data temporary recording means to integrate into one integrated file data.

(Process 54-2) After performing the process 54-1, the file data integration means uses the integrated file data for a saving process in which the file data saving system divides and encrypts the file data and distributes and records the file data:

into the nodes located at each of the bases belonging to the management groups; and into the recording devices located at multiple bases networked to the nodes at the bases.

(Process 54-3) The small amount file data deletion means disconnects a chain of the block recording the corresponding small amount of file data in the predetermined confidential blockchain after the file data saving system completes the saving process for the integrated file data.

(Process 54-4) After performing the process 54-3, the small amount file data deletion means deletes the file data recorded in the block.

In the digital asset guard service provision system according to the present invention, the file data integration means is preferably configured to perform the processes 55-1 through 55-4.

(Process 55-1) The file data integration means integrates the small amount file data, each of which has been recorded in the predetermined confidential blockchain by the small amount file data temporary recording means, into a single integrated file data in a batch process several times a day.

(Process 55-2) The file data integration means transfers the integrated file data integrated in the process 55-1 to a smart contract having encryption and division algorithms accepted by the encryption and division algorithm selection reception means in the file data saving system.

(Process 55-3) The file data integration means controls the integrated file data transferred in the process 55-2 to perform a saving process, such as from the encryption and division of the file data, to distribution and recording of the file data into the nodes at each of the bases belonging to the distributed file management groups and to the recording devices located at multiple bases networked to the nodes at the bases.

Further, in the digital asset guard service provision system of the present invention, the small amount file data deletion means is preferably configured to perform the processes 56-1 through 56-3.

(Process 56-1) Among the file data recorded in the predetermined confidential blockchain by the small amount file data temporary recording means, the small amount file data deletion means sets a temporary safekeeping period of a predetermined number of days, for example, approximately seven days for the file data integrated into one file data integrated by the file data integration means and the file data saving system has completed the saving process for the integrated file data by the file data saving system.

(Process 56-2) The small amount file data deletion means disconnects the chain of the corresponding block among the predetermined confidential blockchain after the temporary safekeeping period set in the process 56-1 has elapsed.

(Process 56-3) The small amount file data deletion means deletes the file data recorded in the block whose chain was disconnected in the process 56-2.

In the digital asset guard service provision system according to the present invention, the file data saving system further comprises a means for checking a record amount within a period, the means for checking a record amount within a period is preferably configured to perform processes 57-1 and 57-2, when the file data to be saved desired by a customer, which is uploaded, distributed and recorded:

into the nodes at each of the bases belonging to the distributed file management groups; and into the recording devices at multiple bases connected to the nodes at the base; exceeds the maximum record amount of the file data within a predetermined period.

(Process 57-1) The means for checking a record amount within a period requests the customer to re-apply for a file data saving service contract.

(Process 57-2) When the customer does not perform the re-applying procedure in response to the request for re-applying for the file data saving service contract in the process 57-1, the means for checking a record amount within a period makes an error procedure.

In the digital asset guard service provision system according to the present invention, a node or recording device that is stopped and not connected to the Internet exists in any of the bases belonging to each of the distributed file management groups, the node or recording device is preferably configured to accept and record the encrypted and multi-divided file data recorded in the node or recording device in an active state at another base, when the node or recording device not operated at the base is restarted.

Further, the digital asset guard service provision system of the present invention further comprises a data destructive attack detection means and a means for automatically saving data upon attacking, the data destructive attack detection means is configured to perform the processes 59-1 and 59-2, and the means for automatically saving data upon attacking is preferably configured to perform the processes 59-3 and 59-4.

(Process 59-1) The data destructive attack detection means detects an attack against encrypted and multi-divided file data which is recorded in a node or recording device of any of the bases configuring the planet, or an existence of data destruction due to equipment failure, and the like.

(Process 59-2) The data destructive attack detection means determines that the file data is attacked when destructions of multiple file data managed in a certain time frame such as 30 minutes, 8 hours, or 24 hours is detected.

(Process 59-3) When the data destructive attack detection means detects an attack against the encrypted and multi-divided file data, the means for automatically saving data upon attacking:

stops the nodes at each of the base configuring the planet. and the recording devices located at multiple bases networked to the nodes at the bases; or forcibly disconnects the Internet connection route.

(Process 59-4) The means for automatically saving data upon attacking performs the process 59-3, and sets and automatically saves the encrypted and multi-divided file data that are distributed and recorded:

in a node at a base that is not attacked; or in the recording devices at multiple bases networked to the nodes at the bases, to the nodes at each of the bases configuring another planet in which the data destructive attack detection means has not detected an attack against the encrypted and multi-divided file data; and to the recording devices at multiple bases networked to the nodes at the bases.

The digital asset guard service provision system of the present invention further comprises a communication switching control means, the communication switching control means is preferably configured to maintain:

the nodes in the inactive state; and the inactive state in which the recording devices at multiple bases networked to the nodes disconnect the internet connection;

and switch to a connection with a communication means such as an LTE other than the Internet when the data destructive attack detection means detects an attack against the encrypted and multi-divided file data.

In the digital asset guard service provision system according to the present invention, the means for automatically saving data upon attacking is preferably configured to automatically save the encrypted and multi-divided file data distributed and recorded:

in the nodes at the bases that have not been attacked and that form the planet; and in the recording devices at the multiple bases networked to the nodes at the bases;

into the nodes at each of the bases configuring another planet in which encrypted and multi-divided file data is not attacked; and into the recording devices located at multiple bases networked to the nodes at the bases, when the data destructive attack detection means detects an attack against the encrypted and multi-divided file data via a communication means other than the Internet such as an LTE.

In the digital asset guard service provision system according to the present invention, file data configuring information comprising digital assets to be guarded and some high-valued information is preferably tokens, customer information of existing business systems, asset information, source codes and modules, confidential information, design documents, parameters for settings, digital contracts, rights, designs, and other data that may be expressed digitally in general.

Further, in the digital asset guard service provision system of the present invention, the data saving service contract application procedure reception means is preferably configured to further accept the following designated items 63-1 through 63-3 from the customer, when accepting the data saving service contract application procedure.

(Designated item 63-1) Guarantee level of file data desired to be saved.

(Designated item 63-2) The nodes located at each of the bases configuring each of the planets.

(Designated item 63-3) The file data saving and restoration system configuration level for operating the recording devices located at multiple bases networked to the nodes at the bases, the file data saving system and the file data restoration system.

In the digital asset guard service provision system according to the present invention, the nodes located at each of the bases configuring each of the distributed file management groups and the recording devices located at multiple bases networked to the nodes at the bases are preferably configured to have different operating hours, have mixtures of operating and inactive states, and perform processes 64-1 and 64-2.

(Process 64-1) In the nodes located at each of the bases configuring each of the distributed file management groups and the recording devices located at multiple bases networked to the nodes at the bases, the nodes at all bases and the recording devices located at multiple bases networked to the nodes located at the bases operate in 24 hours a day.

(Process 64-2) At least any one of the nodes located at each of the bases configuring each of the distributed file management groups or at least any one of the recording devices located at multiple bases networked to the nodes at the bases operates, at a predetermined point of time, among the nodes at all bases configuring each of the distributed file management groups and the recording devices of all bases networked to the nodes at the bases.

In the digital asset guard service provision system according to the present invention, the nodes at each of the bases configuring each of the distributed file management groups and the recording devices located at multiple bases networked to the nodes at the bases is preferably configured to perform the following processes 65-1 through 65-3.

(Process 65-1) The nodes located at each of the bases configuring each of the distributed file management groups and the recording devices located at multiple bases networked to the nodes at the bases operate only during nighttime hours by using night time power during nighttime hours.

(Process 65-2) In the nodes located at each of the bases configuring each of the distributed file management groups and the recording devices located at multiple bases networked to the nodes at the bases, the nodes of at least one of the bases or the recording devices of at least one of the bases networked to the nodes at the bases operate at a predetermined point of time, in each of the distributed file management groups.

(Process 65-3) When the nodes located at each of the bases configuring each of the distributed file management groups and the recording devices located at multiple bases networked to the nodes at the bases are switched from the inactive state to the operating state, the nodes at the bases or the recording devices at the bases networked to the nodes at the bases automatically updates the information such as safekept file data and the like to the latest information within each of the distributed file management groups.

In addition, in the digital asset guard service provision system of the present invention, the nodes located at each of the bases and the recording devices located at multiple bases networked to the nodes at the bases preferably comprise a container or a housing having solar or other renewable energy generation equipment, a file server and CPU, 5G communications equipment and a battery.

In the digital asset guard service provision system according to the present invention, the nodes located at each of the bases and the recording devices located at multiple bases networked to the nodes at the bases preferably comprise a container or a housing having a file server and CPU, 5G communications equipment and a battery that can withstand short-term operation, a cooling device and the like.

The digital asset guard service provision system according to the present invention is preferably configured to perform the processes 68-1 and 68-2.

(Process 68-1) The digital asset guard service provision system offsets the file data record capacity provided in the nodes held by the node holders participating in the consortium-type blockchain with the file data record amount used by the node holders. and calculates the difference between the total file data record amount and the provided file data record capacity.

(Process 68-2) The digital asset guard service provision system collects and allocates the money amount based on the difference calculated in the process 68-1 for each node holder.

The digital asset guard service provision system according to the present invention further comprises customer registration information designation reception means and a smart contract for customer registration, the customer registration information designation reception means is configured to accept a customer ID, designations of terminal information (fixed IP addresses and the like) used for saving and restoring the file data from a customer who desires to save the file data, the smart contract for customer registration is preferably configured to have a function for encrypting and recording the customer ID, the terminal information and the fixed IP address used for saving and restoring the file data accepted by the customer registration information designation reception means in the node groups located at the specified bases in the consortium-type blockchain.

Furthermore, the digital asset guard service provision system of the present invention further comprises a first parameter designation reception and recording means, the first parameter designation reception and recording means is preferably configured to accept a designation of the first parameter from a customer who desires to save the file data, and record the first parameter for which the designation is accepted in an offline recording medium.

The digital asset guard service provision system according to the present invention further comprises a second parameter designation reception and setting means, wherein the second parameter designation reception and setting means is preferably configured to accept a designation of the second parameter from the co-administrator of the consortium-type blockchain, and, set the specified second parameter to a source code of the predetermined smart contract for performing the corresponding process and modularize.

In the digital asset guard service provision system according to the present invention, the Index information generation means, the index information recording means, the encrypted index information extraction means, and the index information decryption means are separately configured on the customer-side and on the co-administrator side of the consortium-type blockchain, wherein the index information generation means comprises: a program, wallet function, or smart contract for generating customer-side index information operating on the customer side who desires to save the file data; and a smart contract for generating co-administrator side index information that operates on the co-administrator side of the consortium-type blockchain;

wherein the program or smart contract for generating customer side index information is configured to have a function for generating customer-side index information, wherein the customer side index information comprises:

an original file name, information on an upload date, and a safekept deadline of the file data to be saved when uploaded into the first temporary storage area using the upload means, wherein the smart contract for generating the co-administrator side index information is configured to have a function for generating co-administrator side index information, wherein the co-administrator side index information comprises:

file name information after renaming of each file data distributed and recorded by each of the smart contracts for distribution and recording; and encrypted corresponding recording destination information, wherein the index information recording means comprises:

a program or smart contract for recording customer-side index information being operated on the customer side that desires to save the file data; and a smart contract for recording co-administrator side index information that operates on the co-administrator side of the consortium-type blockchain;

wherein the program or smart contract for recording customer-side index information is configured to have a function for encrypting and recording the customer-side index information generated by the program or smart contract for generating customer side index information into node groups located at the specified bases in the consortium-type blockchain, when authentication is provided using the first secret key for blockchain access generated based on the first secret key, that is the first offline decryption key generated by the customer, wherein the smart contract for recording co-administrator side index information is configured to have a function for encrypting and recording the co-administrator side index information generated by the smart contract for generating the co-administrator side index information into node groups located at the specified bases in the consortium-type blockchain, when authentication is provided using a second secret key for accessing the blockchain generated based on the second secret key, that is the second offline decryption key generated by the co-administrator of the consortium-type blockchain, wherein the smart contract for recording co-administrator side index information is configured to have a function for encrypting and recording, the co-administrator side index information generated by the co-administrator of the consortium-type blockchain, into the node groups located at the specified bases in the consortium-type blockchain, when authentication is provided using the second secret key for accessing the blockchain generated based on the second secret key, that is, the second decryption key generated by the co-administrator of the consortium-type blockchain, wherein the encrypted index information extraction means comprises:

a smart contract for extracting customer-side encrypted index information that operates on the customer side who desires to restore the file data; and a smart contract for extracting encrypted co-administrator side index information that operates on the co-administrator side of the consortium-type blockchain, wherein the smart contract for extracting customer-side encrypted index information is configured to have a function for extracting the customer side encrypted index information recorded in node groups located at the specified bases in the consortium-type blockchain by the smart contract for recording the customer-side encrypted index information based on the first parameter and the second parameter associated with the file data to be extracted accepted by the file data extraction instruction reception means, when authentication is provided using the first secret key for blockchain access generated based on the first secret key and the first decryption key generated by the customer, wherein the smart contract for extracting encrypted co-administrator side index information is configured to have a function for extracting and recording, the encrypted co-administrator-side index information recorded, in node groups located at the specified bases in the consortium-type blockchain, by the smart contract for recording encrypted co-administrator side index information, based on the first parameter and the second parameter associated with the file data to be saved accepted by the file data extraction instruction reception means, when authentication is provided using the second secret key for accessing the blockchain generated based on the second secret key, that is, the second decryption key generated by the co-administrator of the consortium-type blockchain.

wherein the index information decryption means comprises:

a smart contract for decrypting customer side index information that operates on the customer side who desires to restore the file data; and a smart contract for decrypting co-administrator side index information that operates on the co-administrator side of the consortium-type blockchain, wherein the smart contract for decrypting the customer-side index information is configured to have a function for decrypting the customer side encrypted index information extracted by the smart contract for extracting customer-side encrypted index information based on the first secret key, that is the first offline decryption key generated by the customer, and wherein the smart contract for decrypting the co-administrator side index information is preferably configured to have a function for decrypting the encrypted co-administrator-side index information extracted by the smart contract for extracting the co-administrator side encrypted index information based on the second secret key, that is, the second decryption key generated by the co-administrator of the consortium-type blockchain.

Furthermore, in the digital asset guard service provision system of the present invention, in which the following information 73-1 through 73-3 is preferably configured to be recorded respectively in an encrypted state in the node groups located at the specified bases in the consortium-type blockchain.

(Information 73-1) As customer setting information, information of an IP address, user ID, the first parameter, and the co-administrator smart contract address that can refer to the customer setting information.

(Information 73-2) As customer's index information, setting information of the file name and the file data capacity when the file data is saved, of the process date and time and safekeeping deadline, and of the smart contract that operates on the co-administrator side for saving the customer file data.

(Information 73-3) As co-administrator side index information, renamed file name information of each file data distributed and recorded by each of the smart contracts for distribution and recording.

In the digital asset guard service provision system according to the present invention, wherein the recording devices at multiple bases networked to the nodes at each of the bases are preferably configured with the nodes configuring the same blockchain network as the node at the base, or that are preferably configured with devices that can connect to the nodes in an accessible manner that do not belong to the blockchain network configured with the nodes at the bases.

In the digital asset guard service provision system according to the present invention, wherein the recording devices located at multiple bases networked to the nodes located at each of the bases are configured with devices configuring another network different from the node at the bases.

In the digital asset guard service provision system according to the present invention, wherein the second parameter specified by the co-administrator of the consortium-type blockchain is preferably internally hard-coded in each of the smart contracts for allotting distributed file management groups and in each of the smart contracts for extracting encrypted and divided file data.

In the digital asset guard service provision system according to the present invention, wherein the consortium-type blockchain is preferably configured to comprise a private type blockchain.

In the digital asset guard service provision system according to the present invention, wherein the private type blockchain is preferably configured to comprise a planet comprising node groups in which multiple virtual nodes are combined at one base.

Further, in the digital asset guard service provision system according to the present invention, the co-administrator side file data saving system comprises the smart contract for saving co-administrator side file data, wherein the smart contract for saving co-administrator side file data is configured such that each of the functions of:

the smart contract for allotting distributed file management groups;

the smart contract for distribution and recording;

the smart contract for generating server index information; and the smart contract for recording server index information; are incorporated, wherein the co-administrator side file data restoration system comprises a smart contract for restoring co-administrator side file data, and wherein the smart contract for restoring the co-administrator side file data is preferably configured such that each of the functions of:

the smart contract for extracting encrypted server index information;

the smart contract for decrypting server index information; and the smart contract for extracting encrypted and divided file data; are incorporated, In the digital asset guard service provision system according to the present invention, the smart contract for saving co-administrator side file data is preferably configured such that the second parameter specified by a co-administrator of the consortium-type blockchain is internally hard-coded.

In the digital asset guard service provision system according to the present invention, the smart contract for restoring the co-administrator side file data is configured such that the second parameter or a second compound parameter specified by a co-administrator of the consortium-type blockchain is internally hard-coded, and wherein the second compound parameter is preferably configured to form the pair of the second decryption parameter (that is incorporated and modularized within the predetermined smart contract that performs the corresponding process) specified by the co-administrator and managed offline; and the second encryption parameter (that is incorporated and modularized within the predetermined smart contract that performs the corresponding process) that is automatically generated from the decryption parameter.

In addition, in the digital asset guard service provision system of the present invention, the smart contract for saving co-administrator side file data is preferably configured to have a function for performing processes 82-1 through and 82-3, and processes 82-4 through and 82-6.

(Process 82-1) The smart contract for saving co-administrator side file data generates a key for renaming and encryption using:

the first parameter specified by a customer who desires to save the file data; and the internally hard-coded second parameter.

(Process 82-2) The smart contract for saving co-administrator side file data changes and encrypts (encrypted and multi-divided by the file data encryption and division means) file names of each file data uploaded into the first temporary storage area by the upload means using the renaming and encryption key.

(Process 82-3) After performing the process 82-2, the smart contract for saving co-administrator side file data allots the file data to the multiple distributed file management groups.

(Process 82-4) The smart contract for saving co-administrator side file data changes to a file name further different from the renamed file name and generates new server index information, based on the internally hard-coded second parameter for (?) the renamed file name information and the address information of the safekeeping destinations of the nodes and the recording devices, before the smart contract for saving co-administrator side file data generates server index information (which comprises file name information after renaming of each of the distributed and recorded file data, and address information of the nodes and the recording devices where file data is safekept in each of the distributed file management groups), encrypts and records in node groups located at specified bases in the consortium-type blockchain.

(Process 82-5) The smart contract for saving co-administrator side file data encrypts the new server index information generated in the process 82-4 and records in node groups at specified bases in the consortium-type blockchain.

(Process 82-6) After performing the process 82-5, the smart contract for saving co-administrator side file data deletes:

renamed file name information of each distributed and recorded original file data; and renames the file data after the original distributed recording of each file data is renamed, address information of the nodes and the recording devices in which the file data is safekept in each of the distributed file management groups to which each file data is allotted.

In the digital asset guard service provision system according to the present invention, the smart contract for saving co-administrator side file data is preferably configured to further have a function for performing processes 83-1 through 83-4.

(Process 83-1) The smart contract for saving co-administrator side file data changes the renamed file name to a file name that is further different from the renamed file name, based on the internally hard-coded second parameter.

(Process 83-2) The smart contract for saving co-administrator side file data further adds dummy file information and generates new server index information:

to the file data information changed in the process 83-1; and to the address information of the safekeeping destinations of the nodes and the recording devices.

(Process 83-3) The smart contract for saving co-administrator side file data encrypts the new server index information generated in the process 83-2 and records in node groups at specified bases in the consortium-type blockchain.

(Process 83-4) After performing the process 83-3, the smart contract for saving co-administrator side file data deletes:

the renamed file data information of each of the distributed and recorded original file data; and the address information of the file data safekeeping destinations of the nodes and the recording devices in each of the distributed file management groups to which each file data is allotted.

In the digital asset guard service provision system according to the present invention, the smart contract for restoring the co-administrator side file data is preferably configured to have a function for performing processes 84-1 through 84-5.

(Process 84-1) The smart contract for restoring the co-administrator side file data generates keys for name restoration and decryption using:

the first parameter or first compound parameter specified by the customer; and the second parameter or second compound parameter internally hard-coded and specified by the co-administrator of the consortium-type blockchain.

The first compound parameter is configured with the pair of:

the first decryption parameter specified by the customer and managed offline; and the first encryption parameter automatically generated from the first decryption parameter, The second compound parameter is configured with the pair of:

the second decryption parameter (which is incorporated and modularized within the predetermined smart contract that performs the corresponding process) specified by the co-administrator and managed offline; and the second encryption parameter (which is incorporated and modularized within the predetermined smart contract that performs the corresponding process) automatically generated from the second decryption parameter, (Process 84-2) The smart contract for restoring the co-administrator side file data extracts the encrypted server index information (recorded in node groups located at specified bases in the consortium-type blockchain).

(Process 84-3) After performing the process 84-2, the smart contract for restoring the co-administrator side file data sets to the new server index information in which the renamed file name is changed to a name further different from the renamed file name based on the renamed second parameter or the renamed second compound parameter which are internally hard-coded.

(Process 84-4) After performing the process 84-3, the smart contract for restoring the co-administrator side file data sets the changed name back to the renamed file name information.

(Process 84-5) After performing the process 84-4, the smart contract for restoring the co-administrator side file data sets file name information back to the file name information before renaming of each distributed and recorded file data based on the name restoration and name decryption keys.

Further, in the digital asset guard service provision system of the present invention, the smart contract for restoring the co-administrator side file data is preferably configured to have a function for performing processes 85-1 through 85-6.

(Process 85-1) The smart contract for restoring the co-administrator side file data generates name restoration and name decryption keys using:

the first parameter or first compound parameter specified by a customer; and the second parameter or second compound parameter internally hard-coded and specified by the co-administrator of the consortium-type blockchain.

The first compound parameter is configured with a pair of:

a first decryption parameter specified by a customer and managed offline; and a first encryption parameter automatically generated from the first decryption parameter;

The second compound parameter is configured with a pair of:

the second decryption parameter specified by a co-administrator and managed offline (incorporated and modularized within a predetermined smart contract that performs the corresponding process); and the second encryption parameter that is automatically generated from the second decryption parameter (incorporated and modularized within the predetermined smart contract that performs the corresponding process).

(Process 85-2) The smart contract for restoring the co-administrator side file data extracts encrypted server index information (recorded in node groups located at specified bases in the consortium-type blockchain).

(Process 85-3) After performing the process 85-2, the smart contract for restoring the co-administrator side file data excludes dummy file information based on the second parameter or the second complex parameter hard-coded internally.

(Process 85-4) The smart contract for restoring the co-administrator side file data, after performing the process 85-3, sets server index information back to the new server index information in which the name is further different from the renamed file name.

(Process 85-5) After performing the process 85-4, the smart contract for restoring the co-administrator side file data sets the name processed in the process 85-4 back to the renamed file name information.

(Process 85-6) After performing the process 85-5, the smart contract for restoring the co-administrator side file data places back the file name information before renaming of each distributed and recorded file data based on the name restoration and decryption key.

The digital asset guard service provision system for guarding digital assets against high-level cyberattacks, comprising:

a decentralized ledger using a dispersed technique; and a server application for performing predetermined process using data managed by the decentralized ledger, the digital asset guard service provision system is characterized by comprising:

a consortium-type asynchronous decentralized ledger group configured with multiple planets (a planet is a unit configuring an asynchronous decentralized ledger group) comprising node groups that link the nodes located at multiple bases in different regions in the world;

the file data saving system; and the file data restoration system, wherein the nodes located at each of the bases are networked to the recording devices at multiple bases in the different regions in the world to form distributed file management groups, wherein the file data saving system comprises:

a program having multiple encryption and division algorithms;

encryption and division algorithm selection reception means;

a file data saving instruction reception means;

the file data encryption and division means;

the upload means;

distributed file management groups allotment means;

a distribution and recording means;

a system setting information generation and recording means;

a server index information generation means;

a server index information recording means;

a customer setting information generation means or a program having a wallet function for generating customer setting information;

a customer index information generation means or a program having a wallet function for generating customer index information;

a customer index information recording means; and the first data deletion means, wherein the file data restoration system comprises:

multiple programs having decryption and linkage algorithms;

the file data extraction instruction reception means;

an encrypted server index information extraction means;

a server index information decryption means;

a smart contract for extracting encrypted and divided file data means;

a download means;

the file data restoration means; and the second data deletion means;

wherein the program having the multiple encryption and division algorithms is configured to have the different file data encryption and division process method, wherein the encryption and division algorithm selection reception means is configured to accept a selection of a program having predetermined encryption and division algorithms based on the first parameter specified by a customer who desires to save file data, wherein the file data saving instruction reception means is configured to accept a file data saving instruction from a customer who desires to save file data, wherein the file data encryption and division means is configured to encrypt and multi-divide the customer file data to be saved, the customer file data being accepted by the file data saving instruction reception means, using the program having the encryption and division algorithms accepted by the encryption and division algorithm selection reception means, wherein the upload means is configured to upload each file data encrypted and multi-divided by the file data encryption and division means to a first temporary storage area, wherein the distributed file management group allotment means is configured to have a function for allotting each file data (which is encrypted and multi-divided by the file data encryption and division means) uploaded into the first temporary storage area by the upload means, to multiple distributed file management groups (which are configured with the nodes located at each of the bases configured for the planet set on the co-administrator side according to a condition specified by a customer, and configured with recording devices at multiple bases networked to the nodes at the bases) based on the first parameter and the second parameter specified by the co-administrator of the consortium-type asynchronous decentralized ledger group, wherein the distribution and recording means is configured to have a function for distributing and recording each of the file data allotted by the distributed file management group allotment means to the nodes located at each of the bases belonging to each of the corresponding distributed file management groups and to the recording devices located at multiple bases networked to the nodes at the bases, wherein the system setting information generation and recording means is configured to have a function for:

generating, encrypting the system setting information comprising, destination identifying information such as terminal information (fixed IP addresses and the like) for uploading the system setting information to the first temporary storage area using the upload means, numbers of the predetermined process means that performs a process corresponding to a recording destination of the customer file data, planet information to which a recording destination of file data belong, and file server group information and the like (in the nodes at predetermined bases and in the recording devices located at multiple bases networked to the nodes at the bases) configuring the distributed file management groups; and recording the system setting information into node groups located at specified bases in the consortium-type asynchronous decentralized ledger group, wherein the server index information generation means is configured to generate server index information comprising:

file name information of each file data distributed and recorded by each of the distribution and recording means; and configuration information of each of the distributed file management groups to which each file data is allotted, wherein the server index information recording means is configured to have a function for encrypting server index information generated by the server index information generation means and recording into the node groups located at the specified bases in the consortium-type asynchronous decentralized ledger group.

wherein the customer setting information generation means or the program having a wallet function for generating customer setting information is configured to generate customer configuration information having the first parameter setting information associated with the program having the encryption and division algorithms accepted by the encryption and division algorithm selection reception means, wherein the customer index information generation means or the program having a wallet function for generating customer index information is configured to have a function for generating customer index information having the original file name and upload date information of customer file data to be saved, wherein the customer index information recording means is configured to have a function for:

encrypting customer index information generated by the customer index information generation means or the program having a wallet function for generating customer index information; and recording into node groups located at specified bases in the consortium-type asynchronous decentralized ledger group, wherein the first data deletion means is configured to delete each file data uploaded into the first temporary storage area, after the server index information is encrypted and recorded in node groups located at specified bases in the consortium-type asynchronous decentralized ledger group by the server index information recording means, wherein the multiple programs having the decryption and linkage algorithms is associated with each of the programs having the encryption and division algorithms, and is configured to have a different file data decryption and linkage process method, wherein the file data extraction instruction reception means is configured to accept a file data extraction instruction from a customer who desires to restore the file data, wherein the encrypted server index information extracting means is configured to have a function for extracting encrypted server index information (that is recorded in node groups located at specified bases in the consortium-type asynchronous decentralized ledger group by the server index information recording means) based on:

the first parameter or first compound parameter associated with the file data to be extracted accepted by the file data extraction instruction reception means; and the second parameter or second compound parameter, wherein the first compound parameter is configured with a pair of a first decryption parameter specified by a customer and managed offline, and a first encryption parameter automatically generated from the first decryption parameter, wherein the second compound parameter is configured with a pair of:

the second decryption parameter that is specified by a co-administrator and is managed offline (and is incorporated and modularized in a predetermined process means that performs the corresponding process); and the second encryption parameter that is automatically generated from the second decryption parameter (which is incorporated and modularized in a predetermined process means performing the corresponding process), wherein the server index information decryption means is configured to have a function for decrypting the encrypted server index information extracted by the encrypted server index information extraction means, wherein, using the server index information decrypted by the server index information decryption means, the encrypted and multi-divided file data extracting means is configured to have a function for extracting each of the encrypted and multi-divided file data (that are allotted to each of the distributed file management groups by the distributed file management group allotment means, and distributed and recorded, into the nodes at each of the bases belonging to each of the distributed file management groups and into the recording devices located at multiple bases networked to the nodes at the bases by each of the distribution and recording means), from any of the nodes at each of the bases belonging to each of the distributed file management groups and the recording devices located at multiple bases networked to the nodes at the bases, wherein the download means is configured to download each of the encrypted and multi-divided file data extracted by the encrypted and multi-divided file data extracting means to the second temporary storage area, wherein the file data restoration means is configured to decrypt, each of the encrypted and multi-divided file data (that are extracted by the encrypted and multi-divided file data extracting means) that are downloaded into the second temporary storage area by the download means, link to one file data and restore the file data before being saved, using the program having the decryption and linkage algorithms that are associated with the program having the encryption and division algorithms accepted by the encryption and division algorithm selection reception means, wherein the second data deletion means is characterized to be configured to delete each of the encrypted and multi-divided file data download to the second temporary storage area after restored to the file data before being saved by the file data restoration means.

Advantageous Effects of Invention

According to the present invention, important information such as confidential information and personal information may be strongly and efficiently protected from high-level cyberattacks and physical destruction, and the digital asset guard service provision system may be obtained that can restore important information without being stolen by a third party, even if subjected to a quantum computer cryptanalysis or (ElectroMagnetic Pulse) EMP attacks.

BRIEF EXPLANATION OF DRAWINGS

FIG. 5 is an explanatory diagram schematically illustrating the configuration of encryption and division algorithm selection reception means in the digital asset guard service provision system of the present embodiment, and FIG. 5A is a diagram illustrating a portion thereof, and FIG. 5B is a diagram illustrating the other portion.

FIG. 7 is a diagram schematically illustrating the configuration of the file data encryption and division means in the digital asset guard service provision system of this embodiment, FIG. 7A illustrates a portion thereof, FIG. 7B illustrates another portion, and FIG. 7C is a figure illustrating another portion that is not shown in FIGS. 7A and 7B.

FIG. 11 is an explanatory diagram schematically illustrating the configuration of a file data integration means in the digital asset guard service provision system of this embodiment, and FIG. 11A is a diagram illustrating a portion thereof, and FIG. 11B is a diagram illustrating the other portion.

FIG. 12 is a diagram schematically illustrating the configuration of a small amount file data deletion means in the digital asset guard service provision system of this embodiment, FIG. 12A illustrates a portion thereof, FIG. 12B illustrates another portion, and FIG. 12C illustrates another portion that is not shown in FIGS. 12A and 12B.

FIG. 14 is a diagram schematically illustrating the configuration of a smart contract for allotting distributed file management groups in the digital asset guard service provision system of this embodiment, and FIG. 14A is a diagram illustrating a portion thereof, and FIG. 14B is a diagram illustrating other portions.

FIG. 15 is an explanatory diagram schematically illustrating the configuration of a still another portion of the smart contract for allotting distributed file management groups in the digital asset guard service provision system of the present embodiment.

FIG. 16 is an explanatory diagram schematically illustrating the configuration of a smart contract for distribution and recording in the digital asset guard service provision system of this embodiment, and FIG. 16A is a diagram illustrating a portion thereof, and FIG. 16B is a diagram illustrating other portions.

FIG. 17 is an explanatory diagram schematically illustrating the configuration of a still another portion of the smart contract for distribution and recording in the digital asset guard service provision system of the present embodiment.

FIG. 18 is an explanatory diagram schematically illustrating the configuration of a smart contract for generating server index information in the digital asset guard service provision system of this embodiment, and FIG. 18A is a diagram illustrating a portion thereof, and FIG. 18B is a diagram illustrating other portions.

FIG. 19 is an explanatory diagram schematically illustrating the configuration of a smart contract for recording server index information in the digital asset guard service provision system of this embodiment, and FIG. 19A is a diagram illustrating a portion thereof, and FIG. 19B is a diagram illustrating other portions.

FIG. 20 is an explanatory diagram schematically illustrating the configuration of the first data deletion means in the digital asset guard service provision system of the present embodiment.

FIG. 21 is an explanatory diagram schematically illustrating the configuration of a planet configuration pattern setting means in the digital asset guard service provision system of this embodiment, and FIG. 21A is a diagram illustrating a portion thereof, and FIG. 21B is a diagram illustrating the other portion.

FIG. 22 is an explanatory diagram schematically illustrating the configuration of another portion of the planet configuration pattern setting means in the digital asset guard service provision system of this embodiment, and FIG. 22A is a diagram illustrating a portion thereof, and FIG. 22B is a diagram illustrating other portions.

FIG. 23 is an explanatory diagram schematically illustrating the configuration of a still another portion of the planet configuration pattern setting means in the digital asset guard service provision system of the present embodiment.

FIG. 24 is an explanatory diagram schematically illustrating the configuration of another portion of the planet configuration pattern setting means in the digital asset guard service provision system of this embodiment, and FIG. 24A is a diagram illustrating a portion thereof, and FIG. 24B is a diagram illustrating other portions.

FIG. 25 is an explanatory diagram schematically illustrating the configuration of a Saved file data list information generation means in the digital asset guard service provision system of the present embodiment.

FIG. 26 is an explanatory diagram schematically illustrating the configuration of a save file data list information reference control means in the digital asset guard service provision system of the present embodiment.

FIG. 27 is an explanatory diagram schematically illustrating the configuration of a smart contract for setting safekeeping period in the digital asset guard service provision system of this embodiment, and FIG. 27A is a diagram illustrating a portion thereof, and FIG. 27B is a diagram illustrating other portions.

FIG. 28 is an explanatory diagram schematically illustrating the configuration of a smart contract for chain disconnection in the digital asset guard service provision system of the present embodiment.

FIG. 29 is an explanatory diagram schematically illustrating the configuration of a smart contract for block deletion in the digital asset guard service provision system of the present embodiment.

FIG. 30 is an explanatory diagram schematically illustrating the configuration of an unnecessary block data saving means in the digital asset guard service provision system of this embodiment, and FIG. 30A is a diagram illustrating a portion thereof, and FIG. 30B is a diagram illustrating other portions.

FIG. 31 is an explanatory diagram schematically illustrating the configuration of a data falsification check control means in the digital asset guard service provision system of the present embodiment.

FIG. 32 is an explanatory diagram schematically illustrating the configuration of a rollover smart contract in the digital asset guard service provision system of the present embodiment.

FIG. 33 is an explanatory diagram schematically illustrating the configuration of a period record amount checking means in the digital asset guard service provision system of the present embodiment.

FIG. 34 is an explanatory diagram schematically illustrating the configuration of a data saving service contract application procedure reception means in the digital asset guard service provision system of this embodiment, and FIG. 34A is a diagram illustrating a portion thereof, and FIG. 34B is a diagram illustrating other portions.

FIG. 35 is an explanatory diagram schematically illustrating the configuration of a smart contract for recording data saving service contract application reception information in the digital asset guard service provision system of this embodiment, and FIG. 35A is a diagram illustrating a portion thereof and FIG. 35B is a diagram illustrating other portions.

FIG. 36 is an explanatory diagram schematically illustrating the configuration of an upload processable IP address checking means in the digital asset guard service provision system of the present embodiment.

FIG. 39 is an explanatory diagram schematically illustrating the configuration of a program having multiple decryption and linkage algorithms in the digital asset guard service provision system of the present embodiment.

FIG. 40 is an explanatory diagram schematically illustrating the configuration of a download means in the digital asset guard service provision system of the present embodiment.

FIG. 41 is an explanatory diagram schematically illustrating the configuration of the file data restoration means in the digital asset guard service provision system of this embodiment, FIG. 41A illustrates a portion thereof, FIG. 41B illustrates another portion, and FIG. 41C illustrates anther portion not disclosed in FIGS. 41A and 41B FIG. 42 is an explanatory diagram schematically illustrating the configuration of a still another portion of the file data restoration means in the digital asset guard service provision system of the present embodiment.

FIG. 43 is an explanatory diagram schematically illustrating the configuration of second data deletion means in the digital asset guard service provision system of the present embodiment.

FIG. 45 is an explanatory diagram schematically illustrating the configuration of the file data extraction instruction reception means in the digital asset guard service provision system of the present embodiment.

FIG. 46 is an explanatory diagram schematically illustrating the configuration of a smart contract for extracting encrypted server index information in the digital asset guard service provision system of the present embodiment.

FIG. 47 is an explanatory diagram schematically illustrating the configuration of a smart contract for decrypting index information in the digital asset guard service provision system of this embodiment, and FIG. 47A is a diagram illustrating a portion thereof, and FIG. 47B is a diagram illustrating other portions.

FIG. 48 is a diagram schematically illustrating the configuration of a smart contract for extracting encrypted and multi-divided file data in the digital asset guard service provision system of this embodiment, and FIG. 48A is a diagram illustrating a portion thereof, and FIG. 48B is a diagram illustrating other portions.

FIG. 49 is an explanatory diagram illustrating the configuration of another portion of the smart contract for extracting encrypted and multi-divided file data in the digital asset guard service provision system of this embodiment, FIG. 49A is a diagram illustrating a portion thereof, and FIG. 49B is a diagram illustrating other portions.

FIG. 50 is an explanatory diagram schematically illustrating the configuration of a restoration process time frame etc. setting reception means in the digital asset guard service provision system of the present embodiment.

FIG. 51 is an explanatory diagram schematically illustrating the configuration of a file data restoration process operation control means in the digital asset guard service provision system of this embodiment, and FIG. 51A is a diagram illustrating a portion thereof, and FIG. 51B is a diagram illustrating other portions.

FIG. 52 is an explanatory diagram schematically illustrating the configuration of an authentication code setting reception means in the digital asset guard service provision system of the present embodiment.

FIG. 53 is an explanatory diagram schematically illustrating the configuration of a data destructive attack detection means in the digital asset guard service provision system of the present embodiment.

FIG. 54 is an explanatory diagram schematically illustrating the configuration of the means for automatically saving data upon attacking in the digital asset guard service provision system of this embodiment, and FIG. 54A is a diagram illustrating a portion thereof, and FIG. 54B is a diagram illustrating other portions.

FIG. 55 is an explanatory diagram schematically illustrating the configuration of a communication switching control means in the digital asset guard service provision system of the present embodiment.

FIG. 56 is an explanatory diagram schematically illustrating the configuration of a customer registration information designation reception means in the digital asset guard service provision system of the present embodiment.

FIG. 57 is an explanatory diagram schematically illustrating the configuration of a smart contract for customer registration in the digital asset guard service provision system of the present embodiment.

FIG. 59 is an explanatory diagram schematically illustrating the configuration of a second parameter designation reception and setting means in the digital asset guard service provision system of the present embodiment.

FIG. 64 is an explanatory diagram schematically illustrating the configuration of a smart contract for generating and recording the system setting information in the digital asset guard service provision system of the present embodiment.

FIG. 65 is an explanatory diagram schematically illustrating the configuration of a smart contract or a program having a wallet function for generating customer setting information in the digital asset guard service provision system of the present embodiment.

FIG. 66 is an explanatory diagram schematically illustrating the configuration of a smart contract or a program having a wallet function for generating customer index information in the digital asset guard service provision system of the present embodiment.

FIG. 67 is an explanatory diagram schematically illustrating the configuration of a smart contract for recording customer index information in the digital asset guard service provision system of the present embodiment.

FIG. 69 is an explanatory diagram schematically illustrating the configuration of a smart contract for generating co-administrator side index information in the digital asset guard service provision system of the present embodiment.

FIG. 70 is an explanatory diagram schematically illustrating the configuration of a smart contract for recording customer-side index information in the digital asset guard service provision system of the present embodiment.

FIG. 71 is an explanatory diagram schematically illustrating the configuration of a smart contract for recording co-administrator side index information in the digital asset guard service provision system of the present embodiment.

FIG. 72 is an explanatory diagram schematically illustrating the configuration of a smart contract for extracting customer-side encrypted index information in the digital asset guard service provision system of the present embodiment.

FIG. 73 is an explanatory diagram schematically illustrating the configuration of a smart contract for extracting encrypted co-administrator side index information in the digital asset guard service provision system of the present embodiment.

FIG. 74 is an explanatory diagram schematically illustrating the configuration of a smart contract for decrypting customer-side index information in the digital asset guard service provision system of the present embodiment.

FIG. 75 is an explanatory diagram schematically illustrating the configuration of a smart contract for decrypting co-administrator side index information in the digital asset guard service provision system of the present embodiment.

FIG. 78 is an explanatory diagram of a secret sharing technique used in the digital asset guard service provision system of this embodiment.

secret sharing in the customer and/or user side system, that is, in the customer side file data saving system; and a blockchain technology in the consortium side system, that is, the co-administrator side file data saving system, according to the digital asset guard service provision system of this embodiment.

Figure 80:
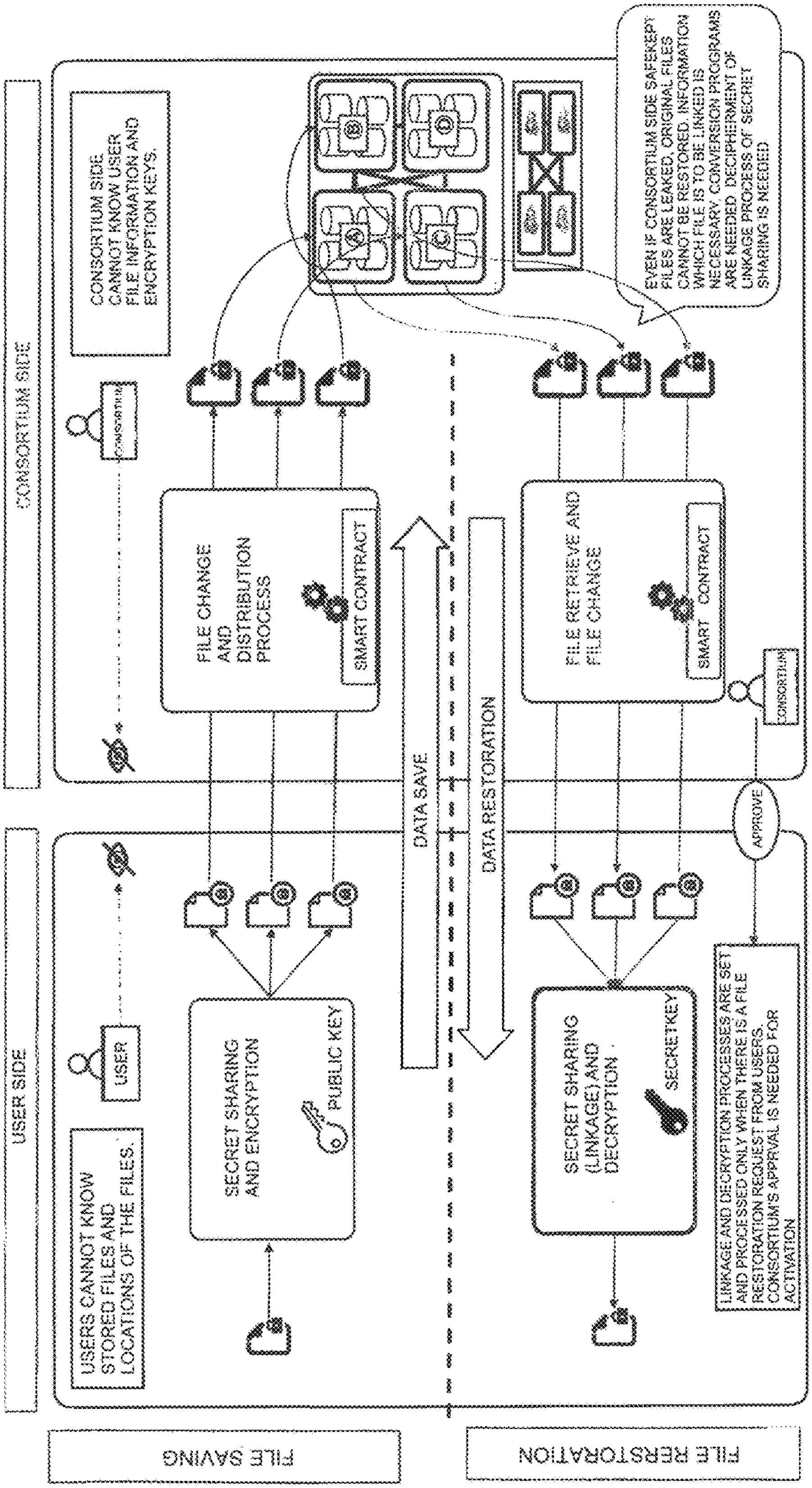

FIG. 80 is an explanatory diagram schematically illustrating the outline of the process performed by the customer and/or user side system and the consortium side system for saving file data and restoring file data, respectively, in the digital asset guard service provision system of the present embodiment.

Figure 81:
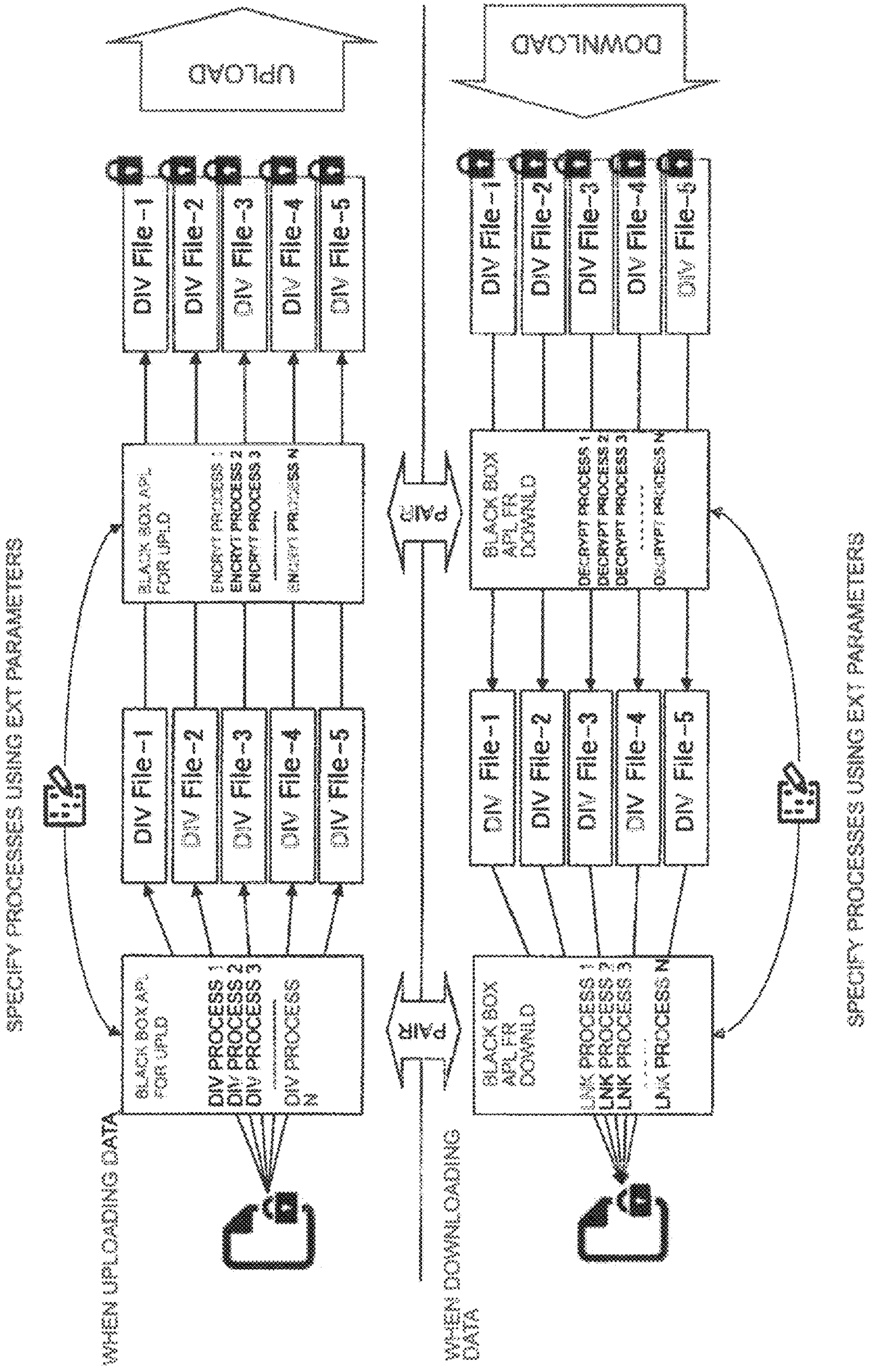

FIG. 81 schematically illustrates the process by the black-boxed program in each of the applications of data saving and file data restoration in the digital asset guard service provision system of this embodiment.

FIG. 82 is an explanatory diagram schematically illustrating a configuration of the smart contract for saving co-administrator side file data in the digital asset guard service provision system according to a modification of the present embodiment, FIG. 82A illustrates a portion thereof, and FIG. 82B is other portions.

FIG. 83 is an explanatory diagram schematically illustrating a configuration of still another portion of the smart contract for saving co-administrator side file data in the digital asset guard service provision system according to a modification of the present embodiment.

FIG. 84 is an explanatory diagram schematically illustrating a portion of the configuration of a smart contract for restoring the co-administrator side file data in the digital asset guard service provision system according to a modification of the present embodiment.

FIG. 85 is an explanatory diagram schematically illustrating a configuration of other portions of the smart contract for restoring the co-administrator side file data in the digital asset guard service provision system according to a modification of the present embodiment.

Figure 86:
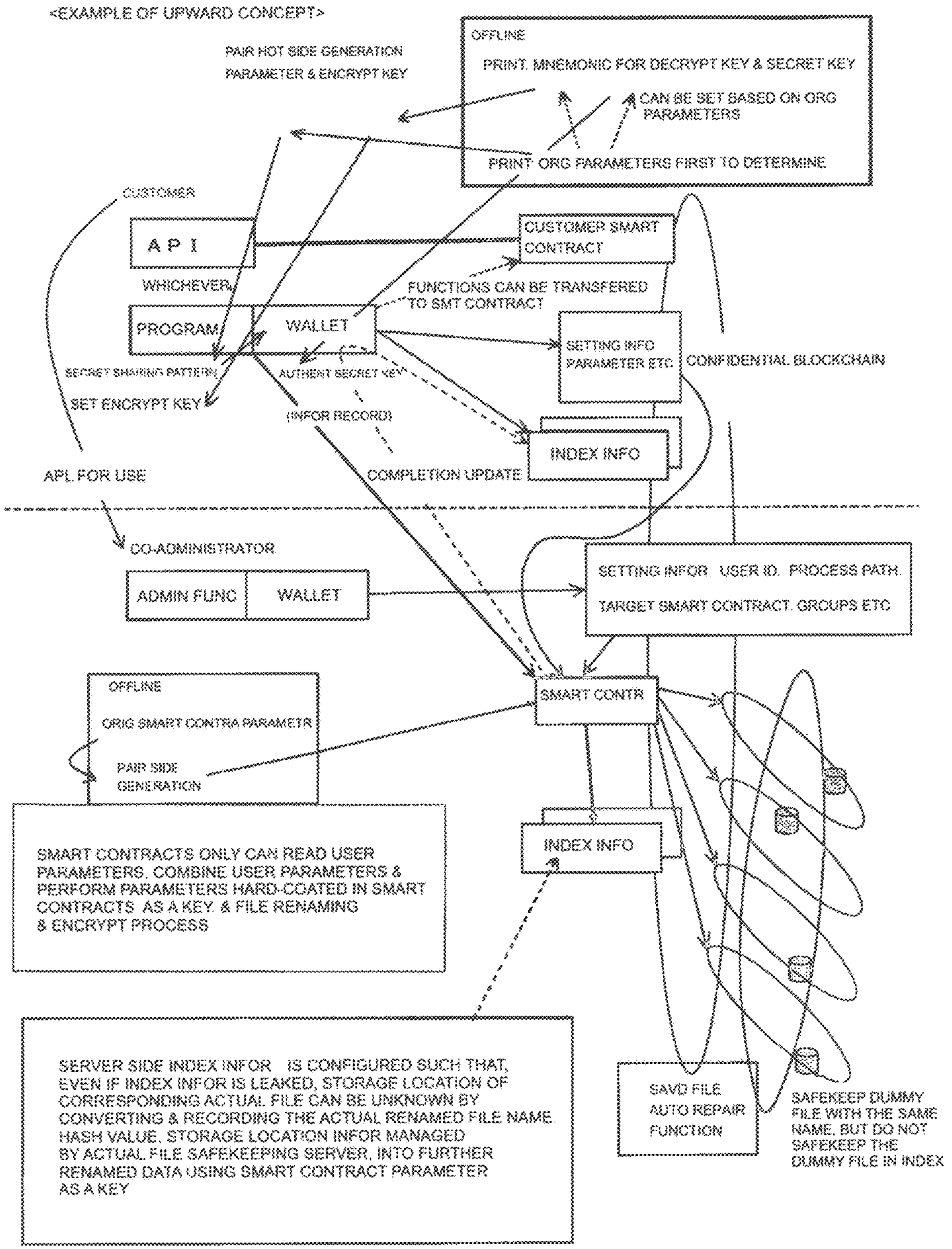

FIG. 86 is an explanatory diagram conceptually illustrating a basic process configuration of file data saving process in the digital asset guard service provision system of the present embodiment.

Figure 87:
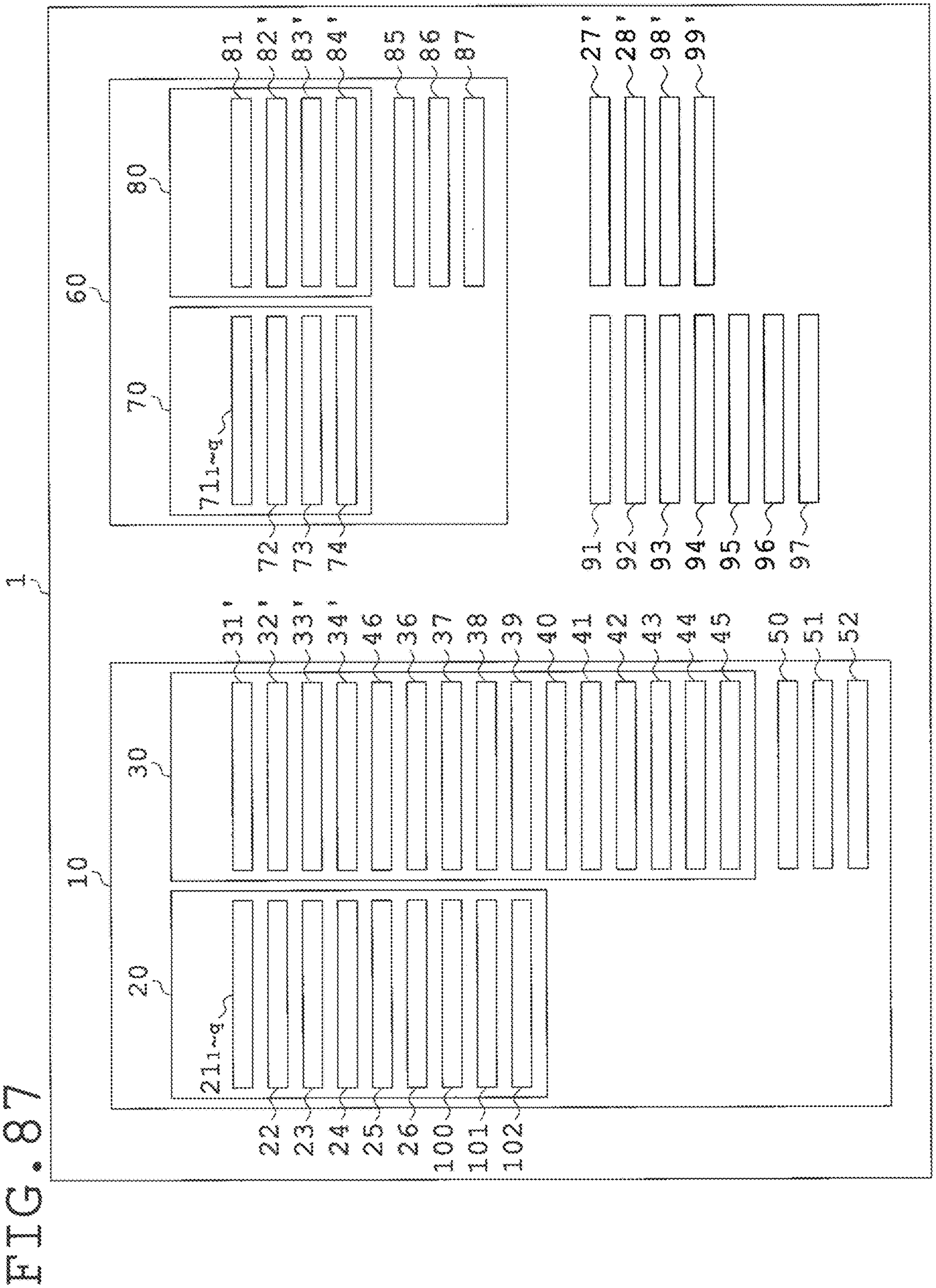

FIG. 87 is an explanatory diagram schematically illustrating an overall configuration of software included in the digital asset guard service provision system according to another modification of the present embodiment.

Figure 88:
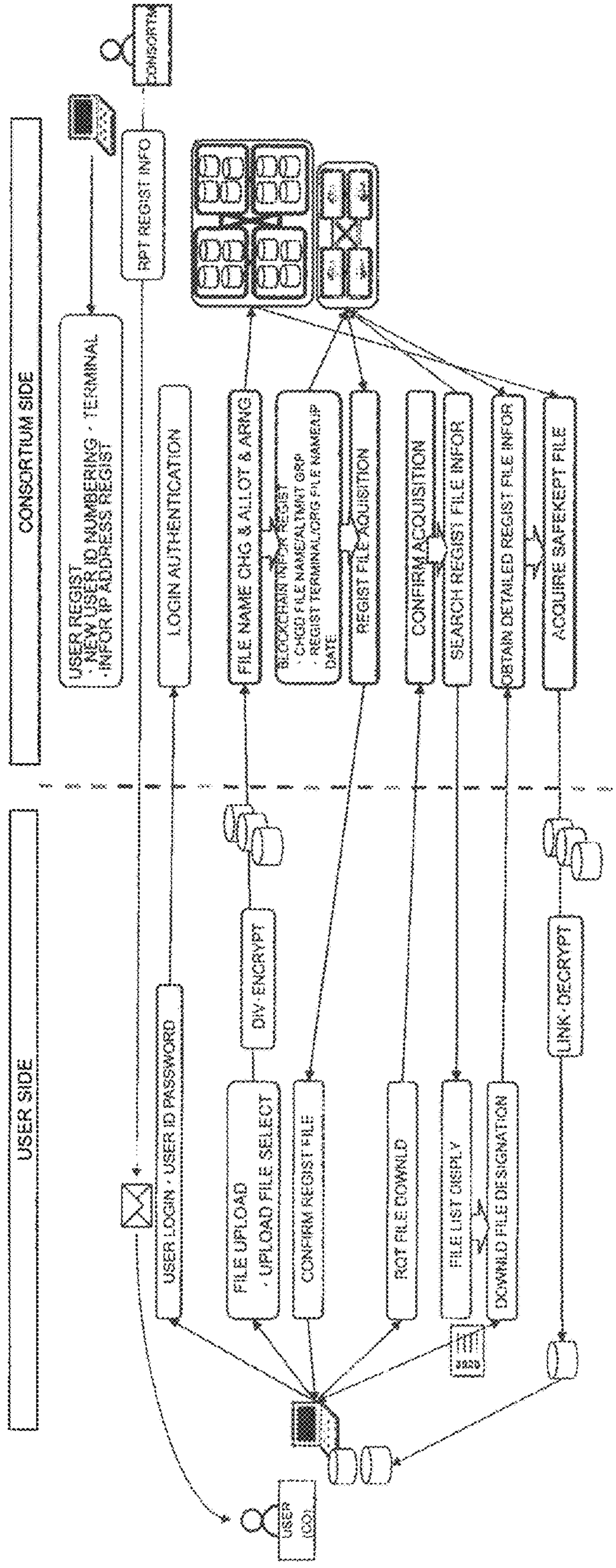

FIG. 88 is an explanatory diagram schematically illustrating an example of the overall process flow using the digital asset guard service provision system of the present embodiment from the management viewpoint of customer and/or user authentication/authorization management and distributed record file data.

Figure 89:
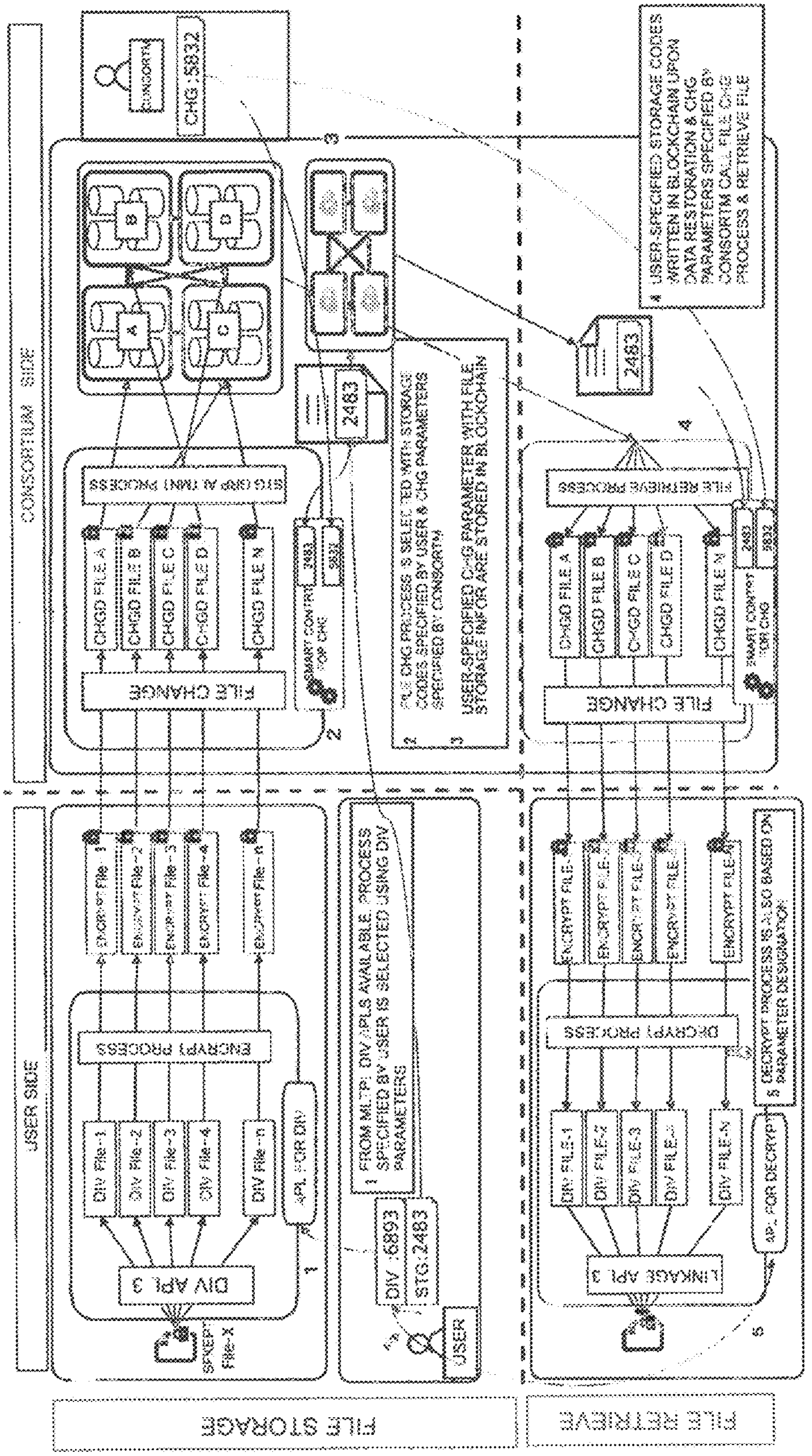

FIG. 89 is an explanatory diagram schematically illustrating an example of the overall process flow using the digital asset guard service provision system of the present embodiment from a perspective of securing confidentiality by combining multiple parameters.

Figure 90:
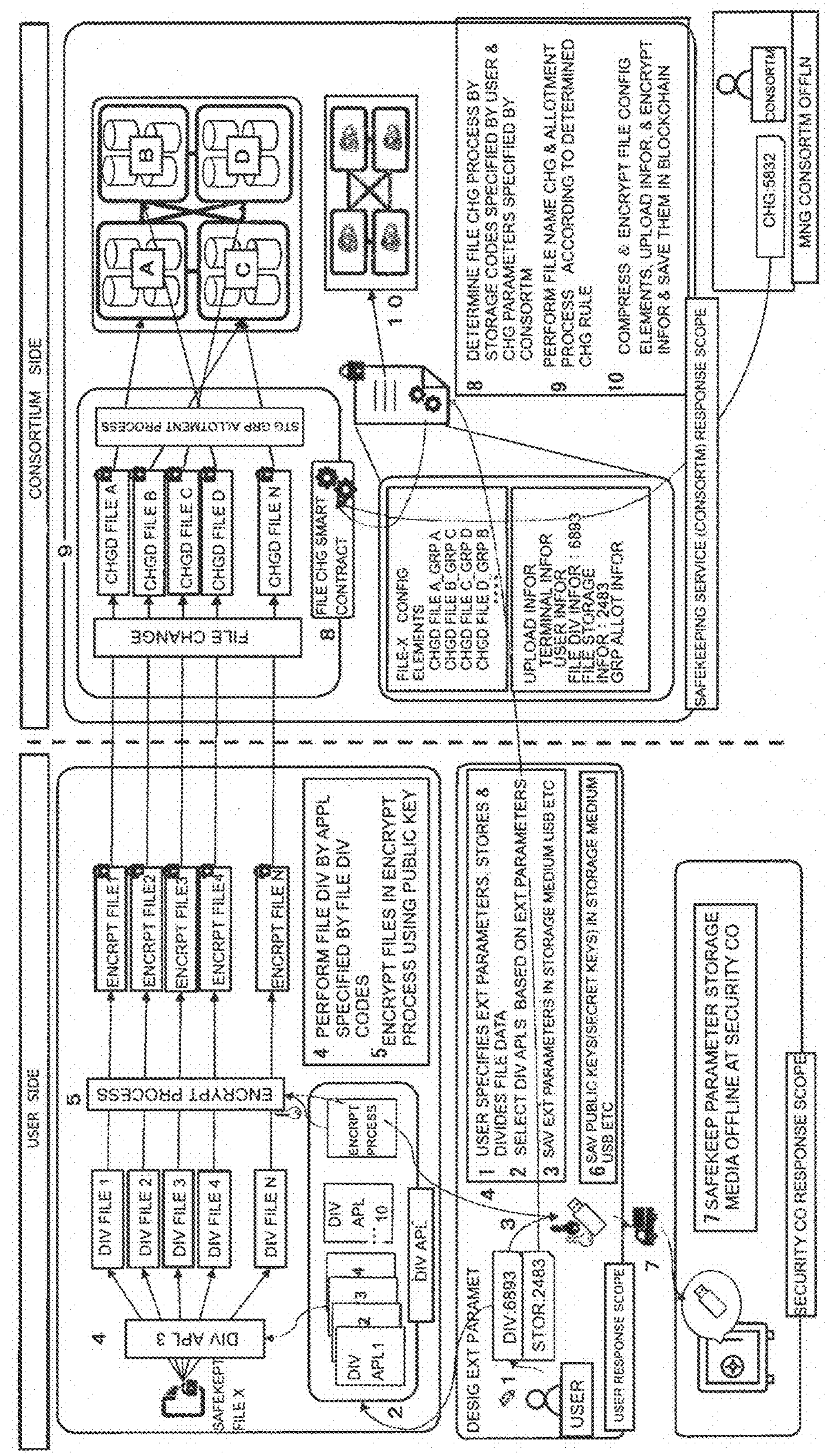

FIG. 90 is an example of a flow of file data saving process using the digital asset guard service provision system of this embodiment, and is schematically illustrated from the perspective of securing confidentiality of file data by combining multiple parameters.

Figure 91:
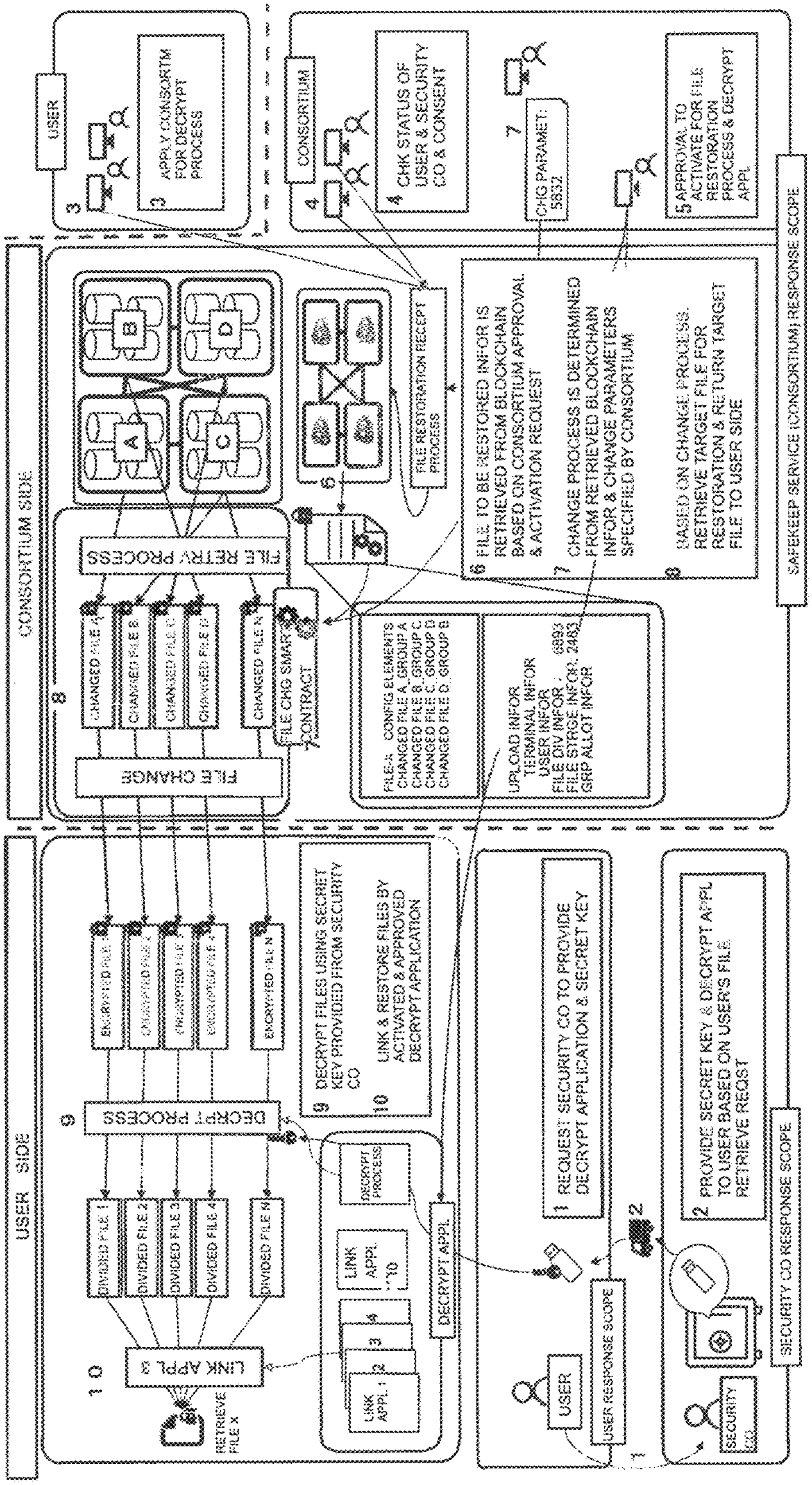

FIG. 91 is an example of a flow of file data restoration process using the digital asset guard service provision system of this embodiment, and is schematically illustrated from the perspective of securing confidentiality of file data by combining multiple parameters.

Figure 92A:
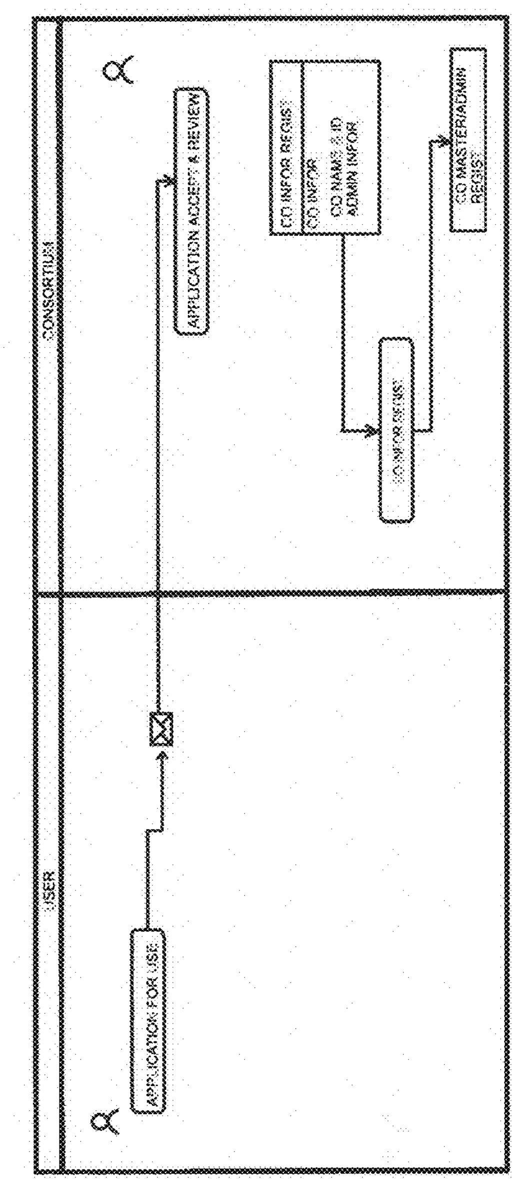
Figure 92B:
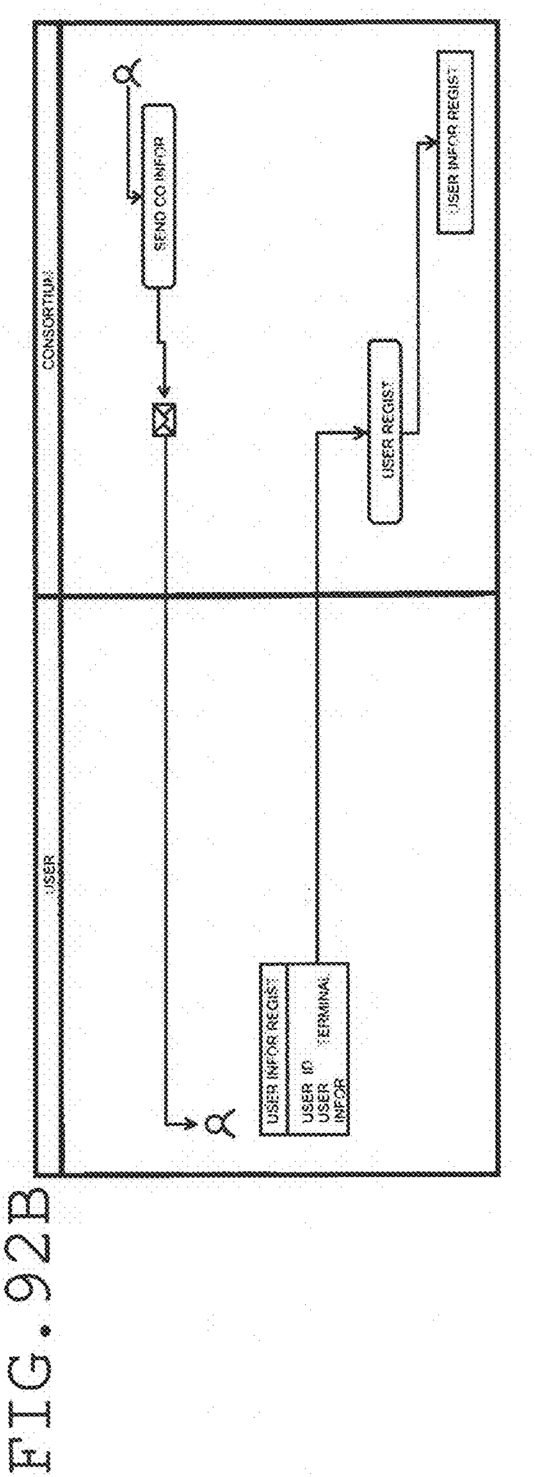

FIG. 92 is a flowchart illustrating a flow of pre-registration process in another example using the digital asset guard service provision system of this embodiment, FIG. 92A is a flowchart illustrating a portion thereof, and FIG. 92B is a flowchart illustrating the other portion.

Figure 93A:
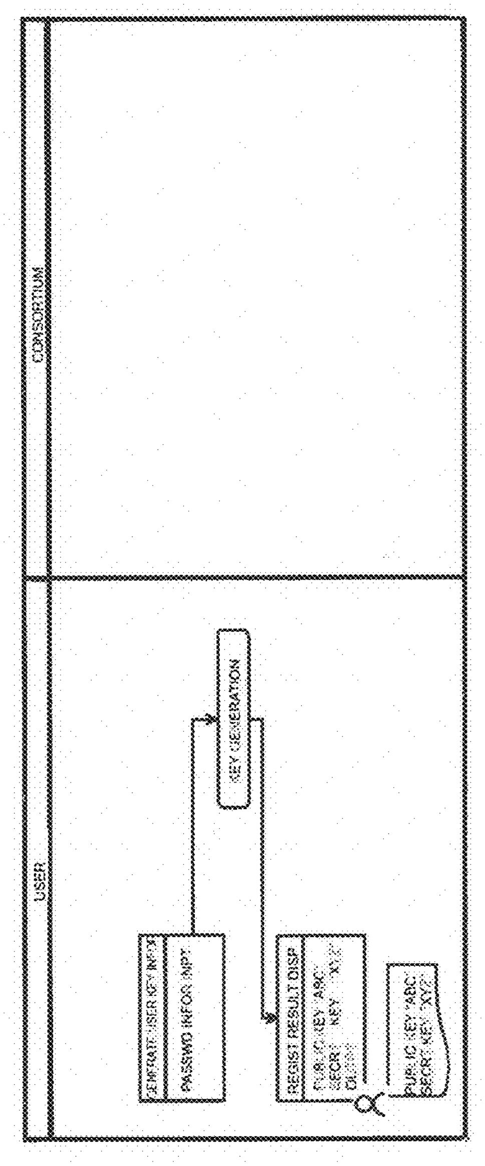
Figure 93B:
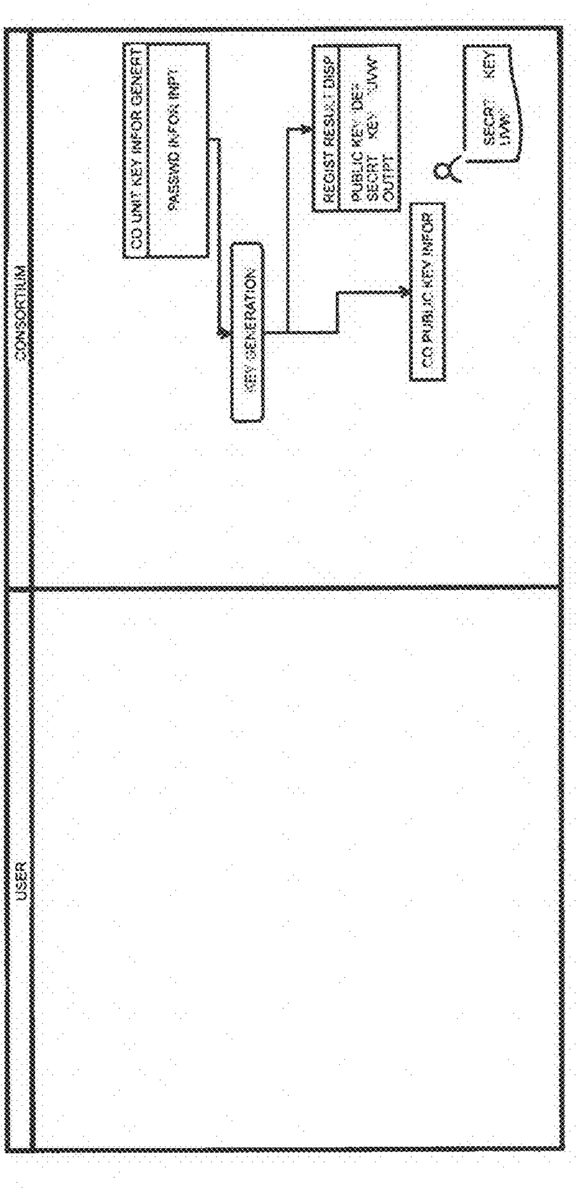

FIG. 93 is another flowchart illustrating a flow of other portions of the pre-registration process continued from FIG. 92 in the example using the digital asset guard service provision system of this embodiment, FIG. 93A illustrates a portion thereof, and FIG. 93B is the other portion.

Figure 94:
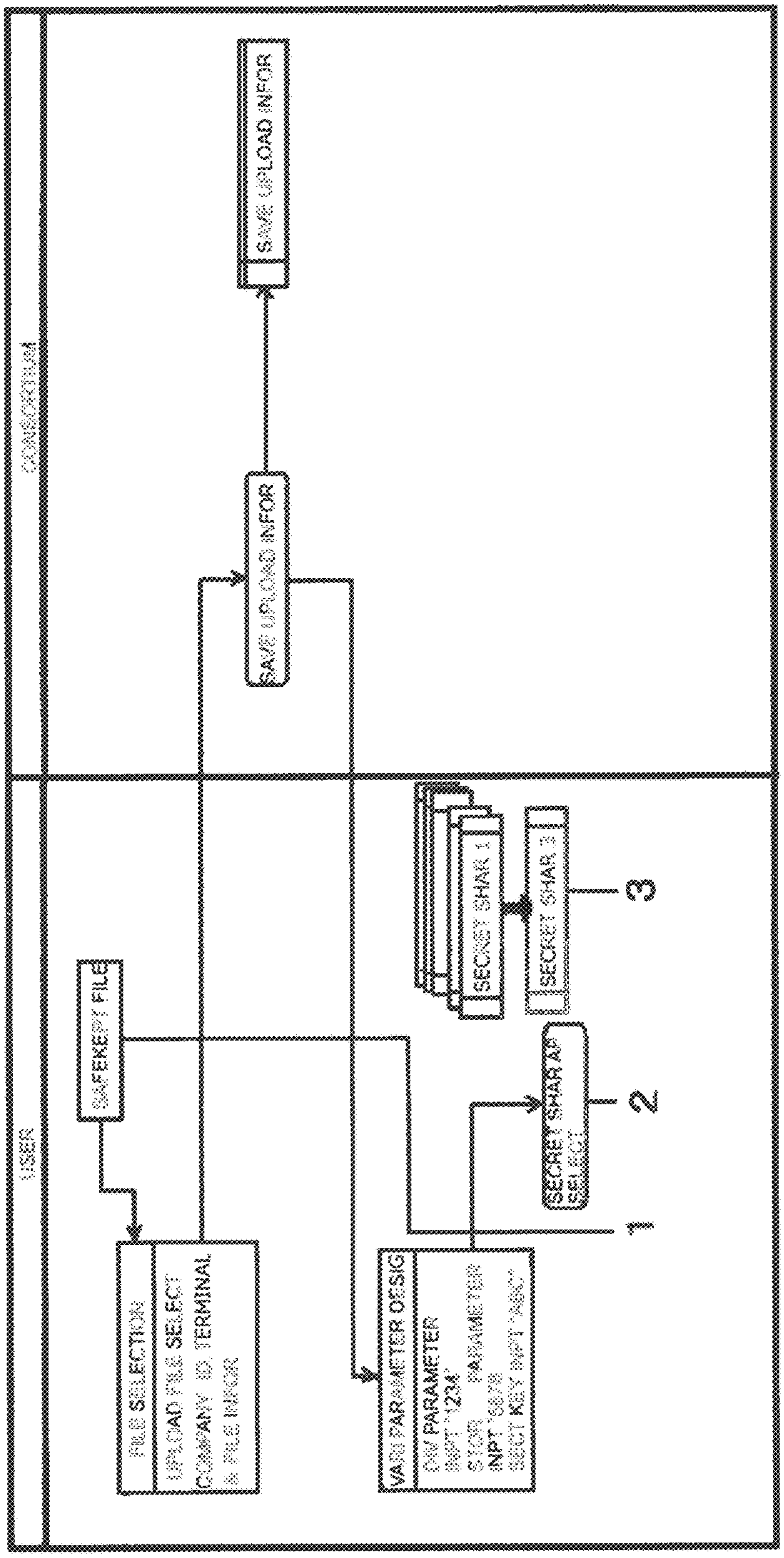

FIG. 94 is a flowchart illustrating a portion of a process of file data saving and uploading in another example using the digital asset guard service provision system of this embodiment.

Figure 95:
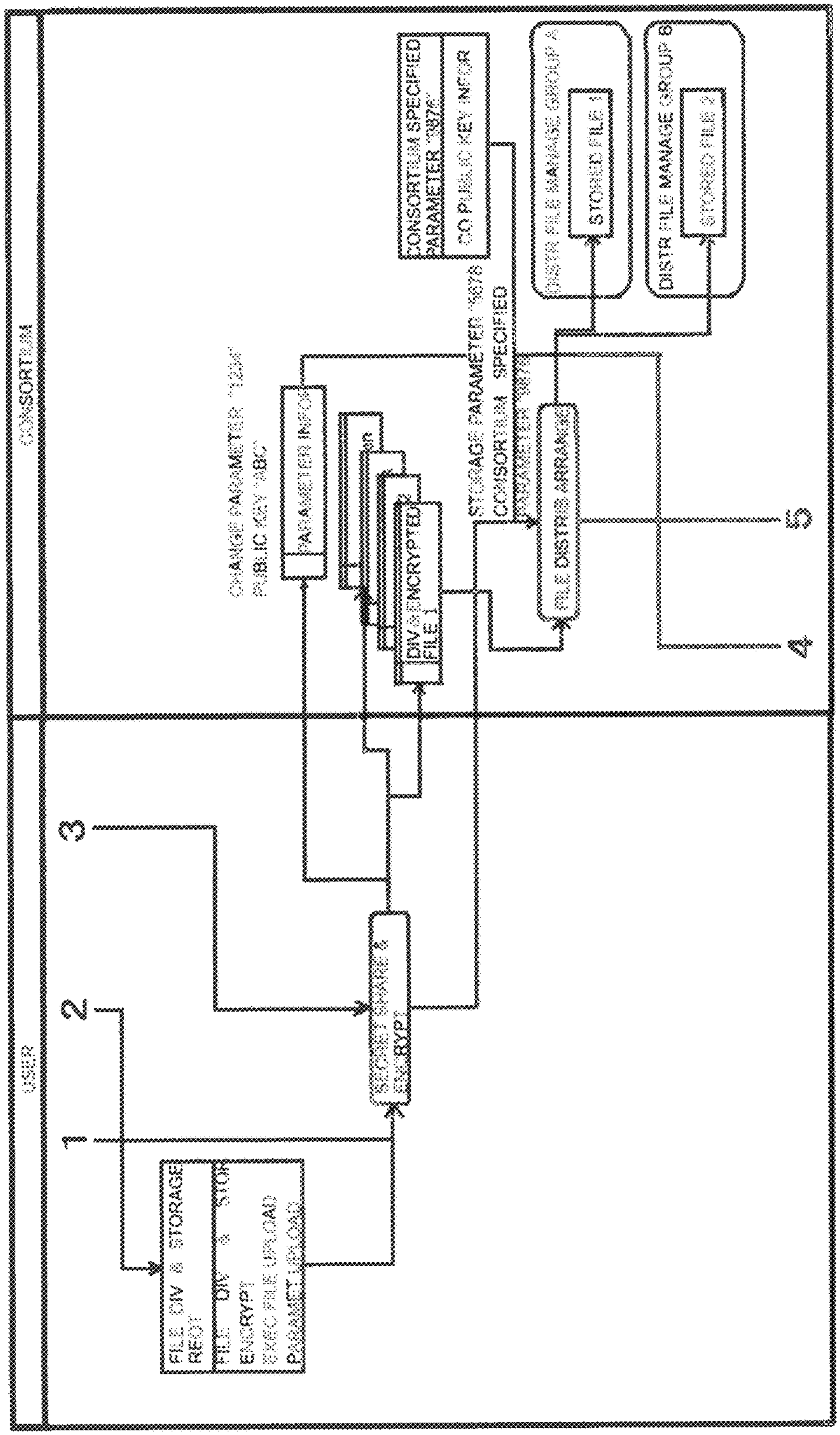

FIG. 95 is a flowchart illustrating the flow of file data saving and upload process continued from FIG. 94 in another example using the digital asset guard service provision system of this embodiment.

Figure 96:
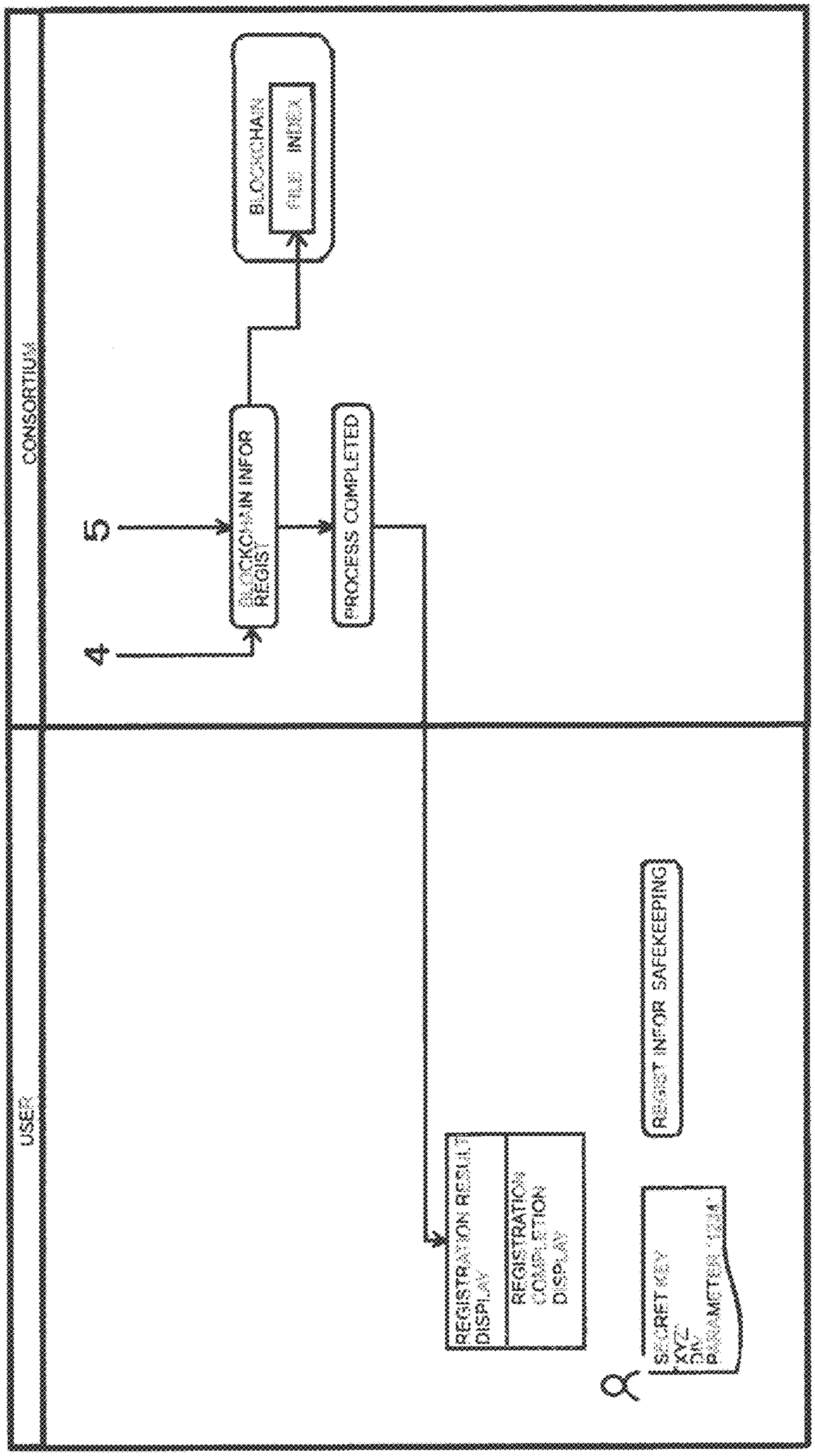

FIG. 96 is a flowchart illustrating a flow of file data saving and upload process continued from FIG. 95 in one more example using the digital asset guard service provision system of this embodiment.

Figure 97:
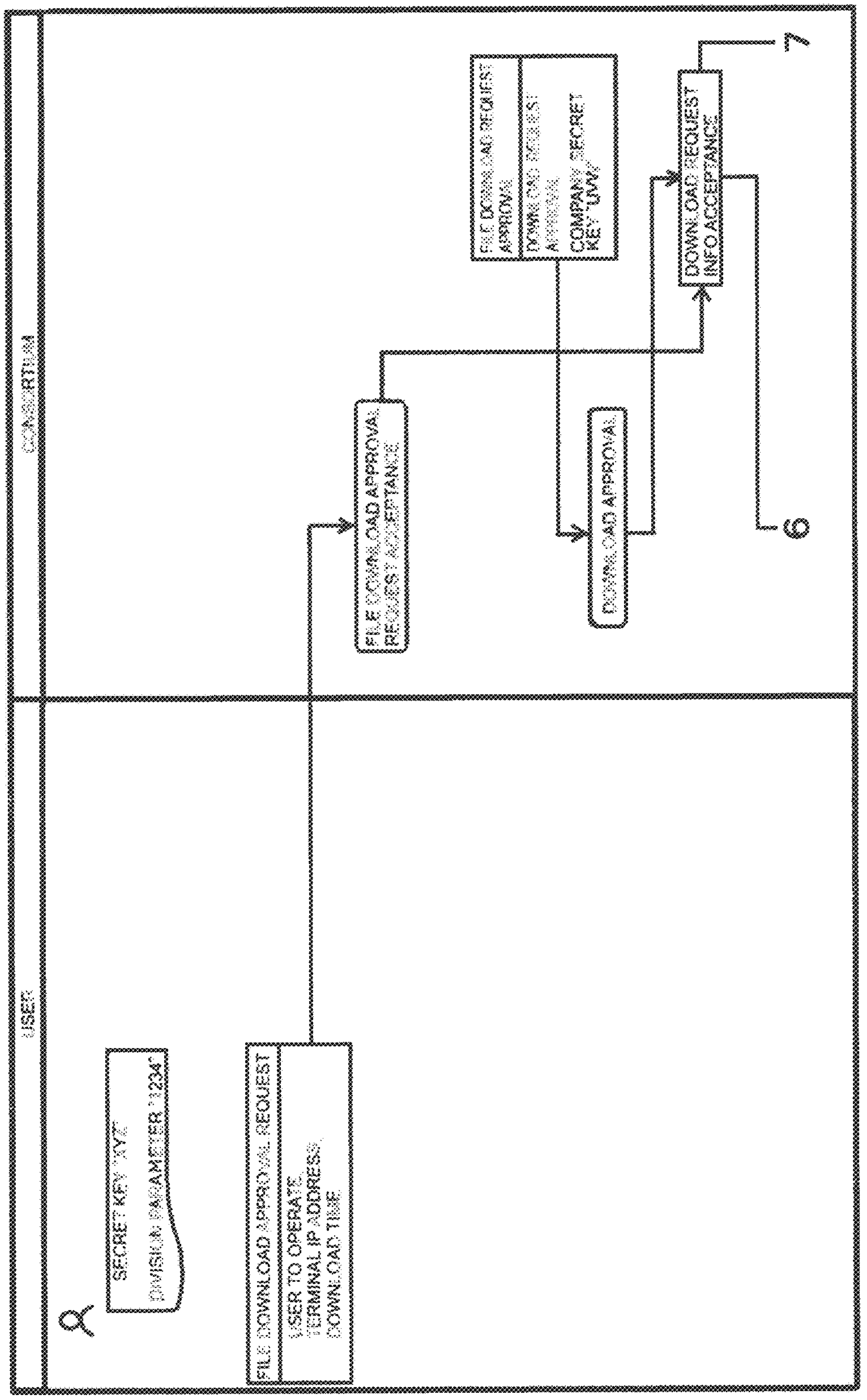

FIG. 97 is a flowchart illustrating a portion of a flow of file data restoration and download process in another example using the digital asset guard service provision system of the present embodiment.

Figure 98:
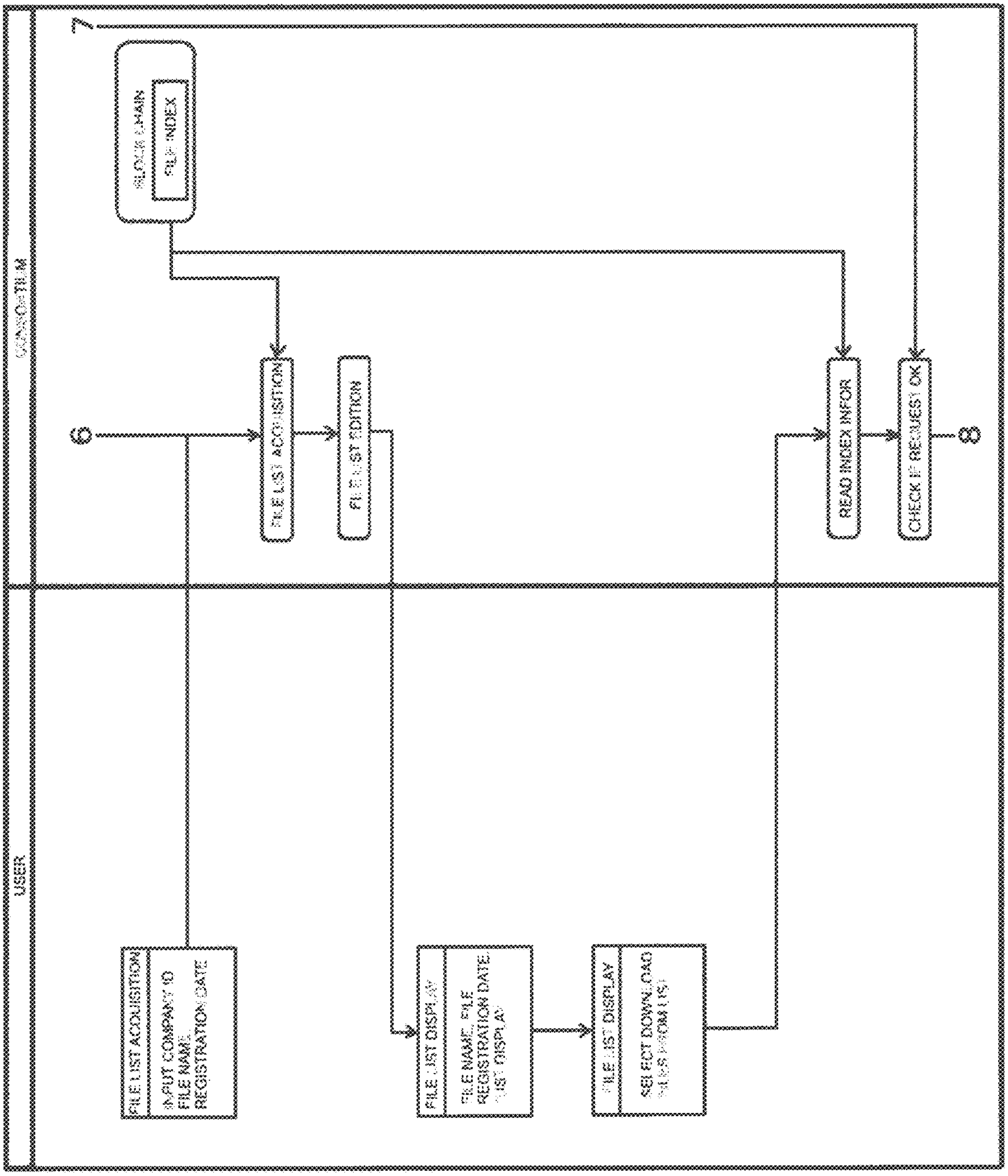

FIG. 98 is a flowchart illustrating a flow of file data restoration and download process continued from FIG. 97 in the example using the digital asset guard service provision system of this embodiment.

Figure 99:
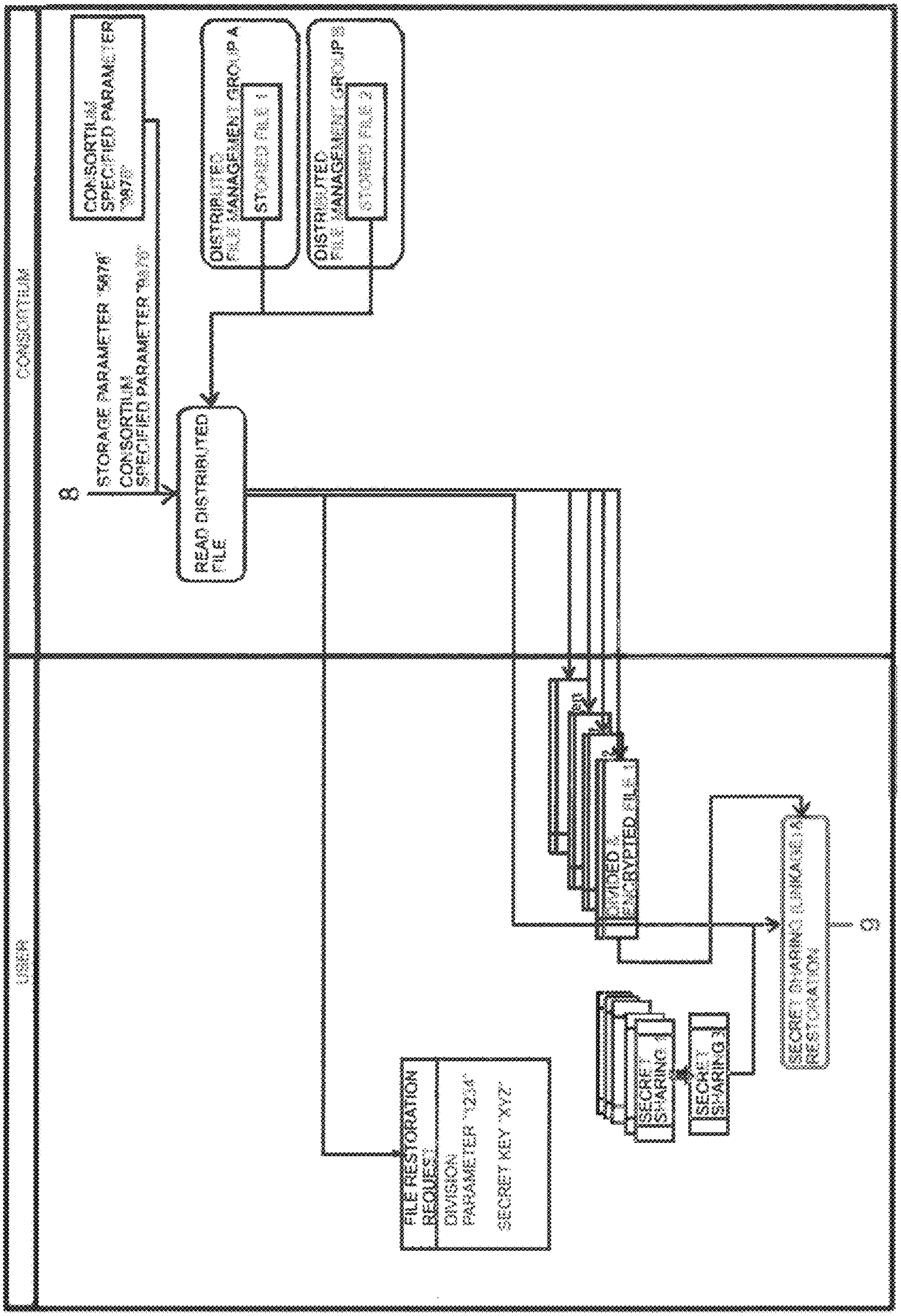

FIG. 99 is a flowchart illustrating the flow of file data restoration and download process continued from FIG. 98 in the example using the digital asset guard service provision system of this embodiment.

Figure 100:
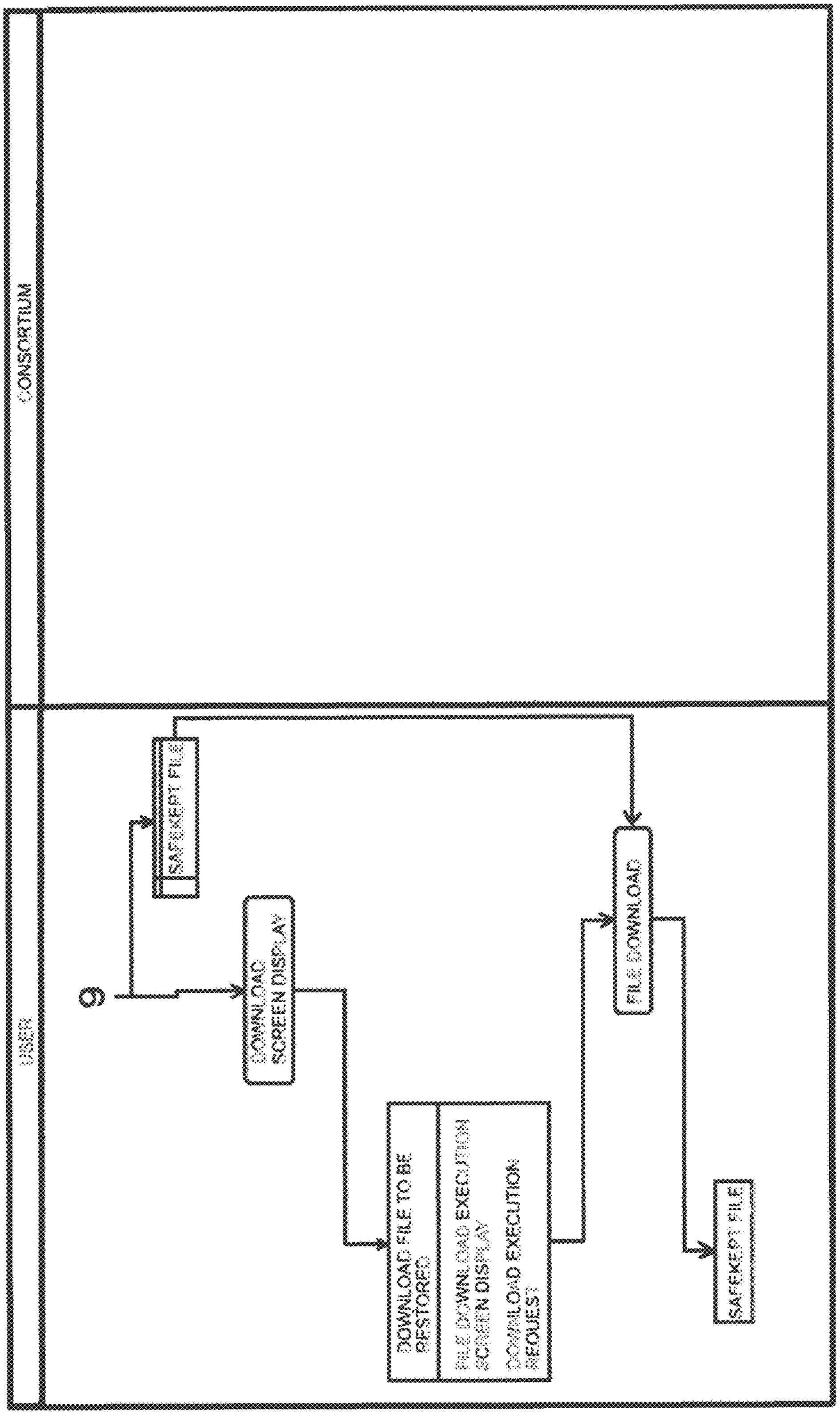

FIG. 100 is a flowchart illustrating the flow of file data restoration and download process continued from FIG. 99 in the example using the digital asset guard service provision system of this embodiment.

Figure 101:
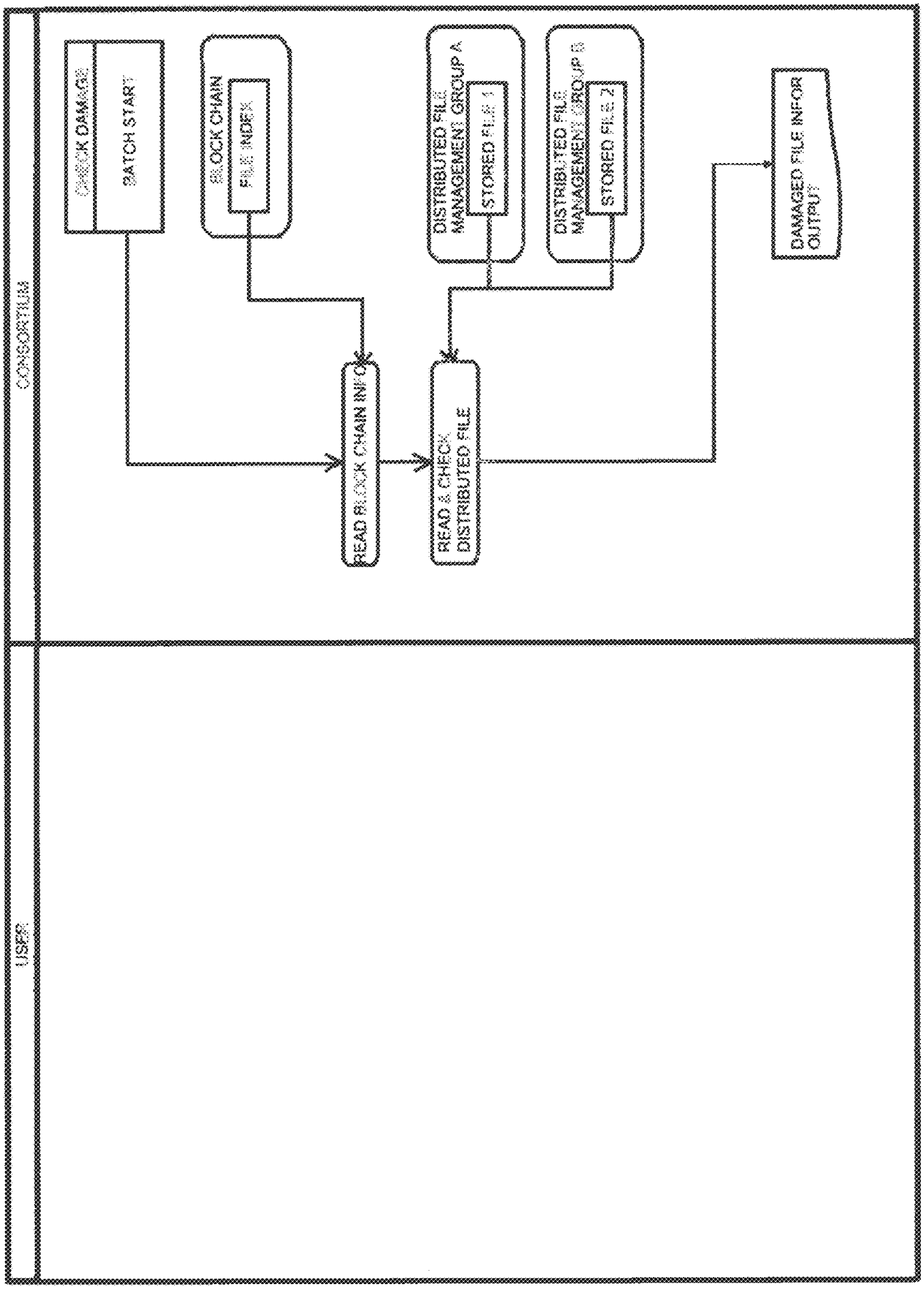

FIG. 101 is a flowchart illustrating a portion of the recovery process in the case of a data attack in another example using the digital asset guard service provision system of the present embodiment.

Figure 102:
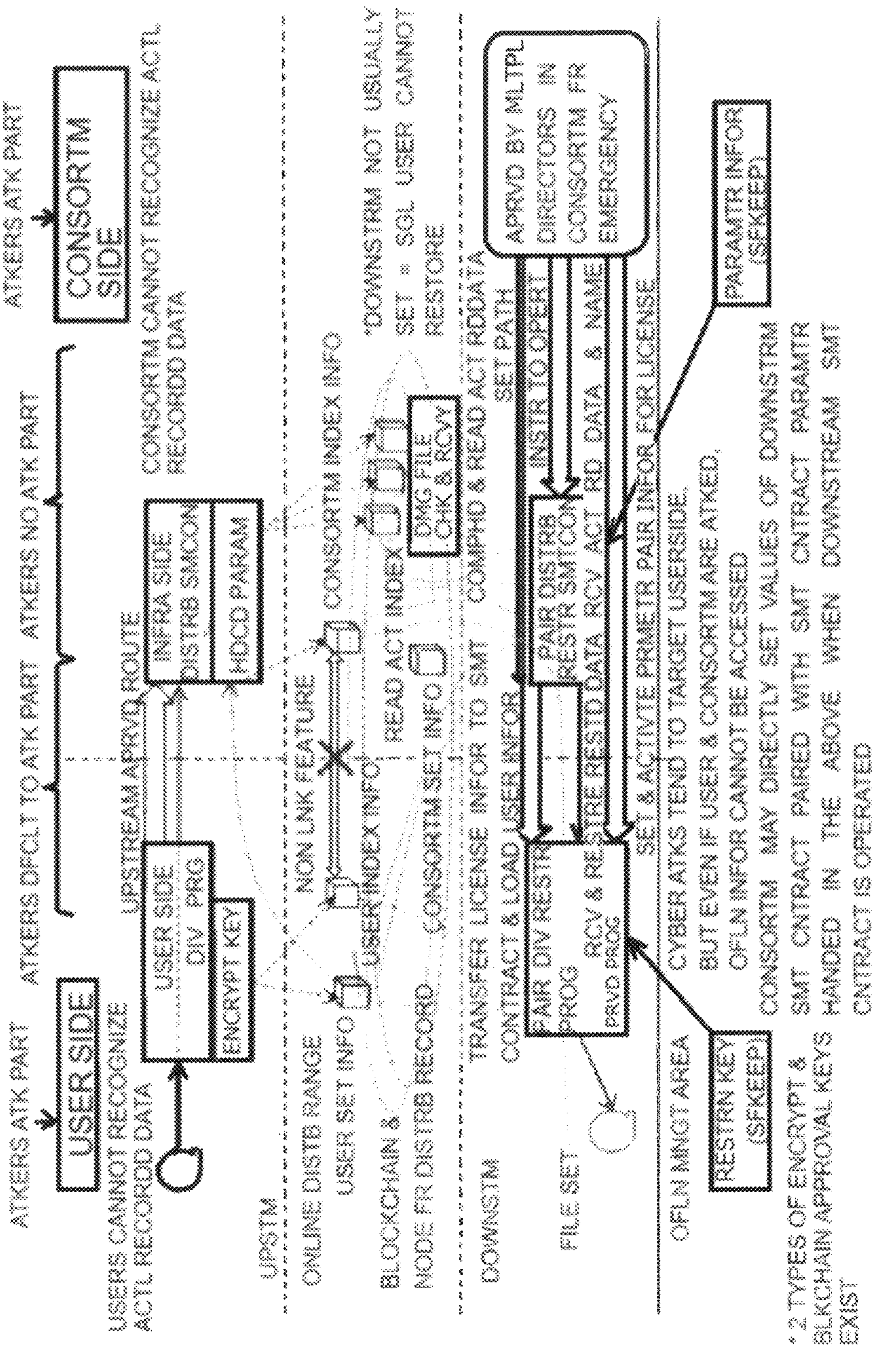

FIG. 102 is an explanatory diagram conceptually illustrating data attack resistance due to fragmentation of user-side process and consortium-side process and fragmentation of file data saving route and file data restoration route in the digital asset guard service provision system of this embodiment.

Figure 103:
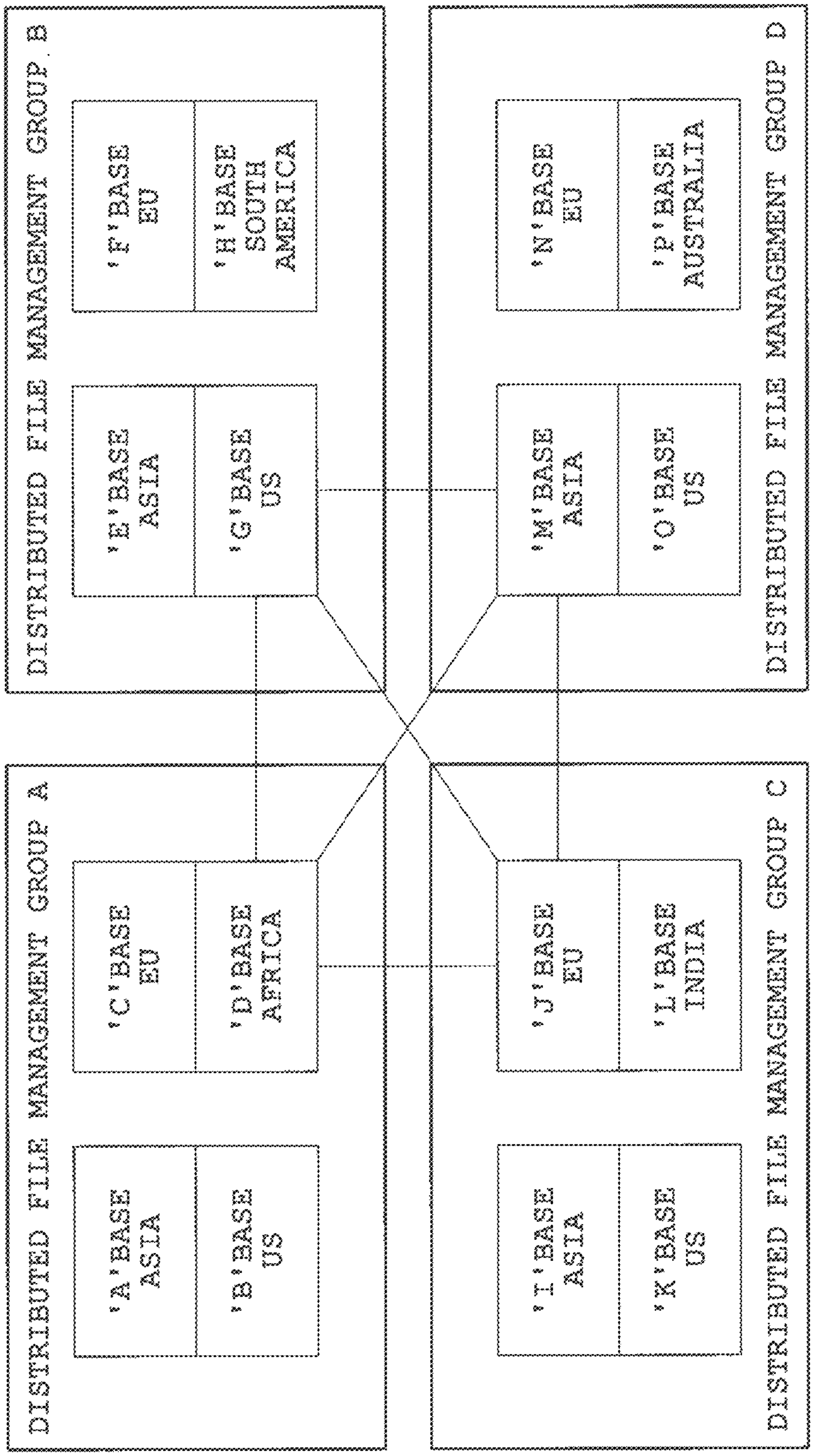

FIG. 103 is an explanatory diagram illustrating an example of the combination of the nodes located at multiple bases configuring distributed file management groups and the recording devices located at multiple bases networked to the nodes at the bases that the present inventor considered and studied in the process of deriving the digital asset guard service provision system of this embodiment.

FIG. 104 is an explanatory diagram illustrating an example of the arrangement of the nodes located at multiple bases configuring distributed file management groups in the matrix, which was considered and studied by the inventor in the process of deriving the digital asset guard service provision system of the present embodiment.

FIG. 105 is an explanatory diagram illustrating, in a table format, an example of the configuration information of each of the distributed file management groups, which was considered and studied by the inventor in the process of deriving the digital asset guard service provision system of the present embodiment.

Figure 106:
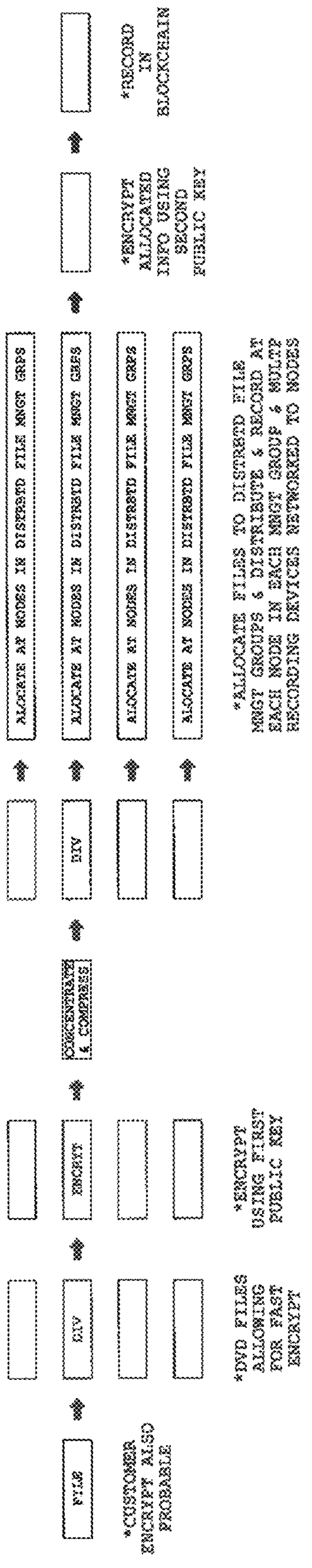

FIG. 106 is an explanatory diagram conceptually illustrating an example of a process flow from division and encryption of file data to be saved to distributed recording of the file data and encryption and recording of index information, which was considered and studied by the inventor in the process of deriving the digital asset guard service provision system of this embodiment.

Figure 107:
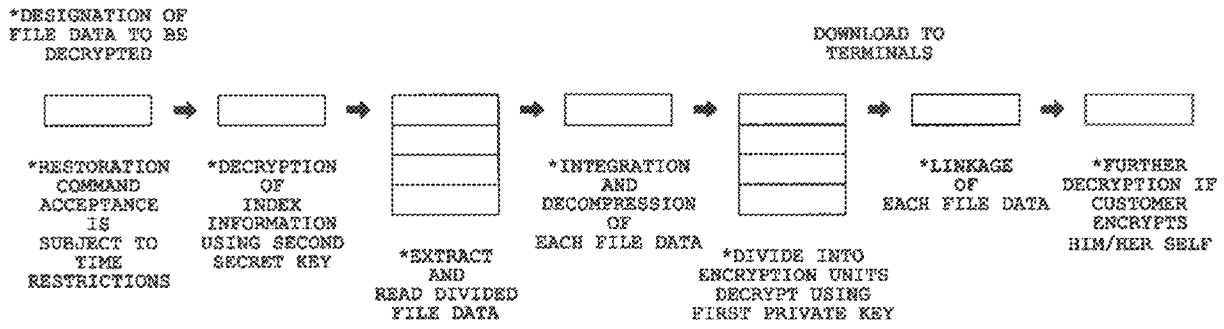

FIG. 107 is an explanatory diagram conceptually illustrating an example of the flow of the process of restoring saved file data, which was considered and reviewed by the inventor in the process of deriving the digital asset guard service provision system of the present embodiment.

Figure 108:
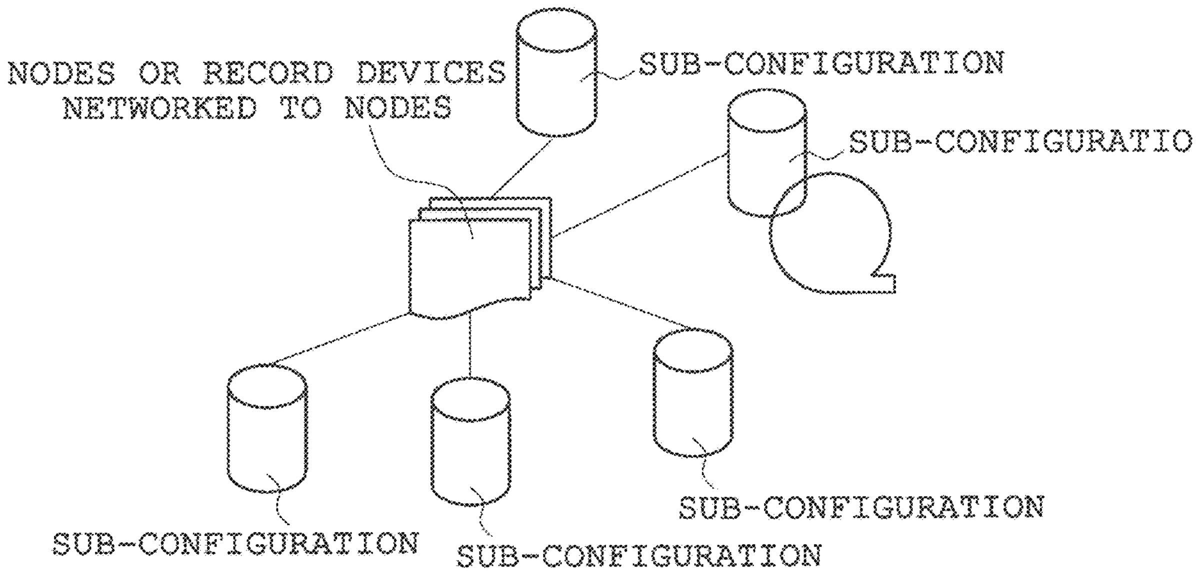

FIG. 108 is an explanatory diagram schematically illustrating an example of a sub-configuration file server connected to any of the nodes located at each of the bases belonging to each of the distributed file management groups and the recording devices at multiple bases networked to the nodes at the bases that the present inventor considered and studied in the process of deriving the digital asset guard service provision system of this embodiment.

DETAILED DESCRIPTION OF THE PREFERRED EMBODIMENTS

Prior to describing the embodiments, the circumstances leading to the derivation of the present invention and the effects of the present invention are described.

As mentioned above, conventional measures to protect data against general cyberattacks include the use of encryption technologies such as blockchain. However, in the future, higher-level cyberattacks that exceed ordinal levels are envisaged, such as cryptographic analysis using quantum computers and EMP attacks. Objects of these high-level cyberattacks involve the leakage, falsification, erasure, or destruction of digital assets (confidential information such as personal information and security-related information, control modules for important functions, currencies such as stable coins, and rights such as contracts).

For this reason, it is important to protect digital assets from high-level cyberattacks.

Digital Assets Subject to High-Level Cyberattacks

Digital assets that are subject to high-level cyberattacks include personal information held by financial institutions, such as account information and personal asset information, and personal information and security-related information held by large companies and government agencies. Digital assets subject to high-level cyberattacks is thought to cover a wide range of things, including confidential information, important contracts and designs, control modules and data, and things regarding lifelines. Until now, there have been no services provided that can guard against high-level cyberattacks with a high degree of accuracy, especially for civilian use.

High Level Cyberattack

High-level cyberattacks mainly include cryptographic analysis using quantum computers (Y2Q: Years To Quantum) and EMP attacks.

Cryptanalysis Using Quantum Computers

Cryptographic analysis using a quantum computer is a cyberattack that breaks through cryptographic guards, steals important information, and destroys the system by decoding secret keys using Secure Sockets Layer (SSL) or blockchain public keys.

If a quantum computer is misused, even if digital assets are protected by storing secret keys in a cold wallet disconnected from the system, the risk of public key be cryptanalyzed and private keys being decrypted is increased.

Cryptanalysis using a quantum computer is a cyberattack that breaks through the current basic security called cryptography. By combining cryptographic analysis using quantum computers with various attacks, it is envisaged that unexpected attacks would be developed, and the impact would be wide-ranging.

EMP Attack

The EMP attack is a cyberattack that destroys electronic equipment, systems, and magnetically recorded digital assets using strong electromagnetic waves generated from a nuclear explosion at high altitude (stratosphere).

The EMP attack may destroy the saved digital assets or the module of the system that saves the digital assets.

Also, although not the EMP attack, large-scale solar flares occur regularly. The effects of strong magnetic fields caused by solar flares can cause as much or more physical destruction as EMP attacks.

Measures Against High-Level Cyberattacks Currently being Considered

Quantum cryptography is being researched as a strategy for cryptographic analysis using quantum computers. However, considering the timing when quantum cryptography may be introduced to the general public and the cost of introducing quantum cryptography, we are not yet reached the level of practical use at present.

Furthermore, as a measure against EMP attacks, measures such as the construction of anti-magnetic mesh are being taken at data centers (including cloud facilities) that meet the EMP resistance standards in the United States. However, only some of the data centers in Japan have anti-magnetic mesh installed, or the measures are not up to sufficient standards.

Additionally, a method of using a cloud to save data to an overseas region that is, an independent region where a data center exists, is considered.

However, the cloud has risks such as insufficient user management, and financial institutions (particularly major financial institutions) are refraining from using the cloud. For details, most of the current domestic cloud services are overseas service entities, and if any problems occur in Japan, there is a possibility that they are easily withdrawn. Additionally, incorrect cloud settings can generate security holes, and even a simple attack can destroy the system.

Furthermore, even if it is a domestic cloud, if digital assets are saved using only one company's cloud, there is a risk that the saved data may become unusable in the event of a cloud system failure. Even if digital assets were to be saved using the clouds of two companies, it would be necessary to generate separate management functions for the two companies' clouds, which would generally be difficult to use.

In particular, measures to be taken against cyberattacks that simultaneously use cryptographic analysis using quantum computers and EMP attacks are currently complex and expensive, and have not yet reached a level where they may be put to general practical use.

Other Challenges

In addition, the evacuation of digital assets by the system is subject to very strict restrictions with regard to personal and other information, as well as confidential information of companies and other organizations. For example, if someone other than yourself manages digital assets, consent from the person who desires to manage the data is required. On the other hand, it is difficult to obtain consent from individuals for all digital assets that may be subject to management. This complicates the management of digital assets.

Additionally, when saving digital assets using distributed technology, blockchains such as public chains may not disconnect the chain that connects blocks. Therefore, even if it becomes necessary to delete garbage data that does not need to be managed or to delete digital data due to the customer's convenience, the digital data may not be deleted. Furthermore, since the block size is relatively small, recording digital data in an amount exceeding the block size is not possible.

Furthermore, even if it were possible to generate a function similar to the save the digital assets using decentralized technology by combining public chains and freeware, the location of responsibility is not clear for public chains and freeware. In digital asset saving services that are not fundamentally guaranteed, handling important or personal information is not desirable due to its reliability.

The inventor has therefore considered and studied the following measures to protect confidential information, personal information and other important information from high-level cyber-attacks and physical destruction, such as quantum computer and algorithmic cryptanalysis and EMP attacks, and to restore important information in the event of data destruction by a data attack, without the data being stolen by a third party, with regard to services mainly for the saving digital assets.

Consideration and Review of Measures to Protect Important Information Such as Confidential Information and Personal Information from High-Level Cyberattacks First, the inventor of the present disclosure conducted the following considerations and studies regarding the characteristics of blockchain.

A public chain has an unspecified number of participants, and various types of data are recorded (sometimes unimportant data or data that could be the target of an attack is recorded). Furthermore, the amount of recorded data may not be controlled, and the recording time is also unstable.

For more details, in a public chain where recorded data has a high degree of freedom and may not be deleted, for example, if important information is recorded, sabotage may be performed to remove that information, which is dangerous.

Additionally, many participants are unable to manage physical the nodes, and there is a risk that malicious participants could attempt to destroy or leak data.

Therefore, a closed private chain is considered to be desirable as a blockchain suitable for protecting important information such as confidential information and personal information from high-level cyberattacks. A closed private chain has the characteristic that participants are identified and data may be disclosed only to the identified participants.

However, private chains have less distributed the nodes than public chains, and are vulnerable to destructive attacks such as EMP attacks.

Therefore, as a measure to compensate for the decentralized nature of the nodes in a private chain, the inventor of the present disclosure considered using a consortium chain in which the co-administrator of a specified node manages the entire chain as a co-administrator.

In addition, in order to make data security more stringent, the inventor considered the use of a secret closed consortium chain, which is constructed in such a way that only the holders of specific nodes can access it as co-administrators, and the holders of specific nodes who are co-administrators can only refer to their own recorded data.

Next, as a measure against EMP attacks, the inventor considered using blockchain decentralization technology (real-time processing) to distribute the file data to be saved to multiple nodes at multiple bases around the world that are physically disconnected from each other and to multiple recording devices at multiple bases around the world that are physically disconnected from each other that are networked to the nodes at the bases. The idea is to record and store the data in a distributed manner. In this way, even in the event of a file data failure or destructive attack on the node of a specific base or a recording device networked to the node, the file data would be protected by the node of the base not under attack or the recording device networked to the node.

The inventor of the present disclosure also considered recording and managing index information of safekept file data on a blockchain. The inventor thought that by doing this, it would be possible to restore the desired file from the index information.

Additionally, the inventor of the present disclosure considered dividing file data (batch-like process) as a measure for cryptographic analysis using a quantum computer.

For details, the file data to be saved is encrypted and multi-divided. For example, encrypted file data is used as the file data to be saved, and the encrypted file data is multi-divided. Alternatively, unencrypted file data is used as the file data to be saved, the file data is multi-divided, and the divided file data is encrypted. In this manner, each divided file data becomes meaningless data. The inventor proposed that the process for recording and storing the file data to be saved by distributing it to the nodes in multiple physically distant bases in the world is black box process. The idea was to make it impossible to decrypt individual file data alone or to restore the original file data from divided individual file data.

The inventor of the present disclosure considered to:

- combine the above-mentioned measures against crypt-analysis by a quantum computer and measures against data destruction by the EMP attack;
- encrypt and multi-divide the file data to be saved (which is uploaded with the intention of saving data by a customer who had completed the application procedure for a data saving service contract);
- distribute the divided individual file data to distributed file management groups configured with the nodes at multiple bases around the world and the recording devices networked to the corresponding nodes, each with different combinations; and
- record the divided individual file data into the distributed file management groups.

However, in a batch process of dividing file data, which is the pre-process prior to allotting and recording data in distributed file management groups configured with the nodes located at multiple bases in the world and the recording devices networked to the nodes, for example, if data is to be backed up once a day, the file data to be saved (which is uploaded with the intention of data saving by a customer who has completed the data saving service contract application procedure) is left unattended for nearly 24 hours. This increases the risk that file data is stolen by a malicious third party, and even if the file data before division is encrypted, an increased risk to be crypt-analysed by a quantum computer is concerned.

Therefore, the inventor of the present disclosure considered doing the following. For example, small file data subject to saving that is constantly generated (that is uploaded with the intention of data saving by a customer who has completed the data saving service contract application procedure) is temporarily safekept in real time into a temporary storage area in node groups located at the specified bases in the consortium-type blockchain. Then, after one day has passed, the small data is assembled (compressed and linked). Then, the assembled (compressed and linked) file data is multi-divided. Then, the divided individual file data is distributed and recorded in distributed file management groups configured with the nodes located at multiple bases in the world and the recording devices networked to the nodes, each having a different combination.

Additionally, the inventor of the present disclosure considered the following procedure for file data temporarily recorded in a temporary storage area in the node groups located at the specified bases in the consortium-type blockchain. For example, a chain of blocks storing file data older than two days is invalidated. Then, delete the invalidated data.

Management for Dividing, Distributing and Recording File Data

Next, the inventor manages the division and distributed recording of file data (uploaded with the intention of data saving by a customer who has completed the data saving service contract application procedure), for example, as follows.

The number of file data divisions will vary depending on the file data record amount (file size) specified by the customer at the time of accepting the data saving service contract application procedure from the customer.

File Data Encryption

Here, as a step prior to dividing file data, the inventor of the present disclosure asks the customer who have completed the data saving service contract application procedure and who wish to save data, to provide, for example, the following preparations through a predetermined process function.

First, the file data desired to be saved is encrypted.

However, encrypting large file data takes time. For this reason, huge file data is divided based on the recorded amount (file size) of file data that may be encrypted efficiently at high speed. Next, each divided file data is encrypted. Next, each of the encrypted file data is relinked and compressed so that it may be used as encrypted entire file data that is the source of division.

Note that a general public key encryption method is used for the encryption of file data by the customer. The customer then prints the public key used to encrypt the file data (herein, this public key is referred to as a "first public key (first encryption key)") on paper and the like safekept in a safe-deposit box, and the like.

Dividing File Data

Furthermore, the inventor of the present disclosure considered dividing the encrypted entire file data to be divided, as follows, for example.

For example, when accepting a data saving service contract application procedure from a customer, multiple types of division numbers suitable for the file data amount to be recorded are presented based on the file data amount to be recorded specified by the customer. The customer then selects and specifies the number of divisions of the file data. Based on the number of divisions of file data selected and specified by the customer, the configuration pattern of the planet (a planet forms one unit of the blockchain) is determined. That is, distributed file management groups comprising the nodes located at each of the bases and the regions in the world and the recording devices located at different multiple bases networked with the nodes at the bases is determined.

Then, based on the number of divisions specified by the customer, the encrypted entire file data that is the source data of the division is divided into a size suitable for distribution and recording (based on factors such as data record capacity and communication speed of the server at the node). Furthermore, in order to make it difficult to restore the encrypted entire file data before division by combining the divided file data, a certain number of dummy file data (for example, about 10% of the total) is added.

Distributed Recording (Selection of Bases of the Nodes for Distribution and Recording)

Additionally, the inventor of the present disclosure considered to distribute and record these divided file data and dummy file data by combining bases of the nodes as follows, according to the planet configuration pattern.

For example, when the planet configuration pattern corresponds to a configuration in which the file data that is the source data of the division is divided into three and one file data is added as a dummy, these four file data are to be simultaneously distributed and recorded in four distributed file management groups, each with a different combination of the nodes at bases around the world and the recording devices at multiple bases networked to the nodes at the bases. At this time, for example, as shown in FIG. 103, the nodes located at the individual bases that make up each of the distributed file management groups and the recording devices located at multiple bases networked to the nodes at the bases are located in different regions. The nodes configuring the distributed file management groups and the bases of the multiple recording devices networked to the nodes are linked so that the nodes and the recording devices form distributed file management groups.

In addition, the nodes located at each of the bases within distributed file management groups (assuming 4 bases in the case of FIG. 103) and the recording devices located at multiple bases networked to the nodes at the bases are selected such that the nodes and the recording devices at the locations where "maximum distance=maximum degree of dispersion is assumed". Then, the divided file data having the same content is to be recorded in the node at each of the bases in the "maximum distance=assumed maximum distribution" and in the recording devices at the multiple bases networked to the nodes at the bases.

In addition, the nodes located at each individual base and the recording devices at multiple bases networked to the nodes located at the bases are set to be:

- connected via communication means such as the Internet (or closed network); and
- the distributed file management functions are incorporated.

Note that FIG. 103, d, g, k, and m illustrate the bases of the nodes configuring the blockchain control protocol.

Each base in which the nodes and the recording devices networked to the nodes are calculated to maximize the degree of dispersion using, for example, the following concept.

For example, considering the spherical earth as a flat surface, for example, as shown in FIG. 104, the matrix is generated in which regions on the earth are divided into 10 vertically (excluding 0: North Pole and 11: South Pole) and 10 horizontally.

Bases at multiple nodes that distribute and record one divided file data and multiple recording devices that are networked to the nodes in one distributed file management group are spaced at three intervals in the x-axis direction based on the Y-axis in the matrix, for example, if the distributed file management group is divided into three (10/3≈3). If, for example, the distributed file management group is divided into four (10/4≈2), the bases are spaced at two intervals in the X-axis direction.

When the intervals in the X-axis direction may not be spaced according to the calculated value using the method described above due to the remaining recordable capacity and the like, a base having a numerical difference similar to the calculated value of the intervals in the X-axis direction is selected in the Y-axis direction.

As a result, the nodes of all the bases and the multiple recording devices networked to the nodes are determined in order to record and multi-divide the file data at multiple bases in a planet.

The inventor of the present disclosure considered to use the cloud for the nodes of some of the bases or for the recording devices networked to the nodes that make up the distributed file management groups. In this case, two types of matrices are used for managing the information of distributed file management groups: one is the matrix to manage the information of the distributed file management groups, which are configured with the nodes such as the cloud or the recording devices networked to such the nodes with low trust level; and another matrix for managing the information of the distributed file management groups, which are configured with the nodes and the recording devices networked to such the nodes with high trust level due to a closed environment.

The inventor has considered combining the information of the distributed file management groups managed by each of these two matrices, so that it is also possible to determine the nodes at all bases for distributed recording of multi-divided file data at multiple bases and the recording devices at multiple bases networked to the nodes at the bases in a planet.

The inventor thought that, on a planet, the bases of the nodes that distribute and record divided file data and the multiple recording devices networked to the nodes are managed by the global positioning system (GPS) and other information and classified in the matrix as described above.

Thus, the inventor considered the following. Distributed file management groups that include the base where the degree of dispersion in the blockchain may be maximized are first selected according to the number of divisions of the file data. Then, within each of the selected distributed file management groups, the individual bases belonging to the distributed file management groups are set so that the degree of dispersion is maximized. Then, a node located at the individual base and the multiple recording devices networked to the nodes are selected.

The inventor considered that these matrices should record the total remaining recordable capacity and the communication capacity, and the like, as information on each region to which the bases of each node and the multiple recording devices networked to the nodes belong. When selecting a node that constitutes distributed file management groups and the multiple recording devices networked to the node, the inventor considers the information recorded in the matrix, such as the total remaining recordable capacity and communication capacity in each region, together with the degree of dispersion, to determine the optimum combination. The nodes and the multiple recording devices networked to the nodes are selected based on the total remaining recordable capacity, the communication capacity, and other information, as well as the degree of dispersion recorded in the matrix in each region.

The inventor of the present disclosure considered applying a general distributed algorithms when selecting a combination of nodes and the multiple recording devices networked to the nodes.

The inventor of the present disclosure considered calculating areas in which recording capacities and communication capacities need to be increased in a combination of the nodes and the multiple recording devices networked to the nodes. By increasing the recording capacities and communication capacities of the nodes and the multiple recording devices networked to the nodes in that area, the inventor of the present disclosure aims to maintain a balance of the bases in which the nodes and the multiple recording devices networked to the nodes are selected.

At the time of distribution and recording of each divided file data, each of the file data has already been encrypted using the first public key (first encryption key), for example, when the customer's preparation process described above is performed.

However, the inventor of the present disclosure also considered encrypting the file data at the time of division in the following manner. For details, the file data is multi-divided to be multiple file data in which the divided file data pieces are linked using a general method such as secret sharing.

The inventor of the present disclosure also considered having the core node manage the individual equipment configuring the recording devices at the bases of each of the distributed file management groups, and having the core node manage the designation of specified equipment.

Distributed Recording (Recording Index Information During Distributed Recording)

The inventor in this case has also considered that when the divided file data is distributed and recorded in each of the above-mentioned distributed file management groups, a distributed file management function should receive the base information within each of the distributed file management groups. (FIG. 103 illustrates that the nodes of the four bases and the recording devices at multiple bases networked to the nodes at the bases distribute and record the same divided file data. Control numbers, installation locations, performance, hash values, and the like, of the storage media comprising the nodes at each of the bases and the recording devices at multiple bases networked to the node at that base).

Note that the hash values are information used to check whether the file data, which is distributed and recorded in the storage media comprising the nodes at each of the bases in each of the distributed file management groups and the recording devices at multiple bases networked to the nodes at the bases safekept in blocks, has been tampered with.

The distributed file management function that received base information within all distributed file management groups (in the above case, there are four distributed file management groups, and each of the distributed file management groups has information on four bases) integrates base information within all distributed file management groups. Then, the information owner uses a public key for index information management (herein, referred to as a "second public key (second encryption key)") that is different from the public key (first public key (first encryption key)), used when encrypting the original file data to be saved, and encrypts base information in all integrated distributed file management groups.

Next, the owner of the information uses a secret key for index information management (here, referred to as a "second secret key (second decryption key)") and record base information in all the encrypted distributed file management groups in the node groups located at the specified bases in the consortium-type blockchain as index information.

The owner of the index information stores these two index information management encryption key (second public key (second encryption key), and second secret key (second decryption key)) to the hardware wallet, prints the index information and stores in a safe-deposit box or the like.

File Data Restoration

In the event of occurring a need for restoring data when the system is destroyed, or the like, the inventor of the present disclosure considered to use a decryption key (second secret key (second decryption key)) for the index information management to restore (decrypt and link) the original file data in a file data restoration function. For details, index information, corresponding to the file data required for restoration from the node groups located at the specified bases in the consortium-type blockchain, is decrypted using the second secret key (second decryption key). Then, the file data restoration function automatically inputs the decrypted index information to the distributed file management function, so that the distributed file management function links and compresses the divided file data which is distributed and recorded in multiple nodes in each of the corresponding distributed file management groups and in the multiple recording devices networked to the nodes. Then, the linked file data is decrypted using the first secret key (first offline decryption key).

The division of the encrypted file data, distribution and recording of the divided file data, and linking of the divided distributed and recorded file data are basically not data movement, and the public key is not used. Therefore, the encryption key (second secret key (second decryption key)) for index information management is not considered to be deciphered.

File Data Division, Distribution and Recording Method

Furthermore, the inventor of the present disclosure considered the following method for dividing, distributing and recording file data. Multiple types of distributed algorithms are prepared. Then, when accepting a data saving service contract application procedure from a customer who is the owner of the original file data to be saved, the customer is allowed to select a distribution algorithms number in addition to the number of file data divisions. Then, a logic is incorporated in which, using the number selected by the customer, the distributed file management group to which the file is to be divided, the nodes at the bases that make up the distributed file management group, and the recording devices located at multiple bases networked to the nodes at the bases, are determined.

The customer should also record this distributed algorithms number on paper and the like, and store it in a safe-deposit box and the like, similar to the storage of the encryption key described above. If this is done, the logic for restoring file data is considered to be impossible to analyze.

Setting Conditions for File Data Restoration Process

The inventor of the present disclosure considered the following regarding the file data restoration function. A time frame (for example, one minute specified by the customer within 24 hours) in which the customer inputs a file data restoration command is prepared for a customer to be able to set in advance. Then, file data restoration commands from the customer are accepted only during an extremely short time frame specified by the customer. In this way, even if a file data restoration command is input, file data restoration process will not be activated except during a very short time frame known only to the customer. Therefore, even if the system is stolen by a third party, it is considered almost impossible for the third party to restore the customer file data by inputting the restore command. The inventor of the present disclosure considered having the customer write down on paper the setting information of the time frame during which the input of the file data restoration command is accepted, and store it together with the encryption key in the same safe-deposit box.

Furthermore, in the file data restoration function, the inventor of the present disclosure combines conditions such as the number of the distributed algorithms, the input time frame of the file data restoration command, and biometric authentication, and only when all of these conditions are met, the file data restoration process may be activated. In this way, data theft may be more effectively prevented.

File Data Record Amount

The inventor considered to have the customer specify the file data record amount (file size) and the degree of dispersion (whether domestic only or including overseas) at the time of accepting the data saving service contract application procedure from the customer.

When the file data uploaded by the customer with the intention of data saving exceeds the maximum file data record amount within a certain period after the completion of the reception of the data saving service contract application procedure from the customer, the inventor considered, the process should be treated as an error if the customer does not complete the contract renewal application procedure for the data saving service.

In this way, even if the system is attacked by a malicious third party with the intention of stopping the system by uploading a large amount of data, the data process that would result in an unlimited amount of recording will not occur, and a system stop is thought to be able to be avoided.

File Data Safekeeping Period

The inventor of the present disclosure thought to be able to set the safekeeping period for file data that is divided, distributed and recorded through distributed file management functions, as specified by the customer at the time of receiving the data saving service contract application procedure.

A third party may not delete file data that is divided, distributed and recorded within the set safekeeping period.

However, the inventor of the present disclosure considered that, a safekeeping period for file data, that is divided, distributed and recorded in the nodes located at multiple bases configuring the distributed file management group and the multiple recording devices networked to the nodes, is set, the divided, distributed and recorded file data may be deleted basically by initializing the nodes located at multiple bases within the distributed file management group of which the safekeeping period has passed and the multiple recording devices networked to the nodes.

When deleting file data that is divided, distributed and recorded in the nodes located at multiple bases within distributed file management groups and the multiple recording devices networked to the nodes after the safekeeping period has passed, the inventor considered the following steps: Notify customers in advance. When the customer who received the notification desires to further update the safekeeping period and enters an update command, the file data is temporarily restored using the managed encryption key (second secret key (second decryption key), first secret key (first offline decryption key). Then, after the file data is restored, a rollover function is implemented to quickly process the second division, distribution and recording of the restored file data.

Network Security

The inventor of the present disclosure considered the following network security. Peers (the nodes or communication partners that communicate on an equal footing) of equipment at each of the bases are managed using global IP addresses and the like. Then, settings are made so that access by unmanaged peers is not permitted.

For example, node information that allows access is recorded in the node groups located at the specified bases in the consortium-type blockchain, and peers that are not recorded are prevented from connecting.

Note that peer information is registered using a privileged key of the consortium-type blockchain (supported by multisig of the companies configuring the consortium).

The inventor of the present disclosure considered that, only transactions on the customer terminal registered with the customer's fixed private IP address pre-registered in the node group of a specified base in the consortium-type blockchain may upload the file data (processes of the file data division, distribution and recording) using the distributed file management function through the data saving service contract application procedure from the customer.

The inventor of the present disclosure considered that in the consortium-type blockchain, a consortium committee comprises node constituent companies, and peer information is registered using a privileged key using multisig.

Then, the inventor of the present disclosure considered accepting only transactions of registered (user) global IP addresses in the division of the corresponding file data and the distribution and recording process (upload process) of the divided file data.

At the same time, the inventor of the present disclosure considered providing a check function that allows the customer to upload only the registered number of bytes of file data.

Distributed File Management Group Configuration Information (Separate Management)

The inventor of the present disclosure has provided information having, for example, as shown in FIG. 105, configuring nodes, area codes by node, address, file record capacity information, and communication speed information as configuration information of each of the distributed file management groups.

The applicant of this application considered that the configuration information of the distributed file management group is encrypted and recorded as index information into node groups located at specified bases in the consortium-type blockchain, and that the decryption of the index information is performed by the distributed file management function.

Encryption Key

The inventor of the present disclosure considered to generate a public key from a secret key. The secret key is then recorded in a hardware wallet or the like that is disconnected from the network and safekept in a safe-deposit box or the like. On the other hand, the stored secret key should only be used upon decryption. At the same time, two types of keys (the first secret key (first offline decryption key) for file data encryption and the second secret key (second decryption key) for index information encryption) are generated.

File Data Encryption, Division, Distribution and Recording Process

As described above, the customer encrypts the file data that the customer desires to save as a preparatory process via a predetermined process function. The inventor of the present disclosure thought that the following method could be used for huge file data. The huge file data is divided based on the file data record amount (file size) that may be encrypted efficiently at high speed. Encrypt each divided file data. Each of the encrypted file data is relinked, compressed and used as the encrypted huge file data prior to division.

At the time of accepting the application procedure for a data saving service contract from the customer, the inventor of the present disclosure considered dividing the file data in the encrypted state, which is the source data of the division, into file data of a suitable size for distributed recording (based on factors such as the data record capacity and communication speed of the server in the nodes and the multiple recording devices networked to the nodes), based on the amount of file data recorded as specified by the customer.

The inventor of the present disclosure proposed that divided file data, including file data added as dummies, are simultaneously distributed and recorded in multiple distributed file management groups (in the nodes at multiple bases and the recording devices at multiple bases networked to the nodes) configured with the nodes at multiple bases and the multiple recording devices networked to the nodes around the world, each with different combinations of file data.

Then, the inventor of the present disclosure considered that the distributed file management function accepted the base information in all the distributed file management groups integrates the base information in all the distributed file management groups. The base information in all the integrated distributed file management groups is encrypted using the second public key (second encryption key) for information management different from the first public key (first encryption key) used by the customer when encrypting the original file data to be saved. Next, the encrypted base information in all the distributed file management groups is recorded as index information in the node groups located at the specified bases in the consortium-type blockchain using the second secret key (second decryption key) for index information management.

FIG. 106 is an explanatory diagram conceptually showing an example of a process flow of dividing, encrypting, distributed recording, and encryption and recording of index information of file data to be saved.

File Data Restoration (Decryption of Index Information, File Data Linkage, File Data Decryption) Process In the file data restoration function, the inventor of the present disclosure considered the following process for decoding index information and linking file data when restoring file data. Registration of a fixed private IP address of a customer terminal exclusively for restoration is accepted in advance from a customer. Among the customer terminals, only the customer terminal registered with a fixed private IP address exclusively for restoration can perform the restoration process.

In this way, a different terminal (fixed private IP address) from the one that performs the encryption process may be set as a recovery-only terminal, being able to make a third party even more difficult f to restore file data.

Note that when performing file data restoration process, the customer specifies the files to be restored in addition, two encryption keys (the first secret key (first offline decryption key) and the second secret key (second decryption key)) safekept in a safe-deposit box or the like are used.

In restoring file data, the inventor of the present disclosure considered, for example, the following process flow.

As mentioned above, in the file data restoration function, a customer inputs a file data restoration command during a specified time frame. The owner of the information decrypts index information corresponding to the file data required for restoration using the second secret key (second decryption key). The file data restoration function automatically inputs the index information decrypted by the customer into the distributed file management function, so that the distributed file management function links and compresses the divided distributed and recorded file data in multiple nodes in each corresponding distributed file management group and the recording devices networked to the nodes. Next, the linked and compressed file data is divided in the same way as at the beginning. The customer then decrypts each divided file data using the first secret key (first offline decryption key). Then the decrypted file data are linked to restore the original file data.

FIG. 107 is an explanatory diagram conceptually showing an example of the flow of restoration process of saved file data.

Regarding the Service Level of File Data Saving Service

The inventor of the present disclosure considered the service level of the file data saving service as follows.

As a top-class file data saving service, the inventor considered a network configuration that uses a company's closed network. For example, this is a network configuration in a closed environment that uses a dedicated line, such as a post office network or a convenience store ATM network. This also applies to satellite communication networks, and the like. Such a closed environment network configuration may not be penetrated by a third party.

The Internet is ordinally used as an ordinal class file data saving service. However, the inventor designed a network configuration that allows only specified management addresses to be used.

Tampering Check for File Data Distributed and Recorded in Each Node

The inventor of the present disclosure considered the following process for divided file data that is distributed, recorded and safekept in multiple nodes within distributed file management groups and the multiple recording devices networked to the nodes Then hash values are calculated based on the divided file data recorded in each node and the multiple recording devices networked to the nodes. Then, the calculated hash values are recorded in a block. Then, hash values recorded in blocks in each node in the distributed file management group and hash values in the multiple recording devices networked to the nodes are constantly compared. When there is a difference between the hash described in a block in a specified node or a recording device networked to that node, and the hash described in a block in another node or the recording device networked to that node. If there is, a function is implemented that detects that the divided file data recorded in the node or the recording device networked to the node is tampered with and excludes it from management and to notify an operator of an alarm.

Furthermore, the inventor of the present disclosure also considers to take the following steps in cases in which a mechanical failure occurs in the node or the recording device networked to the node, and/or the above-mentioned divided file data is tampered with in a node or the recording device networked to the node, and in which the node or the recording device networked to the node is stopped (the node or the recording device networked to the node that operates only at night).

Recovery process of file data in the node or the recording device networked to the node may be performed. For details, the missing information is reloaded and recovered to automatically match the latest state for the nodes or the recording devices networked to the nodes that are not in the latest file data management state.

Consideration and Review of Data Guarding

Two Types of Encryption Keys

There are two types of encryption keys to be managed in the system that provides the data saving service that the inventor of the present disclosure has considered and reviewed. Each encryption key has a public key (encryption key) and a secret key (decryption key safekept in a safe-deposit box or the like), but none of the encryption keys are disclosed to third parties.

The two types of encryption keys are an encryption key for distributed file management (first public key (first encryption key), first secret key (first offline decryption key)) and an encryption key for index information management (second public key (second encryption key), second secret key (second decryption key)).

Distributed Management Program

In addition to these two types of encryption keys, the inventor of the present disclosure considered a distributed management program in a system that provides a data saving service to be considered and reviewed. Selectable multiple types (for example, 10 types) of (distribution logic of) distributed management programs are provided. Then, the inventor of the present disclosure considered managing the information of a (distribution logic of) selected distributed management program in node groups located at the specified bases in the consortium-type blockchain. The managing information itself is (distribution logic of) distributed management program information that is meaningless to third parties.

Let customers choose from 10 types of (distribution logic of) distributed management programs. Then, the inventor of the present disclosure considered having the customer safekeep the number of the (distribution logic of) selected distributed management program together with the secret key in a safe-deposit box or the like.

When the three stages of guards described above are applied (a guard by encrypting file data using the encryption key for distributed file management, a guard by encrypting index information using the encryption key for index information management, and a guard by division and distribution using the (distribution logic of) selected distributed management program), the file data may not be analyzed by even a cryptographic analysis using a quantum computer.

Suppose that even if a customer terminal is contaminated and the two types of public keys mentioned above (the first public key (first encryption key) for distributed file management and the second public key (second encryption key) for index information management) are stolen and analyzed, and two types of secret keys: the first secret key (first offline decryption key) for distributed file management, the second secret key (second decryption key) are stolen and analyzed, the algorithms of the program that is linked and associated with the (distribution logic of) the selected distributed management program may not be analyzed (because the process does not use encryption keys).

Differences from Distributed Storage

Note that the distributed file management function in the measures considered and reviewed by the inventor of the present disclosure differs from "distributed storage" in the following points.

The main purpose of "distributed" systems such as distributed clouds, distributed databases, and distributed file management is to distribute data by expanding the "centralized" processing concept as the basic structure, and the "distributed" systems may not distribute up to the core processing functions.

In contrast, the distributed file management function in the measures considered and reviewed by the inventor of the present disclosure distributes and manages up to the core process.

For example, the inventor of the present disclosure implements "multiple" distributed file management functions, records and manages the multiple pieces of index information into the node groups located at the specified bases in the consortium-type blockchain.

Implementation of multiple distributed file management functions differs from ordinal distributed file functions.

The distributed file management function in the measures considered and reviewed by the inventor of this invention is to parallelize multiple systems of the Inter Planetary File System (IPFS) (the cyberattack resistance is questionable if only one system is used), and to simultaneously relate and run each distributed process.

A third party may not restore the original information (file data) using only the index information alone. Furthermore, even if file data corresponding to individual index information is stolen by a third party, only a portion of the divided and meaningless file data would leak, and the content of the original file data is considered not be deciphered from only the leaked portion of the divided file data.

Consideration and Review of Measures for Further Data Guarding

Separation of Distributed Process Functions (Modules)

The system, that provides the data saving service that the inventor of the present disclosure considers and reviews, is considered to be highly resistant against cyberattacks. Because the system uses an encryption key (first public key (first encryption key), the first secret key (first offline decryption key)) for distributed file management and an encryption key (second public key (second encryption key), second secret key (second decryption key)) for index information management are used for different stages of processes respectively.

On that basis, the inventor of the present disclosure is aware of the risks in the event that the customer's terminal is contaminated (in the event of both public keys being stolen and the two secret keys being analyzed through cryptographic analysis using a quantum computer), and considered to take the following steps.

Divide the distributed process functions (modules) into separate functions, such as the distributed process functions (modules) on the upload side and the distributed process functions (modules) on the download side. In addition, multiple patterns of (distribution logic of) distributed management programs in the distributed process function (module) are set. The selection (encryption) of the (distribution logic of) distributed management program in the distributed process function (module) is performed by the customer, and the selection information is managed by the customer until the time of restoration.

Consideration and Review of Distributed Management Program Providers for Distributed Process Functions (Modules)

The inventor of the present disclosure considered that the distributed management program for the distributed process function (module) is provided by a security company, and that the consortium that provides the service of saving customer file data should not be involved in any process other than the IP address management system of the customer terminal that may be used for uploading and downloading.

Restrictions on Provision Period of the Distributed Management Program on the Download-Side (Data Restoration) Module The inventor of the present disclosure considered that the distributed management program in the distributed process function (module) has a function of black box process, only the distributed management program on the upload side (data encryption) module is provided to customers, and the distributed management program on the corresponding download-side (data restoration) module is not provided to customers unless there is an application for data restoration in the event of a failure.

Management of Encryption Keys and the Like.

The inventor of the present disclosure considered that these two types of encryption keys (encryption key for distributed file management and encryption key for index information management) are also recorded in the hardware wallet other than the mnemonic code. Also, the entire set of information, including the record of the corresponding selected module number, is entrusted to a security company and safekept separately from the network.

IP Address Management of Customer Terminals

The inventor considered to record the (upload side) IP address of the customer terminal in the node groups located at the specified bases in the consortium-type blockchain, and not to work for instructions from a terminal other than the recorded IP address of the customer terminal.

The inventor of the present disclosure considered that the consortium members (committees) rather than the customer (whose identity is confirmed and pay a separate response fee) should claim the time of restoring file data (in other words, in a situation where the file data is subject to significant destruction). At that point, the inventor considered to set the fixed private IP address of the terminal declared by the customer wishing to download to the node groups located at the specified bases in the consortium-type blockchain (multisig authentication by (the committee of) the consortium members) to operate the data restoration process.

The inventor of the present disclosure considered to install a download-dedicated application (that makes the customer and the consortium specify the combination number selected by the customer and the consortium for saving the file data to be saved in the process of uploading the file data to the consortium side, and that is distributed by the security company side, not by the consortium) configuring a distributed management program on the download-side (data restoration) module, for a new fixed private IP address terminal to operate the download-dedicated application using the corresponding encryption keys that are safekept by the security company and simultaneously returned from the security company.

Consortium Consent as a Condition of Operation of Download-Dedicated Applications The inventor of the present disclosure considered that when restoration process of the file data occurs, a consent request notification is sent to the consortium members, and if the consortium members do not consent (license) the consent request notification, the download-dedicated application configuring the distributed management program on the downloading side (data restoration) module does not operate.

Note that even if the distributed file management function (upload side) is stolen and decompiled, because of the obfuscation process, deciphering is basically impossible.

License Updating as a Prerequisite for Distributed File Management Functions

The inventor of the present disclosure requires customers to update the license on a regular basis in the system that provides the data saving service that is being considered and reviewed, and if the license is not updated, the distributed file management function would not operate.

Process of Index Information

The inventor of the present disclosure considers that even if a criminal steals and decompiles these modules, the index information to be read for restoring the file data, when written in the node groups located at the specified bases in the consortium-type blockchain, distributed file management functions of multiple nodes and multiple recording devices networked to the nodes in the distributed file management group, process dedicated information (for example, encryption of index information processed to include dummy file data based on the selection of the nodes at each of the bases and the multiple recording devices networked to the nodes, which are to be positioned at a point having the maximum distance=maximum dispersion by adding dummy file data to the divided file data) rather than individual information (for example, the file data record amount specified by the customer) handed over from the customer's upload function.

The inventor of the present disclosure considered for hard-coding the processed index information so that only the file data restoration function (download), that is paired with the dedicated information process by the distributed file management function, may be able to decipher. The inventor of the present disclosure considered that the restoration side of this file data is managed and isolated from the network, and the group (node and the multiple recording devices networked to the nodes) to which the target data is recorded is differentiated according to the type of data saving service contracted by the customer, and file data may not be restored unless combinations of:

- index information processed by a combination of multiple conditions based on the data saving service contract information; and
- dedicated information processed by the distributed-type file management function; are matched.

Combination of Offline Individual Information

The recorded information is not considered to be restored to the original without using a dedicated restoration function that can basically process that logic, since the corresponding index information is deciphered by combining multiple pieces of offline individual information.

In other words, even if a criminal contaminates a customer's IP address, steals and analyzes two types of encryption keys (the encryption key for distributed file management, and the encryption key for index information management) and a process module for distributed file management functions, and even if the multiple recorded nodes (modified encryption codes (encrypted file names) differ in units of groups (distributed file management group) configured with the nodes and the multiple recording devices networked to the nodes, and is offline with the contents managed by the consortium) are attacked, deciphering multiple combinations of offline individual information is impossible.

And data restoration is considered impossible unless a restoration function that is not provided by the security company is activated.

For example, a customer may specify a four (4)-digit code number as a module number of the distributed management program selected by the customer, and a change code number associated with that four (4)-digit code number may be read from the consortium into the upload function as a license. At the same time, as a sub-address information of the blockchain, file formats and names of the divided file data allotted to the nodes at each of the bases are changed into predetermined file formats and names and recorded. Then, a combination of this information and the change parameters on the node side at each of the bases belonging to the distributed file management groups used for distribution and recording is recorded as index information.

When saving file data, the customer is required to specify modules (for example, about 20 types are provided) of the applicable distributed management program using a four (4)-digit code number.

When restoring file data, the customer is handed, for example, 20 types of distributed management program modules that are paired with the distributed management program modules used when saving file data. However, the customer doesn't know which of the 20 types of distributed management program modules is being received as the module for restoring file data.

In this way, the inventor of the present disclosure considered to incorporate a black box process in addition to encryption, and moreover, to make file data impossible to recover unless all of the management information and configurations managed separately by the multiple companies that make up the consortium are in place.

Consideration and Review of Reducing Accumulated Amount of Storage Space

Conventionally, data recorded in blockchains such as public chains basically may not be deleted. Therefore, each time data is recorded in the blockchain, the data storage area is being occupied.

Therefore, the inventor of the present disclosure considered to record each multi-divided file data (in real time using smart contracts) in the nodes located at multiple bases configuring separate planets set according to the conditions specified by the customer, and to be able to delete backup data that has passed a certain time in the consortium-type blockchain.

For example, the inventor considered preparing multiple types of planets and setting different file data safekeeping periods (for example, one year, 5 years, indefinitely, and the like.) for each planet of different types.

As a method of deleting data, the inventor considered automatic process using a smart contract that is set up at the beginning of the construction of the planet, and performing consortium operation to periodically approve deletion of transactions using a multi-signature type.

For details, each file data (multi-divided) recorded in the nodes located at each of the bases configuring each planet and in the recording devices located at multiple bases networked to the nodes is encrypted and chained together as a block, with time data incorporated into the hash.

The safekeeping period for the block is set on a planet-by-planet basis via the smart contract.

Furthermore, the chain of blocks that has passed the safekeeping period set by the smart contract is set to be disconnected via the smart contract.

The inventor of the present disclosure considered that unlike public blockchains in which the co-administrator is unspecified, the consortium-type Block Am Chain has a specified administrator, and is capable of separating the blockchain.

The inventor of the present disclosure considered to be able to record the disassembled data as backup data in an encrypted state via a specified recording medium that is disconnected from the network, before deleting the unnecessary blocks disconnected via the smart contract, The inventor of the present disclosure considered to be able to re-record (roll over) blocks whose safekeeping period has elapsed via a smart contract, in case there is a customer's request.

For details, in order to extend the safekeeping period of the divided file data recorded as the corresponding block in the nodes at multiple bases configuring each planet and in the recording devices at multiple bases networked to the nodes at the bases before the safekeeping period of the block set by the smart contract has elapsed, the inventor of the present disclosure proposed to generate a new block in the nodes at multiple bases configuring each planet via a smart contract, to take over the control number of the old block and change the control number to a new control number, and to record the number again in the nodes at the multiple bases configuring the planets.

Consideration and Review of Measures for Large Data Back Up

The inventor of the present disclosure considered and reviewed measures to enable data saving even for large data that exceeds the record capacity of a block.

First, the inventor of the present disclosure considered that the nodes located at each of the bases belonging to each of the distributed file management groups and the recording devices located at multiple bases networked to the nodes at the bases have multiple sub-configuration file servers each connected to the nodes located at each of the bases or the recording devices located at multiple bases networked to the nodes at the bases.

Then, the inventor of the present disclosure considered that a smart contract that records each of the encrypted and multi-divided file data confirms data recording capacities of each sub-configuration file server connected to the nodes at each of the bases that belongs to each of the distributed file management groups and the recording devices at multiple bases networked to the nodes at the bases. Then, based on the confirmed data record capacity, a specified sub-configuration file server having a data record capacity capable of recording large divided file data is selected. Then, the large divided file data is recorded in the selected sub-configuration file server, and the information of the specified sub-configuration file server where the large divided file data is recorded is recorded into the nodes at each of the bases belong to the distributed file management group that makes up the planet as the second index information.

The inventor of the present disclosure also considered a case in which when the large divided file data recorded in a predetermined sub-configuration file server connected by a smart contract to the nodes at each of the bases that belongs to each of the distributed file management groups and the recording devices at multiple bases networked to the nodes at the bases exceeds the upper limit of the record capacity of the file server, the following procedure is considered.

For divided file data that exceeds the upper limit of the record capacity of the file server, the inventor considered to calculate the remaining recording capacities of each of the other sub-configuration file servers that are connected to the nodes located at each of the bases belonging to each of the distributed file management groups and the recording devices located at multiple bases networked to the nodes at the bases. Then, based on the calculated remaining recording capacities, the sub-configuration file server with the optimal recording destination is selected.

Then, the divided large file data exceeding the upper limit of the record capacity is recorded in the selected sub-configuration file server, and information on the recording destination sub-configuration file server is recorded as the second index information in the nodes at each of the bases belonging to each of the distributed file management groups.

The inventor of the present disclosure considered that, among each sub-configuration file server connected to the nodes at each of the bases that belongs to the distributed file management group and the recording devices at multiple bases networked to the nodes at the bases, when a smart contract confirms large divided file data unable to be recorded in the specified sub-configuration file server, the smart contract automatically records the data exceeding the capacity of the file server in the other sub-configuration file server connected to the nodes at the base and the recording devices at multiple bases networked to the nodes at the bases.

The inventor of the present disclosure proposed that the nodes located at each of the bases belonging to the distributed file management groups configuring each planet and the recording devices located at multiple bases networked to the nodes at the bases, as shown in FIG. 108, for example, are capable of being equipped with additional sub-configuration file servers to be connected.

Consideration and Review of Measures for Restoring Large Data

The inventor of the present disclosure has conducted the following considerations and studies regarding measures for restoring large data.

Upon restoring large data, the second index information recorded in the nodes located at each of the bases belonging to the distributed file management groups configuring the planet and the recording devices located at multiple bases networked to the nodes at the bases is referred to. Then, the sub-configuration file server in which the divided file data is recorded as the second index information is detected. Then, the divided file data is retrieved from the recording destination sub-configuration file server, and the retrieved multiple divided file data is linked to restore the original large divided file data.

Consideration and Review of Data Saving of Combinations of Ordinal Data and Large Data The inventor of the present disclosure has conducted the following considerations and studies regarding data saving of combinations of ordinal data and large-sized data.

The inventor records a daytime small amount of file data in real time in a predetermined confidential blockchain within the range of block capacity. Further, each small amount file data is integrated into one by batch process several times a day. Then, the integrated file data is used by the file data saving system for saving processes ranging from the integrated file data division, encryption, and distributed recording them into the nodes at each of the bases belonging to the distributed file management groups and to the recording devices at multiple bases networked to the nodes at the bases.

Then, the chain of the corresponding block in a predetermined confidential blockchain is cut. Then, the file data recorded in the block is operated to be deleted. To this end, the smart contract that sets the safekeeping period is configured to have a function for setting a safekeeping period of, for example, approximately seven days for a daytime small amount file data.

Other Considerations and Reviews

The inventor of the present disclosure also considered and reviewed the effective use of energy in a system that provides data saving services.

For example, the inventor considered the case of effectively utilizing power sources with unstable power generation, such as wind and solar power generations.

When there is AC-DC-AC change, has a large power loss. However, in the case of solar power generation, for example, if you use the direct current generated directly as a server power source and store the surplus power in a battery to operate in times of shortage, there is no need to convert it to alternating current, which reduces power loss.

Therefore, the inventor of the present disclosure considered that the nodes at bases and the recording devices located at multiple bases networked to the nodes at the bases where divided file data is distributed, recorded and safekept, shall be the nodes at bases and the multiple recording devices networked to the nodes at the bases having different sunlight hours in the world.

Then, a smart contract is run that records each of the encrypted and multi-divided file data during sunlight hours in the nodes located at each of the bases and the multiple recording devices networked to the nodes. During cloudy days and time frames when power generation is weak in the morning and evening, the battery is used to run the smart contract that records each of the encrypted and multi-divided file data.

However, since power efficiency is low if servers of the nodes and the multiple recording devices networked to the nodes are operated at night when power is not generated, the servers of the nodes and the multiple recording devices networked to the nodes automatically shut down for the power supply to provide backup power at night.

The operation control configuration is such that servers are operated for 8 hours and stops for 16 hours. Then, for example, each base for safekeeping is configured to operate in three patterns of three eight-hour time frames or in two patterns of two twelve-hour time frames. Then, distributed recording and retrieval of each of the encrypted and multi-divided file data may be performed only during the operating time of the server of the node at that base.

In this way, power loss may be significantly reduced and efficiently save and restore file data.

The inventors of the present invention have also considered and reviewed measures to reduce costs.

The file data record amount by each participant in the consortium-type blockchain on its own node and the information on the file data record capacity of the node provided by each participant are assembled as a whole, and calculate the differences between the total file data record amount in the nodes (for data recording) and the file data record capacity of the nodes (for data recording) provided by each participant. Then, a function is implemented to collect and distribute the amount to each participant based on the differences.

For example, when there are 10 nodes (for data recording), (for example, 10 gigabytes here) is required for recording file data that is 10 times the file data record amount in the node (for example, 1 gigabyte).

Here, when the file data record capacity of the participant's node (for data recording) is eight gigabytes, the participant will pay an amount equivalent to two gigabytes.

On the other hand, when the file data record capacity of the participant's physical node (for data recording) is 12 gigabytes, the amount equivalent to two gigabytes may be received.

This amount is automatically received via a smart contract in stable coins or digital currencies.

The inventor of the present disclosure combined the measures derived from the above-mentioned considerations and studies as appropriate assuming various cases, and after further considerations and studies, the inventor determined that the digital technology that strongly and efficiently protects important information such as confidential information and personal information from destruction, and may restore the important information without being stolen by a third party even if the important information is subjected to cryptographic analysis using quantum computers or EMP attacks. This led to the derivation of an asset guard service provision system.

the digital asset guard service provision system according to the present invention guards digital assets against high-level cyberattacks, comprising a decentralized ledger using the dispersed technique such as blockchains and the like, and the smart contract or server application for performing the predetermined process using the data managed in the decentralized ledger, the digital asset guard service provision system is characterized by comprising:

the consortium-type blockchain configured with multiple planets (a planet is a unit making up a blockchain) comprising a node group in which the nodes located at multiple bases in different regions in the world are linked;

the file data saving system; and the file data restoration system;

wherein the nodes located at each of the bases are networked to the recording devices at the multiple bases in the different regions in the world to form distributed file management groups, wherein the file data saving system comprises:

- a program or smart contract having multiple encryption and division algorithms;
- encryption and division algorithm selection reception means;
- the file data saving instruction reception means;
- the file data encryption and division means;
- the upload means;
- a smart contract for allotting distributed file management groups;
- a smart contract for distribution and recording;
- a smart contract for generating and recording system setting information;
- a smart contract for generating server index information;
- a smart contract or a program having a wallet function for generating customer setting information;
- a smart contract or a program having a wallet function for generating customer index information; and
- the first data deletion means;

wherein the file data restoration system comprises:

- a program or smart contract having multiple decryption and linkage algorithms;
- the file data extraction instruction reception means;
- a smart contract for extracting encrypted server index information;
- a smart contract for decrypting server index information;

a smart contract for extracting encrypted and divided file data;

a download means;

the file data restoration means; and the second data deletion means;

wherein the multiple program or smart contract having encryption and division algorithms is configured to have the different file data encryption and division process method, wherein the encryption and division algorithm selection reception means is configured to accept a selection of a program or smart contract having predetermined encryption and division algorithms based on the first parameter specified by a customer who desires to save the file data, wherein the file data saving instruction reception means is configured to accept a file data saving instruction from a customer who desires to save the file data, wherein the file data encryption and division means is configured to encrypt and multi-divide the customer file data to be saved, the customer file data being accepted by the file data saving instruction reception means, using the program or smart contract having encryption and division algorithms accepted by the encryption and division algorithm selection reception means, wherein the upload means is configured to upload each file data encrypted and multi-divided by the file data encryption and division means to the first temporary storage area, wherein the smart contract for allotting distributed file management group is configured to have a function for allotting, each of the file data (that is encrypted and multi-divided by the file data encryption and division means, and) uploaded into the first temporary storage area by the upload means, to the multiple distributed file management groups, (which is configured with the nodes located at each of the bases configuring for the planet set on a co-administrator side in a condition specified by a customer and the recording devices located at multiple bases networked to the nodes at the bases) based on the first parameter and the second parameter specified by the co-administrator of the consortium-type blockchain, wherein the smart contract for distribution and recording is configured to have a function to distribute and record, each file data allotted by the smart contract for allotting distributed file management groups, to the nodes located at each of the bases belonging to each of the corresponding distributed file management groups and to the recording devices located at multiple bases networked to the nodes at the bases, wherein the smart contract for generating and recording system setting information is configured to have a function for generating and encrypting system setting information and recording into the node groups located at the specified bases in the consortium-type blockchain, wherein the system setting information comprises:

destination identifying information such as terminal information (fixed IP addresses and the like) for uploading the system setting information to the first temporary storage area using the upload means;

a predetermined smart contract number that performs a process corresponding to a recording destination of customer file data:

planet information to which a recording destination of file data belongs; and information on a file server group at the nodes at predetermined bases and the recording devices located at multiple bases networked to the nodes at the bases configuring distributed file management groups;

wherein the smart contract for generating server index information is configured to have a function for generating server index information, wherein the server index information comprises:

information on file names of each file data distributed and recorded by each of the smart contracts for distribution and recording; and configuration information of each of the distributed file management groups which are allotment destinations of each file data, wherein a smart contract for recording server index information is configured to have a function for encrypting server index information generated by the smart contract for generating server index information and for recording the server index information into node groups located at specified bases in the consortium-type blockchain, wherein the smart contract or program having a wallet function for generating customer setting information is configured to have a function for generating customer setting information, wherein the customer setting information comprises the first parameter setting information associated with the program or smart contract having encryption and division algorithms accepted by the encryption and division algorithm selection reception means;

wherein the smart contract or program having a wallet function for generating customer index information is configured to have a function for generating customer index information, wherein the customer index information comprises information of an original file name and an upload date of customer file data to be saved, wherein the smart contract for recording customer index information is configured to have a function for encrypting customer index information generated by the smart contract or program having a wallet function for generating customer index information, and for recording the encrypted customer index information into node groups located at specified bases in the consortium-type blockchain, wherein the first data deletion means is configured to delete each file data uploaded into the first temporary storage area, after the server index information is encrypted by the smart contract for recording server index information and recorded in node groups located at specified bases in the consortium-type blockchain, wherein the programs or smart contracts having the multiple decryption and linkage algorithms are configured to differentiate each of the file data decryption and linkage process methods that are associated with the program or smart contract having each of the encryption and division algorithms, wherein the file data extraction instruction reception means is configured to accept a file data extraction instruction from a customer who desires to restore the file data, wherein the smart contract for extracting encrypted server index information is configured to have a function for extracting encrypted server index information (recorded in node groups located at specified bases in the consortium-type blockchain by the smart contract for recording server index information) based on the first parameter or first compound parameter associated with the file data to be extracted accepted by the file data extraction instruction reception means and on the second parameter or second compound parameter, wherein the first compound parameter comprises a pair of a first decryption parameter specified by a customer and managed offline and the first encryption parameter automatically generated from the first decryption parameter, wherein the second compound parameter is configured with a pair of the second decryption parameter specified by a co-administrator and managed offline (which is incorporated and modularized within the predetermined smart contract that performs the corresponding process) and the second encryption parameter automatically generated from the second decryption parameter (which is incorporated and modularized within the predetermined smart contract that performs the corresponding process), wherein the smart contract for decrypting server index information is configured to have a function for decrypting the encrypted server index information extracted by the smart contract for extracting encrypted server index information, wherein the smart contract for extracting encrypted and divided file data is configured to have a function for extracting the encrypted and multi-divided file data which are allotted to each of the distributed file management groups by the smart contract for allotting distributed file management groups, and which are distributed and recorded in the nodes located at each of the bases belonging to each of the distributed file management groups and in the recording devices located at multiple bases networked to the nodes at the bases by each of the smart contracts for distribution and recording, from any of the nodes located at each of the bases belonging to each of the distributed file management groups or from the recording devices located at multiple bases networked to the nodes at the bases, using the server index information decrypted by the smart contract for decrypting server index information, wherein the download means is configured to download each of the encrypted and multi-divided file data, extracted by the smart contract for extracting encrypted and multi-divided file data, to the second temporary storage area, wherein the file data restoration means is configured to decrypt, each of the encrypted and multi-divided file data which are extracted by the smart contract for extracting encrypted and multi-divided file data and downloaded to the second temporary storage area by the download means, to integrate into one file data and to restore to the file data before being saved, using a program or smart contract having decryption and linkage algorithms associated with the program or smart contract having encryption and division algorithms accepted by the encryption and division algorithm selection reception means, and wherein the second data deletion means is configured to delete each of the encrypted and multi-divided file data downloaded to the second temporary storage area after restored to the file data before being saved by the file data restoration means.

A configuration such as the digital asset guard service provision system of the present invention:

"comprising a consortium-type blockchain configured with multiple planets (one unit configuring a blockchain) configured with node groups in which the nodes located at multiple bases in different regions in the world are combined, the nodes located at each of the bases networked to the recording devices located at multiple bases in different regions in the world to form distributed file management groups":

"multi-dividing customer file data to be saved"; and

"distributing and recording each multi-divided file data in the nodes at each of the bases that belongs to the distributed file management groups and the recording devices networked to the nodes at the bases", may protect the nodes located at other bases belonging to the distributed file management groups or the recording devices networked to the nodes from attacks and the file data may be preserved, even if the nodes at one base belonging to distributed file management groups or the recording devices networked to the nodes is attacked by the EMP attack, and the customer divided file data to be saved is lost.

The file data saving system as in the digital asset guard service provision system of the present invention comprising:

"the program or smart contract having multiple encryption and division algorithms with different file data encryption and division process methods";

"the encryption and division algorithm selection reception means that accepts the selection of a program or smart contract having predetermined encryption and division algorithms based on the first parameter specified by a customer who desires to save the file data";

"the file data encryption and division means that encrypts and multi-divides the customer file data to be saved using the program or smart contract having encryption and division algorithms accepted by the encryption and division algorithm selection reception means";

"the smart contract for allotting distributed file management groups having a function of allotting, each file data encrypted and multi-divided by the file data encryption and division means and uploaded to the first temporary storage area by the upload means, to the multiple distributed file management groups configured with the nodes at each of the bases and multiple devices at multiple bases networked to the nodes at the bases configured for the planet set on the co-administrator side in the customer specified condition based on the first parameter and the second parameter specified by the co-administrator of the consortium-type blockchain"; and "the smart contract for distribution and recording having a function of distributing and recording, each file data allotted by the smart contract for allotting distributed file management groups, into the nodes at each of the bases belonging to each of the corresponding distributed file management groups and the recording devices at multiple bases networked to the nodes at the bases", may strengthen attack resistance against cyber attacks by quantum computers and save customer's file data as follows.

(X1) The customer file data to be saved is encrypted and multi-divided. Therefore, in order to decrypt the contents of the file data, a malicious third party would have to decipher the encrypted and multi-divided file data and integrate the file data into one.

(X2) Encryption and multiple divisions of customer file data are performed using a program or smart contract having a predetermined multiple encryption and division algorithms selected based on the first parameter specified by the customer, among programs or smart contracts having multiple encryption division algorithms so that a malicious third party would have to identify the program or smart contract having encryption and division algorithms selected for the encryption and multi-division in order to decrypt the encrypted and multi-divided file data and integrate the file data into one.

(X3) In order to identify the program or smart contract having encryption and division algorithms selected for encryption and multiple divisions, a malicious third party must comprehend the contents of the first parameter specified by the customer.

(X4) Each file data encrypted and multi-divided by the file data encryption and division means and uploaded into the first temporary storage area by the upload means is allotted to distributed file management groups configured with the nodes located at multiple bases and the recording devices located at multiple bases networked to the nodes at the bases, which are configured for a planet set on the co-administrator side according to conditions specified by the customer using the smart contract for allotting distributed file management groups. For this reason, a malicious third party would have to comprehend that the encrypted and multi-divided file data uploaded into the first temporary storage area by the upload means is allotted to which of multiple distributed file management groups configured with the nodes at multiple bases and the recording devices at multiple bases networked to the nodes at the bases configured for which planet, by the smart contract for allotting distributed file management groups.

(X5) Allotment of each of the encrypted and multi-divided file data by the file data encryption and division means and uploaded into the first temporary storage area by the upload means, the allotment being allotted by the smart contract for allotting distributed file management groups, to the multiple distributed file management groups configured with the nodes at multiple bases configured for the planet set on the co-administrator side according to conditions specified by the customer, is based on the first parameter specified by the customer and the second parameter specified by the co-administrator of the consortium-type blockchain.

For this reason, in order for a malicious third party to comprehend that each of the encrypted and multi-divided file data uploaded into the first temporary storage area by the upload means is allotted to which of the multiple distributed file management group that is configured with the nodes at multiple bases configured for which planet and the recording devices at multiple bases networked to the nodes at the bases, a malicious third party would have to comprehend the contents of the second parameter specified by the co-administrator of the consortium-type blockchain in addition to the first parameter specified by the customer.

(X6) Moreover, the malicious third party would have to comprehend that the distribution destination by the smart contract for allotting distributed file management groups is determined by the first parameter and the second parameter.

When the first parameter specified by the customer and the second parameter specified by the co-administrator of the consortium-type blockchain are safekept offline, the above-mentioned steps (X1) through (X6) would almost be impossible to be executed even if a quantum computer is used.

In addition, the file data saving system, as in the digital asset guard service provision system of the present invention, configured to further comprising:

"the smart contract for generating server index information that has a function of generating server index information having file name information of each file data distributed and recorded by each of the smart contracts for distribution and recording and configuration information of each of the distributed file management groups to which each file data is allotted"; and "the smart contract for recording server index information that has a function for encrypting server index information generated by the smart contract for generating server index information and for recording into the node groups located at the specified bases in the consortium-type blockchain" may strengthen attack resistance against cyber attacks by quantum computers and save customer's file data as follows.

(X7) The above-mentioned server index information generated by the smart contract for generating server index information is information necessary for deciphering the data, however, the server index information is encrypted by the smart contract for recording server index information. Therefore, a malicious third party would have to decrypt the encrypted server index information.

(X8) Furthermore, in order to decrypt the encrypted server index information, a malicious third party would have to decipher the process content used for encryption.

(X9) Server index information is recorded in the node groups located at the specified bases in the consortium-type blockchain, however, since the information recorded in the node groups located at the specified bases is encrypted, the consortium (co-administrator) may not comprehend what kind of information is the server index information. For this reason, a malicious third party would have to identify information that the consortium may not comprehend as server index information for a predetermined customer file data.

Therefore, even if a quantum computer is used, executing all of (X7) through (X9) in addition to (X1) through (X6) above would be even more difficult.

The file data restoration system, as in the digital asset guard service provision system of the present invention, being configured to comprise:

"the smart contract for extracting encrypted server index information that has a function of extracting server index information in an encrypted state (recorded in node groups located at specified bases in the consortium-type blockchain by a smart contract for recording server index information), based on the first parameter or a first compound parameter (comprising a pair of the first parameter specified by a customer and managed offline and the first encryption parameter automatically generated from the first decryption parameter), and the second parameter or the second compound parameter (comprising a pair of second decryption parameter (integrated and modularized in a predetermined smart contract performing a corresponding process) specified by a co-administrator and managed offline and the second encryption parameter automatically generated from the second decryption parameter (incorporated and modularized into the predetermined smart contract that performs the corresponding process)"

"the smart contract for decrypting server index information that has a function of decrypting encrypted server index information extracted by a smart contract for extracting encrypted server index information" and "the smart contract for extracting, encrypted and divided file data having a function of extracting each of the encrypted and multi-divided file data, which is allotted to each of the distributed file management groups using server index information decrypted by the smart contract for decrypting server index information and which is distributed and recorded in the nodes located at each of the bases belonging to each of the distributed file management groups and in the recording devices located at multiple bases networked to the nodes at the bases, by each of the smart contracts for distribution and recording, from any of the nodes at the bases belonging to the distributed file management group and the recording devices located at multiple bases networked to the nodes at the bases" may strengthen attack resistance against cyberattacks by quantum computers and set file data that the customer desires to restore to the state before being allotted by the smart contract for allotting distributed file management groups.

(X10) The extraction of the encrypted server index information recorded in node groups at specified bases in the consortium-type blockchain by a smart contract for extracting encrypted server index information is based on:

a first parameter specified by the customer or first compound parameter (configured with a pair of a first decryption parameter specified by the customer and managed offline and the first encryption parameter automatically generated from the first decryption parameter); and the second parameter specified by a co-administrator of the consortium-type blockchain or the second compound parameter (configured with a pair of the second decryption parameter specified by the co-administrator and managed offline (integrated and modularized in a predetermined smart contract performing a corresponding process) and the second encryption parameter automatically generated from the second decryption parameter (integrated and modularized in a predetermined smart contract performing a corresponding process)).

Therefore, a malicious third party would have to comprehend the contents of the second parameter specified by the co-administrator of the consortium-type blockchain or the second compound parameter comprising a pair of the second decryption parameter (specified by the co-administrator and managed offline (integrated and modularized in the predetermined smart contract performing the corresponding process) and the second encryption parameter automatically generated from the second decryption parameter (integrated and modularized in the predetermined smart contract performing the corresponding process), in addition to the first parameter specified by the customer or the first compound parameter (comprising a pair of the first decryption parameter specified by the customer and managed offline and the first encryption parameter automatically generated from the first decryption parameter).

The first parameter specified by the customer or the first compound parameter (comprising a pair of the first decryption parameter specified by the customer and managed offline, and the first encryption parameter automatically generated from the first decryption parameter); and the second parameter specified by the co-administrator of the consortium-type blockchain or the second compound parameter (comprising a pair of the second decryption parameter (integrated and modularized in the predetermined smart contract performing the corresponding process and) specified by the co-administrator and managed offline, and the second encryption parameter (integrated and modularized in the predetermined smart contract performing the corresponding process and) automatically generated from the second decryption parameter);

are respectively safekept offline, therefore, the above-mentioned step (X10) may be almost impossible to execute even using a quantum computer. And subsequently, the decryption of the encrypted server index information by the smart contract for decrypting server index information and the extraction of encrypted and multi-divided file data by the smart contract for extracting encrypted and divided file data becomes almost impossible.

The file data restoration system, as in the digital asset guard service provision system of the present invention, being configured to comprise:

"the program or smart contract having multiple encryption and linkage algorithms having different file data encryption and linkage process method associated with each of the program or smart contract having encryption and division algorithms"; and "the file data restoration means decrypts and links each of the encrypted and multi-divided file data extracted by the smart contract for extracting encrypted and divided file data to one file data and restores the file data before being saved, using the program or smart contract having decryption and linkage algorithms that is associated with the program or smart contract having encryption and division algorithms accepted by the encryption and division algorithm selection reception means";

may strengthen attack resistance against cyber attacks by quantum computers and restore file data that the customer desires to restore to the state before being saved.

(X11) The customer file data to be restored is encrypted and multi-divided. Therefore, in order to decrypt the contents of the file data, a malicious third party would have to decipher the encrypted and multi-divided file data and integrate the file data into one.

(X12) Decryption and integration into one file data of encrypted and multi-divided file data is made by the program or smart contract having decryption and linkage algorithms associated with the program or smart contract having encryption and division algorithms accepted by the predetermined encryption and division algorithm selection reception means that is selected based on the first parameter specified by the customer among programs or smart contracts that have multiple decryption and linkage algorithms with different file data decryption and linkage process methods associated with each program or smart contract having encryption and division algorithms. Therefore, a malicious third party would have to identify the program or smart contract having decryption and linkage algorithms associated with the program or smart contract having encryption and division algorithms selected for encrypting and multi-dividing the encrypted and multi-divided file data in order to decrypt and integrate the encrypted and multi-divided file data into one.

(X13) To identify the program or smart contract having decryption and linkage algorithms associated with the program or smart contract having encryption and division algorithms, a malicious third party would have to comprehend the contents of the first parameter specified by the customer.

However, when the first parameter specified by the customer is safekept offline, executing (X11) through (X13) above becomes almost impossible even using a quantum computer.

As the digital asset guard service provision system of the present invention, the digital asset guard service provision system is configured to have "the data first deletion means that deletes each file data uploaded to the first temporary storage area after the server index information is encrypted and recorded in node groups located at specified bases in the consortium-type blockchain by the smart contract for recording server index information".

By configuring the smart contract for allotting distributed file management groups to have "a function for changing, file formats and names of each file data encrypted and multi-divided by the file data encryption and division means and uploaded to the first storage area by the upload means before allotting to the multiple distributed file management groups", file data having the same file formats and names as file formats and names of each of the file data divided and encrypted by the customer side file data saving system would not exist completely in the co-administrator side file data saving system, when each of the file data divided and encrypted by the customer side file data saving system is made to have file formats and names different from the file formats and names of each divided and encrypted file data distributed and recorded in the co-administrator side file data saving system.

Therefore, even if file data distribute, recorded and safekept in the co-administrator side file data saving system is leaked, a third party would have extreme difficulties to recognize that the leaked file data is the original file data that is saved by the customer. Therefore, the digital asset guard service provision system may even further strengthen the attack resistance of digital assets against high-level cyberattacks.

As in the digital asset guard service provision system of the present invention, the digital asset guard service provision system configured to have "the second deletion means that deletes each of the encrypted and multi-divided file data downloaded to the second temporary storage area after restored to the file data before being saved by the file data restoration means" would no longer generate a risk that a malicious third party may steal the encrypted and multi-divided file data remaining in the second temporary storage area, and the digital asset guard service provision system may further strengthen attack resistance of digital assets against high-level cyberattacks after the customer restores the file data.

Further, the digital asset guard service provision system of the present invention is preferably configured with:

the file data saving system comprising the customer side file data saving system operated on the customer side who desires to save the file data; and the co-administrator side file data saving system operated on the co-administrator side of the consortium-type blockchain;

the file data saving system on the customer side comprising a program or smart contract having the multiple encryption and division algorithms, encryption and division algorithm selection reception means, the file data saving instruction reception means, the file data encryption and division means, the upload means, a smart contract or program having a wallet function for generating customer index information, and the smart contract for recording customer index information;

the co-administrator side file data saving system comprising the smart contract for allotting the distributed file management groups, the smart contract for distribution and recording, the smart contract for generating server index information, the smart contract for recording server index information and the first data deletion means;

the file data restoration system comprising a combination of the customer side file data restoration system that operates on the customer side desiring to restore the saved file data, and the co-administrator side file data restoration system that operates on the co-administrator side of the consortium-type blockchain, both of the customer side file data restoration system and the co-administrator side file data restoration system that are perfectly and independently formed respectively;

the customer side file data restoration system comprising the program or smart contract having multiple encryption and linkage algorithms, the file data extraction instruction reception means, the download means, the file data restoration means and the second data deletion means; and the co-administrator side file data restoration system comprising the smart contract for extracting encrypted server index information, the smart contract for decrypting server index information and the smart contract for extracting encrypted and divided file data.

In this way, when the file data saving system is configured with the customer side file data saving system and the co-administrator side file data saving system, there would be no risk that the first parameter and the second parameter are stolen at the same time when the first parameter specified by the customer and the second parameters specified by the co-administrator of the consortium-type blockchain are separately and respectively safekept offline. Moreover, the process in the customer side file data saving system and the process in the co-administrator side file data saving system are fragmented. Therefore, the risk of being stolen by a malicious third party at the same time is extremely decreased that process data for the file data saving in the file data saving systems of both the customer side and the co-administrator side.

Furthermore, even if the process data for the file data saving in the file data saving systems of both the customer side and the co-administrator side is stolen by a malicious third party, associating the process data for the file data saving in the customer side file data saving system with the process data for the file data saving in the co-administrator side file data saving system may be extremely difficult.

Moreover, as in the digital asset guard service provision system of the present invention, the co-administrator side file data saving system configured to have "the first deletion means that deletes each file data uploaded to the first temporary storage area after server index information is encrypted and recorded in node groups located at specified bases in the consortium-type blockchain by the smart contract for recording server index information", by configuring the smart contract for allotting distributed file management groups to have "a function for changing, file formats and names of each file data encrypted and multi-divided by the file data encryption and division means and uploaded to the first storage area by the upload means before allotting to the multiple distributed file management groups", each of the divided and encrypted file data distributed and recorded in the co-administrator side file data saving system having the same file formats and names as file formats and names of each of the file data divided and encrypted by the customer side file data saving system would not exist completely in the co-administrator side file data saving system, when each file data divided and encrypted by the customer side file data saving system is made to have file formats and names different from the file formats and names of each of the divided and encrypted file data distributed and recorded in the co-administrator side file data saving system.

Therefore, even if file data distribute, recorded and safekept in the co-administrator side file data saving system is leaked, a third party would have extreme difficulties to recognize that the leaked file data is the original file data targeted to be saved by the customer. Therefore, the digital asset guard service provision system may even further strengthen the attack resistance of digital assets against high-level cyberattacks.

Furthermore, the digital asset guard service provision system of the present invention, when the file data restoration system is configured with the customer side file data restoration system and the co-administrator side file data restoration system, there would be no risk that the first parameter and the second parameter are stolen at the same time when the first parameter specified by the customer and the second parameters specified by the co-administrator of the consortium-type blockchain are separately and respectively safekept offline. Moreover, the process in the customer side file data restoration system and the process in the co-administrator side file data restoration system are fragmented. Therefore, the risk is extremely decreased that process data for the file data restoration in the file data restoration systems of both the customer side and the co-administrator side is stolen by a malicious third party at the same time.

Furthermore, even if the process data for the file data restoration in the file data restoration systems of both the customer side and the co-administrator side is stolen by a malicious third party, associating the process data for the file data restoration in the customer side file data restoration system with the process data for the file data restoration in the co-administrator side file data restoration system may be extremely difficult.

Moreover, as in the digital asset guard service provision system of the present invention, the customer side file data restoration system configured to have "the second deletion means that deletes each of the encrypted and multi-divided file data uploaded to the second temporary storage area after restored to the file data before being saved by the file data restoration means" eliminates a risk that a malicious third party may steal the encrypted and multi-divided file data remaining in the second temporary storage area, and the digital asset guard service provision system may further strengthen attack resistance of digital assets against high-level cyberattacks Further, in the digital asset guard service provision system of the present invention, the smart contract for allotting distributed file management groups is further and preferably configured to have a function for converting the file formats and names of each file data (encrypted and multi-divided by the file data encryption and division means and) uploaded into the first temporary storage area by the upload means to predetermined file formats and names before slotting to the multiple distributed file management groups, and the smart contract for extracting encrypted and divided file data is further configured to have a function for converting the file formats and names of each of the extracted file data into the original file formats and names after each of the encrypted and multi-divided file data is extracted.

As in the digital asset guard service provision system of the present invention, when the smart contract for allotting distributed file management groups is configured to have "a function for changing, file formats and names of each file data encrypted and multi-divided by the file data encryption and division means and uploaded to the first storage area into a predetermined file formats and names by the upload means before allotting to the multiple distributed file management groups", the file data formats and names of each file data divided and encrypted by the customer side file data saving system would be different from the file data formats and names of each file data distributed and recorded by the co-administrator side file data saving system.

Therefore, even if file data distributed, recorded and safekept in the co-administrator side file data saving system is leaked, a third party would have extreme difficulties to recognize that the leaked file data is the original file data targeted to be saved by the customer. Therefore, the digital asset guard service provision system may even further strengthen the attack resistance of digital assets against high-level cyberattacks.

In addition, as in the digital asset guard service provision system of the present invention, the smart contract for extracting encrypted and multi-divided file data is configured to have "a function for changing the file formats and names of file data to the original file formats and names after each of the encrypted and multi-divided file data is extracted", may make the file formats and names of each of the extracted file data be different from the file formats and names of each file data that is divided and encrypted by the customer side file data saving system, and even the file data distributed and recorded in the co-administrator side file data saving system may be restored to the original file data by linking and decrypting by the customer side file data restoration system when restoring the file data.

Further, preferably in the digital asset guard service provision system of the present invention:

the first parameter has a file division code and a file storage code;

the encryption and division algorithm selection reception means is configured to accept selections by the program or smart contract having the predetermined encryption and division algorithms based on the file division code;

the smart contract for allotting distributed file management groups is configured to have a function for processing the following processes 4-1 through 4-3;

each of the smart contracts for distributing and recording is configured to have a function for distribution and recording each file data allotted by the smart contract for allotting distributed fie management groups to the nodes located at each of the bases belonging to each of the corresponding file management groups and the recording devices located at multiple bases networked to the nodes at the bases;

the smart contract for extracting encrypted and divided file data is configured to have a function for performing processes 4-4 through 4-6; and the file data restoration means is configured to have a function for decrypting and linking, each encrypted and divided file data extracted by the smart contract for extracting encrypted and divided file data downloaded by the download means to second temporary storage area, to one file data based on the file division code using the program or smart contract having decryption and linkage algorithms associated with the program or smart contract having encryption and division algorithms accepted by the encryption and division algorithm selection reception means.

(Process 4-1) The smart contract for allotting distributed file management groups changes the file formats and names of each file data (encrypted and multi-divided by the file data encryption and division means and) uploaded to the first temporary storage area by the upload means to predetermined file formats and names based on the file storage code and the second parameter.

(Process 4-2) The smart contract for allotting distributed file management groups performs the process 4-1 and at the same time encrypts the file data.

(Process 4-3) After performing the process 4-2, the smart contract for allotting distributed file management groups allots to multiple distributed file management groups configured with the nodes located at multiple bases formed for the planet set on the co-administrator side according to the conditions specified by the customer and the recording devices located at multiple bases networked to the nodes at the bases.

(Process 4-4) The smart contract for extracting encrypted and divided file data extracts, each of the encrypted and multi-divided file data that are allotted by the smart contract for allotting distributed file management groups, distributed and recorded by each of the smart contracts for distribution and recording in the nodes located at each of the bases belonging to each of the distributed file management groups and in the recording devices located at multiple bases networked to the nodes at the bases, from any of the nodes located at each of the bases belonging to each of the distributed file management groups and in the recording devices located at multiple bases networked to the nodes at the bases based on the file storage code and the second parameter.

(Process 4-5) The smart contract for extracting encrypted and divided file data decrypts the file data extracted in the process 4-4.

(Process 4-6) The smart contract for extracting encrypted and divided file data performs the process 4-5 and at the same time changes the file formats and names of the file data to the original file formats and names.

With this configuration, the parameters specified by the customer, which are used in each of the process stages of the file data saving process and file data restoration process, become complicated. Therefore, the parameters used in each of the process stages of the file data saving process and file data restoration process may become harder to be comprehended by a malicious third party, further strengthen attack resistance against cyberattacks by quantum computers and enable customer file data to be saved and restored.

Further, the smart contract for allotting distributed file management groups not only makes the file formats and names of each file data that is divided and encrypted by the customer side file data saving system different, but also encrypts the file formats and names. Therefore, even if file data distribute, recorded and safekept in the co-administrator side file data saving system is leaked, a third party would have even more difficulties to recognize that the leaked file data is the original file data targeted to be saved by the customer. Therefore, attack resistance of digital assets against high-level cyberattacks may further be strengthened.

Further, in the digital asset guard service provision system of the present invention, the file data encryption and division means is preferably configured to perform the processes 5-1 and 5-2, and the file data restoration means is configured to perform the processes 5-3 and 5-4.

(Processes 5-1) The file data encryption and division means multi-divides the customer file data to be saved, accepted by the file data saving instruction reception means, using the program or smart contract having encryption and division algorithms accepted by the encryption and division algorithm selection reception means.

(Process 5-2) The file data encryption and division means performs the process 5-1, and encrypts each multi-divided file data based on the first public key, that is the first encryption key generated by the customer.

(Process 5-3) The file data restoration means decrypts each of the encrypted and multi-divided file data extracted by the smart contract for extracting encrypted and divided file data and downloaded to the second temporary storage area by the download means based on the first secret key, that is the first offline decryption key generated by the customer.

(Process 5-4) The file data restoration means performs the process 5-3 and links each decrypted file data to one file data using the smart contract having decryption and linkage algorithms associated with the program or smart contract having encryption and division algorithms accepted by the encryption and division algorithm selection reception means.

In this way, the file data encryption and division means configured to "multi-divide the customer file data to be saved using a program or smart contract having encryption and division algorithms, and to encrypt each multi-divided file data based on the first public key, that is the first encryption key generated by the customer" even more strengthens attack resistance against cyberattacks by quantum computers and may save customer file data as follows.

(X14) In order to encrypt each multi-divided file data by the file data encryption and division means, the first public key, that is the first encryption key generated by the customer are required. Therefore, in order to decrypt and integrate encrypted and multi-divided file data into one, a malicious third party is required to comprehend the first public key, that is the first encryption key generated by the customer in addition to identifying the program (or smart contact) having encryption and division algorithms selected for encryption and multiple divisions as a preliminary analysis work.

Accordingly, by safekeeping offline the first parameter specified by the customer and the first public key, that is the first encryption key generated by the customer, the above-mentioned process X14 may be almost impossible to be executed even if a quantum computer is used.

In addition, the file data restoration means configured to "decrypt each of the encrypted and multi-divided file data based on the first secret key, that is the first offline decryption key generated by the customer, and to link each decrypted file data to one file data using the program or smart contract having multiple decryption and linkage algorithms associated with the program or smart contract having encryption and division algorithms" may further strengthen the attack resistance against cyberattacks by quantum computers and restore the customer file data as follows.

(X15) In order to decrypt each of the encrypted and multi-divided file data, the first secret key, that is the first offline decryption key generated by the customer are required. Therefore, in order to decrypt and integrate encrypted and multi-divided file data into one, a malicious third party would have to comprehend the first secret key, that is, the first offline decryption key generated by the customer in addition to identifying the program or smart contract having multiple decryption and linkage algorithms associated with the program or smart contract having encryption and division algorithms selected for encrypting and multi-dividing the file data.

Therefore, by safekeeping offline the first parameter specified by the customer and the first secret key, that is, the first offline decryption key generated by the customer respectively, even if a quantum computer is used, executing the above-mentioned step (X15) becomes almost impossible.

Further, in the digital asset guard service provision system of the present invention, preferably, the file data encryption and division means is configured to perform the following processes 6-1 and 6-2), and the file data restoration means is configured to perform the following processes 6-3 and 6-4.

(Process 6-1) The file data encryption and division means encrypts the customer file data to be saved, accepted by the file data saving instruction reception means, based on the first public key, that is the first encryption key generated by the customer.

(Process 6-2) The file data encryption and division means performs the process 6-1 and multi-divides the encrypted file data using the program or smart contract having encryption and division algorithms accepted by the encryption and division algorithm selection reception means.

(Process 6-3) The file data restoration means links into one file data, each of the encrypted and multi-divided file data extracted by the smart contract for extracting encrypted and multi-divided file data and downloaded to the second temporary storage area by the download means, using the program or smart contract having encryption reception means.

(Process 6-4) The file data restoration means performs the process 6-3, and decrypts the linked one file data based on the first secret key, that is, the first offline decryption key generated by the customer.

With this configuration, as described in (X14) and (X15) above, the configuration may further strengthen the attack resistance against cyberattacks by quantum computers to save customer file data.

Further, in the digital asset guard service provision system of the present invention, preferably, the smart contract for recording server index information is configured to have a function for encrypting server index information generated by the smart contract for generating server index information based on, the second public key (second encryption key) generated by the co-administrator of the consortium-type blockchain, or based on the second encryption parameter (integrated and modularized in a predetermined smart contract performing corresponding processes) automatically generated from the second decryption parameter (integrated and modularized in a predetermined smart contract performing corresponding processes) specified by the co-administrator and managed offline, and the smart contract for decrypting server index information is configured to have a function for decrypting the encrypted server index information extracted by the smart contract for extracting encrypted server index information based on the second secret key, that is, the second decryption key generated by the co-administrator of the consortium-type blockchain, or based on the second decryption parameter (incorporated and modularized within the predetermined smart contract that performs corresponding processes) specified by the co-administrator and managed offline.

In this way, the smart contract for recording server index information, being configured to "encrypt server index information generated by the smart contract for generating server index information based on the second secret key, that is the second encryption key generated by the co-administrator of the consortium-type blockchain, or based on the second encryption parameter (incorporated and modularized within the predetermined smart contract that performs corresponding processes) and automatically generated from the second decryption parameter specified by the co-administrator and managed offline (that is incorporated and modularized within the predetermined smart contract that performs corresponding processes)", may further strengthen the attack resistance against cyberattacks by quantum computers to save the customer file data as follows.

(X16) In order for the smart contract for recording server index information to encrypt server index information generated by the smart contract for generating server index information, the second public key, that is, the second encryption key generated by the co-administrator of the consortium-type blockchain or the second encryption parameter (incorporated and modularized within the predetermined smart contract that performs corresponding processes) automatically generated from the second decryption parameter (incorporated and modularized within the predetermined smart contract that performs corresponding processes) specified by a co-administrator and managed offline are required. For this reason, in order to decrypt encrypted server index information, a malicious third party would have to comprehend the second public key, that is the second encryption key generated by the co-administrator of the consortium-type blockchain or the second encryption parameter (incorporated and modularized within the predetermined smart contract that performs corresponding processes) automatically generated from the second decryption parameter (incorporated and modularized within the predetermined smart contract that performs corresponding processes) specified by a co-administrator and managed offline are required as a preliminary analysis work.

Therefore, by safekeeping the second public key, that is, the second encryption key specified by the co-administrator of the consortium-type blockchain, even if a quantum computer is used, executing the above-mentioned step (X16) becomes almost impossible.

Furthermore, the smart contract for decrypting server index information, being configured to "decrypt server index information encrypted server index information extracted by a smart contract for extracting encrypted server index information based on the second secret key, that is, the second decryption key generated by the co-administrator of the consortium-type blockchain, or based on the second decryption parameter (incorporated and modularized within the predetermined smart contract that performs corresponding processes) specified by the co-administrator and managed offline", may further strengthen the attack resistance against cyberattacks by quantum computers to restore customer file data as follows.

(X17) In order to decrypt encrypted server index information, the second secret key, that is, the second decryption key generated by the co-administrator of the consortium-type blockchain or second decryption parameter (incorporated and modularized within the predetermined smart contract that performs corresponding processes) specified by a co-administrator and managed offline are required. For this reason, in order to decrypt encrypted server index information, a malicious third party would have to comprehend the second secret key, that is, the second decryption key generated by the co-administrator of the consortium-type blockchain or the second decryption parameter (incorporated and modularized within the predetermined smart contract that performs corresponding processes) specified by the co-administrator and managed offline.

Therefore, by safekeeping the second secret key, that is, the second decryption key generated by the co-administrator of the consortium-type blockchain or the second decryption parameter (incorporated and modularized within the predetermined smart contract that performs corresponding processes) specified by the co-administrator and managed offline, even if a quantum computer is used, executing the above-mentioned step (X17) becomes almost impossible.

Further, in the digital asset guard service provision system of the present invention, preferably, the program or smart contract having encryption and division algorithms is configured to encrypt and multi-divide file data using secret sharing technologies.

With this configuration, each of the encrypted and multi-divided file data may be made meaningless, and decrypting by malicious third parties may become difficult.

Further, in the digital asset guard service provision system of the present invention, preferably, the program or smart contract having multiple decryption and linkage algorithms is configured to decrypt and restore encrypted and multi-divided file data to the original file data in one linked state using secret sharing technologies.

With this configuration, decrypting by malicious third parties may become even more difficult and the customer file data may be restored.

Furthermore, in the digital asset guard service provision system of the present invention, preferably, the secret sharing technology is an AONT secret sharing technology.

With this configuration, linkage and decryption are not performed unless all the divided file data is collected. Accordingly, decrypting by malicious third parties may become even more difficult Further, in the digital asset guard service provision system of the present invention, preferably, the file data saving system further comprises a planet configuration pattern setting means, wherein the planet configuration pattern setting means is configured to calculate and select the number of the nodes configuring the planet and distributed file management groups configured with nodes at each base and the recording devices located at multiple bases networked to the nodes at the bases based on the number of divisions of the file data in accordance with a record capacity, file size and a degree of dispersion of file data specified by the customer, wherein the smart contract for allotting distributed file management groups is configured to have a function for allotting to multiple distributed file management groups configured with the nodes at each of the bases and the recording devices located at multiple bases networked to the nodes at the bases configuring for the planet set on the co-administrator side according to conditions specified by the customer via the planet configuration pattern setting means, wherein the smart contract for allotting distributed file management groups is configured to have a function for allotting to the multiple distributed file management groups configured with nodes at each of the bases for the planet set on the co-administrator side according to the conditions specified by the customer via the planet configuration pattern setting means and recording devices at multiple bases networked to the nodes at the bases, and wherein each of the smart contracts for distribution and recording is configured to have a function for distributing and recording each file data allotted by the smart contract for allotting distributed file management groups into the nodes at each of the bases belonging to each of the corresponding distributed file management groups and into the recording devices at multiple bases networked to the nodes at the bases.

With this configuration, a suitable planet configuration pattern (the number of the nodes configuring the planet, and distributed file management groups configured with the nodes located at each of the bases and the recording devices located at multiple bases networked to the nodes at the bases) may be set up according to a record capacity of customer file data desired to be saved, and dividing customer file data, allotting to each suitable distributed file management groups, distributing, recording and safekeeping the customer file data in the nodes located at each of the bases in each of the distributed file management groups and the recording devices located at multiple bases networked to the nodes at the bases, may be achieved.

Further, in the digital asset guard service provision system of the present invention, preferably, the planet configuration pattern setting means is configured to calculate and select:

the number of the nodes configuring the planet added by a predetermined number of dummy file data (having an internal code that can recognize that the smart contract for extracting encryption and division file data is dummy information) added to the number of file data divisions; and distributed file management groups comprising the nodes located at each of the bases and the recording devices located at multiple bases networked to the nodes at the bases.

With this configuration, even if the dummy file data and the divided file data are linked into one file data, the content of the linked file data becomes different from the original file data. Therefore, this configuration may make a malicious third party decrypt the original file data even more difficult.

Further, in the digital asset guard service provision system of the present invention, preferably, the smart contract for generating server index information is configured to have a function for generating the server index information comprising information of the nodes located at each of the bases and the recording devices located at multiple bases networked to the nodes at the bases that distribute and record the dummy file data added by the planet configuration pattern setting means as configuration information of each of the distributed file management groups With this configuration, even if index information is stolen by a malicious third party, the stolen index information comprises the configuration information of the distributed file management groups that distribute and record dummy file data. Therefore, even if the dummy file data and divided file data are extracted from the configuration information of the distributed file management group in the server index information and linked into one file data, the contents of the linked file data would be different from the original file. Therefore, this configuration may make a malicious third party decipher the original file data even more difficult.

Further, in the digital asset guard service provision system of the present invention, preferably, the smart contract for extracting encrypted and divided file data is configured to extract each of the encrypted and multi-divided file data (that are (allotted to each of the distributed file management groups by the smart contract for allotting distributed file management groups, and distributed and recorded in the nodes located at each of the bases belonging to each of the distributed file management groups and the recording devices located at multiple bases networked to the nodes at the bases by each of the smart contracts for distribution and recording) from any of the nodes located at each of the bases belonging to each of the distributed file management groups and the recording devices located at multiple bases networked to the nodes at the bases, using server index information excluding information of the nodes located at each of the bases and the recording devices located at multiple bases networked to the nodes at the bases that distribute and record dummy file data (having a code inside being able to recognize dummy information), from configuration information of each of the distributed file management groups in server index information decrypted by the smart contract for decrypting server index information.

This configuration may make a malicious third party decipher the original file data even more difficult, and the attack resistance against cyberattacks by quantum computers is further strengthened, and may extract each of the encrypted and multi-divided file data necessary for restoring the original file data.

Further, in the digital asset guard service provision system of the present invention, preferably, the planet configuration pattern setting means is configured to calculate and select the nodes located at each of the bases and the recording devices located at multiple bases networked to the nodes at the bases in each of the distributed file management groups so that the nodes and the recording devices are located at positions of the nodes and the recording device having the maximum distance therebetween (=maximum degree of dispersion).

With this configuration, even if the nodes at one base or the recording devices networked to the nodes is attacked by electromagnetic pulses and the recorded and safekept file data is destroyed or burned, the nodes located at other bases and the recording devices networked to the nodes are not subjected to the EMP attack, and may escape from being destroyed or burned to be able to increase the security of restoring the original file data.

Further, in the digital asset guard service provision system of the present invention, preferably, the planet configuration pattern setting means is configured to perform the following processes 16-1 and 16-2, and to select the nodes at each of the bases and the recording devices at multiple bases networked to the nodes at the bases within each of the distributed file management groups.

(Process 16-1) The planet configuration pattern setting means views the spherical earth as a flat surface and generates the matrix that divides the regions of the earth into multiple segments in the vertical and horizontal directions.

(Process 16-2) The planet configuration pattern setting means determines intervals of, the bases of nodes that distribute and record one divided file data and of multiple recording devices networked to the nodes in a distributed file management group, in the X-axis direction with respect to the Y-axis in the matrix, using calculated values based on the number of divisions of the file data.

With this configuration, according to the numbers of divisions of file data, even if the nodes at one base or the recording devices networked to the nodes are attacked by electromagnetic pulses and the recorded and safekept file data is destroyed or burned, the nodes located at other bases and the recording devices networked to the nodes are not subjected to the EMP attack, and may escape from being destroyed or burned, and the nodes located at other bases and the recording devices networked to the nodes comprising a planet configuration pattern suitable for increasing the security of restoring the original file data may be set.

Further, in the digital asset guard service provision system of the present invention, preferably, bases of the nodes and the multiple recording devices networked to the nodes that distribute and record each divided file data in the planet is configured to be managed by information such as the global positioning system (GPS) and classified in the matrix.

This configuration may accurately comprehend position information at each of the bases of the nodes and the multiple recording devices networked to the nodes that distribute and record each divided file data in the planet.

Further, in the digital asset guard service provision system of the present invention, preferably, regarding the bases of nodes and the multiple recording devices networked to the nodes that distribute and record one divided file data, the planet configuration pattern setting means is configured to calculate and select the nodes of the bases or the recording devices networked to the nodes at the bases in the Y-axis direction having numerical differences similar to calculation values of the X-axis direction intervals when the interval in the X-axis direction cannot be spaced as per calculation values based on numbers of divisions of the file data caused by a lack of remaining recordable capacity of any of the nodes at predetermined bases and the recording devices at multiple bases networked to the nodes at the bases.

With this configuration, even if the nodes at one base and the recording devices networked to the nodes are attacked by electromagnetic pulses and the recorded and safekept file data is destroyed or burned, the nodes located at other bases and the recording devices networked to the nodes are not subjected to the EMP attack, and may escape from being destroyed or burned, and the nodes located at other bases and the recording devices networked to the nodes comprising a planet configuration pattern suitable for increasing the security of restoring the original file data may be set, while securing that the nodes at each of the bases and the recording devices networked to the nodes for distributing and recording divided file data do not run out of their record capacity.

Further, in the digital asset guard service provision system of the present invention, preferably, the planet configuration pattern setting means is configured to perform the following processes 19-1 and 19-2.

(Process 19-1) The planet configuration pattern setting means selects bases of each node configuring the planet according to the numbers of divisions of the file data specified by a customer based on the record capacity and file size of the file data.

(Process 19-2) The planet configuration pattern setting means selects multiple individual bases belonging to the distributed file management groups so that the degree of dispersion is maximized within the distributed file management group configured with each of the nodes selected in the process 19-1, and selects the multiple recording devices arranged at each individual base (and networked to the nodes).

With this configuration, according to the numbers of divisions of the file data based on recording capacities of customer file data desired to be saved, even if the nodes at one base or the recording devices networked to the nodes are attacked by electromagnetic pulses and the recorded and safekept file data is destroyed or burned, the nodes located at other bases and the recording devices networked to the nodes are not subjected to the EMP attack, and may escape from being destroyed or burned, and the nodes located at other bases and the recording devices networked to the nodes comprising a planet configuration pattern suitable for increasing the security of restoring the original file data may be set.

Further, in the digital asset guard service provision system of the present invention, preferably, the planet configuration pattern setting means is configured to:

record total remaining recording capacities, total remaining communication capacities and the like in the matrix as information of the nodes at each of the bases and the recording devices located at multiple bases networked to the nodes at the bases in each region to which the nodes at each of the bases belong; and select the most appropriate combinations of the bases of the nodes and multiple recording devices net worked to the nodes, using the total remaining recording capacities, information of the total remaining communication capacities and the dispersion degree of the nodes at each of the bases and the recording devices located at multiple bases networked to the nodes at the bases in each region recorded in matrix, when selecting the bases of the nodes and the recording devices located at multiple bases networked to the nodes comprising the distributed file management groups.

With this configuration, the recording capacities of the nodes in each region recorded in the matrix may become comprehended in real time, and even if the nodes at one base are attacked by electromagnetic pulses and the recorded and safekept file data is destroyed or burned, the nodes located at other bases are not subjected to the EMP attack, and may escape from being destroyed or burned, and the nodes located at each of the bases in each of the distributed file management groups comprising a planet configuration pattern At this time suitable for increasing the security of restoring the original file data may be set, while securing that the nodes at each of the bases and the recording devices networked to the nodes for distributing and recording divided file data do not run out of record capacity.

Smart Contract

Further, in the digital asset guard service provision system of the present invention, preferably, the planet configuration pattern setting means is configured to calculate and select regions necessary for increasing recording capacities and communication capacities of the nodes located at each of the bases and the recording devices located at multiple bases networked to the nodes at the bases in combinations of the nodes at predetermined bases comprising the distributed file management groups and the recording devices located at multiple bases networked to the nodes at the bases.

With this configuration, the recording capacities and communication capacities of the nodes located at each of the bases and of the recording devices located at multiple bases networked to the nodes at the bases in each region in the world may be optimized.

Further, in the digital asset guard service provision system of the present invention, preferably, each of the distributed file management groups is configured to have a core node that specifies and manages individual equipment configuring the recording devices at each of the bases belonging to the distributed file management groups.

With this configuration, the nodes located at each of the bases that belong to the distributed file management groups and the recording devices located at multiple bases networked to the nodes at the bases may be managed easier.

Further, in the digital asset guard service provision system of the present invention, preferably, the nodes located at each of the bases are mutually connected via a communication means such as the Internet or a closed network, and the smart contracts for distribution and recording are incorporated in the nodes.

With this configuration, distribution and recording of each of the encrypted and multi-divided file data in the nodes located at each of the bases and in the recording devices located at multiple bases networked to the nodes at the bases may be materialized.

Further, in the digital asset guard service provision system of the present invention, preferably, the file data saving system is configured to have a function for reading out the customer index information that is encrypted and recorded in node groups located at specified bases in the consortium-type blockchain, and is configured to have a wallet function for comprehending recording destinations corresponding to each file data encrypted and multi-divided by the file data encryption and division means.

With this configuration, comprehending the recording destinations corresponding to each of the encrypted and multi-divided file data.

Further, in the digital asset guard service provision system of the present invention, preferably, the file data saving system further comprises a saved file data list information generation means and a saved file data list information reference control means, the saved file data list information generation means is configured to generate saved file data list information, and the saved file data list information comprises terminal information, information of the fixed IP address, the original file name of the file data to be saved, and the upload date associated with the customer at the time of uploading the saved file data list information to the first temporary storage area using the upload means. The saved file data list information reference control means is configured to allow reference to the saved file data list information generated by the saved file data list information generation means only by the communication equipment management and process program managed by the fixed IP address of the customer.

This configuration limits communication terminals that can refer to the customer's saved file data list information. Therefore, acquisition of saved information regarding the customer file data by communication terminals of malicious third parties may be prevented.

Further, in the digital asset guard service provision system of the present invention, preferably, the file data restoration system further comprises a restoration process time frame setting reception means, and a file data restoration process operation control means, the restoration process time frame setting reception means is configured to accept settings of such as a time frame for file data restoration process from a customer who desires to restore the file data, an IP address for restoration, a restorable period and the like, and the file data restoration process operation control means is configured to control the operations of the file data extraction instruction reception means, the smart contract for extracting encrypted server index information, the smart contract for decrypting server index information, the smart contract for extracting encrypted and multi-divided file data, the download means, the file data restoration means, and the second data deletion means only in the time frame, settings of which are accepted by the restoration process time frame setting reception means.

With this configuration, the file data restoration process would not operate even if a file data restoration command is input, except during a very short time frame known only to the customer. Therefore, even if the system is stolen by a third party, restoration of the customer file data would almost impossible by inputting a restore command by the third party.

Further, in the digital asset guard service provision system of the present invention, preferably, the file data restoration system further comprises an authentication code setting reception means, and the authentication code setting reception means is configured to accept a setting of an authentication license code from a customer desiring to restore file data, the file data restoration process operation control means is configured to control the operations of the file data extraction instruction reception means, the smart contract for extracting encrypted server index information, the smart contract for decrypting server index information, the smart contract for extracting encrypted and divided file data, the download means, the file data restoration means, and the second data deletion means only in the time frame, settings of which are accepted by the restoration process time frame setting reception means, and when the authentication code accepted by the authentication code setting reception means is accepted by the co-administrator of the consortium-type blockchain.

This configuration may make restoring the customer file data by an input of a restoration command by a third party even more difficult and more firmly prevent data thefts.

Further, in the digital asset guard service provision system of the present invention, preferably, the authentication code set in the authentication code setting reception means is a code that a customer who desires to restore the file data receives a communication from the co-administrator of the consortium-type blockchain, and the file data restoration process operation control means is configured to provide an operation license for a program or smart contract having decryption linkage algorithms associated with the program or smart contract having encryption and division algorithms accepted by the encryption and division algorithm selection reception means, when the authentication code a setting of which is accepted by the authentication code setting reception means is approved by the co-administrator of the consortium-type blockchain, and further the identity of the customer is systematically confirmed by a multi-step authentication, biometric authentication, one-time passcode and the like registered on the customer's smartphone.

This configuration may make restoring the customer file data by an input of a restoration command by a third party even more difficult and more firmly prevent data thefts.

Further, in the digital asset guard service provision system of the present invention, preferably, the consortium-type blockchain comprises the nodes at each of the bases configuring the planet and recording devices at multiple bases networked to the nodes at the bases, the file data saving system and a multi-level file data saving and restoration system configuration for operating the file data restoration system.

With this configuration, customers may take into account the importance and characteristics of the file data, the cost required to receive the digital asset guard service and the like and select and take an appropriate level of file data saving service.

Further, the digital asset guard service provision system of the present invention preferably comprises the level S file data saving and restoration system configuration, and the level S file data saving and restoration system configuration is configured to operate the nodes located at each of the bases configuring the planet, the recording devices at multiple bases networked to the nodes at the bases, the file data saving system and the file data restoration system, using satellite communications, 5G/6G private communications, and closed networks that do not connected to the Internet such as LTE networks and dedicated closed networks.

This configuration may make infiltrating networks in a closed environment by third parties extremely difficult, and achieve the strongest level of attack resistance against cyberattacks.

Further, the digital asset guard service provision system of the present invention preferably comprises the level four file data saving and restoration system configuration, and the level four file data saving and restoration system configuration is configured to utilize the Internet communication network, to comprise high-credit companies that the participants of the consortium-type blockchain approve respectively, and to operate the nodes located at each of the bases configuring the planet, the recording devices at multiple bases networked to the nodes at the bases, the file data saving system and the file data restoration system in a high-security space such as a dedicated room.

This configuration may increase as much as possible the level of prevention of malicious third parties' intrusion and data leakage in system configurations that utilize the Internet communication network.

Further, the digital asset guard service provision system of the present invention preferably comprises a level three file data saving and restoration system configuration, and the level three file data saving and restoration system configuration is configured to utilize the Internet communication network, to comprise high-credit companies that the participants of the consortium-type blockchain approve respectively, and to operate the nodes located at each of the bases configuring the planet, the recording devices at multiple bases networked to the nodes at the bases, the file data saving system and the file data restoration system by installing a file server for data backup in a high-security space corresponding to an office, or by using inexpensive cloud services including use of regional services spread worldwide.

This configuration may increase the level of prevention of intrusion by malicious third parties and external leakage of data in system configurations that utilize the Internet communication network while reducing costs.

Further, the digital asset guard service provision system of the present invention preferably comprises the level two file data saving and restoration system configuration, and the level two file data saving and restoration system configuration is configured to utilize the Internet communication network, to open to organizations such as general companies and branch networks, and to operate the nodes located at each of the bases configuring the planet, the recording devices located at multiple bases networked to the nodes at the bases, the file data saving system and the file data restoration system.

This configuration may prevent intrusion by malicious third parties and external leakage of data in a system configuration that utilizes the Internet communication network, while further reducing costs.

Further, the digital asset guard service provision system of the present invention preferably comprises the level one file data saving and restoration system configuration, and the level one file data saving and restoration system configuration is configured to utilize the Internet communication network, to open to private homes and the like, and to operate the nodes located at each of the bases configuring the planet, the recording devices located at multiple bases networked to the nodes at the bases, the file data saving system, and the file data restoration system.

This configuration may prevent intrusion by malicious third parties and external leakage of data while reducing costs to the maximum.

Further, in the digital asset guard service provision system of the present invention, preferably, the level one to four file data saving and restoration system configurations are configured so that file servers of the nodes located at each of the bases configuring each of the planets and of the recording devices at multiple bases networked to the nodes at the bases in the world are networked to the Internet communication network and operate during nighttime hours when night time power may be utilized.

With this configuration, level one to four file data saving system configurations that utilizes power effectively and reduces costs may be constructed.

Further, in the digital asset guard service provision system of the present invention, preferably, the level one to four file data saving and restoration system configurations are configured so that file servers of the nodes located at each of the bases configuring each of the planets and of the recording devices at multiple bases networked to the nodes at the bases in the world may be operated during daytime hours to utilize renewable energy such as solar power generation.

With this configuration, power sources with unstable power generation such as wind and solar power generations may be effectively utilized. AC-DC changes, has a large amount of power loss. However, in the case of solar power generation, for example, if DC generation is used as-is for server power, and the surplus is safekept in batteries to run when there is a shortage, there is no need for AC change, so power loss is reduced.

Further, the digital asset guard service provision system of the present invention preferably further comprises a data saving service contract application procedure reception means and a smart contract for recording data saving service contract application reception information. The data saving service contract application procedure reception means is configured to accept a data saving service contract application procedure from the customer, and is configured to accept designations of a storage capacity, a degree of dispersion, whether to include only domestic or overseas saving destinations, safekeeping period, and real-time process of the file data desired to be saved, at the time of receiving the data saving service contract application procedure, and the smart contract for recording data saving service contract application reception information is configured to have a function for performing the following processes 37-1 and 37-2.

(Process 37-1) The smart contract for recording data saving service contract application reception information automatically calculates and generates the basic configuration of the entire planet by:

- managing information of the storage capacity, degree of dispersion, whether to include only domestic or overseas saving destinations, safekeeping period, and real-time process of the file data desired to be saved from the customer accepted by the data saving service contract application procedure reception means; and
- by setting conditions from the customer (budgetary, whether the highest confidential matter regarding personal information and security=amount of risk and the like is included).

(Process 37-2) The smart contract for recording data saving service contract application reception information encrypts and records the information generated in the process 37-1 as a portion of the system setting information in node groups located at specified bases in the consortium-type blockchain, and the predetermined smart contract that performs the corresponding process reads the recorded setting information together with the customer's personal information so that the entire information may be comprehended.

With this configuration, the setting conditions for the planet configuration pattern used for safekeeping file data targeted to be saved in the digital asset guard service provision system may be specified.

Further, the digital asset guard service provision system of the present invention is, preferably, configured to have such functions that:

- each divided file data recorded in the nodes at each of the bases belonging to each of the distributed file management groups and the recording devices at multiple bases networked to the nodes at the bases are managed in an encrypted state;
- index information such as hash of each file data and
- the distributed file groups for allotting the file data are recorded in a block;
- blocks are chained together with time data incorporated into the hash;
- the file data saving system further comprises a smart contract for setting a safekeeping period and a smart contract for disconnecting the chain;
- the smart contract for setting safekeeping periods is configured to have a function for setting the safekeeping period of the block in the planet-by-planet basis at the time of distribution and recording of each file data by each of the smart contracts for distribution and recording based on the information of the safekeeping period of file data desired by the customer to be saved that is recorded in node groups located at specified bases in the consortium-type blockchain by the smart contract for recording data saving service contract application reception information; and
- the smart contract for disconnecting chains is configured to have a function to disconnect the chain of blocks after passing the safekeeping period set by the smart contract for setting safekeeping periods.

This configuration may set the safekeeping period for the file data to be saved according to the customer's designations, and suppress data amount increases or reduce the data amount accumulated in the blockchain storage area.

Further, in the digital asset guard service provision system of the present invention, preferably, the file data saving system further comprises a smart contract for block deletion, and the smart contract for block deletion is configured to have a function to delete unnecessary blocks that have been disconnected via the chain disconnection smart contract.

This configuration may suppress data amount increases or reduce the data amount accumulated in the blockchain storage area.

Further, in the digital asset guard service provision system of the present invention, preferably, the file data saving system further comprises a smart contract for saving unnecessary blocks, and the smart contract for saving unnecessary blocks is configured to have a function for performing the following processes 40-1 through 40-4.

(Process 40-1) The unnecessary block data saving means sends a notification for a customer to confirm whether to delete unnecessary blocks before deleting the unnecessary blocks disconnected via the smart contract for disconnecting chains via the smart contract for deleting blocks, (Process 40-2) When there is no response from the customer to the notification sent in the process 40-1, the unnecessary block data saving means notifies a co-administrator and confirms whether to delete the unnecessary blocks.

(Process 40-3) Even if the unnecessary block is confirmed to be delible, the unnecessary block data saving means temporarily records each of the encrypted and multi-divided file data as saving data via a predetermined record medium disconnected from networks.

(Process 40-4) The unnecessary block data saving means deletes the temporarily recorded the saved data by the process 40-3 after a certain time has elapsed.

With this configuration, even if the file data to be deleted as an unnecessary block in the storage area of the blockchain after the safekeeping period has passed, may be restored if the customer so desires.

Further, in the digital asset guard service provision system of the present invention, preferably, the unnecessary block data saving means is configured to perform the following processes 41-1 through 41-5 when a notification is sent to the customer to confirm whether to delete the unnecessary block, and the unnecessary block data saving means confirms that the customer desires to extend the data safekeeping period.

(Process 41-1) The unnecessary block data saving means temporarily records each of the encrypted and multi-divided file data as data to be saved via a predetermined recording medium that is disconnected from the networks.

(Process 41-2) The unnecessary block data saving means performs the process 41-1 and at the same time selects a new planet that meets the conditions for the extended safekeeping period of file data desired by the customer.

(Process 41-3) The unnecessary block data saving means automatically saves the corresponding file data to the nodes located at each of the bases configuring the planet selected in the process 41-2 and to the recording devices located at multiple bases networked to the nodes at the bases.

(Process 41-4) The unnecessary block data saving means performs the process 41-3 and updates the server index information.

(Process 41-5) After performing the process 41-4, the unnecessary block data saving means deletes the temporarily recorded data to be saved after a certain time has elapsed.

With this configuration, even if the file data is eligible for deletion as an unnecessary block in the blockchain storage area after the safekeeping period has elapsed, the customer may extend the safekeeping period of the file data if so desired.

Further, in the digital asset guard service provision system of the present invention, preferably, the file data saving system further comprises a data falsification check control means, and the data falsification check control means is configured to perform the following processes of 42-1 through 42-4.

(Process 42-1) The data falsification check control means calculates hash values based on the encrypted and multi-divided file data recorded in the nodes at each of the bases belonging to each of the distributed file management groups and the recording devices at multiple bases networked to the nodes at the bases. The data falsification check control means records the hash (Process 42-2) values calculated in the process 42-1 into a block.

(Process 42-3) The data falsification check control means constantly compares the hash values recorded in the blocks of the nodes located at each of the bases belonging to each of the distributed file management groups and the blocks of the recording devices located at multiple bases networked to the nodes at the bases.

(Process 42-4) When the data falsification check control means performs the checking process 42-3 and there is a difference between a hash described in a block in a specified node or recording device, and another hash described in a block in another node or recording device, the data falsification check control means performs the following processes 42-4-1 and 42-4-2.

(Process 42-4-1) The data falsification check control means detects that the encrypted and multi-divided file data recorded in the specified node or recording device is tampered with or destroyed. Then, the specified node or recording device is excluded from the file data saving process (and the block in the specified node or recording device is deleted).

(Process 42-4-2) The data falsification check control means performs the process 42-4-1 and sends an alarm to the operator of the node and to the co-administrator of the consortium-type blockchain.

In the event that a node at a predetermined base or a recording device networked to that node is infiltrated by a malicious third party and attacked for data falsification and the like, this configuration may prevent adverse effects of the data attack against the nodes at other bases or the recording devices networked to the nodes and quickly detect the fact of the data attack and recover from the attack.

Furthermore, the digital asset guard service provision system of the present invention is preferably configured to manage the following communication equipment using a fixed IP address, the communication equipment that allows a customer to use the first secret key, that is the first offline decryption key to restore, each encrypted and multi-divided file data distributed and recorded in the nodes located at each of the bases belonging to each of the distributed file management groups and the recording devices located at multiple bases networked to the nodes at the bases via the file data restoration system, to the original file data before being saved.

With this configuration, even if a malicious third party steals the first secret key, that is, the first offline decryption key of the customer, fie data restoration by using the communication terminal of the third party by using the first private key, that is the first offline decryption key may be prevented.

Further, the digital asset guard service provision system of the present invention is, preferably so configured that, IP address management information of communication equipment for which the customer may use the first secret key, that is the first offline decryption key is presented to co-administrators only when a multi-signature type secret key transaction is approved by holders of specified nodes at multiple bases configuring the co-administrators.

With this configuration, even a co-administrator of the consortium-type blockchain may prevent a single administrator from getting knowledge of the IP address management information of the communication equipment for which the customer may use the first secret key, that is the first offline decryption key. Therefore, even if the single administrator's terminal is infiltrated by a malicious third party, getting knowledge of the IP address management information of the communication equipment for which the customer may use the first secret key, that is the first offline decryption key by a malicious third party may strictly be prevented.

Further, in the digital asset guard service provision system of the present invention, preferably, the node groups located at the specified bases in the consortium-type blockchain is configured to record node information that permits access.

With this configuring node information that permits access may be managed in the node groups located at the specified bases operated by the co-administrator in the consortium-type blockchain.

Further, the digital asset guard service provision system of the present invention preferably further comprises an upload processable IP address checking means, and the upload processable IP address checking means is configured to control to enable the operations of the upload process of file data to be saved in the file data saving system, that is, the encryption and division algorithm selection reception means, the file data saving instruction reception means, the file data encryption and division means, and the upload means only by an operation in a customer terminal in which a fixed IP address is preregistered in the node groups located at the specified bases in the consortium-type blockchain as a portion of the system setting information as setting information for uploading into the first temporary storage area using the upload means.

This configuration may limit terminals that perform the upload process of the customer file data to be saved. Therefore, even if a malicious third party steals a customer's parameter or encryption key, uploading contaminated file data by the malicious third party may be prevented.

Further, in the digital asset guard service provision system of the present invention, preferably, the smart contract for recording data saving service contract application reception information is configured to further have a function for performing the following processes 47-1 and 47-2.

(Process 47-1) The smart contract for recording data saving service contract application reception information confirms a file data record amount accepted by the customer who desires to save by the data saving service contract application procedure reception means.

(Process 47-2) The smart contract for recording data saving service contract application reception information determines the number of divisions of the file data so that, when the file data record amount confirmed in the process 47-1 exceeds the maximum record capacity of one file defined in the system, the record amount is less than the maximum record capacity.

This configuration may prevent an overflow at the nodes and at the multiple recording devices networked to the nodes of the customer file data desired to be saved.

Further, the digital asset guard service provision system of the present invention preferably further comprises a rollover smart contract, and the rollover smart contract is configured to have a function for performing the following processes 48-1 through 48-4.

(Process 48-1) The rollover smart contract sets a new planet and distributed file management group in order to extend safekeeping periods of each encrypted and multi-divided file data recorded as the block in the nodes located at each of the bases belonging to each of the distributed file management groups and the recording devices at multiple bases networked to the nodes at the bases before the safekeeping period of the block set by the smart contract for setting safekeeping period has elapsed.

(Process 48-2) After performing the process 48-1, the rollover smart contract takes over a control number of old server index information, changes to a new control number, and generates new server index information.

(Process 48-3) The rollover smart contract performs the process 48-2 and re-records the file data in the nodes at each of the bases belonging to a new distributed file management group and the recording devices located at multiple bases networked to the nodes at the bases.

(Process 48-4) After performing the process 48-3, the rollover smart contract deletes the file data and old server index information regarding the file data recorded in the nodes located at each of the bases belonging to the original distributed file management group and in the recording devices located at multiple bases networked to the nodes at the bases.

With this configuration, when a customer desires to extend a safekeeping period, the customer may extend the file data safekeeping period approaching the time limit and safekeep the file data.

Further, in the digital asset guard service provision system of the present invention, preferably, the nodes located at each of the bases belonging to each of the distributed file management groups and the recording devices at multiple bases networked to the nodes at the bases are configured to comprise multiple sub-configuration file servers, each connected to the nodes at the bases or the recording devices located at multiple bases networked to the nodes at the bases, or file server groups accessible from the nodes at each of the bases belonging to each of the file management groups.

In this configuration, multiple sub-configuration file servers may be able to share and record the large-sized divided file data, even if large-sized divided file data, that is encrypted, multi-divided, uploaded in the first temporary storage area and that exceeds the record capacity of a block, is allotted for distribution and recording to the nodes at the bases and the recording devices located at multiple bases networked to the nodes at the bases.

Furthermore, in the digital asset guard service provision system of the present invention, each of the smart contracts for distribution and recording is preferably configured to have a function for performing the following processes 50-1 through 50-4.

(Process 50-1) Each of the smart contracts for distribution and recording checks the data record capacity and usages of each file server sub-configuration connecting to the nodes at each of the bases belonging to each of the distributed file management groups and the recording devices at multiple bases networked to the nodes at the bases.

(Process 50-2) Each of the smart contracts for distribution and recording selects a specified sub-configuration file server having a data record capacity that can record large file data that is encrypted, multi-divided and uploaded in the first temporary storage area based on the data record capacity confirmed in the process 50-1.

(Process 50-3) Each of the smart contracts for distribution and recording records the large file data that is encrypted, multi-divided and uploaded in the first temporary storage area in the specified sub-configuration file server selected in the process 50-2.

(Process 50-4) Each of the smart contracts for distribution and recording performs the process 50-3, and records information of the specified sub-configuration file server, in which the large file data that is encrypted, multi-divided and uploaded in the first temporary storage area is recorded, in the nodes at each of the bases belonging to each of the distributed file management groups as the second index information.

With this configuration, even if the large file data that is encrypted, multi-divided and uploaded into the first temporary storage area in excess of the block record capacity is allotted for distribution and recording, the large file data may be recorded in a sub-configuration file server having a data record capacity that can record large file data, and information of a sub-configuration file server in which large-sized file data is recorded may be managed.

Further, in the digital asset guard service provision system of the present invention, preferably, each of the smart contracts for distribution and recording is configured to have a function for performing the following processes 51-1 through 51-5 when the large file data that is encrypted, multi-divided and uploaded into the first temporary storage area, and that is recorded in a predetermined sub-configuration file server connected to the nodes at each of the bases belonging to each of the distributed file management groups and the recording devices located at multiple bases networked to the nodes at the bases, exceeds an upper limit of the record capacity of the file server.

(Process 51-1) Each of the smart contracts for distribution and recording calculates remaining recording capacities of each of other sub-configuration file servers connecting to the nodes at each of the bases belonging to each of the distributed file management groups and the recording devices at multiple bases networked to the nodes at the bases.

(Process 51-2) Each of the smart contracts for distribution and recording selects an optimal sub-configuration file server to be recorded based on the remaining recordable capacity calculated in the process 51-1.

(Process 51-3) Each of the smart contracts for distribution and recording records file data exceeding the upper limit of the record capacity of the file server to the sub-configuration file server selected in the process 51-2.

(Process 51-4) Each of the smart contracts for distribution and recording performs the process 51-3, and changes the settings of the original file server to be inactive.

(Process 51-5) After performing the process 51-4, each of the smart contracts for distribution and recording records and updates information of record destination sub-configuration servers in the nodes at each of the bases belonging to each of the distributed file management groups as the second index information.

With this configuration, even if large file data that is encrypted, multi-divided and uploaded into the first temporary storage area exceeding the record capacity of a block is allotted for distribution and recording, and the record capacity of the large file data exceeds the record capacity of one sub-configuration file server, the multiple sub-configuration file servers may be able to share and record the large file data and information of the multiple sub-configuration file servers that record the large file data may be managed.

Further, in the digital asset guard service provision system of the present invention, preferably, the nodes located at each of the bases belonging to each of the distributed file management groups and the recording devices at the multiple bases networked to the nodes at the bases are configured to be able to increase sub-configuration file server or a recording media connecting to the sub-configuration file servers, each of which is connecting to the node and/or the recording device.

With this configuration, when very large divided file data that is encrypted, multi-divided and uploaded to the first temporary storage area and that exceeds the record capacity of a block is allotted for distribution and recording, or when the remaining recordable capacity of the sub-configuration file server is insufficient at the time of allotment, the multiple sub-configuration file servers or recording media connected to the sub-configuration file servers including the increased number of sub-configuration file servers may be able to share and record the large file data by increasing additional file servers or recording media connected to the nodes at each of the bases and the recording devices networked to the nodes at the bases.

Further, in the digital asset guard service provision system of the present invention, preferably, the smart contract for extracting encrypted and divided file data is configured to have a function for performing processes 53-1 through 53-4.

(Process 53-1) The smart contract for extracting encrypted and divided file data refers to the second index information recorded in the nodes at each of the bases belonging to each of the distributed file management groups.

(Process 53-2) The smart contract for extracting encrypted and divided file data detects the multiple sub-configuration file servers to which the encrypted and multi-divided large file data is recorded which is recorded as the second index information referenced in the process 53-1.

(Process 53-3) The smart contract for extracting encrypted and divided file data extracts the file data recorded in the sub-configuration file server from the multiple sub-configuration file servers detected in the process 53-2.

(Process 53-4) The smart contract for extracting encrypted and divided file data links the multiple file data extracted in the process 53-3 to restore the original encrypted and multi-divided large file data.

In order to restore large file data to the state before the large file data is saved, this configuration may restore the large file data shared and recorded by the sub-configuration file servers to the original encrypted and multi-divided large file data which is in the pre-decryption and pre-linking process.

Further, the digital asset guard service provision system of the present invention preferably further comprises a small amount file data temporary recording means, a file data integration means, and a small amount file data deletion means, the small amount file data temporary recording means is configured to record a small amount of file data to be saved in a predetermined confidential blockchain in real time within the range of block capacity, the file data integration means is configured to perform the following processes 54-1 and 54-2, and the small amount file data deletion means is configured to perform the processes 54-3 and 54-4.

(Process 54-1) The file data integration means performs batch processes several times a day for integrating each small amount of file data recorded in the predetermined confidential blockchain by the small amount file data temporary recording means into one integrated file data.

(Process 54-2) After performing the process 54-1, the file data integration means uses, by the file data saving system, the integrated file data for the saving process from division and encryption of file data to distribution and recording in the nodes located at each of the bases belonging to distributed file management groups and the recording devices located at multiple bases networked to the nodes at the bases.

(Process 54-3) The small amount file data deletion means disconnects the blockchain which records corresponding small amount of file data in the predetermined confidential blockchain after completing the saving process for the integrated file data by the file data saving system.

(Process 54-4) After performing the process 54-3, the small amount file data deletion means deletes the file data recorded in the block.

This configuration may be able to efficiently perform file data saving processes for file data generated from time to time whose differential data having small capacities.

Furthermore, in the digital asset guard service provision system of the present invention, preferably, the file data integration means is configured to perform the processes 55-1 through 55-4.

(Process 55-1) The file data integration means performs batch processes several times a day for each small amount of file data recorded in the predetermined confidential blockchain by the small amount file data temporary recording means to integrate into one integrated file data.

(Process 55-2) The file data integration means transfers the integrated file data integrated in the process 55-1 to a smart contract having encryption and division algorithms accepted by the encryption and division algorithm selection reception means in the file data saving system.

(Process 55-3) The file data integration means controls the integrated file data transferred in the process 55-2 to perform the saving process from division and encryption of file data to distribution and recording of file data in the nodes at each of the bases belonging to the distributed file management groups and the recording devices located at multiple bases networked to the nodes at the bases.

This configuration may be able to efficiently materialize file data saving processes for file data generated from time to time whose differential data having small capacities.

Further, in the digital asset guard service provision system of the present invention, preferably, the small amount file data deletion means is configured to perform the following processes 56-1 through 56-3.

(Process 56-1) The small amount file data deletion means sets a temporary safekeeping period of a predetermined number of days, for example, approximately seven days, for the file data that is integrated into one by the file data integration means and for which the saving process for the integrated file data by the file data saving system is completed, among the file data recorded in the predetermined confidential blockchain by the small amount file data temporary recording means.

(Process 56-2) The small amount file data deletion means disconnects the chain of the corresponding block in the predetermined confidential blockchain after the temporary safekeeping period set in the process 56-1 has elapsed.

(Process 56-3) The small amount file data deletion means deletes the file data recorded in the block whose chain is disconnected in the process 56-2.

This configuration may prevent unnecessary file data from being accumulated in the predetermined confidential blockchain, maximize the use of a predetermined confidential blockchain used for temporary recording of small amounts of file data, and reduce the risk of leakage or theft of small amounts of file data recorded in a predetermined confidential blockchain.

Further, in the digital asset guard service provision system of the present invention, preferably, the file data saving system further comprises a means for checking a record amount within a period, and the means of checking a record amount within a period is configured to perform the following processes 57-1 and 57-2 when file data from the customer desiring to save the file data, uploaded, distributed and recorded in the nodes located at each of the bases belonging to each of the distributed file management groups and in the recording devices located at multiple bases networked to the nodes at the bases exceeds the maximum record amount of the file data within a predetermined period.

(Process 57-1) The means for checking a record amount within a period requests the customer to re-apply for a file data saving service contract.

(Process 57-2) In response to the request for re-applying for the file data saving service contract in the process 57-1, the means for checking a record amount within a period processes as an error if the customer does not perform the re-applying procedure.

With this configuration, even if the system is attacked by a malicious third party with the intention of stopping the system by uploading a large amount of data, the system may avoid system failures and no data processing occurs that results in unlimited recording volume, Further, in the digital asset guard service provision system of the present invention, preferably, a node or a recording device not connected to the Internet in an inactive state is configured to exist at any of the bases belonging to each of the distributed file management groups, the node or recording device not operated at the base is configured to receive and record encrypted and multi-divided file data recorded in a node or recording device in an active state at another base when resuming operations.

This configuration may easily recover encrypted and multi-divided file data by reoperating the node in an inactive state.

Further, the digital asset guard service provision system of the present invention preferably comprises a data destructive attack detection means and a means for automatically saving data upon attacking, and the data destructive attack detection means is configured to perform the following processes 59-1 and 59-2, and the means for automatically saving data upon attacking is configured to perform the processes 59-3 and 59-4.

(Process 59-1) The data destructive attack detection means detects existence of data destruction condition due to equipment failure or the like, or attacks against encrypted and multi-divided file data recorded in a node or recording device at any of the bases configuring the planet.

(Process 59-2) The data destructive attack detection means determines that a data destructive attack is taken place when detecting destruction of multiple file data managed in a certain time frame, such as 30 minutes, 8 hours, or 24 hours.

(Process 59-3) When the data destructive attack detection means detects an attack against the encrypted and multi-divided file data, the means for automatically saving data upon attacking stops the operation of the node at each of the bases configuring the planet and the recording devices located at multiple bases networked to the nodes at the bases, or forcibly disconnect the Internet connection routes.

(Process 59-4) The means for automatically saving data upon attacking performs the process 59-3, and at the same time sets another network and automatically saves the encrypted and multi-divided file data distributed and recorded in nodes located at bases not attacked and in the recording devices at multiple bases networked to the nodes at the bases, into the nodes at each of the bases configuring another planet in which attacks against the encrypted and multi-divided file data are not detected by the data destructive attack detection means, and into the recording devices at multiple bases networked to the nodes at the bases.

With this configuration, even if file data safekept in a node at one base or in a recording device networked to the node is contaminated due to a cyberattack by a malicious third party, the system may promptly prevent the spread of data contamination due to the attack, and secure that all encrypted and multi-divided file data, including file data safekept at the attacked base, may be continuously safekept in an uncontaminated state.

Further, the digital asset guard service provision system of the present invention preferably comprises a communication switching control means, and when the data destructive attack detection means detects an attack against the encrypted and multi-divided file data, the communication switching control means is configured to maintain an inactive state in which the nodes and the recording devices at multiple bases networked to the nodes are disconnected from the Internet connection, and to switch to a connection with a communication means different from the Internet such as an LTE.

With this configuration, even if file data safekept in a node at one base or in a recording device networked to the node is contaminated due to a cyberattack by a malicious third party, the system may promptly prevent the spread of data contamination due to the attack, minimize the number of damaged nodes or the recording devices networked to the nodes, and continue to safekeeping encrypted and multi-divided file data in the nodes located at another bases or in the recording devices networked to the corresponding nodes while defending against further cyberattacks by third parties.

Further, in the digital asset guard service provision system of the present invention, when the data destructive attack detection means detects an attack against the encrypted and multi-divided file data, preferably, the means for automatically saving data upon attacking is configured to automatically save the encrypted and multi-divided file data distributed and recorded in the nodes located at an unassailed base configuring the planet and in the recording devices located at multiple bases networked to the nodes at the base, to the nodes at each of the bases configuring another planet not attacked against encrypted and multi-divided file data and the recording devices at multiple bases networked to the nodes at the bases via a communication means other than the Internet, such as an LTE.

With this configuration, even if file data safekept in a node at one base or in a recording device networked to the node is contaminated due to a cyberattack by a malicious third party, the system may promptly prevent the spread of data contamination due to the attack, and secure that all encrypted and multi-divided file data, including file data safekept at the attacked base, may be continuously safekept in an uncontaminated state via a communication means other than the Internet such as an LTE while defending against further cyberattacks by third parties.

Further, in the digital asset guard service provision system of the present invention, preferably, the file data comprising digital assets to be guarded and some high-valued information includes tokens, customer information of existing business systems, asset information, source codes and modules, confidential information, design documents, parameters for settings, digital contracts, rights, designs, and other data that may be expressed digitally in general.

This configuration may protect a wide variety of digital assets from sophisticated cyberattacks.

Further, in the digital asset guard service provision system of the present invention, preferably, the data saving service contract application procedure accepting means is configured to further accept the following designated items 63-1 through 63-3 from the customer when accepting the data saving service contract application procedure.

(Designated item 63-1) Guarantee level of file data desired to be saved.

(Designated item 63-2) The nodes located at each of the bases configuring each of the planets.

(Designated item 63-3) Levels of the recording devices located at multiple bases networked to the nodes at the bases, and the file data saving and restoration system configuration for operating the file data saving system and the file data restoration system.

With this configuration, the level of the file data saving system configuration used for safekeeping file data to be saved in the digital asset guard service provision system may be set.

Further, in the digital asset guard service provision system of the present invention, preferably, the nodes located at each of the bases configuring each of the distributed file management groups and the recording devices at the multiple bases networked to the nodes at the bases, have different operating time frames and operative and inactive states are mixed, and are configured to perform the following processes 64-1 and 64-2.

(Process 64-1) All the nodes located at each of the bases configuring each of the distributed file management groups and the recording devices located at multiple bases networked to the nodes at the bases operate in 24 hours.

(Process 64-2) In the nodes located at each of the bases configuring each of the distributed file management groups and the recording devices located at multiple bases networked to the nodes at the bases, a node of at least any one base or a recording device of at least any one base networked to the nodes at the bases is operated within each of the distributed file management groups at a predetermined point of time.

With this configuration, in the event of a cyberattack by a malicious third party, encrypted and multi-divided file data safekept in a node at an operating base or in a recording device networked to the node is contaminated, the encrypted and multi-divided file data safekept in the node at the inactive base or the recording device that is networked to the node may not be contaminated. By switching to a communication means such as an LTE that is disconnected from the Internet for encrypted and multiple-divided file data in an uncontaminated state, the encrypted and multiple-divided file data may continuously be safekept in an uncontaminated state.

Further, in the digital asset guard service provision system of the present invention, preferably, the nodes at each of the bases configuring each of the distributed file management groups and the recording devices at multiple bases networked to the nodes at the bases, are configured to perform the processes 65-1 through 65-3.

(Process 65-1) The nodes located at each of the bases configuring each of the distributed file management groups and the recording devices located at multiple bases networked to the nodes at the bases are operated only during night time hours by using the night time power (redundant power) during the night time hours.

(Process 65-2) In the nodes located at each of the bases configuring each of the distributed file management groups and the recording devices located at multiple bases networked to the nodes at the bases, a node of at least any one base or a recording device of at least any one base networked to the nodes at the bases is operated within each of the distributed file management groups at a predetermined point of time.

(Process 65-3) When the nodes located at each of the bases configuring each of the distributed file management groups and the recording devices located at multiple bases networked to the nodes at the bases are shifted from an inactive state to an operating state, the safekept file data information is automatically updated to recent information in each of the distributed file management groups.

With this configuration, a system that utilizes power effectively and reduces costs may be constructed.

Further, in the digital asset guard service provision system of the present invention, preferably, the nodes at each of the bases and the recording devices at multiple bases networked to the nodes at the bases are configured to comprise a container or housing comprising power generation equipment utilizing renewable energy such as solar power, a file server and CPU, 5G communication equipment, and a battery.

Therefore, this configuration may embody a system to effectively utilize unstable power sources, make third parties extremely difficult to infiltrate networks in a closed environment, and to provide the strongest level of attack resistance against cyberattacks.

In addition, since power is mainly used during daytime hours, the power supply may decrease during daytime hours and there may be significant communication delays between users and equipment. However, use of renewable energy such as sunlight may alleviate communication delays between users and equipment when the supply of market power decreases.

Further, in the digital asset guard service provision system of the present invention, preferably, the nodes at each of the bases and the recording devices at multiple bases networked to the nodes at the bases are configured to comprise a container or housing comprising, a file server and CPU, 5G communication equipment, a battery that can withstand short-term operation, a cooling device and the like.

This configuration may embody a system to make third parties extremely difficult to infiltrate networks in a closed environment, and provide the strongest level of attack resistance against cyberattacks.

Furthermore, the digital asset guard service provision system of the present invention is preferably configured to perform the processes 68-1 and 68-2.

(Process 68-1) The digital asset guard service provision system cancels out a file data record capacity provided in a node held by a node holder participating in the consortium-type blockchain and a file data record amount used by the node holder. and calculates differences between a total file data record amount and the provided file data record capacity.

(Process 68-2) The digital asset guard service provision system collects and allocates the money amount based on the difference calculated in the process 68-1 for each node holder.

This configuration may accurately adjust the profit distribution for the node holders participating in the consortium-type blockchain.

Further, the digital asset guard service provision system of the present invention preferably further comprises a customer registration information designation reception means and a smart contract for customer registration. The customer registration information designation reception means is configured to accept designations of a customer ID and terminal information (fixed IP addresses and the like) used for saving and restoring the file data from a customer who desires to save the file data. The smart contract for customer registration is configured to have a function for encrypting and recording the customer ID accepted by the customer registration information designation reception means, terminal information and the fixed IP address used for saving and restoring the file data in the node groups located at the specified bases in the consortium-type blockchain.

This configuration, by limiting the terminals allowed to access the system to those used for saving and restoring the file data specified by the customer, may prevent a malicious third party's communication terminal from accessing the system.

Further, the digital asset guard service provision system of the present invention preferably further comprises a first parameter designation reception and recording means, and the first parameter designation reception and recording means is configured to accept a designation of the first parameter from a customer desiring to save the file data, and to record the specified first parameter in an offline recording medium.

This configuration may enable the customer to specify the first parameter and to manage the first parameter specified by the customer offline.

Further, the digital asset guard service provision system of the present invention preferably further comprises the second parameter designation reception and setting means, and the second parameter designation reception and setting means is configured to accept designation of the second parameter from the co-administrator of the consortium-type blockchain, and to set and modularize the designated second parameter in a source code of the predetermined smart contract that performs the corresponding process.

This configuration may enable a co-administrator of the consortium-type blockchain to designate the second parameter, and to modularize the second parameter designated by the co-administrator into a smart contract.

In the digital asset guard service provision system of the present invention, preferably, the index information generation means, the index information recording means, the encrypted index information extraction means, and the index information decryption means are separately configured on the customer side and on the co-administrator side of the consortium-type blockchain;

- the index information generation means comprises the customer-side index information generation program, wallet function, or smart contract being operated on the customer side who desires to save the file data, and the smart contract for generating the co-administrator side index information being operated on the co-administrator side of the consortium-type blockchain;
- the program or smart contract for generating customer side index information is configured to have a function for generating customer side index information;
- the customer side index information comprises the original file name, upload date information and a safekept period of file data to be saved when uploaded to the first temporary storage area using the upload means;
- the smart contract for generating co-administrator side index information is configured to have a function for generating co-administrator side index information;
- the co-administrator side index information comprises file name information after renaming of each file data distributed and recorded by each of the smart contracts for distribution and recording, and destination information for the corresponding encrypted records;
- the index information recording means comprises the program or smart contract for recording customer side index information operating on the customer side desiring to save the file data, and the smart contract for recording co-administrator side index information operating on the co-administrator side of the consortium-type blockchain;
- the program or smart contract for recording customer-side index information is configured to have a function for encrypting the customer side index information generated by the program or smart contract for generating customer side index information and recording in the node group at the specified base in the consortium-type blockchain, when performed an approval using the first secret key for first blockchain access generated based on the first secret key, that is, the first offline decryption key generated by the customer;
- the smart contract for recording co-administrator side index information is configured to have a function for encrypting the co-administrator side index information generated by the smart contract for generating co-administrator side index information, and record in the node group at the specified base in the consortium-type blockchain, when performed an approval using the second secret key for blockchain access generated based on the second secret key, that is the second offline decryption key generated by the co-administrator of the consortium-type blockchain;

the encrypted index information extraction means comprises the smart contract for extracting customer side encrypted index information operating on the customer side desiring to restore the file data, and the smart contract for extracting co-administrator side encrypted index information operating on the co-administrator side of the consortium-type blockchain;

the smart contract for extracting customer side encrypted index information is configured to have a function for encrypting the encrypted customer side index information recorded in node groups located at specified bases in the consortium-type blockchain by the smart contract for recording customer side encrypted index information based on the first and second parameters associated with the file data to be extracted that is accepted by the file data extraction instruction reception means, when performed an approval using the first secret key for blockchain access generated based on the first secret key, that is the first decryption key by the customer;

the smart contract for extracting encrypted co-administrator side index information is configured to have a function for extracting encrypted co-administrator side index information recorded in node groups located at specified bases in the consortium-type blockchain by the smart contract for recording co-administrator side encrypted index information based on the first and second parameters associated with the file data to be extracted that is accepted by the file data extraction instruction reception means, when performed an approval using the second secret key for blockchain access generated based on the second secret key, that is the second decryption key by the co-administrator of the consortium-type blockchain;

the index information decryption means comprises the smart contract for decrypting customer side index information that operates on the customer side who desires to restore the file data, and the smart contract for decrypting co-administrator side index information that operates on the co-administrator side of the consortium-type blockchain;

the smart contract for decrypting customer side index information is configured to have a function for decrypting the customer side encrypted index information extracted by the smart contract for extracting customer side encrypted index information based on the first secret key, that is the first offline decryption key generated by the customer;

the smart contract for decrypting co-administrator side index information is configured to have a function for decrypting the co-administrator side encrypted index information extracted by the smart contract for extracting co-administrator side encrypted index information based on a second secret key, that is second offline decryption key generated by the co-administrator;

With this configuration, the co-administrator of the consortium-type blockchain may not be able to comprehend the customer-side index information, and the customer may not be able to comprehend the co-administrator-side index information. Moreover, each encrypted index information may be almost impossible to be extracted by safekeeping offline the first secret key for blockchain access generated based on the first secret key (first offline decryption key) and a second secret key for blockchain access generated based on the second secret key (second offline decryption key) generated by the co-administrator of the consortium-type blockchain respectively;

For this reason, processes in the customer side file data saving system and processes in the co-administrator side file data saving system are fragmented, and the risk that the processed data for the file data saving in both the customer side and the co-administrator side file data saving systems are stolen by a malicious third party at the same time becomes extremely low.

Then, the process in the customer side file data restoration system and the process in the co-administrator side file data restoration system are fragmented. Therefore, the risk that process data for the file data restoration in both the customer side file data restoration system and the co-administrator side file data restoration systems is stolen by a malicious third party at the same time becomes extremely low.

As a result, the attack resistance of digital assets against high-level cyberattacks may be further strengthened.

Further, in the digital asset guard service provision system of the present invention, preferably, the following information 73-1 through 73-3 is configured to be recorded in each encrypted state in node groups located at specified bases in the consortium-type blockchain.

(Information 73-1) As customer setting information, information of an IP address, a user ID, the first parameter, and a co-administrator side smart contract address that can refer to the customer setting information.

(Information 73-2) As customer index information, a file name and file data capacity when the file data is saved, a process date and time, safekeeping deadline, and setting information of a smart contract operating for customer file data saving on the co-administrator side.

(Information 73-3) As co-administrator side index information, renamed file name information of each file data distributed and recorded by each of the smart contracts for distribution and recording.

In this way, the customer and the co-administrator of the consortium-type blockchain cannot visually recognize the entire information regarding the customer file data saving, such as customer information recorded in the blockchain at the time of new application, information at the time of saving file data, and the like. On the contrary, only programs such as smart contracts running in the system may be made to comprehend such information. As a result, the risk of information being comprehended by a malicious third party would become extremely low.

Further, in the digital asset guard service provision system of the present invention, preferably, the recording devices at multiple bases networked to the nodes located at each of the bases are configured with the nodes configuring a blockchain network the same as the nodes at the bases, or are configured with devices that do not belong to the blockchain network configured with the nodes at the bases, and are configured with the devices to which the nodes at the bases are capable of connecting in an accessible state.

With this configuration, the recording devices that distribute and record becomes easier to be managed, and a system that prevents malicious third parties from intruding and data from leaking to the outside becomes easier to generate.

Further, in the digital asset guard service provision system of the present invention, preferably, the recording devices at the multiple bases networked to the nodes at each of the bases are configured with devices configuring another network different from the nodes at the bases.

This configuration may increase file data recording capacities.

Further, in the digital asset guard service provision system of the present invention, preferably, in the smart contract for allotting distributed file management groups and in the smart contract for extracting encrypted and multi-divided file data, the second parameter specified by a co-administrator of the consortium-type blockchain is hard-coded.

With this configuration, smart contracts may not be recompiled, so the risk that a malicious third party may comprehend the contents of the second parameter is extremely low. As a result, the attack resistance of digital assets against high-level cyberattacks may be increased.

Furthermore, in the digital asset guard service provision system of the present invention, preferably, the consortium-type blockchain is constructed by comprising the private type blockchain.

This configuration may further broaden configuration of consortium-type blockchains. Note that since a private blockchain is a blockchain that has confidentiality, private blockchains may easily prevent intrusion from malicious third parties.

Furthermore, in the digital asset guard service provision system of the present invention, preferably, the private blockchain is configured with a planet comprising node groups in which multiple virtual nodes are combined at one base.

In this configuration, by setting up the multiple recording devices networked to each node in node groups in which multiple virtual nodes of the private type blockchain are combined at different bases in the regions of the world, the nodes at another base belonging to distributed file management groups or the recording devices networked to the nodes may be protected from an attack and the file data is maintained, even if the nodes at one base or the recording device networked to the nodes are subject to EMP attacks and the customer's divided file data to be saved is lost.

Further, in the digital asset guard service provision system of the present invention, preferably, the co-administrator side file data saving system comprises the smart contract for saving co-administrator side file data;

- the smart contract for saving co-administrator side file data is configured to incorporate each function of the smart contract for allotting distributed file management groups, the smart contract for distribution and recording, the smart contract for generating server index information, and the smart contract for recording server index information;
- the co-administrator side file data restoration system comprises a smart contract for restoring co-administrator side file data; and
- the smart contract for restoring co-administrator side file data is configured to incorporate each function of the smart contract for extracting encrypted server index information, the smart contract for decrypting server index information, and the smart contract for extracting encrypted and divided file data.

In this way, even if a single smart contract incorporating the functions of the multiple smart contracts described above may obtain the same effect as the digital asset guard service provision system of the present invention comprising the multiple smart contracts described above.

Further, in the digital asset guard service provision system of the present invention, preferably, the smart contract for saving co-administrator side file data comprises the second parameter specified by a co-administrator of the consortium-type blockchain hardcoded internally.

In this way, even if a single smart contract incorporating the functions of the multiple smart contracts described above may obtain the same effect as a configuration in which the second parameter is hardcoded internally in the digital asset guard service provision system of the present invention comprising the above mentioned multiple smart contracts.

Further, in the digital asset guard service provision system of the present invention, preferably, the smart contract for restoring co-administrator side file data comprises an internally hard-coded second parameter or the second compound parameter specified by a co-administrator of the consortium-type blockchain. The second compound parameter is configured to comprise a pair of:

- the second decryption parameter specified by a co-administrator and managed offline (and incorporated and modularized in the predetermined smart contract that performs the corresponding process); and
- the second encryption parameter that is automatically generated from the second decryption parameter (which is incorporated and modularized within the predetermined smart contract that performs the corresponding process).

In this way, even if a single smart contract incorporating the functions of the multiple smart contracts described above may obtain the same effect as a configuration in which the second parameter or the second compound parameter is hardcoded internally in the digital asset guard service provision system of the present invention comprising the above mentioned multiple smart contracts, (the second compound parameter being configured with a pair of the second decryption parameter specified by a co-administrator and managed offline (and incorporated and modularized in the predetermined smart contract that performs the corresponding process) and the second encryption parameter that is automatically generated from the second decryption parameter (which is incorporated and modularized within the predetermined smart contract that performs the corresponding process)).

Further, in the digital asset guard service provision system of the present invention, preferably, the smart contract for saving co-administrator side file data is configured to have functions of performing processes 82-1 through and 82-3, and processes 82-4 through and 82-6.

(Process 82-1) The smart contract for saving co-administrator side file data generates keys for renaming and encryption using the first parameter specified by a customer who desires to save the file data and the internally hard-coded second parameter.

(Process 82-2) The smart contract for saving co-administrator side file data changes and encrypts file names of each file data (encrypted and multi-divided by the file data encryption and division means and) uploaded to the first temporary storage area by the upload means using the renaming and encryption keys.

(Process 82-3) After performing the process 82-2, the smart contract for saving co-administrator side file data allots the file data to the multiple distributed file management groups.

(Process 82-4) The smart contract for saving co-administrator side file data generates server index information (which comprises renamed file name information of each distributed and recorded file data and address information of the nodes and the recording devices safekeeping file data in each of the distributed file management groups to which each file data is allotted), before encrypting and recording in node groups located at specified bases in the consortium-type blockchain, changes to a name further different from the renamed file name, and generates new server index information based on the internally hard-coded second parameter for information of the renamed file name and address information of the nodes and the recording devices.

(Process 82-5) The smart contract for saving co-administrator side file data encrypts the new server index information generated in the process 82-4 and records in the node group of the specified base in the consortium-type blockchain.

(Process 82-6) After performing the process 82-5, the smart contract for saving co-administrator side file data deletes renamed file name information of each original distributed and recorded file data and address information of the nodes and the recording devices safekeeping the file data in each of the distributed file management groups to which each file data is destined to be allotted.

With this configuration, even if the server index information is stolen by a malicious third party, renamed file name information in server index information and address information of safekeeping destinations of the nodes and the recording devices become even more difficult for a third party to recognize that these are the file name information of the original customer file data to be saved and the address information of the safekeep destinations of a node and recording device. This may further strengthen the attack resistance of digital assets against high-level cyberattacks.

Further, in the digital asset guard service provision system of the present invention, preferably, the smart contract for saving co-administrator side file data is further configured to have a function for performing the following processes 83-1 through 83-4.

(Process 83-1) The smart contract for saving co-administrator side file data changes the file name to a name that is further different from the renamed file name based on the internally hard-coded second parameter.

(Process 83-2) The smart contract for saving co-administrator side file data further adds dummy file information to the renamed file name information and the address information of the safekeeping destinations of the node and recording device processed in the process 83-1, and generates new server index information.

(Process 83-3) The smart contract for saving co-administrator side file data encrypts the new server index information generated in the process 83-2 and records in node groups at specified bases in the consortium-type blockchain.

(Process 83-4) After performing the process 83-3, the smart contract for saving co-administrator side file data deletes renamed file name information of each original distributed and recorded file data and address information of the nodes and the recording devices safekeeping the file data in each of the distributed file management groups to which each file data is destined to be allotted.

With this configuration, even if the server index information is stolen by a malicious third party, recognizing the file name information of the original customer file data to be saved and address information of the safekeeping destinations of the node and recording device by the malicious third party would become even more difficult to identify information of the renamed file name and address information of the safekeeping destinations of the node and recording device to which dummy file information is added in the server index information.

This may further strengthen the attack resistance of digital assets against high-level cyberattacks.

Further, in the digital asset guard service provision system of the present invention, preferably, the smart contract for restoring co-administrator side file data is configured to have a function for performing processes 84-1 through 84-5.

(Process 84-1) The smart contract for restoring co-administrator side file data generates the name restoration and decryption key using the first parameter or first compound parameter internally hard-coded and specified by a customer and the second parameter or second compound parameter specified by a co-administrator of the consortium-type blockchain.

The first compound parameter comprises a pair of a first decryption parameter specified by a customer and managed offline, and the first encryption parameter automatically generated from the first decryption parameter, and the second compound parameter comprises a pair of the second decryption parameter specified by a co-administrator and managed offline (and incorporated and modularized within the predetermined smart contract that performs the corresponding process), and the second encryption parameter that is automatically generated from the second decryption parameter (and incorporated and modularized within the predetermined smart contract that performs the corresponding process).

(Process 84-2) The smart contract for restoring co-administrator side file data extracts encrypted server index information (recorded in node groups located at specified bases in the consortium-type blockchain).

(Process 84-3) After performing the process 84-2, the smart contract for restoring co-administrator side file data sets back the new server index information in which the file name is further different from the renamed file name based on the second parameter or the second compound parameter internally hard-coded.

(Process 84-4) Following the process 84-3, the smart contract for restoring co-administrator side file data sets the changed name back and sets information of the renamed file name back.

(Process 84-5) Following the process 84-4, the smart contract for restoring co-administrator side file data sets information of file names before the names of each of the distributed and recorded file data are changed based on the keys for name restoration and decryption.

With this configuration, recognizing the renamed file name information in the server index information and address information of the safekeeping destinations of the node and recording device by the malicious third party would become even more difficult to identify information of a file name of original file data to be saved by a customer and address information of the safekeeping destinations of the node and recording device, and the configuration may further strengthen the attack resistance of digital assets against high-level cyberattacks, and customers may restore original file data.

Further, in the digital asset guard service provision system of the present invention, preferably, the smart contract for restoring co-administrator side file data is configured to have a function for performing the following processes 85-1 through 85-6.

(Process 85-1) The smart contract for restoring co-administrator side file data generates the name restoration and decryption key using the first parameter or first compound parameter specified by a customer and the second parameter or second compound parameter specified by a co-administrator of an internally hard-coded consortium-type blockchain.

The first compound parameter is configured with a pair of a first decryption parameter specified by a customer and managed offline, and the first encryption parameter automatically generated from the first decryption parameter. The second compound parameter is configured with a pair of the second decryption parameter specified by a co-administrator and managed offline (the second decryption parameter being incorporated and modularized within the predetermined smart contract that performs the corresponding process) and the second encryption parameter automatically generated from the second decryption parameter (the second encryption parameter being incorporated and modularized within the predetermined smart contract that performs the corresponding process).

(Process 85-2) The smart contract for restoring co-administrator side file data extracts encrypted server index information (recorded in node groups located at specified bases in the consortium-type blockchain).

(Process 85-3) After performing the process 85-2, the smart contract for restoring co-administrator side file data excludes dummy file information based on the internally hard-coded second parameter or second complex parameter.

(Process 85-4) The smart contract for restoring the co-administrator side file data, following the process 85-3, sets back the new server index information in which the file name is further different from the renamed file name.

(Process 85-5) Following the process 85-4, the smart contract for restoring co-administrator side file data sets the changed name back to information of the renamed file name.

(Process 85-6) Following the process 85-5, the smart contract for restoring co-administrator side file data sets file name information back before the renaming of each distributed and recorded file data based on the name restoration and decryption key.

With this configuration, recognizing file name information of the original file data to be saved by a customer and the address information of the safekeeping destinations of the node and recording device by the malicious third party would become even more difficult to identify information of the renamed file name to which dummy file information in server index information is added and the address information of the safekeeping destinations of the node and recording device, and the configuration may further strengthen the attack resistance of digital assets against high-level cyberattacks, and customers may restore the original file data.

Furthermore, the digital asset guard service provision system according to the present invention guards digital assets against high-level cyberattacks, comprising a decentralized ledger using the dispersed technique, and a server application for performing a predetermined process using data managed in the decentralized ledger, the digital asset guard service provision system is characterized by comprising:

the consortium-type asynchronous decentralized ledger group configured with multiple planets (a planet is a unit comprising an asynchronous decentralized ledger group) comprising node groups that link the nodes located at multiple bases in different regions in the world;

the file data saving system; and the file data restoration system;

wherein the nodes located at each of the bases are networked to the recording devices at the multiple bases in the different regions in the world to form distributed file management groups, wherein the file data saving system comprises:

the program having multiple encryption and division algorithms;

an encryption and division algorithm selection reception means;

the file data saving instruction reception means;

the file data encryption and division means;

the upload means;

a distributed file management groups allotment means;

the distribution and recording means;

the system setting information generation and recording means;

the server index information generation means;

the server index information recording means;

the customer setting information generation means or program having a wallet function for generating setting information;

the customer index information generation means or program having a wallet function for generating customer index information;

the customer index information recording means; and the first data deletion means;

wherein the file data restoration system comprises:

the multiple programs having decryption and linkage algorithms;

the file data extraction instruction reception means;

the encrypted server index information extraction means;

the server index information decryption means;

an encrypted and divided file data extraction means;

the download means;

the file data restoration means; and the second data deletion means;

wherein the program having the multiple encryption and division algorithms is configured to have the different file data encryption and division process method, wherein the encryption and division algorithm selection reception means is configured to accept a selection of a program having predetermined encryption and division algorithms based on the first parameter specified by a customer who desires to save the file data, wherein the file data saving instruction reception means is configured to accept a file data saving instruction from a customer who desires to save the file data, wherein the file data encryption and division means is configured to encrypt and multi-divide the customer file data to be saved, the customer file data being accepted by the file data saving instruction reception means, using a program having the encryption reception means, wherein the upload means is configured to upload each file data encrypted and multi-divided to the first temporary storage area by the file data encryption and division means, wherein the distributed file management group allotment means is configured to have a function for allotting, each of the file data (that is encrypted and multi-divided by the file data encryption and division means, and) uploaded into the first temporary storage area by the upload means, to the multiple distributed file management groups, (which is configured with the nodes located at each of the bases configuring for the planet set on a co-administrator side in a condition specified by a customer and the recording devices located at multiple bases networked to the nodes at the bases) based on the first parameter and the second parameter specified by the co-administrator of the consortium-type asynchronous decentralized ledger group, wherein the distribution and recording means is configured to have a function to distribute and record, each file data allotted by the distributed file management group allotment means, in the nodes located at each of the bases belonging to each of the corresponding distributed file management groups and in the recording devices located at multiple bases networked to the nodes at the bases, wherein the system setting information generation and recording means is configured to have a function for generating and encrypting the system setting information and recording into the node groups located at the specified bases in the consortium-type asynchronous decentralized ledger group, wherein the system setting information comprises:

destination identifying information such as terminal information (fixed IP addresses and the like) for uploading the system setting information to the first temporary storage area using the upload means;

a number of a predetermined process means that performs a process corresponding to a recording destination of the customer file data;

planet information to which a recording destination of file data belongs; and information on a file server group (at the nodes at predetermined bases and the recording devices located at multiple bases networked to the nodes at the bases) configuring distributed file management groups;

wherein the server index information generation means is configured to have a function for generating server index information that comprises:

information on file names of each file data distributed and recorded by each of the distribution and recording means; and configuration information of each of the distributed file management groups which are allotment destinations of each file data, wherein the server index information recording means is configured to have a function for encrypting server index information generated by the server index information generation means, and of recording the server index information into node groups located at specified bases in the consortium-type asynchronous decentralized ledger group, wherein the customer setting information generation means or program having a wallet function for generating customer setting information is configured to generate customer setting information that comprises the first parameter setting information associated with the program having the encryption and division algorithms accepted by the encryption and division algorithm selection reception means;

wherein the customer index information generation means or program having a wallet function for generating customer index information is configured to have a function for generating customer index information that comprises information of an original file name and an upload date of the customer file data to be saved, wherein the customer index information recording means is configured to have a function for encrypting customer index information generated by the customer index information generation means or program having the wallet function for generating customer index information, and for recording the encrypted customer index information into node groups located at specified bases in the consortium-type asynchronous decentralized ledger group, wherein the first data deletion means is configured to delete each file data uploaded into the first temporary storage area, after the server index information is encrypted by the server index information recording means and recorded in node groups located at specified bases in the consortium-type asynchronous decentralized ledger group, wherein the program having the multiple decryption and linkage algorithms is configured to associated with each of the programs having encryption and division algorithms, and differentiate file data decryption and linkage process methods;

wherein the file data extraction instruction reception means is configured to accept a file data extraction instruction from a customer who desires to restore the file data, wherein the encrypted server index information extraction means is configured to have a function for extracting encrypted server index information (recorded in node groups located at specified bases in the consortium-type asynchronous decentralized ledger group by the server index information recording means) based on the first parameter or first compound parameter associated with the file data to be extracted accepted by the file data extraction instruction reception means and based on the second parameter or second compound parameter, wherein the first compound parameter comprises a pair of a first decryption parameter specified by a customer and managed offline and the first encryption parameter automatically generated from the first decryption parameter, wherein the second compound parameter is configured with a pair of the second decryption parameter specified by a co-administrator and managed offline (which is incorporated and modularized within a predetermined process means that performs the corresponding process) and the second encryption parameter automatically generated from the second decryption parameter (which is incorporated and modularized within a predetermined process means that performs the corresponding process), wherein the server index information decryption means is configured to have a function for decrypting the encrypted server index information extracted by the encrypted server index extraction means, wherein the encrypted and divided file data extraction means is configured to have a function for extracting the encrypted and multi-divided file data (which are allotted to each of the distributed file management groups by the distributed file management group allotment means, and which are distributed and recorded in the nodes located at each of the bases belonging to each of the distributed file management groups and in the recording devices located at multiple bases networked to the nodes at the bases by each of the distribution and recording means) from any of the nodes located at each of the bases belonging to each of the distributed file management groups or from the recording devices located at multiple bases networked to the nodes at the bases, using the server index information decrypted by the server index information decryption means, wherein the download means is configured to download each of the encrypted and multi-divided file data, extracted by the encrypted and multi-divided file data extraction means, to the second temporary storage area, wherein the file data restoration means is configured to decrypt, each of the encrypted and multi-divided file data (which are extracted by the encrypted and multi-divided file data extraction means and) downloaded to the second temporary storage area by the download means, to integrate into one file data and to restore to the file data before being saved, using a program having decryption and linkage algorithms associated with the program having the encryption and division algorithms accepted by the encryption and division algorithm selection reception means, and wherein the second data deletion means is configured to delete each of the encrypted and multi-divided file data downloaded to the second temporary storage area after restored to the file data before being saved by the file data restoration means.

Even with this configuration, as with the configuration using blockchain, important information such as confidential information and personal information may be strongly and efficiently protected, and the important information may be protected and restored without being stolen by a third party, even if the important information is subjected to cryptographic analysis by quantum computers or EMP attacks.

Therefore, according to the present invention, important information such as confidential information and personal information may be strongly and efficiently protected from high-level cyberattacks and physical destruction, and the important information may be protected even if the important information is subjected to cryptographic analysis by quantum computers or EMP attacks. The digital asset guard service provision system may be provided that can restore information without being stolen by a third party.

Hereinafter, embodiments for performing the present invention are described with reference to the drawings.

First Embodiment

Figure 1:
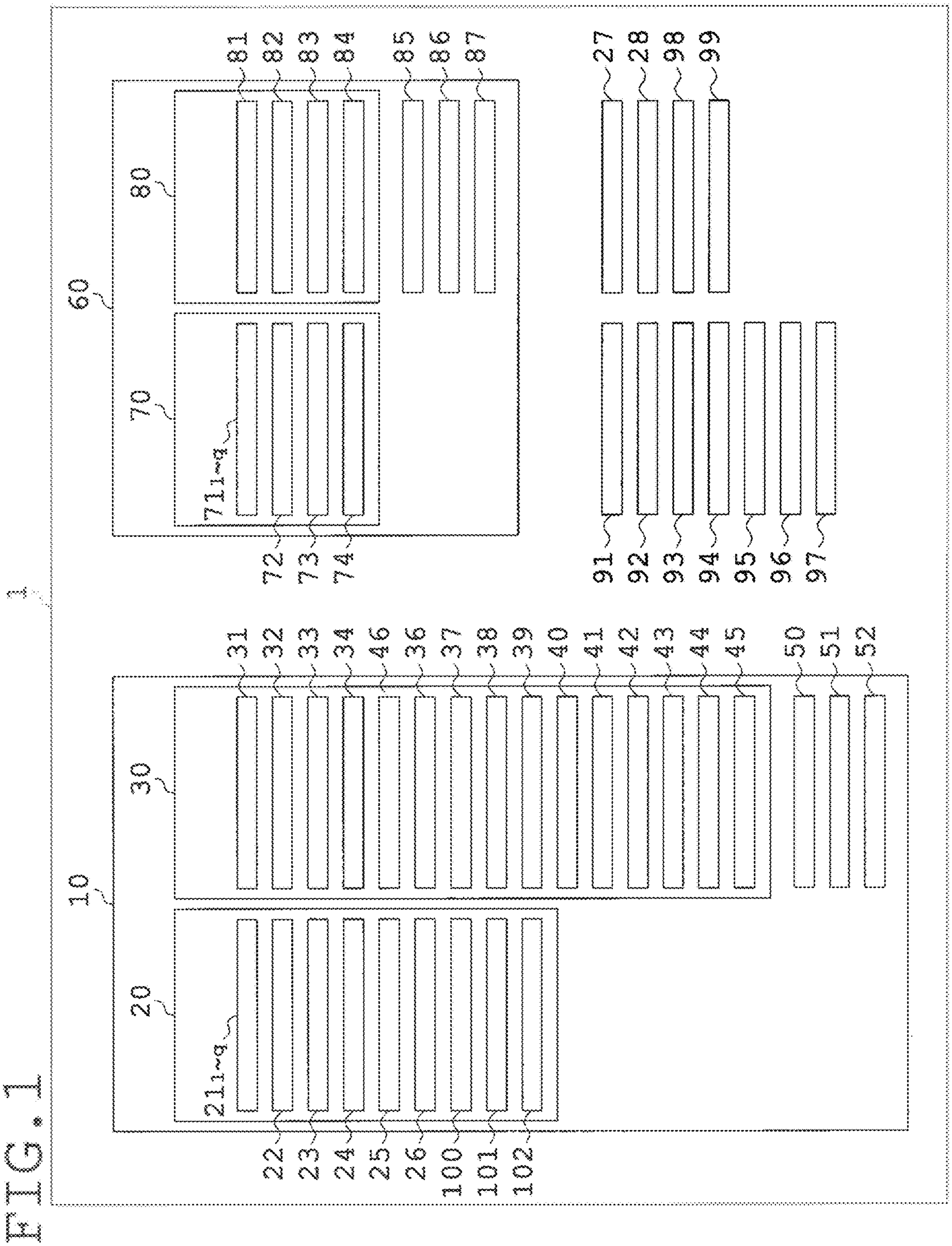
FIG. 1 is an explanatory diagram schematically illustrating the overall configuration of software included in the digital asset guard service provision system according to the first embodiment of the present invention.

FIG. 1 is an explanatory diagram schematically showing the overall configuration of the digital asset guard service provision system according to the first embodiment of the present invention.

The digital asset guard service provision system 1 of the first embodiment comprises a decentralized ledger using the dispersed technique such as blockchain, and a smart contract or server application for performing predetermined process using data managed by the decentralized ledger. The digital asset guard service provision system 1 of the first embodiment comprises the consortium-type blockchain, and, for example, as shown in FIG. 1, a file data saving system 10 and a file data restoring system 60.

Consortium-Type Blockchain

The consortium-type blockchain is configured with multiple planets $\mathbf{100}_{1\ through\ n}$ (where n is an integer greater than or equal to 2) configuring the blockchain (a planet is a unit configuring the blockchain).

Each of the planets $\mathbf{100}_{1\ through\ n}$ (where n is an integer of 2 or more) is configured with a node group that is a combination of the nodes $\mathbf{102}_{1\ through\ mb}$ (where mb is an integer of 2 or more) at multiple bases in different regions in the world.

In addition, the nodes $\mathbf{102}_{1\ through\ mb}$ (where mb is an integer of 2 or more) at each of the bases are networked to the recording devices located at multiple bases in different regions in the world, and are connected to distributed file management groups $\mathbf{101}_{1\ through\ m}$ (where m is an integer of 2 or more).

FIG. 103 illustrates an example of a combination of the nodes $\mathbf{102}_{1\ through\ mb}$ (where mb is an integer of 2 or more) at multiple bases configuring the distributed file management groups $\mathbf{101}_{1\ through\ m}$ (where m is an integer of 2 or more) and the recording devices located at multiple bases networked to the nodes at the bases. FIG. 103 illustrates an example of a combination of four nodes in each of four distributed file management groups and the multiple recording devices networked to the nodes.

File Data Saving System 10

Figure 2:
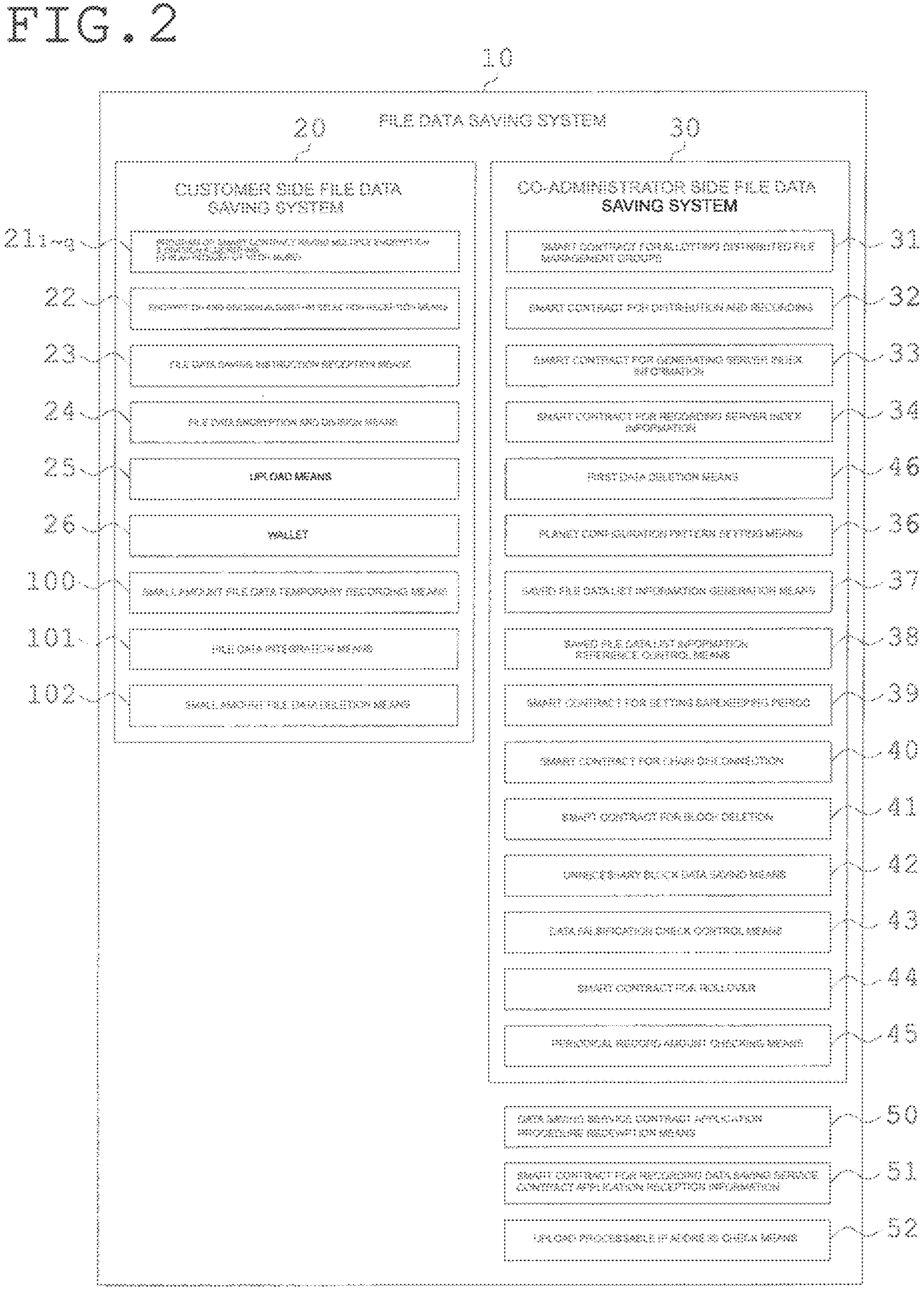
FIG. 2 is an explanatory diagram schematically illustrating the configuration of the file data saving system in the digital asset guard service provision system of the present embodiment.

For example, as shown in FIG. 2, the file data saving system 10 comprises a customer side file data saving system 20 and a co-administrator side file data saving system 30.

Customer Side File Data Saving System 20

Figure 3:
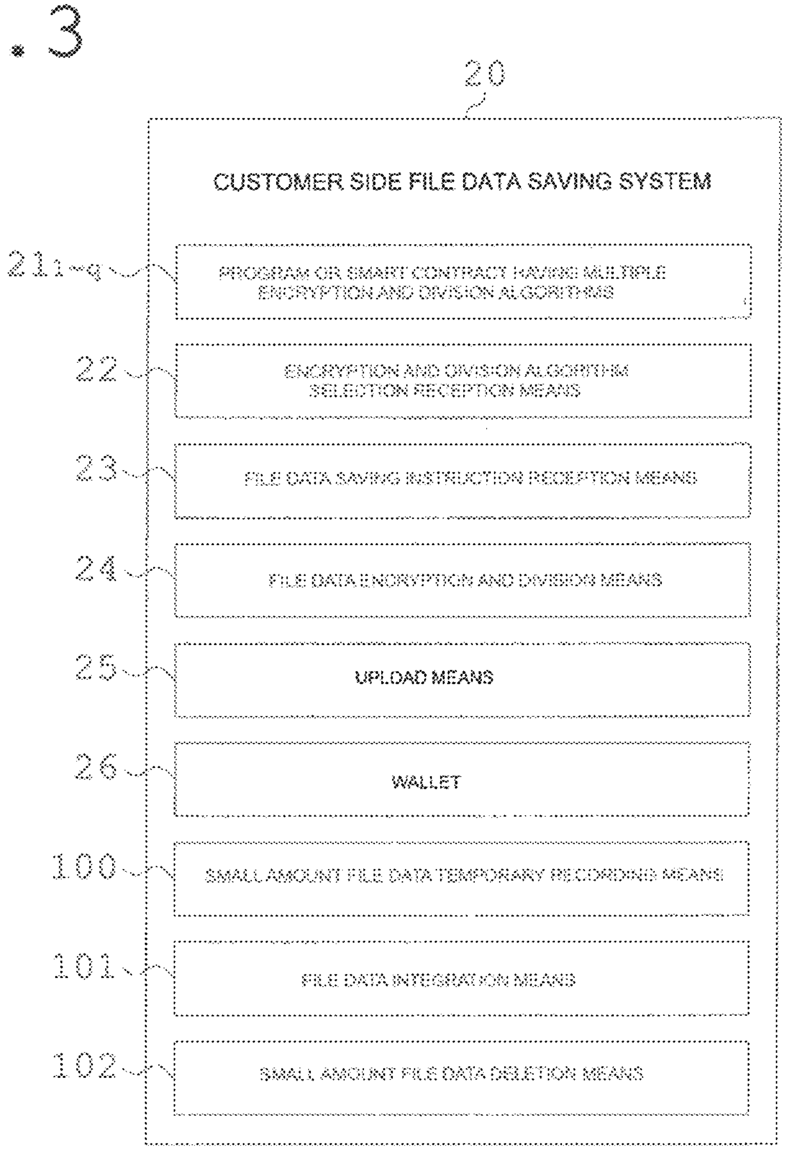
FIG. 3 is an explanatory diagram schematically illustrating the configuration of the customer-side file data saving system in the digital asset guard service provision system of the present embodiment.

For example, as shown in FIG. 3, the customer side file data saving system 20 comprises programs or smart contracts $\mathbf{21}_{1\ through\ q}$ (where q is an integer of 10 or more) that have multiple encryption and division algorithms, an encryption and division algorithm selection reception means 22, the file data saving instruction reception means 23, the file data encryption and division means 24, the upload means 25, and a wallet (function) 26.

Figure 4:
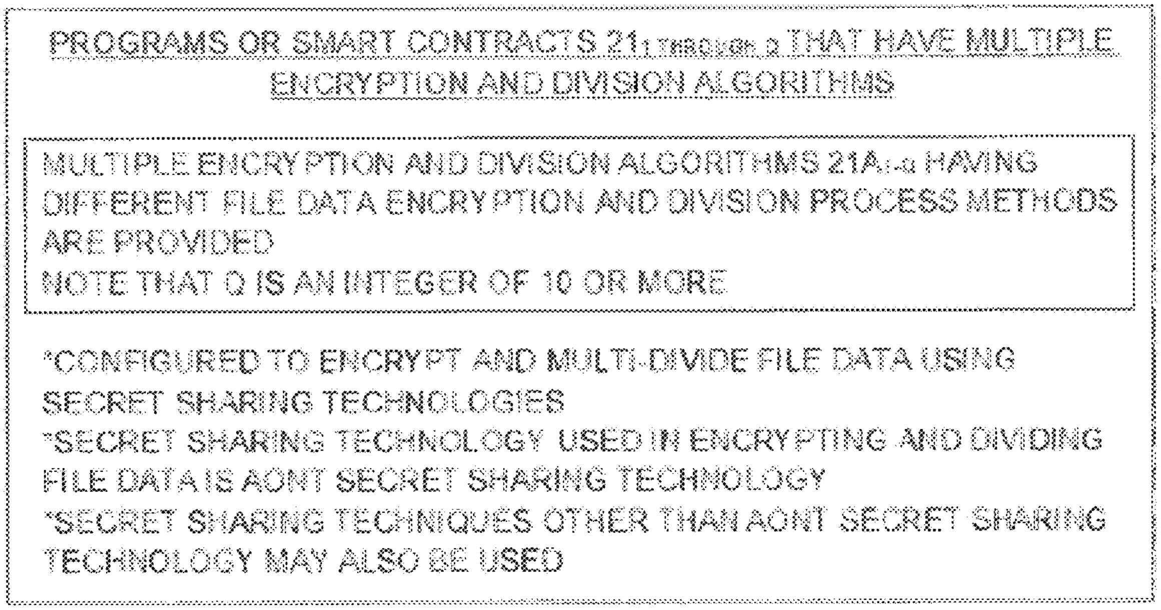
FIG. 4 is an explanatory diagram schematically illustrating the configuration of the program having multiple encryption and division algorithms in the digital asset guard service provision system of the present embodiment.

Programs or Smart Contracts Having Multiple Encryption and Division Algorithms $\mathbf{21}_{1\ through\ g}$ As shown in FIG. 4, for example, the programs or smart contracts $\mathbf{21}_{1\ through\ q}$ (where q is an integer of 10 or more) having multiple encryption and division algorithms $\mathbf{21}a_{1\text{-}q}$ (where q is an integer of 10 or more) having different file data encryption and division process methods.

In addition, the programs or smart contracts $\mathbf{21}_{1\ through\ q}$ (where q is an integer of 10 or more) having encryption and division algorithms are configured to encrypt and multi-divide file data using secret sharing technologies. The secret sharing technology used in the programs (or smart contracts) $\mathbf{21}_{1\ through\ q}$ (where q is an integer of 10 or more) having encryption and division algorithms is an AONT secret sharing technology in this embodiment. However, secret sharing techniques other than the AONT secret sharing technology may also be used.

Encryption and Division Algorithm Selection Reception Means 22

For example, as shown in FIG. 5A, the encryption and division algorithm selection reception means 22 is configured to accept a selection of the program or smart contract 21 having predetermined encryption and division algorithm 21*a* (where a is an integer from 1 through q) based on a first parameter P1 specified by a customer who desires to save the file data.

Note that the first parameter P1 comprises a file division code P11 and a file storage code P12.

Alternatively, for example, as shown in FIG. 5B, the encryption and division algorithm selection reception means 22 is configured to accept a selection of the program or smart contract 21 having the predetermined encryption and division algorithm 21*a* (where a is an integer from 1 through q) based on the file division code P11.

File Data Saving Instruction Reception Means 23

Figure 6:
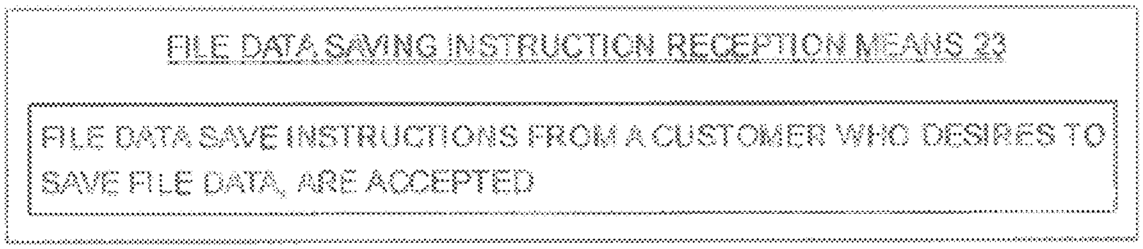
FIG. 6 is an explanatory diagram schematically illustrating the configuration of the file data saving instruction reception means in the digital asset guard service provision system of the present embodiment.

The file data saving instruction reception means 23 is configured to accept a file data save instruction from a customer who desires to save the file data, for example, as shown in FIG. 6.

File Data Encryption and Division Means 24

For example, as shown in FIG. 7A, the file data encryption and division means 24 is configured to encrypt and multi-divide the customer file data to be saved, accepted by the file data saving instruction reception means 23, using the program or smart contract 21 that comprises the encryption and division algorithm 21*a* (where a is an integer from 1 through q) accepted by the encryption and division algorithm selection reception means 22.

Further, for example, as shown in FIG. 7B, the file data encryption and division means 24 is configured to multi-divide the customer file data to be saved, accepted by the file data saving instruction reception means 23, using the program or smart contract 21 that comprises the encryption and division algorithm 21*a* (where a is an integer from 1 through q) accepted by the encryption and division algorithm selection reception means 22, and to encrypt each multi-divided file data based on the first public key, that is, the first encryption key K12 generated by the customer.

Note that, as shown in FIG. 7C, for example, the file data encryption and division means 24 may be configured to encrypt the customer file data to be saved, accepted by the file data saving instruction reception means 23 based on the first public key, that is the first encryption key K12 generated by the customer, and to multi-divide the encrypted file data, using the program or smart contract 21 that comprises the encryption and division algorithm 21*a* (where a is an integer from 1 through q) accepted by the encryption and division algorithm selection reception means 22.

That is, the file data encryption and division means 24 may be configured to have two patterns of "to divide and then to encrypt" and "to encrypt and then to divide" for the process order of encryption and division for the customer file data to be saved.

Upload Means 25

Figure 8:
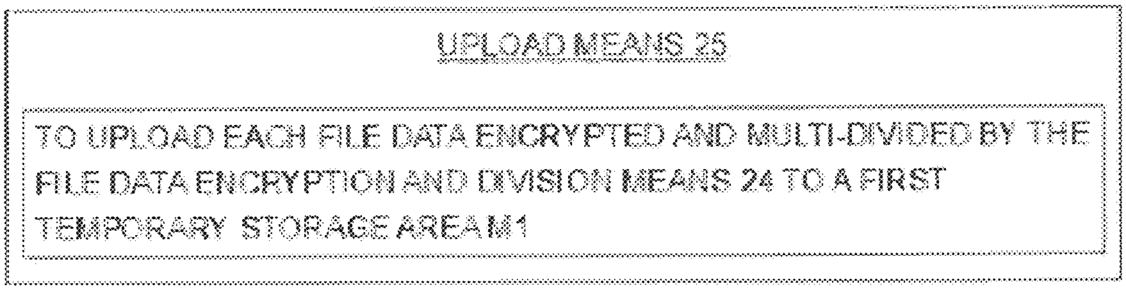
FIG. 8 is an explanatory diagram schematically illustrating the configuration of the upload means in the digital asset guard service provision system of the present embodiment.

For example, as shown in FIG. 8, the upload means 25 is configured to upload each file data encrypted and multi-divided by the file data encryption and division means 24 to the first temporary storage area M1.

Wallet (Function) 26

Figure 9:
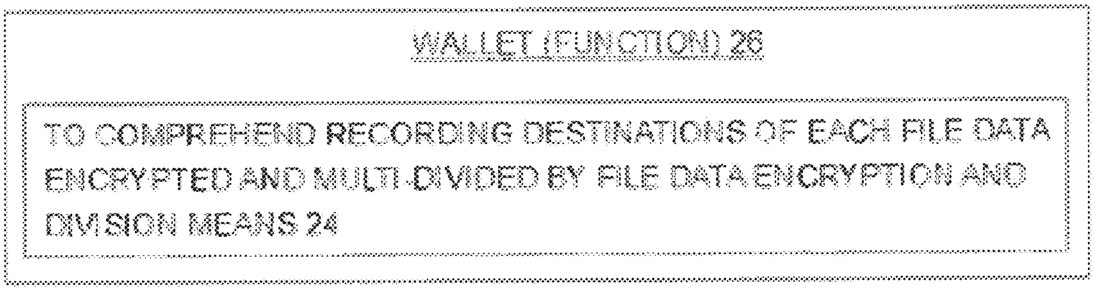
FIG. 9 is an explanatory diagram schematically illustrating the configuration of a wallet in the digital asset guard service provision system of the present embodiment.

For example, as shown in FIG. 9, the wallet (function) 26 is configured to comprehend a recording destination of each of the file data encrypted and multi-divided by the file data encryption and division means 24.

The customer side file data saving system 20 is further configured to comprises a small amount file data temporary recording means 100, a file data integration means 101, and a small amount file data deletion means 102.

Small Amount File Data Temporary Recording Means 100

Figure 10:
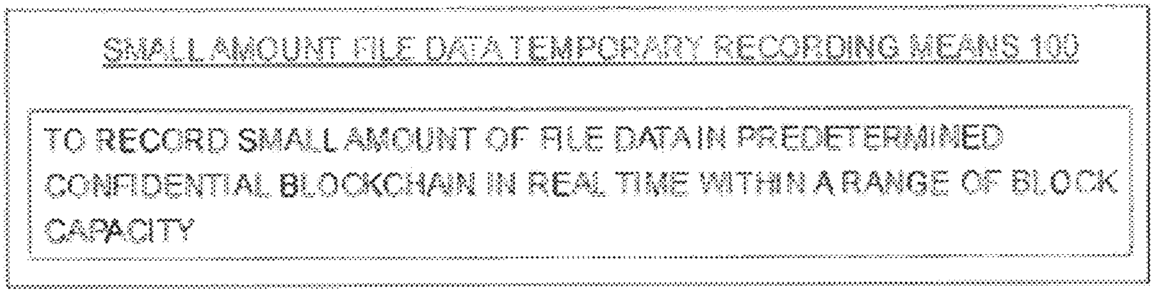
FIG. 10 is an explanatory diagram schematically illustrating the configuration of a small amount file data temporary recording means in the digital asset guard service provision system of the present embodiment.

For example, as shown in FIG. 10, the small amount file data temporary recording means 100 is configured to record a small amount of file data in a predetermined confidential blockchain in real time within the range of block capacity.

File Data Integration Means 101

The file data integration means 101 is configured to perform the processes 54-1 and 54-2, for example, as shown in FIG. 11A.

(Process 54-1) The file data integration means 101 performs batch processes several times a day to integrate each small amount of file data recorded in the predetermined confidential blockchain by the small amount file data temporary recording means 100 into one integrated file data.

(Process 54-2) After performing the process 54-1, the file data integration means 101 uses the integrated file data in the saving process from dividing and encrypting the integrated file data to distribute and record the integrated file data into the nodes $\mathbf{102}_{1\ through\ mb}$ (where mb is an integer of 2 or more) at each of the bases belonging to the distributed file management groups $\mathbf{101}_{1\ through\ m}$ (where m is an integer of 2 or more) and into the recording devices at multiple bases networked to the nodes at the bases by the file data saving system 10.

Further, the file data integration means 101 is configured to perform the processes 55-1 through 55-4, for example, as shown in FIG. 11B.

(Process 55-1) The file data integration means 101 performs batch processes several times a day to integrate each small amount of file data recorded in the predetermined confidential blockchain by the small amount file data temporary recording means 100 into one integrated file data.

(Process 55-2) The file data integration means 101 transfers the integrated file data integrated in the process of process 55-1 to the smart contract 21 having the encryption and division algorithm 21*a* (where a is an integer from 1 through q) accepted by the encryption and division algorithm selection reception means 22 in the file data saving system 10.

(Process 55-3) The file data integration means 101 controls to perform the saving process from dividing and encrypting the integrated file data transferred in the process of process 55-2 to distribute and record the integrated file data into the nodes $\mathbf{102}_{1\ through\ mb}$ (where mb is an integer of 2 or more) at each of the bases belonging to the distributed file management groups $\mathbf{101}_{1\ through\ m}$ (where m is an integer of 2 or more) and into the recording devices at multiple bases networked to the nodes at the bases.

Small Amount File Data Deletion Means 102

The small file data deletion means 102 is configured to perform the processes 54-3 and 54-4, for example, as shown in FIG. 12A.

(Process 54-3) After the file data saving system 10 completes the saving process for the integrated file data, the small amount file data deletion means 102 disconnects a chain of a block that records the corresponding small amount of file data in the predetermined confidential blockchain.

(Process 54-4) The small amount file data deletion means 102 is configured to delete the file data recorded in the block after performing the process 54-3.

For more details, as shown in FIGS. 12B and 12C, the small amount file data deletion means 102 is configured to have a function for performing processes 56-1 through 56-3.

(Process 56-1) The small amount file data deletion means 102 sets a temporary safekeeping period of a predetermined number of days, for example, about seven days, for file data that has been integrated into one by the file data integration means 101 and for which the file data saving system 10 has completed the saving process for the integrated file data, among the file data recorded in the predetermined confidential blockchain by the small amount file data temporary recording means 100.

(Process 56-2) The small amount file data deletion means 102 disconnects the chain of the corresponding block in the predetermined confidential blockchain after the temporary safekeeping period set in the process 56-1 has elapsed.

(Process 56-3) The small file data deletion means 102 deletes the file data recorded in the block whose chain was disconnected in the process 56-2.

Co-Administrator Side File Data Saving System 30

Figure 13:
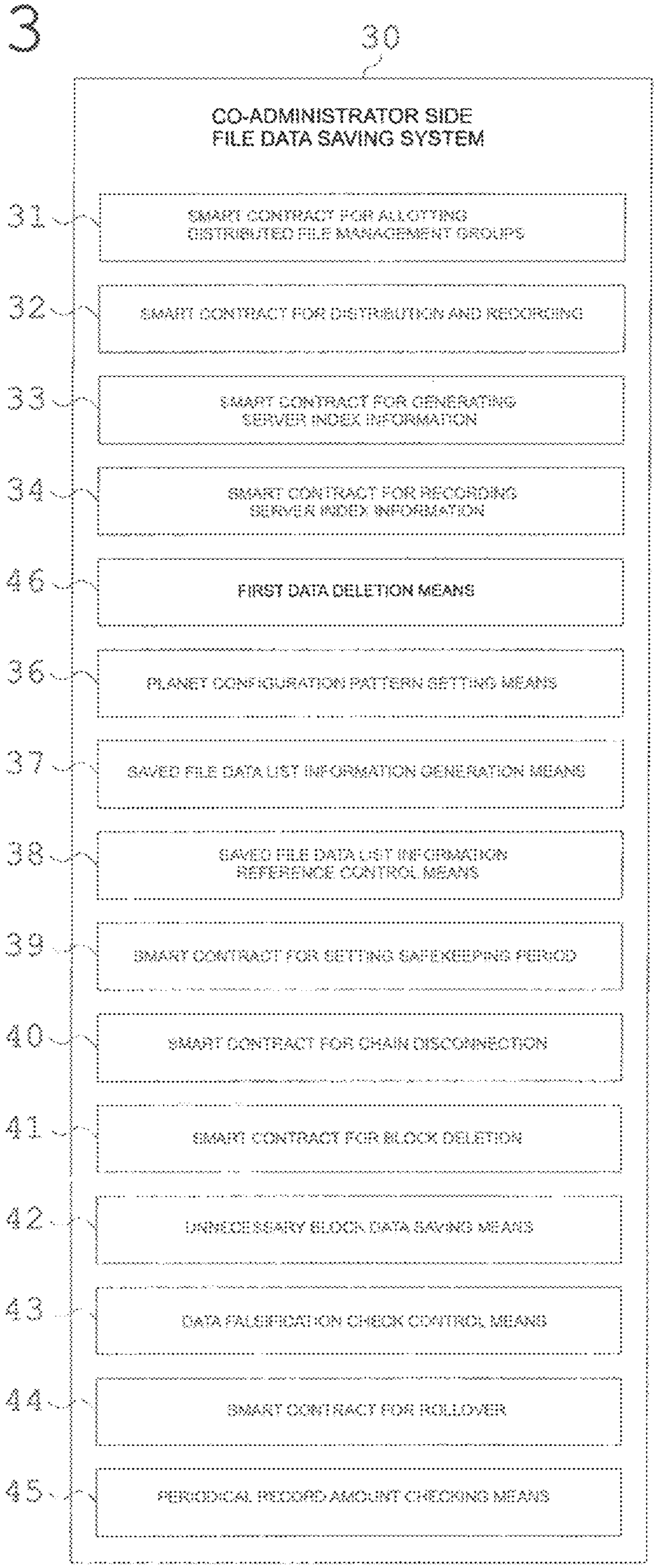
FIG. 13 is an explanatory diagram schematically illustrating the configuration of the co-administrator side file data saving system in the digital asset guard service provision system of the present embodiment.

For example, as shown in FIG. 13, the co-administrator side file data saving system 30 comprises a smart contract 31 for allotting distributed file management groups, a distribution and recording smart contract 32, a smart contract 33 for generating server index information, a smart contract 34 for recording server index information, the first data deletion means 46, a planet configuration pattern setting means 36, a saved file data list information generation means 37, a saved file data list information reference control means 38, a smart contract 39 for setting safekeeping period, a smart contract 40 for chain disconnection, a smart contract 41 for block deletion, an unnecessary block data saving means 42, a data falsification check control means 43, a rollover smart contract 44, and a periodical record amount checking means 45.

Smart Contract 31 for Allotting Distributed File Management Groups

The smart contract 31 for allotting distributed file management groups is, for example, as shown in FIG. 14A, is configured to have a function for allotting, each file data (encrypted and multi-divided by the file data encryption and division means 24 and) uploaded to a first temporary storage area M1, to the multiple distributed file management groups 101$_{1\ through\ m}$ (configured with the nodes located at each of the bases configured for the planets 100$_{1\ through\ n}$ set on a co-administrator side in a customer specified condition and the recording devices at multiple bases networked to the nodes at the bases) based on the first parameter P1 and the second parameter P2 specified by the co-administrator of the consortium-type blockchain. Note that m and n are integers of 2 or more.

In addition, the smart contract 31 for allotting distributed file management groups is configured to have a function for performing the following processes 4-1 through 4-3, for example, as shown in FIG. 14B.

(Process 4-1) The smart contract 31 for allotting distributed file management groups changes, file formats and names of each file data (encrypted and multi-divided by the file data encryption and division means 24 and) uploaded to the first temporary storage area M1 by the upload means 25, to predetermined file formats and names based on the file storage code P12 and the second parameter P2.

(Process 4-2) The smart contract 31 for allotting distributed file management groups performs the process 4-1 and at the same time encrypts the file data.

(Process 4-3) After performing the process 4-2, the smart contract 31 for allotting distributed file management groups allots each file data to the multiple distributed file management groups 101$_{1\ through\ m}$ (where m is an integer of 2 or more) configured with the nodes located at multiple bases configured for the planets 100$_{1\ through\ n}$ (n is an integer of 2 or more) set on a co-administrator side in a condition specified by a customer and the recording devices located at multiple bases networked to the nodes at the bases.

In addition, the smart contract 31 for allotting distributed file management groups is configured, for example, as shown in FIG. 15, to have a function for allotting each file data to the multiple distributed file management groups 101$_{1\ through\ m}$ (where m is an integer of 2 or more) configured with:

- the nodes located at multiple bases configured for the planets 100$_{1\ through\ n}$ (n is an integer of 2 or more) set on the co-administrator side in the customer specified condition via the planet configuration setting means 36; and
- the recording devices located at multiple bases networked to the nodes at the bases.

In this way, before allotting to the multiple distributed file management groups 101$_{1\ through\ m}$ (where m is an integer of 2 or more), the smart contract 31 for allotting distributed file management groups is configured to have a function for changing file formats and names of each file data encrypted and multi-divided by the file data encryption and division means 24 and uploaded to the first temporary storage area M1 by the upload means 25, to predetermined file formats and names.

Distribution and Recording Smart Contract 32

For example, as shown in FIGS. 16A and 16B, the distribution and recording smart contract 32 has a function of distributing and recording each file data allotted by the smart contract 31 for allotting distributed file management groups to the nodes 102$_{1\ through\ mb}$ (where mb is an integer of 2 or more) at each of the bases belonging to each of the corresponding distributed file management groups 101$_{1\ through\ m}$ (where m is an integer of 2 or more) and to the recording devices located at multiple bases networked to the nodes at the bases.

Furthermore, each distribution and recording smart contracts 32 is configured to have a function for performing processes 50-1 through 50-4.

(Process 50-1) Each of the distribution and recording smart contracts 32 checks data recording capacities of each sub-configuration file server 103$_{1\ through\ p}$ (where p is an integer of 2 or more) that connect to the nodes 102$_{1\ through\ mb}$ (where mb is an integer of 2 or more) at each of the bases belonging to each of the distributed file management groups 101$_{1\ through\ m}$ (where m is an integer of 2 or more) and to the recording devices located at multiple bases networked to the nodes at the bases.

(Process 50-2) Each of the distribution and recording smart contracts 32 selects a specified sub-configuration file server having a data record capacity capable of recording large file data that is encrypted, multi-divided and uploaded to the temporary storage area M1 based on the data record capacity and usages confirmed in the process 50-1.

(Process 50-3) Each of the distribution and recording smart contracts 32 records the large file data that is encrypted, multi-divided and uploaded to the first temporary storage area M1 in the specified sub-configuration file server selected in the process 50-2.

(Process 50-4) Each of the distribution and recording smart contracts 32 performs the process 50-3, and records information of the specified sub-configuration file server recording the large file data that is encrypted, multi-divided and uploaded into the first temporary storage area M1 into the nodes 102$_{1\ through\ mb}$ (where mb is an integer of 2 or more) at each of the bases belonging to each of the distributed file management groups 101$_{1\ through\ m}$ (where m is an integer of 2 or more) as the second index information.

In addition, each of the distribution and recording smart contracts 32, for example, as shown in FIG. 17, is configured to have functions for performing the following processes 51-1 through 51-5, when the large file data, that is that is encrypted, multi-divided and uploaded into the first temporary storage area M1 exceeds an upper limit of the storage capacity of the file server, the large file data being recorded in the predetermined sub-configuration file server connected to the nodes 102$_{1\ through\ mb}$ (where mb is an integer of 2 or more) at each of the bases belonging to each of the distributed file management groups 101$_{1\ through\ m}$ (where m is an integer of 2 or more) and connected to the recording devices at multiple bases networked to the nodes at the bases.

(Process 51-1) Each of the distribution and recording smart contracts 32 calculates a remaining recordable capacity of each of other sub-configuration file servers connected to the nodes 102$_{1\ through\ mb}$ (where mb is an integer greater than or equal to 2) at each of the bases belonging to each of the distributed file management groups 101$_{1\ through\ m}$ (where m is an integer greater than or equal to 2 or more) and connected to the recording devices located at multiple bases networked to the nodes at the bases for file data exceeding the upper limit of the record capacity of the file server.

(Process 51-2) Each of the distribution and recording smart contracts 32 selects the most suitable recording destination of sub-configuration file server based on the remaining recordable capacity calculated in the process 51-1.

(Process 51-3) Each of the distribution and recording smart contracts 32 records the file data exceeding the upper limit of the record capacity of the file server in the sub-configuration file server selected in the process 51-2.

(Process 51-4) Each of the distribution and recording smart contracts 32 performs the process 51-3, and changes the settings to put the original file server in a dormant state.

(Process 51-5) After performing the process 51-4, each of the distribution and recording smart contracts 32 records (updates) information of the recording destination of sub-configuration file servers to be recorded in the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) as the second index information.

Smart Contract 33 for Generating Server Index Information

The smart contract 33 for generating server index information is configured to have a function for generating server index information, as shown in FIG. 18A and FIG. 18B, for example. The server index information comprises:

- file name information of each file data distributed and recorded by each of the distribution and recording smart contracts 32; and
- configuration information of each of the distributed file management groups to which each file data is allotted.

In addition, the smart contract 33 for generating server index information is configured to have a function for generating server index information including information on the nodes located at each of the bases and information on the recording devices located at multiple bases networked to the nodes at the bases, the nodes and the recording devices distributing and recording dummy file data added by the planet configuration pattern setting means 36 as configuration information of each of the distributed file management groups $\mathbf{101}_{1\ through\ m}$ (where m is an integer of 2 or more).

Note that an example of configuration information for distributed file management groups is shown in FIG. 105. In the example of FIG. 105, the configuration information for each of the distributed file management groups comprises configurating nodes (here two types of nodes, core and sub-nodes, exist), area codes for each node, addresses, file record capacity information, and communication speed information.

Furthermore, in the example of FIG. 105, the recording devices located at multiple bases networked to the nodes (two types of nodes, core and sub-nodes) located at each of the bases are configured with the nodes configuring the blockchain network same as that configured the nodes at the bases. Alternatively recording devices which do not belong to the blockchain network configured with the nodes at the bases and to which the nodes at the bases can connect in an accessible state.

Note that the recording devices located at multiple bases networked to the nodes located at each of the bases may be configured with devices configuring another network different from that of the nodes at the bases.

Smart Contract 34 for Recording Server Index Information

For example, as shown in FIG. 19A and FIG. 19B, the smart contract 34 for recording server index information is configured to have a function for encrypting server index information generated by the smart contract 33 for generating server index information and recording into the node groups located at the specified bases in the consortium-type blockchain.

In addition, the smart contract 34 for recording server index information is configured to have a function for encrypting server index information generated by the smart contract 33 for generating server index information based on a second public key, that is, second encryption key K22 generated by the co-administrator of the consortium-type blockchain, or based on the second encryption parameter P2X2 (which is incorporated and modularized in a predetermined smart contract performing the corresponding process) automatically generated from the second decryption parameter P2X1 (which is incorporated and modularized in a predetermined smart contract performing the corresponding process) specified by the co-administrator and managed offline.

First Data Deletion Means 46

For example, as shown in FIG. 20, the first data deletion means 46 is configured to delete each file data uploaded into the first temporary storage area M1, after the server index information is encrypted and recorded in the node groups located at the specified bases in the consortium-type blockchain by the smart contract 34 for recording server index information.

Planet Configuration Pattern Setting Means 36

For example, as shown in FIG. 21A and FIG. 21B, the planet configuration pattern setting means 36 is configured to calculate and select:

- the number of the nodes configuring the planets $\mathbf{100}_{1\ through\ n}$ (where n is an integer of 2 or more); and
- distributed file management groups configured with the nodes $\mathbf{102}_{1\ through\ mb}$ (where mb is an integer of 2 or more) at each of the bases and the recording devices located at multiple bases networked to the nodes at the bases, based on the number of divisions of the file data based on the record capacity. the file size and the degree of dispersion of the file data specified by the customer.

In addition the planet configuration pattern setting means 36 is configured to add a predetermined number of dummy file data (which comprises a code inside that allows a smart contract 84 for extracting encrypted and divided file data to recognize the dummy information) to the number of divisions of the file data, and to select the number of the nodes configuring the planets $\mathbf{100}_{1\ through\ n}$ (where n is an integer of 2 or more), and the distributed file management groups configured with the nodes $\mathbf{102}_{1\ through\ mb}$ (where mb is an integer of 2 or more) at each of the bases and the multiple recording devices that is networked to the nodes at the bases.

In addition, the planet configuration pattern setting means 36, for example, as shown in FIG. 22A and FIG. 22B is configured to calculate and select the nodes $\mathbf{102}_{1\ through\ mb}$ (where mb is an integer greater than or equal to 2) at each of the bases within each of the distributed file management groups $\mathbf{101}_{1\ through\ m}$ (where m is an integer of 2 or more) and the recording devices located at multiple bases networked to the nodes at the bases to be the nodes and the recording devices positioned at a point having the maximum distance therebetween (=maximum degree of dispersion).

For more details, the planet configuration pattern setting means 36 is configured to perform the following processes 16-1 and 16-2, and select the nodes $\mathbf{102}_{1\ through\ mb}$ (where mb is an integer greater than or equal to 2) at each of the bases within each of the distributed file management groups $\mathbf{101}_{1\ through\ m}$ (where m is an integer of 2 or more) and the recording devices located at multiple bases networked to the nodes at the bases.

(Process 16-1) The planet configuration pattern setting means 36 regards the spherical earth as a flat surface and generates a matrix MA in which the earth as a flat surface is multi-divided in the longitudinal and lateral directions.

(Process 16-2) The planet configuration pattern setting means 36 determines the X-axis direction intervals with reference to the Y-axis in the matrix MA, regarding the bases of the nodes 102$_{1\ through\ mb}$ (where mb is an integer of 2 or more) and bases of the multiple recording devices networked to the nodes that record and distribute one divided file data within one distributed file management group 101*b* (where b is an integer between 1 and m), using calculated values based on the number of divisions of the file data.

In addition the planet configuration pattern setting means 36, for example, as shown in FIG. 23, is configured to calculate and select the nodes and the recording devices networked to the nodes at the bases having numerical differences similar to calculation values of the X-axis direction intervals in the Y-axis direction, when the intervals in the X-axis direction cannot be spaced as per calculation values based on numbers of divisions of the file data caused by a lack of remaining recordable capacity of any of core nodes 102*c* (where c is a positive integer less than or equal to m) at a predetermined base and the recording devices at multiple bases networked to the nodes at the bases, for the bases of the nodes 102$_{1\ through\ mb}$ (where mb is an integer of 2 or more) at the bases and the multiple recording devices networked to the nodes that record and distribute one divided file data.

An example of the matrix MA is shown in FIG. 104.

In this way, the planet configuration pattern setting means 36 is configured to perform the following processes 19-1 and 19-2, and to select:

- the nodes 102$_{1\ through\ mb}$ (where mb is an integer greater than or equal to 2) at each of the bases within each of the distributed file management groups 101$_{1\ through\ m}$ (where m is an integer greater than or equal to 2); and the recording devices at multiple bases networked to the nodes at the bases.

(Process 19-1) The planet configuration pattern setting means 36 selects bases of each node configuring a planet according to a number of divisions of file data based on a record capacity and file size of the file data specified by a customer.

(Process 19-2) The planet configuration pattern setting means 36 selects multiple individual bases belonging to the distributed file management groups 101*b* (where b is an integer between 1 and m) so that the degree of dispersion is maximized within the distributed file management groups 101$_{1\ through\ m}$ (where m is an integer of 2 or more) configured with each of the nodes selected in the process 19-1.

Furthermore, as shown in FIG. 24A and FIG. 24B, the planet configuration pattern setting means 36 is configured to:

- record total remaining recordable capacity and total remaining communication capacity and the like in the matrix MA as information on the nodes located at each of the bases at each region to which bases of the nodes 102$_{1\ through\ mb}$ (where mb is an integer of 2 or more) belong and information of the recording devices located at multiple bases networked to the nodes at the bases; and
- select most suitable combinations of bases of the nodes 102$_{1\ through\ mb}$ (where mb is an integer of 2 or more) and the multiple recording devices networked to the nodes at eh bases, using information of total remaining recording capacities, total remaining communication capacity and dispersion degrees of the nodes located at each of the bases and the recording devices located at multiple bases networked to the nodes at the bases in each region recorded in the matrix MA, upon selecting bases of the nodes 102$_{1\ through\ mb}$ (where mb is an integer of 2 or more) configuring the distributed file management groups 101$_{1\ through\ m}$ (where m is an integer of 2 or more) and the bases of the multiple recording devices networked to the nodes.

In addition, the planet configuration pattern setting means 36 is configured to calculate and select a region in which recording capacities and communication capacities of the nodes located at each of the bases and the recording devices located at multiple bases networked to the nodes at the bases need to be increased, in combinations of the nodes 102$_{1\ through\ mb}$ (where mb is an integer of 2 or more) at predetermined bases configuring the distributed file management groups 101$_{1\ through\ m}$ (where m is an integer of 2 or more) and the recording devices located at multiple bases networked to the nodes at the bases.

Saved File Data List Information Generation Means 3,7

The Saved file data list information generation means 37 is configured to generate saved file data list information, as shown in FIG. 25, for example. The saved file data list information is configured to comprise terminal information (fixed IP addresses and the like) and information of the original file name and the upload date of the file data to be saved, which are associated with a customer when the file data is uploaded to the first temporary storage area M1 using the upload means 25.

Saved File Data List Information Reference Control Means 38

For example, as shown in FIG. 26, the saved file data list information reference control means 38 is configured to allow the saved file data list information generated by the saved file data list information generation means 37 to refer only by using communication equipment management and process program managed by the fixed IP address of the customer.

Smart Contract 39 for Setting Safekeeping Period

For example, as shown in FIG. 27A and FIG. 27B, the smart contract 39 for setting safekeeping period is configured to have a function for setting a safekeeping period of the block in units of the planets 100$_{1\ through\ n}$ (where n is an integer of 2 or more) at the time of distribution and recording of each file data by each of the distribution and recording smart contracts 32 based on safekeeping period information of file data that the customer desires to save and that is recorded in node groups located at specified bases in the consortium-type blockchain by a smart contract 51 for recording data saving service contract application reception information.

Smart Contract 40 for Chain Disconnection

For example, as shown in FIG. 28, the smart contract 40 for chain disconnection is configured to have a function for disconnecting the chain of blocks after the safekeeping period set by the smart contract 39 for setting safekeeping period has passed.

In addition, the digital asset guard service provision system 1 of this embodiment, as described above, is configured to set the smart contract 39 for setting safekeeping period and disconnect the chain of blocks whose safekeeping period has elapsed by the smart contract 39 for setting safekeeping period. However, the digital asset guard service provision system of the present invention may be configured to, for example:

prepare a planet that operates only for a certain time frame (for example, a maximum of one year or a maximum of two years);

select a planet that meets the conditions of a safekeeping period of file data desired by a customer by him/herself; and make the system save the file data into the nodes at each of the bases belonging to the planet and the recording devices located at multiple bases networked to the nodes at the bases selected by the customer.

In that case, the customer index information should record the planet number to be saved, the service provision system number to be saved, the expiration date and the like. Then, when the expiration date arrives, the planet and the file group to be saved are made to be initialized by a predetermined deletion (initialization) program.

Smart Contract 41 for Block Deletion

The smart contract 41 for deleting blocks has a function of deleting unnecessary blocks disconnected via the smart contract 40 for chain disconnection, for example, as shown in FIG. 29.

Unnecessary Block Data Saving Means 42

The unnecessary block data saving means 42 is configured to perform the processes 40-1 through 40-4, for example, as shown in FIG. 30A and FIG. 30B.

(Process 40-1) The unnecessary block data saving means 42 sends a notification to confirm asking a customer whether to delete the unnecessary block, before deleting the unnecessary block disconnected via the smart contract 40 for chain disconnection by the smart contract 41 for deleting blocks.

(Process 40-2) When there is no response from the customer to the notification sent in the process 40-1, the unnecessary block data saving means 42 notifies and confirms the co-administrator whether to delete the unnecessary block.

(Process 40-3) Even if the unnecessary block is confirmed to be delible, the unnecessary block data saving means 42 temporarily records each encrypted and multi-divided file data as data to be saved via a predetermined recording medium that is disconnected from the network.

(Process 40-4) The unnecessary block data saving means 42 is configured to delete the temporarily recorded data to be saved by the process 40-3 after a certain period has passed.

Further, the unnecessary block data saving means 42 is configured to perform the following processes 41-1 through 41-5, when the unnecessary block data saving means 42 sends a notification to the customer to confirm whether the unnecessary block may be deleted, and whether the customer desires to extend the safekeeping period of the file data is confirmed.

(Process 41-1) The unnecessary block data saving means 42 temporarily records each of the encrypted and multi-divided file data as data to be saved via a predetermined recording medium that is disconnected from the network.

(Process 41-2) The unnecessary block data saving means 42 performs the process 41-1 and at the same time selects a new planet that meets a condition of the customer's desire to extend safekeeping period for file data.

(Process 41-3) The unnecessary block data saving means 42 automatically saves corresponding file data into the nodes located at each of the bases configuring the planet selected in the process 41-2, and into the recording devices located at multiple bases networked to the nodes at the bases.

(Process 41-4) The unnecessary block data saving means 42 performs the process 41-3 and updates the server index information.

(Process 41-5) After performing the process 41-4, the unnecessary block data saving means 42 deletes the temporarily recorded data to be saved after a certain period has elapsed.

Data Falsification Check Control Means 43

The data falsification check control means 43 is configured to perform the processes 42-1 through 42-4, for example, as shown in FIG. 31.

(Process 42-1) The data falsification check control means 43 calculates a hash value based on encrypted and multi-divided file data recorded in the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and the recording devices located at multiple bases networked to the nodes at the bases.

(Process 42-2) The data falsification check control means 43 records the hash value calculated in the process 42-1 in a block.

(Process 42-3) The data falsification check control means 43 constantly compares hash values recorded in a block in the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and hash values recorded in the recording devices located at multiple bases networked to the nodes at the bases.

(Process 42-4) When the data falsification check control means 43 performs the checking process 42-3, the data falsification check control means 43 checks a hash described in the block in a specified node or recording device and another hash described in the block in another node or recording device, and if there is a difference between a hash described in the block and another hash described in the block, the data falsification check control means 43 performs the following processes 42-4-1 and 42-4-2.

(Process 42-4-1) The data falsification check control means 43 detects that the encrypted and multi-divided file data recorded in the specified node or recording device is tampered with or destroyed, and then, the specified node or recording device is excluded from the file data saving process, and the block in the specified node or recording device is deleted.

(Process 42-4-2) The data falsification check control means 43 performs the process 42-4-1 and sends an alarm to notify an operator of the node and a co-administrator of the consortium-type blockchain.

Rollover Smart Contract 44

The rollover smart contract 44 is configured to have a function for performing processes 48-1 through 48-4, for example, as shown in FIG. 32.

(Process 48-1) The rollover smart contract 44 sets a new planet and distributed file management group in order to extend safekeeping periods of each encrypted and multi-divided file data recorded as the block in the nodes $\mathbf{102}_{1\ through\ mb}$ (where mb is an integer of 2 or more) at each of the bases belonging to each of the distributed file management groups $\mathbf{101}_{1\ through\ mb}$ (where m is an integer greater than or equal to 2 or more) and the recording devices located at multiple bases networked to the nodes at the bases, before the safekeeping period of the block set by the smart contract 39 for setting safekeeping period elapses.

(Process 48-2) After performing the process 48-1, the rollover smart contract 44 takes over a control number of old server index information, changes to a new control number, and generates new server index information.

(Process 48-3) The rollover smart contract 44 performs the process 48-2 and re-record the file data in the nodes $\mathbf{102}_{1g\ through\ mb}$ (where mb is an integer of 2 or more) at each of the bases belonging to new the distributed file management groups $\mathbf{101}_{1\ through\ m}$ (where mb is an integer of 2 or more) and the recording devices located at multiple bases networked to the nodes at the bases.

(Process 48-4) After performing the process 48-3, the rollover smart contract 44 deletes:

- the file data recorded in the nodes $\mathbf{102}_{1g\ through\ mb}$ (where mb is an integer of 2 or more) at each of the bases belonging to the original distributed file management groups $\mathbf{101}_{1\ through\ m}$ (where mb is an integer of 2 or more) and the recording devices located at multiple bases networked to the nodes at the bases; and
- deletes the old server index information regarding the file data.

Periodical Record Amount Checking Means 45

For example, as shown in FIG. 33, the periodical record amount checking means 45 is configured to perform the following processes 57-1 and 57-2, when the file data uploaded from a customer who desires to save the file data and distributed and recorded in the nodes located at each of the bases belonging to each of the distributed file management groups $\mathbf{101}_{1\ through\ m}$ (where m is an integer greater than or equal to 2 or more) and the recording devices located at multiple bases networked to the nodes at the bases exceeds the maximum file data recordable amount within a predetermined period.

(Process 57-1) The periodical record amount checking means 45 requests the customer to re-apply for the file data saving service contract.

(Process 57-2) In response to the request for re-applying for the file data saving service contract in the process 57-1, if the customer does not perform the re-applying procedure, the periodical record amount checking means 45 is configured to process the saving process as an error.

In addition, the file data saving system 10 comprises a data saving service contract application procedure reception means 50, the smart contract 51 for recording data saving service contract application receiving information, and an upload processable IP address check means 52.

Data Saving Service Contract Application Procedure Reception Means 50

For example, as shown in FIG. 34A and FIG. 34B, the data saving service contract application procedure reception means 50 is configured to:

- accept a data saving service contract application procedure from a customer who desires to save the file data; and
- accept designations of a storage capacity, a degree of dispersion, whether to include domestic or international area of saving of the file data, a safekeeping period, and real-time process of the file data to be saved desired by the customer, at the time of accepting the data saving service contract application procedure.

In addition, the data saving service contract application procedure reception means 50 is configured to further accept the following designated items 63-1 through 63-3 from the customer when accepting the data saving service contract application procedure.

(Designated item 63-1) A guarantee level of file data desired to be saved.

(Designated item 63-2) Levels of the nodes $\mathbf{102}_{1\ through\ mb}$ (where mb is an integer of 2 or more) at each of the bases configuring each of the planets $\mathbf{100}_{1\ through\ n}$ (where n is an integer of 2 or more).

(Designated item 63-3) Levels of the recording devices at multiple bases networked to the nodes at the bases, and the file data saving and restoration system configuration for operating the file data saving system 10 and the file data restoration system 60.

Smart Contract 51 for Recording Data Saving Service Contract Application Reception Information The smart contract 51 for recording data saving service contract application reception information is configured to have functions for performing the following processes 37-1 and 37-2, as shown in FIG. 35A and FIG. 35B, for example.

(Process 37-1) The smart contract 51 for recording data saving service contract application reception information automatically calculates and generates the basic configuration of the entire planet by:

- managing information of a storage capacity, a degree of dispersion, whether to include domestic or international area of saving of the file data, a safekeeping period, and real-time process of the file data to be saved desired by a customer accepted by the data saving service contract application procedure reception means 50; and
- setting conditions (budgetary, whether to include the highest confidential matter regarding personal information and security that is a magnitude of risk) from the customer.

(Process 37-2) The smart contract 51 for recording data saving service contract application reception information encrypts the information generated in the process 37-1 as portions of the system setting information and records in node groups at specified bases in the consortium-type blockchain, and the predetermined smart contract that performs the corresponding process reads the recorded setting information together with the customer's personal information so that the entire information may be comprehended.

Furthermore, the smart contract 51 for recording data saving service contract application reception information is configured to further have a function for performing the following processes 47-1 and 47-2.

(Process 47-1) The smart contract 51 for recording data saving service contract application reception information checks the file data record amount desired to be saved requested by the customer, the record amount being accepted by the data saving service contract application procedure reception means 50.

(Process 47-2) When the file data record amount checked in the process 47-1 exceeds the maximum record capacity of one file defined in the system, the smart contract 51 for recording data saving service contract application reception information determines a number of file data divisions so that the record amount becomes less than the maximum record capacity.

Note that, regarding information accepted by the data saving service contract application procedure reception means 50 and encrypted and recorded in node groups of a specified base in the consortium-type blockchain by the smart contract 51 for recording data saving service contract application reception information, information on name, address, and contact information of the customer and/or user ID and authentication method, an IP address route, an expiration date and the like are additionally set as information on a co-administrator side. After being set, planet configuration information is recorded in the consortium-type blockchain. Because the customer information set as the co-administrator information and the smart contract information are managed on the co-administrator side, the co-administrator may be capable of referring to the information. Only the customer and the predetermined smart contract performing the process may be capable of referring to the customer information set by the customer him/herself and managed on the customer side, therefore, the co-administrator may not refer to the customer information.

Upload Processable IP Address Check Means 52

For example, as shown in FIG. 36, the upload processable IP address check means 52 is configured to control to be capable of operating the upload process of the file data to be saved in the file data saving system 10, that is, the encryption and division algorithm selection reception means 22, the file data saving instruction reception means 23, the file data encryption and division means 24, and the upload means 25, only with an operation at a customer terminal in which a fixed IP address is preregistered in node groups at specified bases in the consortium-type blockchain as portions of the system setting information, and as terminal information for uploading the file data to be saved to the first temporary storage area M1 using the upload means 25.

File Data Restoration System 60

Figure 37:
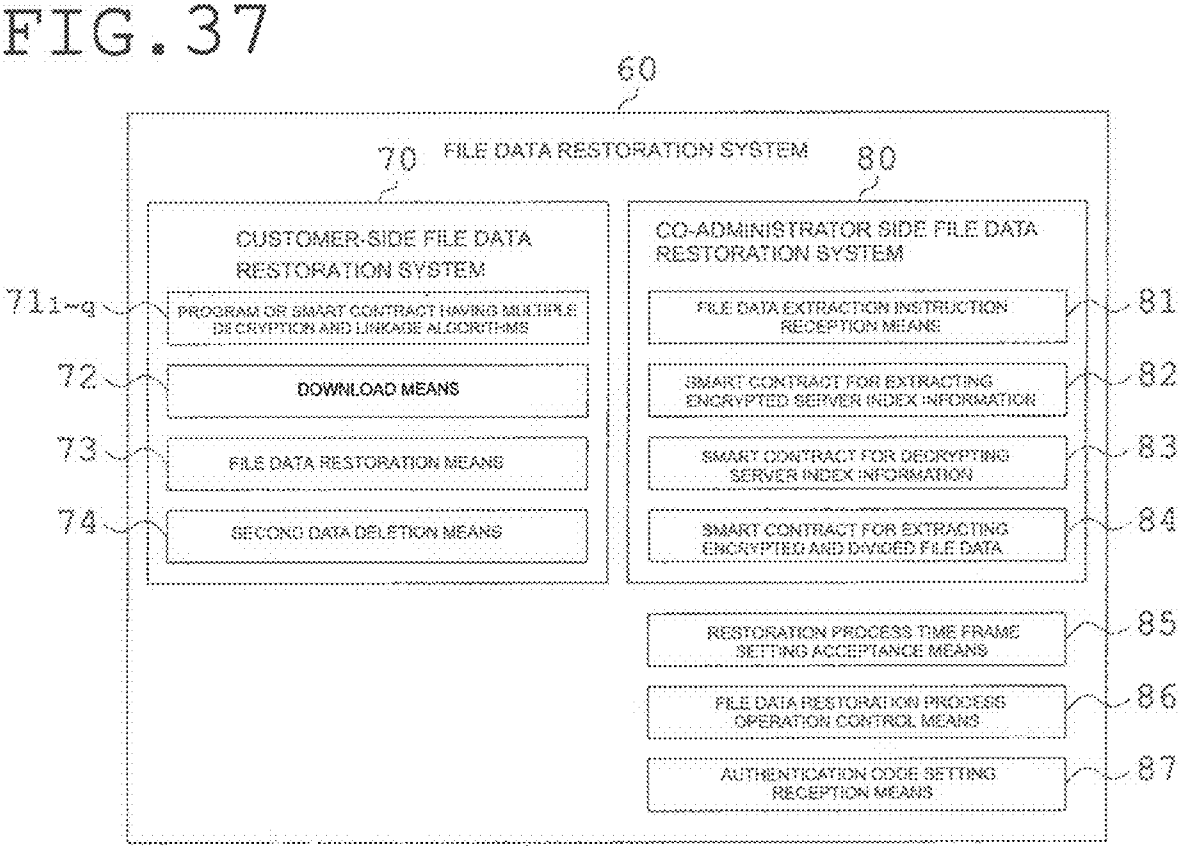
FIG. 37 is an explanatory diagram schematically illustrating the configuration of the file data restoration system in the digital asset guard service provision system of the present embodiment.

For example, as shown in FIG. 37, the file data restoration system 60 is configured with a combination of a customer side file data restoration system 70 and a co-administrator side file data restoration system 80, which are each configured completely independently.

Customer Side File Data Restoration System 70

Figure 38:
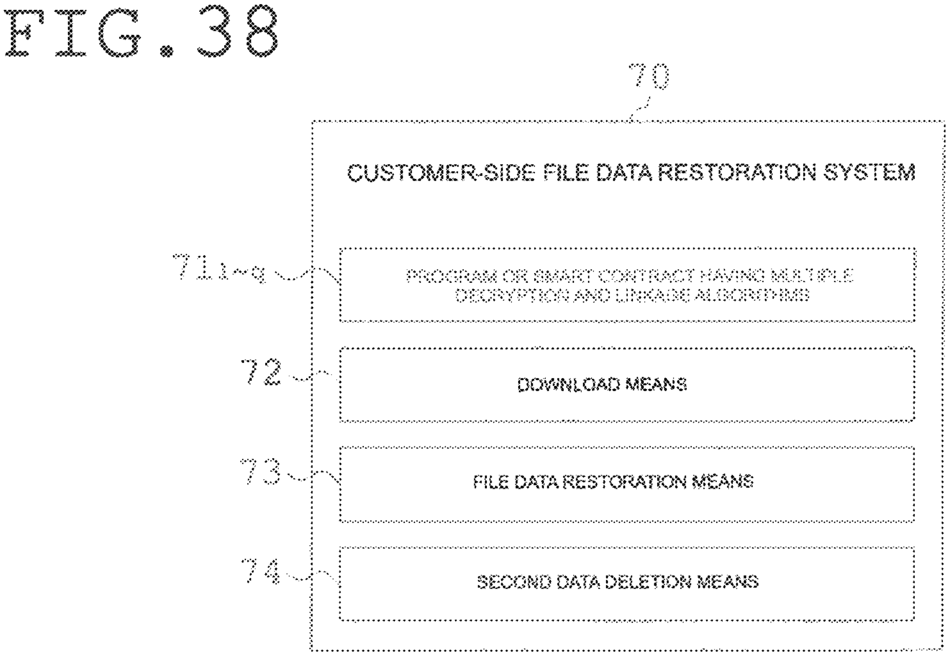
FIG. 38 is an explanatory diagram schematically illustrating the configuration of a customer-side file data restoration system in the digital asset guard service provision system of the present embodiment.

For example, as shown in FIG. 38, the customer-side file data restoration system 70 comprises multiple programs or smart contracts $\mathbf{71}_{1\ through\ q}$ (where q is an integer of 10 or more) having multiple decryption and linkage algorithms, a download means 72, the file data restoration means 73, and the second data deletion means 74.

Programs or Smart Contracts Having Multiple Decryption and Linkage Algorithms $\mathbf{71}_{1\ through\ g}$ The multiple programs or smart contracts $\mathbf{71}_{1\ through\ q}$ (where q is an integer of 10 or more) having multiple decryption and linkage algorithms comprise, for example, as shown in FIG. 39, multiple decryption and linkage algorithms 71alpha$_{1\ through\ q}$ (q is an integer of 10 or more) having different decryption and linkage process methods associated with each of the programs or smart contracts $\mathbf{21}_{1\ through\ q}$ (q is an integer of 10 or more) having encryption and division algorithms.

In addition, the programs or smart contracts $\mathbf{71}_{1\ through\ q}$ (where q is an integer of 10 or more) having multiple decryption and linkage algorithms is configured to restore the encrypted and multi-divided file data to the original file data decrypted and linked to one file data using secret sharing technologies.

The secret sharing technology used in the programs or smart contracts $\mathbf{71}_{1\ through\ q}$ (where q is an integer of 10 or more) having multiple decryption and linkage algorithms is an AONT secret sharing technology in this embodiment. However, other secret sharing techniques may also be used.

Download Means 72

For example, as shown in FIG. 40, the download means 72 is configured to download each of the encrypted and multi-divided file data extracted by the smart contract 84 for extracting encrypted and divided file data into the second temporary storage area M2.

File Data Restoration Means 73

For example, as shown in FIGS. 41A, 41B, and 41C, the file data restoration means 73 is configured to decrypt the program (or a smart contract) having encryption and division algorithms (extracted by the smart contract 84 for extracting encrypted and divided file data and) downloaded to the second storage area M2 by the download means 72, to link to one file data and to restore to the file data before being saved using a program or smart contract 71alpha (where alpha is an integer between 1 and q) having decryption and linkage algorithms associated with the program (or smart contract) 21 having the encryption and division algorithm 21*a* (where a is an integer from 1 through q) accepted by the encryption and division algorithm selection reception means 22.

Furthermore, the file data restoration means 73 is configured to perform the following processes 5-3 and 5-4.

(Process 5-3) The file data restoration means 73 decrypts each of the encrypted and multi-divided file data (extracted by the smart contract 84 for extracting encrypted and divided file data) and downloaded to the second temporary storage area M2 by the download means 72 based on the first secret key, that is the first offline decryption key K11 generated by the customer.

(Process 5-4) The file data restoration means 73 performs the process 5-3 and links each decrypted file data to one file data using the program or smart contract 71alpha (alpha is an integer between 1 and q) having multiple decryption and linkage algorithms that are associated with the program or smart contract 21 having the encryption and division algorithm 21*a* (where a is an integer from 1 through q) accepted by the encryption and division algorithm selection reception means 22.

Note that the file data restoration means 73 may be configured to perform the processes 6-3 and 6-4.

(Process 6-3) The file data restoration means 73 links to one file data, each encrypted and muti-divided file data (extracted by the smart contract 84 for extracting encrypted and divided file data) and downloaded to the second temporary storage area M2 by the download means 72, using the program or smart contract 71alpha (alpha is an integer between 1 and q) having multiple decryption and linkage algorithms that are associated with the program or smart contract 21 having the encryption and division algorithm 21*a* (where a is an integer from 1 through q) accepted by the encryption and division algorithm selection reception means 22.

(Process 6-4) The file data restoration means 73 performs the process 6-3 and decrypts the linked one file data based on the customer generated first secret key, that is, the first offline decryption key K11.

That is, the file data restoration means 73 may be configured to have two patterns of "decryption to linkage" and "linkage to decryption" as an order of decryption and linkage process for each of the encrypted and multi-divided file data downloaded to the second temporary storage area M2 by the download means 72, in association with the order of encryption and division process using the program or smart contract 21 having the encryption and division algorithm 21*a* (where a is an integer from 1 through q) accepted by the encryption and division algorithm selection reception means 22 for the customer file data to be saved in the file data encryption and division means 24.

Further, as shown in FIG. 42, for example, the file data restoration means 73 is configured to decrypt, link to one file data and restore the file data before being saved, each of the encrypted and multi-divided file data (extracted by the smart contract 84 for extracting encrypted and divided file data and) downloaded to the second temporary storage area M2 by the download means 72 based on the file division code P11 using the program or smart contract 71alpha (where, a is an integer from 1 through q) having the encryption and division algorithms associated with the program or smart contract 21 having the encryption and division algorithm

21*a* (where a is an integer from 1 through q) accepted by the encryption and division algorithm selection reception means 22.

Second Data Deletion Means 74

For example, as shown in FIG. 43, the second data deletion means 74 is configured to delete each encrypted and multi-divided file data downloaded to the second temporary storage area M2 after being restored to the file data before being saved by the file data restoration means 73.

Co-Administrator Side File Data Restoration System 80

Figure 44:
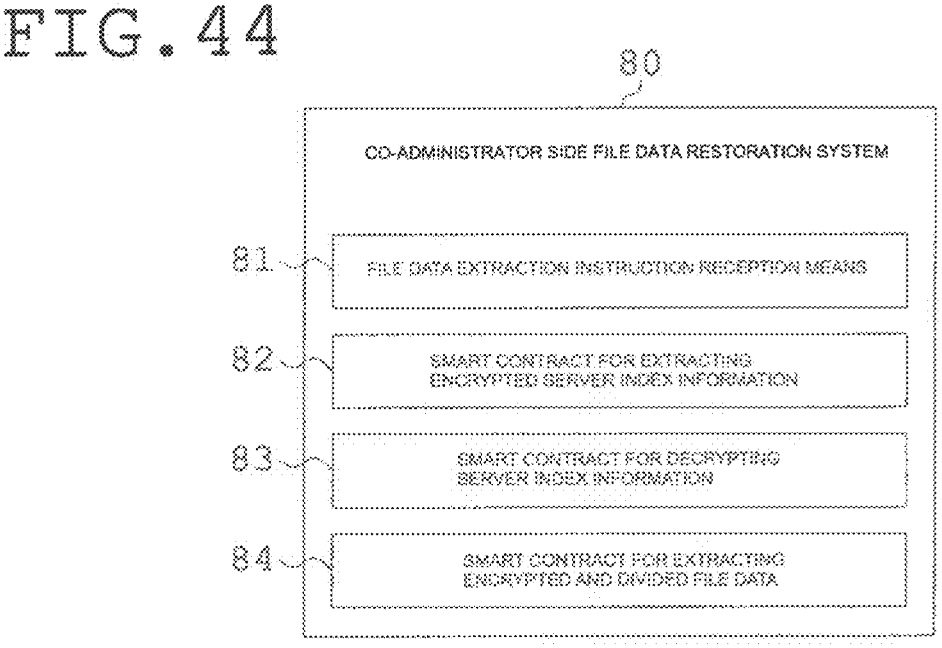
FIG. 44 is an explanatory diagram schematically illustrating the configuration of a co-administrator side file data restoration system in the digital asset guard service provision system of the present embodiment.

For example, as shown in FIG. 44, the co-administrator side file data restoration system 80 comprises the file data extraction instruction reception means 81, a smart contract 82 for extracting encrypted server index information, and a smart contract 83 for decrypting server index information, and the smart contract 84 for extracting encrypted and divided file data.

File Data Extraction Instruction Reception Means 81

The file data extraction instruction reception means 81 is configured to accept a file data extraction instruction from a customer who desires to restore the file data, as shown in FIG. 45, for example.

Smart Contract 82 for Extracting Encrypted Server Index Information

The smart contract 82 for extracting encrypted server index information, for example, as shown in FIG. 46, comprises a function of extracting encrypted server index information (recorded in node groups at specified bases in the consortium-type blockchain by the smart contract 34 for recording server index information) based on:

- the first parameter P1 associated with the file data to be extracted that is accepted by the file data extraction instruction reception means 81 or a first compound parameter P1X (comprising a pair of a first decryption parameter P1X1 that is specified by a customer and managed offline, and the first encryption parameter P1X2 that is automatically generated from the first decryption parameter P1X1); and
- the second parameter P2 or the second compound parameter P2X (comprising a pair of the second decryption parameter P2X1 that is specified by a co-administrator and managed offline (which is incorporated and modularized within the predetermined smart contract that performs a corresponding process), and the second encryption parameter P2X2 that is automatically generated from the second decryption parameter P2X1 (which is incorporated and modularized within the predetermined smart contract that performs a corresponding process)).

Smart Contract 83 for Decrypting Server Index Information

The smart contract 83 for decrypting server index information, for example, as shown in FIG. 47A and FIG. 47B, comprises a function of decrypting encrypted server index information extracted by the smart contract 82 for extracting encrypted server index information.

In addition, the smart contract 83 for decrypting server index information is configured to have a function for decrypting encrypted server index information extracted by the smart contract 82 for extracting encrypted server index information based on the second secret key, that is, a second decryption key K21 generated by the co-administrator of the consortium-type blockchain, or the second decryption parameter P2X1 specified by the co-administrator and managed offline (incorporated and modularized in the predetermined smart contract that performs the corresponding process).

Smart Contract 84 for Extracting Encrypted and Divided File Data

For example, as shown in FIG. 48A and FIG. 48B, the smart contract 84 for extracting encrypted and divided file data is configured to have a function for extracting, encrypted and multi-divided file data (allotted to each of the distributed file management groups 101$_{1\ through\ m}$ (where m is an integer of 2 or more) by the each smart contract 31 for distribution and recording and distributed and recorded in the nodes 102$_{1\ through\ mb}$ (where mb is an integer of 2 or more) located at each of the bases belonging to each of the distributed file management groups 101$_{1\ through\ m}$ (where m is an integer of 2 or more) and in the recording devices located at multiple bases networked to the nodes at the bases) by each of the distribution and recording smart contracts 32, from any of the nodes at each belonging to each of the distributed file management groups 101$_{1\ through\ m}$ (where m is an integer of 2 or more) and the recording devices at multiple bases networked to the nodes, using server index information decrypted by the smart contract 83 for decrypting server index information.

In addition, the smart contract 84 for extracting encrypted and divided file data is configured to have a function for extracting encrypted and multi-divided file data (allotted, by the smart contract 31 for allotting distributed file management groups, to each of the distributed file management groups 101$_{1\ through\ m}$ (where m is an integer greater than or equal to 2 or more), distributed and recorded, by each of the distribution and recording smart contracts 32, in the nodes 102$_{1\ through\ mb}$ (where mb is an integer of 2 or more) located at each of the bases belonging to each of the distributed file management groups 101$_{1\ through\ m}$ (where m is an integer greater than or equal to 2 or more) and in the recording devices at multiple bases networked to the nodes at the bases, from any one of the nodes located at each of the bases belonging to each of the distributed file management groups 101$_{1\ through\ m}$ (where m is an integer greater than or equal to 2 or more) and the recording devices at multiple bases networked to the nodes at the bases, using the server index information excluding information of the nodes at each of the bases and the recording devices at multiple bases networked to the nodes at the bases that distribute and record dummy file data (having a code inside capable of recognizing dummy information from configuration information of each of the distributed file management groups 101$_{1\ through\ m}$ (where m is an integer of 2 or more) in the server information decrypted by the smart contract 83 for decrypting server index information.

In addition, the smart contract 84 for extracting encrypted and divided file data is configured to have a function for performing the following processes 4-4 through 4-6, for example, as shown in FIG. 49A and FIG. 49B.

(Process 4-4) The smart contract 84 for extracting encrypted and divided file data extracts each encrypted and multi-divided file data (allotted, by the smart contract 31 for allotting distributed file management groups to each of the distributed file management groups 101$_{1\ through\ m}$ (where m is an integer greater than or equal to 2 or more), the file data being distributed and recorded by each of the distribution and recording smart contracts 32, in the nodes 102$_{1\ through\ mb}$ (where mb is an integer of 2 or more) located at each of the bases belonging to each of the distributed file management groups 101$_{1\ through\ m}$ (where m is an integer greater than or equal to 2 or more) and in the recording devices at multiple bases networked to the nodes at the bases), from any one of the nodes located at each of the bases belonging to each of the distributed file management groups 101$_{1\ through\ m}$ (where m is an integer greater than or equal to 2 or more) or from the recording devices at multiple bases networked to the nodes at the bases based on the file storage code P12 and the parameter P2.

(Process 4-5) The smart contract 84 for extracting encrypted and divided file data decrypts the file data extracted in the process 4-4.

(Process 4-6) The smart contract 84 for extracting encrypted and divided file data performs the process 4-5 and at the same time changes the file formats and names of the file data to the original file formats and names.

Furthermore, the smart contract 84 for extracting encrypted and divided file data is configured to have a function for performing processes 53-1 through 53-4.

(Process 53-1) The smart contract 84 for extracting encrypted and divided file data refers to the second index information recorded at the nodes $\mathbf{102}_{1\ through\ mb}$ (where mb is an integer of 2 or more) located at each of the bases belonging to each of the distributed file management groups $\mathbf{101}_{1\ through\ m}$ (where m is an integer greater than or equal to 2 or more).

(Process 53-2) The smart contract 84 for extracting encrypted and divided file data detects multiple sub-configuration file servers recording the encrypted and multi-divided large file servers recorded as the second index information referenced in the process 53-1.

(Process 53-3) The smart contract 84 for extracting encrypted and divided file data extracts file data recorded in sub-configuration file servers from the multiple sub-configuration file servers detected in the process 53-2.

(Process 53-4) The smart contract 84 for extracting encrypted and divided file data links the multiple file data extracted in the process 53-3 to restore the original encrypted and multi-divided large file data.

In this way, the smart contract 84 for extracting encrypted and divided file data is configured to have a function for converting the file formats and names of each extracted file data to those of the original file data after each of the encrypted and multi-divided file data is extracted.

In addition, the file data restoration system 60 comprises a restoration process time frame setting reception means 85, a file data restoration process operation control means 86, and an authentication code setting reception means 87.

Restoration Process Time Frame Setting Reception Means 85

For example, as shown in FIG. 50, the restoration process time frame setting reception means 85 is configured to accept settings of:

- a time frame in which a file data restoration process from a customer who desires to restore the file data is performed;
- an IP address for performing the restoration; and
- a restorable period.

File Data Restoration Process Operation Control Means 86

For example, as shown in FIG. 51A, the file data restoration process operation control means 86 is configured to control the file data extraction instruction reception means 81, the smart contract 82 for extracting encrypted server index information, the smart contract 83 for decrypting server index information, the smart contract 84 for extracting encrypted and divided file data, the download means 72, the file data restoration means 73, and the second data deletion means 74 to operate only during a time frame during which a setting is accepted by the restoration process time frame setting reception means 85.

In addition, for example, as shown in FIG. 51B, the file data restoration process operation control means 86 is configured to control the file data extraction instruction reception means 81, the smart contract 82 for extracting encrypted server index information, the smart contract 83 for decrypting server index information, the smart contract 84 for extracting encrypted and divided file data, the download means 72, the file data restoration means 73, and the second data deletion means 74 to operate only during a time frame during which a setting is accepted by the restoration process time frame setting reception means 85 and when a setting of the authentication code accepted by the authentication code setting acceptance means 87 is approved by the co-administrator of the consortium-type blockchain.

Authentication Code Setting Reception Means 87

The authentication code setting acceptance means 87 is configured to accept an authentication license code setting by a customer who desires to restore the file data, for example, as shown in FIG. 52.

The authentication code set in the authentication code setting reception means 87 is a code that a customer who desires to restore the file data is contacted by a co-administrator of the consortium-type blockchain, or is a one-time passcode such as a biometric authentication registered in the customer's smartphone and the like.

Then, the file data restoration process operation control means 86 is configured to provide an operation license for a program or smart contract having decryption and linkage algorithms associated with the program or smart contract having encryption and division algorithms accepted by the encryption and division algorithm selection reception means 22, when the authentication code a setting of which is accepted by the authentication code setting reception means 87 accepts authentication from the co-administrator of the consortium-type blockchain, and further the identity of the customer is systematically confirmed through multi-step authentication, biometric authentication, one-time passcode and the like.

In addition, as a form of granting an operation license, for example, an authentication code that means granting an operation license is incorporated in a program or smart contract having decryption and linkage algorithms, and only the program or smart contract having decryption and linkage algorithms in which the authentication code is incorporated is configured to operate in response to file restoration process operations by the customer.

Further, the digital asset guard service provision system 1 of this embodiment is configured to comprise a data destructive attack detection means 91, an automatic data saving means 92 upon being attacked, a communication switching control means 93, a customer registration information designation reception means 94, a smart contract 95 for customer registration, a first parameter designation reception and recording means 96, and a second parameter designation reception and setting means 97.

Data Destructive Attack Detection Means 91

The data destructive attack detection means 91 is configured to perform the processes 59-1 and 59-2, as shown in FIG. 53, for example.

(Process 59-1) The data destructive attack detection means 91 detects the existence of a data destruction situation due to equipment failure or an attack against the encrypted and multi-divided file data recorded in the nodes $\mathbf{102}_{1\ through\ mb}$ (where mb is an integer of 2 or more) of any base configuring the planets $\mathbf{100}_{1\ through\ n}$ (where n is an integer of 2 or more), or the recording devices.

(Process 59-2) The data destructive attack detection means 91 determines that there is a data destructive attack when multiple file data destructions are detected, the file data being managed in a certain time frame, such as 30 minutes, 8 hours, or 24 hours.

Automatic Data Saving Means 92 Upon being Attacked

The automatic data saving means 92 upon being attacked is configured to perform the following processes 59-3 and 59-4, for example, as shown in FIG. 54A and FIG. 54B.

(Process 59-3) When the data destructive attack detection means 91 detects an attack against the encrypted and multi-divided file data, the automatic data saving means 92 upon being attacked stops the nodes $\mathbf{102}_{1\ through\ mb}$ (where mb is an integer of 2 or more) at each of the bases configuring the planet, and the recording devices located at multiple bases networked to the nodes at the bases, or forcibly disconnects the Internet connection routes.

(Process 59-4) The automatic data saving means 92 upon being attacked performs the process 59-3, and sets a separate network, and automatically saves the encrypted and multi-divided file data distributed and recorded in the nodes $\mathbf{102}_{1\ through\ mb}$ (where mb is an integer of 2 or more) at each of the bases and in the recording devices located at multiple bases networked to the nodes at the bases that are not attacked, into the nodes $\mathbf{102}_{1\ through\ mb}$ (where mb is an integer of 2 or more) at each of the bases configuring other planets or into the recording devices located at multiple bases networked to the nodes at the bases in which an attack against the encrypted and multi-divided file data is not detected by the data destructive attack detection means 91.

In addition, when the data destructive attack detection means 91 detects an attack against the encrypted and multi-divided file data, the automatic data saving means 92 upon being attacked is configured to automatically save, the encrypted and multi-divided file data distributed and recorded in the nodes $\mathbf{102}_{1\ through\ mb}$ (where mb is an integer of 2 or more) at each of the bases configuring the planet and the recording devices located at multiple bases networked to the nodes at the bases that are not attacked, into the nodes $\mathbf{102}_{1\ through\ mb}$ (where mb is an integer of 2 or more) at each of the bases configuring other planets in which the encrypted and multi-divided file data is not attacked and into the recording devices located at multiple bases networked to the nodes at the bases via a communication means such as an LTE and the like other than the Internet.

Communication Switching Control Means 93

For example, as shown in FIG. 55, the communication switching control means 93 is configured to:

- maintain a stopped state in which the nodes and the recording devices located at multiple bases networked to the nodes at the bases are disconnected from the Internet; and
- switch to a connection with a communication means such as an LTE other than the Internet;
- when the data destructive attack detection means 91 detects an attack against the encrypted and multi-divided file data.

Customer Registration Information Designation Reception Means 94

For example, as shown in FIG. 56, the customer registration information designation reception means 94 is configured to accept designations of a customer ID, terminal information (fixed IP addresses and the like) for using file data saving and restoration from a customer who desires to save the file data.

Smart Contract 95 for Customer Registration

For example, as shown in FIG. 57, the smart contract 95 for customer registration is configured to have a function for encrypting the customer ID, the terminal information and the fixed IP address for using file data saving and restoration accepted by the customer registration information designation reception means 94 and recording into node groups located at specified bases in the consortium-type blockchain.

First Parameter Designation Reception and Recording Means 96

Figure 58:
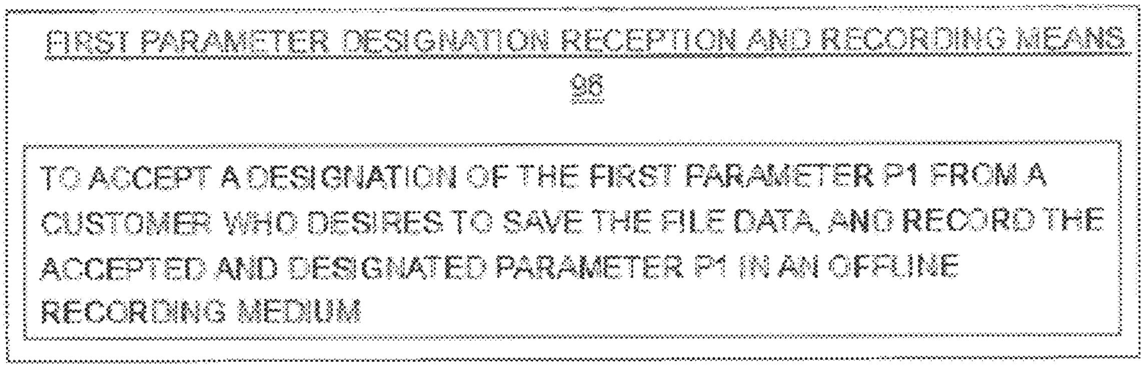
FIG. 58 is an explanatory diagram schematically illustrating the configuration of a first parameter designation reception and recording means in the digital asset guard service provision system of the present embodiment.

For example, as shown in FIG. 58, the first parameter designation reception and recording means 96 is configured to accept a designation of the first parameter P1 from a customer who desires to save the file data, and record the accepted and designated parameter P1 in an offline recording medium.

Second Parameter Designation Reception and Setting Means 97

For example, as shown in FIG. 59, the second parameter designation reception and setting means 97 is configured to accept a designation of the second parameter P2 from a co-administrator of the consortium-type blockchain, and set and modularize the accepted and designated parameter P2 in a source code of the predetermined smart contract that performs the corresponding process.

File Data Saving and Restoration System Configuration

In addition, in the digital asset guard service provision system 1 of the present embodiment, the consortium-type blockchain comprises multiple level (level S to level one) file data saving and restoration system configurations in which the nodes located at each of the bases configuring planets, the recording devices at multiple bases networked to the nodes at the bases, the data saving system 10 and the file data restoration system 60.

Level S File Data Saving and Restoration System Configuration

The digital asset guard service provision system 1 of this embodiment comprises the level S file data saving and restoration system configuration. In the level S file data saving and restoration system configuration, the consortium-type blockchain is configured to operate the nodes $\mathbf{102}_{1\ through\ mb}$ (where mb is an integer of 2 or more) at each of the bases that make up the planets $\mathbf{100}_{1\ through\ n}$ (where n is an integer of 2 or more), the recording devices at multiple bases networked to the nodes at the bases, the file data saving system 10, and the file data restoring system 60 using satellite communications, 5G/6G private communications, LTE networks and dedicated closed networks that are not connected to the Internet.

A closed network that is not connected to the Internet is a network configuration in a closed environment that uses a dedicated line as a network, such as a post office network and a convenience store ATM network. This also applies to satellite communication networks and the like.

Figure 60:
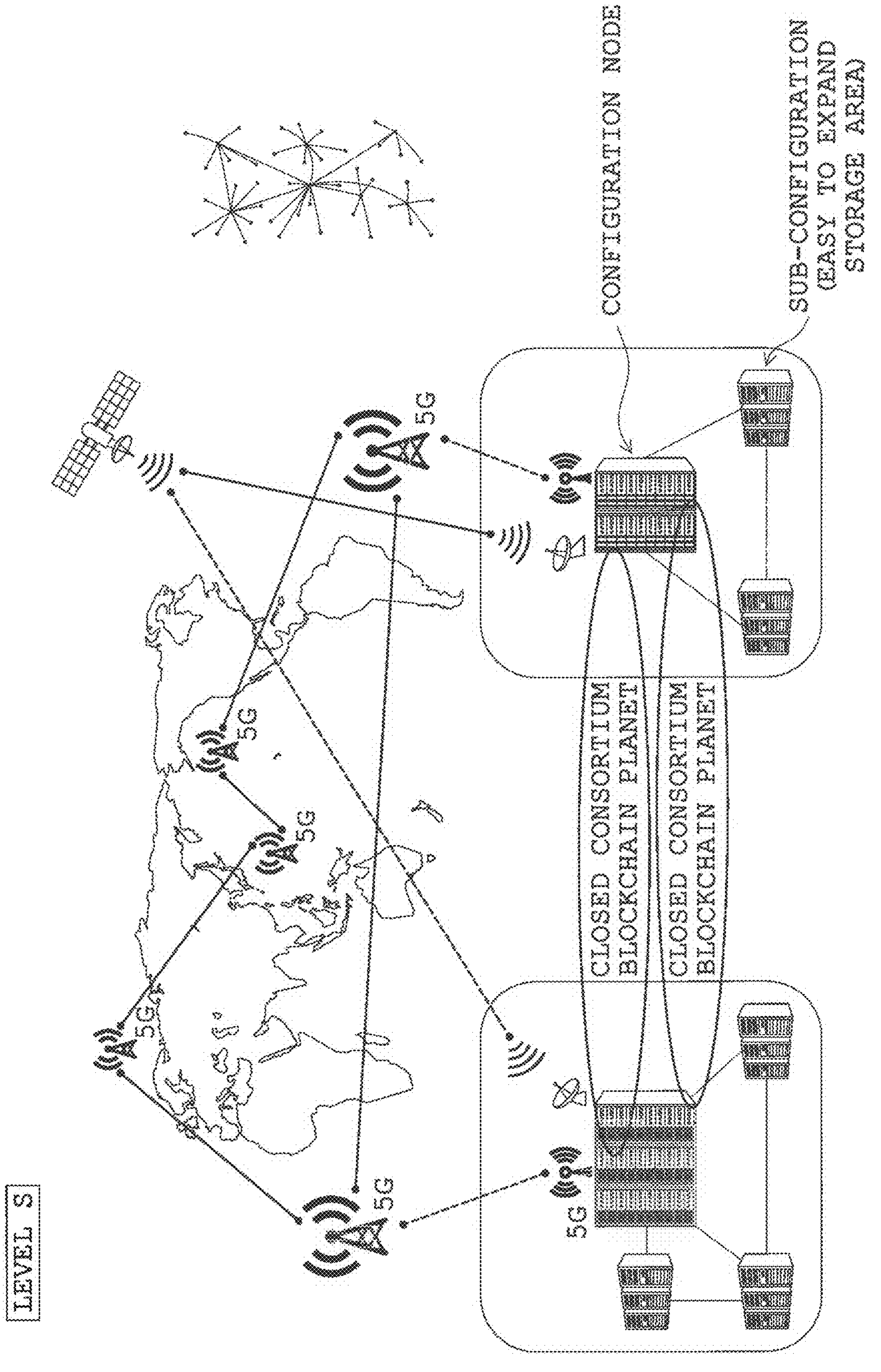
FIG. 60 is an explanatory diagram conceptually illustrating an example of a configuration of a level S file data saving and restoring system in the consortium-type blockchain provided in the digital asset guard service provision system of the present embodiment.

An example of the level S file data saving and restoration system configuration is shown in FIG. 60.

Level Four File Data Saving System Configuration

Furthermore, the digital asset guard service provision system 1 of this embodiment comprises the level four file data saving and restoration system configuration. In the level four file data saving and restoration system configuration, the consortium-type blockchain is configured to:

- comprise high-credit companies in which participants of the consortium-type blockchain approve each other utilizing the Internet communication network; and
- operate the nodes $\mathbf{102}_{1\ through\ mb}$ (where mb is an integer of 2 or more) at each of the bases that make up the planets $\mathbf{100}_{1\ through\ n}$ (where n is an integer of 2 or more), the recording devices at multiple bases networked to the nodes at the bases, the file data saving system 10, and the file data restoring system 60 in a space with a high security level such as a dedicated room utilizing the Internet communication network.

Level Three File Data Saving and Restoration System Configuration

Furthermore, the digital asset guard service provision system 1 of this embodiment comprises the level three file data saving and restoration system configuration. In the level three file data saving and restoration system configuration, the consortium-type blockchain is configured to utilize the Internet communication network, and is configured with high-credit companies each of which participants of the consortium-type blockchain approve, and is configured to operate the nodes $\mathbf{102}_{1\ through\ mb}$ (where mb is an integer of 2 or more) at each of the bases that make up the planets $\mathbf{100}_{1\ through\ n}$ (where n is an integer of 2 or more), the recording devices at multiple bases networked to the nodes at the bases, the file data saving system 10, and the file data restoring system 60 by setting up a file server for data back-up in a space with a high security level corresponding to an office or the like, or by utilizing inexpensive cloud service including utilization of region service spread worldwide.

Figure 61:
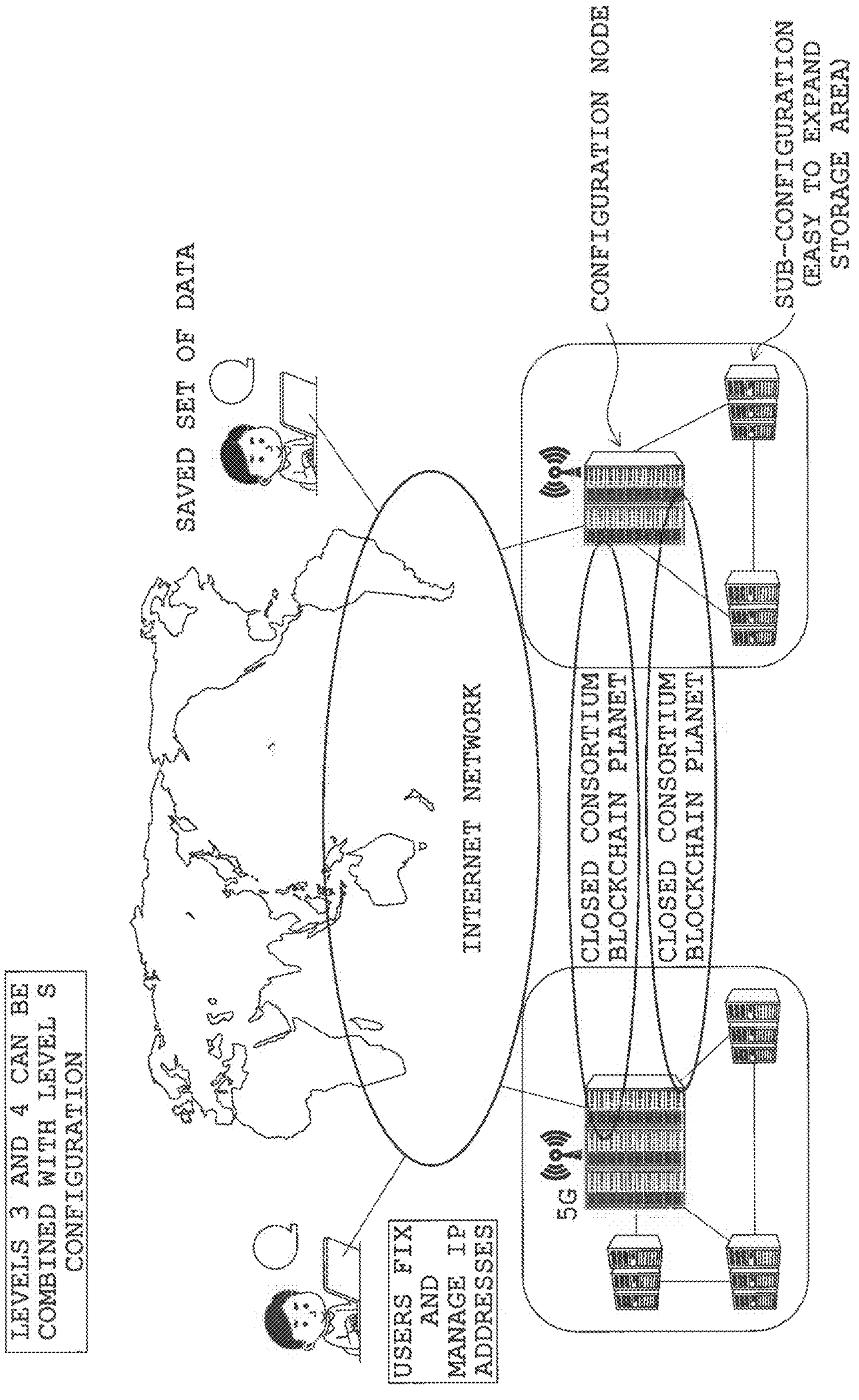
FIG. 61 is an explanatory diagram conceptually illustrating an example of a configuration of a level four and level three file data saving and restoration system in the consortium-type blockchain provided in the digital asset guard service provision system of the present embodiment.
Figure 62:
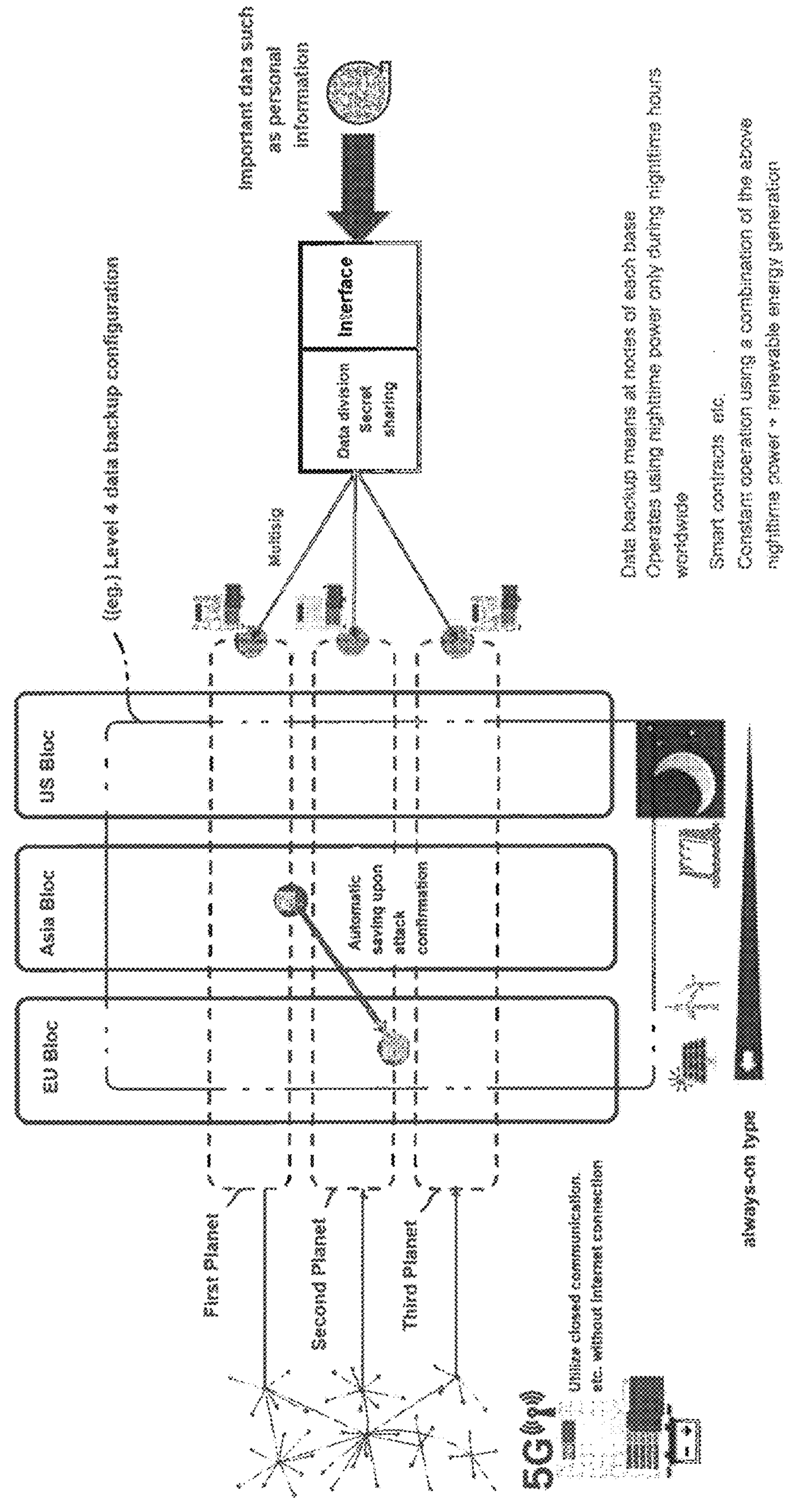
FIG. 62 is an explanatory diagram schematically illustrating an example of a configuration of a level four file data saving and restoration system in the consortium-type blockchain provided in the digital asset guard service provision system of the present embodiment.

An example of the configuration of the level three and level four file data saving and restoration system is shown in FIG. 61. In addition, an example of the configuration of the level four file data saving and restoration system is shown in FIG. 62.

Level Two File Data Saving and Restoration System Configuration

Furthermore, the digital asset guard service provision system 1 of this embodiment comprises the level two file data saving and restoration system configuration. In the level two file data saving and restoration system configuration, the consortium-type blockchain is configured to utilize the Internet communication network, is open to organizations such as general companies and the like, for example open to branch networks, and is configured to operate the nodes $\mathbf{102}_{1\ through\ mb}$ (where mb is an integer of 2 or more) at each of the bases that make up the planets $\mathbf{100}_{1\ through\ n}$ (where n is an integer of 2 or more), the recording devices at multiple bases networked to the nodes at the bases, the file data saving system 10, and the file data restoring system 60

Level One File Data Saving and Restoration System Configuration

Furthermore, the digital asset guard service provision system 1 of this embodiment comprises the level one file data saving and restoration system configuration. In the level one file data saving and restoration system configuration, the consortium-type blockchain is configured to utilize the Internet communication network, open to private houses, such as branch networks, and operate the nodes $\mathbf{102}_{1\ through\ mb}$ (where mb is an integer of 2 or more) at each of the bases that make up the planets $\mathbf{100}_{1\ through\ n}$ (where n is an integer of 2 or more), the recording devices at multiple bases networked to the nodes at the bases, the file data saving system 10, and the file data restoring system 60.

In the level one to four file data saving and restoration system configurations in the digital asset guard service provision system 1 of the present embodiment, file servers at the nodes $\mathbf{102}_{1\ through\ mb}$ (where mb is an integer of 2 or more) at each of the bases of the world that make up the planets $\mathbf{100}_{1\ through\ n}$ (where n is an integer of 2 or more) and at the recording devices at multiple bases networked to the nodes at the bases are configured to operate by being networked to an Internet communication network during night hours when nighttime power may be used.

In addition, in the level one to four file data saving and restoration system configurations in the digital asset guard service provision system 1 of this embodiment, file servers at the nodes $\mathbf{102}_{1\ through\ mb}$ (where mb is an integer of 2 or more) at each of the bases of the world that make up the planets $\mathbf{100}_{1\ through\ n}$ (where n is an integer of 2 or more) and at the recording devices at multiple bases networked to the nodes at the bases are configured to be operable by using renewable energy power such as solar power generation and the like during the daytime.

Figure 63:
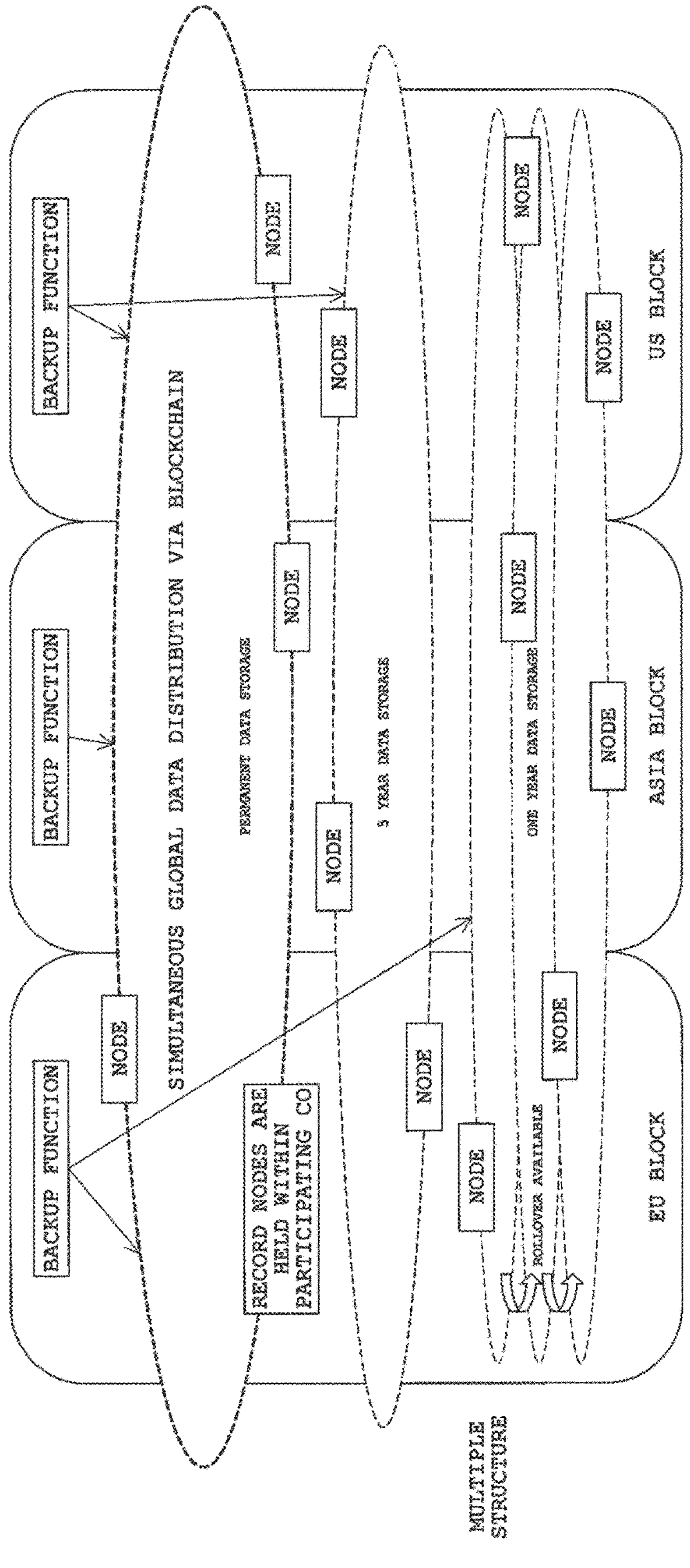
FIG. 63 is an explanatory diagram conceptually illustrating a configuration of worldwide simultaneous distributed recording of file data using the consortium-type blockchain provided in the digital asset guard service provision system of the present embodiment.

For example, as shown in FIG. 63, the digital asset guard service provision system 1 of this embodiment comprises a configuration that distributes and records file data (in the nodes at the corresponding bases and the recording devices located at multiple bases networked to the nodes at the bases forming distributed file management groups) simultaneously in the world by the consortium-type blockchain.

In addition, in the digital asset guard service provision system 1 of this embodiment, only a portion of the file data saving and restoration system configurations of levels one to four may be selected or simplified to incorporate alternative process with a lower security level. This configuration may provide the digital asset guard service provision system at a lower cost.

Further, the digital asset guard service provision system 1 of this embodiment is configured to comprise a smart contract 98 for generating and recording the system setting information, a smart contract 99 or a program having a wallet function 99 for generating customer setting information, a smart contract 27 or a program 27 having a wallet function for generating customer index information and a smart contract 28 for recording customer index information.

Smart Contract 98 for Generating and Recording System Setting Information

For example, as shown in FIG. 64, the smart contract 98 for generating and recording the system setting information is configured to have a function for generating and encrypting the system setting information, and recording into node groups located at the specified bases in the consortium-type blockchain. The system setting information is configured to comprise destination identifying information such as terminal information, that is a fixed IP address for uploading to the first temporary storage area M1 using the upload means 25, a number of a predetermined smart contract performing a corresponding process of the recording destination of the customer file data, planet information to which the file data recording destination belongs, and file server group information in the nodes at predetermined bases and the recording devices located at multiple bases networked to the nodes at the bases, configuring distributed file management groups.

Smart Contract or Program 99 with a Wallet Function for Generating Customer Setting Information The smart contract or the program 99 having the wallet function for generating customer setting information comprises, for example, as shown in FIG. 65, a function for generating customer setting information having setting information of the first parameter P1 associated with the program or smart contract 21 having the encryption and division algorithm 21*a* (where a is an integer from 1 through q) accepted by the encryption and division algorithm selection reception means 22.

Smart Contract or Program 27 Having a Wallet Function for Generating Customer Index Information The smart contract or program 27 having the wallet function for generating customer index information comprises a function for generating customer index information that comprises an original file name of the customer file data to be saved and information of an upload date, as shown in FIG. 66, for example.

Smart Contract 28 for Recording Customer Index Information

For example, as shown in FIG. 67, the smart contract 28 for recording customer index information comprises a function for encrypting customer index information generated by the smart contract or the program 27 having a wallet function and for recording at node groups located at specified bases at the consortium-type blockchain.

Other Configurations

In addition, the digital asset guard service provision system 1 of this embodiment is configured as follows.

In the digital asset guard service provision system 1 of this embodiment, the bases of the nodes $\mathbf{102}_{1\ through\ mb}$ (where mb is an integer greater than or equal to 2) and bases of the multiple recording devices networked to the nodes that distribute and record each divided file data in the planets $\mathbf{100}_{1\ through\ n}$ (where n is an integer of 2 or more) are configured to be managed by information such as the global positioning system (GPS) and classified in the matrix MA.

In addition, in the digital asset guard service provision system 1 of this embodiment, each of the distributed file management groups $\mathbf{101}_{1\ through\ m}$ (where m is an integer of 2 or more) comprises the core nodes $\mathbf{102}c_{1\ through\ m}$ (where m is an integer of 2 or more) that designate and manage individual equipment configuring the recording devices at each of the bases belonging to the distributed file management groups $\mathbf{101}_{1\ through\ m}$ (where m is an integer of 2 or more)

In addition, in the digital asset guard service provision system 1 of this embodiment, the nodes $\mathbf{102}_{1\ through\ mb}$ (where mb is an integer of 2 or more) at each of the bases are connected each other via communication means such as the Internet or closed networks, and the distribution and recording smart contract 32 is incorporated.

Furthermore, in the digital asset guard service provision system 1 of this embodiment, each of the divided file data recorded in the nodes $\mathbf{102}_{1\ through\ mb}$ (where mb is an integer greater than or equal to 2) at each of the bases belonging to each of the distributed file management groups $\mathbf{101}_{1\ through\ m}$ (where m is an integer of 2 or more) and the recording devices located at multiple bases networked to the nodes at the bases are managed in an encrypted state. Index information such as hash of each file data and a distributed file group that is an allotment destination of recorded file data are recorded in a block. Blocks are connected by a chain with time data embedded in the hash.

In addition, the digital asset guard service provision system 1 of this embodiment is configured such that communication equipment is managed using a fixed IP address. And for the communication equipment, a customer may use the first secret key, that is the first offline key K11 for restoring, each of the encrypted and multi-divided file data, which is distributed and recorded in the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and the recording devices located at multiple bases networked to the nodes at the bases via the file data restoration system 60, to original file data before being saved.

In addition, the digital asset guard service provision system 1 of the present embodiment is configured such that only when a multi-signature type secret key transaction is approved by a holder of specified nodes at multiple bases forming a co-administrator, management information of an IP address of communication equipment, for which a customer may use the first secret key, that is, the first offline decryption key K11, is provided to the co-administrator.

Furthermore, in the digital asset guard service provision system 1 of the present embodiment, node information that permits access is recorded in node groups located at specified bases in the consortium-type blockchain.

Furthermore, in the digital asset guard service provision system 1 of this embodiment, the nodes $\mathbf{102}_{1\ through\ mb}$ (where mb is an integer greater than or equal to 2) at each of the bases belonging to each of the distributed file management groups $\mathbf{101}_{1\ through\ m}$ (where m is an integer of 2 or more) and the recording devices located at multiple bases networked to the nodes at the bases comprise the multiple sub-configuration file servers $\mathbf{103}_{1\ through\ p}$ (where p is an integer of 2 or more) (or a file server group accessible to the nodes $\mathbf{101}_{1\ through\ m}$ (where m is an integer greater than or equal to 2) at each of the bases belonging to each of the distributed file management groups $\mathbf{101}_{1\ through\ m}$ (where m is an integer of 2 or more)), each connecting to the nodes or the recording devices.

FIG. 108 illustrates an example of a sub-configuration file server that connects to any of the nodes at each of the bases and the recording devices located at multiple bases networked to the nodes at the bases.

Furthermore, in the digital asset guard service provision system 1 of this embodiment, the nodes $\mathbf{102}_{1\ through\ mb}$ (where mb is (an integer of 2 or more) at each of the bases belonging to each of the distributed file management groups $\mathbf{101}_{1\ through\ m}$ (where m is an integer of 2 or more) and the recording devices located at multiple bases networked to the nodes at the bases comprise respectively connecting the sub-configuration file servers $\mathbf{103}_{1\ through\ p}$ (where p is an integer of 2 or more) or recording media connecting to sub-configuration file servers that may be increased in number.

In addition, in the digital asset guard service provision system 1 of this embodiment, a node or recording device that is in an inactive state and not connected to the Internet exists in any base belonging to each of the distributed file management groups $\mathbf{101}_{1\ through\ m}$ (where m is an integer of 2 or more). The node or recording device that is in an inactive state is configured to receive and record encrypted and multi-divided file data recorded in a node or recording device of the other base in a running state at the time of restart.

In addition, in the digital asset guard service provision system 1 of this embodiment, the nodes $\mathbf{102}_{1\ through\ mb}$ (where mb is an integer greater than or equal to 2) configuring each of the distributed file management groups $\mathbf{101}_{1\ through\ m}$ (where m is an integer of 2 or more) and the recording devices located at multiple bases networked to the nodes at the bases are configured to have different operation time frames, to be in a mixture of operating and inactive states and to perform the following processes 64-1 and 64-2.

(Process 64-1) The nodes at the base configuring each of the distributed file management groups and the recording devices located at multiple bases networked to the nodes located at the bases operate the nodes of all bases and the recording devices located at multiple bases networked to the nodes at the bases are in operation in 24 hours.

(Process 64-2) At a predetermined point of time, within each of the distributed file management groups $\mathbf{101}_{1\ through\ m}$ (where m is an integer of 2 or more), the nodes located at each of the bases configuring each of the distributed file management groups and the recording devices located at multiple bases networked to the nodes at the bases operate the nodes $102_{1\ through\ mb}$ (where mb is an integer of 2 or more) in at least one of the bases, or the recording devices in at least one of the bases networked to the nodes at the bases.

In addition, in the digital asset guard service provision system 1 of the present embodiment, the nodes $102_{1\ through\ mb}$ (where mb is an integer of 2 or more) at each of the bases configuring each of the distributed file management groups and the recording devices located at multiple bases networked to the nodes at the bases are configured to perform the processes 65-1 through 65-3.

(Process 65-1) The nodes located at each of the bases configuring each of the distributed file management groups and the recording devices located at multiple bases networked to the nodes at the bases are operated only at night time by using night-time power.

(Process 65-2) At a predetermined point of time, within each of the distributed file management groups $101_{1\ through\ m}$ (where m is an integer of 2 or more), the nodes located at each of the bases configuring each of the distributed file management groups and the recording devices located at multiple bases networked to the nodes at the bases operate the nodes $102_{1\ through\ mb}$ (where mb is an integer of 2 or more) in at least one of the bases, or the recording devices in at least one of the bases networked to the nodes at the bases.

(Process 65-3) When the nodes located at each of the bases configuring each of the distributed file management groups and the recording devices located at multiple bases networked to the nodes at the bases are switched from the inactive state to the operating state, the nodes at the bases and the recording devices at the bases networked to the nodes at the bases automatically update the safekept file data information to the latest information within each of the distributed file management groups $101_{1\ through\ m}$ (where m is an integer of 2 or more).

In addition, in the digital asset guard service provision system 1 of the present embodiment, the nodes $102_{1\ through\ mb}$ (where mb is an integer of 2 or more) at each of the bases and the recording devices located at multiple bases networked to the nodes at the bases are configured to comprise a container or housing having renewable energy generation equipment utilizing sunlight, a file server and CPU, a 5G communication equipment, and a battery.

In addition, in the digital asset guard service provision system 1 of the present embodiment, the nodes $102_{1\ through\ mb}$ (where mb is an integer of 2 or more) at each of the bases and the recording devices located at multiple bases networked to the nodes at the bases are configured to comprise a container or housing having a file server and CPU, a 5G communication equipment, a battery that can withstand short-term operation, a cooling device and the like.

Furthermore, the digital asset guard service provision system 1 of this embodiment is configured to perform the following processes 68-1 and 68-2.

(Process 68-1) The digital asset guard service provision system cancels out a file data record capacity provided in the nodes held by node holders participating in the consortium-type blockchain, and a file data record amount used by the node holders, and calculates differences between the total file data record amount and the provided file data recording capacities.

(Process 68-2) The digital asset guard service provision system collects and distributes the money amount based on the differences calculated in the process 68-1 for each node holder.

Furthermore, in the digital asset guard service provision system 1 of this embodiment, file data comprising digital assets to be guarded and some high-valued information includes tokens, customer information of existing business systems, asset information, source codes and modules, confidential information, design documents, parameters for settings, digital contracts, rights, designs, and other data that may be expressed digitally in general.

In addition, in the digital asset guard service provision system 1 of the present embodiment, encryption keys (the first public key, that is the first encryption key K12, the first secret key, that is the first offline decryption key K11, the second public key, that is the second encryption key K22, the second secret key, that is, the second decryption key K21) (encryption key for distributed file management, encryption key for index information management) are recorded in the hardware wallet in addition to mnemonic codes, and among these sets of information including records of the number of the program 21 having a customer selected encryption and division algorithm 21*a* (where, a is an integer between 1 and q), the customer deposits to security companies the first encryption key, the first parameter P1 and the like generated and specified by the customer, and a co-administrator of the consortium-type blockchain deposits to security companies the second encryption key, second parameter P2 and the like, generated and specified by the co-administrator separately and respectively, and they are safekept disconnected from networks.

Furthermore, in the digital asset guard service provision system 1 of this embodiment, in order not to comprehend each other's information on a customer side and on a co-administrator side, index information generation means, index information recording means, the encrypted index information extraction means, and index information decryption means are separately configured on the customer side and on the co-administrator side of the consortium-type blockchain as follows.

Index Information Generation Means (Customer Side, Co-Administrator Side)

The index information generation means is configured to comprise a program (wallet function) or smart contract 33-1 for generating customer side index information that runs on the customer side who desires to save file data, and a smart contract 33-2 for generating co-administrator side index information that runs on the co-administrator side of the consortium-type blockchain.

Figure 68:
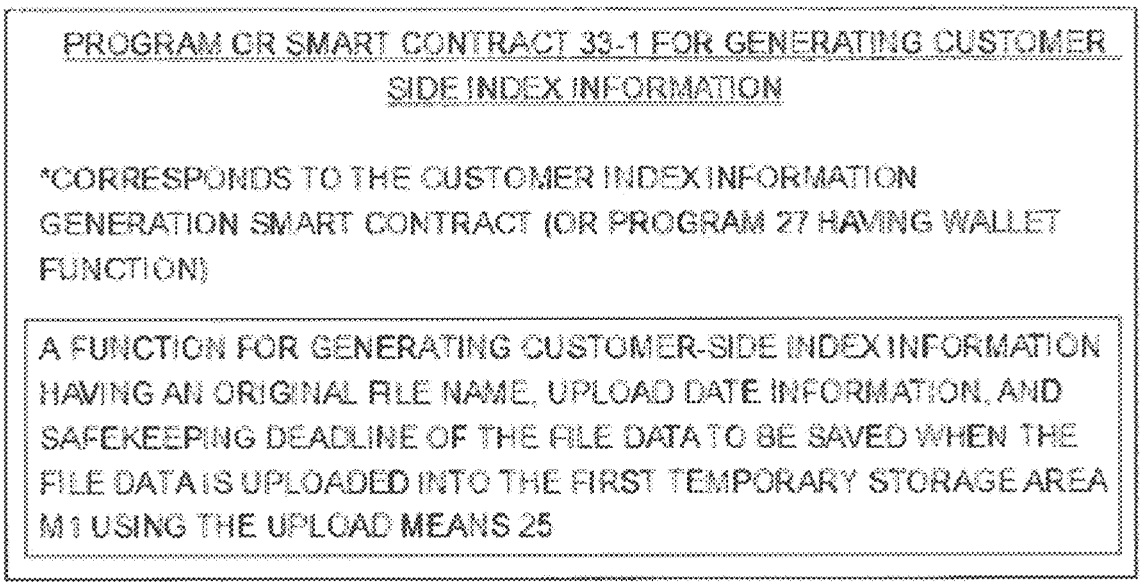
FIG. 68 is an explanatory diagram schematically illustrating the configuration of a smart contract for generating customer side index information in the digital asset guard service provision system of the present embodiment.

Program or Smart Contract 33-1 for Generating Customer Side Index Information The program or smart contract 33-1 for generating customer side index information corresponds to the above-mentioned smart contract or program 27 having a wallet function for generating customer side index information, and for example, as shown in FIG. 68, comprises a function for generating customer-side index information having an original file name, upload date information, and safekeeping deadline of the file data to be saved when the file data is uploaded into the first temporary storage area M1 using the upload means 25.

Smart Contract 33-2 for Generating Co-Administrator Side Index Information

The smart contract 33-2 for generating co-administrator side index information corresponds to the smart contract 33 for generating server index information described above, and for example, as shown in FIG. 69, comprises a function of generating co-administrator-side index information that comprises file name information and encrypted corresponding recording destination information after renaming of each file data distributed and recorded by each of the distribution and recording smart contracts 32.

Index Information Recording Means (Customer Side, Co-Administrator Side)

The index information recording means is configured to comprise a program or smart contract 34-1 for recording customer-side index information that runs on the customer side who desires to save the file data, and a smart contract 34-2 for recording co-administrator side index information that runs on the co-administrator side of the consortium-type blockchain.

Program or Smart Contract 34-1 for Recording Customer-Side Index Information For example, as shown in FIG. 70, the program or smart contract 34-1 for recording customer-side index information comprises a function for encrypting and recording customer-side index information generated by the program or smart contract 33-1 for generating customer-side index information in node groups at specified bases in the consortium-type blockchain, when approval is granted using the first secret key for accessing the blockchain K112 generated based on the first secret key, that is the first offline decryption key K11 generated by the customer Smart Contract 34-2 for Recording Co-Administrator Side Index Information The smart contract 34-2 for recording co-administrator side index information corresponds to the above-mentioned smart contract 34 for recording server index information, and comprises, for example, as shown in FIG. 71, a function for encrypting and recording co-administrator side index information generated by the smart contract 33-2 for generating co-administrator side index information into node groups located at specified bases at the consortium-type blockchain, when approval is granted using a second secret key for accessing the blockchain K212 generated based on the second secret key, that is the second offline decryption key K21 generated by the co-administrator of the consortium-type blockchain.

Encrypted Index Information Extraction Means (Customer Side, Co-Administrator Side)

The encrypted index information extraction means is configured to comprise a smart contract 82-1 for extracting customer-side encrypted index information that runs on the customer side who desires to restore the file data, and a smart contract 82-2 for extracting co-administrator side encrypted index information that runs on the co-administrator side of the consortium-type blockchain.

Smart Contract 82-1 for Extracting Customer-Side Encrypted Index Information The smart contract 82-1 for extracting customer-side encrypted index information, for example, as shown in FIG. 72, comprises a function for extracting customer side encrypted index information recorded in node groups located at specified bases in the consortium-type blockchain by the smart contract 34-1 for recording customer-side encrypted index information based on the first parameter P1 and the second parameter P2 associated with the file data to be extracted that is accepted by the file data extraction instruction reception means 81, when authentication is granted using a first secret key for accessing the blockchain K112 generated based on the customer generated first secret key, that is the first offline decryption key K11.

Smart Contract 82-2 for Extracting Co-Administrator Side Encrypted Index Information The smart contract 82-2 for extracting co-administrator side encrypted index information corresponds to the above-mentioned smart contract 82 for extracting encrypted server index information. For example, as shown in FIG. 73, when authentication is granted using the second secret key for accessing the blockchain K212 generated based on the second secret key, that is, the second decryption key K21 generated by the co-administrator of the consortium-type blockchain, the smart contract 82-2 for extracting co-administrator side encrypted index information comprises a function for extracting the encrypted co-administrator side index information recorded in node groups at specified bases in the consortium-type blockchain by the smart contract 34-2 for recording co-administrator side encrypted index information based on the first parameter P1 associated with the file data to be extracted accepted by the file data extraction instruction reception means 81 and the second parameter P2.

Index Information Decryption Means (Customer Side, Co-Administrator Side)

The index information decryption means is configured to comprise a smart contract 83-1 for decrypting customer-side index information that runs on the customer side who desires to restore the file data, and a smart contract 83-2 for decrypting the co-administrator side index information that runs on the co-administrator side of the consortium-type blockchain.

Smart Contract 83-1 for Decrypting Customer Side Index Information

The smart contract 83-1 for decrypting customer-side index information, for example, as shown in FIG. 74, comprises a function for decrypting encrypted customer side index information extracted by the smart contract 82-1 for extracting customer-side index information based on the first secret key, that is the first offline decryption key K11 generated by the customer.

Smart Contract 83-2 for Decrypting Co-Administrator-Side Index Information

The smart contract 83-2 for decrypting co-administrator-side index information corresponds to the above-mentioned smart contract 83 for decrypting server index information, and for example, as shown in FIG. 75, comprises a function for decrypting co-administrator side encrypted index information extracted by a smart contract 82-2 for extracting encrypted co-administrator side index information based on the second secret key, that is the second decryption key K21 generated by the co-administrator of the consortium-type blockchain.

Note that the digital asset guard service provision system of the present invention has a configuration in which a smart contract is provided in a customer side system. However, the digital asset guard service provision system 1 of the present embodiment may be a configuration in which each smart contract provided in the customer side system is provided in a consortium side, and the customer side may download and use a dedicated program in which a wallet is incorporated therein, or may set up a dedicated application on a network and connect to a consortium side system using an Application Programming Interface (API) and the like.

In addition, in the digital asset guard service provision system 1 of this embodiment, the second parameter P2 specified by the co-administrator of the consortium-type blockchain is hard-coded in the smart contract 31 for allotting distributed file management groups and the smart contract 84 for extracting encrypted and divided file data.

In addition, in the digital asset guard service provision system 1 of the present embodiment, the following information 73-1 through 73-3 is configured to be recorded in an encrypted state respectively in node groups located at specified bases in the consortium-type blockchain.

(Information 73-1) An IP address, a user ID and the first parameter P1 as customer setting information, and co-administrator side smart contract address information that can refer to the customer setting information.

(Information 73-2) File name and file data capacity when the file data is saved as index information of the customer, process date and time, safekeeping deadline, and smart contract setting information that operates for saving the customer file data on the co-administrator side.

(Information 73-3) Information on the renamed file names of each file data distributed and recorded by each of the distribution and recording smart contracts 32 as co-administrator side index information.

Description of Characteristic Technical Elements

Next, characteristic technical elements included in the digital asset guard service provision system 1 of this embodiment configured as described above is schematically explained.

Figure 76:
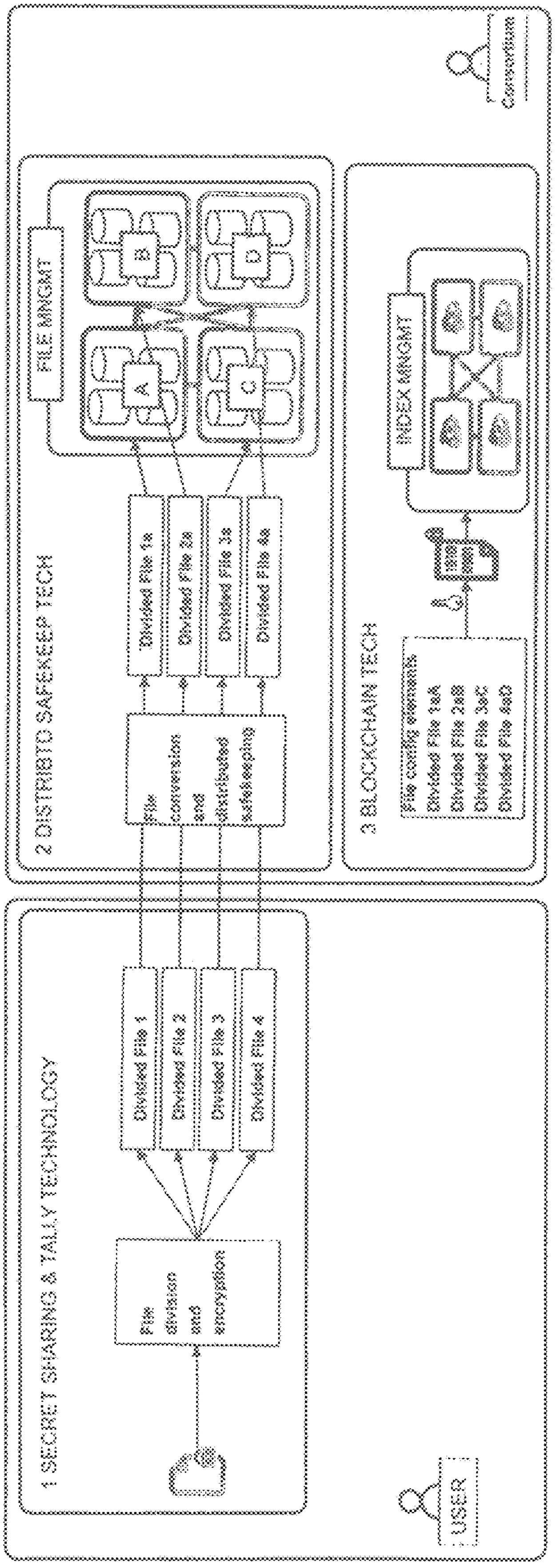
FIG. 76 is an explanatory diagram conceptually illustrating characteristic technical elements included in the digital asset guard service provision system of the present embodiment.

FIG. 76 is an explanatory diagram conceptually showing characteristic technical elements provided in the digital asset guard service provision system 1 of this embodiment.

Figure 77:
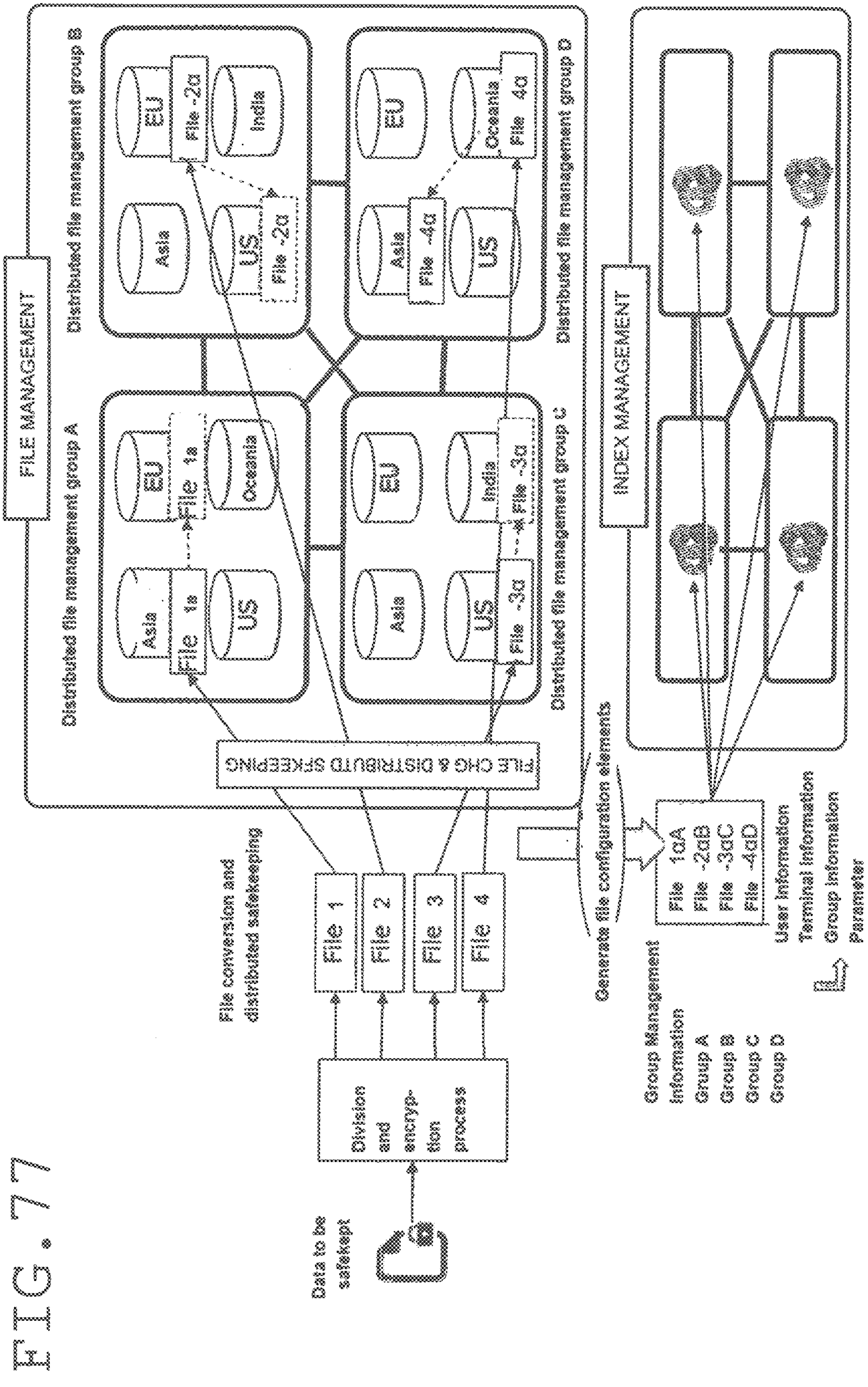
FIG. 77 is an explanatory diagram more specifically illustrating the characteristic technical elements provided in the digital asset guard service provision system of the present embodiment.

FIG. 77 is an explanatory diagram showing a more concrete version of FIG. 76.

The digital asset guard service provision system 1 of this embodiment secures high confidentiality and integrity by combining secret sharing and tally technology, distribution and safekeeping technology, and blockchain technology.

The secret sharing and tally technology here is a technology that divides and encrypts file data to be saved into multiple portions using the secret sharing technologies.

In addition, the distribution and safekeeping technology here is a technology that distributes, records and safekeeps the divided file data at the nodes located at multiple bases that belong to each of the distributed file management groups and the recording devices at multiple bases networked to the nodes located at the bases, which are distributed on a global scale after changing file formats and names thereof to predetermined file formats and names.

Additionally, the blockchain technology here is a technology that encrypts the distributed, recorded and safekept information as index information, records and safekept in a blockchain.

The distribution and safekeeping technology comprises a file management function and an index management function.

The file management function comprises a role of safekeeping file data to be safekept in the nodes located at multiple bases that belong to each of the distributed file management groups and the recording devices located at multiple bases networked to the nodes at the bases.

The index management function comprises a role of managing safekept file data information, file configuration elements, file upload information, parameter information used for secret sharing, and distributed file group information for safekeeping file data.

Secret Sharing Technologies

Figure 78A:
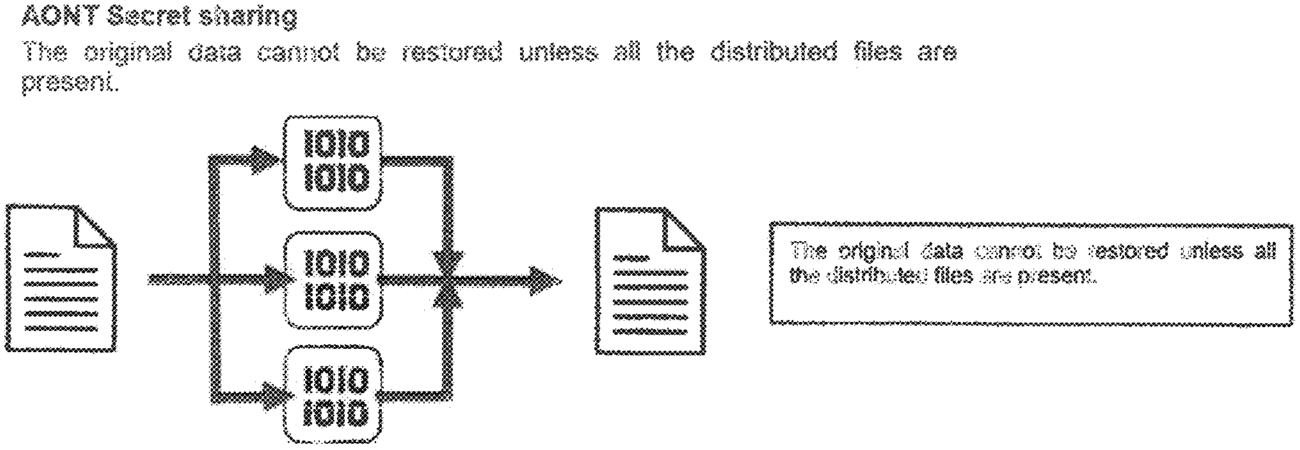
FIG. 78A illustrates suitable secret sharing techniques and FIG. 78B is an explanatory diagram of another secret sharing technique.
Figure 78B:
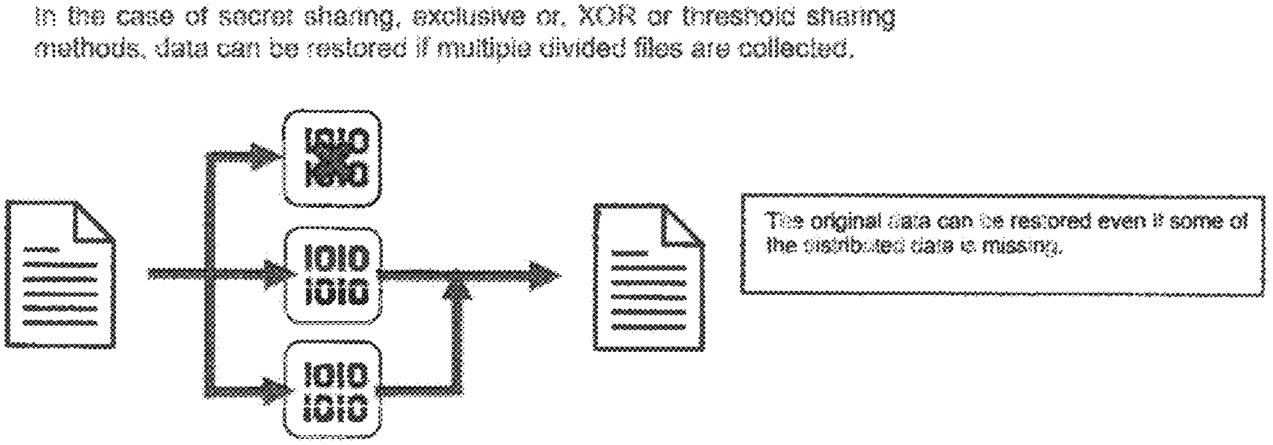

Here, the secret sharing technologies used in the digital asset guard service provision system 1 of this embodiment is explained using FIG. 78A and FIG. 78B.

Secret sharing is a technology that fragments an original information into multiple portions and tallies them. Although individual fragmented data has no meaning, this technology allows the original data to be restored by combining the fragmented data.

The secret sharing technologies comprise the methods, for example, as shown in FIG. 78A, which requires all of fragmented individual file data to be assembled as a condition for restoring the original data, and, for example, as shown in FIG. 78B, there are methods such as exclusive OR (XOR) and threshold distribution method that enable restoration to the original data if multiple portions of fragmented file data are collected.

However, in the digital asset guard service provision system 1 of this embodiment, the AONT secret sharing technology is preferably used as the secret sharing technology.

Combination of Secret Sharing Technology on a Customer Side and Blockchain Technology on a Consortium Side In addition, the digital asset guard service provision system 1 of this embodiment is configured to conceal file data by combining the secret sharing technologies in the customer and/or user side systems (customer side file data saving system 20 and customer side file data restoration system 70) and the blockchain technology in the consortium side systems (the co-administrator side file data saving system 30 and the co-administrator side file data restoration system 80).

Figure 79:
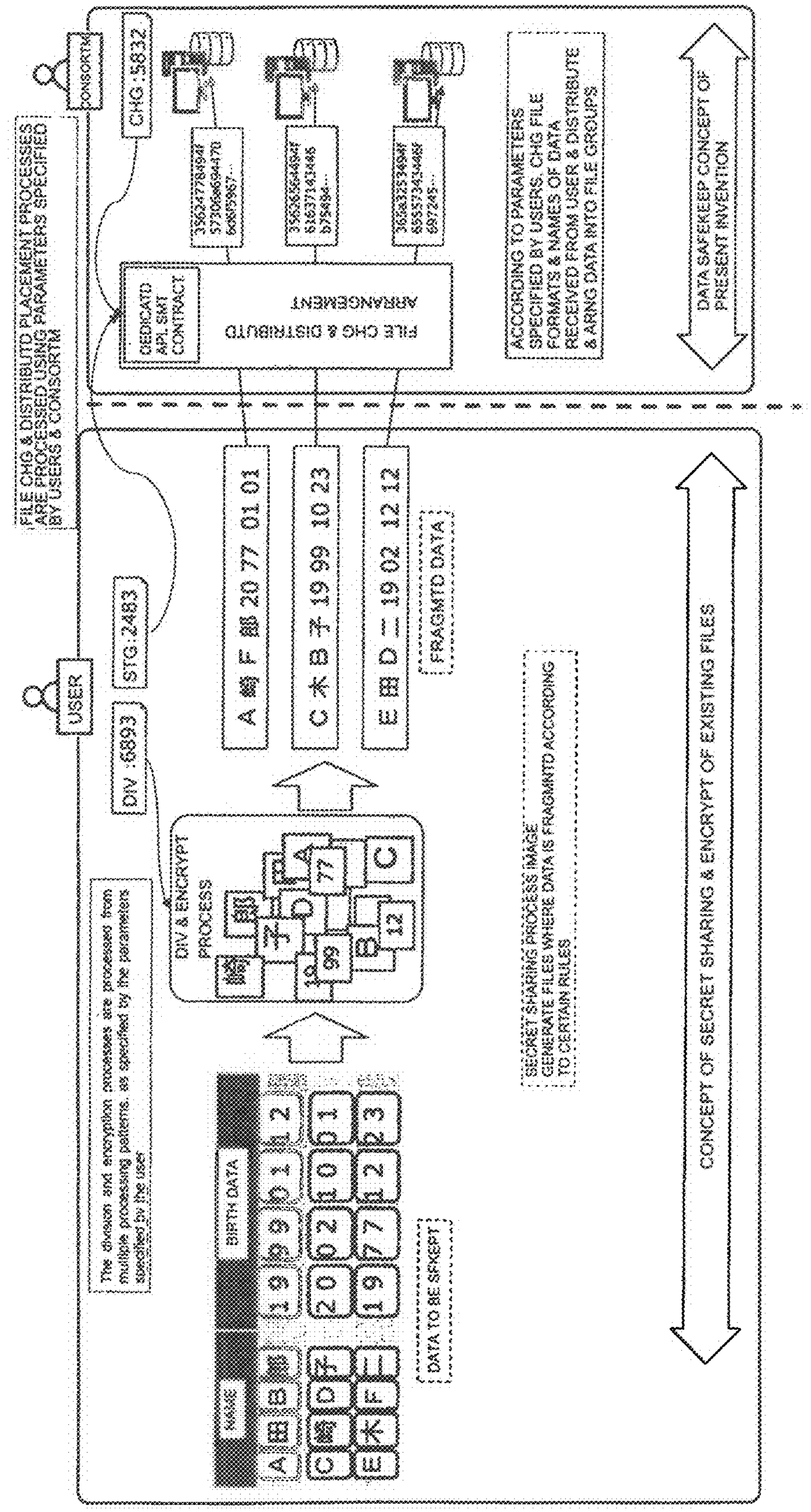
FIG. 79 is a diagram conceptually and schematically illustrating a file data concealment technology combining.

FIG. 79 is an explanatory diagram conceptually and schematically showing the file data concealment technology combining the secret sharing technologies in the customer and/or user side systems that is secret sharing at the customer side file data saving system 20 and the consortium side systems, that is the blockchain technology at the co-administrator side file data saving system 30.

Assume that the file data to be saved comprises name and date of birth data as shown on the left side of FIG. 79, for example.

Such a division and encryption process using the secret sharing technologies for such file data is performed using a process pattern selected from multiple process patterns based on the parameter P1 specified by the customer and/or user.

In the example of FIG. 79, the customer and/or user specifies “6893” as the file division code P11 and “2483” as the file storage code P12.

Based on the process pattern of the file division code “6893”, the name and birth day data is fragmented according to a predetermined rule, and multiple pieces of divided file data may be obtained by linking fragmented pieces of data.

Furthermore, the digital asset guard service provision system 1 of this embodiment is configured:

- to change file formats and names of each encrypted and divided file data using the file storage code P12 specified by the customer and/or user and a smart contract specified by the consortium specified parameter P2, that is, the smart contract 31 for allotting distributed file management groups;
- to allot (distribute and arrange) each encrypted and divided file data to each of the distributed file management groups; and
- to distribute and record each encrypted and divided file data in the nodes $\mathbf{102}_{1\ through\ mb}$ (where mb is an integer of 2 or more) at each of the bases belonging to each of the allotted the distributed file management groups $\mathbf{101}_{1\ through\ m}$ (Where m is an integer of 2 or more) via the distribution and recording smart contract 32.

In addition, the digital asset guard service provision system 1 of the present embodiment comprises a configuration in which:

- the division and encryption of file data using secret sharing technologies for file data to be saved is performed by the customer and/or user side system, that is, by the customer side file data saving system 20;

the file format and name changes of each divided and encrypted file data using the secret sharing technologies, the allotment to each of the distributed file management groups, and the distribution and recording into the nodes at each of the bases belonging to each allotted distributed file management group are processed in the consortium side system, that is, the co-administrator side file data saving system 30.

Several types of patterns (algorithms) are prepared for file format and name changes of file data and for the process of allotment to each of the distributed file management groups in the smart contract 31 for allotting distributed file management group. The allotment process pattern (algorithms) is configured to be determined by the file storage code P12 specified by the customer and/or user and the parameter P2 specified by the consortium.

Securing Data Confidentiality by Fragmenting the Customer-Side System and the Consortium-Side System In addition, in each of the file data saving and in the file data restoration, the digital asset guard service provision system 1 of this embodiment is configured to secure file data confidentiality by fragmenting processes in the customer and/or user side systems (the customer side file data saving system 20 and the customer side file data restoration system 70) and the consortium side systems (the co-administrator side file data saving system 30 and the co-administrator side file data restoration system 80).

FIG. 80 conceptually outlines the process performed by the customer and/or user systems and the consortium side systems for saving file data and restoring file data in the digital asset guard service provision system 1 of this embodiment.

When saving file data, the customer and/or user side system, that is, the customer side file data saving system 20, encrypts and divides the file data using secret sharing technologies, and encrypts the file data using a public key. On the other hand, the consortium side system, that is, the co-administrator side file data saving system 30, changes file formats and names, allots, distributes and arranges file data.

In this case, the customer and/or user may not be possible to know:

information on the file formats and names changed by the consortium side system, that is, the co-administrator side file data save system 30;

distribution and recording destinations and storage destinations of the file data to be saved;

the parameter P2 specified by the consortium; and further the encryption key information K2 (the second public key, that is the second encryption key K22) for encrypting the index information.

On the other hand, the consortium side may not be possible to know:

the file information of the customer and/or user;

the parameter P1 specified by the customer and/or user; and the encryption key information K1 (the first public key, that is the first encryption key K12).

In restoring file data, the consortium side system, that is, the co-administrator side file data restoration system 80, extracts (takes out) the distributed and recorded file data, and changes the file format and name. On the other hand, in the customer and/or user side system, that is, the customer side file data restoration system 70, file data is linked and decrypted using secret sharing technologies and the secret key K11.

The process of linkage and decryption in the customer and/or user side system, that is, the customer side file data restoration system 70, is performed only after receiving the authentication of the consortium when the customer and/or user requests the consortium to restore file data.

As in the digital asset guard service provision system 1 of this embodiment, when processes of the customer and/or user side systems (the customer side file data saving system 20 and the customer side file data restoration system 70) and processes of the consortium side systems (the co-administrator side file data saving system 30 and the co-administrator side file data restoration system 80) are fragmented, even if the file data is leaked that is distributed and recorded, safekept, divided and encrypted, and whose file formats and names are changed in the consortium side system, the original file data would not be possible to be restored only with the above-mentioned information.

In order to restore the original file data, information on the files to be linked, a file format and name change program, decipherment of linkage process using secret sharing technologies, and the encryption key for decryption (the first secret key, that is, the first offline decryption key K11) and the like are additionally required.

Securing Data Confidentiality Through Black Box Process Using Secret Sharing Technologies In addition, the digital asset guard service provision system 1 of the present embodiment is configured to secure data confidentiality by performing a file data dividing and encrypting process using secret sharing technologies, and a decrypting and linking file data process using secret sharing technologies by using a program whose process is black boxed by parameters P1 and P2 at the time of both saving and restoring file data.

FIG. 81 is an explanatory diagram conceptually illustrating a process by a black boxed program for file data saving and file data restoration in the digital asset guard service provision system 1 of this embodiment.

In the digital asset guard service provision system 1, an application for uploading file data to the consortium side system for file saving purposes, that is, the programs $\mathbf{21}_{1\ \mathit{through}\ q}$ (where q is an integer of 10 or more) having multiple encryption and division algorithms, and an application for downloading file data from the consortium side system for file restoration purposes, that is, the programs $\mathbf{71}_{1\ \mathit{through}\ q}$ (where q is an integer of 10 or more) having multiple decryption and linkage algorithms, are prepared.

The application for uploading file data that is, the programs $\mathbf{21}_{1\ \mathit{through}\ q}$ (where q is an integer of 10 or more) comprise multiple selectable types of algorithms performing encryption and division processes.

The applications for downloading file data, that is, the programs $\mathbf{71}_{1\ \mathit{through}\ q}$ (where q is an integer of 10 or more) comprise multiple selectable types of algorithms performing decryption and linkage processes.

In these applications, which one of the multiple algorithms to select is determined by a parameter P1 specified by an external customer.

Further, the application for uploading file data, that is, the algorithms in the programs $\mathbf{21}_{1\ \mathit{through}\ q}$ (where q is an integer of 10 or more) having multiple encryption and division functions, are associated with the application for downloading file data, that is, the algorithms in the multiple programs $\mathbf{71}_{1\ \mathit{through}\ q}$ (where q is an integer of 10 or more) having decryption and linkage functions.

The consortium side system for file restoration purposes, that is, the co-administrator side file data restoration system 80, when downloading file data therefrom, is configured to be capable of linking, decrypting and restoring divided and encrypted file data by specifying the same parameter P1 as when uploading the file data.

As described above, in the digital asset guard service provision system 1 of the present embodiment, for the encryption and secret sharing of file data, there are multiple programs on the customer side using different types of secret sharing techniques, and customers are allowed to select a program using parameters. A parameter as a key may also be used for encrypting file data by coding the parameter in a program. The key for the encryption may be generated from a decryption key and hard-coded as setting information of the program. The program stores customer setting information and index information in a blockchain. In the wallet function, a private key may be generated at the time of initialization and the program may process it as a hot or cold wallet.

In addition, the blockchain secret key information and the base parameters specified by the customer are safekept offline.

Additionally, a supplementary explanation is provided regarding keys and parameters in the digital asset guard service provision system 1 of this embodiment.

The customer's first encryption key K12 used in the digital asset guard service provision system 1 of this embodiment may also be generated in a method other than using the first secret key (first offline decryption key) K11 to be a base generated by the customer.

For example, the first encryption key K12 can also be generated using the first parameter P1 specified by the customer or the first decryption parameter P1X1. Furthermore, the first encryption key K12 can also be generated using the first encryption parameter P1X2 generated using the first decryption parameter specified by the customer and the first decryption parameter P1X1.

Similarly, the co-administrator side second encryption key K22 used in the digital asset guard service provision system 1 of this embodiment may be generated by a method other using the base second secret key, that is, the second decryption key K21 generated by the co-administrator.

For example, the second encryption key K22 may also be generated using the second parameter P2 specified by the co-administrator or the second decryption parameter P2X1. Furthermore, the second encryption key K22 may also generated using the second encryption parameter P2X2 generated using the second decryption parameter specified by the co-administrator, and the second decryption parameter P2X1.

In addition, the digital asset guard service provision system 1 of this embodiment may also be configured as follows as a modified configuration.

Configuration Having Private Blockchain

For example, consortium-type blockchains may be constructed with private-type blockchains, as long as the blockchain is confidential.

In that case, the private-type blockchains are used that are constructed with a planet comprising a node group, which is a combination of multiple virtual nodes at a single base.

Integration of Each Smart Contract

In addition, the co-administrator side file data saving system 30 may be configured to comprise a smart contract 30X for saving co-administrator side file data, integrating each function of the smart contract 31 for allotting distributed file management groups, the distribution and recording smart contract 32, the smart contract 33 for generating server index information, and the smart contract 34 for recording server index information.

The co-administrator side file data restoration system 80 may be configured to comprise the smart contract 80X for restoring co-administrator side file data, integrating each function of the smart contract 82 for extracting encrypted server index information, the smart contract 83 for decrypting server index information, and the smart contract 84 for extracting encrypted and divided file data.

In that case, the smart contract 30X for saving co-administrator side file data may preferably be configured such that the second parameter P2 specified by the co-administrator of the consortium-type blockchain is hard-coded internally.

In addition, the smart contract 84 for restoring co-administrator side file data may preferably be configured such that the second parameter P2 or the second compound parameter P2X (which is configured by a pair of the second decryption parameter P2X1 (incorporated and modularized in a specified smart contract that performs a corresponding process), and the second encryption parameter P2X2 (incorporated and modularized in a specified smart contract that performs a corresponding process) automatically generated from the second decryption parameter P2X1)) specified by a co-administrator of the consortium-type blockchain are hard-coded therein.

Smart Contract 30X for Saving Co-Administrator Side File Data

For example, as shown in FIG. 82A and FIG. 82B, the smart contract 30X for saving co-administrator side file data X is configured to comprise a function that performs the following processes 82-1 through 82-3 and a function that performs the following processes 82-4 through 82-6.

(Process 82-1) The smart contract 30X for saving co-administrator side file data generates the key (key number omitted) for renaming and encryption using the first parameter P1 specified by a customer who desires to save the file data, and the second parameter P2 that is internally hard-coded.

(Process 82-2) The smart contract 30X for saving co-administrator side file data changes and encrypts file names of each file data (encrypted and multi-divided by the file data encryption and division means 24 and) uploaded into the first temporary storage area M1 by the upload means 25, using the renaming and encryption key (key number omitted).

(Process 82-3) After performing the process 82-2, the smart contract 30X for saving co-administrator side file data allots the file data to the distributed file management groups $\mathbf{101}_{1\ through\ m}$ (where m is an integer of 2 or more).

(Process 82-4) Before generating and encrypting server index information (comprising: renamed file name information of each distributed and recorded file data; and address information of the nodes and the recording devices that safekeep destinations for the file data in the distributed file management groups $\mathbf{101}_{1\ through\ m}$ (where m is an integer of 2 or more) that are allotment destinations of each of the file data) and recording the server index information into node groups located at specified bases in the consortium-type blockchain, for renamed file information and address information of the nodes and the recording devices into which the file data is safekept, the smart contract 30X for saving co-administrator side file data changes the file name to a file name further different from the renamed file name and generates new server index information based on the internally hard-coded second parameter P2.

(Process 82-5) The smart contract 30X for saving co-administrator side file data encrypts the new server index information generated in the process 82-4 and records in the node group at the specified base in the consortium-type blockchain.

(Process 82-6) After performing the process 82-5, the smart contract 30X for saving co-administrator side file data deletes the renamed file name information of each original distributed and recorded file data and the address information of the nodes and the recording devices in which the file data is safekept for the file data in each of the distributed file management groups 101$_{1\ through\ m}$ (where m is an integer of 2 or more) to which each file data is allotted.

In addition, the smart contract 30X for saving co-administrator side file data is further configured to comprise a function of performing processes 83-1 through 83-4, as shown in FIG. 83, for example.

(Process 83-1) The smart contract 30X for saving co-administrator side file data changes the file name to a name that is further different from the renamed file name, based on the second parameter P2 that is internally hard-coded.

(Process 83-2) The smart contract 30X for saving co-administrator side file data further adds dummy file information to the file name information changed in the process 83-1 and to the address information of the nodes and the recording devices in which the file data is safekept to generate new server index information.

(Process 83-3) The smart contract 30X for saving co-administrator side file data encrypts the new server index information generated in the process 83, and records into the node groups at specified bases in the consortium-type blockchain.

(Process 83-4) After performing the process 83-3, the smart contract 30X for saving co-administrator side file data deletes the renamed file name information of each original distributed and recorded file data and the address information of the nodes and the recording devices in which the file data in each of the distributed file management groups 101$_{1\ through\ m}$ (where m is an integer of 2 or more) to which each file data is allotted is safekept.

Smart Contract 80X for Restoring Co-Administrator Side File Data

For example, as shown in FIG. 84, the smart contract 80X for restoring co-administrator side file data is configured to comprise a function for performing the following processes 84-1 through 84-5.

(Process 84-1) The smart contract 80X for restoring co-administrator side file data generates keys for file name restoration and decryption using the first parameter P1 or first compound parameter P1X specified by the customer, and the second parameter P2 or the second compound parameter P2X internally hard-coded and specified by the co-administrator of the consortium-type blockchain.

The first compound parameter P1X is configured with a pair of the first decryption parameter P1X1 specified by the customer and managed offline, and the first encryption parameter P1X2 that is automatically generated from the first decryption parameter P1X1.

The second compound parameter P2X is configured with a pair of the second decryption parameter P2X1 specified by the co-administrator and managed offline, and the second encryption parameter P2X2 (incorporated and modularized within the predetermined smart contract that performs the corresponding process) that is automatically generated from the second decryption parameter P2X1.

(Process 84-2) The smart contract 80X for restoring co-administrator side file data extracts encrypted server index information (recorded in node groups located at specified bases in the consortium-type blockchain).

(Process 84-3) After performing the process 84-2, the smart contract 80X for restoring co-administrator side file data places back new server index information in which the file name is further different from the renamed file name based on the second parameter P2 and the second compound parameter P2X (Process 84-4) Following the process 84-3, the smart contract 80X for restoring co-administrator side file data places the changed file name back to the renamed file name information.

(Process 84-5) Following the process 84-4, the smart contract 80X for restoring co-administrator side file data places back the file name information before the renaming of each of the distributed and recorded file data based on the name restoration and decryption key.

In addition, the smart contract 80X for restoring co-administrator side file data is configured to have a function for performing processes 85-1 through 85-6, as shown in FIG. 85, for example.

(Process 85-1) The smart contract 80X for restoring co-administrator side file data generates keys for file name restoration and decryption using the first parameter P1 or first compound parameter P1X specified by the customer, and the second parameter P2 or the second compound parameter P2X internally hard-coded and specified by the co-administrator of the consortium-type blockchain.

The first compound parameter P1X is configured with a pair of the first decryption parameter P1X1 specified by the customer and managed offline, and the first encryption parameter P1X2 that is automatically generated from the first decryption parameter.

The second compound parameter P2X is configured with a pair of the second decryption parameter P2X1 specified by a co-administrator and managed offline (incorporated and modularized within the predetermined smart contract that performs the corresponding process), and the second encryption parameter P2X2 that is automatically generated from the second decryption parameter P2X1 (which is incorporated and modularized within the predetermined smart contract that performs the corresponding process).

(Process 85-2) The smart contract 80X for restoring co-administrator side file data extracts encrypted server index information (recorded in node groups located at specified bases in the consortium-type blockchain).

(Process 85-3) After performing the process 85-2, the smart contract 80X for restoring co-administrator side file data excludes dummy file information based on the second parameter P2 or the second compound parameter P2X that are internally hard-coded.

(Process 85-4) Following the process 85-3, the smart contract 80X for restoring co-administrator side file data places back new server index information in which the file name is further different from the renamed file name.

(Process 85-5) Following the process 85-4, the smart contract 80X for restoring co-administrator side file data places back the file name information after the name change by setting the changed name back.

(Process 85-6) Following the process 85-5, the smart contract 80X for restoring co-administrator side file data places back information in which renamed file names of each of the distributed and recorded file data based on the keys for name restoration and decryption.

Note that FIG. 86 conceptually illustrates the basic process configuration of the file data saving process in the digital asset guard service provision system 1 of this embodiment.

Configured with an Asynchronous Decentralized Ledger

Furthermore, although the digital asset guard service provision system 1 according to another modification of the present embodiment is configured with the consortium-type blockchain. The following configuration may also be configured with an asynchronous decentralized ledger group instead of a synchronous type blockchain.

That is, the digital asset guard service provision system 1 according to another modification of the present embodiment is the digital asset guard service provision system to protect digital assets from high-level cyberattacks, which is configured with a server application to perform a predetermined process using a decentralized ledger using the dispersed technique and data managed by the decentralized ledger, as shown in FIG. 87, for example.

The digital asset guard service provision system 1 according to another modification of the present embodiment comprises:

- the consortium-type asynchronous decentralized ledger group configured with the multiple planets 100$_{1\ through\ n}$ (where n is an integer of 2 or more) (which is one unit configuring an asynchronous decentralized ledger group) comprising node groups incorporating the nodes at multiple bases in different regions in the world;
- the file data saving system 10; and
- the file data restoration system 60,
- wherein the nodes located at each of the bases are networked to the recording devices located at multiple bases in different regions in the world to configure the distributed file management groups 101$_{1\ through\ m}$ (where m is an integer of 2 or more).

The file data saving system 10 comprises the multiple programs 21$_{1\ through\ q}$ (where q is an integer of 10 or more) having encryption and division algorithms, the encryption and division algorithm selection reception means 22, the file data saving instruction reception means. 23, the file data encryption and division means 24, the upload means 25, the distributed file management groups allotment means 31', the distribution and recording means 32', the system setting information generation and recording means 98', the server index information generation means 33', the server index information recording means 34', a customer setting information generation means (or a program having a wallet function for generating customer setting information) 99', a customer index information generation means (or a program having a wallet function for generating customer index information) 27', a customer index information recording means 28' and the first data deletion means 46.

The multiple programs 21$_{1\ through\ q}$ (where q is an integer of 10 or more) having encryption and division algorithms is configured to have a different file data encryption and division process method.

The encryption and division algorithm selection reception means 22 is configured to accept a selection of the programs 21$_{1\ through\ q}$ (where q is an integer of 10 or more) having predetermined encryption and division algorithms based on the first parameter P1 specified by a customer who desires to save the file data.

The file data saving instruction reception means 23 is configured to accept a file data save instruction from a customer who desires to save the file data.

The file data encryption and division means 24 is configured to encrypt and multi-divide the customer file data to be saved that is accepted by the file data saving instruction reception means 23 using the program 21 having the encryption and division algorithm 21*a* (where a is an integer between 1 and q) accepted by the encryption and division algorithm selection reception means 22.

The upload means 25 is configured to upload, each file data encrypted and multi-divided by the file data encryption and division means 24, to the first temporary storage area M1.

The distributed file management group allotment means 31' is configured to have a function for allotting, each file data encrypted and multi-divided by the file data encryption and division means 24 and uploaded to the first temporary storage area M1 by the upload means 25 based on the first parameter P1 and the second parameter P2 specified by the co-administrator of the consortium-type asynchronous decentralized ledger group, to the multiple distributed file management groups 101$_{1\ through\ m}$ (where m is an integer of 2 or more) that are configured with:

- the nodes 102$_{1\ through\ mb}$ (where mb is an integer of 2 or more) at each of the bases configured for the planets 100$_{1\ through\ n}$ (n is an integer of 2 or more) set on the co-administrator side in a condition specified by the customer; and
- the recording devices located at multiple bases networked to the nodes at the bases.

The distribution and recording means 32' is configured to have a function for distributing and recording each file data allotted by the distributed file management group allotment means 31' into the nodes 102$_{1\ through\ mb}$ (where mb is an integer of 2 or more) at each of the bases belonging to each of the corresponding distributed file management groups 101$_{1\ through\ m}$ (where m is an integer of 2 or more) and the recording devices at multiple bases networked to the nodes at the bases.

The system setting information generation and recording means 98' is configured to have a function for generating and encrypting the system setting information comprising:

- terminal information for uploading to the first temporary storage area M1 using the upload means 25;
- information identifying the destination such as a fixed IP address;
- a number of a predetermined process means that performs a corresponding process of the customer file data to be recorded;
- planet information to which the file data recording destination belongs;
- information on a file server group in the nodes located at specified bases and the recording devices at multiple bases networked to the nodes at the bases that make up the distributed file management groups,
- and to have a function for recording in node groups at specified bases in the consortium-type asynchronous decentralized ledger group.

The server index information generation means 33' is configured to generate server index information comprising:

- file name information of each file data distributed and recorded by each distribution and recording means 32'; and configuration information of each of the distributed file management groups to which each file data is allotted.

The server index information recording means 34' is configured to have a function for encrypting server index information generated by the server index information generation means 33' and recording into the node groups located at the specified bases in the consortium-type asynchronous decentralized ledger group.

The customer setting information generation means (or the program having the wallet function for generating customer setting information) 99' is configured to have a function for generating customer setting information comprising setting information of the first parameter P1 associated with the programs $\mathbf{21}_{1\ through\ q}$ (where q is an integer of 10 or more) having the encryption and division algorithms accepted by the encryption and division algorithm selection reception means 22.

The customer index information generation means (or program having the wallet function for generating customer index information) 27' is configured to have a function for generating customer index information having information on the original file name and the upload date of the customer file data to be saved.

The customer index information recording means 28' is configured to have a function for encrypting customer index information generated by the customer index information generation means or the program 27' having the wallet function for generating customer index information and records in node groups located at specified bases in the consortium-type asynchronous decentralized ledger group.

The first data deletion means 46 is configured to delete each file data uploaded into the first temporary storage area M1 after the server index information is encrypted and recorded in the node group of the specified base in the consortium-type asynchronous decentralized ledger group by the server index information recording means 34'.

The file data restoration system 60 is configured to comprise:

- The multiple programs $\mathbf{71}_{1\ through\ q}$ (where q is an integer of 10 or more) having decryption and linkage algorithms;
- the file data extraction instruction reception means 81;
- the encrypted server index information extraction means 82';
- the server index information decryption means 83' having a function of decrypting the encrypted server index information extracted by the encrypted server index information extraction means 82';
- the encrypted and divided file data extraction means 84' having a function for extracting, each encrypted and multi-divided file data that is allotted to each of the distributed file management groups $\mathbf{101}_{1\ through\ m}$ (where mb is an integer of 2 or more) by the distributed file management group allotment means 31' and
- is distributed and recorded into the nodes $\mathbf{100}_{1\ through\ n}$ (where n is an integer of 2 or more) at each of the bases that belong to each of the distributed file management groups $\mathbf{101}_{1\ through\ m}$ (where m is an integer of 2 or more) and the recording devices located at multiple bases networked to the nodes at the bases by each of the distribution and recording means 32',
- from any of the nodes $\mathbf{100}_{1\ through\ n}$ (where n is an integer of 2 or more) at each of the bases belonging to each of the distributed file management groups $\mathbf{101}_{1\ through\ m}$ (where m is an integer greater than or equal to 2 or more) and the recording devices located at multiple bases networked to the nodes at the bases, using server index information decrypted by he distributed file management group allotment means 31';
- the download means 72 that downloads each of the encrypted and multi-divided files extracted by the encrypted and divided file data extraction means 84' to the second temporary storage area M2;
- the file data restoration means 73 decrypts, links each encrypted and multi-divided file data that is extracted by the encrypted and divided file data extraction means 84' and downloaded to the second temporary storage area M2 to one file data and restores the file data before being saved, using the programs 71alpha (where alpha is an integer between 1 and q) having decryption and linkage algorithms associated with the program 21 having encryption and division algorithm 21*a* (where a is an integer between 1 and q) accepted by the encryption and division algorithm selection reception means 22; and
- the second data deletion means 74 for deleting the encrypted and multi-divided file data downloaded to the second temporary storage area M2 after being restored to the file data before being saved by the file data restoration means 73.
- the multiple programs $\mathbf{71}_{1\ through\ q}$ (where q is an integer of 10 or more) having multiple decryption and linkage algorithms are configured to have different decryption and linkage process methods for the file data, associated with each of the programs $\mathbf{21}_{1\ through\ q}$ (where q is an integer of 10 or more) having encryption and division algorithms.

The file data extraction instruction reception means 81 is configured to accept a file data extraction instruction from a customer who desires to restore the file data.

The encrypted server index information extraction means 82' is configured to have a function for extracting encrypted server index information (recorded in the node groups at specified bases in the consortium-type asynchronous decentralized ledger group by the server index information recording means 34') based on the first parameter P1 or the first compound parameter P1X and the second parameter P2 or the second compound parameter P2X associated with the file data to be extracted accepted by the file data extraction instruction reception means 81.

The first compound parameter P1X is configured with a pair of the first decryption parameter P1X1 specified by the customer and managed offline, and the first encryption parameter P1X2 that is automatically generated from the first decryption parameter P1X1.

The second compound parameter P2X is configured with a pair of the second decryption parameter P2X1 specified by the customer and managed offline (incorporated and modularized in a predetermined process means that performs the corresponding process), and the second encryption parameter P2X2 (incorporated and modularized in a predetermined process means that performs the corresponding process) that is automatically generated from the second decryption parameter P2X1.

The general process flow in the digital asset guard service provision system 1 of this embodiment configured as described above is explained with appropriate reference to the corresponding processes in the examples of FIG. 88 through FIG. 91. FIG. 88 and FIG. 89 are explanatory diagrams schematically showing an example of the overall process flow using the digital asset guard service provision system of this embodiment, and FIG. 90 is a schematic diagram showing an example of the flow of file data saving process. FIG. 91 is an explanatory diagram schematically showing an example of the flow of file data restoration process. Note that FIG. 88 through FIG. 91 show the flow of processes in the same example from different viewpoints.

(S1) Procedures and Processes Before Applying for a Data Saving Service Contract (Pre-Registration of Customer Information)

Prior to applying for a data saving service contract, the following procedures and processes are performed.

(S1-1) Procedures on the Customer Side (S1-1-1) Customer Information Pre-Registration Application Procedure A customer who desires to use the data saving service must apply for pre-registration of customer information via the customer registration information designation reception means 94 to the co-administrator of the consortium-type blockchain that is the provider of the digital asset guard service.

(S1-2) Processes on the Co-Administrator Side of Consortium-Type Blockchain

On the consortium side, information registration for customers who wish to use the digital asset guard service is performed as follows.

In the example of FIG. 88, "user registration" and "registration information notification" on the consortium side are shown as processes corresponding to the above-mentioned processes.

(S1-2-1) Reception of Designation of Customer Terminal Information

The customer registration information designation reception means 94 accepts designation of a customer ID, terminal information (fixed IP addresses and the like) used for saving and restoring the file data from a customer who desires to use the digital asset guard service.

(S1-2-2) Recording Customer Terminal Information

The smart contract 95 for customer registration encrypts and records the customer ID, the terminal information and, that is the fixed IP address used for saving and restoring the file data to the node groups located at the specified bases in the consortium-type blockchain.

After the registration process is completed, the consortium side notifies the customer of the completion of the registration process and the registered customer information via e-mail, for example.

(S2) Data Saving Service Contract Application Procedure and Process

The following data saving service contract application procedures and processes are performed.

(S2-1) Procedures on the Customer Side (S2-1-1) Data Saving Service Contract Application Procedure After completing the customer information pre-registration application procedure, the customer requests the data saving service via the data saving service contract application procedure reception means 50 to the co-administrator of the consortium-type blockchain that is the provider of the digital asset guard service.

(S2-2) Processes of the Consortium-Type Blockchain on the Co-Administrator Side (S2-2-1) Reception of Data Saving Service Contract Application Procedure At the time of accepting the data saving service contract application procedure, the data saving service contract application procedure reception means 50 accepts designations from the customer regarding the storage capacity, degree of dispersion, whether to include only domestic or overseas saving destinations, the safekeeping period, and real-time property.

Further, the data saving service contract application procedure reception means 50 further accepts a guarantee level of the file data that is desired to be saved, and also accepts designation of levels of the file data saving and restoration system configuration for operating the nodes $\mathbf{102}_{1\ through\ mb}$ (where mb is an integer of 2 or more) at each of the bases configuring each of the planets $\mathbf{100}_{1\ through\ n}$ (where n is an integer of 2 or more), the recording devices at multiple bases networked to the nodes at the bases, the file data saving system 10 and file data restoration system 60.

(S2-2-2) Record of Data Saving Service Contract Application Reception Information The smart contract 51 for recording data saving service contract application reception information automatically calculates and generates the basic configuration of the entire planet by managing information of the storage capacity, degree of dispersion, whether to include only domestic or overseas saving destinations, the safekeeping period, and real-time property of the file data desired to be saved by the customer, and by setting conditions (budget, whether the highest confidential matter regarding personal information or security is included=size of risk, and the like) from the customer. Then, the smart contract 51 for recording data saving service contract application reception information encrypts and records the generated information into node groups located at specified bases in the consortium-type blockchain as a portion of the system setting information, and. the predetermined smart contract that performs the corresponding process reads the information together with the customer's personal information so that the entire information may be comprehended.

(S2-2-3) Planet Allotment

The co-administrator of the consortium-type blockchain allots suitable planets based on the information on the storage capacity, degree of dispersion, safekeeping period, and the like of the file data that the customer desires to save, which is accepted by the data saving service contract application procedure reception means 50.

At this time, the planet configuration pattern setting means 36 selects:

- the number of nodes configuring the planets $\mathbf{100}_{1\ through\ n}$ (where n is an integer of 2 or more); and
- the distributed file management groups configured with the nodes $\mathbf{102}_{1\ through\ mb}$ (where mb is an integer of 2 or more) at each of the bases, and the recording devices located at multiple bases networked to the nodes at the bases, based on the number of divisions of the file data based on the record capacity and file size of the file data specified by the customer so that the degree of dispersion is maximized.

In addition the planet configuration pattern setting means 36 selects:

- the number of the nodes configuring the planets $\mathbf{100}_{1\ through\ n}$ (where n is an integer of 2 or more);
- the nodes $\mathbf{102}_{1\ through\ mb}$ (where mb is an integer of 2 or more) at each of the bases; and
- the multiple recording devices that is networked to the nodes at the bases (that configure the distributed file management groups), by adding a predetermined number of dummy file data (which comprises a code inside that allows the smart contract 84 for extracting encrypted and divided file data to recognize the dummy information) to the number of divisions of the file data.

(S3) File Data Saving Procedures and Process (S3-1) Procedures and Processes Before Saving File Data Prior to saving the file data, the following procedures and processes are performed.

(S3-1-1) Procedures on the Customer Side (S3-1-1-1) Specifying the First Parameter The customer specifies the first parameter P1 via the first parameter designation reception and recording means 96.

In the example of FIG. 89 and FIG. 90, the file division code P11 "6893" and the file storage code P12 "2483" are specified as the first parameter P1 (external parameter).

(S3-1-2) Process by the Security Company (S3-1-2-1) Reception of First Parameter Designation The first parameter designation reception and recording means 96 accepts a designation of the first parameter P1 from a customer who desires to save the file data, and records the first parameter P1 for which the designation is accepted in an offline recording medium.

(S3-1-2-2) Selection Acceptance of Programs Having Encryption and Division Algorithms The encryption and division algorithm selection reception means 22 accepts a selection of the program or smart contract 21 that comprises a predetermined encryption and division algorithm 21*a* (where a is an integer greater than or equal to one and less than or equal to q) based on the first parameter P1 specified by a customer who desires to save the file data.

(S3-1-2-3) Providing a Program or Smart Contract Having a Wallet and Encryption and Division Algorithms The security company provides customers with a wallet and the program or smart contract 21 that comprises encryption and division algorithm 21*a* (where a is an integer between 1 and q).

(S3-1-3) Process of Consortium-Type Blockchain on the Co-Administrator Side (S3-1-3-1) Specifying the Second Parameter The co-administrator of the consortium-type blockchain specifies the second parameter P2 via the second parameter designation reception and setting means 97.

In the example of FIG. 89, "5832" is specified as the second parameter P2 (change parameter).

(S3-1-3-2) Reception and Setting of Second Parameter Designation

The second parameter designation reception and setting means 97 accepts a designation of the second parameter P2 from a co-administrator of the consortium-type blockchain, and sets the designation accepted second parameter P2 to a source code of a predetermined smart contract performing the corresponding process and modularizes.

(S3-2) Procedures and Process When Saving File Data

Perform the following file data saving procedures and processes.

(S3-2-1) Process on the Customer Side (S3-2-1-1) Input Customer ID, Password, and the Like.

The customer inputs the customer ID, password, and the like, from the customer terminal, and enables the co-administrator side file data saving system 30 to perform data saving process.

In the example of FIG. 88, "user login" on the user side is shown as a process corresponding to the above-mentioned process.

(S3-2-1-2) File Data Saving Instruction

The customer issues an instruction to save the file data desired to be saved via the file data saving instruction reception means 23.

In the example of FIG. 88, "file upload" on the user side is shown as a process corresponding to the above-mentioned process.

(S3-2-1-3) Reception of Instructions to Save File Data

The file data saving instruction reception means 23 accepts a file data save instruction from a customer who desires to save the file data.

(S3-2-1-4) Encryption and Division of File Data

The file data encryption and division means 24 encrypts and multi-divides the customer file data to be saved, accepted by the file data saving instruction reception means 23 using the program (or smart contract) 21 having the encryption and division algorithm 21*a* (where a is an integer between 1 and q) accepted by the encryption and division algorithm selection reception means 22.

At this time, the file data encryption and division means 24 encrypts each of the encrypted and multi-divided file data based on the first public key (first encryption key) K12 generated by the customer.

In the example of FIG. 88, "division and encryption" is performed on the user side, in the example of FIG. 89, the process performed by the application for division in the file storage process on the user side, and in the example of FIG. 90, the process performed by the application for division on the user side are shown as processes corresponding to the above-mentioned processes.

(S3-2-1-5) Upload File Data

The upload means 25 uploads each file data encrypted and multi-divided by the file data encryption and division means 24 to the first temporary storage area M1.

(S3-2-2) Process on the Co-Administrator Side of Consortium-Type Blockchain (S3-2-2-1) File Name Change and Allotment of Encrypted and Multi-Divided File Data The smart contract 31 for allotting distributed file management groups allots, each file data (encrypted and multi-divided by the file data encryption and division means 24 and) uploaded into the first temporary storage area M1 by the upload means 25, to the multiple distributed file management groups $\mathbf{101}_{1\ through\ m}$ (where m is an integer of 2 or more) configured with nodes at multiple bases configured for the planets $\mathbf{100}_{1\ through\ n}$ (where n is an integer of 2 or more) set on the co-administrator in a customer specified condition, and the multiple recording devices that is networked to the nodes at the bases, based on the first parameter P1 and the second parameter P2 specified by the co-administrator of the consortium-type blockchain, In addition, the smart contract 31 for allotting distributed file management groups changes, the file formats and names of each file data (encrypted and multi-divided file data by the file data encryption and division means 24 and) uploaded into the first temporary storage area M1 by the upload means 25, to predetermined file formats and names before allotting to the multiple distributed file management groups $\mathbf{101}_{1\ through\ m}$ (where m is an integer of 2 or more).

The example of FIG. 88 illustrates "file name change and allotment arrangement" on the consortium side, the example of FIG. 89 illustrates a process performed by the smart contract for changes selected by the file storage code P12 "2483" specified by the user in the file storage process on the consortium side and by the parameter P2 "5832" specified by the consortium, and the example of FIG. 90 illustrates a process performed by the smart contract for changes on the consortium side, as processes corresponding to the above-mentioned processes.

(S3-2-2-2) Distribution and Recording of Allotted File Data

Next, the distribution and recording smart contract 32 distributes and records each file data allotted by the smart contract 31 for allotting distributed file management groups in the nodes $\mathbf{102}_{1\ through\ mb}$ (where mb is an integer of 2 or more) at each of the bases belonging to each of the corresponding distributed file management groups $\mathbf{101}_{1\ through\ mb}$ (where m is an integer greater than or equal to 2 or more) and the recording devices at multiple bases networked to the nodes at the bases.

(S3-2-2-3) Generation of Server Index Information

Next, the smart contract 33 for generating server index information generates server index information comprising file name information of each file data distributed and recorded by each of the distribution and recording smart contracts 32, and configuration information of each of the distributed file management groups to which each file data is allotted.

In the example of FIG. 90, "File-X component", "upload information, file division information: 6893, file storage information: 2483, group allotment information." on the consortium side are shown as server index information.

At this time, the smart contract 33 for generating server index information generates server index information including information on the nodes located at each of the bases and the recording devices located at multiple bases networked to the nodes at the bases that distribute and record the dummy file data dummy file data added by the planet configuration pattern setting means 36, as configuration information for each of the distributed file management groups $\mathbf{101}_{1\ through\ m}$ (where m is an integer of 2 or more).

(S3-2-2-4) Recording Generated Server Index Information

The smart contract 34 for recording server index information encrypts the server index information generated by the smart contract 33 for generating server index information and records in the node groups located at the specified bases in the consortium-type blockchain.

At this time, the smart contract 34 for recording server index information encrypts the server index information generated by the smart contract 33 for generating server index information based on:

- the second public key (second encryption key) K22 generated by the co-administrator of the consortium-type blockchain; or
- the second encryption parameter P2X2 (which is incorporated and modularized in a predetermined smart contract performing the corresponding process) automatically generated from the second decryption parameter P2X1 specified by the co-administrator and managed offline (and which is incorporated and modularized in a predetermined smart contract performing the corresponding process).

As a process corresponding to the above-mentioned process, an example of FIG. 88 illustrates "blockchain information registration (renamed file name and/or allotment group, registered terminal and/or original file name and/or updated date)" on the consortium side, an example of FIG. 89 illustrates "parameters specified by a user are stored in the blockchain together with file storage information" in the file storage process on the consortium side, and an example in FIG. 90 illustrates "file configuration elements, upload information, encrypted index information and the like are compressed, encrypted and saved in blockchain" on the consortium side.

These complete the file data saving process.

(S3-2-2-5) Generation of Saved File Data List Information

The saved file data list information generation means 37 generates saved file data list information associated with the customer comprising, the terminal information, that is, fixed IP address at the time of being uploaded into the first temporary storage area M1 using the upload means 25, the original file name of the file data to be saved and upload date information.

(S3-2-2-6) Reference and Control of Saved File Data List Information

The saved file data list information reference control means 38 allows to refer to the saved file data list information generated by the saved file data list information generation means 37 only by the communication equipment management and process program managed by the fixed IP address of the customer.

(S3-2-2-7) Deletion of File Data Uploaded into the First Temporary Storage Area

After the server index information is encrypted by the smart contract 34 for recording server index information and recorded in node groups located at specified bases in the consortium-type blockchain, the first data deletion means 46 deletes each file data uploaded into the first temporary storage area M1.

(S4) File Data Restoration Procedures and Process (S4-1) Procedures and Process Before File Data Restoration Prior to restoring the file data, the following procedures and processes are performed.

(S4-1-1) Procedures on the Customer Side (S4-1-1-1) Request for Provision of the Multiple Programs Having Decryption and Linkage Algorithms, First Secret Key, that is First Offline Decryption Key The customer requests the security company to provide the program having the decryption and linkage algorithms and the first secret key, that is, the first offline decryption key K11.

An example in FIG. 91 illustrates "request to provide an application for decryption and the secret key" on the user side as a procedure corresponding to the above-mentioned process.

(S4-1-2) Process on the Security Company (S4-1-2-1) Providing a Program or Smart Contract Having Decryption and Linkage Algorithms and First Secret Key, that is First Offline Decryption Key The security company provides the customer with a program 71alpha (where alpha is an integer between 1 and q) and the first secret key (first offline decryption key) K11 associated with the program 21 having encryption and division algorithm 21*a* (where a is an integer between 1 and q).

An example of FIG. 91 illustrates "Provide a user with a secret key and application for decryption in response to a file retrieving request from the user", which is the scope of security company support on the user side, as a process corresponding to the above-mentioned process.

(S4-2) File Data Restoration Procedures and Process

The following file data restoration procedures and processes are performed.

(S4-2-1) Procedures on the Customer Side (S4-2-1-1) Application for File Data Restoration Process The customer applies for file data restoration process to the co-administrator of the consortium-type blockchain, who is the provider of the digital asset guard service.

In the example of FIG. 88, a "file download request" on the user side is shown, and in the example of FIG. 91, the user's "application for decryption process to the consortium" is shown as the procedure corresponding to the above-mentioned process.

(S4-2-1-2) Input Customer ID, Password and the Like

The customer inputs the customer ID, password and the like from the customer terminal to enable data restoration process by the co-administrator side file data restoration system 70.

(S4-2-2) Process on the Co-Administrator Side of the Consortium-Type Blockchain (S4-2-2-1) Confirmation of File Data Registration Status for Which Restoration Process is Applied The co-administrator of the consortium-type blockchain refers to the index information recorded in the blockchain and checks whether the distributed and recorded file data information matches the file data requested for restoration process.

In the example of FIG. 88, "confirm acquisition availability" and "registered file information search" on the consortium side, "display file list", "designation of download file" on the user side, and "obtain registered file information details" on the consortium side, are shown as a process corresponding to the above-mentioned process.

(S4-2-2-2) Authentication of File Data Restoration Process

Next, the co-administrator of the consortium-type blockchain approves the file data restoration process when confirmed that the distributed and recorded file data information matches with the file data requested for restoration process. Then, via the file data restoration process operation control means 86, the application for file data restoration process is made operational.

In the example of FIG. 91, the consortium's "confirm and approve statuses of the user and security company" and "approve the launch of the file restoration process and application for decryption" are shown as the processes corresponding to the above-mentioned processes.

(S4-2-2-3) Reception of File Data Extraction Instructions

The file data extraction instruction reception means 81 accepts a file data extraction instruction from a customer who desires to restore the file data.

(S4-2-2-4) Extraction of Encrypted Server Index Information

The smart contract 82 for extracting encrypted server index information extracts encrypted server index information (recorded in node groups at specified bases in the consortium-type blockchain by the smart contract 34 for recording server index information) based on:

- the first parameter P1 associated with the file data to be extracted that is accepted by the file data extraction instruction reception means 81 or the first compound parameter P1X (comprising a pair of the first decryption parameter P1X1 that is specified by a customer and managed offline, and the first encryption parameter P1X2 that is automatically generated from the first decryption parameter P1X1); and
- the second parameter P2 or the second compound parameter P2X (comprising a pair of the second decryption parameter P2X1 that is specified by a co-administrator and managed offline (which is incorporated and modularized within the predetermined smart contract that performs a corresponding process), and the second encryption parameter P2X2 that is automatically generated from the second decryption parameter P2X1 (which is incorporated and modularized within the predetermined smart contract that performs a corresponding process)).

In the example in FIG. 91, "retrieving the information of the file to be restored from the blockchain based on the consortium's authentication and activation request" on the consortium side is shown as a process that corresponds to the above-mentioned process.

(S4-2-2-5) Decrypting Server Index Information

The smart contract 83 for decrypting server index information decrypts the encrypted server index information extracted by the smart contract 82 for extracting encrypted server index information.

At this time, the smart contract 83 for decrypting server index information decrypts the encrypted server index information extracted by the smart contract 82 for extracting encrypted server index information based on the second secret key, that is, the second decryption key K21 generated by the co-administrator of the consortium-type blockchain.

(S4-2-2-6) Extraction of Encrypted and Divided File Data

The smart contract 84 for extracting encrypted and divided file data extracts each encrypted and multi-divided file data (allotted to each of the distributed file management groups 101$_{1\ through\ m}$ (where m is an integer of 2 or more) by the smart contract 31 for allotting distributed file management groups, and distributed and recorded in the nodes 102$_{1\ through\ mb}$ (where mb is an integer of 2 or more) at each of the bases belonging to each of the distributed file management groups 101$_{1\ through\ m}$ (where m is an integer of 2 or more) and the recording devices located at multiple bases networked to the nodes at the bases by each of the distribution and recording smart contracts 32), from any node at each of the bases belongs to each of the distributed file management groups 101$_{1\ through\ m}$ (where m is an integer of 2 or more) and the recording devices located at multiple bases networked to the nodes at the bases, using the server index information decrypted by the smart contract 83 for decrypting server index information.

Furthermore, the smart contract 84 for extracting encrypted and divided file data decrypts the extracted file data and at the same time changes the file formats and names of the file data to the original file formats and names.

In the example of FIG. 88, "safekept file acquisition" on the consortium side,

- in the example of FIG. 89, "user-specified file storage code P12 '2483' written in the blockchain at the time of data restoration, and file conversion process is called using the parameter P2 '5832' to retrieve the file" in the file retrieval process on the consortium side ", and
- in the example of FIG. 91, "the change process is determined from the retrieved blockchain information and the parameter P2 '5832' specified by the consortium" and "based on the change process, perform retrieval of the file to be restored." in the file retrieval process on the consortium side, are shown as the processes corresponding to the above-mentioned process.

The smart contract 84 for extracting encrypted and divided file data extracts each encrypted and multi-divided file data (allotted to each of the distributed file management groups 101$_{1\ through\ m}$ (where m is an integer of 2 or more) by the smart contract 31 for allotting distributed file management groups, and distributed and recorded in the nodes 102$_{1\ through\ mb}$ (where mb is an integer of 2 or more) at each of the bases belonging to each of the distributed file management groups 101$_{1\ through\ m}$ (where m is an integer of 2 or more) and the recording devices located at multiple bases networked to the nodes at the bases by each of the distribution and recording smart contracts 32), from any node at each of the bases belongs to each of the distributed file management groups 101$_{1\ through\ m}$ (where m is an integer of 2 or more) and the recording devices located at multiple bases networked to the nodes at the bases, using server index information, in which configuration information that distributes and records dummy file data (having a code inside that is capable of recognize dummy information) is excluded from configuration information of each of the distributed file management groups 101$_{1\ through\ m}$ (where m is an integer of 2 or more) in the server index information decrypted by the smart contract 83 for decrypting server index information.

(S4-2-3) Procedures on the Customer Side (Part 2)

(S4-2-3-1) File Data Download

The download means 72 downloads each of the encrypted and multi-divided file data extracted by the smart contract 84 for extracting encrypted and divided file data to the second temporary storage area M2.

(S4-2-3-2) Restoration of File Data

The file data restoration means 73 decrypts, links to one file data and restores the file data before being saved each encrypted and multi-divided file data (that is extracted by the smart contract 84 for extracting encrypted and divided file data) and downloaded to the second temporary storage area M2 by the download means 72, using the program or smart contract 71alpha (where alpha is an integer between 1 and q) having decryption and linkage algorithms associated with the program or smart contract 21 having the encryption and division algorithm 21*a* (where a is an integer from 1 through q) accepted by the encryption and division algorithm selection reception means 22.

At this time, the file data restoration means 73 decrypts each encrypted and multi-divided file data (extracted by the smart contract 84 for extracting encrypted and divided file data) and downloaded to the second temporary storage area M2 by the download means 72 based on the first secret key, that is, the first offline decryption key K11 generated by the customer.

At the same time the file data restoration means 73 performs the process, and links each of the decrypted file data into one file data, using the program or smart contract 71alpha (where alpha is an integer between 1 and q) having decryption and linkage algorithms associated with the program or smart contract 21 having the encryption and division algorithm 21*a* (where a is an integer from 1 through q) accepted by the encryption and division algorithm selection reception means 22.

This completes the file data restoration process.

In the example of FIG. 88, "linkage and decryption" on the user side, in the example of FIG. 89, the process performed by the application for decryption in the file retrieval process on the user side, and in the example of FIG. 91, the process performed by the application for decryption on the user side are illustrated as processes corresponding to the above-mentioned processes.

After the file data restoration process is completed, the customer retrieves the restored file data.

(S4-2-3-3) Deletion of Each File Data Downloaded to the Second Temporary Storage Area The second data deletion means 74 deletes the encrypted and divided file data that is downloaded to the second temporary storage area M2 after being restored to the file data before being saved by the file data restoration means 73.

(S5) Other Process (S5-1) Response Process when File Data is Attacked (S5-1-1) Detection of Attacks Against File Data The data destructive attack detection means 91 detects:

- attacks against encrypted and multi-divided file data recorded in the nodes 102$_{1\ through\ mb}$ (where mb is an integer of 2 or more) at any base configuring the planets 100$_{1\ through\ n}$ (where n is an integer of 2 or more) or the recording devices; or
- existence of a data destruction condition due to equipment failure, and the like.

The data destructive attack detection means 91 determines whether a data destructive attack is performed when destruction of multiple file data managed within a certain time frame, such as 30 minutes, 8 hours, or 24 hours is detected.

(S5-1-2) Automatic Saving to Another Planet where No Attack is Detected

When the data destructive attack detection means 91 detects an attack against the encrypted and multi-divided file data, the automatic data saving means 92 upon being attacked stops the nodes 102$_{1\ through\ mb}$ at each of the bases configuring the planets and the recording devices located at multiple bases networked to the nodes at the bases, or the Internet connection route is forcibly disconnected.

In addition to performing the process, the automatic data saving means 92 upon being attacked sets another network and automatically saves, encrypted and recorded file data distributed and recorded in nodes at bases that are not attacked or the recording devices located at multiple bases networked to the nodes at the bases, to the nodes 102$_{1\ through\ mb}$ (where mb is an integer of 2 or more) at each of the bases configuring other planets in which attacks against the encrypted and recorded file data are not detected by the data destructive attack detection means 91 and the recording devices located at multiple bases networked to the nodes at the bases.

In addition, when the data destructive attack detection means 91 detects an attack against the encrypted and multi-divided file data, the automatic data saving means 92 upon being attacked automatically saves encrypted and multi-divided file data distributed and recorded in the nodes 102$_{1\ through\ mb}$ (where mb is an integer greater than or equal to 2) at a base configuring the planet not attacked and the recording devices located at multiple bases networked to the nodes at the base, to the nodes 102$_{1\ through\ mb}$ (where mb is an integer greater than or equal to 2) at each of the bases configuring other plane in which no encrypted and multi-divided file data is attacked and the recording devices located at multiple bases networked to the nodes at the bases via a communication means separate from the Internet such as an LTE and the like.

(S5-1-3) Switching to a Connection with a Communication Means Other than the Internet Such as an LTE When the data destructive attack detection means 91 detects an attack against the encrypted and multi-divided file data, the communication switching control means 93 maintains a stopped state in which nodes at a stopped state and the recording devices located at multiple bases networked to the nodes at the bases are disconnected from the Internet, and switches to a connection with a communication means separate from the Internet, such as an LTE.

(S5-2) File Data Protection Deadline Management (S5-2-1) Setting the Protection Period for File Data The smart contract 39 for setting safekeeping period sets a safekeeping period of the block in units of the planets 100$_{1\ through\ n}$ (where n is an integer of 2 or more) based on the safekeeping period information of the file data that the customer desires to save, which is recorded in node groups located at specified bases in the consortium-type blockchain by the smart contract 51 for recording data saving service contract application reception information, at the time of distribution and recording of each file data by each of the distribution and recording smart contracts 32.

Note that each of the divided file data recorded in the nodes 102$_{1\ through\ mb}$ (where mb is an integer of 2 or more) at each of the bases belonging to each of the distributed file management groups 101$_{1\ through\ m}$ (where m is an integer of 2 or more) and the recording devices at multiple based networked to the nodes at the bases are managed in an encrypted state. Index information such as a hash of each file data and a distributed file group to which the recorded file data is allotted are recorded in the block. The blocks are also connected by a chain incorporating time data in the hash.

(S5-2-2) Process of File Data Whose Safekeeping Period has Passed (S5-2-2-1) Disconnecting the Blockchain The smart contract 40 for chain disconnection disconnects the chain of the block after the safekeeping period set by the smart contract 39 for setting safekeeping period has passed.

(S5-2-2-2) Saving Unnecessary Block Data

Before deleting the unnecessary block disconnected via the smart contract 40 for chain disconnection via the smart contract 41 for deleting blocks, the unnecessary block data saving means 42 sends a notification to confirms with the customer whether the unnecessary block is to be deleted. Then, if there is no response from the customer to the notification, the unnecessary block data saving means 42 notifies the co-administrator and confirms whether the unnecessary block may be deleted. Further, even if the unnecessary block is confirmed to be delible, the unnecessary block data saving means 42 temporarily records each encrypted and multi-divided file data as saved data via a predetermined recording medium that is disconnected from networks. Then, the unnecessary block data saving means 42 deletes the temporarily saved data after a certain time has elapsed.

(S5-2-2-3) Block Deletion

The smart contract 41 for deleting blocks deletes unnecessary disconnected blocks via the smart contract 40 for chain disconnection.

(S5-2-2-4) Rollover

When receiving a request from a customer, the following is performed.

Before the safekeeping period of the block set by the smart contract 39 for setting safekeeping period elapses, the rollover smart contract 44 sets new planets and distributed file management groups to extend the safekeeping period of each encrypted and multi-divided file data recorded in the nodes $\mathbf{102}_{1\ through\ mb}$ (where mb is an integer of 2 or more) of each base belonging to each of the distributed file management groups $\mathbf{101}_{1\ through\ m}$ (where m is an integer of 2 or more) and the recording devices located at multiple bases networked to the nodes at the bases as the block. After the process is performed, the rollover smart contract 44 takes over the control number of the old server index information, changes the old control number to a new control number, and generates new server index information. The rollover smart contract 44 performs the process, and at the same time re-rerecords the file data in the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and the recording devices located at multiple bases networked to the nodes at the bases. Then after performed the process, the rollover smart contract 44 deletes the file data recorded in the nodes $\mathbf{102}_{1\ through\ mb}$ (where mb is an integer of 2 or more) at each of the bases belonging to the original distributed file management groups $\mathbf{101}_{1\ through\ m}$ (where m is an integer of 2 or more) and the recording devices located at multiple bases networked to the nodes at the bases, and deletes the old server index information regarding the file data.

(S5-3) Various Checks and Control Processes (S5-3-1) Data Falsification Check

The data falsification check control means 43 calculates hash values based on the encrypted and multi-divided file data recorded in the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and the recording devices located at multiple bases networked to the nodes at the bases, and records the calculated hash values in blocks. The data falsification check control means 43 constantly compares hash values recorded in the blocks in the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and hash values in the recording devices located at multiple bases networked to the nodes at the bases. When the data falsification check control means 43 performs the comparison process and detects a difference between a hash described in a block in a specified node or recording device and a hash described in a block in another node or recording device, the data falsification check control means 43 detects that the encrypted and multi-divided file data recorded in the specified node or recording device is tampered with or destroyed, excludes the node or recording device from the target of the save process, and deletes the block at the specified nodes or recording device. Along with performing the process, the data falsification check control means 43 notifies an alarm to the operator of the node and the co-administrator of the consortium-type blockchain.

(S5-3-2) Upload Processable IP Address Check

The upload processable IP address check means 52 controls to enable the upload process of file data to be saved in the file data saving system 10 (operations of the encryption and division algorithm selection reception means 22, the file data saving instruction reception means 23, the file data encryption and division means 24, and the upload means 25) only by operations at a customer terminal in which a fixed IP address is preregistered in node groups at specified bases in the consortium-type blockchain as terminal information for uploading to the first temporary storage area M1 using the upload means 25 as a portion of the system setting information.

(S5-3-3) Checking File Data Record Amount within a Period

When the file data distributed and recorded in the nodes located at each of the bases belonging to each of the distributed file management groups $\mathbf{101}_{1\ through\ m}$ (where m is an integer of 2 or more) and the recording devices located at multiple bases networked to the nodes at the bases exceeds the maximum file data record amount within a predetermined period, the periodical record amount checking means 45 requests to the customer a re-application procedure of the file data saving service contract. Then, in response to the request for the re-application procedure for the file data saving service contract, the periodical record amount checking means 45 processes as an error if the customer does not perform the re-application procedure.

(S5-3-4) Provision of Various Restrictions on File Data Restoration Process (S5-3-4-1) Reception of Settings for File Data Restoration Process Time Frame The restoration process time frame setting acceptance means 85 accepts settings of a time frame for file data restoration process, an IP address for performing restoration, a restorable period and the like from a customer who desires to restore the file data.

(S5-3-4-2) Authentication Code Setting Acceptance

The authentication code setting acceptance means 87 accepts a setting of an authentication code from a customer who desires to restore the file data.

(S5-3-4-3) File Data Restoration Process Operation Control

The file data restoration process operation control means 86 controls the file data extraction instruction reception means 81, the smart contract 82 for extracting encrypted server index information, the smart contract 83 for decrypting server index information, the smart contract 84 for extracting encrypted and divided file data, the download means 72, the file data restoration means 73, and the second data deletion means 74 only when authentication is received from the co-administrator, and only at a time frame when the restoration process time frame setting acceptance means 85 accepts the setting and only when the authentication code whose setting is accepted by the authentication code setting reception means 87 is accepted by the co-administrator of the consortium-type blockchain.

(S5-4) Process for Large File Data and Small Amount File Data (S5-4-1) Installation of Sub-Configuration File Server In the digital asset guard service provision system 1 of this embodiment, the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and the recording devices located at multiple bases networked to the nodes at the bases comprise file server groups accessible from:

- the multiple sub-configuration file servers $\mathbf{103}_{1\ through\ p}$ (where p is an integer of 2 or more) connecting to the nodes $\mathbf{102}_{1\ through\ mb}$ (where mb is an integer of 2 or more) at the bases and connecting to recording devices at multiple bases networked to the nodes at the bases respectively; or
- each of the nodes $\mathbf{102}_{1\ through\ mb}$ (where mb is (an integer of 2 or more) belonging to each of the distributed file management groups $\mathbf{101}_{1\ through\ m}$ (where m is an integer of 2 or more).

Furthermore, in the digital asset guard service provision system 1 of this embodiment, the nodes $\mathbf{102}_{1\ through\ mb}$ (where mb is (an integer of 2 or more) belonging to each of the distributed file management groups $\mathbf{101}_{1\ through\ m}$ (where m is an integer of 2 or more) and the recording devices located at multiple bases networked to the nodes at the bases comprise:

- the sub-configuration file servers $\mathbf{103}_{1\ through\ p}$ (where p is an integer of 2 or more) connecting to the nodes or recording devices; or
- recording media connecting to the sub-configuration file servers that may be increased in number.

(S5-4-2) Selection and Distributed Recording of Sub-Configuration File Servers Capable of Recording Large File Data Each of the distribution and recording smart contracts 32 checks data recording capacities of each of the sub-configuration file servers $\mathbf{103}_{1\ through\ p}$ (where p is an integer of 2 or more) connected to:

- the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more); and
- the recording devices at multiple bases networked to the nodes at the bases.

Then, each of the distribution and recording smart contracts 32 selects specified sub-configuration file servers that have recordable data storage capacities that are capable of recording large file data that are encrypted, multi-divided and uploaded into the first temporary storage area M1, based on the confirmed data recording capacities and usages. Then, each of the distribution and recording smart contracts 32 record the large file data that are encrypted, multi-divided and uploaded into the first temporary storage area M1 into the selected specified sub-configuration file servers. In addition to performing this process, each of the distribution and recording smart contracts 32 record, information of the specified sub-configuration file servers which are record destinations of the encrypted, multi-divided large file data that is uploaded into the first temporary storage area M1, into the nodes $\mathbf{102}_{1\ through\ mb}$ (where mb is an integer of 2 or more) at each of the bases belonging to each of the distributed file management groups $\mathbf{101}_{1\ through\ mb}$ (where m is an integer of 2 or more) as the second index information.

In addition, when the recorded capacity of the large file data exceeds the upper limit of the record capacity of the file server, the large file data being encrypted, multi-divided and uploaded into the first temporary storage area M1, and recorded in the predetermined sub-configuration file servers that are connected to the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and the recording devices located at multiple bases networked to the nodes at the bases, each of the distribution and recording smart contracts 32 calculates remaining recordable capacities of each of other sub-configuration file servers connected to the nodes $\mathbf{102}_{1\ through\ mb}$ (where mb is an integer of 2 or more) at each of the bases belonging to each of the distributed file management groups $\mathbf{101}_{1\ through\ mb}$ (where m is (an integer of 2 or more) and the recording devices located at multiple bases networked to the nodes at the bases, for the file data that exceeds the upper limit of the record capacity of the relevant file server.

Then, each of the distribution and recording smart contracts 32 selects the optimal record destination sub-configuration file servers based on the calculated remaining recordable capacities.

Then, each of the distribution and recording smart contracts 32 records the file data in excess of the upper limit of the record capacity of the file server in the selected sub-configuration file servers. At the same time as performing this process, each of the distribution and recording smart contracts 32 changes the settings to put the original file server in a dormant state. After performing that process, each of the distribution and recording smart contracts 32 records (updates) information of the record destination sub-configuration file servers as the second index information.

(S5-4-3) Process for Small Amount File Data

The small amount file data temporary recording means 100 records a small amount of file data in a predetermined confidential blockchain in real time within the range of block capacity.

The file data integration means 101 integrates each of the small amount of file data recorded in the predetermined confidential blockchain by the small amount file data temporary recording means 100 into one integrated file data by batch processes several times a day. Then, the file data integration means 101 transfers the integrated file data to the smart contract 21 having the encryption and division algorithm 21*a* (where, a is an integer greater than or equal to 1 and less than or equal to q) accepted by the encryption and division algorithm selection reception means 22 in the file data saving system 10. Then, the file data integration means 101 controls the transferred integrated file data to perform the saving process from the file data encryption and division to distribution and recording to the nodes $\mathbf{102}_{1\ through\ mb}$ (where mb is an integer greater than or equal to 2) at each of the bases belonging to the distributed file management groups $\mathbf{101}_{1\ through\ m}$ (where m is an integer of 2 or more) and the recording devices located at multiple bases networked to the nodes at the bases.

The small amount file data deletion means 102 sets a temporary safekeeping period of a predetermined number of days, for example, approximately seven days, for the file data integrated into one by the file data integration means 101 and for which the file data saving system 10 has completed the saving process for the integrated file data, among the file data recorded in the predetermined confidential blockchain by the small amount file data temporary recording means 100. Then, the small amount file data deletion means 102 cuts the chain of the corresponding block in the predetermined confidential blockchain after the temporary safekeeping period has elapsed. Then, the small amount file data deletion means 102 deletes the file data recorded in the block.

(S5-4-4) Restoration Process of Large File Data

The smart contract 84 for extracting encrypted and divided file data refers to the second index information recorded at the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more). Then, the smart contract 84 for extracting encrypted and divided file data detects the multiple sub-configuration file servers that are record destinations of the encrypted and multi-divided large file data, which is recorded as the referenced second index information, and extracts the file server data recorded in the sub-configuration file servers from the multiple sub-configuration file servers. Then, the smart contract 84 for extracting encrypted and divided file data links the extracted multiple file data and restores the file data to the original encrypted and divided large file data.

(S5-5) Collection and Distribution of Money Amounts Based on Total Record Amount of File Data Held by Node Holders and Provided File Data Record Capacity In addition, the digital asset guard service provision system 1 of the present embodiment cancels out a file data record capacity provided in a node held by a node holder participating in the consortium-type blockchain, and a file data record amount used by the node holder. Then, the differences between the total file data record amount and the provided file data record capacity are calculated. Then, the money amounts are collected and allotted to each node holder based on the differences.

(S5-6) Operating Time of Each Node

In the digital asset guard service provision system 1 of this embodiment, in any base belonging to each of the distributed file management groups $\mathbf{101}_{1\ through\ m}$ (where m is an integer of 2 or more), a node or recording device exists that is not connected to the Internet in an inactive state. Then, at the time of restart, the inactive node or recording device at the base accepts and records the encrypted and multi-divided file data recorded in an active node or recording device at other bases.

In addition, in the digital asset guard service provision system 1 of this embodiment, the nodes $\mathbf{102}_{1\ through\ mb}$ (where mb is an integer greater than or equal to 2) at each of the bases configuring each of the distributed file management groups $\mathbf{101}_{1\ through\ m}$ (where m is an integer of 2 or more) and the recording devices located at multiple bases networked to the nodes at the bases have different operating hours and are in a mixture of operating and inactive states. Then, all the nodes $\mathbf{102}_{1\ through\ mb}$ (where mb is an integer of 2 or more) at each of the bases configuring each of the distributed file management groups $\mathbf{101}_{1\ through\ m}$ (where m is an integer of 2 or more) and all the recording devices located at multiple bases networked to the nodes at the bases are in operation in 24 hours. And, the nodes $\mathbf{102}_{1\ through\ mb}$ (where mb is an integer greater than or equal to 2) at each of the bases configuring each of the distributed file management groups $\mathbf{101}_{1\ through\ m}$ (where m is an integer of 2 or more) and the recording devices located at multiple bases networked to the nodes at the bases operate, at a predetermined time point, within each of the distributed file management groups $\mathbf{101}_{1\ through\ m}$ (where m is an integer of 2 or more), the nodes $\mathbf{102}_{1\ through\ mb}$ (Where mb is an integer of 2 or more) of at least one of the bases or the recording devices of at least one of the bases networked to the nodes at the bases.

In addition, in the digital asset guard service provision system 1 of the present embodiment, the nodes $\mathbf{102}_{1\ through\ mb}$ (where mb is an integer of 2 or more) at each of the bases configuring each of the distributed file management groups and the recording devices located at multiple bases networked to the nodes at the bases operate only during nighttime hours using night-time power. Then, the nodes $\mathbf{102}_{1\ through\ mb}$ (where mb is an integer greater than or equal to 2) at each of the bases configuring each of the distributed file management groups and the recording devices located at multiple bases networked to the nodes at the bases operate, at a predetermined time point, within each of the distributed file management groups $\mathbf{101}_{1\ through\ m}$ (where m is an integer of 2 or more), the nodes $\mathbf{102}_{1\ through\ mb}$ (where mb is an integer of 2 or more) of at least one of the bases or the recording devices of at least one of the bases networked to the nodes at the bases.

In addition, the nodes $\mathbf{102}_{1\ through\ mb}$ (where mb is an integer of 2 or more) at each of the bases configuring each of the distributed file management groups and the recording devices located at multiple bases networked to the nodes at the bases automatically correct, when activated from the inactive states, information of safekept file data and the like to the latest information in each of the distributed file management groups $\mathbf{101}_{1\ through\ m}$ (where m is an integer of 2 or more).

Furthermore, more specified process flows for the digital asset guard service using the digital asset guard service provision system 1 of this embodiment are explained using FIG. 92A through FIG. 101. FIG. 92A through FIG. 93B are flowcharts showing flows of pre-registration process in other examples using the digital asset guard service provision system of this embodiment, FIG. 94 through FIG. 96 illustrate flowcharts showing flows of file data saving and file data upload processes in other examples using the digital asset guard service provision system of this embodiment, FIG. 97 through FIG. 100 illustrate flowcharts showing flows of file data restoration and download processes in other examples using the digital asset guard service provision system of this embodiment following the FIG. 99, and FIG. 101 is a flowchart showing a portion of a recovery process when the data is attacked in other examples using the digital asset guard service provision system of this embodiment, A. Pre-Registration Process Flow (FIG. 92A to FIG. 93B)

(Usage Application by Customer Company)

For example, a customer company applies to the consortium to use the digital asset guard service, as shown in FIG. 92A.

At this time, in the digital asset guard service provision system 1 of the present embodiment, the customer company performs a pre-registration application procedure for customer information via the customer registration information designation reception means 94 as a procedure corresponding to the above procedure.

(Usage Application Reception and Review by Consortium)

Next, the consortium confirms the details of the application from the customer company and conducts a review to determine whether the customer company may begin using the service.

At this time, in the digital asset guard service provision system 1 of the present embodiment, as a process corresponding to the above-mentioned process, the customer registration information designation reception means 94 accepts the customer company ID and designation of terminal information (fixed IP addresses and the like) used for saving and restoring the file data from the customer company desiring to use the digital asset guard service.

(Registration of Customer Company Information by Consortium)

Next, the consortium registers information on customer companies that use the digital asset guard service.

Examples of customer company information include customer company name, company ID and administrator information.

At this time, in the digital asset guard service provision system 1 of the present embodiment, as a process corresponding to the above-mentioned process, the smart contract 95 for customer registration encrypts and records the customer company ID and terminal information (fixed IP addresses and the like) used for file data saving and restoration accepted by the customer registration information designation reception means 94 in the node groups located at specified bases in the consortium-type blockchain.

(Master Registration of Customer Company Information by Consortium Side Application)

Next, the consortium side application registers the customer company information in the company information master.

(Sending Customer Company Information)

Next, the consortium sends the customer company information registered in the company information master to the customer company.

(Registration of User Information by Customer Company)

Next, the user who uses the digital asset guard service within the customer company enters a registration application for user information.

Examples of the user information include a user ID, user terminal information, that is, the user's private IP address.

At this time, in the digital asset guard service provision system 1 of this embodiment, the user performs a pre-registration application procedure for user information via the customer registration information designation reception means 94 as a procedure corresponding to the above procedure.

(Registration of User Information by Consortium Side Application)

Next, the consortium side application registers user information (user ID, user terminal information) based on input information from the user.

At this time, in the digital asset guard service provision system 1 of the present embodiment, as a process corresponding to the above-mentioned process, the customer registration information designation reception means 94 accepts the user ID and designations of terminal information (that is a fixed IP address and the like) used for the file data saving and restoration from the user. In addition, the smart contract 95 for customer registration encrypts and records the user ID and terminal information (fixed IP addresses and the like) used for saving and restoring the file data accepted by the customer registration information designation reception means 94 at node groups at specified bases in the consortium-type blockchain.

(Generation of Key Information by User)

Next, the user enters password information, for example, as shown in FIG. 93A.

The user-side application generates the first encryption key information K1 (the first public, that is the first encryption key K12, and the first secret key, that is the first offline decryption key K11). Then, the generated first encryption key information K1 (the first public key, that is the first encryption key K12, and the first secret key, that is the first offline decryption key K11) is displayed to the user. In this example, a first public, that is, a first encryption key K12 "ABC" and a first secret key, that is a first offline decryption key K11 "XYZ" are assumed to be generated.

(Safekeeping of Key Information by User)

Next, the user obtains the first encryption key information K1 (the first public key, that is the first encryption key K12, and the first secret key, that is the first offline decryption key K11) generated by the user application is safekept in an offline environment.

(Generation of Key Information by Consortium)

Next, the consortium enters password information.

The consortium side application generates the second encryption key information K2 (the second public key, that is, the second encryption key K22 and the second secret key, that is, the second decryption key K21) for each customer company. Then, the generated the second the second encryption key information K2 the second encryption key information K2 (the second public key, that is, the second encryption key K22 and the second secret key, that is, the second decryption key K21) is displayed on the consortium, and the information on the second public key, that is, the second encryption key K22 is updated. In this example, a second public key, that is, a second encryption key K22 "DEF" and a second secret key, that is, a second decryption key K21 "UVW" are assumed to be generated.

(Safekeeping Key Information by Consortium)

Next, the consortium safekeeps the second secret key (the second decryption key) K21 generated by the consortium side application offline.

B. File Data Save and File Data Upload Process Flow (FIG. 94 Through FIG. 96)

(Selection of Files to be Saved and Uploaded by the User)

The user selects files to be saved and uploaded, as shown in FIG. 94, for example.

(Saving of File Data Saving and Upload Information by Consortium Side Application)

Next, the consortium side application saves information related to the file data to be saved (customer company ID to which the user belongs, registered user information (user ID, user terminal information), file name, file size, update date, and the like).

The information related to the file data to be saved comprises, for example, such values as a customer company ID "K2222", a user ID "U1234567", a user IP address "222.123.456.789", a file name "kokyaku_file.csv", an update date "2023.02.22. 19:00" and a file size "1M".

(Designation of Various Parameters by the User)

Next, the user specifies the file division code P11, the file storage code P12, and the first encryption key information K1 (the first public key, that is the first encryption key K12).

Various parameters are input, for example, a division parameter P11 "1234", a file storage code P12 "5678", and a first encryption key information K1 (a first public key, that is a first encryption key K12) "ABC".

At this time, in the digital asset guard service provision system 1 of the present embodiment, as a process corresponding to the above-mentioned process, the first parameter designation reception and recording means 96 accepts the first parameter P1 from the user who desires to save the file data. The first parameter for which the designation is accepted is recorded in an offline recording medium.

(Selection of Secret Sharing Application by User Side Application)

Next, the user-side application selects a secret sharing application based on the division parameter input by the user.

At this time, in the digital asset guard service provision system 1 of this embodiment, as a process corresponding to the above-mentioned process, the encryption and division algorithm selection reception means 22 accepts a selection of the first the program or smart contract 21 having predetermined encryption and division algorithm 21*a* (where a is an integer from 1 through q) based on the division code P11 in the parameter P1 designated by the user who desires to save the file data.

(Request by User to Save and Upload File Data)

Next, the user requests the consortium to save and upload file data, for example, as shown in FIG. 95.

At this time, in the digital asset guard service provision system 1 of the present embodiment, as a procedure corresponding to the above procedure, the user sends an instruction to save the file data that the user desires to save via the file data saving instruction reception means 23.

(File Data Division and Encryption Using Secret Sharing Technologies by User Side Application)

Next, the user-side application divides and encrypts the file data using the first public key, that is the first encryption key K12 in the secret sharing process by the secret sharing application selected based on the file division code P11.

At this time, in the digital asset guard service provision system 1 of the present embodiment, as a process corresponding to the above-mentioned process, the file data encryption and division means 24 encrypts and multi-divides the user's file data to be saved that is accepted by the file data saving instruction reception means 23 using the program or smart contract 21 having the encryption and division algorithm 21*a* (where a is an integer between 1 and q) accepted by the encryption and division algorithm selection reception means 22 based on the first public key, that is the first encryption key K12.

Next, the user-side application transfers the divided and encrypted file data and parameter information to the consortium side.

For example, the name of the file data is changed from the file name "kokyaku_file.csv" to "206bc3f134b8 . . . ", "09f504689f32c . . . ", "a66a50321cd5, . . . " after division and encryption.

At this time, in the digital asset guard service provision system 1 of this embodiment, as a process corresponding to the above-mentioned process, the upload means 25 uploads each of the file data encrypted and divided by the file data encryption and division means 24 to the first temporary storage area M1.

(File Format and Name Change, Allotment, Distribution and Recording Processes of File Data by the Consortium Side System)

Next, the consortium side system performs the file format and name change, allotment, distribution and recording processes of the divided and encrypted file data.

For details, a smart contract that performs file format and name change and allotment process and a smart contract that performs distribution and recording are selected in the consortium side system based on the file storage code P12 specified by the user and the parameter P2 specified by the consortium.

The smart contract that performs file format and name change and allotment process encrypts the file name of the divided and encrypted file data using the second public key, that is the second encryption key K22.

Next, the smart contract that performs file format and name change and allotment process determines the file management group that is the target of distribution and recording.

For example, each of the distributed file management groups is selected and allotted as follows.

When there are six distributed file management groups A to F, when a decentralized registration pattern "4" is selected from the file storage code P12 "5678" specified by the user and a parameter P2 "9876" specified by the consortium, the file data is allotted to distributed file management groups A, B, D, E, and F.

| | | Decentralized registration pattern | | | | |
|---|---|---|---|---|---|---|
| | | 1 | 2 | 3 | 4 | 5 |
| Distributed file management group | A | ○ | | ○ | ○ | ○ |
| | B | ○ | ○ | | ○ | ○ |
| | C | ○ | ○ | ○ | | ○ |
| | D | ○ | ○ | ○ | ○ | |
| | E | ○ | ○ | ○ | ○ | ○ |
| | F | | ○ | ○ | ○ | ○ |

At this time, in the digital asset guard service provision system 1 of the present embodiment, as a process corresponding to the above-mentioned process, the smart contract 31 for allotting distributed file management groups allots each file data (encrypted and multi-divided by the file data encryption and division means 24 and) uploaded into the first temporary storage area M1 by the upload means 25 to the multiple distributed file management groups $\mathbf{101}_{1\ through\ m}$ (where mb is an integer of 2 or more), (which are configured with the nodes at multiple bases configured for the planets $\mathbf{100}_{1\ through\ n}$ (where n is an integer of 2 or more) set on the co-administrator side according to conditions specified by the customer, and the recording devices located at multiple bases networked to the nodes at the bases), based on the first parameter P1 and the second parameter P2 specified by the co-administrator of the consortium-type blockchain.

In addition, before allotting to the multiple distributed file management groups $\mathbf{101}_{1\ through\ m}$ (where m is an integer of 2 or more), the smart contract 31 for allotting distributed file management groups changes, the file formats and names of each file data (encrypted and multi-divided by the file data encryption and division means 24 and) uploaded into the first temporary storage area M1 by the upload means 25, into predetermined file formats and names.

The smart contract that performs distribution and recording calculates the hash values of each file data targeted for distribution and recording according to rules defined in the smart contract, and distributes and records (stores) to nodes at each base belonging to the distributed file management groups.

Examples of hash values for each file data subject to distribution and recording are shown below.

| Original file name | Stored file hash value |
|---|---|
| 206bc3f134b8... | 65363a91bd082... |
| 09f504689f32c... | c798ec1dc32781... |
| a66a50321cd5... | 7d1b5ca80464e7... |

At this time, in the digital asset guard service provision system 1 of the present embodiment, as a process corresponding to the above-mentioned process, the distribution and recording smart contract 32 distributes and records each file data allotted by the smart contract 31 for allotting distributed file management groups to the nodes $\mathbf{102}_{1\ through\ mb}$ (where mb is an integer of 2 or more) at each of the bases belonging to each of the corresponding distributed file management groups $\mathbf{101}_{1\ through\ m}$ (where m is an integer of 2 or more) and the recording devices located at multiple bases networked to the nodes at the bases.

In addition, parameters by the consortium are specified, entered and registered associated with the company ID upon registering prior customer company information, or entered and registered at the timing of receiving a request from the user to the consortium for file data saving and file data uploading.

At this time, in the digital asset guard service provision system 1 of the present embodiment, as a process corresponding to the above-mentioned process, the second parameter designation reception and setting means 97 accepts designation of the second parameter from the co-administrator of the consortium-type blockchain, sets and modularizes the designated second parameter P2 to a source code of the predetermined smart contract that performs the corresponding process.

(Registration of Index Information by Consortium Side System)

Next, the consortium side system registers the index information of the distributed and registered file data in the blockchain, for example, as shown in FIG. 96.

The registered contents include, for example, user information (the customer company information, registered user ID, user IP address at the time of registration, and the like), file information (the original file name "kokyaku_file.csv", original file update date "2023.02. 22.19:00", file size "1M"), parameter information (the file division code P11 "1234", the file storage code P12 "5678", the consortium specified parameter P2 "9876"), file configuration elements (the file name and hash value at the time of secret sharing process, and distributed file management group information).

The file configuration elements registered as index information are configured with, for example, the following data.

| Original file name | Stored file hash value | Distributed file management group |
|---|---|---|
| 206bc3f134b8... | 65363a91bd082... | A |
| 09f504689f32c... | c798ec1dc32781... | B |
| a66a50321cd5... | 7d1b5ca80464e7... | D |

Additionally, the following distributed record information in the distributed file management group is also registered as index information.

| Stored file hash value | data area |
|---|---|
| 65363a91bd082... | file data |
| c798ec1dc32781... | file data |
| 7d1b5ca80464e7... | file data |

At this time, in the digital asset guard service provision system 1 of the present embodiment, as a process corresponding to the above-mentioned process, the smart contract 33 for generating server index information generates file name information of each file data distributed and recorded by each of the distribution and recording smart contracts 32 and server index information that comprises configuration information of each of the distributed file management groups to which each file data is allotted.

The smart contract 34 for recording server index information encrypts the server index information generated by the Smart contract 33 for generating server index information and records at the node groups located at specified bases in the consortium-type blockchain based on the second public key (the second encryption key) K22 generated by the co-administrator of the consortium-type blockchain.

In addition, the smart contractor or program 27 having a wallet function for generating customer index information generates customer index information that comprises information on the original file name and an upload date of the file data to be saved.

The smart contract 28 for recording customer index information encrypts the customer index information generated by the smart contractor or program 27 having a wallet function for generating customer index information, and records at the node groups located at the specified bases in the consortium-type blockchain.

In addition, the smart contract 98 for generating and recording the system setting information generates and encrypts information that identifies the destination, such as terminal information (fixed IP addresses and the like) when uploaded into the first temporary storage area M1 using the upload means 25, a number of the predetermined smart contract that performs the corresponding process of the file data to be recorded, the information of the planet to which the file data to be recorded belongs, and the system setting information including information on file server groups at the nodes at predetermined bases and the recording devices located at multiple bases networked to the nodes at the bases configuring the distributed file management group, and records at the node groups at the specified bases in the consortium-type blockchain.

In addition, the smart contract or program 99 having a wallet function for generating customer setting information generates customer setting information having setting information of the first parameter P1 associated with the program or smart contract 21 having the encryption and division algorithm 21*a* (where a is an integer between one and q) accepted by the encryption and division algorithm selection reception means 22.

(File Saving Completion Process by the Consortium Side System)

Next, the consortium side system notifies the user that the file saving is complete.

(Confirmation of File Data Saving Results by User)

Next, the user confirms the file data saving results.

(Offline Safekeeping of Secret Key Information and Parameter Information by Users)

Next, the user saves the information of the first secret key, that is, the first offline decryption key K11 and the information of the file division code P11 in a storage medium or the like, and safekeeps in an offline environment.

C. File Data Restoration and Download Process (FIG. 97 Through FIG. 100)

(Obtaining File Data Restoration and Download Information by Users)

For example, as shown in FIG. 97, the user obtains information regarding the stored first secret key, that is, the first offline decryption key K11 and information regarding the file division code P11.

At this time, in the digital asset guard service provision system 1 of the present embodiment, as a procedure corresponding to the above procedure, the customer requests to the security company to provide the program having the decryption and linkage algorithms, and the first secret key, that is, the first offline decryption key K11.

(Request for Authentication of File Data Restoration and Download by User)

Next, the user requests the consortium to approve the file data restoration and download. At this time, the user to operate, the IP address of the terminal to be downloaded and the scheduled download implementation time are entered.

The contents of the file data restoration and download request include, for example, a customer company ID "K22222", a downloading user "U567891", an IP address "222123456123", a scheduled download date and time and the like.

(Reception of Authentication Requests for File Data Restoration and File Data Download by Consortium Side Application)

Next, the consortium side application accepts a request for authentication of file data restoration and download from the user, and registers in the reception file, request information (the customer company ID "K22222", download user "U567891", IP address "222123456123", scheduled download date and time, and the like.).

At this time, in the digital asset guard service provision system 1 of the present embodiment, as a process corresponding to the reception of the above-mentioned scheduled download date and time, the restoration process time frame setting acceptance means 85 accepts a request from a customer who desires to restore the file data, settings such as the time frame for the file data restoration process, the IP address for restoration, and the restorable period.

Further, the authentication code setting reception means 87 accepts an authentication or license code setting from a customer who desires to restore the file data.

(Authentication of File Data Saving and File Data Upload by Consortium)

Next, the consortium selects and approves the second secret key, that is, the second decryption key K21 "UVW" corresponding to the target company from the file data restoration and download request information.

(Authentication of File Data Restoration and File Data Download by Consortium Side Application)

The consortium side application updates the file data restoration (file data download) request information to "approved" and enables the following functions.

Enable download path (with expiration date)

Setting the smart contract for file data restoration to a startable state (with expiration date)

Setting the decryption and linkage application using secret sharing technologies to an operable state (with expiration date)

For example, file data restoration and download request information (the customer company ID "K22222", download user "U567891", IP address "222123456123", scheduled download date and time, and the like.), authentication status update to "Approved".

At this time, in the digital asset guard service provision system 1 of the present embodiment, as a process corresponding to the above-mentioned process, the file data restoration process operation control means 86 controls to operate the file data extraction instruction reception means 81, the smart contract 82 for extracting encrypted server index information, the smart contract 83 for decrypting server index information, the smart contract 84 for extracting encrypted and divided file data, the download means 72, the file data restoration means 73, and the second data deletion means 74, only in the time frame whose setting is accepted by the restoration process time frame setting acceptance means 85 and when the authentication code setting accepted by the authentication code setting reception means 87 is approved by the co-administrator of the consortium-type blockchain.

(User's Request to Obtain Saved File Data List Information)

Next, as shown in FIG. 98, the user inputs the customer company ID, a download target file name, and file save date, and requests the consortium to obtain save file data list information.

For example, the customer company ID "K22222", the download target file name "kokyaku*", and file save dates "2023.01.01-2023.12.31" are input.

(Obtaining Saved File Data List Information by Consortium)

Next, the consortium checks whether the acquisition request information in the saved file data list information matches the file data download authentication request reception information.

Using the requested customer company, file name and date of decentralized registration as search keys, the index information of the file data corresponding to the search conditions is obtained from the blockchain.

(Editing and Outputting Saved File Data List Information by Consortium)

Next, the consortium edits and outputs the acquired saved file data list information.

The saved file data list information comprises, for example, a file name and a date of decentralized registration, and is displayed on the user terminal.

(Selection and Retrieval Request of File to be Saved by User)

Next, the user selects the file to be downloaded whose file data is desired to be restored from the saved file data list information edited and displayed as a list, inputs the parameter information necessary for downloading, and submits the request to the consortium to retrieve the file.

For example, the target file name "kokyaku_file.csv" is selected and the division parameter "1234" and the first secret key, that is, the first offline decryption key K11 "XYZ" used for decryption and linkage are input.

At this time, in the digital asset guard service provision system 1 of the present embodiment, as a process corresponding to the above-mentioned process, the file data extraction instruction reception means 81 accepts a file data extraction instruction from a customer who desires to restore the file data.

(Reading Index Information by Application on the Consortium Side)

Next, the application on the consortium side reads the index information of the file to be downloaded from the blockchain.

For example, the file configuration elements are read from the customer company ID "K22222", the file name "kokyaku_filecsv", and the decentralized registration date and time "2022.02.22.19:00:00".

The file configuration elements read as index information is configured with, for example, the following data.

| Original file name | Stored file hash value | Distributed file management group |
|---|---|---|
| 2 0 6 b c 3 f 1 3 4 b 8 . . . | 6 5 3 6 3 a 9 1 b d 0 8 2 . . . | A |
| 0 9 f 5 0 4 6 8 9 f 3 2 c . . . | c 7 9 8 e c 1 d c 3 2 7 8 1 . . . | B |
| a 6 6 a 5 0 3 2 1 c d 5 . . . | 7 d 1 b 5 c a 8 0 4 6 4 e 7 . . . | D |

At this time, in the digital asset guard service provision system 1 of the present embodiment, as a process corresponding to the above-mentioned process, the smart contract 82 for extracting encrypted server index information extracts encrypted server index information (recorded in node groups at specified bases in the consortium-type blockchain by the smart contract 34 for recording server index information) based on:

- the first parameter P1 associated with the file data to be extracted that is accepted by the file data extraction instruction reception means 81 or the first compound parameter P1X (comprising a pair of the first decryption parameter P1X1 that is specified by a customer and managed offline, and the first encryption parameter P1X2 that is automatically generated from the first decryption parameter P1X1); and
- the second parameter P2 or the second compound parameter P2X (comprising a pair of the second decryption parameter P2X1 that is specified by a co-administrator and managed offline (which is incorporated and modularized within the predetermined smart contract that performs a corresponding process), and the second encryption parameter P2X2 that is automatically generated from the second decryption parameter P2X1 (which is incorporated and modularized within the predetermined smart contract that performs a corresponding process)).

In addition, the smart contract 83 for decrypting server index information decrypts the encrypted server index information extracted by the smart contract 82 for extracting encrypted server index information based on the second secret key, that is, the second decryption key K21 generated by the co-administrator of the consortium-type blockchain, or the second decryption parameter P2X1 specified by the co-administrator and managed offline (incorporated and modularized in the predetermined smart contract that performs the corresponding process).

(Check Download Request Information by Consortium Side Application)

Next, the consortium-side application checks whether the acquisition request information in the file information list matches the file data download authentication request reception information.

For example, the consortium-side application checks whether the consortium-side application checks the following information matches.

The customer company ID "K22222", download user "U567891", IP address "222123456123", scheduled download date and time authentication status "Approved"

(Extraction of File Data to be Restored, Restoration of Changed File Format and Name by Consortium Application)

Next, for example, as shown in FIG. 99, the consortium side application extracts file data distributed and recorded at the nodes at multiple bases belonging to each of the distributed file management groups and the recording devices located at multiple bases networked to the nodes at the bases based on the contents of file configuration elements in the index information listed in the blockchain.

The consortium side application checks whether the file data restoration and download authentication request reception information is approved, whether the file storage code P12 and consortium designation parameter P2 are set, and whether an IP address of a user terminal that requested the retrieval (download) of the saved file is the same as the IP address when accepted the file data restoration and download request, as activation conditions for the smart contract for extracting file data.

Based on the file storage code P12 "5678" and the consortium specified parameter P2 "9876" recorded in the blockchain, a smart contract for extracting the file data is selected.

A smart contract that extracts file data retrieves distributed and recorded files based on the contents of file configuration elements recorded in the blockchain.

For more details, the smart contract that extracts the file data whose file formats and names are changed which are distributed and recorded in the distributed file management groups using stored file hash value as a key.

Next, the smart contract that extracts the file data restores the extracted file data from the changed file formats and names to the original file formats and names using the second secret key, that is, the second decryption key K21 "UVW".

These file data extraction and file format and name restoration are repeated according to the number of file data allotted to the distributed file management groups.

At this time, in the digital asset guard service provision system 1 of the present embodiment, as a process corresponding to the above-mentioned process, the smart contract 84 for extracting encrypted and divided file data extracts each encrypted and multi-divided file data (allotted to each of the distributed file management groups $\mathbf{101}_{1\ through\ m}$ (where m is an integer of 2 or more) by the smart contract 31 for allotting distributed file management groups, and distributed and recorded in the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and the recording devices located at multiple bases networked to the nodes at the bases by each of the distribution and recording smart contracts 32), from any nodes at each of the bases belongs to each of the distributed file management groups $\mathbf{101}_{1\ through\ m}$ (where m is an integer of 2 or more) and the recording devices located at multiple bases networked to the nodes at the bases, using the server index information decrypted by the smart contract 83 for decrypting server index information.

In addition, the smart contract 84 for extracting encrypted and divided file data changes the file formats and names of each extracted file data to the original file formats and names after extracting each file data that is encrypted and multi-divided.

Secret Sharing (Linkage and Decryption) by User-Side Applications

Next, the user's system restores the file to be restored using the division parameter P1 "1234" specified by the user and the first secret key, that is, the first offline decryption key K11 "XYZ" input by the user.

For example, the original file data "kokyaku_file.csv" is restored by secret sharing (decryption and linkage). from the divided and encrypted file data "206bc3f134b8 . . . ", "09f504689f32c . . . " and "a66a50321cd5 . . . " restored to the original file formats and names.

At this time, in the digital asset guard service provision system 1 of the present embodiment, as a process corresponding to the above-mentioned process, the download means 72 downloads each of the encrypted and multi-divided file data extracted by the smart contract 84 for extracting encrypted and divided file data, to the second temporary storage area M2.

The file data restoration means 73 decrypts each of the encrypted and multi-divided file data (extracted by the smart contract 84 for extracting encrypted and divided file data) and downloaded to the second temporary storage area M2 by the download means 72 based on the first secret key, that is, the first offline decryption key K11 generated by the customer, and links each of the decrypted file data to one file data, using the program or smart contract 71alpha (where alpha is an integer between 1 and q) having decryption and division algorithms associated with the program or smart contract 21 having the encryption and division algorithm 21*a* (where a is an integer from 1 through q) accepted by the encryption and division algorithm selection reception means 22.

Download Screen Display by User Application

Next, the user-side application displays on the screen of the user terminal that the file data to be restored may be downloaded, as shown in FIG. 100, for example.

Request by User to Download File Data

Next, the user requests downloading of the file data to be restored.

Downloading by the User Application

The user-side application downloads the restored file data.

D. Recovery Process in Case of Data Being Attacked (FIG. 101)

Checking Damage File Data by the Consortium Side System

Next, as shown in FIG. 101, the consortium side system periodically (for example, monthly) performs a damage check on the distributed and recorded file data using a batch process.

Reading Index Information Recorded in a Blockchain

The consortium side system reads the index information recorded in a blockchain and obtains the following information.

- User information (customer company information (company ID), user ID (registered user ID), IP address (user IP address at the time of registration), registration date and time and the like.
- File information (original file name "kokyaku_file.csv", original file update date "2023.02.22.19:00", file size "1M")
- Parameter information (division parameter "1234", storage parameter "5678", consortium specified parameter "9876"), file configuration elements (file name and hash value at the time of secret sharing process, distributed file management group information)

For example, the file configuration elements are configured with the following data.

| Original file name | Stored file hash value | Distributed file management group |
|---|---|---|
| 206bc3f134b8... | 65363a91bd08 2... | A |
| 09f504689f32 c... | c798ec1dc3278 1... | B |
| a66a50321cd5... | 7d1b5ca80464e 7... | D |

Reading and Checking Distributed and Recorded Files

Next, the consortium side system checks the distributed and recorded file data based on the contents of the index information recorded in the blockchain.

For more details, the consortium side system reads the distributed and recorded file data using the stored file hash value in the index information recorded in the blockchain as a key.

Next, the consortium side system calculates the hash value of the read file data, compares it with the stored file hash value in the index information, and checks whether there is any change. Then, the changed file data is detected as damaged file data.

Storage File Hash Value in Index Information

| Stored file hash value | data area |
|---|---|
| 65363a91bd082... | File data-1 |
| c798ec1dc3278 1... | File data 2 |
| 7d1b5ca80464e 7... | File data 3 |

At this time, in the digital asset guard service provision system 1 of the present embodiment, as a process corresponding to the above-mentioned process, the data falsification check control means 43 calculates hash values based on the encrypted and multi-divided file data recorded in the nodes $\mathbf{102}_{1\ through\ mb}$ (where mb is an integer of 2 or more) at each of the bases belonging to each of the distributed file management groups $\mathbf{101}_{1\ through\ mb}$ (where m is an integer greater than or equal to 2 or more) and the recording devices located at multiple bases networked to the nodes at the bases. Then, the data falsification check control means 43 records the calculated hash value in the block. Further, the data falsification check control means 43 constantly compares the hash values recorded in the blocks in the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and hash values in the recording devices located at multiple bases networked to the nodes at the bases.

When the data falsification check control means 43 performs the comparison process and detects a difference between a hash described in a block in a specified node or recording device and a hash described in a block in another node or recording device, the data falsification check control means 43 detects that the encrypted and multi-divided file data recorded in the specified node or recording device is tampered with or destroyed, excludes the node or recording device from the target of the save process, (and deletes the block at the specified nodes or recording device). Along with performing the process, the data falsification check control means 43 notifies an alarm to the operator of the node and the co-administrator of the consortium-type blockchain.

Form Output of Damage File Data

Next, the consortium side system outputs the detected damaged file data out of the distributed and recorded file data in a form.

In addition, in the digital asset guard service provision system 1 of the present embodiment, as described above, the data destructive attack detection means 91 detects:

the existence of an attack on the encrypted and multiple-divided file data recorded at the nodes $\mathbf{102}_{1\ through\ mb}$ (where mb is an integer of 2 or more) at any base configuring the planets $\mathbf{100}_{1\ through\ n}$ (where n is an integer of 2 or more) or the recording devices; or a data destruction situation due to equipment failure.

The data destructive attack detection means 91 determines that a data destructive attack is taking place when, for example, the destruction of multiple file data managed in a certain period of time, such as 30 minutes, 8 hours, or 24 hours, is detected.

Furthermore, when the data destructive attack detection means 91 detects an attack against the encrypted and multi-divided file data, the automatic data saving means 92 upon being attacked deactivates the nodes $\mathbf{102}_{1\ through\ mb}$ (where mb is an integer of 2 or more) at each of the bases configuring the planets and the recording devices located at multiple bases networked to the nodes at the bases, or forcibly disconnects the Internet connections.

In addition to performing the process, the automatic data saving means 92 upon being attacked sets another network and automatically saves, the encrypted and recorded file data distributed and recorded in nodes at bases that are not attacked or the recording devices located at multiple bases networked to the nodes at the bases, to the nodes $\mathbf{102}_{1\ through\ mb}$ (where mb is an integer of 2 or more) at each of the bases configuring other planets in which attacks against the encrypted and recorded file data are not detected by the data destructive attack detection means 91 and the recording devices located at multiple bases networked to the nodes at the bases.

In addition, when the data destructive attack detection means 91 detects an attack against the encrypted and multi-divided file data, the automatic data saving means 92 upon being attacked automatically saves encrypted and multi-divided file data distributed and recorded in the nodes $\mathbf{102}_{1\ through\ mb}$ (where mb is an integer greater than or equal to 2) at a base configuring the planet not attacked and the recording devices located at multiple bases networked to the nodes at the base, into the nodes $\mathbf{102}_{1\ through\ mb}$ (where mb is an integer greater than or equal to 2) at each of the bases configuring other plane in which no encrypted and multi-divided file data is not attacked and into the recording devices located at multiple bases networked to the nodes at the bases via a communication means separate from the Internet such as an LTE and the like.

Furthermore, when the data destructive attack detection means 91 detects an attack against the encrypted and multiple-divided file data, the communication switching control means 93 maintains the deactivated state in which the nodes in the deactivated state and the recording devices at multiple bases that are networked to the nodes at the bases are disconnected from the Internet connection, and switches to a connection with a means of communication such as LTE that is different from the Internet.

Effects of the Digital Asset Guard Service Provision System of this Embodiment

The digital asset guard service provision system 1 of the present embodiment is configured to "comprise consortium-type blockchains configured to comprise the multiple planets $\mathbf{100}_{1\ through\ n}$ (where n is an integer of 2 or more) (one unit configuring the blockchain) that are configured with node groups in which the nodes $\mathbf{102}_{1\ through\ mb}$ (where mb is an integer of 2 or more) at multiple bases in different regions in the world are combined, the nodes $\mathbf{102}_{1\ through\ mb}$ (where mb is an integer of 2 or more) at each of the bases networks to the recording devices located at multiple bases in different regions in the world to construct the distributed file management groups $\mathbf{101}_{1\ through\ m}$ (where m is an integer of 2 or more)", "the customer file data to be saved is multi-divided", and "each of the multi-divided file data are distributed and recorded in the nodes $\mathbf{102}_{1\ through\ mb}$ (where mb is an integer of 2 or more)" at each of the bases belonging to the distributed file management groups $\mathbf{101}_{1\ through\ m}$ (where m is an integer of 2 or more) and the recording devices located at multiple bases networked to the nodes at the bases". Accordingly, even if a node at a base belonging to the distributed file management group or a recording device networked to the node is attacked by electromagnetic pulses and the divided customer file data to be saved is lost, the nodes located at other bases belonging to the distributed file management groups or the recording devices networked to the nodes may be protected from the attacks and the file data may be preserved.

Further, according to the digital asset guard service provision system 1 of the present embodiment, the file data saving system 10 is configured with:

"the multiple programs or smart contracts $\mathbf{21}_{1\ through\ q}$ (where q is an integer of 10 or more) having multiple encryption and division algorithms that have different file data encryption and division process methods";

"the encryption and division algorithm selection reception means 22 accepting a selection by the program or smart contract 21 having predetermined encryption and division algorithm 21*a* (where a is an integer between 1 and q) based on the first parameter P1 specified by the customer who desires to save the file data";

"file data encryption and division means 24 for encrypting and dividing into multiple files that encrypts and multi-divides customer file data to be saved using the program or smart contract 21 having the encryption and division algorithm 21*a* (where a is an integer from 1 through q) accepted by the encryption and division algorithm selection reception means 22";

"the smart contract 31 for allotting distributed file management groups which is configured to have a function for allotting, each file data encrypted and multi-divided by the file data encryption and division means 24 and uploaded to the first temporary storage area M1 by the upload means, to the multiple distributed file management groups $\mathbf{101}_{1\ through\ m}$ (where m is an integer of 2 or more) configured with the nodes $\mathbf{102}_{1\ through\ mb}$ (where mb is an integer of 2 or more)" at each of the bases configuring for the planets $\mathbf{100}_{1\ through\ n}$ (where n is an integer of 2 or more) set on the co-administrator side in a customer specified condition and to the recording devices located at multiple bases networked to the nodes at the bases, based on the first parameter P1 and the second parameter P2 specified by the co-administrator of the consortium-type blockchain "; and "the distribution and recording smart contract 32 that has a function for distributing and recording each file data allotted by the smart contract 31 for allotting distributed file management groups to the nodes $\mathbf{102}_{1\ through\ mb}$ (where mb is an integer of 2 or more) at each of the bases belonging to each of the corresponding distributed file management groups $\mathbf{101}_{1\ through\ m}$ (where m is an integer of 2 or more) and to the recording devices located at multiple bases networked to the nodes at the bases". Accordingly, the customer's file data may be saved with a strong attack resistance against cyber attacks by quantum computers, as follows.

(XX1) The customer file data to be saved is encrypted and multi-divided. Therefore, in order to decrypt the contents of the file data, a malicious third party would have to decipher the encrypted and multi-divided file data and integrate the file data into one.

(XX2) Encryption and multiple divisions of the customer file data are performed by the program or smart contract 21 having predetermined encryption and division algorithm 21*a* (where a is an integer between 1 and q) selected based on the first parameter P1 specified by the customer among the multiple programs or smart contracts $\mathbf{21}_{1\ through\ q}$ (where q is an integer of 10 or more) having multiple encryption and division algorithms. Accordingly, in order to decrypt and integrate encrypted and multi-divided file data into one, a malicious third party would have to identify the program or smart contract having encryption and division algorithms selected for encryption and multiple divisions.

(XX3) In order to identify the program or smart contract having encryption and division algorithms selected for encryption and multiple divisions, a malicious third party would have to comprehend the content of the first parameter specified by the customer.

(XX4) Each file data encrypted and multi-divided by the file data encryption and division means 24 and uploaded into the first temporary storage area M1 by the upload means is allotted by the smart contract 31 for allotting distributed file management groups to the multiple distributed file management groups configured with nodes at multiple bases configured for the planets $\mathbf{100}_{1\ through\ n}$ (where n is an integer of 2 or more) set on the co-administrator side according to the conditions specified by the customer, and with the recording devices located at multiple bases networked to the nodes at the bases. Therefore, a malicious third party would have to comprehend that each encrypted and multi-divided file data that is uploaded to the first temporary storage area M1 is allotted, by the smart contract 31 for allotting distributed file management groups, to which of the multiple distributed file management groups configured with the nodes at the multiple bases configured for which planet and the recording devices located at multiple bases networked to the nodes at the bases.

(XX5) The allotment, of each file data encrypted and multi-divided by the file data encryption and division means 24 and uploaded into the first temporary storage area M1 by the upload means by the smart contract 31 for allotting distributed file management groups, to the multiple distributed file management groups configured with the nodes at the multiple bases configured for the planet set on the co-administrator side according to conditions specified by the customer, and with the recording devices located at multiple bases networked to the nodes located at the bases, is based on the first parameter P1 specified by the customer and the second parameter P2 specified by the co-administrator of the consortium-type blockchain. Therefore, a malicious third party would have to comprehend the content of the second parameter P2 specified by the co-administrator of the consortium-type blockchain in addition to the first parameter specified by the customer in order to comprehend that each encrypted and multi-divided file data uploaded into the first temporary storage area M1 by the upload means is allotted to which of the multiple distributed file management groups configured with the nodes at the multiple bases configured for which planet and the recording devices located at multiple bases networked to the nodes located at the bases.

(XX6) Furthermore, it is necessary to comprehend that the allotment destination by the smart contract 31 for allotting distributed file management groups is determined by the first parameter P1 and the second parameter P2.

Execution of the above-mentioned steps (XX1) through (XX6) becomes almost impossible by safekeeping offline the first parameter P1 specified by the customer and the second parameter P2 specified by the co-administrator of the consortium-type blockchain, respectively, even if a quantum computer is used.

Further, according to the digital asset guard service provision system 1 of the present embodiment, the file data saving system 10 is configured to further comprise:

"the smart contract 33 for generating server index information that has a function for generating server index information that comprises the file name information of each of the file data distributed and recorded by each of the distribution and recording smart contracts 32 and the configuration information of each of the distributed file management groups to which each file data is allotted"; and "the smart contract 34 for recording server index information that has a function for encrypting the index information generated by the smart contract 33 for generating server index information, and recording into the node groups located at the specified bases in the consortium-type blockchain". Accordingly, the file data saving system 10 may further strengthen the attack resistance against cyberattacks by quantum computers and save customer file data.

(XX7) The above index information generated by the smart contract 33 for generating server index information is information necessary for decrypting the data, however is encrypted by the smart contract 34 for recording server index information. Therefore, a malicious third party would have to decrypt the encrypted server index information.

(XX8) Also, in order to decrypt the encrypted server index information, a malicious third party would have to decipher the process contents used for the encryption.

(XX9) Server index information is recorded in the node groups located at the specified bases in the consortium-type blockchain, however in the consortium (co-administrator), the information recorded in the node groups located at the specified bases is encrypted. For this reason, one can't figure out what kind of information it is. A malicious third party would have to identify information that the consortium may not comprehend as server index information of the predetermined customer file data.

Therefore, even if a quantum computer is used, executing all steps of (XX7) through (XX9) in addition to (XX1) through (XX6) above is impossible.

Further, according to the digital asset guard service provision system 1 of the present embodiment, the file data restoration system 60 is configured with:

the smart contract 82 for extracting encrypted server index information having a function for extracting encrypted server index information (recorded in node groups at specified bases in the consortium-type blockchain by the smart contract 34 for recording server index information) based on, the first parameter P1 or the first compound parameter P1X (comprising a pair of the first decryption parameter P1X1 that is specified by a customer and managed offline, and the first encryption parameter P1X2 that is automatically generated from the first decryption parameter P1X1), and the second parameter P2 or the second compound parameter P2X (comprising a pair of the second decryption parameter P2X1 that is specified by a co-administrator and managed offline (which is incorporated and modularized within the predetermined smart contract that performs a corresponding process), and the second encryption parameter P2X2 that is automatically generated from the second decryption parameter P2X1 (which is incorporated and modularized within the predetermined smart contract that performs a corresponding process));

the smart contract 83 for decrypting server index information having a function for decrypting encrypted server index information extracted by the smart contract 82 for extracting encrypted server index information; and the smart contract 84 for extracting encrypted and divided file data that is configured to have a function for extracting each encrypted and multi-divided file data allotted to each of the distributed and file management groups $\mathbf{101}_{1\ through\ m}$ (where m is an integer of 2 or more) by the smart contract 31 for allotting distributed file management groups and distributed and recorded in the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and in the recording devices at multiple bases networked to the nodes at the bases by each of the distribution and recording smart contracts 32, from any of the nodes located at each of the bases belonging to the each of the distributed file management groups $\mathbf{101}_{1\ through\ m}$ (where m is an integer of 2 or more) and the recording devices at multiple bases networked to the nodes at the bases, using server index information decrypted by the smart contract 83 for decrypting server index information. Accordingly, the attack resistance against cyber-attacks by quantum computers may be strengthened, and setting the file data that the customer desires to restore back to the state before being allotted by the smart contract 31 for allotting distributed file management groups may become possible as follows.

(XX10) The extraction of the server index information encrypted and recorded in the node groups located at the specified bases in the consortium-type blockchain by the smart contract 82 for extracting encrypted server index information is based on:

the customer specified first parameter P1 or the first compound parameter P1X (comprising a pair of the first decryption parameter P1X1 specified by the customer and managed offline and the first encryption parameter P1X2 automatically generated from the first decryption parameter P1X1); and the second parameter P2 specified by the co-administrator of the consortium-type blockchain, or the second compound parameter P2X (comprising a pair of the second decryption parameter P2X1 specified by the co-administrator and managed offline (that is incorporated and modularized in the predetermined smart contract that performs the corresponding process) and the encryption parameter P2X2 automatically generated from the second decryption parameter P2X1 (that is incorporated and modularized in the predetermined smart contract that performs the corresponding process)).

Therefore, a malicious third party is required to comprehend the content of:

the second parameter P2 specified by the co-administrator of the consortium-type blockchain, or the second compound parameter P2X (comprising a pair of the second decryption parameter P2X1 specified by the co-administrator and managed offline (that is incorporated and modularized in the predetermined smart contract that performs the corresponding process) and the encryption parameter P2X2 automatically generated from the second decryption parameter P2X1 (that is incorporated and modularized in the predetermined smart contract that performs the corresponding process));

in addition to the customer specified first parameter P1 or the first compound parameter P1X (comprising a pair of the first decryption parameter P1X1 specified by the customer and managed offline and the first encryption parameter P1X2 automatically generated from the first decryption parameter P1X1).

Accordingly, when each of the customer specified first parameter P1 or the first compound parameter P1X (comprising a pair of the first decryption parameter P1X1 specified by the customer and managed offline and the first encryption parameter P1X2 automatically generated from the first decryption parameter P1X1); and the second parameter P2 specified by the co-administrator of the consortium-type blockchain, or the second compound parameter P2X (comprising a pair of the second decryption parameter P2X1 specified by the co-administrator and managed offline (that is incorporated and modularized in the predetermined smart contract that performs the corresponding process) and the encryption parameter P2X2 automatically generated from the second decryption parameter P2X1 (that is incorporated and modularized in the predetermined smart contract that performs the corresponding process));

are safekept offline, executing the above-mentioned step (XX10) becomes almost impossible, and the subsequent decryption of the encrypted server index information by the smart contract 83 for decrypting server index information, and the extraction of each of the encrypted and multi-divided file data by the smart contract 84 for extracting the encrypted and divided file data also becomes almost impossible, even if a quantum computer is used.

Further, according to the digital asset guard service provision system 1 of the present embodiment, the file data restoration system 60 is configured with:

"the multiple programs or smart contracts $\mathbf{71}_{1\ through\ q}$ (where q is an integer of 10 or more) that have decryption and linkage algorithms having different file data decryption and linkage process methods, associated with each of the programs or smart contracts $\mathbf{21}_{1\ through\ q}$ (where q is an integer of 10 or more) having encryption and division algorithms"; and "the file data restoration means 73 that decrypts and links each of the encrypted and multi-divided file data extracted by the smart contract 84 for extracting encrypted and divided file data to one file data and restores to the file data before being saved, using the smart contract or program 71alpha (where, a is an integer from 1 through q) having decryption and linkage algorithms associated with the smart contract or program 21 having encryption and division algorithm 21*a* (where, a is an integer from 1 through q) accepted by the encryption and division algorithm selection reception means 22. As a result, attack resistance against cyberattacks by quantum computers may further be strengthened, and restoring the file data that the customer desires to restore to the state before being saved may become possible as follows.

(XX11) The customer file data to be restored is encrypted and multi-divided. Therefore, in order to decrypt the contents of the file data, a malicious third party would have to decipher the encrypted and multi-divided file data and integrate the file data into one.

(XX12) The decryption and linkage of the encrypted and multi-divided file data into one file data is made by using the program or smart contract 71alpha (where alpha is an integer between 1 and q) that has decryption and linkage algorithms associated with the program or smart contract 21 that comprises encryption and division algorithm 21*a* (where a is an integer from 1 through q) accepted by the predetermined encryption and division algorithm selection reception means 22 selected based on the customer specified first parameter, among the multiple programs or smart contracts $\mathbf{71}_{1\ through\ q}$ (where q is an integer of 10 or more) that have decryption and linkage algorithms having different file data decryption and linkage process methods associated with each of the programs or smart contracts $\mathbf{21}_{1\ through\ q}$ (where q is 10 or more) having respective encryption and division algorithms. Therefore, in order to decrypt and link the encrypted and multi-divided file data into one, a malicious third party would have to identify the program or smart contract having encryption and division algorithms selected for encrypting and multi-dividing the file data.

(XX13) To identify the program or smart contract having decryption and linkage algorithms associated with the program or smart contract having encryption and division algorithms, a malicious third party needs to comprehend the contents of the parameter P1.

Therefore, by safekeeping the first parameter P1 specified by the customer offline, executing the above-mentioned steps (XX11) through (XX13) becomes almost impossible, Furthermore, the digital asset guard service provision system 1 of the present embodiment is configured with "the first data deletion means 46 that deletes each file data uploaded to the first temporary storage area M1, after the server index information is encrypted and recorded in node groups located at specified bases in the consortium-type blockchain by the smart contract 34 for recording server index information". Accordingly, by configuring the smart contract for allotting distributed file management groups with "the function of changing file formats and names of each file data encrypted and multi-divided by the file data encryption and division means and uploaded to the first temporary storage area M1 by the upload means before allotting to the multiple distributed file management groups, into predetermined file formats and names, the file data having the same file formats and names as the file formats and names of each of the file data divided and encrypted by the customer-side file data saving system would cease to exist perfectly in the co-administrator side file data saving system, when the file formats and names are differentiated between each of the file data divided and encrypted by the customer-side file data saving system and each of the divided and encrypted file data distributed and recorded in the co-administrator side file data saving system. Therefore, even if file data distributed, recorded and safekept in the co-administrator side file data saving system is leaked, a third party would become extremely difficult to recognize that the leaked file data is the original file data targeted to be saved by the customer. Therefore, the attack resistance of digital assets against high-level cyberattacks may be further strengthened.

Furthermore, the digital asset guard service provision system 1 of the present embodiment is configured with "the second data deletion means 74 that deletes each of the encrypted and multi-divided file data uploaded to the second temporary storage area M2, after restored to the file data before being saved by the file data restoration means". Therefore, there would be no risk that the encrypted and multi-divided file data remaining in the digital storage area M2 is stolen after the customer restores the file data, and the attack resistance of digital assets against high-level cyberattacks may be further strengthened.

Further, according to the digital asset guard service provision system 1 of this embodiment, the file data saving system 10 comprises the customer-side file data saving system 20 operated on the customer side who desires to save the file data, and the co-administrator side file data saving system 30 that operates on the co-administrator side of the consortium-type blockchain. The customer side file data saving system 20 comprises the multiple programs or smart contracts $\mathbf{21}_{1\ through\ q}$ (where q is an integer of 10 or more) having encryption and division algorithms, the encryption and division algorithm selection reception means 22, the file data saving instruction reception means 23, the file data encryption and division means 24, the upload means 25, the smart contract or program 27 having a wallet function for customer index information, and the smart contract 28 for recording customer index information. The co-administrator side file data saving system 30 comprises the smart contract 31 for allotting distributed file management groups, the distribution and recording smart contract 32, the smart contract 33 for generating server index information, the smart contract 34 for recording server index information, and the first data deletion means 46. Therefore, there would not be a risk that the first parameter P1 and the second parameter P2 are simultaneously stolen by separately safekeeping offline the customer specified first parameter P1 and the second parameter P2 specified by the co-administrator of the consortium-type blockchain. Moreover, the process in the customer side file data saving system 20 and the process in the co-administrator side file data saving system 30 are fragmented. Therefore, the risk that process data for the file data saving in the file data saving systems 20 and 30 on both the customer side and the co-administrator side is stolen simultaneously by a malicious third party would become extremely low.

Furthermore, even if the process data for the file data saving in the file data saving systems 20 and 30 on both the customer side and the co-administrator side is stolen by a malicious third party, the association of the process data for the file data saving in the customer side file data saving system 20 and the process data for the file data saving in the co-administrator side file data saving system 30 may be able to make extremely difficult for a malicious third party.

Moreover, according to the digital asset guard service provision system 1 of the present embodiment, the co-administrator side file data saving system is configured with "the first deletion means 46 deleting each file data uploaded into the first temporary storage area M1 after the server index information is encrypted and recorded in the node groups located at the specified bases in the consortium-type blockchain by the smart contract 34 for recording server index information".

Accordingly, by configuring the smart contract for allotting distributed file management groups with "the function of changing the file formats and names of each file data encrypted and multi-divided by the file data encryption and division means and uploaded to the first temporary storage area M1 by the upload means before allotting to the multiple distributed file management groups, into predetermined file formats and names, the file data having the same file formats and names as the file formats and names of each file data divided and encrypted by the customer-side file data saving system would cease to exist perfectly in the co-administrator side file data saving system, when the file formats and names are different between each of the file data divided and encrypted by the customer-side file data saving system and each of the divided and encrypted file data distributed and recorded in the co-administrator side file data saving system. Therefore, even if file data distributed, recorded and safekept in the co-administrator side file data saving system is leaked, a third party would become extremely difficult to recognize that the leaked file data is the original file data targeted to be saved by the customer. Therefore, the attack resistance of digital assets against high-level cyberattacks may be further strengthened.

Further, according to the digital asset guard service provision system 1 of the present embodiment, the file data restoration system 60 comprises combinations of the customer-side file data restoration system 70 configured completely independently and operated on the customer side who desires to restore the saved file data, and the co-administrator-side file data restoration system 80 that operates on the co-administrator side of the consortium-type blockchain. The customer-side file data restoration system 70 comprises the programs or smart contracts $\mathbf{71}_{1\ through\ q}$ (where q is an integer of 10 or more) having multiple decryption and linkage algorithms, the file data extraction instruction reception means 81, the download means 72, the file data restoration means 73, and the second data deletion means 74, the co-administrator side file data restoration system 80 comprises the smart contract 82 for extracting encrypted server index information, the smart contract 83 for decrypting server index information, and the smart contract 84 for extracting encrypted and divided file data. Therefore, there would not be a risk that the first parameter P1 and the second parameter P2 are simultaneously stolen by separately safekeeping offline the customer specified first parameter P1 and the second parameter P2 specified by the co-administrator of the consortium-type blockchain. Moreover, the process in the customer side file data saving system 70 and the process in the co-administrator side file data saving system 80 are fragmented. Therefore, the risk that process data for the file data saving in the file data saving systems 70 and 80 on both the customer side and the co-administrator side is stolen simultaneously by a malicious third party would become extremely low.

Furthermore, even if the process data for the file data restoration in the file data restoration systems 70 and 80 on both the customer side and the co-administrator side is stolen by a malicious third party, the association of the process data for the file data restoration in the customer side file data restoration system 70 with the process data for the file data restoration on the co-administrator side file data restoration system 80 by the malicious third party may become very difficult.

Moreover, according to the digital asset guard service provision system 1 of the present embodiment, the customer side file data restoration system is configured with "the second data deletion means 74 for deleting each of the encrypted and multi-divided file data downloaded to the second temporary storage area M2, after restored to the file data before being saved by the file data restoration means 73". Accordingly, there would be no risk that the encrypted and multi-divided file data remaining in the second temporary storage area M2 is stolen by a third party after the customer restores the file data, and therefore, the attack resistance of digital assets against high-level cyberattacks may be further strengthened.

Further, according to the digital asset guard service provision system of the present embodiment, the smart contract 31 for allotting distributed file management groups is configured with "a function for changing, the file formats and names of each file data (encrypted and multi-divided by the file data encryption and division means 24 and) uploaded into the first temporary storage area M1 by the upload means, to predetermined file formats and names before allotting to the multiple distributed file management groups $\mathbf{101}_{1\ through\ m}$ (where m is an integer of 2 or more)". Therefore, the file formats and names of each of the file data divided and encrypted by the customer side file data saving system 20 and the file formats and names of each of the divided and encrypted file data that are distributed and recorded in the co-administrator side file data saving system 30 are different. Therefore, even if the file data distributed, recorded and safekept in the co-administrator side file data saving system 30 is leaked, to recognize that the leaked file data is the original file data targeted to be saved by the customer becomes extremely difficult for a third party. Therefore, the attack resistance of digital assets against high-level cyberattacks may be further strengthened.

In addition, according to the digital asset guard service provision system of the present embodiment, the smart contract 84 for extracting encrypted and divided file data is configured with "a function for changing the file formats and names of each of the extracted file data to the original file formats and names after extracting each of the file data that is encrypted and multi-divided". Therefore, by differentiating file formats and names from each file data divided and encrypted by the customer side file data saving system 20 when saving the file data, even if the file data distributed and recorded in the co-administrator side file data saving system 30 may be restored to the original file data by linking and decrypting by the customer side file data saving system 20 when restoring the file data.

Further, according to the digital asset guard service provision system 1 of the present embodiment:

"the first parameter P1 comprises the file division code P11 and the file storage code P12";

"the encryption and division algorithm selection reception means 22 accepts selections of the program or smart contract 21 that has a predetermined encryption and division algorithm 21*a* (where a is an integer between 1 and q, inclusive) based on the file division code P11.";

"the smart contract for allotting distributed file management groups 31 has a function for changing, file formats and names of each of the file data (encrypted and multi-divided by the file data encryption and division means 24 and) uploaded into the first temporary storage area M1 by the upload means, to predetermined file formats and names based on the file storage code P12 and the second parameter P2, and at the same time encrypts the file data and allotting to the multiple distributed file management groups $\mathbf{101}_{1\ through\ m}$ (where m is an integer of 2 or more) configured with nodes located at multiple bases configured for the planets $\mathbf{100}_{1\ through\ n}$ (where n is an integer of 2 or more) set on the co-administrator side according to the conditions specified by the customer and with the recording devices located at multiple bases networked to the nodes at the bases";

"the smart contract 84 for extracting encrypted and divided file data has functions of extracting, each encrypted and multi-divided file data that is allotted to each of the distributed file management groups $\mathbf{101}_{1\ through\ m}$ (where m is an integer of 2 or more) by the smart contract 31 for allotting distributed file management groups, the file data being distributed and recorded into the nodes $\mathbf{102}_{1\ through\ mb}$ (where mb is an integer of 2 or more) at each of the bases belongs to each of the distributed file management groups $\mathbf{101}_{1\ through\ m}$ (where mb is an integer of 2 or more) and into the recording devices located at multiple bases networked to the nodes at the bases by each of the distribution and recording smart contracts 32, from any of the nodes at each of the bases belongs to each of the distributed file management groups $\mathbf{101}_{1\ through\ m}$ (where mb is an integer of 2 or more) and the recording devices located at multiple bases networked to the nodes at the bases, based on the file storage code P12 and the second parameter P2, the smart contract 84 also having a function of decrypting the extracted file data and at the same time changing the file formats and names of the file data to the original file formats and names"; and "the file data restoration means 73 is configured to decrypt and link, each of the encrypted and divided file data that is extracted by the smart contract 84 for extracting encrypted and divided file data and downloaded to the second temporary storage area M2 by the download means 72, to one file data and restore to the file data before being saved based on the file division code P11 using the program or smart contract 71alpha (where alpha is an integer from 1 through q) that has decryption and linkage algorithms associated with the program or smart contract 21 having the encryption and division algorithm 21*a* (where a is an integer from 1 through q) accepted by the encryption and division algorithm selection reception means 22". Accordingly, the parameters specified by the customer used in each process stage of the file data saving process and the file data restoration process become complicated. Therefore, the parameters used in each process stage of the file data saving process and the file data restoration process may be able to make even more difficult for a malicious third party to comprehend, thereby increasing attack resistance against cyberattacks by quantum computers, and the customer file data may be able to be saved and restored.

Furthermore, the smart contract 31 for allotting distributed file management groups not only changes the file formats and names of each file data divided and encrypted by the customer side file data saving system 20, but also encrypts them. Therefore, even if the file data distributed, recorded and safekept in the co-administrator side file data saving system 30 is leaked, to recognize that the leaked file data is the original file data targeted to be saved by the customer becomes extremely difficult for a third party. Therefore, the attack resistance of digital assets against high-level cyberattacks may be further strengthened.

Further, according to the digital asset guard service provision system 1 of the present embodiment, the file data encryption and division means 24 is configured to "multi-divide customer file data to be saved using the program or smart contract 21 having the encryption and division algorithm 21*a* (where a is an integer from 1 through q) accepted by the encryption and division algorithm selection reception means 22, and encrypt each of the multi-divided file data based on the customer generated first public key, that is the first encryption key K12. Therefore, the attack resistance of digital assets against high-level cyberattacks may be further strengthened, and the customer file data may be saved, as described below.

(XX14) The customer generated first public key, that is the first encryption key K12 is required for encrypting each file data multi-divided by the file data encryption and division means 24. Therefore, in order to decrypt and integrate the encrypted and multi-divided file data into one, a malicious third party needs to comprehend the customer generated first public key, that is the first encryption key K12 in addition to identifying the program or smart contract having encryption and division algorithms selected for encrypting and multi-dividing the file data as a preliminary analysis work. Therefore, executing the above-mentioned step (XX14) becomes almost impossible by safekeeping the first parameter P1 specified by the customer and the first public key, that is the first encryption key K12 generated by the customer offline respectively, even if a quantum computer is used.

In addition, the file data restoration means 60 is configured to "decrypt each of the encrypted and multi-divided file data based on the customer generated first secret key, that is, first offline decryption key K11, and to link each of the decrypted file data to one file data using the program or smart contract 71alpha (where alpha is an integer between 1 and q, inclusive) having a decryption and linkage algorithms associated with the program or smart contract 21 having the encryption and division algorithm 21*a* (where a is an integer between 1 and q) accepted by the encryption and division algorithm selection reception means 22". Therefore, the attack resistance of digital assets against high-level cyberattacks may be further strengthened, and the customer file data may be restored, as described below.

(XX15) In order to decrypt each of the encrypted and multi-divided file data, the customer is required to generate the first secret key, that is, the first offline decryption key K11. Therefore, in order to decrypt and integrate the encrypted and multi-divided file data into one, a malicious third party needs to comprehend the customer generated first secret key, that is, the first offline decryption key K11 in addition to identifying the program or smart contract having encryption and division algorithms selected for encrypting and multi-dividing the file data. Therefore, executing the above-mentioned step (XX15) becomes almost impossible by safekeeping the first parameter P1 specified by the customer and the customer generated first secret key, that is, the first offline decryption key K11 respectively, even if a quantum computer is used.

Further, according to the digital asset guard service provision system 1 of the present embodiment, the file data encryption and division means 24 is configured to:

"encrypt the customer file data to be saved based on the customer generated first public key, that is the first encryption key K12; and to multi-divide the encrypted file data using the program or smart contract 21 having the encryption and division algorithm 21*a* (where a is an integer from 1 through q) accepted by the encryption and division algorithm selection reception means 22"; and the file data restoration means is configured:

"to link each of the encrypted and multi-divided file data to one file data using the program or smart contract 71alpha (where alpha is an integer of 1 or more and q or less) with decryption and linkage algorithms associated with the program or smart contract 21 with the encryption and division algorithm 21*a* (where a is an integer between 1 and q) accepted by the encryption and division algorithm selection reception means 22; and to decrypt the linked one file data based on the customer generated first secret key, that is, the first offline decryption key K11".

Therefore, similar to the above-mentioned steps (XX14) and (XX15), this configuration may further strengthen attack resistance against cyberattacks by quantum computers and the customer file data, may be saved.

Furthermore, according to the digital asset guard service provision system 1 of the present embodiment, the smart contract 34 for recording server index information is configured to "encrypt the server index information generated by the smart contract 33 for generating server index information based on the second public key, that is, the second encryption key k22 generated by the co-administrator of the consortium-type blockchain, or based on the second encryption parameter P2X2 (which is incorporated and modularized in a predetermined smart contract performing the corresponding process) automatically generated from the second decryption parameter P2X1 (which is incorporated and modularized in a predetermined smart contract performing the corresponding process) specified by the co-administrator and managed offline. Therefore, this configuration further strengthens the resistance against cyberattacks by quantum computers, and the customer file data may be saved as described below.

(XX16) In order for the smart contract 34 for recording server index information to encrypt the server index information generated by the smart contract 33 for generating server index information, the second public key, that is, the second encryption key k22 generated by the co-administrator of the consortium-type blockchain, or the second encryption parameter P2X2 (which is incorporated and modularized in a predetermined smart contract performing the corresponding process) automatically generated from the second decryption parameter P2X1 (which is incorporated and modularized in a predetermined smart contract performing the corresponding process) specified by the co-administrator and managed offline, is required.

For this reason, in order to decrypt the encrypted and multi-divided file data, a malicious third party needs to comprehend the second public key, that is, the second encryption key K22 generated by the co-administrator of the consortium-type blockchain, or the second encryption parameter P2X2 (which is incorporated and modularized in a predetermined smart contract performing the corresponding process) automatically generated from the second decryption parameter P2X1 (which is incorporated and modularized in a predetermined smart contract performing the corresponding process) specified by the co-administrator and managed offline.

Therefore, executing the above-mentioned step (XX16) becomes almost impossible by safekeeping offline the second public key, that is, the second encryption key K22 generated by the co-administrator of the consortium-type blockchain, even if a quantum computer is used.

Further, according to the digital asset guard service provision system 1 of the present embodiment, the smart contract 83 for decrypting server index information is configured to decrypt the encrypted server index information extracted by the smart contract 82 for extracting encrypted server index information based on the second secret key, that is, the second decryption key K21 generated by the co-administrator of the consortium-type blockchain. or the second decryption parameter P2X1 specified by the co-administrator and managed offline (incorporated and modularized in the predetermined smart contract that performs the corresponding process).

Therefore, this configuration further strengthens the resistance against cyberattacks by quantum computers, and the customer file data may be restored as described below.

(XX17) In order to decrypt encrypted server index information, the second secret key, that is, the second decryption key K21 generated by the co-administrator of the consortium-type blockchain or second decryption parameter P2X1 (incorporated and modularized within the predetermined smart contract that performs corresponding processes) specified by a co-administrator and managed offline are required. For this reason, in order to decrypt encrypted server index information, a malicious third party would have to comprehend the second secret key, that is, the second decryption key K21 generated by the co-administrator of the consortium-type blockchain or second decryption parameter P2X1 (incorporated and modularized within the predetermined smart contract that performs corresponding processes) specified by the co-administrator and managed offline.

Therefore, by safekeeping the second secret key, that is, the second decryption key K21 generated by the co-administrator of the consortium-type blockchain or the second decryption parameter P2X1 (incorporated and modularized within the predetermined smart contract that performs corresponding processes) specified by the co-administrator and managed offline, even if a quantum computer is used, executing the above-mentioned step (XX17) becomes almost impossible.

Further, according to the digital asset guard service provision system 1 of the present embodiment, the programs or smart contracts $\mathbf{21}_{1\ through\ q}$ (where q is an integer of 10 or more) having encryption and division algorithms are configured to encrypt and multi-divide the file data using secret sharing technologies. Accordingly, each of the encrypted and multi-divided file data may be made into meaningless data, a malicious third party is difficult to decipher the file data.

Further, according to the digital asset guard service provision system 1 of the present embodiment, the programs or smart contracts $\mathbf{71}_{1\ through\ q}$ (where q is an integer of 10 or more) having multiple decryption and linkage algorithms are configured to decrypt and restore the encrypted and multi-divided to the original file data that is linked into one file using the secret sharing restoration technology. Therefore, the configuration makes a malicious third party difficult to decipher the file data increasing even more resistant against cyberattacks using quantum computers, and the customer file data may be restored.

In addition, according to the digital asset guard service providing system 1 of this embodiment, the secret sharing technology is configured to be AONT-type secret sharing technology, so that the data of the divided file data is not combined and decrypted until all divided file data are collected. This makes it even more difficult for a malicious third party to decipher the original file data.

Further, according to the digital asset guard service provision system 1 of the present embodiment, the file data saving system 60 is further configured to comprise:

the planet configuration pattern setting means 36 for selecting distributed file management groups that selects, the number of nodes configuring the planets $\mathbf{100}_{1\ through\ n}$ (where n is an integer of 2 or more), and the distributed file management groups configured with the nodes $\mathbf{102}_{1\ through\ mb}$ (mb is an integer of 2 or more) at each of the bases and the recording devices at multiple bases networked to the nodes at the bases, based on the number of divisions of the file data based on the record capacity, file size and degree of dispersion of the file data specified by the customer;

the smart contract 31 for allotting distributed file management groups is configured to have a function for allotting the file data to the multiple distributed file management groups $\mathbf{101}_{1\ through\ m}$ (where m is an integer of 2 or more) comprising the nodes at each base configuring the planets $\mathbf{100}_{1\ through\ n}$ (where n is an integer of 2 or more), which are set on the co-administrator side according to the conditions specified by the customer via the planet configuration pattern setting means 36, and the recording devices located at multiple bases networked to the nodes at the bases; and each of the distribution and recording smart contracts 32 is configured to have a function for distributing and recording each file data allotted by the smart contract 31 for allotting distributed file management groups into the nodes $\mathbf{102}_{1\ through\ mb}$ (mb is an integer of 2 or more) at each of the bases belonging to each of the corresponding distributed file management groups $\mathbf{101}_{1\ through\ m}$ (where m is an integer of 2 or more) and into the recording devices at multiple bases networked to the nodes at the bases.

Therefore, a suitable planet configuration pattern (the number of nodes configuring the planet, and the distributed file management groups configured with the nodes at each base and the recording devices at multiple bases networked to the nodes at the bases) may be set according to the record capacity of the file data of the customer who desires to save the file data, the customer file data may be divided and allotted to each of the suitable distributed file management groups, and the file data may be distributed, recorded and safekept in the nodes at each base within each of the distributed file management groups and the recording devices at multiple bases that are networked to the nodes at the bases Further, according to the digital asset guard service provision system 1 of the present embodiment, the planet configuration pattern setting means 36 is configured to add a predetermined number of dummy file data (which comprises a code inside that allows the smart contract 84 for extracting encrypted and divided file data to recognize the dummy information) to the number of divisions of the file data, and select the number of the nodes configuring the planets $\mathbf{100}_{1\ through\ n}$ (where n is an integer of 2 or more), and the distributed file management groups configured with the nodes $\mathbf{102}_{1\ through\ mb}$ (where mb is an integer of 2 or more) at each of the bases and the multiple recording devices that is networked to the nodes at the bases. With this configuration, even if the dummy file data and the divided file data are linked into one file data, the content of the linked file data becomes different from the original file data. Therefore, this configuration may make a malicious third party decipher the original file data even more difficult.

Further, according to the digital asset guard service provision system 1 of the present embodiment, the smart contract 33 for generating server index information is configured to have a function for "generating server index information including information on the nodes located at each of the bases and the recording devices located at multiple bases networked to the nodes at the bases in which the dummy file data added by the planet configuration pattern setting means 36 is distributed and recorded as information of each of the distributed file management groups $\mathbf{101}_{1\ through\ m}$ (where m is an integer of 2 or more)". Therefore, even if the index information is stolen by a malicious third party, the stolen index information includes configuration information of the distributed file management groups in which the dummy file data is distributed and recorded. Therefore, even if dummy file data and divided file data are extracted from the configuration information of the distributed file management group in the server index information and linked into one file data, the contents of the linked file data is different from the original file data. For this reason, this may make a malicious third party even more difficult to decipher the original file data.

Further, according to the digital asset guard service provision system 1 of the present embodiment, from the configuration information of each of the distributed file management groups $\mathbf{101}_{1\ through\ m}$ (where m is an integer of 2 or more) in the server index information decrypted by the smart contract 83 for decrypting server index information, the smart contract 84 for extracting encrypted and divided file data is configured to have "a function for extracting each of the encrypted and multi-divided file data (allotted to each of the distributed file management groups $\mathbf{101}_{1\ through\ m}$ (where m is an integer of 2 or more) by the smart contract 31 for allotting distributed file management groups and distributed and recorded in the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and in the recording devices located at multiple bases networked to the nodes at the bases), from any of the nodes at each of the bases belonging to each of the distributed file management groups $\mathbf{101}_{1\ through\ m}$ (where m is an integer of 2 or more) and the recording devices located at multiple bases networked to the nodes at the bases, using the server index information excluding the information of the nodes at each of the bases and the recording devices located at multiple bases networked to the nodes at the bases that distribute and record dummy file data (which has a code inside that can recognize the dummy information)". Accordingly, this configuration may make a malicious third party decipher the original file data even more difficult, and the attack resistance against cyberattacks by quantum computers is further strengthened, and may extract each of the encrypted and multi-divided file data necessary for restoring the original file data.

Further, according to the digital asset guard service provision system 1 of the present embodiment, the planet configuration pattern setting means 36 is configured to calculate and select the nodes $\mathbf{102}_{1\ through\ mb}$ (where mb is an integer of 2 or more) located at each of the bases in each of the distributed file management groups $\mathbf{101}_{1\ through\ m}$ (where m is an integer of 2 or more) and the recording devices located at multiple bases networked to the nodes at the bases so that the nodes and the recording device are positioned at a point in which the distances therebetween are maximized (=maximum degree of dispersion).

With this configuration, even if a node at one base or a recording device networked to the node is attacked by electromagnetic pulses and the recorded and safekept file data is destroyed or burned, the nodes located at other bases and the recording devices networked to the nodes are not subjected to the EMP attack, and may escape from being destroyed or burned to be able to increase the security of restoring the original file data.

Further, according to the digital asset guard service provision system 1 of the present embodiment, the planet configuration pattern setting means 36 is configured to:

regard the spherical earth as a flat surface and generates the matrix MA in which regions on the earth are multi-divided in the longitudinal and lateral directions;

determines intervals in the X-axis direction with respect to the Y-axis in the matrix MA of bases of the nodes $\mathbf{102}_{1\ through\ mb}$ (where mb is an integer of 2 or more) and the multiple recording devices networked to the nodes at the bases using calculation values based on the number of divisions of the file data within one the distributed file management groups 101*b* (where b is an integer between 1 and m); and select the nodes $\mathbf{102}_{1\ through\ mb}$ (where mb is an integer of 2 or more) at each of the bases and the multiple recording devices networked to the nodes at the bases within each of the distributed file management groups $\mathbf{101}_{1\ through\ m}$ (where m is an integer of 2 or more).

Accordingly, with this configuration, according to the numbers of divisions of the file data, even if the nodes at one base or the recording devices networked to the nodes are attacked by electromagnetic pulses and the recorded and safekept file data is destroyed or burned, the nodes located at other bases and the recording devices networked to the nodes are not subjected to the EMP attack, and may escape from being destroyed or burned, and this configuration may set the nodes located at other bases and the recording devices networked to the nodes configuring a planet configuration pattern suitable for increasing the security of restoring the original file data.

In the digital asset guard service provision system 1 of this embodiment, the bases of the nodes and multiple recording devices networked to the nodes that distribute and record each divided file data in the planets $\mathbf{100}_{1\ through\ n}$ (where n is an integer of 2 or more) are configured to be managed by information such as the global positioning system (GPS) and classified in the matrix MA in the planets $\mathbf{100}_{1\ through\ n}$ (where n is an integer of 2 or more). Therefore, the positional information of each of the bases of the nodes and multiple recording devices networked to the nodes that distribute and record each of the divided file data in the planets may be accurately comprehended.

Further, in the digital asset guard service provision system of the present invention, preferably, regarding the bases of the nodes $\mathbf{102}_{1\ through\ mb}$ (where mb is an integer of 2 or more) and the multiple recording devices networked to the nodes that distribute and record one divided file data, the planet configuration pattern setting means 36 is configured to calculate and select the nodes of the bases or the recording devices networked to the nodes at bases in the Y-axis direction having numerical differences similar to calculation values of the X-axis direction intervals when the interval in the X-axis direction cannot be spaced as per calculation values based on numbers of divisions of the file data caused by a lack of remaining recordable capacity of any of the nodes at predetermined bases and the recording devices at multiple bases networked to the nodes at the bases.

With this configuration, while ensuring that the bases of the nodes and multiple recording devices networked to the nodes that distribute and record each divided file data keep avoiding insufficient record capacity, even if the nodes at one base and the recording devices networked to the nodes are attacked by electromagnetic pulses and the recorded and safekept file data is destroyed or burned, the nodes located at other bases and the recording devices networked to the nodes are not subjected to the EMP attack, and may escape from being destroyed or burned, and the nodes located at other bases and the recording devices networked to the nodes configuring a planet configuration pattern suitable for increasing the security of restoring the original file data may be set.

Further, according to the digital asset guard service provision system 1 of the present embodiment, the planet configuration pattern setting means 36 is configured to:

select the bases of each of the nodes configuring a planet in accordance with the numbers of divisions of the file data based on the record capacity and size of the file data specified by the customer;

select multiple individual bases belonging to the distributed file management groups so that the degree of dispersion is maximized in the distributed file management groups $\mathbf{101}_{1\ through\ m}$ (where m is an integer of 2 or more) configured with each of the selected nodes; and select the multiple recording devices (networked to the nodes $\mathbf{102}_{1\ through\ mb\ through\ mb}$ (where mb is an integer of 2 or more) arranged at each individual base.

Therefore, in accordance with the numbers of divisions of the file data based on the record capacity of the customer file data to be saved, even if a node at a base and a recording device networked to the node are subjected to the EMP attack and the recorded and safekept file data is destroyed or burned, the nodes located at other bases and the recording devices networked to the nodes are not subjected to the EMP attack, and may escape from being destroyed or burned, and the nodes located at other bases and the recording devices networked to the nodes configuring a planet configuration pattern suitable for increasing the security of restoring the original file data may be set.

Further, according to the digital asset guard service provision system 1 of the present embodiment, the planet configuration pattern setting means 36 is configured to:

record the total remaining recordable capacity, total remaining communication capacity and the like, as information on nodes located at each of the bases in each region to which the base of the nodes belong and the recording devices located at multiple bases networked to the nodes at the bases in the matrix MA; and select the best combination of the bases of the nodes $\mathbf{102}_{1\ through\ mb}$ (where mb is an integer of 2 or more) and the bases of the multiple recording devices networked to the nodes at each of the bases, using the total remaining recordable capacity, total remaining communication capacity and the degree of dispersion of the nodes located at each of the bases in each of the regions recorded in the matrix MA, upon selecting the bases of the nodes $\mathbf{102}_{1\ through\ mb}$ (where mb is an integer of 2 or more) configuring the distributed file management groups $\mathbf{101}_{1\ through\ m}$ (where m is an integer of 2 or more). Therefore, the recordable capacities of the nodes in each of the regions recorded in the matrix MA may be comprehended. And in this configuration, while ensuring that the nodes at each of the bases and the recording devices networked to the nodes that distribute and record each of the divided file data keep avoiding insufficient record capacity, even if the nodes at one base and the recording devices networked to the nodes are attacked by electromagnetic pulses and the recorded and safekept file data is destroyed or burned, the nodes located at other bases and the recording devices networked to the nodes are not subjected to the EMP attack, and may escape from being destroyed or burned, and nodes may be set up at each base within each distributed file management group in a currently suitable planet configuration pattern to increase the security of restoring the original file data.

Further, in the digital asset guard service provision system of the present invention, preferably, the planet configuration pattern setting means 36 is configured to calculate and select regions necessary for increasing recording capacities and communication capacities of the nodes located at each of the bases and the recording devices located at multiple bases networked to the nodes at the bases in the combination of the nodes the nodes 102$_{1\ through\ mb}$ (where mb is an integer of 2 or more) at a predetermined base configuring the distributed file management groups 101$_{1\ through\ m}$ (where m is an integer of 2 or more) and the recording devices located at multiple bases networked to the nodes at the bases.

Therefore, with this configuration, the recording capacities and communication capacities of the nodes located at each of the bases and of the recording devices located at multiple bases networked to the nodes at the bases in each region in the world may be optimized.

Further, according to the digital asset guard service provision system 1 of the present embodiment, each of the distributed file management groups 101$_{1\ through\ m}$ (where m is an integer of 2 or more) is configured to comprise the core nodes 102$c$1 through m (where m is an integer of 2 or more) specifying and managing the individual equipment configuring the recording devices at each of the bases belonging to the distributed file management groups 101$_{1\ through\ mb}$ (mb is an integer of 2 or more). Accordingly, the nodes located at each of the bases belonging to the distributed file management groups and the recording devices at multiple bases networked to the nodes at the bases may be easily managed.

Further, according to the digital asset guard service provision system 1 of the present embodiment, the nodes 102$_{1\ through\ mb}$ (where mb is an integer of 2 or more) at each of the bases are configured to be connected via communication means such as the Internet or a closed network, and incorporate the distribution and recording smart contract 32. Therefore, distribution and recording of each of the encrypted and multi-divided file data to the nodes at each of the bases and to the multiple bases networked to the nodes at the bases may be materialized.

Further, according to the digital asset guard service provision system 1 of the present embodiment, the file data saving system 10 is configured to read the customer index information encrypted and recorded in the node groups located at the specified bases in the consortium-type blockchain, and have a wallet function 26 that comprehends the recording destination corresponding to each of the file data encrypted and multi-divided by the file data encryption and division means 24, the recording destination corresponding to each of the encrypted and multi-divided file data may be comprehended.

Further, according to the digital asset guard service provision system 1 of the present embodiment, the file data saving system 10 is configured to further comprise:

the saved file data list information generation means 37 that generates saved file data list information, comprising, the terminal information, that is, fixed IP address at the time of being uploaded into the first temporary storage area M1 using the upload means 25, the original file name of the file data to be saved and upload date information associated with the customer; and the saved file data list information reference control means 38 configured to allow the saved file data list information generated by the saved file data list information generation means 37 to refer only by using communication equipment management and process programs managed by the fixed IP address of the customer. With this configuration, the communication terminals that can refer to the customer's saved file data list information are limited. Therefore, acquisition of saved information regarding the customer file data by the communication terminal of a malicious third party may be prevented.

Further, according to the digital asset guard service provision system 1 of the present embodiment, the file data restoration system 60 is configured to further comprise:

the restoration process time frame setting reception means 85 that accepts settings such as a time frame in which the restoration process of the file data from the customer desiring to save the file data, an IP address for the restoration and a restorable period; and the file data restoration process operation control means 86 that is configured to operate the file data extraction instruction reception means 81, the smart contract 82 for extracting encrypted server index information, the smart contract 83 for decrypting server index information, the smart contract 84 for extracting encrypted and divided file data, the download means 72, the file data restoration means 73, and the second data deletion means 74 only during the time frame the setting of which is accepted by the restoration process time frame setting reception means 85.

Therefore, even if the file data restoration command is input, the file data restoration process would not be operated except during a very short time frame known only to the customer. Therefore, even if the system is stolen by a third party, the file data restoration of the customer by inputting the restoration command by a third party would be almost impossible.

Further, according to the digital asset guard service provision system 1 of the present embodiment, the file data restoration system 60 is configured to further comprise the authentication code setting reception means 87 that accepts the setting of an authentication (license) code from a customer who desires to restore the file data, and the file data restoration process operation control means 86 is configured to operate the file data extraction instruction reception means 81, the smart contract 82 for extracting encrypted server index information, the smart contract 83 for decrypting server index information, the smart contract 84 for extracting encrypted and divided file data, the download means 72, the file data restoration means 73, and the second data deletion means 74 only in the time frame the setting of which is accepted by the restoration process time frame setting reception means 85 and only when the authentication code whose setting is accepted by the authentication code setting reception means 87 is approved by the co-administrator of the consortium-type blockchain. Accordingly, this configuration may make the file data restoration of the customer by inputting restoration commands by a malicious third party even more difficult and more firmly prevent data thefts.

Further, according to the digital asset guard service provision system 1 of the present embodiment, the authentication code set in the authentication code setting reception means 87 is a code that the customer desiring restoration of the file data is notified from a co-administrator of the consortium-type blockchain. The file data restoration process operation control means 86 is configured to provide an operation license of the program or smart contract 71alpha (that is an integer of 1 or more and q or less) having decryption and linkage algorithms associated with the program or smart contract 21 having encryption and division algorithm 21*a* (where a is an integer of 1 or more and q or less) accepted by the encryption and division algorithm selection reception means 22, when the authentication code a setting of which is accepted by the authentication code setting reception means 87 is approved by the co-administrator of the consortium-type blockchain, and further the authentication code is systematically confirmed to belong to the customer through multi-step authentication, biometric authentication, one-time passcode and the like. registered in the smartphone of the customer. Therefore, this configuration may make restoring the customer file data by an input of a restoration command by a third party even more difficult and more firmly prevent data theft.

Further, according to the digital asset guard service provision system 1 of the present embodiment, the consortium-type blockchain is configured to comprise the multiple level file data saving and restoration system configuration for operating:

the nodes 102$_{1\ through\ mb}$ (where mb is an integer of 2 or more) at each base configuring the planets 100$_{1\ through\ n}$ (where n is an integer of 2 or more);

the recording devices located at multiple bases networked to the nodes at the bases;

the file data saving system 10; and the file data restoration system 60.

Accordingly, the customer may select and be provided appropriate level file data saving services by taking into account the importance and characteristics of the file data desired to be saved, the cost required to receive the digital asset guard service and the like.

Further, the digital asset guard service provision system 1 of the present embodiment comprises the level S file data saving and restoration system configuration that is configured to "operate:

the nodes 102$_{1\ through\ mb}$ (where mb is an integer of 2 or more) at each base configuring the planets 100$_{1\ through\ n}$ (where n is an integer of 2 or more);

the recording devices located at multiple bases networked to the nodes at the bases;

the file data saving system 10; and the file data restoration system 60, using satellite communications, 5G/6G private communications, and closed networks that do not connected to the Internet such as LTE networks and dedicated closed networks".

Therefore, this configuration may make infiltrating networks in a closed environment by third parties extremely difficult, and achieve the strongest level of attack resistance against cyberattacks.

Further, the digital asset guard service provision system 1 of the present embodiment comprises the level three file data saving and restoration system configuration that is configured to "comprise high-credit companies in which participants of the consortium-type blockchain approve each other utilizing the Internet communication network, and operate:

the nodes 102$_{1\ through\ mb}$ (where mb is an integer of 2 or more) at each base configuring the planets 100$_{1\ through\ n}$ (where n is an integer of 2 or more);

the recording devices located at multiple bases networked to the nodes at the bases:

the file data saving system 10; and the file data restoration system 60, in a space with a high security level such as a dedicated room".

Therefore, this configuration may extremely increase the level of prevention of malicious third party intrusion and data leakage to the outside in a system configuration that utilizes the Internet communication network.

Further, the digital asset guard service provision system 1 of the present embodiment comprises the level three file data saving and restoration system configuration that is configured to "comprise high-credit companies in which participants of the consortium-type blockchain approve each other utilizing the Internet communication network, and operate:

the nodes 102$_{1\ through\ mb}$ (where mb is an integer of 2 or more) at each base configuring the planets 100$_{1\ through\ n}$ (where n is an integer of 2 or more);

the recording devices located at multiple bases networked to the nodes at the bases;

the file data saving system 10; and the file data restoration system 60, by installing a file server for data saving in a space with a security level suitable for an office, or utilizing inexpensive cloud services including regional services spread globally".

Therefore, this configuration may increase the level of prevention from the malicious third parties' intrusion and external leakage of data in the system configuration utilizing the Internet communication network while keeping costs down.

Further, the digital asset guard service provision system 1 of the present embodiment comprises the level two file data saving and restoration system configuration that is configured to "open to organizations such as general companies, such as branch networks utilizing the Internet communication network, and operate:

the nodes 102$_{1\ through\ mb}$ (where mb is an integer of 2 or more) at each base configuring the planets 100$_{1\ through\ n}$ (where n is an integer of 2 or more);

the recording devices located at multiple bases networked to the nodes at the bases;

the file data saving system 10; and the file data restoration system 60".

Therefore, this configuration may increase the level of prevention of malicious third party intrusion and external leakage of data in the system configuration utilizing the Internet communication network while keeping costs lower.

Further, the digital asset guard service provision system 1 of the present embodiment comprises the level one file data saving and restoration system configuration that is configured to "open to private homes and the like utilizing the Internet communication network, and operate:

the nodes 102$_{1\ through\ mb}$ (where mb is an integer of 2 or more) at each base configuring the planets 100$_{1\ through\ n}$ (where n is an integer of 2 or more);

the recording devices located at multiple bases networked to the nodes at the bases;

the file data saving system 10; and the file data restoration system 60".

Therefore, this configuration may increase the level of prevention of malicious third party intrusion and external leakage of data in the system configuration utilizing the Internet communication network while reducing costs to a maximum.

Furthermore, according to the digital asset guard service provision system 1 of the present embodiment, the level one to four file data saving and restoration system configurations are configured such that "the nodes $\mathbf{102}_{1\ through\ mb}$ (where mb is an integer of 2 or more) at each of the bases over the world configuring each of the planets $\mathbf{100}_{1\ through\ n}$ (where n is an integer of 2 or more), and the recording devices located at multiple bases networked to the nodes at the bases are networked to the Internet communication network and operated during night hours when night time power is available". Therefore, the level one to four file data saving system configurations may be constructed that effectively use power and reduce costs.

Furthermore, according to the digital asset guard service provision system 1 of the present embodiment, the level one to four file data saving and restoration system configurations are configured such that "file servers of the nodes $\mathbf{102}_{1\ through\ mb}$ (where mb is an integer of 2 or more) at each of the bases over the world configuring each of the planets $\mathbf{100}_{1\ through\ n}$ (where n is an integer of 2 or more) and of the recording devices located at multiple bases networked to the nodes at the bases are operable using renewable energy such as solar power and the like during the daytime". Therefore, power sources with unstable power generation, such as wind and solar power generations may be effectively utilized. AC-DC and DC-AC conversions have large amounts of power loss. However, in the case of solar power generation, for example, if we use the direct current generated directly as a server power source and store the surplus power in a battery to operate in times of power shortage, the DC-AC conversion is not needed, which reduces power loss.

Further, the digital asset guard service provision system 1 of the present embodiment, further comprises the data saving service contract application procedure reception means 50 and the smart contract 51 for recording data saving service contract application reception information. The data saving service contract application procedure reception means 50 is configured to "accept a data saving service contract application procedure from a customer who desires to save the file data, and at the time of accepting the data saving service contract application procedure, accept designations of recording capacities, degrees of dispersion, whether the data saving destinations include abroad or domestic only and safekeeping period of the file data received from customers who desire to be saved". The smart contract 51 for recording data saving service contract application reception information is configured to "have functions for:

managing information of the recording capacities, degrees of dispersion, safekeeping period and real-time processing of the file data received from customers who desires to be saved, and automatically calculating and generating the basic configuration of the entire planet by setting conditions of the customer (budget, whether the highest confidential matter regarding personal information or security is included=size of risk, and the like) accepted by the contract application procedure reception means 50; and encrypting and recording the generated information into node groups located at specified bases in the consortium-type blockchain as a portion of the system setting information, and. reading the recorded setting information together with the customer's personal information by the predetermined smart contract that performs the corresponding process to comprehend the entire situation". Therefore, the setting conditions of the planet configuration pattern used for safekeeping the file data to be saved in the digital asset guard service provision system may be specified.

Further, according to the digital asset guard service provision system 1 of the present embodiment, each divided file data recorded in the nodes $\mathbf{102}_{1\ through\ mb}$ (where mb is an integer of 2 or more) belonging to the distributed file management groups $\mathbf{101}_{1\ through\ m}$ (where m is an integer of 2 or more) and the recording devices located at multiple bases networked to the nodes at the bases are managed in an encrypted state, and index information such as hash of each of the file data and a distributed file group to which file data is allotted is recorded in blocks, the blocks are connected in a chain in which time data is incorporated in the hash, and the file data saving system 10 further comprises the smart contract 39 for setting a safekeeping period and the smart contract 40 for disconnecting chains, and the smart contract 39 for setting a safekeeping period is configured to have a function for setting the safekeeping period of the block for each planet as a unit at the time of distributing and recording each file data by each of the distribution and recording smart contracts 32 based on the safekeeping period information of the file data that the customer desires to save, which is recorded in the node group of the specified base in the consortium-type blockchain by the smart contract 51 for recording data saving service contract application reception information, and the smart contract 40 for disconnecting chains is configured to have a function for disconnecting chains of the block after the safekeeping period set by the smart contract 39 for setting safekeeping period has passed. Therefore, with this configuration, the safekeeping period for the file data to be saved may be set according to the customer's designations, and the increase in the amount of data accumulated in the storage area of the blockchain may be suppressed or the amount of data may be reduced.

Further, according to the digital asset guard service provision system 1 of the present embodiment, the file data saving system 10 further comprises a smart contract 41 for deleting blocks, and the smart contract 41 for deleting blocks is configured to have a function for deleting unwanted blocks disconnected via the smart contract 40 for disconnecting chains. Therefore, with this configuration, the increase in the amount of data accumulated in the storage area of the blockchain may be suppressed or the amount of data may be reduced.

Further, according to the digital asset guard service provision system 1 of the present embodiment, the file data saving system 10 further comprises the unnecessary block data saving means 42, and the unnecessary block data saving means 42 is configured to:

"send a notification for confirming the customer if the unnecessary block is to be deleted before deleting via the smart contract 41 for deleting blocks the unnecessary block disconnected via the smart contract 40 for chain disconnection;

notify on the co-administrator side and confirm whether the unnecessary block is to be deleted when there is no response from the customer; and record each of the encrypted and multi-divided file data as saved data via the specified recording medium that is disconnected from the network even if the unnecessary block is confirmed to be delible, and the temporarily recorded saved data is deleted after a certain time frame". Accordingly, even the file data to be deleted as an unnecessary block in the blockchain storage area may be restored if the customer so desires.

In addition, according to the digital asset guard service provision system 1 of the present embodiment, the unnecessary block data saving means 42 is configured to:

temporarily record each of the encrypted and multi-divided file data is saved as the saved data via a specified recording medium that is disconnected from the network, when the notification for confirming the customer if the unnecessary block is to be deleted is sent and the customer is confirmed to desire to extend the safekeeping period of the file data;

at the same time, select a new planet suitable for the conditions for extended safekeeping period of the file data that the customer desires;

automatically save the file data into the nodes located at each of the bases configuring the selected planet and the recording devices at the multiple bases networked to the nodes at the bases;

at the same time, update the server index information; and after the update, delete the temporarily recorded saved data after a certain time frame.

Therefore, even if the file data is to be deleted as an unnecessary block from the blockchain storage area after the safekeeping period has passed, the customer is able to extend the safekeeping period of the file data if desired.

Further, according to the digital asset guard service provision system 1 of the present embodiment, the file data saving system 10 further comprises the data falsification check control means 43, and the data falsification check control means 43 is configured to:

"calculate hash values based on the encrypted and multi-divided file data recorded in the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and the recording devices located at multiple bases networked to the nodes at the bases;

record the calculated hash values in the blocks;

constantly compare the hash values recorded in blocks in the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and hash values in the recording devices located at multiple bases networked to the nodes at the bases; and when there is a difference between a hash described in a block of a specified node or recording device and a hash described in a block of another node or recording device;

detect that the encrypted and multi-divided file data recorded in the specified node or the recording device is falsified and/or destroyed;

exclude the specified node or the recording device from the file data saving process;

delete the blocks in the specified node or the recording device; and send an alarm to the operator of the node and the co-administrator of the consortium-type blockchain.

Therefore, when the node at the specified base or the recording device networked to the node is infiltrated by a malicious third party and subjected to attacks such as tampering with data, the data attack may be stopped and not have an adverse effect on the nodes located at other bases or the recording devices networked to the nodes. This configuration may quickly detect the fact of a data attack and perform recovery process.

Further, according to the digital asset guard service provision system 1 of the present embodiment, the communication equipment that allows the customer to use the first secret key, that is, the first offline decryption key K11 to restore each of the encrypted and multi-divided file data which are distributed and recorded in the nodes $\mathbf{102}_{1\ through\ mb}$ (where mb is an integer of 2 or more) and the recording devices located at multiple bases networked to the nodes at the bases via the file data restoration system 60, to the original file data before being saved is configured to be managed using a fixed IP address. Therefore, even if a malicious third party steals the first secret key, that is, the first offline decryption key K11 of the customer, and the file data restoration using the first secret key, that is, the first offline decryption key K11 at the communication terminal of the third party may be prevented.

Further, the digital asset guard service provision system 1 of the present embodiment is configured such that the management information of the IP address of the communication equipment for which the customer can use the first secret key, that is, the first offline decryption key K11 is presented to the co-administrator, only when a multi-signature type secret key transaction is approved by the holders of specified nodes located at multiple bases configuring the co-administrator. Therefore, even if a single administrator of the co-administrator of the consortium-type blockchain may be strictly prevented from obtaining the knowledge of the management information of the IP address of the communication equipment for which the customer can use the first secret key, that is, the first offline decryption key K11. Accordingly, even if the single administrator's terminal is infiltrated by a malicious third party, obtaining the knowledge of the management information of the IP address of the communication equipment for which the customer can use the first secret key, that is, the first offline decryption key K11 by the malicious third party may be strictly prevented.

Furthermore, according to the digital asset guard service provision system 1 of the present embodiment, node information that permits access is configured to be recorded in the node groups of a specified base in the consortium-type blockchain. Therefore, the node information that permits access may be managed in the node groups located at the specified bases operated by the co-administrator in the consortium-type blockchain.

Further, the digital asset guard service provision system 1 of the present embodiment further comprises an upload processable IP address checking means 52, and the upload processable IP address checking means 52 is configured to "control to be able to operate the upload process of the file data to be saved in the file data saving system 10, that is, control to be able to operate the encryption and division algorithm selection reception means 22, the file data saving instruction reception means 23, the file data encryption and division means 24, and the upload means 25, only by operations at customer terminals whose fixed IP address is pre-registered in the node groups located at the specified bases in the consortium-type blockchain as a portion of the system setting information as terminal information for uploading the file data to the temporary storage area M1 using the upload means 25". Therefore, terminals that perform the upload process of the customer file data to be saved may be limited. Therefore, even if a malicious third party steals the customer's parameters or encryption key, the upload process of the file data contaminated by the malicious third party may be prevented.

Furthermore, according to the digital asset guard service provision system 1 of the present embodiment, the smart contract 51 for recording data saving service contract application reception information is configured to have "functions for:

confirming the file data record amount that the customer desires to save, which is accepted by the data saving service contract application procedure reception means 50; and determining the number of divisions of the file data so that the record amount is less than the maximum record capacity, when the confirmed file data record amount exceeds the maximum record capacity of one file defined in the system". Therefore, overflows of the customer file data desiring to be saved at the nodes and at the multiple recording devices networked to the nodes may be prevented beforehand.

Further, the digital asset guard service provision system 1 of the present embodiment, the rollover smart contract 44 further comprises, which is configured to have "a function for:

"setting new planets and distributed file management groups before the safekeeping period of the block set by the smart contract 39 for setting safekeeping period elapses, in order to extend the safekeeping period of each of the encrypted and multi-divided file data recorded as the block in the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and in the recording devices located at multiple bases networked to the nodes at the bases;

taking over the control number of the old server index information, changing to a new control number to generate new server index information;

re-recording the file data in the nodes $\mathbf{102}_{1\ through\ mb}$ (where mb is an integer of 2 or more) at each of the bases belonging to each of new the distributed file management groups $\mathbf{101}_{1\ through\ m}$ (where m is an integer of 2 or more) and in the recording devices located at multiple bases networked to the nodes at the bases; and then, deleting the file data and the old server index information for the file data recorded in the nodes located at each of the bases belonging to the distributed file management groups and in the recording devices located at multiple bases networked to the nodes at the bases". Therefore, if the customer desires to extend the safekeeping period, the safekeeping period of the file data close to the deadline may be extended and safekept.

Further, according to the digital asset guard service provision system 1 of the present embodiment, the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) and the recording devices located at multiple bases networked to the nodes at the bases are configured to "comprise:

the multiple sub-configuration file servers $\mathbf{103}_{1\ through\ p}$ (where p is an integer of 2 or more) each connected to the nodes at each of the bases or the recording devices at multiple bases, or file server groups accessible from the nodes at each of the bases belonging to each of the file management groups". Therefore, even if large divided file data exceeding the record capacity of the block that is encrypted, multi-divided, and uploaded into the first temporary storage area M1 is allotted to the nodes $\mathbf{102}_{1\ through\ mb}$ (where mb is an integer of 2 or more) at the bases and the recording devices located at multiple bases networked to the nodes at the bases for distribution and recording, and the multiple sub-configurations file servers $\mathbf{103}_{1\ through\ p}$ (P is an integer of 2 or more) may share and record the large file data.

Further, according to the digital asset guard service provision system 1 of the present embodiment, each of the distribution and recording smart contracts 32 is configured to have functions for:

"checking the data record capacity and usage status of each of the sub-configuration file servers $\mathbf{103}_{1\ through\ p}$ (p is an integer greater than or equal to 2) connecting to the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) or the recording devices located at multiple bases networked to the nodes at the bases;

selecting a specified sub-configuration file server having a data record capacity capable of recording the large file data encrypted, multi-divided and uploaded to the first temporary storage area M1 based on the confirmed data record capacity;

recording the large file data encrypted, multi-divided and uploaded to the first temporary storage area M1 on the file server of the selected specific sub-configuration; and recording information of the specified sub-configuration file server that records the large file data encrypted, multi-divided and uploaded to the first temporary storage area M1 in the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) as the second index information". Therefore, even if the large divided file data that is encrypted, multi-divided, and uploaded into the first temporary storage area M1 in excess of the block record capacity is allotted for distribution and recording, the sub-configuration file servers $\mathbf{103}_{1\ through\ p}$ (where p is an integer of 2 or more) having a data record capacity capable of recording the large file data may record the large file data, and information of the sub-configuration file servers that recorded the large file data may be managed.

Further, according to the digital asset guard service provision system 1 of the present embodiment, each of the distribution and recording smart contracts 32 is configured to have "a function for:

when the large file data encrypted, multi-divided and uploaded to the first temporary storage area M1 recorded in the sub-configuration file servers $\mathbf{103}_{1\ through\ p}$ (where p is an integer of 2 or more) connecting to the nodes $\mathbf{102}_{1\ through\ mb}$ (where mb is an integer of 2 or more) at each of the bases belonging to each of the distributed file management groups $\mathbf{101}_{1\ through\ m}$ (where m is an integer of 2 or more) or the recording devices located at multiple bases networked to the nodes at the bases exceeds an upper limit of the record capacity of the file server, for the file data that exceeds the upper limit of the record capacity of the file server, calculating remaining recordable capacities of each of other sub-configuration file servers connected to the nodes $\mathbf{102}_{1\ through\ mb}$ (where mb is an integer of 2 or more) at each of the bases belonging to each of the distributed file management groups $\mathbf{101}_{1\ through\ mb}$ (where m is an integer of 2 or more) or the recording devices located at multiple bases networked to the nodes at the bases;

selecting the optimal record destination sub-configuration file servers based on the calculated remaining recordable capacities;

recording in the selected sub-configuration file servers;

at the same time, changing the settings to put the original file server in a dormant state; and recording the information of the record destination sub-configuration file servers in the nodes 102$_{1\ through\ mb}$ (where mb is an integer of 2 or more) at each of the bases belonging to each of the distributed file management groups 101$_{1\ through\ m}$ (where m is an integer of 2 or more) as the second index information". Therefore, even if the large divided file data that is encrypted, multi-divided, and uploaded into the first temporary storage area M1 in excess of the block record capacity is allotted for distribution and recording, and the record amount of the large file data exceeds the record capacity of one sub-configuration, multiple sub-configuration file servers may share and record the large file data, and at the same time, information of the multiple sub-configuration file servers that recorded the large file data may be managed.

Further, according to the digital asset guard service provision system 1 of the present embodiment, the nodes 102$_{1\ through\ mb}$ (where mb is an integer of 2 or more) at each of the bases belonging to each of the distributed file management groups 101$_{1\ through\ m}$ (where m is an integer of 2 or more) and the recording devices located at multiple bases networked to the nodes at the bases are configured to "comprise the connecting sub-configuration file servers 103$_{1\ through\ p}$ (where p is an integer of 2 or more) connecting to either one of the nodes or recording devices or recording media connecting to the sub-configuration file servers that may be increased in number".

Therefore, with this configuration, when very large divided file data that is encrypted, multi-divided and uploaded to the first temporary storage area M1 exceeding the record capacity of the block is allotted for distribution and recording, or when the remaining recordable capacities of the sub-configuration file servers are insufficient, the multiple sub-configuration file servers 103$_{1\ through\ p}$ (where p is an integer of 2 or more) or recording media connected to the sub-configuration file servers including the increased number of sub-configuration file servers may share the recording by increasing additional file servers or recording media.

Further, according to the digital asset guard service provision system 1 of the present embodiment, the smart contract 84 for extracting encrypted and divided file data is configured to have "functions for:

referring to the second index information recorded in the nodes 102$_{1\ through\ mb}$ (where mb is an integer of 2 or more) at each of the bases belonging to each of the distributed file management groups 101$_{1\ through\ m}$ (where m is an integer of 2 or more);

detecting the multiple sub-configuration file servers which are the recording destinations of the encrypted and multi-divided large file data recorded as the second index information;

extracting the file data recorded in the sub-configuration file servers from the multiple sub-configuration file servers;

linking the multiple extracted file data; and restoring to the original encrypted and divided large file data". Therefore, in order to restore the large file data to the state before being saved, the large file data that is shared and recorded in the sub-configuration file servers 103$_{1\ through\ p}$ (where p is an integer of 2 or more) may be restored to the original encrypted and multi-divided large file data prior to the decryption and linkage process.

Further, the digital asset guard service provision system 1 of the present embodiment further comprises the small amount file data provisional recording means 100, the file data integration means 101, and the small amount file data deletion means 102.

The small amount file data provisional recording means 100 is configured to "record a small amount of file data to be saved in a predetermined confidential blockchain in real time within the range of block capacity", and the file data integration means 101 is configured to:

"integrate each of the small amount of file data recorded in the predetermined confidential blockchain into one integrated file data by batch process several times a day by the small amount file data temporary recording means 100; and use the integrated file data for the saving process including the division and encryption of the file data, and distribution and recording of the file data into the nodes at each of the bases belonging to the distributed file management groups and the recording devices at multiple bases networked to the nodes at the bases by the file data saving system 10.

And the small file data deletion means 102 is configured to:

"disconnect the corresponding chain of the blocks that record a small amount of file data in the predetermined confidential blockchain; and delete the file data recorded in the block after completing the saving process for the integrated file data by the file data saving system 10".

Therefore, the file data saving process, for file data that has a small capacity such as differential data and is generated at any time, may be performed efficiently.

Further, according to the digital asset guard service provision system 1 of the present invention, the file data integration means 101 is configured such that:

"each of the small amount of file data recorded in the predetermined confidential blockchain is integrated into one by batch process several times a day by the small amount file data temporary recording means 100;

then the integrated file data is passed to the smart contract 21 having the encryption and division algorithms 21*a* (where a is an integer between 1 and q, inclusive) accepted by the encryption and division algorithm selection reception means 22 in the file data saving system 10; and then, the passed integrated file data is controlled to operate the saving process including the division and encryption of the file data, and distribution and recording of the file data into the nodes at each of the bases belonging to the distributed file management groups and the recording devices at multiple bases networked to the nodes at the bases".

Therefore, the file data saving process, for file data that has a small capacity such as differential data and is generated at any time, may be materialized efficiently.

In addition, according to the digital asset guard service provision system 1 of the present embodiment, the small amount file data deletion means 102 is configured such that:

"a temporary safekeeping period for a predetermined number of days, for example, approximately seven days is set for the file data integrated into one by the file data integration means 101 and for which the file data saving system 10 has completed the saving process for the integrated file data among the file data recorded in the predetermined confidential blockchain by the small amount file data temporary recording means 100;

then, after the set provisional safekeeping period has elapsed, the chain of the corresponding block in the predetermined confidential blockchain is disconnected; and then, the file data recorded in the block whose chain is disconnected is deleted".

Therefore, this configuration prevents the accumulation of unnecessary file data in the predetermined confidential blockchain, makes maximum use of the predetermined confidential blockchain used for temporarily recording the small amount file data, and reduces the risk of leakage or theft of the predetermined confidential small amount file data recorded in the predetermined confidential blockchain.

Further, the digital asset guard service provision system 1 of the present embodiment, the file data saving system 10 further comprises the periodical record amount checking means 45, which is configured such that:

"when the file data from the customer desiring to save the file data, uploaded, distributed and recorded in the nodes $\mathbf{102}_{1\ through\ mb}$ (where mb is an integer of 2 or more) at each of the bases belonging to each of the distributed file management groups $\mathbf{101}_{1\ through\ m}$ (where mb is an integer of 2 or more) and in the recording devices located at multiple bases networked to the nodes at the bases exceeds the maximum file data record amount within a predetermined period, the customer is required to re-apply a file data saving service contract. If the customer does not re-apply the contract in response to a request for re-application procedure for the file data saving service contract, the action is treated as an error."

Therefore, even if the system is attacked by a third party with the intention of shutting down the system by uploading a large amount of data, data process that would result in an unlimited amount of recording will not occur, and the system may be prevented from be shut down.

Further, according to the digital asset guard service provision system 1 of the present embodiment, a node or recording device exists that is not connected to the internet connection in an inactive state in any base belonging to each of the distributed file management groups $\mathbf{101}_{1\ through\ m}$ (where m is an integer of 2 or more), and the node or recording device in the inactive state is configured to receive and record the encrypted and multi-divided file data recorded in nodes or recording devices in an operative state at another base upon restarting.

Therefore, the encrypted and multi-divided file data may easily be recovered by restarting the node in the inactive state.

Further, the digital asset guard service provision system 1 of the present embodiment comprises the data destructive attack detection means 91 and the automatic data saving means 92 upon being attacked, and the data destructive attack detection means 91 is configured such that:

the data destructive attack detection means 91 "detect the presence of data corruption due to equipment failure or attacks against the encrypted and multi-divided file data encrypted and multi-divided file data recorded in (the nodes $\mathbf{102}_{1\ through\ mb}$ (where mb is an integer of 2 or more) or the recording devices at any of the bases configuring) the planets $\mathbf{100}_{1\ through\ n}$ (where n is an integer of 2 or more); Then, the data destructive attack detection means 91 determines that a data destructive attack is taking place when, for example, the destruction of multiple file data managed in a certain period of time, such as 30 minutes, 8 hours, or 24 hours, is detected".

The automatic data saving means 92 upon being attacked is configured such that:

the automatic data saving means 92 upon being attacked stops the nodes $\mathbf{102}_{1\ through\ mb}$ (where mb is an integer greater than or equal to 2) at each of the bases configuring planets and the recording devices located at multiple bases networked to the nodes at the bases, or forcibly disconnects the Internet connection, when the data destructive attack detection means 91 detects attacks against the encrypted and multi-multi-divided file data. The automatic data saving means 92 upon being attacked disconnects the Internet connection and at the same time sets another network and automatically saves, the encrypted and multi-multi-divided file data distributed and recorded in the nodes $\mathbf{102}_{1\ through\ mb}$ (where mb is an integer of 2 or more) at the bases not attacked or the recording devices located at multiple bases networked to the nodes at the bases, to the nodes $\mathbf{102}_{1\ through\ mb}$ (where mb is an integer greater than or equal to 2) at each of the bases configuring another planet in which attacks against the encrypted and multi-multi-divided file data are not detected by the data destructive attack detection means 91, and to the recording devices at multiple bases networked to the nodes at the bases", Therefore, in the event of a cyberattack by a malicious third party, the encrypted and multi-divided file data safekept in a node at an operating base or in a recording device networked to the node is contaminated, this configuration may speedily stop spreading data contamination by the cyberattacks, and all the encrypted and multiple-divided file data including the file data safekept at the attacked bases may continuously be safekept in an uncontaminated state.

Further, the digital asset guard service provision system 1 of the present embodiment comprises the communication switching control means 93 which is configured to "maintain the inactive state of the node and the recording devices located at multiple bases networked to the nodes located at the bases, and the state of disconnecting from the Internet, and switch to connection with another communication means such as an LTE different from the Internet, when an attack is detected against the encrypted and multi-divided file data in the inactive state."

Therefore, in the event of a cyberattack by a malicious third party, even if the encrypted and multi-divided file data safekept in a node at an operating base or in a recording device networked to the node is contaminated, this configuration may speedily stop spreading data contamination by the cyberattacks, minimize the number of the damaged nodes or the recording devices networked to the nodes, protect against further cyberattacks by the malicious third parties, and continue safekeeping the encrypted and multi-divided file data in the nodes at other bases or the recording devices networked to the nodes.

Further, according to the digital asset guard service provision system 1 of the present embodiment, the automatic data saving means 92 upon being attacked is configured to:

"automatically save, the encrypted and multi-divided file data distributed and recorded in the nodes at the bases not being attacked that configure the planets and in the recording devices at multiple bases networked to the nodes at the bases, to the nodes $\mathbf{102}_{1\ through\ mb\ through\ mb}$ (where mb is an integer of 2 or more) at each of the bases configuring other planets in which the encrypted and multi-divided file data are not attacked, and to the recording devices located at multiple bases networked to the nodes at the bases via a communication means other than the Internet, such as an LTE, when the data destructive attack detecting means 91 detects an attack against the encrypted and multi-divided file data".

Therefore, in the event of a cyberattack by a malicious third party, even if the encrypted and multi-divided file data safekept in a node at an operating base or in a recording device networked to the node is contaminated, this configuration may protect against further cyberattacks by the malicious third parties via a communication means separate from the Internet such as an LTE and the like, and all the encrypted and multiple-divided file data including the file data safekept at the attacked bases may continuously be safekept in an uncontaminated state.

Furthermore, the digital asset guard service provision system 1 of this embodiment is configured such that:

file data comprising digital assets to be guarded and some high-valued information includes tokens, customer information of existing business systems, asset information, source codes and modules, confidential information, design documents, parameters for settings, digital contracts, rights, designs, and other data that may be expressed digitally in general.

Therefore, this configuration may protect a wide variety of digital assets from sophisticated cyberattacks.

In addition, according to the digital asset guard service provision system 1 of the present embodiment, the data saving service contract application procedure reception means 50 is configured to further accept designations of:

"guarantee levels of the file data to be saved", "the nodes $\mathbf{102}_{1\ through\ mb}$ (where mb is an integer of 2 or more) at each of the bases configuring each of the planets $\mathbf{100}_{1\ through\ n}$ (where n is an integer of 2 or more)", and "levels of the file data saving and restoration system configuration for operating "the recording devices at multiple bases networked to the nodes at the bases, file data saving system 10", from the customer when accepting the data saving service contract application procedure.

Therefore, the levels of the file data saving system configuration used for safekeeping the file data to be saved in the asset guard service provision system may be set.

Further, according to the digital asset guard service provision system 1 of the present embodiment, the nodes $\mathbf{102}_{1\ through\ mb}$ (however, (mb is an integer greater than or equal to 2) at each of the bases configuring each of the distributed file management groups $\mathbf{101}_{1\ through\ m}$ (where m is an integer of 2 or more) and the recording devices located at multiple bases networked to the nodes located at the bases are configured such that:

"operating time frames thereof are different, the operating and inactive states are mixed, and the nodes located at all bases and the recording devices located at multiple bases networked to the nodes at the bases are operated in 24 hours. At a predetermined time point, within each of the distributed file management groups, nodes located at least one of the bases or the recording devices located at least one of the bases networked to the nodes at the bases are operated.

Therefore, even if the encrypted and multi-divided file data safekept in the nodes at the base being operated and the recording devices networked to the nodes at the base are contaminated by the cyberattacks of the malicious third parties, contamination of the encrypted and multi-divided file data safekept in the nodes at inactive bases and the recording devices networked to the nodes at the bases may be avoided. And the encrypted and multi-divided file data may continue to be safekept in the uncontaminated state by switching the uncontaminated encrypted and multi-divided file data to a communication means other than the Internet, such as an LTE.

Further, according to the digital asset guard service provision system 1 of the present embodiment, the nodes $\mathbf{102}_{1\ through\ mb}$ (where mb is an integer of 2 or more) at each of the bases configuring each of the distributed file management groups $\mathbf{101}_{1\ through\ m}$ (where m is an integer of 2 or more) and the recording devices located at multiple bases networked to the nodes located at the bases are configured to "utilize night power during nighttime hours and be operated only during nighttime hours. At a predetermined time point, within each of the distributed file management groups, nodes located at least one of the bases or the recording devices located at least one of the bases networked to the nodes at the bases are operated. And when transitioning from an inactive state to an operating state, the nodes at the bases or the recording devices at the bases networked to the nodes at the base automatically corrects the safekept file data and other information to the latest information within each of the distributed file management groups".

Therefore, a system that effectively uses power and at the same time, reduces costs may be configured.

Further, according to the digital asset guard service provision system 1 of the present embodiment, the nodes $\mathbf{102}_{1\ through\ mb}$ (where mb is an integer of 2 or more) at each of the bases and the recording devices at multiple bases networked to the nodes at the bases are configured to comprise a container or housing comprising power generation equipment utilizing renewable energy such as solar power, a file server and CPU, 5G communication equipment, and a battery.

Therefore, this configuration may embody a system to effectively utilize unstable power sources, make third parties extremely difficult to infiltrate networks in a closed environment, and to provide the strongest level of attack resistance against cyberattacks.

In addition, since power is mainly used during daytime hours, the power supply may decrease during daytime hours and there may be significant communication delays between users and equipment. However, use of renewable energy such as sunlight may alleviate communication delays between users and equipment when the supply of market power decreases.

Further, according to the digital asset guard service provision system 1 of the present embodiment, the nodes $\mathbf{102}_{1\ through\ mb}$ (where mb is an integer of 2 or more) at each of the bases and the recording devices at multiple bases networked to the nodes at the bases are configured to comprise a container or housing comprising a file server and CPU, 5G communication equipment, battery that can withstand short-term operation, cooling device, and the like, so it is highly unlikely that a third party will intrude into the network in a closed environment, and the configuration may realize a system that has the highest level of resistance against cyberattacks.

Furthermore, the digital asset guard service provision system 1 of the present embodiment is configured such that:

"the file data record capacity provided in the nodes held by the node holders participating in the consortium-type blockchain and the file data record amount used by the node holders are canceled out and differences between the total file data record amount and the provided file data record capacity are calculated. Then, collection and distribution of the money amount based on the calculated differences is performed for each node holder". Therefore, the profit distribution for the node holders participating in the consortium-type blockchain may accurately be adjusted.

Moreover, the digital asset guard service provision system 1 of this embodiment further comprises the customer registration information designation reception means 94 and the smart contract 95 for customer registration, and the customer registration information designation reception means 94 is configured to "accept designations of the customer ID and terminal information, that is, the fixed IP address from the customer desired to save the file data". The smart contract 95 for customer registration is configured to "comprise a function for encrypting and recording the customer ID accepted by the information designation reception means 94, and the terminal information and, that is the fixed IP address used for saving and restoring the file data in the node groups located at the specified bases in the consortium-type blockchain".

Therefore, the system intrusion using communication terminals of the malicious third parties may be prevented by limiting the terminals used for saving and restoring the file data specified by the customer.

Further, the digital asset guard service provision system 1 of the present embodiment further comprises the first parameter designation reception and recording means 96 which is configured to "accept a designation of the first parameter P1 from the customer desiring to save the file data, and record the first parameter for which the designation is accepted in an offline recording medium". Therefore, the customer may specify and manage offline the first parameter P1.

Further, the digital asset guard service provision system 1 of the present embodiment further comprises the second parameter designation reception and setting means 97 which is configured to "accept a designation of the second parameter P2 from the co-administrator of the consortium-type blockchain, and set and modularize the second parameter for which the designation is accepted in the source code of the predetermined smart contract that performs the corresponding process". Therefore, the configuration may be capable of specifying the second parameter P2 by the co-administrator of the consortium-type blockchain, and modularizing the second parameter specified by the co-administrator into a smart contract.

Further, the digital asset guard service provision system 1 of the present embodiment is configured with the index information generation means, the index information recording means, the encrypted index information extraction means, and the index information decryption means separately on the customer side and on the co-administrator of the consortium-type blockchain.

The index information generation means comprises "the program (wallet function) or smart contract 33-1 for generating customer-side index information that operates on the customer side who desires to save the file data, and the smart contract 33-2 for generating co-administrator side index information that operates on the co-administrator side of the consortium-type blockchain. The program (wallet function) or smart contract 33-1 for generating customer-side index information is configured to have a function for "generating the customer-side index information having the original file name, upload date information, and safekeeping deadline of the file data to be saved when uploaded into the first temporary storage area M1 using the upload means 25". The smart contract 33-2 for generating co-administrator side index information is configured to have a function for "generating the co-administrator-side index information having the file name information and corresponding encrypted record destination information after renaming each of the file data distributed and recorded by each of the distribution and recording smart contracts 32. The index information recording means comprises "the program or smart contract 34-1 for recording customer-side index information that operates on the customer side who desires to save the file data, and the smart contract 34-2 for recording co-administrator side index information that operates on the co-administrator side of the consortium-type blockchain". The program or smart contract 34-1 for recording customer-side index information comprises a function for encrypting and recording the customer-side index information generated by the program or smart contract 33-1 for generating customer-side index information in node groups at specified bases in the consortium-type blockchain, when approval is granted using the first secret key for accessing the blockchain 132 generated based on the first secret key, that is, the first offline decryption key K11 generated by the customer. The smart contract 34-2 for recording co-administrator side index information is configured to have a function for encrypting and recording the co-administrator side index information generated by the smart contract 33-2 for generating the co-administrator side index information into node groups located at specified bases at the consortium-type blockchain, when approval is granted using the second secret key for accessing the blockchain 232 generated based on the second secret key, that is, the second offline decryption key K21 generated by the co-administrator of the consortium-type blockchain. The encrypted index information extraction means comprises "the smart contract 82-1 for extracting customer side encrypted index information that operates on the customer side who desires to restore the file data, and the smart contract 82-2 for extracting encrypted co-administrator side index information that operates on the co-administrator side of the consortium-type blockchain.

The smart contract 82-1 for extracting customer side encrypted index information is configured to have a function for:

"extracting the customer side index information recorded and encrypted in the node groups at the specified bases in the consortium-type blockchain by the customer-side encrypted index information recording smart contract 34-1 based on the first parameter P1 and second parameter P2 associated with the file data to be extracted that is accepted by the file data extraction instruction reception means 81, when authentication is granted using the first secret key for blockchain access K112 generated based on the first secret key, that is the first offline decryption key K11 generated by the customer".

The smart contract 82-2 for extracting the co-administrator side encrypted index information is configured to have a function for:

"extracting the co-administrator side index information recorded and encrypted in the node groups at the specified bases in the consortium-type blockchain by the smart contract 34-2 for recording co-administrator-side encrypted index information based on the first parameter P1 and second parameter P2 associated with the file data to be extracted that is accepted by the file data extraction instruction reception means 81, when authentication is granted using the second secret key for blockchain access K212 generated based on the second secret key, that is, second offline decryption key K21 generated by the co-administrator of the consortium-type blockchain".

The index information decryption means is configured to comprise "the smart contract 83-1 for decrypting the customer side index information that operates on the customer side who desires to restore the file data, and the smart contract 83-2 for decrypting the co-administrator side index information on the co-administrator side that operates on the co-administrator side of the consortium-type blockchain".

The smart contract 83-1 for decrypting customer side index information is configured to have a function for:

"decrypting the customer side encrypted index information extracted by the smart contract 82-1 for extracting customer-side encrypted index information based on the first secret key, that is, the first offline decryption key K11 generated by the customer."

The smart contract 83-2 for decrypting co-administrator-side index information is configured to have a function for:

"decrypting the encrypted co-administrator side index information extracted by the smart contract 82-2 for extracting the co-administrator side encrypted index information based on the second secret key, that is, the second decryption key K21 generated by the co-administrator of the consortium-type blockchain. Therefore, this configuration has the following effects.

That is, the co-administrator of the consortium-type blockchain may not comprehend the customer-side index information, and the customer may not comprehend the co-administrator side index information. Moreover, the each of the encrypted index information may also almost be impossible to be extracted by safekeeping offline each of the first secret key K112 for blockchain access generated based on the first private key, that is, first offline decryption key K11 generated by the customer, and the second secret key K212 for blockchain access generated based on the second secret key, that is, second decryption key K21 generated by the co-administrator of the consortium-type blockchain.

Therefore, the process in the file data saving system 20 on the customer side and the process in the file data saving system 30 on the co-administrator side are fragmented, and the risk of malicious third parties simultaneously stealing the processed data for file data saving in the file data saving systems 20 and 30 on both the customer and co-administrator sides is extremely low.

The process in the file data restoration system on the customer side and the process in the file data restoration system on the co-administrator side are then fragmented. Therefore, the risk of the processed data for the file data restoration in the file data restoration systems 70 and 80 on both the customer and co-administrator sides being stolen simultaneously by a malicious third party is extremely low.

As a result, the attack resistance of digital assets against high-level cyberattacks may be further strengthened.

Further, according to the digital asset guard service provision system 1 of the present embodiment, in the node groups located at the specified bases in the consortium-type blockchain, the following is recorded in an encrypted state:

"IP addresses, user IDs and the first parameter P1 as the customer setting information, and "co-administrator side smart contract address information that can refer to the customer setting information";

"file names and file data capacities, process date and time, and safekeeping deadline when the file data is saved, and the smart contract setting information operating for saving the customer file data on the co-administrator side as the index information"; and further, "renamed file name information of each file data distributed and recorded by each of the distribution and recording smart contracts 32 as co-administrator side index information", each of which are recorded in an encrypted state.

Therefore, all information on the saving of the customer file data, such as customer information at the time of a new application and information on the saving of the file data recorded in the blockchain, can be made invisible to both the customer and the co-manager of the consortium-type blockchain, while at the same time allowing only the programs such as smart contracts can be made aware of such information.

As a result, the risk of information being comprehended by a malicious third party would become extremely low.

Further, according to the digital asset guard service provision system 1 of the present embodiment, the recording devices located at multiple bases networked to the nodes located at each of the bases are configured with nodes configuring the same blockchain network as the nodes at the bases, or with devices that do not belong to the blockchain network configured with the nodes at the bases and that can connect to the nodes at the bases in an accessible state.

Therefore, the recording devices that distribute and record may be easily managed and an environment that prevents intrusion by malicious third parties and external leakage of data may easily be generated.

Furthermore, according to the digital asset guard service provision system 1 of the present embodiment, the recording devices located at multiple bases networked to the nodes located at each of the bases are configured with devices configuring another network different from the nodes at the bases. Therefore, the capacity for recording the file data may be increased.

Furthermore, according to the digital asset guard service provision system 1 of this embodiment, the second parameter P2 specified by the co-administrator of the consortium-type blockchain is configured to be hard-coded inside the smart contract 31 for allotting distributed file management groups and the smart contract 84 for extracting encrypted and divided file data.

Since the smart contracts may not be recompiled, the risk that a malicious third party comprehends the contents of the second parameter P2 becomes extremely low. As a result, the attack resistance of digital assets against high-level cyberattacks may be further strengthened.

Furthermore, according to the digital asset guard service provision system 1 according to the modification of the present embodiment, since the consortium-type blockchain is configured to include the private type blockchain, the consortium-type blockchain configuration may be further broadened. Note that since a private blockchain is a blockchain that has confidentiality, this may easily prevent intrusion from malicious third parties.

Further, according to the digital asset guard service provision system 1 according to the modified example of the present embodiment, a private blockchain is configured to comprise a planet comprising a node group that is a combination of multiple virtual nodes located at one base.

Therefore, by positioning the multiple recording devices in different regions in the world that are networked to each node in node groups combining multiple virtual nodes of the private blockchain, even if the divided customer file data to be saved is lost when the nodes at one base belonging to distributed file management groups or the recording devices networked to the node is attacked by electromagnetic pulses, the nodes located at other bases belonging to the distributed file management group or the recording devices networked to the nodes is protected from attacks to be able to maintain the file data.

Further, according to the digital asset guard service provision system 1 according to the modified example of the present embodiment:

the co-administrator side file data saving system 10 is configured to comprise the smart contract 30X for saving co-administrator side file data "configured to combine each of the functions of the smart contract 31 for allotting distributed file management groups, the distribution and recording smart contract 32, the smart contract 33 for generating server index information, and the smart contract 34 for recording server index information"; and the co-administrator-side file data restoration system 60 is configured to comprise the smart contract 80X for restoring the co-administrator side file data "configured to combine each of the functions of the smart contract 82 for extracting encrypted server index information, the smart contract 83 for decrypting server index information, and the smart contract 84 for extracting encrypted and divided file data".

Accordingly even if one single smart contract is configured to incorporate the functions of the multiple smart contracts described above, obtaining the same effects as the digital asset guard service provision system of the present invention having the multiple smart contracts described above is also probable.

Further, according to the digital asset guard service provision system 1 according to the modified example of the present embodiment, the smart contract 30X for saving co-administrator side file data is configured such that, the second parameter P2 specified by the co-administrator of the consortium-type blockchain, or the second compound parameter P2X, (comprising a pair of the second decryption parameter P2X1 specified by the co-administrator and managed offline (that is incorporated and modularized in the predetermined smart contract that performs the corresponding process) and the encryption parameter P2X2 automatically generated from the second decryption parameter P2X1 (that is incorporated and modularized in the predetermined smart contract that performs the corresponding process)), is internally hard-coded.

In this manner, even in a configuration in which the functions of the multiple smart contracts described above are incorporated in one smart contract, similar effects may be obtained, in the digital asset guard service of the present invention having the multiple smart contracts described above, as the configuration in which the second parameter or the second compound parameter (comprising a pair of the second decryption parameter (that is incorporated and modularized in the predetermined smart contract that performs the corresponding process) and the encryption parameter automatically generated from the second decryption parameter (that is incorporated and modularized in the predetermined smart contract that performs the corresponding process)) is hard-coded internally.

Further, according to the digital asset guard service provision system 1 according to the modified example of the present embodiment, the smart contract 30X for saving co-administrator side file data is configured to comprise the following functions:

"a key for renaming and encryption is generated using the first parameter P1 specified by the customer desiring to save the file data and the second parameter hard-coded internally. Then, the smart contract 30X for saving co-administrator side file data renames and encrypts the file names of each of the file data (encrypted and multi-divided by the file data encryption and division means 24 and) uploaded into the first temporary storage area M1 by the upload means 25 using the renaming and encryption key, then, after the encryption process is performed, the file names are allotted to multiple distributed file management groups."; and "before generating and encrypting server index information (comprising renamed file name information of each of the distributed and recorded file data, and address information of the nodes and the recording devices that are safekeeping destinations of the file data in each of the distributed file management groups to which each file data is allotted.), and recording into the node groups located at the specified bases in the consortium-type blockchain, new server index information is generated by changing the renamed name to a further different name for the renamed file name information and the address information of the nodes and the recording devices which are safekeeping destinations based on the second parameter P2 that is internally hard-coded. Then the newly generated server index information is encrypted and recorded in the node group located at the specified base in the consortium-type blockchain. After the recording process, the renamed file name information of each of the distributed and recorded original file data, and the address information of the nodes and the recording devices that are safekeeping destinations of the file data in each of the distributed file management groups to which each file data is allotted, are deleted."

Therefore, even if the server index information is stolen by a malicious third party, this configuration makes even more difficult for a third party to recognize the renamed file name information in the server index information and the address information of the nodes and the recording devices to be the safekeeping destinations as the information on the file name of the original file data to be saved by the customer and the address information of the nodes and the recording devices to be the safekeeping destinations. This may further strengthen the attack resistance of digital assets against high-level cyberattacks.

Further, according to the digital asset guard service provision system 1 according to another modification of the present embodiment, the smart contract 30X for saving co-administrator side file data is configured to have functions described as follows:

"The file name is changed to a name that is further different from the renamed file name based on the second parameter P2 hard coded therein;

Then, new server index information is generated by adding dummy file information to the renamed file name information and to the address information of the nodes and recording devices safekeeping the file data;

Then, the generated new server information is encrypted and record in the node groups located at the specified bases in the consortium-type blockchain;

After the recording, the renamed file name information of each of the original distributed and recorded server index information, and the address information of the nodes and recording devices safekeeping the file data in each of the distributed file management groups to which each file data is allotted, are deleted."

Therefore, even if the server index information is stolen by a malicious third party, the malicious third party may have further difficulty for recognizing the file name information of the original customer file data to be saved, and the address information of the nodes and recording devices safekeeping the file data, from the renamed file name information to which the dummy file information is added, and the address information of the nodes and recording devices safekeeping the file data in the server index information.

This may further strengthen the attack resistance of digital assets against high-level cyberattacks.

Further, according to the digital asset guard service provision system 1 according to the modification of the present embodiment, the smart contract 80X for restoring co-administrator side file data is configured to have functions described as follows.

"the name restoration and decryption key is generated using:

the first parameter P1 specified by the customer or the first compound parameter P1X (comprising the pair of the first decryption parameter P1X1 specified by the customer and managed offline and the first encryption parameter P1X2 automatically generated from the first decryption parameter P1X1); and the second parameter P2 which is hard coded inside and specified by the co-administrator of the consortium-type blockchain, or the second compound parameter P2X (comprising the pair of the second decryption parameter P2X1 specified by the co-administrator and managed offline (that is incorporated and modularized in the predetermined smart contract that performs the corresponding process) and the encryption parameter P2X2 automatically generated from the second decryption parameter P2X1 (that is incorporated and modularized in the predetermined smart contract that performs the corresponding process)).

Then, the encrypted server index information is extracted that is recorded in the node groups at specified bases in the consortium-type blockchain. Then, after the extraction process, the new server index information is set back in which the name is changed to a name that is further different from the renamed file name based on the internally hardcoded second parameter P2 or second compound parameter P2X.

Then, subsequent to the process, the changed name is set back to the renamed file name information. Then, based on the name restoration and decryption key, the file name information before renaming each of the distributed and recorded file data is restored.

Therefore, a malicious third party may have further difficulty for recognizing the renamed file name information and the address information of the nodes and recording devices safekeeping the file data in the server index information as the file name information of the original customer file data to be saved, and the address information of the nodes and recording devices safekeeping the file data.

This may further strengthen the attack resistance of digital assets against high-level cyberattacks and the customer may restore the original file data.

Further, according to the digital asset guard service provision system 1 according to the modification of the present embodiment, the smart contract 80X for restoring co-administrator side file data is configured to have functions described as follows.

"the name restoration and decryption key are generated using:

the first parameter P1 specified by the customer or the first compound parameter P1X (comprising a pair of the first decryption parameter P1X1 specified by the customer and managed offline and the first encryption parameter P1X2 automatically generated from the first decryption parameter P1X1); and the second parameter P2 which is hard coded inside and specified by the co-administrator of the consortium-type blockchain, or the second compound parameter P2X (comprising a pair of the second decryption parameter P2X1 specified by the co-administrator and managed offline (that is incorporated and modularized in the predetermined smart contract that performs the corresponding process) and the encryption parameter P2X2 automatically generated from the second decryption parameter P2X1 (that is incorporated and modularized in the predetermined smart contract that performs the corresponding process)).

Then, the encrypted server index information is extracted that is recorded in the node groups at specified bases in the consortium-type blockchain. Then, after the extraction process, the dummy file information is excluded based on the internally hardcoded second parameter P2 or second compound parameter P2X. Subsequent to the process, the new server index information is set back in which the name is changed to a name that is further different from the renamed file name. Subsequent to the process, the changed name is set back to the renamed file name information. Then, based on the name restoration and decryption key, the file name information before renaming each of the distributed and recorded file data is restored.

Therefore, the malicious third party may have further difficulty for recognizing the file name information of the original customer file data to be saved, and the address information of the nodes and recording devices safekeeping the file data, from the renamed file name information to which the dummy file information is added, and the address information of the nodes and recording devices safekeeping the file data in the server index information.

This may further strengthen the attack resistance of digital assets against high-level cyberattacks and the customer may restore the original file data.

Further, the digital asset guard service provision system 1 according to the modification of the present embodiment for guarding digital assets against high-level cyberattacks, comprising a decentralized ledger using the dispersed technique, and a server application for performing a predetermined process using data managed in the decentralized ledger, the digital asset guard service provision system is characterized by comprising:

the consortium-type asynchronous decentralized ledger group configured with the multiple planets 100$_{1\ through\ n}$ (where n is an integer of 2 or more) (a planet is a unit comprising an asynchronous decentralized ledger group) comprising node groups that link the nodes located at multiple bases in different regions in the world;

the file data saving system 10; and the file data restoration system 60;

wherein the nodes located at each of the bases are networked to the recording devices at the multiple bases in the different regions in the world to form the distributed file management groups 101$_{1\ through\ m}$ (where m is an integer greater than or equal to 2), wherein the file data saving system 10 comprises:

the programs 21$_{1\ through\ q}$ (where q is an integer of 10 or more) having multiple encryption and division algorithms;

the encryption and division algorithm selection reception means 22;

the file data saving instruction reception means 23;

the file data encryption and division means 24;
the upload means 25;
the distributed file management groups allotment means 31';
the distribution and recording means 32';
the system setting information generation and recording means 98';
the server index information generation means 33';
the server index information recording means 34';
the customer setting information generation means or program 99' having a wallet function for generating customer setting information generation;
the customer index information generation means or program 27' having a wallet function for generating customer index information;
the customer index information recording means 28'; and
the first data deletion means;

wherein the file data restoration system comprises 60:
the multiple programs having decryption and linkage algorithms;
the file data extraction instruction reception means 81;
the encrypted server index information extraction means;
the server index information decryption means;
the encrypted and divided file data extraction means;
the download means;
the file data restoration means; and
the second data deletion means 74;

wherein the programs $\mathbf{21}_{1\ through\ q}$ (where q is an integer of 10 or more) "having the multiple encryption and division algorithms is configured to have the different file data encryption and division process method", wherein the encryption and division algorithm selection reception means 22 is configured to "accept a selection of the programs $\mathbf{21}_{1\ through\ q}$ (where q is an integer of 10 or more) having encryption and division algorithms, and the programs $\mathbf{21}_{1\ through\ q}$ (where q is an integer of 10 or more) having predetermined encryption and division algorithms based on the first parameter P1 specified by a customer who desires to save the file data", wherein the file data saving instruction reception means 23 is configured to "accept a file data saving instruction from a customer who desires to save the file data, wherein the file data encryption and division means 24 is configured to "encrypt and multi-divide the customer file data to be saved, the customer file data being accepted by the file data saving instruction reception means 23, using the program 21 having the encryption and division algorithm 21*a* (where a is an integer between 1 and q) accepted by the encryption and division algorithm selection reception means 22, wherein the upload means 25 is configured to upload each of the file data encrypted and multi-divided by the file data encryption and division means 24 to the first temporary storage area M1, wherein the distributed file management group allotment means 31' is configured to "have a function for allotting, each of the file data (that is encrypted and multi-divided by the file data encryption and division means 24, and) uploaded into the first temporary storage area M1 by the upload means 25, to the multiple distributed file management groups $\mathbf{101}_{1\ through\ m}$ (where m is an integer greater than or equal to 2), (which is configured with the nodes $\mathbf{102}_{1\ through\ mb}$ (where mb is an integer of 2 or more) located at each of the bases configuring for the planets $\mathbf{100}_{1\ through\ n}$ (n is an integer of 2 or more) set on the co-administrator side in a condition specified by the customer and the recording devices located at multiple bases networked to the nodes at the bases) based on the first parameter P1 and the second parameter P2 specified by the co-administrator of the consortium-type asynchronous decentralized ledger group", wherein the distribution and recording means 32' is configured to "have a function to distribute and record each of the file data allotted by the distributed file management group allotment means 31', in the nodes $\mathbf{102}_{1\ through\ mb}$ (where mb is an integer of 2 or more) located at each of the bases belonging to each of the corresponding distributed file management groups $\mathbf{101}_{1\ through\ m}$ (where m is an integer greater than or equal to 2) and in the recording devices located at multiple bases networked to the nodes at the bases", wherein the system setting information generation and recording means 98' is configured to "have a function for generating and encrypting the system setting information comprising:

destination identifying information such as terminal information, that is a fixed IP address for uploading the file data to the first temporary storage area M1 using the upload means 25;

numbers of the predetermined process means performing a corresponding process of a customer file data recording destination;

planet information to which the file data recording destination belongs; and file server group information in the nodes at predetermined bases and the recording devices located at multiple bases networked to the nodes at the bases, configuring distributed file management groups", wherein the server index information generation means 33' is configured to "generate server index information that comprises:
information on file names of each of the file data distributed and recorded by each of the distribution and recording means 32'; and
configuration information of each of the distributed file management groups which are allotment destinations of each file data", wherein the server index information recording means 34' is configured to "have a function for encrypting server index information generated by the server index information generation means 34', and for recording the server index information into node groups located at specified bases in the consortium-type asynchronous decentralized ledger group, wherein the customer setting information generation means or program 99' having a wallet function for generating customer setting information is configured to "generate customer setting information that comprises the first parameter P1 setting information associated with the programs $\mathbf{21}_{1\ through\ q}$ (where q is an integer of 10 or more) having the encryption and division algorithms accepted by the encryption and division algorithm selection reception means 22";

wherein the customer index information generation means or program 27' having a wallet function for generating customer index information for generating customer index information is configured to "have a function for generating customer index information that comprises information on the original file name and upload date of customer file data to be saved, wherein the customer index information recording means 28' is configured to "have a function for encrypting the customer index information generated by the customer index information generation means or program 27' having a wallet function for generating customer index information, and for recording the encrypted customer index information into node groups located at specified bases in the consortium-type asynchronous decentralized ledger group", wherein the first data deletion means 46 is configured to "delete each of the file data uploaded into the first temporary storage area M1, after the server index information is encrypted by the server index information recording means 34' and recorded in the node group located at the specified base in the consortium-type asynchronous decentralized ledger group, wherein the programs $\mathbf{71}_{1\ through\ q}$ (where q is an integer of 10 or more) having the multiple decryption and linkage algorithms are configured to "differentiate file data decryption and linkage process methods that are associated with the programs $\mathbf{21}_{1\ through\ q}$ (where q is an integer of 10 or more) having each of the encryption and division algorithms", wherein the file data extraction instruction reception means 81 is configured to "accept a file data extraction instruction from a customer who desires to restore the file data", wherein the encrypted server index information extraction means 82' is configured to "have a function for extracting the encrypted server index information (recorded in the node group located at the specified base in the consortium-type asynchronous decentralized ledger group by the server index information recording means 34') based on:

the first parameter P1 associated with the file data to be saved which is accepted by the file data extraction instruction reception means 81 or the first compound parameter P1X (comprising the pair of the first decryption parameter P1X1 that is specified by a customer and managed offline, and the first encryption parameter P1X2 that is automatically generated from the first decryption parameter P1X1); and the second parameter P2 or the second compound parameter P2X (comprising the pair of the second decryption parameter P2X1 that is specified by the co-administrator and managed offline (which is incorporated and modularized within the predetermined smart contract that performs a corresponding process), and the second encryption parameter P2X2 that is automatically generated from the second decryption parameter P2X1 (which is incorporated and modularized within het predetermined smart contract that performs a corresponding process))", wherein the server index information decryption means 83' is configured to "have a function for decrypting the encrypted server index information extracted by the encrypted server index extraction means 82'", wherein the encrypted and divided file data extraction means 84' is configured to "have a function for extracting each of the encrypted and multi-divided file data (which are allotted to each of the distributed file management groups $\mathbf{101}_{1\ through\ m}$ (where m is an integer of 2 or more) by the distributed file management group allotment means 31', and which are distributed and recorded in the nodes $\mathbf{102}_{1\ through\ mb}$ (mb is an integer of 2 or more) located at each of the bases belonging to each of the distributed file management groups $\mathbf{101}_{1\ through\ m}$ (where m is an integer of 2 or more) and in the recording devices located at multiple bases networked to the nodes at the bases by each of the distribution and recording means 32') from any of the nodes $\mathbf{102}_{1\ through\ mb}$ (mb is an integer of 2 or more) located at each of the bases belonging to each of the distributed file management groups $\mathbf{101}_{1\ through\ m}$ (where m is an integer of 2 or more) or from the recording devices located at multiple bases networked to the nodes at the bases, using the server index information decrypted by the server index information decryption means 83'"

wherein the download means 72 is configured to "download each of the encrypted and multi-divided file data, extracted by the encrypted and multi-divided file data extraction means 84', to the second temporary storage area M2", wherein the file data restoration means 73 is configured to "decrypt, each of the encrypted and multi-divided file data (which are extracted by the encrypted and multi-divided file data extraction means 84' and) downloaded to the second temporary storage area M2 by the download means 72, to integrate into one file data and to restore to the file data before being saved, using the program 71alpha (alpha is an integer between 1 and q) having the decryption and linkage algorithms associated with the program 21 having the encryption and division algorithms 21*a* (where, a is an integer from 1 through q) accepted by the encryption and division algorithm selection reception means 22", and wherein the second data deletion means 74 is configured to "delete each of the encrypted and multi-divided file data downloaded to the second temporary storage area M2 after restored to the file data before being saved by the file data restoration means 73".

Even with this configuration, as with the configuration using blockchain, important information such as confidential information and personal information may be strongly and efficiently protected, and the important information may be restored without being stolen by a third party, even if this configuration is subjected to cryptographic analysis by quantum computers or EMP attacks.

In this manner, in the digital asset guard service provision system 1 of the present embodiment, on a basis of the consortium-type blockchain having the worldwide spread nodes, important information can be managed in a distributed manner on a global scale by combining distributed file management and blockchain management of distributed index information.

Therefore, saved important information may be protected in response to localized cyberattacks such as EMP attacks and physical destruction.

In addition, in the digital asset guard service provision system 1 of this embodiment, for example, as shown in FIG. 102, processes are fragmented into two systems, processes on the customer/user side (encryption and division of file data using the secret sharing technique), and processes on the consortium side (file name and format change, allotment, distribution and recording of encrypted and divided file data, and generation and encryption of index information).

The digital asset guard service provision system 1 of this embodiment is configured such that the customer may not comprehend the parameters, encryption keys, and process information on the consortium side, and the consortium side may not comprehend the parameters, the encryption keys, and the process information on the customer side.

At the same time, in the digital asset guard service provision system 1 of this embodiment, a process path for saving file data (upstream process path) and a process path for restoring file data (downstream process path) are fragmented. The digital asset guard service provision system 1 of this embodiment comprises a configuration in which encryption keys and parameters are configured to be managed offline, and restoration process is performed upon the authentication of the consortium when restoring file data. Therefore, according to the digital asset guard service provision system 1 of this embodiment, even if the customer side or the consortium side were cyberattacked by a quantum computer and has the data contaminated, the saved important information may be preserved without being destroyed.

Moreover, in the digital asset guard service provision system 1 of the present embodiment, the process on the consortium side when saving file data (file name and format change, allotment, distribution and recording of encrypted and divided file data) is configured to be performed in a black box based on the parameters specified by the consortium and customer. Concurrently, in the digital asset guard service provision system 1 of this embodiment, the process on the consortium side when restoring file data (extraction and file name and format re-change of file data) is also configured to be performed in a black box using parameters specified by the consortium and customer. Moreover, in the digital asset guard service provision system 1 of this embodiment, the customer terminals that can access the consortium side for saving and restoring file data may be restricted, and the time frame during which file data may be saved is extremely short.

Therefore, according to the digital asset guard service provision system 1 of the present embodiment, even if either the customer side or the consortium side suffers a cyberattack by a malicious third party, the contents of the file data may not be deciphered. File data may not be restored even if either the customer or the consortium suffers a cyberattack by a malicious third party.

Therefore, according to this embodiment, important information such as confidential information and personal information may be strongly and efficiently protected from high-level cyberattacks and physical destruction, and even when subjected to cryptanalysis and EMP attacks by quantum computers. The digital asset guard service provision system that can restore important information without being stolen by a third party may be obtained.

in detail above, the present invention is not limited to the above-described embodiments, and the present invention may be applied within the scope described in the designation and drawings without departing from the scope of the present invention. Various modifications and substitutions may be made to the embodiments described above.

For example, in the digital asset guard service provision system of the present invention, the first encryption key generated by the customer, the first parameter specified by the customer, the second encryption key generated by the co-administrator, and the second parameter specified by the co-administrator may be combined in various forms other than those described in this embodiment.

In addition, as a safekeeping means for the file data in the digital asset guard service provision system of the present invention, in addition to the above-mentioned recording function using blockchain and asynchronous distributed technology, a recording function using special encryption and the like may be substituted.

Furthermore, in the above-described digital asset guard service provision system of the present invention, in order to more strictly manage the file data to be saved, configurations are described in which services are provided mainly by consortium of multiple node management organizations. However, the digital asset guard service provision system of the present invention may also be configured to provide a system in which services are provided by a single node administrator using a decentralized ledger with confidentiality such as a private chain, for example.

Furthermore, in an event that generates an unexpectedly strong magnetic field, such as a very violent solar flare, even if file data is safekept in globally distributed the nodes and the recording devices networked to the nodes, the effects of strong magnetic fields would spread over a wide area of the world, increasing the risk that dispersedly safekept file data is destroyed. Therefore, in the digital asset guard service provision system of the present invention, in order to prevent file data from being destroyed due to such an event that generates an unexpected strong magnetic field, among nodes at each dispersed base and the recording devices networked to the nodes at the bases, the nodes at the minimum required base or the recording devices for the file data restoration process may be configured to be surrounded by a high magnetic field resistant material, such as a 3 cm thick lead plate, which does not destroy data even in a strong magnetic field, and an external radiator may be used to lower the temperatures of the nodes or the recording devices at the minimum required bases Furthermore, in the digital asset guard service provision system of the present invention and this embodiment described above, the file data saving system is configured to comprise the programs or smart contracts having multiple encryption and division algorithms having different file data encryption and division process methods, and the file data restoration system is configured to comprise the programs or smart contracts having multiple decryption and linkage algorithms having different file data encryption and division process methods associated with the programs or smart contracts having multiple encryption and division algorithms. However, in the digital asset guard service provision system of the present invention, the file data saving system may naturally be configured to comprise the programs and smart contracts having multiple encryption and division algorithms having different file data encryption and division process methods, and the file data restoration system may be configured to comprise the programs and smart contracts having multiple decryption and linkage algorithms having different file data encryption and division process methods associated with the programs or smart contracts having multiple encryption and division algorithms.

Furthermore, the digital asset guard service provision system of the present invention and this embodiment, may be configured to comprise multiple consortium-type blockchains (systems operating on the co-administrator side). The consortium-type blockchain (the system operated on the co-administrators side) may comprise multiple planets, but basically the system may comprise one planet.

One planet is configured with a combination of multiple physical server groups (the nodes) managed by individual companies, and there are a wide variety of combinations of physical areas, such as utilizing multiple clouds (domestic and overseas regions, multi-cloud).

Furthermore, in the digital asset guard service provision system of the present invention and this embodiment, one data guard service may be configured to combine multiple planets. Note that, when configuring to combine multiple planets, multiple different consortium-type blockchains (systems operated on the co-administrator side) are preferable.

Regarding data deletion in the digital asset guard service provision system of the present invention and this embodiment, the data deletion function may be controlled by a cyberattack, or may be deleted or damaged by malicious operator (such as espionage vandals). However, in the digital asset guard service provision system of the present invention and this embodiment, the above-mentioned one or multiple planets are not managed by one management organization, but may be configured to reduce the risk of data deletion due to cyberattacks or malicious operators (human risk) by combining multiple management bodies.

The risk of cyberattacks and the spread of risks by malicious operators may be reduced by configuring one data guard service with multiple planets and fragmenting operations planet by planet.

In other words, the digital asset guard service provision system of the present invention and this embodiment may be configured such that even if some of the planets perform unexpected data deletion, the entire system may not be affected by the deletion by operating multiple planets using the same logic.

Alternatively, when data is renewed, the digital asset guard service provision system may be configured such that the application programs on both the customer side and the consortium side may recognize the unwanted data information, and the control over index information is disconnected from the customer side control, allowing the consortium side to have sole control. In the case of configuring the digital asset guard service provision system in this manner, even if the index information is leaked to the outside, there is no problem because the data information corresponding to the index is information that is subject to deletion in the first place, and moreover, the index information is protected by the keys managed by the customer. So, decryption is not possible.

Note that, regarding the data to be deleted, after a predetermined time has elapsed, the index information is read and the corresponding file (data) is deleted.

In addition, the digital asset guard service provision system of the present invention and this embodiment may be configured to perform the process on the consortium side by combining the above-mentioned multiple planets, in addition to configurations that are supported by one consortium, such as multisig, and the configuration may increase the security strength by having multiple authentications from the consortium side for each planet.

Two or more planets for providing one data guard service may be combined to be able to decrypt data from each other's planet. With this configuration, data may not be decrypted by a single planet, and the data may not be able to be decrypted without consent of other planets.

Furthermore, in the digital asset guard service provision system of the present invention and this embodiment, the configuration in which multiple planets are combined may also be configured to be able to set the data maintaining planets on the user side. Also, the configuration may also be configured to be able to fragment the data at the entrance of the consortium and designate a consortium to be maintained.

In the digital asset guard service provision system of the present invention and this embodiment, the following configurations may be configured for example, in which three planets are set, every ⅔ of the data is maintained in each consortium side system configuring each planet, a single planet is not able to decrypt the data, and even if the single planet is totally and physically destroyed, the remaining planets are able to decrypt the data.

Furthermore, in the digital asset guard service provision system of the present invention and this embodiment, dividing the node groups in one planet into multiple node groups and treating each node group as one planet is also possible.

In addition, if there are multiple planets on the consortium side, index information (blockchain records) may be configured to record the management information corresponding to the multiple planets. In this case, the keys from different planets are combined with the customer's key. In addition, the management information, such as which data is allotted to which planet, is recorded in the customer side index information (of the system).

Further, in the digital asset guard service provision system of the present invention and this embodiment, the key information of the customer is data. This key information itself may be configured to be able to record in the data maintenance means. With this configuration, the risk of losing the key may be reduced.

Note that in this case, the maintenance means for recording the key may be a maintenance means other than the customer, such as a company that is dedicated to manage the keys professionally.

Furthermore, in the case where the digital asset guard service provision system of the present invention and this embodiment is configured to comprise multiple consortium-side systems, this configuration may be managed with one key, which may be divided for each consortium. Therefore, if keys are divided for each consortium, key management becomes complicated. this key information itself may be recorded in the digital asset guard service provision system as separate security data. For example, the number of keys to be managed may be reduced to one.

In that case, to manage one key is sufficient for the customer (the key may be entrusted to a third party, and the third party can also manage the data by utilizing the digital asset guard service provision system of the present invention and this embodiment). The key may be simply recorded in a computer, smartphone, or various media connected to the Internet.

In other words, even if the data regarding the one key is leaked, the authentication of multiple consortia is required to restore keys for each consortium from the leaked data regarding the one key. Furthermore, even if the key for each consortium could be restored the key for each consortium, only the key information for each consortium would be displayed, and the actual secured data would not be decrypted.

In the first place, when preserving (saving) file data using the digital asset guard service provision system of the present invention and this embodiment, customers (users) and consortiums are required to undergo prior authentication (multi-factor authentication and multi-stage authentication) using IDs. Step-by-step authentication, and the like) are in place, and appropriate guards are in place at the security entrance.

When decrypting the safekept data, the management key safekept through the digital asset guard service provision system of the present invention and this embodiment is first decrypted, and based on the decrypted management key, the key information of multiple consortia is acquired and individually decrypts the encrypted data saved in each consortium side system.

Furthermore, when transferring personal information to the consortium side system, even if the data is encrypted and secret-shared in advance, the changed data may be recognized as personal information.

For this reason, when the consortium side system accepts the encrypted and secret-shared data, there are concerns that various restrictions is imposed on the provision of personal information to a third party.

However, in the digital asset guard service provision system of the present invention and this embodiment, when transferring file data from the customer (user) side system to the consortium side system, the corresponding information is changed into multiple files by secret sharing.

When the multiple file data with shared secrets are transferred to the consortium side system at a time, the above-mentioned concerns arise.

Therefore, in the digital asset guard service provision system of the present invention and this embodiment the multiple file data is preferably sent to the consortium side system in units that cannot be restored (for example, one file data out of the secret-shared multiple file data), the file data is deleted (erased) after the transmission process, and after the deletion (erasure), the next file data is preferably processed for transmission and deletion (erasure) after transmission in the same manner.

When this is done, the consortium side is supposed to receive meaningless information in the file data unit (for example, one file data sent at this moment among the secret-shared multiple file data), and as mentioned above, the consortium receives meaningless information and the above-mentioned concerns are not considered to arise. In addition, in the consortium side system, after performing the saving process such as allotment, distribution and recording for the received file data, the file data is deleted via the data deletion means.

The consortium side system deletes (erases) the file data each time received. On the other hand, the customer side system may possibly delete (erase) one file each time it is sent, but may delete all files at once after all files have been sent.

For example, when five secret-shared file data are generated on the customer side system, and the setting is such that three of them may be decrypted, the maximum number of units of the file data to be sent to the consortium side system is two.

The system on the consortium side may not be able to decrypt the received file data in the received file data units (two in the above example) no matter how. Therefore, even if personal information is the file data in the sending customer side system, the consortium side system may not recognize the personal information from the received file data, so the above-mentioned concerns do not arise.

In this manner, even if file data including personal information is sent from the customer side system to the consortium side system using the digital asset guard service provision system of the present invention and this embodiment, the customer would not be considered to have transferred the personal information to the consortium side system.

Furthermore, using the digital asset guard service provision system of the present invention and this embodiment, even when file data saved in the consortium side system is sent to the customer side system for restoration and decryption, the process should be divided into separate transmission units of the same file data in the reverse order of the above-mentioned.

In addition, in the digital asset guard service provision system of the present invention and this embodiment of the present invention, " . . . program(s) or smart contract(s)" refers that all of the following configurations are intended to be included:

Configuration comprising programs

Configuration comprising smart contracts

Configuration comprising a combination of program(s) and smart contract(s)

INDUSTRIAL APPLICABILITY

The digital asset guard service provision system of the present invention is useful in fields where, for example, confidential information such as personal information and security-related information, control modules for important functions, currencies such as stable coins, rights such as contracts, and other important information are treated as an asset.

EXPLANATION OF REFERENCES

1 Digital asset guard service provision system
10 File data saving system
20 Customer side file data saving system
21$_{1\ through\ q}$ (q is an integer of 10 or more) Program or smart contract having multiple encryption and division algorithms
22 Encryption and division algorithm selection reception means
23 File data saving instruction reception means
24 File data encryption and division means
25. Upload means
26 Wallet
27 Smart contract or program having wallet function for generating customer index information
27' Customer index information generation means or Program having wallet function for generating customer index information
28 Smart contract for recording customer index information
28' Customer index information recording means
33-1 Program or smart contract for generating customer side index information
34-1 Program or smart contract for recording customer-side index information
30 Co-administrator side file data saving system
30X Smart contract for saving co-administrator side file data
31 Smart contract for allotting distributed file management groups
31' Distributed file management group allotment means
32 Smart contract for distribution and recording
32' Distribution and recording means
33 Smart contract for generating server index information
33-2 Smart contract for generating index information on co-administrator side
33' Server index information generation means
34 Smart contract for recording server index information
34-2 Smart contract for recording index information on co-administrator side
34' Server index information recording means
36 Planet configuration pattern setting means
37. Saved file data list information generation means
38. Saved file data list information reference control means
39 Smart contract for setting safekeeping period
40 Smart contract for chain disconnection
41 Smart contract for block deletion

42 Unnecessary block data saving means
43 Data falsification check control means
44 Smart contract for rollover
45. Periodical record amount checking means
46 First data deletion means
100 Small amount file data temporary recording means
101 File data integration means
102 Small amount file data deletion means
50 Data saving service contract application procedure reception means
51 Smart contract for recording data saving service contract application reception information
52 Upload processable IP address check means
53 Upload processable record capacity check means
60 File data restoration system
70 Customer-side file data restoration system
71$_{1\ through\ q}$ (q is an integer of 10 or more) Program or smart contract having multiple decryption and linkage algorithms
72 Download means
73 File data restoration means
74 Second data deletion means
82-1 Smart contract for extracting customer-side encrypted index information
83-1 Smart contract for decrypting customer-side index information
80 Co-administrator side file data restoration system
80X Smart contract for restoring co-administrator side file data
81 File data extraction instruction reception means
82 Smart contract for extracting encrypted server index information
82-2 Smart contract for extracting co-administrator side encrypted index information
82' Encrypted server index information extraction means
83 Smart contract for decrypting server index information
83-2 Smart contract for decrypting co-administrator side index information
83' Server index information decryption means
84 Smart contract for extracting encrypted and divided file data
84' Encrypted and divided file data extraction means
85 Restoration process time frame setting acceptance means
86 File data restoration process operation control means
87 Authentication code setting reception means
91 Data destructive attack detection means
92 Automatic data saving means upon being attacked
93 Communication switching control means
94 Customer registration information designation reception means
95 Smart contract for customer registration
96 First parameter designation reception and recording means
97 Second parameter designation reception and setting means
98 Smart contract for generating and recording system setting information
98' System setting information generation and recording means
99 Smart contract or program having wallet function for generating customer setting information
99' Customer setting information generation means or Program having wallet function for generating customer setting information
K1 First (encryption) key
K12 First public key, that is encryption key
K11 First secret key, that is first offline decryption key
K112 Secret key for first blockchain access
K2 Second (encryption) key
K22 Second public key, that is second encryption key
K21 Second secret key, that is second decryption key
K212 Secret key for second blockchain access
P1 First parameter
P11 File division code
P12 File storage code
P1X First compound parameter
P1X1 First decryption parameter
P1X2 First encryption parameter
P2 Second parameter
P2X Second compound parameter
P2X1 Second decryption parameter
P2X2 Second encryption parameter
M1 First temporary storage area
M2 Second temporary storage area
MA Matrix
100$_{1\ through\ n}$ (where n is an integer greater than or equal to 2) Planet
101$_{1\ through\ m}$ (where mb is an integer greater than or equal to 2) Distributed file management group
102$_{1\ through\ mb}$ (where mb is an integer greater than or equal to 2) Node
102*c*$_{1\ through\ m}$ (where m is an integer greater than or equal to 2) Core node
103$_{1\ through\ p}$ (where p is an integer of 2 or more) Sub-configuration file server

The invention claimed is:

1. A digital asset guard service provision system for guarding digital assets against high-level cyberattacks, comprising a decentralized ledger using the dispersed technique such as blockchains, and a smart contract or server application for performing a predetermined process using data managed in the decentralized ledger, the digital asset guard service provision system is characterized by comprising:

a consortium-type blockchain configured with multiple planets (a planet is a unit making up a blockchain) comprising a node group in which nodes located at multiple bases in different regions in the world are linked;

a file data saving system; and a file data restoration system;

wherein the nodes located at each of the bases are networked to the recording devices at the multiple bases in the different regions in the world to form distributed file management groups, wherein the file data saving system comprises:

a program or smart contract having multiple encryption and division algorithms;

an encryption and division algorithm selection receiver comprising an information processor and a program operating in cooperation with the information processor;

a file data saving instruction receiver comprising an information processor and a program operating in cooperation with the information processor;

a file data encryptor and divider comprising an information processor and a program operating in cooperation with the information processor;

an uploader comprising an information processor and a program operating in cooperation with the information processor;

a smart contract for allotting distributed file management groups;

a smart contract for distribution and recording;

a smart contract for generating and recording system setting information;

a smart contract for generating server index information;

a smart contract or a program having a wallet function for generating customer setting information;

a smart contract or a program having a wallet function for generating customer index information; and a first data deleter comprising an information processor and a program operating in cooperation with the information processor;

wherein the file data restoration system comprises:

a program or smart contract having multiple decryption and linkage algorithms;

a file data extraction instruction receiver comprising an information processor and a program operating in cooperation with the information processor;

a smart contract for extracting encrypted server index information;

a smart contract for decrypting server index information;

a smart contract for extracting encrypted and multi-divided file data;

a downloader comprising an information processor and a program operating in cooperation with the information processor;

a file data restorer comprising an information processor and a program operating in cooperation with the information processor; and a second data deleter comprising an information processor and a program operating in cooperation with the information processor;

wherein the multiple programs or smart contract having encryption and division algorithms is configured to have a different file data encryption and division process method, wherein the encryption and division algorithm selection receiver is configured to accept a selection of a program or smart contract having predetermined encryption and division algorithms based on a first parameter specified by a customer who desires to save the file data, wherein the file data saving instruction receiver is configured to accept a file data saving instruction from a customer who desires to save the file data, wherein the file data encryptor and divider is configured to encrypt and multi-divide the customer file data to be saved, the customer file data being accepted by the file data saving instruction receiver, using a program or smart contract having encryption and division algorithms accepted by the encryption and division algorithm selection receiver, wherein the uploader is configured to upload each file data encrypted and multi-divided by the file data encryptor and divider to a first temporary storage area, wherein the smart contract for allotting distributed file management group is configured to have a function for allotting, each of the file data (that is encrypted and multi-divided by the file data encryptor and divider, and) uploaded into the first temporary storage area by the uploader, to the multiple distributed file management groups (configured with the nodes located at each of the bases configuring the planet set on a co-administrator side in a condition specified by a customer and the recording devices located at multiple bases networked to the nodes at the bases) based on the first parameter and the second parameter specified by a co-administrator of the consortium-type blockchain, wherein the smart contract for distribution and recording is configured to have a function to distribute and record each file data allotted by the smart contract for allotting distributed file management groups into the nodes located at each of the bases belonging to each of the corresponding distributed file management groups and into the recording devices located at multiple bases networked to the nodes at the bases, wherein the smart contract for generating and recording the system setting information is configured to have a function for generating and encrypting the system setting information and recording into the node groups located at the specified bases in the consortium-type blockchain, wherein the system setting information comprises:

(a) destination identifying information such as terminal information and a fixed Internet Protocol (IP) address for uploading the system setting information to the first temporary storage area using the uploader;

(b) a predetermined smart contract number that performs a process corresponding to a recording destination of customer file data;

(c) planet information to which a recording destination of file data belongs; and (d) information on a file server group at the nodes at predetermined bases and the recording devices located at multiple bases networked to the nodes at the bases configuring distributed file management groups;

wherein the smart contract for generating server index information is configured to have a function for generating server index information, wherein the server index information comprises:

(a) information on file names of each file data distributed and recorded by each of the smart contracts for distribution and recording; and (b) configuration information of each of the distributed file management groups which are allotment destinations of each file data, wherein a smart contract for recording server index information is configured to have a function for encrypting server index information generated by the smart contract for generating server index information and for recording the server index information into node groups located at specified bases in the consortium-type blockchain, wherein the smart contract or program having a wallet function for generating customer setting information is configured to have a function for generating customer setting information, wherein the customer setting information comprises the first parameter setting information associated with the program or smart contract having encryption and division algorithms accepted by the encryption and division algorithm selection receiver;

wherein the smart contract or program having a wallet function for generating customer index information is configured to have a function for generating customer index information, wherein the customer index information comprises information of an original file name and an upload date of customer file data to be saved, wherein the smart contract for recording customer index information is configured to have a function for encrypting customer index information generated by the smart contract or program having a wallet function for generating customer index information, and for recording the encrypted customer index information into node groups located at specified bases in the consortium-type blockchain, wherein the first data deleter is configured to delete each file data uploaded into the first temporary storage area, after the server index information is encrypted by the smart contract for recording server index information and recorded in node groups located at specified bases in the consortium-type blockchain, wherein the programs or smart contracts having the multiple decryption and linkage algorithms are configured to associated with each of the program or smart contract having the encryption and division algorithms, and to differentiate file data decryption and linkage process methods, wherein the file data extraction instruction receiver is configured to accept a file data extraction instruction from a customer who desires to restore the file data, wherein the smart contract for extracting encrypted server index information is configured to have a function for extracting encrypted server index information (recorded in node groups located at specified bases in the consortium-type blockchain by the smart contract for recording server index information) based on the first parameter or first compound parameter associated with the file data to be extracted accepted by the file data extraction instruction receiver and based on the second parameter or second compound parameter, wherein the first compound parameter comprises a pair of a first decryption parameter specified by a customer and managed offline and a first encryption parameter automatically generated from the first decryption parameter, wherein the second compound parameter is configured with a pair of a second decryption parameter specified by a co-administrator and managed offline (which is incorporated and modularized within the predetermined smart contract that performs a corresponding process) and a second encryption parameter automatically generated from the second decryption parameter (which is incorporated and modularized within a predetermined smart contract that performs the corresponding process), wherein the smart contract for decrypting server index information is configured to have a function for decrypting the encrypted server index information extracted by the smart contract for extracting encrypted server index information, wherein the smart contract for extracting encrypted and multi-divided file data is configured to have a function for extracting the encrypted and multi-divided file data (which are allotted to each of the distributed file management groups by the smart contract for allotting distributed file management groups, and which are distributed and recorded in the nodes located at each of the bases belonging to each of the distributed file management groups and in the recording devices located at multiple bases networked to the nodes at the bases by each of the smart contracts for distribution and recording), from any of the nodes located at each of the bases belonging to each of the distributed file management groups or from the recording devices located at multiple bases networked to the nodes at the bases, using the server index information decrypted by the smart contract for decrypting server index information, wherein the downloader is configured to download, each of the encrypted and multi-divided file data extracted by the smart contract for extracting encrypted and multi-divided file data, to a second temporary storage area, wherein the file data restorer is configured to decrypt, each of the encrypted and multi-divided file data which are (extracted by the smart contract for extracting encrypted and multi-divided file data and) downloaded to the second temporary storage area by the downloader, integrate into one file data and restore to the file data before being saved, using a program or smart contract having decryption and linkage algorithms associated with the program or smart contract having encryption and division algorithms accepted by the encryption and division algorithm selection receiver, and wherein the second data deleter is configured to delete each of the encrypted and multi-divided file data downloaded to the second temporary storage area after restored to the file data before being saved by the file data restorer.

2. The digital asset guard service provision system according to claim 1, wherein the file data saving system comprises:

a customer-side file data saving system that operates on the customer-side who desires to save the file data; and a co-administrator side file data saving system that operates on the co-administrator side of the consortium-type blockchain;

wherein the customer side file data saving system comprises:

the multiple programs or smart contract having encryption and division algorithms;

the encryption and division algorithm selection receiver;

the file data saving instruction receiver;

the file data encryptor and divider;

the uploader;

the smart contract or the program having a wallet function for generating customer index information; and the smart contract for recording customer index information;

wherein the co-administrator side file data saving system comprises:

the smart contract for allotting distributed file management groups;

the smart contract for distribution and recording;

the smart contract for generating server index information;

the smart contract for recording server index information; and the first data deleter;

wherein the file data restoration system comprises a combination of:

a customer-side file data restoration system that operates on a customer-side who desires to restore saved file data, each of which being formed completely and independently; and a co-administrator side file data restoration system that operates on the co-administrator side of the consortium-type blockchain;

both of the restoration systems are formed completely and independently, wherein the customer side file data restoration system comprises:

a program or smart contract having multiple decryption and linkage algorithms;

the file data extraction instruction receiver;

the downloader;

the file data restorer; and the second data deleter;

wherein the co-administrator side file data restoration system comprises:

the smart contract for extracting encrypted server index information;

the smart contract for decrypting server index information; and the smart contract for extracting encrypted and multi-divided file data.

3. The digital asset guard service provision system according to claim 1, wherein the smart contract for allotting distributed file management groups is further configured to have a function for converting file formats and names of each file data (encrypted and multi-divided by the file data encryptor and divider and) uploaded into the first temporary storage area by the uploader into predetermined file formats and names prior to allotting to the multiple distributed file management groups, and wherein the smart contract for extracting encrypted and multi-divided file data is further configured to have a function for converting file formats and names of each extracted file data to the original file formats and names after extracting the encrypted and multi-divided file data.

4. The digital asset guard service provision system according to claim 1, wherein the first parameter comprises:

a file division code; and a file storage code;

wherein the encryption and division algorithm selection receiver is configured to accept a selection of a program or smart contract having predetermined encryption and division algorithms based on the file division code, wherein the smart contract for allotting distributed file management groups is configured to have a function for performing processes 4-1 through 4-3, wherein, in the process 4-1, the smart contract for allotting distributed file management groups converts the file formats and names of each file data (encrypted and multi-divided by the file data encryptor and divider and) uploaded to the first temporary storage area by the uploader to predetermined file formats and names based on the file storage code and the second parameter, in the process 4-2, the smart contract for allotting distributed file management groups performs the process 4-1 and simultaneously encrypts the file data, and in the process 4-3, after performing the process 4-2, the smart contract for allotting distributed file management groups allots to multiple distributed file management groups configured with the nodes located at multiple bases formed for the planet set on the co-administrator side according to a condition specified by a customer and with the recording devices located at multiple bases networked to the nodes at the bases, wherein each of the smart contracts for distribution and recording is configured to have a function for distributing and recording each file data allotted by the smart contract for allotting distributed file management groups to the nodes at each of the bases belonging to each of the corresponding distributed file management groups and to the recording devices located at multiple bases networked to the nodes at the bases, wherein the smart contract for extracting encrypted and multi-divided file data is configured to have a function for performing processes 4-4 through 4-6, wherein, in the process 4-4, the smart contract for extracting encrypted and multi-divided file data extracts each of the encrypted and multi-divided file data (that are allotted to each of the distributed file management groups by the smart contract for allotting distributed file management groups, distributed and recorded in the nodes located at each of the bases belonging to each of the distributed file management groups by each of the smart contracts for distribution and recording and in the recording devices located at multiple bases networked to the nodes at the bases) from any of the nodes located at each of the bases belonging to each of the distributed file management groups or from the recording devices located at multiple bases networked to the nodes at the bases based on the file storage code and the second parameter, in the process 4-5, the smart contract for extracting encrypted and multi-multi-divided file data decrypts the file data extracted in the process 4-4, and in the process 4-6, the smart contract for extracting encrypted and multi-divided file data performs the process 4-5 and at the same time changes the file formats and names of the file data to the original file formats and names, wherein the file data restorer is configured to decrypt the encrypted and multi-divided file data (that is extracted by the smart contract for extracting encrypted and multi-divided file data and) that is downloaded to the second temporary storage area by the downloader, link to one file data and restore the file data before being saved, based on the file division code, using the program or smart contract having encryption and division algorithms associated with the program or smart contract having encryption and division algorithms accepted by the encryption and division algorithm selection receiver.

5. The digital asset guard service provision system according to claim 1, wherein the file data encryptor and divider is configured to perform the processes 5-1 and 5-2, wherein, in the process 5-1, the file data encryptor and divider multi-divides the customer file data to be saved accepted by the file data saving instruction receiver using the program or smart contract having encryption and division algorithms accepted by the encryption and division algorithm selection receiver, and in the process 5-2, the file data encryptor and divider performs the process 5-1, and encrypts each of the multi-divided file data in accordance with a first public key, that is a first encryption key generated by the customer, and the file data restorer is configured to perform the processes 5-3 and 5-4, wherein, in the process 5-3, the file data restorer decrypts each of the encrypted and multi-divided file data that are (extracted by the smart contract for extracting encrypted and multi-divided file data and) downloaded to the second temporary storage area by the downloader based on a first secret key, that is a first offline decryption key generated by the customer, and in the process 5-4, the file data restorer performs the process 5-3 and links each decrypted file data to one file data using a program or smart contract having decryption and linkage algorithms associated with the program or smart contract having encryption and division algorithms accepted by the encryption and division algorithm selection receiver.

6. The digital asset guard service provision system according to claim 1, wherein the smart contract for recording server index information is configured to have a function for encrypting server index information generated by the smart contract for generating server index information based on the second public key, that is the second encryption key generated by the co-administrator of the consortium-type blockchain, or based on the second encryption parameter (which is incorporated and modularized in the predetermined smart contract performing the set process) which is automatically generated from a (incorporated and modularized within the predetermined smart contract that performs the corresponding process) second decryption parameter specified by the co-administrator and managed offline; and wherein the smart contract for decrypting server index information is configured to have a function for decrypting the encrypted server index information extracted by the smart contract for extracting encrypted server index information based on the second secret key, that is the second decryption key generated by the co-administrator of the consortium-type blockchain, or based on the second decryption parameter (which is incorporated and modularized in the predetermined smart contract performing the set process) specified by the co-administrator and managed offline.

7. The digital asset guard service provision system according to claim 1, wherein the program or smart contract having encryption and division algorithms is configured to encrypt and multi-divide file data using secret sharing technologies.

8. The digital asset guard service provision system according to claim 1, wherein the program or smart contract having decryption and linkage algorithms is configured to decrypt encrypted and multi-divided file data using secret sharing technologies and restore to the original integrated file data.

9. The digital asset guard service provision system according to claim 1, wherein the file data saving system further comprises a planet configuration pattern setter comprising an information processor and a program operating in cooperation with the information processor, wherein the planet configuration pattern setter is configured to calculate and select a number of the nodes configuring the planet and distributed file management groups configured with nodes at each base and the recording devices located at multiple bases networked to the nodes at the bases based on the number of divisions of the file data in accordance with a record capacity and file size and a degree of dispersion of file data specified by the customer, wherein the smart contract for allotting distributed file management groups is configured to have a function for allotting to multiple distributed file management groups configured with the nodes at each of the bases and the recording devices located at multiple bases networked to the nodes at the bases configuring the planet set on the co-administrator side according to conditions specified by the customer via the planet configuration pattern setter, and wherein each of the smart contracts for distribution and recording is configured to have a function for distributing and recording each file data allotted by the smart contract for allotting distributed file management groups in the nodes at each of the bases belonging to each of the corresponding distributed file management groups and in the recording devices located at multiple bases networked to the nodes at the bases.

10. The digital asset guard service provision system according to claim 9, wherein the planet configuration pattern setter is configured to add a predetermined number of dummy file data (internally comprising the code that can recognize that the smart contract for extracting encrypted and multi-divided file data is dummy information) to the number of divisions of the file data, and selects the number of the nodes configuring the planet and distributed file management groups configured with the nodes located at each of the bases and the recording devices located at multiple bases networked to the nodes at each of the bases.

11. The digital asset guard service provision system according to claim 9, wherein the planet configuration pattern setter performs the following processes 16-1 and 16-2, wherein, in the process 16-1, the planet configuration pattern setter views the spherical earth as a flat surface and generates a matrix that divides the regions of the earth into multiple segments in the vertical and horizontal directions, and in the process 16-2, the planet configuration pattern setter determines intervals in the X-axis direction with respect to the Y-axis in the matrix for bases of nodes that distribute and record one divided file data and of multiple recording devices networked to the nodes in a distributed file management group, using calculated values based on the number of divisions of the file data, and is configured to calculate and select the nodes located at each of the bases in each of the distributed file management groups and the recording devices located at multiple bases networked to the nodes at the bases.

12. The digital asset guard service provision system according to claim 1, wherein the file data saving system further comprises a data falsification check controller comprising an information processor and a program operating in cooperation with the information processor, and wherein the data falsification check controller is configured to perform processes 42-1 through 42-4, wherein, in the process 42-1, the data falsification check controller calculates hash values based on encrypted and multi-divided file data recorded: in the nodes at each of the bases belonging to each of the distributed file management groups; and in the recording devices at multiple bases networked to the nodes at the bases, in the process 42-2, the data falsification check controller records in a block the hash value calculated in the process 42-1, in the process 42-3, the data falsification check controller constantly compares the hash values recorded in: blocks in the nodes located at each of the bases belonging to each of the distributed file management groups; and blocks of the recording devices located at multiple bases networked to the nodes at the bases, and in the process 42-4, if there is a difference between: a hash described in a block in a specified node or in a recording device; and a hash described in another block of a node or a recording device; upon performing the comparison process 42-3, the data falsification check controller performs processes 42-4-1 and 42-4-2, and wherein, in the process 42-4-1, the data falsification check controller: detects that the encrypted and multi-divided file data recorded in the specified node or recording device is tampered with or destroyed; excludes the specified node or recording device from the file data save process object; and deletes the block in the specified node or recording device, and in the process 42-4-2, the data falsification check controller performs the process 42-4-1 and sends an alarm to the operator of the node and to the co-administrator of the consortium-type blockchain.

13. The digital asset guard service provision system according to claim 1, further comprises an upload processable IP address checker comprising an information processor and a program in cooperation with the information processor, wherein, as terminal information for uploading into the first temporary storage area using the uploader, the upload processable IP address checker is configured to control to be capable of operating the upload process of file data to be saved in the file data saving system, that is:

the encryption and division algorithm selection receiver comprising an information processor and a program operating in cooperation with the information processor;

the file data saving instruction receiver;

the file data encryptor and divider; and the uploader, only by an operation in a customer terminal in which a fixed IP address is pre-registered in the node groups located at the specified bases in the consortium-type blockchain as a portion of the system setting information.

14. The digital asset guard service provision system according to claim 1, further comprises a data destructive attack detector comprising an information processor and a program operating in cooperation with the information processor and a data saver automatically saving data upon attacking that comprises an information processor and a program operating in cooperation with the information processor, wherein the data destructive attack detector is configured to perform the processes 59-1 and 59-2, wherein, in the process 59-1, the data destructive attack detector detects an attack against encrypted and multi-divided file data which is recorded in a node or recording device of any of the bases configuring the planet, or an existence of data destruction due to equipment failure, and in the process 59-2, the data destructive attack detector determines that the file data is attacked when destructions of multiple file data managed in a certain time frame such as 30 minutes, 8 hours, or 24 hours is detected, and wherein the data saver is configured to perform the processes 59-3 and 59-4, wherein in the process 59-3, when the data destructive attack detector detects an attack against the encrypted and multi-divided file data, the data saver: stops the nodes at each of the base configuring the planet, and the recording devices located at multiple bases networked to the nodes at the bases; or forcibly disconnects the Internet connection route, and in the process 59-4, the data saver performs the process 59-3, and sets and automatically saves the encrypted and multi-divided file data that are distributed and recorded: in a node at a base that is not attacked; or in the recording devices at multiple bases networked to the nodes at the bases, to the nodes at each of the bases configuring another planet in which the data destructive attack detector has not detected an attack against the encrypted and multi-divided file data; and to the recording devices at multiple bases networked to the nodes at the bases.

15. The digital asset guard service provision system according to claim 1, wherein an index information generator comprising an information processor and a program operating in cooperation with the information processor, an index information recorder, an encrypted index information extractor comprising an information processor and a program operating in cooperation with the information processor, and an index information decryptor comprising an information processor and a program operating in cooperation with the information processor are separately configured on the customer-side and on the co-administrator side of the consortium-type blockchain, wherein the index information generator comprises: a program, wallet function, or smart contract for generating customer-side index information operating on the customer side who desires to save the file data; and a smart contract for generating co-administrator side index information that operates on the co-administrator side of the consortium-type blockchain;

wherein the program or smart contract for generating customer side index information is configured to have a function for generating customer-side index information, wherein the customer side index information comprises:

an original file name, information on an upload date, and a safekept deadline of the file data to be saved when uploaded into the first temporary storage area using the uploader;

wherein the smart contract for generating the co-administrator side index information is configured to have a function for generating co-administrator side index information, wherein the co-administrator side index information comprises:

file name information after renaming of each file data distributed and recorded by each of the smart contracts for distribution and recording; and encrypted corresponding recording destination information, wherein the index information recorder comprises: a program or smart contract for recording customer-side index information being operated on the customer side that desires to save the file data; and a smart contract for recording co-administrator side index information that operates on the co-administrator side of the consortium-type blockchain, wherein the program or smart contract for recording customer-side index information is configured to have a function for encrypting and recording the customer-side index information generated by the program or smart contract for generating customer side index information into node groups located at the specified bases in the consortium-type blockchain, when authentication is provided using the first secret key for blockchain access generated based on the first secret key, that is the first offline decryption key generated by the customer, wherein the smart contract for recording co-administrator side index information is configured to have a function for encrypting and recording the co-administrator side index information generated by the smart contract for generating the co-administrator side index information into node groups located at the specified bases in the consortium-type blockchain, when authentication is provided using a secret key for accessing the blockchain generated based on the second secret key, that is the second offline decryption key generated by the co-administrator of the consortium-type blockchain, wherein the smart contract for recording co-administrator side index information is configured to have a function for encrypting and recording, the co-administrator side index information generated by the co-administrator of the consortium-type blockchain, into the node groups located at the specified bases in the consortium-type blockchain, when authentication is provided using the second secret key for accessing the blockchain generated based on the second secret key, that is, the second decryption key generated by the co-administrator of the consortium-type blockchain, wherein the encrypted index information extractor comprises:

a smart contract for extracting customer-side encrypted index information that operates on the customer side who desires to restore the file data; and a smart contract for extracting encrypted co-administrator side index information that operates on the co-administrator side of the consortium-type blockchain, wherein the smart contract for extracting customer-side encrypted index information is configured to have a function for extracting the customer side encrypted index information recorded in node groups located at the specified bases in the consortium-type blockchain by the smart contract for recording the customer-side encrypted index information based on the first parameter and the second parameter associated with the file data to be extracted accepted by the file data extraction instruction receiver, when authentication is provided using the first secret key for blockchain access generated based on the first secret key and the first decryption key generated by the customer, wherein the smart contract for extracting encrypted co-administrator side index information is configured to have a function for extracting and recording, the encrypted co-administrator-side index information recorded, in node groups located at the specified bases in the consortium-type blockchain, by the smart contract for recording encrypted co-administrator side index information, based on the first parameter and the second parameter associated with the file data to be saved accepted by the file data extraction instruction receiver, when authentication is provided using the second secret key for accessing the blockchain generated based on the second secret key, that is, the second decryption key generated by the co-administrator of the consortium-type blockchain, wherein the index information decryptor comprises:

a smart contract for decrypting customer side index information that operates on the customer side who desires to restore the file data; and a smart contract for decrypting co-administrator side index information that operates on the co-administrator side of the consortium-type blockchain, wherein the smart contract for decrypting the customer-side index information is configured to have a function for decrypting the customer side encrypted index information extracted by the smart contract for extracting customer-side encrypted index information based on the first secret key, that is the first offline decryption key generated by the customer, and wherein the smart contract for decrypting the co-administrator side index information is configured to have a function for decrypting the encrypted co-administrator-side index information extracted by the smart contract for extracting the co-administrator side encrypted index information based on the second secret key, that is, the second decryption key generated by the co-administrator of the consortium-type blockchain.

* * * * *